United States Patent [19]

Hsu

[11] Patent Number: 4,949,260

[45] Date of Patent: Aug. 14, 1990

[54] METHOD FOR INPUTTING CHINESE INFORMATION THROUGH HIEROGLYPHIC APPROACH AND KEYBOARD ARRANGEMENT THEREFOR

[76] Inventor: Su-Hsia Hsu, No. 19, Wen Wu 2nd Street, Chien King District, Kao Hsiung, Taiwan

[21] Appl. No.: 292,995

[22] Filed: Jan. 3, 1989

[51] Int. Cl.[5] .......................... B41J 5/00; G06F 15/38

[52] U.S. Cl. .................................... 364/419; 400/110; 364/900

[58] Field of Search ........................ 364/419, 900, 200; 400/110

[56] References Cited

U.S. PATENT DOCUMENTS

| | | | |
|---|---|---|---|
| 4,505,602 | 3/1985 | Wong | 364/419 |
| 4,698,758 | 10/1987 | Larsen | 364/419 |
| 4,737,040 | 4/1988 | Moon | 400/110 |
| 4,879,653 | 11/1989 | Shinoto | 364/419 |

*Primary Examiner*—Jerry Smith
*Assistant Examiner*—Kim Thanh Tbui
*Attorney, Agent, or Firm*—Cushman, Darby & Cushman

[57] ABSTRACT

A method and an arrangement of key-board are disclosed for inputting information in Chinese through a hieroglyphic approach, in which the forms, sounds, and meanings of the English letters and the numerals are correlated with the Chinese characters for inputting information in Chinese through the keyboard. In the present invention, instead of the numerous Chinese radicals which are to be memorized, the correlation in form, sound, and meaning of the English letters and the numerals between the Chinese characters is utilized so that information in Chinese can be input by directly operating a standard keyboard. With the present invention, it is easy, convenient, and fast for an operator to learn the input method and arrangement and it is also possible to change the font of the Chinese characters by simply pressing a function key.

3 Claims, 2 Drawing Sheets

METHOD FOR INPUTTING CHINESE INFORMATION THROUGH HIEROGLYPHIC APPROACH AND KEYBOARD ARRANGEMENT THEREFOR

BACKGROUND OF THE INVENTION

The present invention relates to a method for inputting Chinese information through the hieroglyphic approach, and the keyboard arrangement therefor. In the present invention, a method for inputting Chinese characters is embodied mainly by making use of the forms, sounds, and meanings of the English letters and the numerals to match the basic radicals of Chinese characters. With the method of the present invention, it is possible to have different codes for inputting each of the Chinese characters so that the frequency of repetition of the words is substantially reduced.

There are several currently available methods with which Chinese information is input by entering codes directly according to the stroke orders of the Chinese characters. Among them is the "Ta Yi Method for Inputting Chinese Characters and Keyboard Arrangement Therefor", in which the numerous Chinese characters with complicated structures are sorted into 237 radicals and the sorted radicals are allocated on a normal English keyboard with the arrangement according to their frequencies of usage. An operator has to remember the various keys each representing different radicals to input the codes of the Chinese characters. The Ta Yi Method for Inputting Chinese Character referred to above has many disadvantages. As stated above, the operator has to remember the various keys each representing different radicals since the corresponding relationships of the keys and the radicals are not regular. In the Ta Yi Method, the forms of the Chinese characters are sorted into more than two hundred radicals and except that the frequently used radicals are allocated on the keys which the operator will operate frequently, there are no definite rules for the operator to follow. Thus, a novice operator will face a big problem when they have first to remember the relationships between the keys and the radicals. Besides, since each of the keys represents different radicals, any Chinese character must be input by entering a fixed code in a given order for the method to function, which tends to cause difficulties in learning and a sense of frustration to the beginners.

SUMMARY OF THE INVENTION

Accordingly, it is an object of the present invention to provide a method which makes use of hieroglyphic approach to overcome the disadvantages of the above-mentioned method. That is to make the job of inputting the characters easy to learn. In view of the fact that ordinary operators are familiar with the English keyboard arrangement, the invention provides a code combination table in which the Chinese characters are correlated with the English letters, the numerals, and the symbols in respect of their forms and the similarities between their pronunciations and meanings to save the effort of the operators in remembering the keyboard arrangement with which the complicated Chinese radicals are allocated. In addition, the method of the present invention permits inputting the Chinese characters in a number of ways so that the repeated characters are reduced and the speed of operation is increased. The method of the present invention can be adopted by any operator quickly and efficiently by directing using the English keyboard.

Another object of the present invention is to provide a method which permits inputting the Chinese characters which are written in different ways, with different strokes, in different styles or in simplified forms and will automatically convert such characters into their regular forms, thereby to increase the flexibility of using the method of the prèsent invention for inputting the information in Chinese.

A further object of the invention is to provide a keyboard arrangement utilizing a normal standard English keyboard wherein the English letter keys, the numeral keys, the symbol keys and so on are directly sorted to represent various radicals of the Chinese characters according to the similarities of the forms, pronunciations and meanings between the English letters, symbols and numerals and the constructions of the Chinese characters. Therefor, an operator can easily input the Chinese characters through the hieroglyphic approach.

In the present invention, the Chinese characters are divided into rarely used characters and commonly used ones. In case of the occurrence of repeated characters, the one which is most commonly use will be entered automatically and in case when it is required to use the rarely used character, the rarely used character will be automatically entered by merely entering an appropriate instruction key so that the time for character selection is saved. Also, the function keys are used to transfer the inputted characters to become various forms and sizes to meet the requirements in type-setting diagramming, printing, displaying, tabulation, and programming.

The present invention can also enter the Chinese characters by inputting the phonetic symbols (Pin-in Symbol). The phonetic symbols of the Chinese characters are preset on a plurality of keys of the English keyboard so that persons who do not know well how to write the Chinese characters still can input specific phonetic symbols formed by the corresponding keys to get the information in Chinese.

BRIEF DESCRIPTION OF THE DRAWINGS

The code indexing principles and the keyboard arrangement of the present invention will now be described with reference to the following FIGS. 1 and 2 and the Table addressed in the Detailed Description of the Invention.

DETAILED DESCRIPTION OF THE INVENTION

Figure 1:
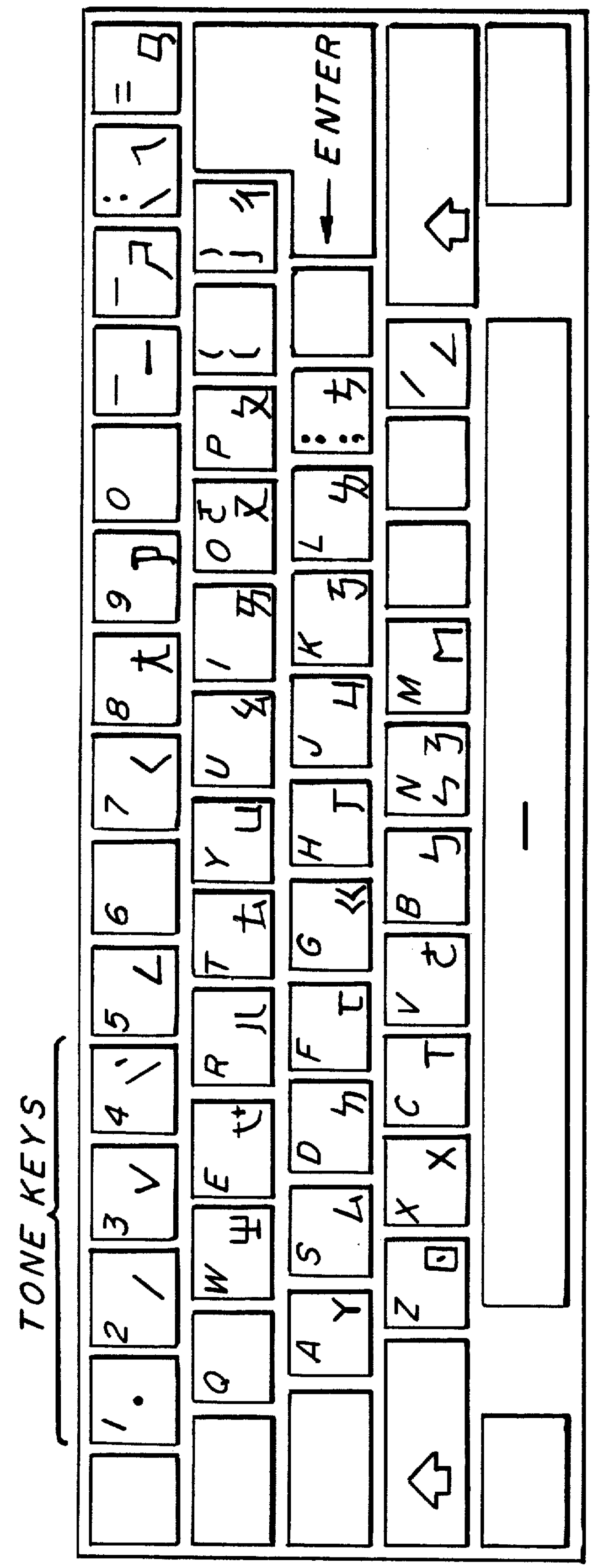
FIG. 1 is a keyboard arrangement of the phonetic symbols of Chinese characters correlated to the English letter and symbols in accordance with the present invention.

The present invention will now be described with reference to The Tables and figures, in which.

Table 1 is a list of keys of an English keyboard on which the Chinese characters are allocated as the basis for direct code indexing.

Table 2 is a list of indexing codes for processing the Chinese information by means of the method according to the present invention.

First referring to Tab. 1, the code indexing principles of the present invention will be described. The code indexing principles relates to correlating the English letters to the Chinese characters according to the similarities in forms, pronunciations, and meanings thereof for determining the radicals which the Chinese characters are composed. Therefore, the code indexing principles used in the method according to the present invention are mainly based on the stroke orders of the Chinese characters which match with the forms of the English letters and symbols.

For the convenience of remembering the relation between the forms of the Chinese characters and the forms, pronunciations, and meanings of the English letters and symbols, in addition to referring to the list shown in Tab. 1, the principles used for code indexing in respect of individual letters will now be described in more detail:

. 1.

A: The Chinese characters etc. are all of a shape which has an opening facing down with something therein and looks very much like the letter "A".

B: The Chinese characters etc. all have a shape which is divided equally from the middle and looks very much like the letter "B".

C: The Chinese characters etc. are all of a shape which is surrounded on three side thereof and the other side thereof has an opening facing laterally, thus looking very much like the letter "C".

D: The Chinese characters and (used for shaving) not only have a shape resembling that of the letter "D" but also sound very much alike.

E: The Chinese characters etc. very much like the letter "E", have a shape composed of a vertical stroke and three or more horizontal ones or a horizontal stroke and three or more vertical ones.

F: The Chinese character is in the shape of inverted letter "F" in opposite direction and looks very much alike; and the characters (used as a radical), like the letter "F", is composed of a vertical stroke and two horizontal strokes, one in the upper and the other in the middle position, and the shape looks very much like "F", so "F" is taken as the indexing code.

G: The Chinese characters and the letter "G" are shaped very much like the heart, so "G" is taken as the indexing code for the characters such as which have a shape similar to that of G.

H: The Chinese characters etc., very much like the letter "H", have a shape composed of two horizontal and one vertical strokes or one horizontal and two vertical strokes.

I: The letter "I" is in the shape of a straight vertical stroke while the character literally means straight and the radical has the shape of a straight vertical line with two dots omitted, so "I" is taken as the indexing code.

J: The Chinese characters etc., has a shape very much like that of the letter "J"; and fishhooks are similar in shape to "J"; so "J" is also taken as the indexing code for the character meaning "fish".

K: The Chinese characters etc. are similar in shape to letter "K" in that they all have an opening facing down, so "K" is taken as the indexing code.

L: The Chinese character looks in shape like the letter "L" rotated through 90 degrees and the lower portions of the characters etc. have a shape in close resemblance to "L", so "L" is taken as the indexing code.

M: The Chinese characters etc., like the letter "M", are in a shape having two vertical strokes on either side; and the characters mean the weapons men used to fight and the English word "men" begins with the letter "M", so "M" is taken as the indexing cod for such characters.

N: The upper portion of the Chinese characters and the character etc., very much like the letter "N", are of a shape having more than two turns of 45 degrees; so "N" is taken as the indexing code for such characters.

O: The Chinese characters etc. have a shape which is closed on four sides with nothing inside and look very much like the letter "O", so "O" is taken as the indexing code.

P: The Chinese characters etc. and the radical closely resemble the letter "P" in shape, so "P" is taken as the indexing code for the characters of like shapes.

Q: The Chinese character etc. having a shape which is closed on four sides something inside and look nearly the same as the letter "Q", so "Q" is taken as the indexing code for characters of like shapes.

R: The Chinese characters etc. all include the shape of " " and the Mandarin pronunciation of the character " " is just the same as the letter "R", so "R" is taken as the indexing code.

S: The Chinese characters is in its simplified form and used as a radical for composing those characters meaning worn, snake and the like which resemble the letter "S" in shape; the characters etc. look very much alike, so "S" is taken as the indexing code.

T: The Chinese characters etc. have a vertical stroke affixed with a horizontal one and the character includes a portion which resembles the letter "T", so "T" is taken as the indexing code for those characters having a vertical stroke affixed with a horizontal stroke or dot, or a horizontal stroke affixed a vertical or downward stroke or a dot and looking like the letter "T".

U: The Chinese characters etc. include the shape of the letter "U" and the radical resembles "U" except that the opening thereof is facing down, so "U" is taken as the indexing code for those characters having a shape which is closed on three sides with an opening facing up or down.

V: The letter "V" looks very much like the panties for females, so "V" is taken as the indexing code for the Chinese character which means feminine and for the characters composed of as a radical.

W: The letter "W" looks very much like a stove and the upper portion of the characters etc. looks much the same, so "W" is taken as the indexing code.

X: The Chinese characters etc. include a portion shaped like the letter "X" and the radical looks very much like a pair of "X's", so "X" is taken as the indexing code.

Y: The letter "Y" looks like a tree which is what the Chinese character means, so "Y" is taken as the indexing code for wood related characters Z: The Chinese characters etc. all closely resemble the letter "Z" and the radicals are each used for composing characters in association with some kind of animal and hence relating to the word "Zoo" which begins with the letter "Z", so "Z" is taken as the indexing code.

1: The code represents the first tone of the Chinese character.

2: The Chinese character which means "two", characters having a shape separated into two portions by two strokes and, for the purpose of avoiding repetition, characters such as may be simply repreented by indexing code "2"; in addition, characters each having two portions of the same shape may be prefixed with indexing code "2". The code also represents the second tone code of the Chinese character.

3: The Chinese character which means "three", characters each having a shape separated into three portions by three strokes such as and characters composed with which is the radical form of the character , as well as characters having three portions of the same shape may be prefixed with code "3" plus the particular indexing code for respective characters per se, or may be simply represented by code "3". The code further represents the third tone of the Chinese character.

4: The Chinese character which means "four", characters of the shape resembling , and characters having four portions of the same shape take "4" as the indexing code. The code further represents the fourth tone code of the Chinese characters.

5: The Chinese character which means "five", and other characters of similar shapes including take "5" as the indexing code.

6: "6" is used as the indexing code for the Chinese character which means "6" and the element contained in the character which is the "capital" form of ; besides, "6" instead of "$" is intended to be taken as the indexing code for the convenience of indexing a character.

7: The Chinese character which means "seven", characters composed of — the radical form of the character which sounds the same as the character , and the character which means "the horse" and is No. 7 of the twelve animals that are the Chinese signs of the zodiac take "7" as the indexing code.

8: The Chinese character which means "eight" and the characters having the radical or take "8" as the indexing code.

9: The Chinese character which means "nine", the character which sounds the same as , the character which looks alike, and the characters compose of — the radical for the which sounds like takes "9" as the indexing code.

0: The figure "0" which, as used in computers, is always crossed with a slant dash to distinguish it from the letter "O" looks somewhat like the Chinese character , so characters having their periphery shaped like the (not including the elements therein) take "0" as the indexing code.

=: The Chinese character which means "equal" and characters having two horizontal strokes or dots, characters which take "2" as the indexing code provided that they have two portions separated by two strokes, and characters which have two portions of the same shape may take "=" as the indexing code.

+: The Chinese character and characters etc. having a portion shaped like , and characters having " " as a radical which sounds like the character take "+" as the indexing code.

−: The Chinese character , characters etc. having negative meanings, and the character which means "rain" comprising a "−" on the first stroke take "−" as the indexing code.

*: "*" is the sign for multiplication, so the Chinese character which means "to multiply" take "*" as the indexing code.

/: "/" symbolizes the way in which a bamboo is cut away and it is also a slant line, so the Chinese characters which have the radical " " meaning "bamboo" and the character meaning "slant" take "/" as the indexing code.

;: According to Chinese grammar, the colon ":" is used to introduce a direct quotation such as the saying of someone, but ";", rather than ":", is used as the indexing code. It is because that although both ";" and ":" are positioned on the same key, ";" are more convenient to be entered without having to press the "SHIFT" key on the keyboard as in the case of ":". Therefore, the characters shaped like which has two parts put together and looks very much like ":" and those comprising the radical which means "to speak" take ";" as the indexing code.

': The Chinese character means "the rice sprout" and the sign "'" looks very much like "the sprout of rice", so characters having " " as a radical or a downward stroke shaped like the sign "'" take "'" as the indexing code.

.: "." looks like a bean and is used as for the sign of a full stop, so the characters etc. which sound similar or look alike and characters which have a one-stroke portion take "." as the indexing code. The symbol can also be taken as a tone code which represents the neutral tone of the Chinese character.

[: For the convenience of entering the indexing code "+", "[" is used as a substitute for "+".

]: This sign looks somewhat like the radical written in the so=called "seal character style" and is taken as the indexing code therefor.

=: Hills and mountains are sloped ground features, so the character which means "hill or mountain" may also take "=" as the indexing code so as to add another separate approach in which the character may be code indexed.

2.

Except the English letter keys, there are certain keys on the English language keyboard which represent particular meanings, respectively, and can be used exclusively for code indexing certain characters according to the meanings represented thereby. For example:

"!", the exclamation mark, can be used exclusively as the indexing code for the two-character expression which means "exclamation".

"$", the dollar(s) mark, can be used exclusively as the indexing code for character which means "gold" and hence "money".

"(", the first half of the parentheses, can be used exclusively as the index code for character which is the first part of the two-character expression " " meaning "parentheses".

Likewise, ")", the second half of the parentheses, can be used exclusively as the indexing code for character which is the second part of the two-character expression " " meaning "parentheses".

Such exclusive indexing codes defined in accordance with the meanings represented thereby enables the operators to easily memorize particular codes according to the characteristics of the marks so as to provide convenient, effective, and time-saving advantages.

3.

According to the present invention, the simple characters can be completed by only inputting one code and even the complex characters can also be achieved by inputting no more than four codes which, in principle, are composed of an initial code, a middle code and an ending code. (The term "code" as used herein refers to any single letter, figure, or symbol as represented by a particular key.) If a character has repeated portions in its construction, the character can be coded for the repeated portions per se and combined with the number of the repeated portions. (i.e. prefixed with 2, 3, or 4.) For example:

The character " " having four identical " " is code indexed as "40".

Each character can have a maximum of four codes and in accordance with the present invention, once four codes are keyed in, the character represented thereby will be automatically displayed without having to press the enter key ("ENTER" or "RETURN" key on the keyboard).

4.

For convenience and simplification in processing Chinese phrases, the Chinese phrases can be inputted by direct encoding the first indexing code of each word of the phrase. For example, the phrase " " is indexing coded by "BNHH" which is a combination of the first code of each word of the phrase. Moreover, to avoid repetition and ensure a more rapid process, at the end of the indexing codes, there can be added a tone code of the last word of the phrase (e.g. the last word " " is pronounced in the second tone, therefore the tone code is "2"). Accordingly, the codes of the above example will be "BNHH2".

5.

In addition to the above approach for code indexing, any strokes which are constructed in a character but separated by other strokes thereof can be code indexed directly. For example:

-continued

From the foregoing, every character can be code indexed in different approaches and the characters input in simplified form or different stroke orders still will be obtained in their regular forms.

Since the principles for code indexing in accordance with the present invention is to select the keys directly according to the forms, meanings and pronunciation of the English letters and the symbols, an operator can input the information in the Chinese in the same way as he typewrites English words in a standard keyboard. Moreover, the arrangement of the Chinese radicals with the keyboard is so easily memorized that an operator will learn to operate the keyboard arranged according to the present invention faster.

Except for inputting the Chinese characters directly from an English keyboard, it is also possible to shift the mode for inputting English letters, figures, and symbols by pressing the "ESC" key. Moreover, there are specific indexing codes for inputting the capitalized Chinese characters in regard to the Arabic numerals 1, 2, 3 . . . by entering the initial code together with the Arabic numeral the character represents. For examples:

| | | |
|---|---|---|
| " " - H1, | " " - M2, | " " - S3 |
| " " - E4, | " " - T5, | " " - P6 |
| " " - 37, | " " - F8, | |
| | " " - E9; and | |
| " " - F+ | | |

The following informations show the advantages obtained by using the method of the present invention for processing Chinese information.

| Number of input code(s) | Number of approaches | Percentage |
|---|---|---|
| 1 | 59 | 0.1% |
| 2 | 1362 | 2.3% |
| 3 | 18473 | 31.2% |
| 4 | 39321 | 65.4% |

From the data shown above, it can be seen that of all the 13,051 Chinese characters, there are a total of 59,240 approaches for inputting them (the average is 4.57 approaches per character) and it needs to enter an average of 3.6 codes for each input character. Tab. 2 shows a list of all the indexing codes used for processing the Chinese characters of the present invention. From the table, it can be seen that most Chinese characters can be input with different codes.

Because of the fact that there are 4.57 approaches for inputting each character, rate of repetition of the characters is substantially reduced. In case repeated characters do occur, the desired one can be found by simply entering codes through another different approach. Furthermore, in case of repetition occurs, the normally used characters will be automatically displayed and if such character is not desirable, a less frequently or rarely used character may be selected and entered by means of a selection key, which further reduces the rate of repetition.

The present invention also provide a method for processing the information in Chinese by correlating the keys on the English keyboard to the phonetic symbols of the Chinese characters. Please refers to FIG. 1 which shows the keyboard arrangement in accordance with this method. From the figure, it can be seen that the arrangement is also according to the similiarity of the pronuciation and meanings between the phonetic sound and the English letters and symbols. For example, the symbol "  " is prononced similarly to the phonetic sound of the English letter "B", and the symbol "  " is similar in pronounciation to the English letter "G". At the end of the phonetic-symbol-codes of each Chinese character, a key tone (for example, the keys "0, "1" or "SPACE KEY", "2", "3" and "4" represent the five tones of the Chinese characters respectively) is inputted so that a correct word can be performed. Therefore, it is convenient for persons who do not know how to write the Chinese characters but know the phonetic symbols thereof to process the information in Chinese.

Figure 2:
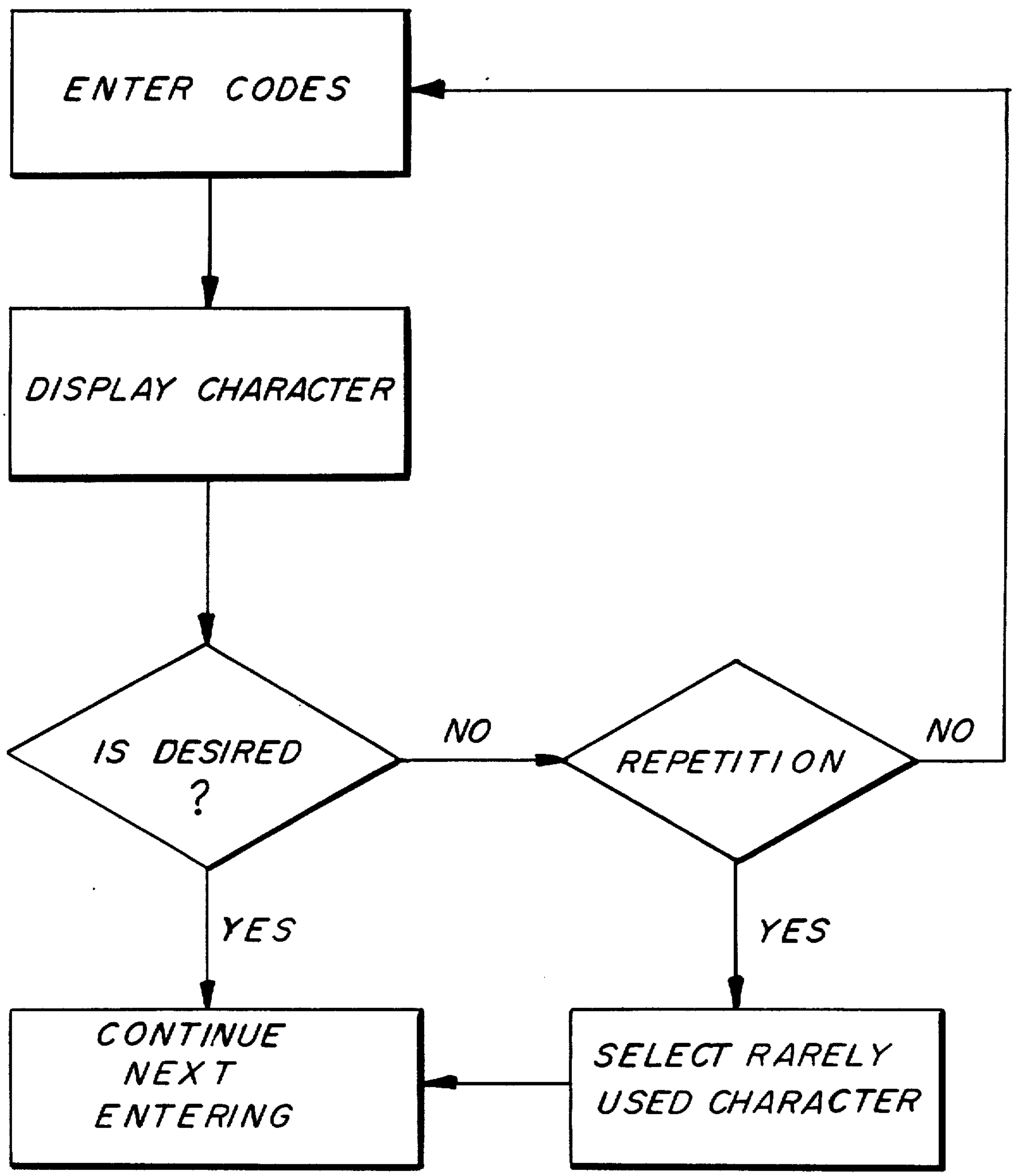
FIG. 2 is a flow chart showing that the method of the present invention is used for processing the Chinese information.

For ease of understanding the method of the present invention, FIG. 2 shows a flow chart for processing Chinese information by means of the method according to the present invention. It firstly input the indexing codes of the Chinese characters according to the method in accordance with the invention, then the chosen character will be displayed on a computer terminal incorporating the keyboard of the invention. If the displayed character is not the desired one and the rarely used one is desired, press a selection key to enter such rarely used one. Then the process is completed.

The present invention provides a basic combination directly relating to the relationship of the forms, sounds, and meanings of the English letters, and the symbols and figures and those of the Chinese characters, thereby eliminating the necessity of memorizing the radicals and the relation of distribution between such radicals and the keyboard. Therefore, anyone can learn to input Chinese information quickly and effectively. In addition, with the keyboard arrangement of the present invention, the forms and sizes of the characters can be altered at an instant by pressing a function key so as to facilitate tabulation, setting, and printing by the operator.

The claimed features are defined in detail in the appended claims which are intended to cover all the modifications made thereto without departing from the scope of the present invention.

TABLE 1

| KEY | CORRESPONDING CHARACTERS |
|---|---|
| A | and characters of like shapes |
| B | and characters of like shapes |
| C | and characters of like shapes |
| D | and charactersof like shapes |
| E | characters of like shapes |
| F | (the radical of ) and characters of like shapes |
| G | and characters of like shapes |
| H· | and characters of like shapes |

TABLE 1-continued

| KEY | CORRESPONDING CHARACTERS |
|---|---|
| I | and characters of like shapes and the radical |
| J | (J resembling a fishhook) and characters of like shapes |
| K | and characters of like shapes |
| L | and characters of like shapes |
| M | (symbolizing men fighting) and characters of like shapes |
| N | and characters of like shapes |
| O | and characters of like shapes |
| P | (the radicals , ) and characters of like shapes |
| Q | and characters of like shapes |
| R | and characters of like shapes |
| S | and characters of like shapes |
| T | and characters of like shapes |
| U | and characters of like shapes |
| V | the radical (relating to briefs) |
| W | the upper portions of |
| X | and the radical |
| Y | and characters of like shapes |
| Z | (relating to a zoo), etc. |
| 2 | and characters of two strokes or having two identical portions |
| 3 | and characters of three strokes or having three identical portions |
| 4 | and characters of like shapes |
| 5 | and characters of like shapes |
| 6 | (used the same as $ for the convenience of code indexing) |
| 7 | ( means the "horse" which is No. 7 of the 12 animals symbolizing the Chinese lunar year) |
| 8 | and the radical |
| 9 | and characters of like shapes |
| 0 | and characters having their periphery shaped like the □ (not including the elements enclosed therein) |
| = | and characters written with two horizontal strokes or dots, two portions separated by two stroke, or having two identical portions |
| + | and characters of like shapes |
| — | (a cloud in the sky), etc. exclusive code for |
| / | the radical and as the exclusive code for character |
| ; | exclusive code for , |
| , | exclusive code for and the downward stroke "/" |
| . | and characters comprising one stroke or of like shapes |
| [ | used the same as "+" for the convenience of code indexing |
| ] | exclusive code for the radical |
| = | exclusive code for |
| ! | exclusive code for |
| @ | exclusive code for |
| # | exclusive code for |
| $ | exclusive code for |
| % | exclusive code for |
| | exclusive code for |
| & | exclusive code for |
| ( | exclusive code for |
| ) | exclusive code for |

TABLE 2

| | | | | | | | | |
|---|---|---|---|---|---|---|---|---|
| 00186 | 一 | - | 1 | | | | | |
| 00187 | 乙 | Z | | | | | | |
| 00188 | 丁 | J | -J | | | | | |
| 00189 | 七 | 7 | | | | | | |
| 00190 | 乃 | S' | 'S | | | | | |
| 00191 | 九 | 9 | | | | | | |
| 00192 | 了 | JJ | LJ | | | | | |
| 00193 | 二 | -- | 2 | | | | | |
| 00194 | 人 | T | | | | | | |
| 00195 | 儿 | 'L | R | | | | | |
| 00196 | 入 | '. | | | | | | |
| 00197 | 八 | 8 | | | | | | |
| 00198 | 几 | R | 'Z | | | | | |
| 00199 | 刀 | D | | | | | | |
| 00200 | 刃 | C- | C. | | | | | |
| 00201 | 力 | C | C' | | | | | |
| 00202 | 匕 | F | L' | | | | | |
| 00203 | 十 | + | -I | 10 | [ | | | |
| 00204 | 卜 | I. | | | | | | |
| 00205 | 又 | -X | | | | | | |
| 00206 | 三 | --- | 3 | | | | | |
| 00207 | 下 | -T | T. | -I. | | | | |
| 00208 | 丈 | -'. | +. | +'. | [. | ['. | | |
| 00209 | 上 | I-- | T- | | | | | |
| 00210 | 丫 | VI | | | | | | |
| 00211 | 丸 | 9. | | | | | | |
| 00212 | 凡 | R. | | | | | | |
| 00213 | 久 | 'L. | U. | C. | | | | |
| 00214 | 么 | 'S | | | | | | |
| 00215 | 也 | JIL | LIL | | | | | |
| 00216 | 乞 | TZ | '-Z | | | | | |
| 00217 | 于 | =J | 2J | HJ | | | | |
| 00218 | 亡 | .C | TL | .-L | | | | |
| 00219 | 兀 | -R | -'L | | | | | |
| 00220 | 刃 | D. | D' | | | | | |
| 00221 | 勺 | 'C- | 'C. | | | | | |
| 00222 | 千 | '+ | '-I | '10 | 1000 | '[ | | |
| 00223 | 叉 | X. | -X. | | | | | |
| 00224 | 口 | O | | | | | | |
| 00225 | 土 | IH | | | | | | |
| 00226 | 士 | +- | [- | | | | | |
| 00227 | 夕 | U. | C. | | | | | |
| 00228 | 大 | K | > | | | | | |
| 00229 | 女 | V | L'- | | | | | |
| 00230 | 孑 | Z- | LJ- | JJ- | | | | |
| 00231 | 子 | Z' | LJ' | JJ' | | | | |
| 00232 | 孓 | Z. | LJ. | JJ. | | | | |
| 00233 | 寸 | -J. | J. | | | | | |
| 00234 | 小 | I2 | I.. | J2 | J.. | < | | |
| 00235 | 尢 | +'L | +L | -'L | +R | ['L | [L | [R |
| 00236 | 尸 | P | C' | O' | | | | |
| 00237 | 山 | IU | \ | | | | | |
| 00238 | 川 | 'II | III | | | | | |
| 00239 | 工 | H | -I- | | | | | |
| 00240 | 己 | CL | | | | | | |
| 00241 | 已 | CIL | | | | | | |
| 00242 | 巳 | OL | | | | | | |
| 00243 | 巾 | UI | | | | | | |
| 00244 | 干 | HI | =I | 2I | -+ | -[ | | |
| 00245 | 廾 | ++ | [[ | | | | | |
| 00246 | 弋 | -L. | | | | | | |
| 00247 | 弓 | CIC | 5 | | | | | |
| 00248 | 才 | J' | -J' | +' | [' | | | |
| 00249 | 丑 | EI | C+ | L+- | C[ | L[- | | |
| 00250 | 丐 | GJ | -GJ | T-'C | T-IC | T-LJ | T-C | |
| 00251 | 不 | -3 | -'I. | | | | | |
| 00252 | 中 | OI | OI | | | | | |
| 00253 | 丰 | 3I | 3-I | '--I | ---I | IEI | | |
| 00254 | 丹 | U-. | U.- | | | | | |
| 00255 | 之 | .Z | | | | | | |
| 00256 | 尹 | E' | | | | | | |

| | | | | | | | | | | | |
|---|---|---|---|---|---|---|---|---|---|---|---|
| 00257 | 予 | SLJ | SJJ | | | | | | | | |
| 00258 | 云 | =S | 2S | | | | | | | | |
| 00259 | 井 | =2 | 22 | == | # | | | | | | |
| 00260 | 互 | -O- | =O | 2O | -LL- | | | | | | |
| 00261 | 五 | 5 | | | | | | | | | |
| 00262 | 亢 | TRI | TR | | | | | | | | |
| 00263 | 仁 | T2 | T= | | | | | | | | |
| 00264 | 什 | T+ | T-I | T1O | T[ | | | | | | |
| 00265 | 仃 | TJ | T-J | | | | | | | | |
| 00266 | 仆 | TT | TI. | | | | | | | | |
| 00267 | 仇 | T9 | T'Z | | | | | | | | |
| 00268 | 仍 | T'S | TS' | T'3 | T3' | TS | | | | | |
| 00269 | 今 | 8.L | 8-L | 8.J | 8-J | | | | | | |
| 00270 | 介 | 82 | 8'I | 8II | | | | | | | |
| 00271 | 仄 | -'T | LT | | | | | | | | |
| 00272 | 元 | =R | 2R | | | | | | | | |
| 00273 | 允 | SR | S'L | | | | | | | | |
| 00274 | 內 | UT | U'. | | | | | | | | |
| 00275 | 六 | 6 | | | | | | | | | |
| 00276 | 兮 | 8-C | | | | | | | | | |
| 00277 | 公 | 8S | | | | | | | | | |
| 00278 | 冗 | UR | U'Z | | | | | | | | |
| 00279 | 凶 | XU | UX | | | | | | | | |
| 00280 | 分 | 8D | 2D | | | | | | | | |
| 00281 | 切 | FD | 7D | | | | | | | | |
| 00282 | 刈 | XJ | XIJ | | | | | | | | |
| 00283 | 匀 | 'C= | 'C2 | | | | | | | | |
| 00284 | 勾 | 'CS | CS | | | | | | | | |
| 00285 | 勿 | 'C'' | C'' | U'' | 'C2 | | | | | | |
| 00286 | 化 | TF | T7 | | | | | | | | |
| 00287 | 匹 | CR | C2 | C8 | | | | | | | |
| 00288 | 午 | 'HI | T+ | '-+ | '2I | '=I | T[ | '-[ | | | |
| 00289 | 升 | '2O | '++ | 'H | ''+ | ''-I | ^ | 'X | '[[ | ''[ | |
| 00290 | 卅 | 3O | -3I | -'II | -III | +++ | [[[ | | | | |
| 00291 | 卞 | .T. | TI. | .-I. | TT | | | | | | |
| 00292 | 厄 | LJL | LCL | LPL | | | | | | | |
| 00293 | 友 | +'X | -'X | +'-X | ['X | ['-X | | | | | |
| 00294 | 及 | 'S. | S'. | ST | SX | | | | | | |
| 00295 | 反 | LX | ''X | | | | | | | | |
| 00296 | 壬 | '+- | 'IH | '[- | | | | | | | |
| 00297 | 天 | -K | =T | 2T | | | | | | | |
| 00298 | 夫 | +K | [K | | | | | | | | |
| 00299 | 太 | K. | | | | | | | | | |
| 00300 | 夭 | 'K | '-T | | | | | | | | |
| 00301 | 孔 | ZL | Z'L | Z-L | | | | | | | |
| 00302 | 少 | 3' | I2' | I..' | J2' | J..' | | | | | |
| 00303 | 尤 | -R. | +L. | -'L. | [L. | | | | | | |
| 00304 | 尺 | P. | OT | O'. | C'. | | | | | | |
| 00305 | 屯 | -UL | -EL | +UL | +EL | [UL | [EL | | | | |
| 00306 | 巴 | BL | | | | | | | | | |
| 00307 | 幻 | NC | N-J | NL | NJ | | | | | | |
| 00308 | 廿 | ++- | [[- | H- | -U | 2O | =O | | | | |
| 00309 | 弔 | 5+ | 5I | 5[ | | | | | | | |
| 00310 | 引 | 5I | | | | | | | | | |
| 00311 | 心 | 'L2 | 'L= | .L2 | .L= | G | | | | | |
| 00312 | 戈 | M | -L'. | -L.' | -L.. | | | | | | |
| 00313 | 戶 | 'P | .P | -P | LO | 'C' | .C' | .O' | | | |
| 00314 | 手 | EJ | 3J | '2J | '=J | | | | | | |
| 00315 | 扎 | FL | | | | | | | | | |
| 00316 | 支 | +X | +-X | [X | [-X | | | | | | |
| 00317 | 文 | TX | .-X | | | | | | | | |
| 00318 | 斗 | =+ | 2+ | =[ | 2[ | | | | | | |
| 00319 | 斤 | LT | ''T | L-I | | | | | | | |
| 00320 | 方 | TD | .-D | | | | | | | | |
| 00321 | 日 | B | | | | | | | | | |
| 00322 | 曰 | O- | O- | | | | | | | | |
| 00323 | 月 | A | | | | | | | | | |
| 00324 | 木 | Y | | | | | | | | | |
| 00325 | 欠 | 'JT | 'LT | UT | | | | | | | |
| 00326 | 止 | TI- | I-I- | | | | | | | | |
| 00327 | 歹 | -U. | -C. | | | | | | | | |
| 00328 | 毋 | O-' | O'- | O+ | O-' | O'- | O+ | Q' | O+' | O+'' | Q+' |
| | | Q+ | O[ | O[ | O[' | O[' | Q[' | Q[ | | | |

| | | | | | | | | | | | |
|---|---|---|---|---|---|---|---|---|---|---|---|
| 00329 | 比 | FF | 77 | % | 2F | =F | | | | | |
| 00330 | 毛 | EL | 3L | 3-L | '2L | '=L | | | | | |
| 00331 | 氏 | CM | C-L | 'LM | | | | | | | |
| 00332 | 水 | J4 | JLL | I4 | ILL | | | | | | |
| 00333 | 火 | W | ..T | | | | | | | | |
| 00334 | 爪 | '3 | LI. | ''I. | | | | | | | |
| 00335 | 父 | 8X | =X | 2X | '.X | | | | | | |
| 00336 | 爻 | XX | | | | | | | | | |
| 00337 | 片 | 'TT | 'TL | 'LT | 'LL | 'L-L | | | | | |
| 00338 | 牙 | CJ | CJ' | CI' | | | | | | | |
| 00339 | 牛 | 'IHI | 'H | '20 | '2I | '=I | | | | | |
| 00340 | 犬 | .K | | | | | | | | | |
| 00341 | 王 | E | -I= | -I-- | --I- | | | | | | |
| 00342 | 丙 | -UT | | | | | | | | | |
| 00343 | 世 | HL | =OL | 2OL | | | | | | | |
| 00344 | 丕 | -3- | | | | | | | | | |
| 00345 | 且 | U=- | A- | | | | | | | | |
| 00346 | 丘 | 'O | LT- | L-I- | | | | | | | |
| 00347 | 主 | .E | | | | | | | | | |
| 00348 | 乍 | TI2 | TI= | | | | | | | | |
| 00349 | 乏 | '.Z | -.Z | | | | | | | | |
| 00350 | 乎 | A-J | AJ | '2-J | '2J | 'KJ | | | | | |
| 00351 | 以 | L.T | | | | | | | | | |
| 00352 | 付 | T-J. | TJ. | | | | | | | | |
| 00353 | 仔 | TZ- | TLJ- | TJJ- | | | | | | | |
| 00354 | 仕 | T+- | TIH | T[- | | | | | | | |
| 00355 | 他 | TJIL | TJL | TLIL | TLL | T+L | T[L | | | | |
| 00356 | 仗 | T-'. | T+'X | T-X | T+'. | T['. | | | | | |
| 00357 | 代 | T-L. | | | | | | | | | |
| 00358 | 令 | 8.S | 8-S | | | | | | | | |
| 00359 | 仙 | TIU | | | | | | | | | |
| 00360 | 仞 | TD. | TD' | | | | | | | | |
| 00361 | 充 | TSR | .-SR | | | | | | | | |
| 00362 | 兄 | OR | | | | | | | | | |
| 00363 | 冉 | UIH | U+- | U[- | | | | | | | |
| 00364 | 册 | UU- | =U- | 2U- | | | | | | | |
| 00365. | 冬 | X2 | X= | 'X2 | 'X= | | | | | | |
| 00366 | 凹 | UU | | | | | | | | | |
| 00367 | 出 | IUU | UIU | IUIU | 2IU | =IU | | | | | |
| 00368 | 凸 | TU | .U | | | | | | | | |
| 00369 | 刊 | '+J | '+IJ | ='IJ | ='J | 2'IJ | 2'J | H'IJ | H'J | '[J | '[IJ |
| | | -+J | -+IJ | -[J | -[IJ | | | | | | |
| 00370 | 加 | C'O | J'O | CO | | | | | | | |
| 00371 | 功 | HC' | HC | | | | | | | | |
| 00372 | 包 | UOL | UPL | UCL | COL | CPL | CCL | 'COL | 'CPL | 'CCL | 'JOL |
| | | 'JPL | 'JCL | | | | | | | | |
| 00373 | 匆 | C2. | 'C2. | 'J2. | | | | | | | |
| 00374 | 北 | -L-L | L-L- | L--L | -LL- | 'L'L | L'L' | L''L | 'LL' | F'L | FL' |
| | | 'LF | L'F | F-L | FL- | -LF | L-F | 7'L | 7L' | 'L7 | L'7 |
| | | 7-L | 7L- | -L7 | L-7 | | | | | | |
| 00375 | 皿 | CUI | CIE | | | | | | | | |
| 00376 | 仟 | T'+ | THI | T2I | T=I | T'[ | T-+ | T-[ | | | |
| 00377 | 半 | =H | 2H | 22I | =IHI | 2IHI | ==O | 22O | ==I | 2=I | 2++ |
| | | =++ | 2[[ | =[[ | | | | | | | |
| 00378 | 卉 | +20 | +H | +-'I | +-II | +++ | [20 | [H | [-'I | [-II | [[[ |
| 00379 | 卡 | T-T | TT. | GT | GI. | | | | | | |
| 00380 | 占 | I-O | TO | | | | | | | | |
| 00381 | 卯 | C'P | 'U'P | 'L'P | 'UP | | | | | | |
| 00382 | 卮 | L-L | L-JL | L-CL | L-OL | L-PL | | | | | |
| 00383 | 去 | HS | +-S | IHS | [-S | | | | | | |
| 00384 | 可 | JO | -JO | | | | | | | | |
| 00385 | 古 | +O | -IO | [O | | | | | | | |
| 00386 | 右 | +'O | ['O | | | | | | | | |
| 00387 | 召 | DO | UO | | | | | | | | |
| 00388 | 叮 | OJ | O-J | | | | | | | | |
| 00389 | 叩 | OP | OJI | OIJ | | | | | | | |
| 00390 | 叨 | OD | | | | | | | | | |
| 00391 | 叼 | OC. | | | | | | | | | |
| 00392 | 司 | C-O | J-O | | | | | | | | |
| 00393 | 叵 | CO | | | | | | | | | |
| 00394 | 叫 | OLI | OU | | | | | | | | |
| 00395 | 另 | OCI | OC | OC'I | | | | | | | |
| 00396 | 只 | O2 | O'. | | | | | | | | |

| | | | | | | | | | | | |
|---|---|---|---|---|---|---|---|---|---|---|---|
| 00397 | 史 | OX | OX | | | | | | | | |
| 00398 | 叱 | OF | O7 | | | | | | | | |
| 00399 | 台 | SO | | | | | | | | | |
| 00400 | 句 | 'CO | 'JO | | | | | | | | |
| 00401 | 叭 | O8 | O'. | | | | | | | | |
| 00402 | 叻 | OC- | OC | OC'- | OC' | | | | | | |
| 00403 | 四 | 4 | OR | O8 | ---- | | | | | | |
| 00404 | 囚 | OT | | | | | | | | | |
| 00405 | 外 | AT | AI. | C.T | U.T | U.I. | | | | | |
| 00406 | 央 | UK | | | | | | | | | |
| 00407 | 失 | '+K | '2T | '=T | '[K | | | | | | |
| 00408 | 奴 | VX | V-X | | | | | | | | |
| 00409 | 奶 | VS' | V'S | VS | | | | | | | |
| 00410 | 孕 | S'Z | 'SZ | S'Z- | 'SZ- | SZ- | SZ | 3'Z | 3'Z- | | |
| 00411 | 它 | UF | .UF | U7 | .U7 | | | | | | |
| 00412 | 尼 | PF | P'L | PL' | P-L | PL- | P7 | | | | |
| 00413 | 巨 | CC | | | | | | | | | |
| 00414 | 巧 | H-IC | HTC | H-C | H5 | | | | | | |
| 00415 | 左 | +'H | -'H | ['H | | | | | | | |
| 00416 | 市 | TUI | T-E | .-UI | | | | | | | |
| 00417 | 布 | +E | +UI | +'E | +'UI | -'UI | [E | [UI | ['E | ['UI | |
| 00418 | 平 | K+ | H=I | HI= | -=+ | H2I | HI2 | -2+ | H8I | HI8 | -8+ |
| | | K[ | -=[ | -2[ | -8[ | | | | | | |
| 00419 | 幼 | NC' | | | | | | | | | |
| 00420 | 弁 | S2O | SH | S-'I | S-II | S++ | S[[ | | | | |
| 00421 | 弘 | 5S | | | | | | | | | |
| 00422 | 弗 | 52 | 5'I | 5II | 52I | | | | | | |
| 00423 | 必 | G' | 'L2' | .L2' | .L=' | 'L=' | | | | | |
| 00424 | 戊 | LM | 'M | M' | | | | | | | |
| 00425 | 打 | FJ | F-J | | | | | | | | |
| 00426 | 扔 | F'S | FS' | FS | | | | | | | |
| 00427 | 扒 | F8 | F2 | F'. | | | | | | | |
| 00428 | 扑 | FT | FI. | | | | | | | | |
| 00429 | 斥 | LT. | ''T. | | | | | | | | |
| 00430 | 旦 | B- | | | | | | | | | |
| 00431 | 朮 | +LL. | .Y | Y. | | | | | | | |
| 00432 | 本 | Y- | | | | | | | | | |
| 00433 | 未 | +Y | -Y | [Y | | | | | | | |
| 00434 | 末 | Y+ | -Y | Y[ | | | | | | | |
| 00435 | 札 | YL | | | | | | | | | |
| 00436 | 正 | -G | T-I- | | | | | | | | |
| 00437 | 母 | O2- | O=- | O-2 | O-= | Q- | O2- | O=- | O-2 | O-= | |
| 00438 | 民 | OK | CK | PK | OLM | PLM | CLM | OL+ | CL+ | OL-L | PL-L |
| | | CL-L | PM | OL[ | CL[ | | | | | | |
| 00439 | 氐 | 'K- | 'K. | CM- | CM. | C+- | C+. | C[- | C[. | | |
| 00440 | 永 | .3 | .4 | .ILL | -ILL | .JLL | -JLL | | | | |
| 00441 | 汁 | 3+ | 31O | 3[ | | | | | | | |
| 00442 | 汀 | 3-J | 3J | | | | | | | | |
| 00443 | 氾 | 3CL | 3JL | | | | | | | | |
| 00444 | 犯 | ZJL | ZCL | ZOL | ZPL | | | | | | |
| 00445 | 玄 | TN | TLS | .-N | | | | | | | |
| 00446 | 玉 | E. | | | | | | | | | |
| 00447 | 瓜 | AS | '3S | LS. | ''S. | | | | | | |
| 00448 | 瓦 | -Z. | -Z | CZ. | CZ | -LZ- | -LL. | -LL | -LZ. | -LZ | |
| 00449 | 甘 | H= | H2 | =O= | =O2 | 2O2 | 2O= | =O- | 2O- | -U- | ++2 |
| | | ++= | [[2 | [[= | | | | | | | |
| 00450 | 生 | 'E | 'IE | | | | | | | | |
| 00451 | 用 | UIHI | U++ | UHI | U2O | U=I | U2I | UH | U[[ | | |
| 00452 | 甩 | AL | UHL | UIHL | U2OL | | | | | | |
| 00453 | 田 | Q | | | | | | | | | |
| 00454 | 由 | IQ | | | | | | | | | |
| 00455 | 甲 | QI | | | | | | | | | |
| 00456 | 申 | BI | IQI | | | | | | | | |
| 00457 | 疋 | LG | JG | LTT | JTT | | | | | | |
| 00458 | 白 | 'B | | | | | | | | | |
| 00459 | 皮 | EX | UIX | L'IX | LIX | J'IX | JIX | | | | |
| 00460 | 皿 | U2- | 4- | | | | | | | | |
| 00461 | 目 | O= | O2 | | | | | | | | |
| 00462 | 矛 | SJ' | SLJ' | SJJ' | | | | | | | |
| 00463 | 矢 | TK | '-K | '2T | '=T | | | | | | |
| 00464 | 石 | -'O | TO | | | | | | | | |
| 00465 | 示 | =3 | 23 | --3 | -Y | | | | | | |
| 00466 | 禾 | 'Y | ' | | | | | | | | |

| | | | | | | | | | | | |
|---|---|---|---|---|---|---|---|---|---|---|---|
| 00467 | 穴 | U8 | .U8 | .U'. | | | | | | | |
| 00468 | 立 | T2- | TK | | | | | | | | |
| 00469 | 丞 | J3- | L3- | J4- | L4- | ZLL- | | | | | |
| 00470 | 丢 | ES | 'HS | 'IHS | -HS | | | | | | |
| 00471 | 乒 | 'O' | LT-' | | | | | | | | |
| 00472 | 乓 | 'O. | LT-. | | | | | | | | |
| 00473 | 乩 | TOL | I-OL | | | | | | | | |
| 00474 | 亙 | =B | 2B | CC- | CC. | -O-. | -B- | | | | |
| 00475 | 交 | T2X | .-2X | T8X | .-8X | | | | | | |
| 00476 | 亦 | T4 | T22 | .-4 | .-22 | | | | | | |
| 00477 | 亥 | TUT | .-UT | | | | | | | | |
| 00478 | 仿 | TTD | TT'C | TTU | | | | | | | |
| 00479 | 伉 | TTR | | | | | | | | | |
| 00480 | 伙 | TW | T2T | T8T | | | | | | | |
| 00481 | 伊 | TE' | | | | | | | | | |
| 00482 | 伕 | T+K | T-K | T2T | T=T | T[K | | | | | |
| 00483 | 伍 | T5 | TLL- | | | | | | | | |
| 00484 | 伐 | TM | | | | | | | | | |
| 00485 | 休 | TY | | | | | | | | | |
| 00486 | 伏 | T.K | TK. | | | | | | | | |
| 00487 | 仲 | TOI | TOI | TO | | | | | | | |
| 00488 | 件 | TT+ | T'20 | T'2I | T'=I | TT[ | | | | | |
| 00489 | 任 | TE | T'+- | T'IH | T'H | T'[- | T-+- | T-IH | T-H | T-[- | |
| 00490 | 仰 | TCP | | | | | | | | | |
| 00491 | 仳 | TFF | T2F | T77 | T27 | T% | | | | | |
| 00492 | 份 | T8D | T2D | | | | | | | | |
| 00493 | 企 | 8G | 8TI- | | | | | | | | |
| 00494 | 伋 | T'S. | TS'. | TST | TSX | T'3. | T3'. | T3T | T3. | | |
| 00495 | 光 | 3-R | 3-'L | | | | | | | | |
| 00496 | 兇 | XUR | XU'L | UXR | UX'L | | | | | | |
| 00497 | 兆 | KKL | KK | L2L2 | '2L2 | | | | | | |
| 00498 | 先 | 'HR | 'IHR | '+-R | '[-R | | | | | | |
| 00499 | 全 | 8E | | | | | | | | | |
| 00500 | 共 | HH2 | HH8 | 222 | 228 | =22 | === | =28 | ==8 | | |
| 00501 | 再 | -UH | -U+- | -UIH | TUIH | TU+- | -U[- | TU[- | -U2I | -U=I | |
| 00502 | 冰 | =4 | 24 | =JLL | =ILL | 2JLL | 2ILL | | | | |
| 00503 | 列 | -AJ | -AIJ | | | | | | | | |
| 00504 | 刑 | ==J | ==IJ | =2J | =2IJ | 22J | 22IJ | HHJ | HHIJ | | |
| 00505 | 划 | MJ | MIJ | | | | | | | | |
| 00506 | 刎 | C2J | C2IJ | C''J | 'C2J | U2IJ | U''J | | | | |
| 00507 | 刖 | AIJ | | | | | | | | | |
| 00508 | 劣 | 3'C | 3'C' | I2'C | J2'C | | | | | | |
| 00509 | 匈 | CXU | CUX | 'CU | 'CXU | 'CUX | 'JUX | 'JXU | | | |
| 00510 | 匡 | CE | | | | | | | | | |
| 00511 | 匠 | CLT | C''T | | | | | | | | |
| 00512 | 印 | EP | C-P | | | | | | | | |
| 00513 | 危 | ULL | ULJL | ULOL | ULPL | ULCL | | | | | |
| 00514 | 吉 | HO | IHO | +-O | [-O | | | | | | |
| 00515 | 吏 | +OX | -OX | +OX | -OX | [OX | [OX | | | | |
| 00516 | 同 | U-O | | | | | | | | | |
| 00517 | 吊 | OUI | OIE | | | | | | | | |
| 00518 | 吐 | OH | OIH | O+- | O[- | | | | | | |
| 00519 | 吁 | OHJ | O2J | O=J | O--J | | | | | | |
| 00520 | 吋 | OJ. | O-J. | O+. | O[. | | | | | | |
| 00521 | 各 | XO | 'XO | | | | | | | | |
| 00522 | 向 | 'UO | | | | | | | | | |
| 00523 | 名 | AO | U.O | C.O | | | | | | | |
| 00524 | 合 | 8-O | 8O | | | | | | | | |
| 00525 | 吃 | OTZ | O'-Z | | | | | | | | |
| 00526 | 后 | L-O | ''-O | | | | | | | | |
| 00527 | 吆 | ON | OLS | | | | | | | | |
| 00528 | 吒 | OHL | O2L | O=L | O'-L | O'+L | O'[L | | | | |
| 00529 | 因 | OK | | | | | | | | | |
| 00530 | 回 | OO | | | | | | | | | |
| 00531 | 囝 | OZ- | | | | | | | | | |
| 00532 | 圳 | H3 | IH3 | H3I | H'II | HIII | IH3I | | | | |
| 00533 | 地 | HJL | HLL | H+L | HJIL | HLIL | IHJL | IHLL | IH+L | H[L | IH[ |
| 00534 | 在 | +IH | -TH | +TH | +'IH | +IIH | -TIH | [IH | [TH | ['IH | [II |
| 00535 | 圭 | HH | =IH | 2IH | IHIH | | | | | | |
| 00536 | 圬 | H-S | H-5 | H=C | H2C | IH-S | IH-5 | IH2C | IH=C | | |
| 00537 | 圯 | HOL | HPL | IHOL | IHPL | | | | | | |
| 00538 | 圩 | H2J | H=J | HHJ | IHHJ | IH2J | IH=J | | | | |
| 00539 | 夙 | R-A | RA | R-U. | R-C. | | | | | | |

| | | | | | | | | | | | |
|---|---|---|---|---|---|---|---|---|---|---|---|
| 00540 | 多 | U.U. | =U. | 2U. | C.C. | =C. | 2C. | | | | |
| 00541 | 夷 | K5 | -5T | +5T | [5T | | | | | | |
| 00542 | 夸 | K-S | K-5 | K2C | K=C | | | | | | |
| 00543 | 妄 | CV | .CV | | | | | | | | |
| 00544 | 奸 | VHI | V2I | V=I | V-+ | V-[ | | | | | |
| 00545 | 妃 | VJL | VOL | VPL | VCL | VL | | | | | |
| 00546 | 好 | VZ | VZ- | VLJ- | VJJ- | | | | | | |
| 00547 | 她 | VJIL | VLIL | VLL | V+L | V[L | | | | | |
| 00548 | 如 | VO | L'-O | | | | | | | | |
| 00549 | 妁 | VC- | VC. | V'C- | V'C. | | | | | | |
| 00550 | 字 | UZ- | .UZ- | | | | | | | | |
| 00551 | 存 | +IZ | +IZ- | -TZ | -TZ- | +'IZ | [IZ | [IZ- | ['IZ | | |
| 00552 | 宇 | UHJ | .UHJ | U2J | U=J | .U2J | .U=J | | | | |
| 00553 | 守 | .UJ. | .UJ | | | | | | | | |
| 00554 | 宅 | UHL | U2L | U=L | U'-L | U'+L | .UHL | U'[L | | | |
| 00555 | 安 | UV | .UV | | | | | | | | |
| 00556 | 寺 | HJ. | IHJ | IHJ. | | | | | | | |
| 00557 | 尖 | J2K | | | | | | | | | |
| 00558 | 屹 | IUTZ | ETZ | ET-L | E'-Z | \TOZ | \TZ | | | | |
| 00559 | 州 | 3T | TTT | | | | | | | | |
| 00560 | 帆 | ER. | UIR | UIR. | | | | | | | |
| 00561 | 并 | =HH | 2HH | 'H'H | | | | | | | |
| 00562 | 年 | TL+ | TCI | TL-I | TIHI | TL[ | | | | | |
| 00563 | 式 | HM | MH | -HL | | | | | | | |
| 00564 | 弛 | 5JIL | 5JL | 5LIL | 5LL | 5+L | 5[L | | | | |
| 00565 | 忙 | I2C | I2.C | I2TL | I.C | ITL | | | | | |
| 00566 | 忖 | I2J. | I2J | IJ. | IJ | | | | | | |
| 00567 | 戎 | +M | M+ | [M | M[ | | | | | | |
| 00568 | 戌 | L-M | M'- | | | | | | | | |
| 00569 | 戍 | .M | M. | L.M | LM. | M'. | | | | | |
| 00570 | 成 | DM | UM | MD | MU | LCM | MLC | | | | |
| 00571 | 扣 | FO | | | | | | | | | |
| 00572 | 扛 | FH | | | | | | | | | |
| 00573 | 托 | FHL | F=L | F2L | F'-L | F'+L | F'[L | | | | |
| 00574 | 收 | UTX | LITX | UITX | | | | | | | |
| 00575 | 早 | B+ | B[ | | | | | | | | |
| 00576 | 旨 | FB | 7B | | | | | | | | |
| 00577 | 旬 | 'CB | 'JB | CB | | | | | | | |
| 00578 | 旭 | 9B- | 9B | | | | | | | | |
| 00579 | 曲 | OH | O2O | O++ | O2O | O++ | O[[ | O[[ | | | |
| 00580 | 曳 | BM | QM | IQM | BL' | QL' | | | | | |
| 00581 | 有 | +A | -'A | +'A | [A | ['A | | | | | |
| 00582 | 朽 | YTC | Y-C | Y5 | YS | | | | | | |
| 00583 | 朴 | YT | YI. | | | | | | | | |
| 00584 | 朱 | '+Y | '[Y | | | | | | | | |
| 00585 | 朵 | 'SY | S'Y | 3'Y | RY | | | | | | |
| 00586 | 次 | =UT | 2UT | =- | 2- | | | | | | |
| 00587 | 此 | GF | G7 | | | | | | | | |
| 00588 | 死 | AF | -AF | A7 | -A7 | | | | | | |
| 00589 | 氖 | 7S | 7S' | 7'S | TZS | TZS' | TZ'S | T-ZS | 73' | 7'3 | TZ3 |
| | | TZ'3 | TLS' | TL'S | T-LS | TL3' | TL'3 | | | | |
| 00590 | 汝 | 3V | 3L'- | | | | | | | | |
| 00591 | 汗 | 3HI | 32I | 3=I | 3-+ | 3-[ | | | | | |
| 00592 | 汙 | 3=J | 32J | 3HJ | | | | | | | |
| 00593 | 江 | 3H | | | | | | | | | |
| 00594 | 池 | 3JIL | 3LIL | 3LL | 3+L | 3[L | | | | | |
| 00595 | 汐 | 3U. | 3C. | | | | | | | | |
| 00596 | 汕 | 3IU | | | | | | | | | |
| 00597 | 污 | 94C3 | | | | | | | | | |
| 00598 | 汛 | 3XZ | 3ZX | 3+Z | 3Z+ | 3'Z. | 3XL | 3+L | 3L+ | 3'L. | 3[Z |
| | | 3Z[ | 3[L | 3L[ | | | | | | | |
| 00599 | 汍 | 39. | | | | | | | | | |
| 00600 | 汎 | 3R. | | | | | | | | | |
| 00601 | 灰 | +W | +'W | +2T | -'W | -'2T | [W | ['W | [2T | | |
| 00602 | 牟 | S'H | S'2O | S'2I | S'=I | ST+ | ST[ | | | | |
| 00603 | 牝 | ZF | Z7 | 'FF | 'F7 | 'F-L | 'FL- | 'F'L | 'FL' | | |
| 00604 | 百 | TB | -'B | | | | | | | | |
| 00605 | 竹 | T'T' | 2T' | =T' | TITI | 2TI | =TI | 8'8' | 28' | =8' | 8I8I |
| | | 28I | =8I | / | | | | | | | |
| 00606 | 米 | ..Y | 2Y | =Y | | | | | | | |
| 00607 | 糸 | N3 | LS3 | N | | | | | | | |
| 00608 | 缶 | 'HE | HE | | | | | | | | |
| 00609 | 羊 | =EI | 2EI | 23I | =3I | | | | | | |

| | | | | | | | | | | | |
|---|---|---|---|---|---|---|---|---|---|---|---|
| 00610 | 羽 | C2C2 | =C2 | 2C2 | C=C= | =C= | 2C= | | | | |
| 00611 | 老 | HF | H'F | H7 | H'7 | | | | | | |
| 00612 | 考 | H'5 | H'-C | H'TC | | | | | | | |
| 00613 | 而 | TU2 | -'U2 | TU'I | TUII | TU= | | | | | |
| 00614 | 耒 | =Y | '-Y | =OY | 2OY | --Y | | | | | |
| 00615 | 耳 | -4 | | | | | | | | | |
| 00616 | 聿 | E2I | E=I | EI= | EIHI | | | | | | |
| 00617 | 肉 | UTT | U2T | | | | | | | | |
| 00618 | 肋 | AC' | AC | | | | | | | | |
| 00619 | 肌 | AR | A'Z | | | | | | | | |
| 00620 | 臣 | CU | C2C | CICI | | | | | | | |
| 00621 | 自 | '4 | '02 | 'O= | | | | | | | |
| 00622 | 至 | -SH | SIH | -SIH | | | | | | | |
| 00623 | 臼 | EE | | | | | | | | | |
| 00624 | 舌 | '+O | HIO | '[O | | | | | | | |
| 00625 | 舛 | U.H | C.H | U.CI | C.CI | | | | | | |
| 00626 | 舟 | 'A- | 'A | 'U-2 | 'U2- | | | | | | |
| 00627 | 艮 | BK | | | | | | | | | |
| 00628 | 色 | UBL | | | | | | | | | |
| 00629 | 艾 | ++X | HX | [[X | | | | | | | |
| 00630 | 虫 | S | OS | OS | | | | | | | |
| 00631 | 血 | '4- | 'U2- | | | | | | | | |
| 00632 | 行 | 'T2J | 'T=J | 'T-J | 'TJ | T2J | T=J | ]2J | ]=J | ]-J | |
| 00633 | 衣 | T'K | | | | | | | | | |
| 00634 | 西 | -OR | -08 | -02 | -08 | -02 | | | | | |
| 00635 | 阡 | P'+ | P-+ | P'-I | P2I | P=I | P'[ | P-[ | | | |
| 00636 | 串 | OOI | OO | | | | | | | | |
| 00637 | 亨 | TOLL | TOLJ | TOJJ | TOZ | TOJ | | | | | |
| 00638 | 位 | TTK | TT2- | TT=- | | | | | | | |
| 00639 | 住 | T.E | | | | | | | | | |
| 00640 | 佇 | TUJ | TU-J | T.UJ | | | | | | | |
| 00641 | 佗 | TUF | T.UF | TU7 | T.U7 | | | | | | |
| 00642 | 佞 | T=V | T2V | | | | | | | | |
| 00643 | 伴 | T22O | T2H | T22I | T2=I | T2++ | T2[[ | | | | |
| 00644 | 佛 | T52 | T52I | T5'I | T5II | | | | | | |
| 00645 | 何 | TJO | T-JO | | | | | | | | |
| 00646 | 估 | T+O | T[O | | | | | | | | |
| 00647 | 佐 | T-'H | T+H | T+'H | T[H | T['H | | | | | |
| 00648 | 佑 | T-'O | T+'O | T['O | | | | | | | |
| 00649 | 伽 | TC'O | TCO | TJ'O | | | | | | | |
| 00650 | 伺 | TC-O | TJ-O | | | | | | | | |
| 00651 | 伸 | TIQI | TBI | TO- | | | | | | | |
| 00652 | 佃 | TQ | TO+ | TO+ | TO[ | TO[ | | | | | |
| 00653 | 佔 | TI-O | TTO | | | | | | | | |
| 00654 | 似 | TL.T | | | | | | | | | |
| 00655 | 但 | TB- | | | | | | | | | |
| 00656 | 佣 | TUH | TU2O | TU2I | TU=I | | | | | | |
| 00657 | 作 | TTI2 | TTI= | TTK | T'E | | | | | | |
| 00658 | 你 | TU3 | TUI2 | TUJ2 | TUI8 | TUJ8 | | | | | |
| 00659 | 伯 | T'B | | | | | | | | | |
| 00660 | 低 | T'K- | T'K. | TCM- | TCM. | TC+- | TC+. | TC[- | TC[. | | |
| 00661 | 伶 | T8.S | T8-S | T8.P | T8-P | T8P | | | | | |
| 00662 | 余 | 8=I2 | 8=J2 | 82I2 | 82J2 | 8=I8 | 8=J8 | 82I8 | 82J8 | 8H3 | 8-' |
| | | 8Y | 8' | | | | | | | | |
| 00663 | 佝 | T'CO | T'JO | | | | | | | | |
| 00664 | 佈 | T+E | T-'E | T+'E | T[E | T['E | | | | | |
| 00665 | 佚 | T'+K | T'-K | T'2T | T'=T | TTK | T'[K | | | | |
| 00666 | 兌 | 8OR | =OR | 2OR | | | | | | | |
| 00667 | 克 | +OR | [OR | | | | | | | | |
| 00668 | 免 | DBR | UBR | | | | | | | | |
| 00669 | 兵 | '02 | '08 | LTK | 'O'. | | | | | | |
| 00670 | 冶 | =SO | 2SO | | | | | | | | |
| 00671 | 冷 | =8S | =8.S | =8-S | 28S | 28.S | 28-S | | | | |
| 00672 | 別 | OUJ | ODJ | OUIJ | ODIJ | | | | | | |
| 00673 | 判 | =HJ | =2'J | =='J | =2JJ | ==JJ | =HIJ | 2HJ | 22'J | 2='J | 22JJ |
| | | 2=JJ | 2HIJ | | | | | | | | |
| 00674 | 利 | 'YIJ | 'YJ | 'IJ | 'J | | | | | | |
| 00675 | 刪 | 4OJ | UU-J | 4OIJ | | | | | | | |
| 00676 | 刨 | UOLJ | UPLJ | UCLJ | ULJ | 'CLJ | COLJ | CPLJ | CCLJ | CLJ | 'JLJ |
| | | JOLJ | JPLJ | JCLJ | JLJ | | | | | | |
| 00677 | 劫 | HSC' | IHSC | HSC | | | | | | | |
| 00678 | 助 | A-C' | A-C | 4-C' | 4-C | 4C' | 4C | | | | |
| 00679 | 努 | VXC' | VXC | | | | | | | | |

```
00680 劬  COC   COC'  'COC  'JOC
00681 匣  CQI
00682 即  BSP   BFP   B7P
00683 卵  P.P.  =P.   2P.
00684 吝  TXO
00685 吭  OTR   OT'Z
00686 吞  'KO   -KO   2TO   =TO   H2O   H8O   '-TO  KO
00687 吾  5O    LL-O
00688 否  -3O   T8O
00689 呎  OOT   OP.
00690 吧  OBL-  OBL
00691 呆  OY
00692 呃  OLJL  OLL   OLCL
00693 吳  ONK   ON-T  ON-2  ON-8
00694 呈  OE    O'+-  O'IH  O'H   O'[-
00695 呂  O'O   OIO   OO
00696 君  E'O
00697 吩  O8D   O2D
00698 告  'HO   'IHO  '2IO  '=IO  '+-O  '[-O
00699 吹  OUT   O'LT  O'JT
00700 吻  O'C2  OC2   OC''
00701 吸  O'S.  OS'.  O'S   OST   OSX   O'3.  O3'.  O'3   O3T   O3X
00702 吮  OSR
00703 吵  O3'   O3
00704 吶  OUT
00705 吠  O.K
00706 吼  OZL   OZ'L  OZ-L
00707 呀  OCJ   OCJ'
00708 吱  O+X   O[X
00709 含  8-LO  8-JO  8.LO  8.JO  8LO   8JO
00710 吟  O8-L  O8-J  O8.L  O8.J  O8L   O8J
00711 听  OLT
00712 囪  'O2.  O2.   'O2.  O2.
00713 困  OY
00714 囤  O-UL  O+UL  O-EL  O+EL  O-L   O+L   OEL   O.    O[UL  O[EL
          O[L
00715 囫  OC    O'C2  OC2   O'C
00716 坊  HTD   IHTD  IHD   HD
00717 坑  HTR   HT'Z  HT'L  IHTR
00718 址  IHG   HG
00719 坍  HA-   HU-.  HU.-  IHA-
00720 均  HC2   HC=   H'C2  H'C=  IHC2  IHC=
00721 坎  HUT   H'LT  H'JT  IHUT  IH-
00722 圾  H'S.  HS'.  HST   HSX   H'3.  H3'.  H'3   H3T   H3X   IH'
          IHST  IHSX  IH'3  IH3T  IH3X
00723 坐  TTIH  TTH   2TIH  2TH   =TIH  =TH
00724 坏  H-3   HT8   HKI   IH-3  IHT8
00725 圻  HLT   IHLT
00726 壯  UL+-  ULH   UT+-  UTH   K+-   KH    UL[-  UT[-  K[-
00727 夾  KTT   -3T   -TTT  K2T
00728 妝  UUV   ULV   UTV   KV    2YLH  =YLH
00729 妒  V'P   V.P
00730 妨  VTD   VD
00731 妞  VC+   VEI   VL+-  VC[   VL[-
00732 妣  VFF   V77   V2F   V27   V%
00733 妙  V3'   V3
00734 妖  V'K   V-K   V2T   V=T   VH2   VH8   V'-T  VK
00735 妍  VHH   V22   V=2   V2HI
00736 妤  VSLJ  VSJJ
00737 妓  V+X   V[X
00738 妊  V'+-  V'IH  V'H   VE    V'[-
00739 妥  '3V   -3V   AV
00740 孝  H'Z-  H'Z   HZ-   IH'Z
00741 孜  Z'TX  Z'X   ZTX   ZX    Z-TX  Z-X
00742 孚  '3Z-  '3Z   -3Z-  AZ-
00743 孛  +UZ-  +UZ   [UZ-  [UZ
00744 完  U2R   U=R   .U2R  .U=R
00745 宋  UY    .UY
00746 宏  U+S   .U+S  U[S   .U[S
00747 尬  -R82  +L82  K82   [L82
00748 局  PCO
00749 屁  PFF   P77   P2F   P27   P%
00750 尿  PILL  PJLL  P3    P4
```

| | | | | | | | | | | | |
|---|---|---|---|---|---|---|---|---|---|---|---|
| 00751 | 尾 | PEL | P3L | P3-L | P'2L | P'=L | | | | | |
| 00752 | 岐 | IU+X | E+X | IU[X | E[X | \+X | \[X | | | | |
| 00753 | 岑 | IU8L | IU8J | E8-L | E8-J | E8.L | E8.J | E8LI | E8L | E8JI | E8J |
| | | \8-L | \8-J | \8.L | \8.J | \8L | \8J | | | | |
| 00754 | 岔 | 8DIU | 2DIU | 8DE | 2DE | =DIU | =DE | 2D\ | 8D\ | | |
| 00755 | 岌 | IU'S | IUST | IUSX | IU'3 | IU3T | IU3X | IUSI | IUS | E"S. | ES". |
| | | ESTI | EST | ESXI | ESX | E'3. | E3'. | E'3 | E3T | E3X | \'S. |
| | | \SX | \ST | | | | | | | | |
| 00756 | 巫 | TTT- | H2T | HTT | | | | | | | |
| 00757 | 希 | X+E | X+UI | X+'E | X[E | X[UI | X['E | | | | |
| 00758 | 序 | LSJ | .LSJ | LSLJ | LSJJ | | | | | | |
| 00759 | 庇 | LFF | .LFF | L77 | .L77 | .L2F | .L27 | .L% | L% | | |
| 00760 | 床 | LY | .LY | | | | | | | | |
| 00761 | 廷 | 'HZ | EZ | '+-Z | 'IHZ | '[-Z | | | | | |
| 00762 | 弄 | E20 | E++ | E-'I | E-II | E[[ | | | | | |
| 00763 | 弟 | 25J | 25J' | =5J | =5J' | | | | | | |
| 00764 | 彤 | U.-3 | U-.3 | A-3 | | | | | | | |
| 00765 | 形 | HH3' | 223' | HH3 | 223 | ==3 | | | | | |
| 00766 | 彷 | 'TTD | 'TD | 'D | ]TD | ]D | | | | | |
| 00767 | 役 | TRX | 'TRX | ]RX | | | | | | | |
| 00768 | 忘 | .CG | TLG | CG | | | | | | | |
| 00769 | 忌 | CLG | | | | | | | | | |
| 00770 | 志 | +-G | HG | [-G | | | | | | | |
| 00771 | 忍 | D.G | D'G | J'.G | C'.G | DG | | | | | |
| 00772 | 忱 | I2UR | I2ER | IUR | IER | | | | | | |
| 00773 | 快 | I2LK | I2JK | ILK | IJK | | | | | | |
| 00774 | 忸 | I2C+ | I2CX | I2EI | IC+ | ICX | IEI | I2C[ | IC[ | | |
| 00775 | 忪 | I28S | I22S | I8S | I2S | | | | | | |
| 00776 | 戒 | 20M | M20 | ++M | M++ | =OM | XM | MX | [[M | M[[ | |
| 00777 | 我 | 'FM | | | | | | | | | |
| 00778 | 抄 | F3' | F3 | | | | | | | | |
| 00779 | 抗 | FTR | | | | | | | | | |
| 00780 | 抖 | F2+ | F=+ | F2[ | F=[ | | | | | | |
| 00781 | 技 | F+X | F[X | | | | | | | | |
| 00782 | 扶 | F+K | F-K | F2T | F=T | FIH8 | F[K | | | | |
| 00783 | 抉 | FLK | FJK | | | | | | | | |
| 00784 | 扭 | FC+ | FEI | FL+- | FE | FC[ | FL[- | | | | |
| 00785 | 把 | FBL | | | | | | | | | |
| 00786 | 扼 | FLJL | FLCL | FLOL | FLPL | FLL | | | | | |
| 00787 | 找 | FM | | | | | | | | | |
| 00788 | 批 | FFF | F77 | F2F | F27 | F% | | | | | |
| 00789 | 扳 | FLX | | | | | | | | | |
| 00790 | 抒 | FSJJ | FSLJ | FSJ | | | | | | | |
| 00791 | 扯 | FG | FTI- | | | | | | | | |
| 00792 | 折 | FLT | | | | | | | | | |
| 00793 | 扮 | F8D | F2D | | | | | | | | |
| 00794 | 投 | FRX | | | | | | | | | |
| 00795 | 抓 | F'3 | FLI. | | | | | | | | |
| 00796 | 抑 | FCP | | | | | | | | | |
| 00797 | 抆 | FTX | | | | | | | | | |
| 00798 | 改 | CLTX | | | | | | | | | |
| 00799 | 攻 | HTX | | | | | | | | | |
| 00800 | 攸 | TITX | TIX | | | | | | | | |
| 00801 | 旱 | BHII | BHI | BH | B2II | B2I | B=II | B=I | B-+I | B-+ | B--1 |
| | | B-[I | B-[ | | | | | | | | |
| 00802 | 更 | -BX | -QX | TBX | TQX | | | | | | |
| 00803 | 束 | YO | | | | | | | | | |
| 00804 | 李 | YZ-I | YZI | YZ- | YZ | | | | | | |
| 00805 | 杏 | YO | | | | | | | | | |
| 00806 | 材 | YJ' | Y-J' | | | | | | | | |
| 00807 | 村 | YJ. | Y-J. | | | | | | | | |
| 00808 | 杜 | YIH | Y+- | Y[- | | | | | | | |
| 00809 | 杖 | Y-X | Y-'. | Y+'. | Y+'X | Y['. | Y['X | | | | |
| 00810 | 杞 | YCL | | | | | | | | | |
| 00811 | 杉 | Y3 | Y''' | Y''. | | | | | | | |
| 00812 | 杆 | YHI | Y2I | Y=I | Y-+ | Y--I | Y-[ | | | | |
| 00813 | 杠 | YH | | | | | | | | | |
| 00814 | 杓 | YC- | YC. | Y'C- | Y'C. | | | | | | |
| 00815 | 宋 | .CY | TLY | CY | | | | | | | |
| 00816 | 步 | G3' | | | | | | | | | |
| 00817 | 每 | TQ- | TO2- | TO=- | TO-2 | TO-= | TO2- | TO=- | TO-2 | TO-= | |
| 00818 | 求 | -3. | -4. | +3. | +4. | [3. | [4. | | | | |
| 00819 | 汞 | HILL | HJLL | | | | | | | | |

```
00820 沙   33'
00821 沁   3G    3'L2 3.L2 3'L= 3.L=
00822 沈   3ER   3U'L
00823 沉   3UR   3U'Z
00824 沅   32R   3=R
00825 沛   3TE   3TUI 3TIE
00826 汪   3E
00827 決   3LK   3JK
00828 沐   3Y
00829 汰   3K.
00830 沌   3-UL  3-EL 3+UL 3+EL 3[UL 3[EL
00831 沮   30-   30-  3B
00832 沖   30I   30I  301  301
00833 沒   3UX   3DX
00834 汽   3T-Z  3T-L
00835 沃   3'K   32T  3=T  3H8  3'-T
00836 汲   3ST   3SX  3'S. 3S'. 3'3. 33'. 33X
00837 汾   38D   32D
00838 汴   3TT   3.T. 3TI. 3IT.
00839 沆   3TR   3T'Z 3.-R
00840 汶   3TX   3.-X
00841 沍   3-0-  3CC  320  3=0
00842 沔   3GC   3TLC
00843 沘   3FF   32F  377  327  3%
00844 沂   3LT
00845 灶   WIH   W+-  W[-
00846 灼   WC-   WC.  W'C- W'C.
00847 災   3LW   3W   LLLW
00848 炙   9W    U.W  C.W
00849 牢   .U'H  .UT+ .UH  U'H  U'20 U'2I U'=I U'=0 .UT[
00850 牡   'FIH  'FH  ZIH  ZH
00851 牠   'FJL  'FLL 'F+L ZJIL ZLIL ZLL  Z+L  'F[L Z[L
00852 狄   ZW    Z2T
00853 狂   ZE
00854 玖   EU.   EC.  E9
00855 甬   SUH   SA   SU20 SU=I SU2I
00856 甫   +A.   .+A  [A.  .[A
00857 男   QC'   QC
00858 甸   'CQ   CQ
00859 皂   'BF   BF   'B7  B7
00860 町   4-J   4J
00861 矣   STK   S'-K S'2T S'=T S'H2 S'H8 S-
00862 私   'YS
00863 秀   'Y'S  'YS' 'S'  ''S  'Y'3 ''3
00864 禿   'YR   'Y'L 'R   ''L
00865 究   .U29  .U89 U29  U89
00866 糸   -N3   'N3  -N   'N
00867 罕   U2HI  U22I U2=I U2-+ U8HI U82I U8=I U8-+ URHI UR2
           UR=I  UR-+ U2-[ U8-[ UR-[
00868 肖   3A    J2A
00869 肓   .CA   TLA  CA
00870 肝   AHI   A2I  A=I  A-+  A-[
00871 肘   AJ.   A-J.
00872 肛   AH
00873 肚   AIH   A+-  A[-
00874 育   TSA
00875 良   .BK   -BK
00876 芒   ++.C  ++TL ++C  H.C  HTL  X.C  XTL  [[.C [[TL [[C
00877 芋   ++2J  ++=J ++HJ H2J  H=J  HHJ  X2J  X=J  XHJ  [[2
           [[=J  [[HJ
00878 芍   ++C-  ++C. H'C- H'C. X'C- X'C. XC-  XC.  [[C- [[C
00879 見   4R    4'L
00880 角   UUH   UU+- UUIH UA   HH[-
00881 言   T20   T=0  ;
00882 谷   220   880  280  40   =20  ==0  =80
00883 豆   -OK
00884 豕   TC2L  -C2L ZL
00885 貝   42    48
00886 赤   IH22  H22  IH28 H28  IH4  H4
00887 走   IHG   HG   IHTT HTT
00888 足   OG    OTT
00889 身   '4J'  '4J  4J'
00890 車   -Q-   +Q+  [Q[
```

```
00891 幸  T2HI T2-+ T22I T2=I T2-[
00892 辰  L2K  L=K
00893 迂  2JZ  =JZ  HJZ
00894 迤  JILZ LILZ +LZ  [LZ
00895 迅  Z+Z  +ZZ  ZXZ  XZZ  Z[Z  [ZZ
00896 迄  TZZ
00897 巡  LLLZ 3LZ  3Z
00898 邑  OBLI OBL
00899 邢  HHP  22P  =2P  ==P
00900 邪  CJ'P CJP
00901 邦  3'P  E'P
00902 那  U2P  U=P  AP
00903 酉  -OR- -02- -08- -OR- -02- -08-
00904 釆  '2Y
00905 里  QH   QIH
00906 防  PTD  PD
00907 阮  P2R  P=R
00908 阱  PHH  P22  P#   PH
00909 阪  PLX
00910 阬  PTR  PT'Z PT'L
00911 並  2H2  K22- K4-  2HH2 =H2  =H=  =HH2 =HH=
00912 乖  '+FF '+2F '+F  '+77 '+27 '+7  '[FF '[2F '[F  '[77
00913 乳  '3ZL AZ'L AZ-L AZL
00914 事  -OEJ +OEJ -OEJ +OEJ -EJ  +EJ  [OEJ [OEJ [EJ
00915 些  GF-- GF2  GF=  G7-- G72  G7=
00916 亞  -UU- 2UU  =UU  2U   =U
00917 享  TOZ-
00918 京  TO3  TOI2 TOI8 TOJ2 TOJ8
00919 佯  T2EI T23I
00920 依  TT'K
00921 侍  THJ. THJ  TIHJ
00922 佳  THH  T2IH
00923 使  T-OX T-OX T+OX T[OX
00924 佬  TH'F THF  TH'7 TH7
00925 供  THH2 THH8 TH2  TH8
00926 例  T-AJ TAIJ
00927 來  YTT
00928 侃  TOR  TOIR TORI TO3I
00929 佰  TTB  100  T-'B
00930 併  T2HH T222 T2=2
00931 侈  T2U. T2C. TAA  T2A
00932 佩  TR-E TRE  TRTE TRTU
00933 佻  TKKL TKK  T2K
00934 侖  8-UH 8-A  8A
00935 佾  T8A
00936 侏  TTY  T'+Y T'-Y T'[Y
00937 侑  T+A  T-'A T+'A T[A  T['A
00938 佺  T8E
00939 兔  UBR. DBR.
00940 兒  EER  :R
00941 兕  UUR
00942 兩  TUTT TU2T -UTT -U2T
00943 具  4K   4-2  4-8
00944 其  HH22 HH=2 HH=8 HH28 H2K  H=K  H22  H=2  H28  =O=K
          H=8
00945 典  0202 0208 OHH2 OHH8 U2OK UHHK UHK  UH-2 UH-8
00946 冽  2-AJ 2AIJ 2AJ  =-AJ =AIJ =AJ
00947 函  -3U  -4U  T3U  T4U  L3U  L4U  J3U  J4U  LL4U JJ4U
00948 刻  TUTJ TTIJ TTJ
00949 券  2=TD 22TD 2H8D 2HD  ==TD =H8D =HD
00950 刷  PEIJ PEJ  PUIJ
00951 刺  YUIJ YUJ
00952 到  -SHJ SHIJ SHJ
00953 刮  '+OJ HOIJ HIOJ HOJ  '[OJ
00954 制  'HEJ HEIJ HEJ
00955 剁  'SYJ S'YJ SYIJ SYJ  '3YJ RYIJ RYJ
00956 劾  TUTC
00957 劻  CEC' CEC
00958 卒  TTT+ T2T+ T4+  TTT[ T2T[ T4[
00959 協  +3C  +CCC [3C  [CCC
00960 卓  TB+  I-B+ TB[  I-B[
00961 卑  'Q4  'Q'+ 'Q+  Q'+  'Q'[ 'Q[  Q'[
```

| | | | | | | | | | | | |
|---|---|---|---|---|---|---|---|---|---|---|---|
| 00962 | 卦 | HHT | HHI. | 2HT | 2HI. | =HT | =HI. | | | | |
| 00963 | 卷 | 22TL | 2=TL | 2H8L | 2HJL | 2HL | ==TL | =H8L | =HJL | =HL | |
| 00964 | 卸 | 'HGP | HGP | | | | | | | | |
| 00965 | 卹 | '4-P | 4-P | '4P | | | | | | | |
| 00966 | 取 | PX | 4X | -4X | | | | | | | |
| 00967 | 叔 | TYX | G3X | | | | | | | | |
| 00968 | 受 | '3UX | AUX | | | | | | | | |
| 00969 | 味 | O-Y | O+Y | O[Y | | | | | | | |
| 00970 | 呵 | O-JO | OJO | | | | | | | | |
| 00971 | 咖 | OCO | OC'O | OJ'O | | | | | | | |
| 00972 | 呸 | O-3- | O23 | O=3 | | | | | | | |
| 00973 | 咕 | O+O | O-IO | O[O | | | | | | | |
| 00974 | 咀 | OA- | O4- | | | | | | | | |
| 00975 | 呻 | OIQI | OBI | OO- | | | | | | | |
| 00976 | 呷 | OQI | | | | | | | | | |
| 00977 | 咄 | OUIU | OIUU | O2IU | | | | | | | |
| 00978 | 咒 | OOR | OO'Z | OO'L | | | | | | | |
| 00979 | 咆 | OUOL | OUPL | OUCL | OUL | OCOL | OCPL | OCCL | OCL | O'CL | OJOI |
| | | OJPL | OJCL | OJL | O'JL | | | | | | |
| 00980 | 呼 | O'2J | OA-J | OAJ | | | | | | | |
| 00981 | 咐 | OTJ. | OTJ | | | | | | | | |
| 00982 | 呱 | O'3S | OAS | | | | | | | | |
| 00983 | 呶 | OVX | | | | | | | | | |
| 00984 | 和 | 'YO | | | | | | | | | |
| 00985 | 咚 | OX2 | OX= | | | | | | | | |
| 00986 | 呢 | OPF | OP7 | | | | | | | | |
| 00987 | 周 | UHO | UIHO | U+-O | U[-O | | | | | | |
| 00988 | 咋 | OTI2 | OTI= | OTK | O'E | | | | | | |
| 00989 | 命 | 8-OP | 8OPI | 8OP | | | | | | | |
| 00990 | 咎 | ATO | U.TO | C.TO | | | | | | | |
| 00991 | 固 | O+O | O[O | | | | | | | | |
| 00992 | 垃 | HTK | HT2- | IHTK | | | | | | | |
| 00993 | 坷 | H-JO | HJO | IHJO | | | | | | | |
| 00994 | 坪 | HK+ | HH2I | HHI2 | H-2+ | IHK+ | HH8I | HHI8 | H-8+ | HK[ | H-2[ |
| | | IHK[ | H-8[ | | | | | | | | |
| 00995 | 坩 | HH- | HH= | H2O- | H2O= | IHH2 | IHH= | IHH | | | |
| 00996 | 坡 | HEX | HUIX | IHEX | | | | | | | |
| 00997 | 坦 | HB- | IHB- | | | | | | | | |
| 00998 | 坤 | HIQI | IHBI | HO- | HQI | IHO- | IHQI | | | | |
| 00999 | 坼 | HLT. | | | | | | | | | |
| 01000 | 夜 | TTA. | TTB- | | | | | | | | |
| 01001 | 奉 | E82O | E8H | E82I | E8=I | 3T2O | 3TH | 3T2I | 3T=I | | |
| 01002 | 奇 | K-JO | KJO | | | | | | | | |
| 01003 | 奈 | K23 | K=3 | K-Y | KY | | | | | | |
| 01004 | 奄 | KQL | KBL | KIQL | | | | | | | |
| 01005 | 奔 | K+2O | K+H | K+++ | K[2O | K[H | K[[[ | | | | |
| 01006 | 妾 | TKV | T2-V | | | | | | | | |
| 01007 | 妻 | -EV | +EV | -V | +V | EV | [EV | [V | | | |
| 01008 | 委 | 'YV | 'V | | | | | | | | |
| 01009 | 妹 | V+Y | V-Y | VY | V[Y | | | | | | |
| 01010 | 妮 | VPF | VP7 | | | | | | | | |
| 01011 | 姑 | V+O | V[O | | | | | | | | |
| 01012 | 姆 | VQ- | VO2- | VO=- | VO-2 | VO-= | VO2- | VO=- | VO-2 | VO-= | |
| 01013 | 姐 | VA- | V4- | V4 | | | | | | | |
| 01014 | 姍 | V4O | VUU- | | | | | | | | |
| 01015 | 始 | VSO | | | | | | | | | |
| 01016 | 姓 | V'E | VTH | V'IE | | | | | | | |
| 01017 | 姊 | V5J' | V5J | VSJ' | VSJ | | | | | | |
| 01018 | 妯 | VIQ | | | | | | | | | |
| 01019 | 妳 | VUI2 | VUJ2 | VU3 | VUI8 | VUJ8 | | | | | |
| 01020 | 姒 | VL.T | | | | | | | | | |
| 01021 | 姅 | V22O | V2H | V22I | V2=I | V2++ | V2X | V2[[ | | | |
| 01022 | 孟 | Z-4- | Z-4 | Z4- | Z4 | | | | | | |
| 01023 | 孤 | Z'3S | Z'AS | Z-AS | ZAS | ZLS. | | | | | |
| 01024 | 季 | 'YZ- | 'YZ | 'Z- | | | | | | | |
| 01025 | 宗 | .U23 | U23 | .U-Y | U-Y | U=3 | | | | | |
| 01026 | 定 | .U-G | .UG | U-G | UG | | | | | | |
| 01027 | 官 | .UB | UB | | | | | | | | |
| 01028 | 宜 | .UA- | UA- | .U4- | .U4 | U4- | U4 | | | | |
| 01029 | 宙 | .UIQ | UIQ | .UQ | | | | | | | |
| 01030 | 宛 | .UAL | UAJL | UACL | UAL | | | | | | |
| 01031 | 尚 | 3UO | I2UO | I8UO | J2UO | J8UO | | | | | |
| 01032 | 屆 | PUIU | PIUU | P2IU | | | | | | | |

| | | | | | | | | | | | |
|---|---|---|---|---|---|---|---|---|---|---|---|
| 01033 | 居 | P+O | P[O | | | | | | | | |
| 01034 | 屈 | PHU | PUH | PIHU | P+-U | PU | P[-U | | | | |
| 01035 | 岷 | IUPM | IUOK | EOK | ECK | EOLM | ECLM | EOL+ | ECL+ | EOL[ | ECL[ |
| | | \PM | \OK | \CK | | | | | | | |
| 01036 | 岡 | UKIU | UKE | UK\ | | | | | | | |
| 01037 | 岸 | IULH | ELHI | EL2I | EL=I | EL-+ | ELH | EL-[ | \LHI | \L-+ | \L-[ |
| | | \L2I | \L=I | | | | | | | | |
| 01038 | 岩 | IUTO | IU+ | E-'O | ETO | E+ | IU[ | E[ | \-'O | \TO | |
| 01039 | 岫 | IUIQ | EIQ | \IQ | | | | | | | |
| 01040 | 岱 | TMIU | TME | TM\ | | | | | | | |
| 01041 | 岳 | 'OIU | 'OE | LT-E | LT-\ | 'O\ | | | | | |
| 01042 | 帘 | U2UI | U8UI | .UUI | .U2E | U2IE | U2E | .U8E | U8IE | U8E | URUI |
| | | .URE | URIE | URE | | | | | | | |
| 01043 | 帚 | EUUI | EUE | C-UE | | | | | | | |
| 01044 | 帖 | UITO | | | | | | | | | |
| 01045 | 帕 | UI'B | UIB | | | | | | | | |
| 01046 | 帛 | 'BUI | | | | | | | | | |
| 01047 | 帑 | VXE | VXUI | | | | | | | | |
| 01048 | 幸 | H2H | H2HI | H2-+ | H22I | H2=I | H2-[ | | | | |
| 01049 | 庚 | .LET | LET | | | | | | | | |
| 01050 | 店 | .LTO | LTO | LI-O | | | | | | | |
| 01051 | 府 | .LTJ | LTJ. | LTJ | | | | | | | |
| 01052 | 底 | .LK- | .LK. | | | | | | | | |
| 01053 | 庖 | .LUL | .LCL | LUOL | LUPL | LUCL | LUL | L'CL | LCOL | LCPL | LCCL |
| | | L'JL | LJOL | LJPL | LJCL | | | | | | |
| 01054 | 延 | 'GZ | GZ | | | | | | | | |
| 01055 | 弦 | 5TN | | | | | | | | | |
| 01056 | 弧 | 5AS | 5LS. | ) | | | | | | | |
| 01057 | 弩 | VX5 | | | | | | | | | |
| 01058 | 往 | 'T.E | ].E | ]E | | | | | | | |
| 01059 | 征 | 'T-G | 'TG | ]-G | ]G | | | | | | |
| 01060 | 彿 | 'T52 | ]52 | | | | | | | | |
| 01061 | 彼 | 'TEX | TUIX | ]UIX | ]EX | | | | | | |
| 01062 | 忝 | 'KG | -KG | 2TG | =TG | H8G | '-TG | 'K4 | -K4 | H84 | 2T4 |
| | | =T4 | | | | | | | | | |
| 01063 | 忠 | OIG | OIG | OG | | | | | | | |
| 01064 | 忽 | 'C2G | C2G | C''G | U2G | U''G | | | | | |
| 01065 | 念 | 8-LG | 8-JG | 8.LG | 8.JG | 8LG | 8JG | | | | |
| 01066 | 忿 | 8DG | 2DG | =DG | | | | | | | |
| 01067 | 快 | I2UK | IUK | | | | | | | | |
| 01068 | 怔 | I2-G | I2G | I-G | | | | | | | |
| 01069 | 怯 | I2HS | IIHS | IHS | | | | | | | |
| 01070 | 怵 | I2Y. | IY. | IY | | | | | | | |
| 01071 | 怖 | I2+E | I+E | I-'E | I+'E | I2[E | I[E | I['E | | | |
| 01072 | 怪 | I2XH | IXH | IXIH | | | | | | | |
| 01073 | 怕 | I2'B | I'B | IB | | | | | | | |
| 01074 | 怡 | I2SO | ISO | | | | | | | | |
| 01075 | 性 | I2'E | I'E | I'IE | | | | | | | |
| 01076 | 怩 | I2PF | I2P7 | IPF | IP7 | | | | | | |
| 01077 | 怫 | I252 | I5'I | I5II | I52 | | | | | | |
| 01078 | 怛 | I2B- | IB- | | | | | | | | |
| 01079 | 或 | O-M | MO- | | | | | | | | |
| 01080 | 戕 | KM | UUM | ULM | UTM | | | | | | |
| 01081 | 房 | 'PTD | 'PD | .PTD | .PD | | | | | | |
| 01082 | 戾 | 'PK. | 'P.K | 'PK | .PK. | .P.K | .PK | | | | |
| 01083 | 所 | 'PLT | .PLT | PLT | PT | | | | | | |
| 01084 | 承 | L32 | L3= | L42 | L4= | J32 | J3= | J42 | J4= | Z2LL | Z=LL |
| 01085 | 拉 | FTK | FT2- | | | | | | | | |
| 01086 | 拌 | F2H | F22I | F2=I | F220 | F2++ | F2X | F2[[ | | | |
| 01087 | 拄 | F.E | | | | | | | | | |
| 01088 | 抿 | FOK | FCK | FPK | FOLM | FPLM | FCLM | FOL+ | FPL+ | FCL+ | FOL[ |
| | | FPL[ | FCL[ | | | | | | | | |
| 01089 | 拂 | F5'I | F5II | F52 | | | | | | | |
| 01090 | 抹 | FY+ | F-Y | FY- | FY | FY[ | | | | | |
| 01091 | 拒 | FCC | FE | | | | | | | | |
| 01092 | 招 | FDO | FUO | | | | | | | | |
| 01093 | 披 | FEX | FUIX | | | | | | | | |
| 01094 | 拓 | FTO | F-'O | | | | | | | | |
| 01095 | 拔 | F+X. | F[X. | | | | | | | | |
| 01096 | 拋 | F9C' | F9C | FKC' | FKC | | | | | | |
| 01097 | 拈 | FTO | FI-O | | | | | | | | |
| 01098 | 抨 | FK+ | FH2I | FHI2 | FHI8 | F-2+ | F-8+ | FK[ | F-2[ | F-8[ | |
| 01099 | 抽 | FIQ | | | | | | | | | |
| 01100 | 押 | FQI | | | | | | | | | |

| | | | | | | | | | | | |
|---|---|---|---|---|---|---|---|---|---|---|---|
| 01101 | 拐 | FOC | FOC' | | | | | | | | |
| 01102 | 拙 | FUIU | FIUU | F2IU | | | | | | | |
| 01103 | 拇 | FQ- | FO2- | FO=- | FO-2 | FO-= | FO2- | FO=- | FO-2 | FO-= | |
| 01104 | 拍 | F'B | | | | | | | | | |
| 01105 | 抵 | FK- | FK. | F'K- | F'K. | | | | | | |
| 01106 | 拚 | FS2O | FSH | FS++ | FS[[ | | | | | | |
| 01107 | 抱 | FUOL | FUPL | FUCL | FUL | FCOL | FCPL | FCCL | FCL | F'CL | FJ( |
| | | FJPL | FJCL | F'JL | | | | | | | |
| 01108 | 拘 | FCO | F'CO | F'JO | | | | | | | |
| 01109 | 拖 | FTJL | FTLL | FT+L | FT[L | | | | | | |
| 01110 | 拗 | FNC | FNC' | | | | | | | | |
| 01111 | 拆 | FLT. | | | | | | | | | |
| 01112 | 抬 | FSO | | | | | | | | | |
| 01113 | 拎 | F8.S | F8-S | F8S | | | | | | | |
| 01114 | 放 | TDTX | TDX | DTX | | | | | | | |
| 01115 | 斧 | 8XLT | 8XT | 2XLT | 2XT | =XLT | =XT | | | | |
| 01116 | 於 | TD82 | TDT2 | DT2 | TD8= | TDT= | DT= | | | | |
| 01117 | 旺 | BE | | | | | | | | | |
| 01118 | 昔 | HHB | 22B | HB | =2B | ==B | | | | | |
| 01119 | 易 | BC'' | BC2I | BC2 | BCI | BC | B'C2 | BU'' | BU2I | BU2 | |
| 01120 | 昌 | BB | | | | | | | | | |
| 01121 | 昆 | BFF | B2F | B77 | B27 | B% | | | | | |
| 01122 | 昂 | BHP | | | | | | | | | |
| 01123 | 明 | BA | | | | | | | | | |
| 01124 | 昀 | B'C= | B'C2 | BC= | BC2 | | | | | | |
| 01125 | 昏 | C+B | CMB | C-LB | 'KB | KB | C[B | | | | |
| 01126 | 昕 | BLT | BT | | | | | | | | |
| 01127 | 昊 | B-K | B2T | B=T | BH8 | | | | | | |
| 01128 | 昇 | B'H | B'2O | B'++ | B'X | B'[[ | | | | | |
| 01129 | 服 | APX | APL | | | | | | | | |
| 01130 | 朋 | AA | 2A | =A | | | | | | | |
| 01131 | 杭 | YTR | | | | | | | | | |
| 01132 | 枋 | YTD | | | | | | | | | |
| 01133 | 枕 | YUR | YER | YU'L | | | | | | | |
| 01134 | 東 | YQ | -B3 | +B3 | -Q3 | +Q3 | -L3 | [B3 | [Q3 | | |
| 01135 | 果 | QY | | | | | | | | | |
| 01136 | 杳 | YB | +8B | [8B | | | | | | | |
| 01137 | 杷 | YBL | | | | | | | | | |
| 01138 | 枇 | YFF | Y2F | Y77 | Y27 | Y% | | | | | |
| 01139 | 枝 | Y+X | Y[X | | | | | | | | |
| 01140 | 林 | YY | | | | | | | | | |
| 01141 | 杯 | Y-3 | YT8 | | | | | | | | |
| 01142 | 杰 | YW | +8W | +84 | Y4 | [8W | [84 | | | | |
| 01143 | 板 | YLX | YL-X | | | | | | | | |
| 01144 | 枉 | YE | | | | | | | | | |
| 01145 | 松 | Y8S | Y2S | | | | | | | | |
| 01146 | 析 | YLT | | | | | | | | | |
| 01147 | 杵 | YT+ | Y'HI | Y'H | YT[ | | | | | | |
| 01148 | 枚 | YTX | | | | | | | | | |
| 01149 | 枓 | Y2+ | Y=+ | Y2[ | | | | | | | |
| 01150 | 杼 | YSLJ | YSJJ | YSJ | | | | | | | |
| 01151 | 杪 | Y3' | | | | | | | | | |
| 01152 | 杲 | BY | B+8 | B[8 | | | | | | | |
| 01153 | 欣 | LTUT | | | | | | | | | |
| 01154 | 武 | 2GM | 2MG | =GM | =MG | | | | | | |
| 01155 | 歧 | G+X | G[X | | | | | | | | |
| 01156 | 歿 | -AUX | -ADX | ADX | | | | | | | |
| 01157 | 氓 | .COK | .CCK | COK | CCK | COLM | CCLM | COL+ | CCL+ | COL[ | CCL[ |
| 01158 | 氛 | 78D | 72D | TZ8D | TZ2D | TL8D | TL2D | | | | |
| 01159 | 泣 | 3TK | 3T2- | | | | | | | | |
| 01160 | 注 | 3.E | | | | | | | | | |
| 01161 | 泳 | 3-3 | 3.3 | 3.4 | | | | | | | |
| 01162 | 沱 | 3.UF | 3UF | 3.U7 | 3U7 | | | | | | |
| 01163 | 泌 | 3G' | | | | | | | | | |
| 01164 | 泥 | 3PF | 3P7 | | | | | | | | |
| 01165 | 河 | 3-JO | 3JO | | | | | | | | |
| 01166 | 沽 | 3+O | 3[O | | | | | | | | |
| 01167 | 沾 | 3I-O | 3TO | | | | | | | | |
| 01168 | 沼 | 3DO | | | | | | | | | |
| 01169 | 波 | 3UIX | 3EX | | | | | | | | |
| 01170 | 沫 | 3Y+ | 3-Y | 3Y[ | | | | | | | |
| 01171 | 法 | 3HS | 3IHS | | | | | | | | |
| 01172 | 泓 | 35S | | | | | | | | | |

01173 沸 35'I 35II 352I 352
01174 泄 3HL 320L
01175 油 3IQ
01176 況 30R 30'L
01177 沮 3A- 34-
01178 洒 34 302 308 30R
01179 泗 30T 30T
01180 泱 3UK
01181 沿 3RO
01182 治 3SO
01183 泡 3UPL 3UOL 3UCL 3'CL 3CPL 3COL 3CCL 3'JL 3JPL 3JOL
3JCL
01184 泛 3TZ 3'.Z
01185 泊 3'B
01186 沫 3+Y 3-Y 3[Y
01187 泯 3OK 3CK 3OLM 3PLM 3CLM 3OL+ 3PL+ 3CL+ 3OL[ 3PL[
3CL[
01188 泜 3'K- 3'K. 3K-
01189 泖 3C'P 3PP
01190 泠 38.S 38-S 38S
01191 炕 WTR WT'Z WT'L
01192 炎 WW 2W =W
01193 炒 W3' W3
01194 炔 WUT W-
01195 炙 AW U2T U=W C2W C=W
01196 爬 '3BL L.BL
01197 爭 '3EJ AEJ
01198 爸 8XBL 8XL 2XBL 2XL =XBL =XL
01199 版 UULX ULLX UTLX KLX
01200 牧 'FTX 'FX ZTX ZX
01201 物 'FC2 Z'C2 ZC2 ZC'' 'FU2 Z'U2 ZU2 ZU''
01202 狀 UU.K UUK. UUK UL.K ULK. ULK UT.K UTK. UTK K.K
KK.
01203 狎 ZQI
01204 狙 ZA- Z4
01205 狗 Z'CO ZCO Z'JO ZJO
01206 狐 Z'3S ZLS. ZAS
01207 玩 E2R E=R
01208 玨 EE E-+- E-[-
01209 玫 E.-X ETX
01210 玟 E'-X ETX
01211 玥 EA
01212 甽 Q3 Q3I Q'II
01213 疝 .L2E L2E L2IU LIU .L2\ L2\ L\
01214 疙 L2TZ
01215 疚 .L29 L2U. L2C. L29
01216 的 'BC- 'BC. 'BC
01217 盂 2J4- =J4- HJ4- 2J4 =J4 HJ4
01218 盲 .C4 TL4 C4
01219 直 +4L +4- I [4L [4-
01220 知 TKO '-KO '2TO '=TO 'H2O 'H8O -O
01221 矽 TOU. TOC. TOA
01222 社 KIH KH 23IH 23+- 23H -YIH -Y+- -YH =3IH =3+
=3H 23[- -Y[- =3[-
01223 祀 KCL KOL KPL 23OL 23PL 23CL -YOL -YPL -YCL =3O
=3PL =3CL
01224 祁 KP 23P -YP =3P
01225 秉 'YE '-E3
01226 秈 'YIU 'IU 'Y\ '\
01227 空 .U2H U2H .U8H U8H .URH URH
01228 穹 .U25 U25 .U85 U85 .UR5
01229 竺 FF2 FF= FF-- /2 /= /--
01230 糾 N3LI NLI N3UI NUI
01231 罔 UK.C UKC U2TC
01232 羌 2ER =ER 2E'L =E'L
01233 羋 TT2O TT++ TTHI TTX TT[[ 2T2O 2THI 2T++ 2T[[ =T2
=THI =T++ =T[[
01234 者 H'B IH'B
01235 肺 ATUI ATE
01236 肥 ABL
01237 肢 A+X A[X
01238 肱 A+S A-'S A+'S A[S A['S
01239 股 ARX
01240 肫 A-UL A+UL A-EL A+EL A[UL A[EL

```
01241 肩   'PA   .PA   PA
01242 肴   X+A   X-'A  X+'A  X[A   X['A
01243 肪   ATD   AD
01244 肯   GA
01245 臥   ET    C2CT
01246 臾   EET   2ET   =ET
01247 舍   8HIO  82IO  8=IO  8'+O  8-+O  8HO   8'[O  8-[O
01248 芳   ++TD  HTD   XTD   [[TD
01249 芝   ++.Z  ++Z   H.Z   HZ    X.Z   XZ    [[.Z  [[Z
01250 芙   +++K  ++-K  ++2T  ++=T  H+K   H-K   H--T  X+K   X-K   X--
           [[[K  [[-K  [[2T  [[=T  H[K   X[K
01251 芭   ++BL  HBL   XBL   [[BL
01252 芽   ++CJ  HCJ'  HCJ   XCJ'  XCJ   [[CJ
01253 芟   ++RX  HRX   XRX   [[RX
01254 芹   ++LT  HLT   XLT   [[LT
01255 花   ++TF  HTF   ++T7  HT7   XTF   XT7   [[TF  [[T7
01256 芬   ++2D  ++8D  H2D   H8D   X8D   X2D   [[2D  [[8D
01257 芥   ++82  H8'I  H8II  H82   X8'I  X8II  X82   [[82
01258 芯   ++G   H'L2  H.L2  H'L=  H.L=  X'L2  X.L2  X'L=  X.L=  XG
           [[G
01259 芸   ++2S  ++=S  H--S  H2S   H=S   X--S  X2S   X=S   [[2S  [[=
01260 芣   ++-3  ++T8  H-3   HT8   X-3   XT8   [[-3  [[T8
01261 芰   +++X  H+X   X+X   [[[X  H[X   X[X
01262 芾   ++-E  ++TU  H-UI  H-E   HTU   X-UI  X-E   XTU   [[-E  [[T
01263 芷   ++G   HTI-  XTI-  XG    [[G
01264 虎   TU7R  T7R   U7R
01265 虱   Z'OS  ZOS   Z'OS  ZOS   Z'S   ZS    Z-OS  Z-OS  Z-S   L'O:
           LOS   L'OS  LOS   L'S   LS    L-OS  L-OS  L-S
01266 初   KD
01267 表   E'K   IEK
01268 軋   +Q+L  -Q-L  HQL   QL    [Q[L
01269 迎   CPZ
01270 返   LXZ
01271 近   LTZ
01272 邵   DO3I  UO3I  DOP   UOP
01273 邸   K-P   K.P   'K-P  'K.P
01274 邱   'OP   LT-P
01275 邶   FFP   F'LP  FL'P  F-LP  FL-P  'LFP  L'FP  L-FP  -LFP  77P
           7'LP  7L'P  7-LP  7L-P  'L7P  L'7P  L-7P  -L7P
01276 采   '3Y   AY
01277 金   8E2   8K
01278 長   E-K   EK
01279 門   PP    P-P-  IBBI  BIBI  2P-   2BI   =P-   =BI
01280 阜   'OO+  OO+   'B+   'OO[  OO[   'B[
01281 陀   P.UF  PUF   P.U7  PU7
01282 阿   P-JO  PJO
01283 阻   PA-   P4-
01284 附   PTJ   PTJ.
01285 陂   PUIX  PEX
01286 隹   T.HH  TTE
01287 雨   TU4   -U3   -U4   TU22  TU==
01288 青   EA    IEA   3IA
01289 非   I3I3  I33I  3II3  3I3I  3'I3
01290 亟   SOX-
01291 亭   TOUJ
01292 亮   TOUR
01293 信   TT2O  TT=O  T;
01294 侵   TEUX
01295 侯   TCTK  TCK   TC-
01296 便   T-QX  TTQX  T-BX  TTBX
01297 俠   TKTT  TK2T  TKT   T-3T
01298 俑   TSUH
01299 俏   T3A
01300 保   TOY   TO+2  TO+8  TO[2  TO[8
01301 促   TOG
01302 侶   TO'O  TOIO  TOO
01303 俘   T'3Z  TAZ-  TAZ
01304 俟   TS2T  TS=T  TSTK  TSK   TS-
01305 俊   TS2X  TS8X  TSRX
01306 俗   T22O  T88O  T28O  T4O
01307 侮   TTQ-
01308 俐   T'YJ  TYIJ  TYJ   T'IJ  T'J
01309 俄   T'FM  TFM
```

| | | | | | | | | | | | |
|---|---|---|---|---|---|---|---|---|---|---|---|
| 01310 | 係 | T'N3 | T-N3 | TN3 | T'N | T-N | | | | | |
| 01311 | 俚 | TQIH | TQH | | | | | | | | |
| 01312 | 俎 | TTA- | TT4- | 2TA- | 2T4- | =TA- | =T4- | | | | |
| 01313 | 俞 | 8-AJ | 8AIJ | 8AJ | | | | | | | |
| 01314 | 侷 | TPJO | TPCO | | | | | | | | |
| 01315 | 胄 | T2OR | T8OR | T2RI | T8RI | T2R | T8R | | | | |
| 01316 | 冑 | B4 | | | | | | | | | |
| 01317 | 冒 | IQA | | | | | | | | | |
| 01318 | 冠 | U2RJ | U=RJ | URJ | | | | | | | |
| 01319 | 剎 | XYIJ | XYJ | | | | | | | | |
| 01320 | 剃 | 25JJ | =5JJ | | | | | | | | |
| 01321 | 削 | 3AIJ | 3AJ | | | | | | | | |
| 01322 | 前 | KAIJ | KAJ | | | | | | | | |
| 01323 | 剌 | YOIJ | YOIJ | YOJ | YOJ | | | | | | |
| 01324 | 剋 | +ORJ | +RJ | [ORJ | [RJ | | | | | | |
| 01325 | 則 | 42IJ | 48IJ | 42J | 48J | | | | | | |
| 01326 | 勇 | SAC | SAC' | SUHC | | | | | | | |
| 01327 | 勉 | DBRC | UBRC | DRC | URC | | | | | | |
| 01328 | 勃 | +UZC | +ZC | +ZC' | [UZC | [ZC | [ZC' | | | | |
| 01329 | 勁 | -3HC | 3HC | 3HC' | | | | | | | |
| 01330 | 匍 | C-UH | C+A. | C+A | 'C+A | C[A. | C[A | 'C[A | | | |
| 01331 | 南 | +U2H | +UH | [U2H | [UH | | | | | | |
| 01332 | 卻 | 220P | 880P | 280P | 40JI | 40CI | 40P | =20P | ==0P | =80P | |
| 01333 | 厚 | LBZ- | LBZ | | | | | | | | |
| 01334 | 叛 | 2HLX | =HLX | | | | | | | | |
| 01335 | 咬 | OT2X | OT8X | | | | | | | | |
| 01336 | 哀 | TO'K | TOK | | | | | | | | |
| 01337 | 咨 | 2UTO | 2-0 | =UTO | =-0 | | | | | | |
| 01338 | 哎 | 0++X | OHX | OXX | O[[X | | | | | | |
| 01339 | 哉 | HOM | HMO | | | | | | | | |
| 01340 | 咸 | -OM | M-O | | | | | | | | |
| 01341 | 咦 | OKS | O-ST | O+ST | O[ST | | | | | | |
| 01342 | 咳 | OTUT | | | | | | | | | |
| 01343 | 哇 | OHH | O2IH | O2H | | | | | | | |
| 01344 | 哂 | O-4 | O-02 | O-08 | O-OR | O-02 | O-08 | O-OR | | | |
| 01345 | 咽 | OOK | | | | | | | | | |
| 01346 | 咪 | O2Y | | | | | | | | | |
| 01347 | 品 | 000 | 30 | | | | | | | | |
| 01348 | 哄 | OHH2 | OHH8 | OH2 | | | | | | | |
| 01349 | 哈 | O8-O | O8O | | | | | | | | |
| 01350 | 咯 | OXO | O'XO | | | | | | | | |
| 01351 | 咫 | P.02 | P.08 | | | | | | | | |
| 01352 | 咱 | O'4 | | | | | | | | | |
| 01353 | 咻 | OTY | | | | | | | | | |
| 01354 | 咩 | O2EI | | | | | | | | | |
| 01355 | 咧 | O-AJ | OAIJ | | | | | | | | |
| 01356 | 咿 | OTE' | | | | | | | | | |
| 01357 | 囿 | O+A | O+'A | O[A | O['A | | | | | | |
| 01358 | 垂 | H2OH | H++H | HXH | H[[H | | | | | | |
| 01359 | 型 | HHJH | 22JH | HIJH | HJIH | HJH | =2JH | ==JH | | | |
| 01360 | 垠 | HBK | IHBK | | | | | | | | |
| 01361 | 垣 | H-B- | H2B | H=B | IH2B | IH=B | | | | | |
| 01362 | 垢 | HL-O | HLO | IHLO | | | | | | | |
| 01363 | 城 | HDM | HUM | HMD | HMU | IHDM | IHUM | | | | |
| 01364 | 垮 | HK2C | HKC | HK=C | IHKC | | | | | | |
| 01365 | 垓 | HTUT | | | | | | | | | |
| 01366 | 奕 | T22K | T28K | | | | | | | | |
| 01367 | 契 | EDK | 3IDK | | | | | | | | |
| 01368 | 奏 | E8'K | E8-K | E82T | E8=T | E8H8 | 3T'K | 3T-K | 3T2T | 3T=T | 3 |
| 01369 | 奎 | KHH | K2IH | | | | | | | | |
| 01370 | 奐 | UU2K | UU8K | UURK | U4-2 | U4-8 | | | | | |
| 01371 | 姜 | 2EV | =EV | | | | | | | | |
| 01372 | 姘 | V2HH | V222 | | | | | | | | |
| 01373 | 姿 | 2UTV | 2TV | 2-V | =UTV | =TV | =-V | | | | |
| 01374 | 姣 | VT2X | VT8X | | | | | | | | |
| 01375 | 姨 | VK5 | V-5T | V+5T | V[5T | | | | | | |
| 01376 | 娃 | VHH | V2IH | V2H | | | | | | | |
| 01377 | 姥 | VH'F | VHF | VH'7 | VH7 | | | | | | |
| 01378 | 姪 | V-SH | VSH | | | | | | | | |
| 01379 | 姚 | VKKL | VKK | V2K | | | | | | | |
| 01380 | 姦 | VVV | | | | | | | | | |
| 01381 | 威 | L-VM | LVM | M-V | MV | | | | | | |
| 01382 | 姻 | VOK | VOK | | | | | | | | |

| | | | | | | | | | |
|---|---|---|---|---|---|---|---|---|---|
| 01383 | 孩 | Z'TT | Z-TT | ZTUT | | | | | |
| 01384 | 宣 | .U2B | .U=B | U-B- | U2B | U=B | | | |
| 01385 | 宦 | .UE | UC2C | UE | | | | | |
| 01386 | 室 | .USH | U-SH | USH | | | | | |
| 01387 | 客 | .UXO | U'XO | UXO | | | | | |
| 01388 | 宥 | .U+A | U+A | U+'A | .U[A | U[A | U['A | | |
| 01389 | 封 | HHJ. | 2HJ. | =HJ. | | | | | |
| 01390 | 屎 | P2Y | | | | | | | |
| 01391 | 屏 | P2HH | P222 | P2H | | | | | |
| 01392 | 屍 | P-AF | PAF | P-A7 | PA7' | | | | |
| 01393 | 屋 | P-SH | PSH | | | | | | |
| 01394 | 峙 | IUHJ | EHJ. | EHJ | EIHJ | \HJ. | \HJ | | |
| 01395 | 峒 | EU-O | IUUO | \U-O | \UO | | | | |
| 01396 | 巷 | HH8L | 228L | H8OL | H8PL | H8CL | H8L | =281 | ==8L |
| 01397 | 帝 | T2UE | | | | | | | |
| 01398 | 帥 | 'BUI | BUI | 'OOE | OOUI | OOE | | | |
| 01399 | 帟 | T22E | T4E | T4UI | | | | | |
| 01400 | 幽 | UNIN | ENN | E2N | | | | | |
| 01401 | 庠 | L2EI | L23I | | | | | | |
| 01402 | 度 | L2OX | .LHX | LHX | | | | | |
| 01403 | 建 | E2IZ | E=IZ | EHZ | | | | | |
| 01404 | 弈 | T420 | T4H | T22H | T28H | | | | |
| 01405 | 弭 | 5P | 5-4 | 54 | | | | | |
| 01406 | 彥 | TXL3 | T2L3 | | | | | | |
| 01407 | 很 | 'TBK | ]BK | | | | | | |
| 01408 | 待 | 'THJ | ]HJ. | ]HJ | | | | | |
| 01409 | 徊 | 'TOO | 'TQ | 'TOO | ]OO | ]OO | ]Q | | |
| 01410 | 律 | 'TEH | ]E2O | ]E++ | ]EH | ]E[[ | | | |
| 01411 | 徇 | 'TCB | ]'CB | ]CB | | | | | |
| 01412 | 後 | 'TNX | ]N'X | ]NX | | | | | |
| 01413 | 徉 | 'T2E | ]2EI | ]23I | ]2E | | | | |
| 014T4 | 怒 | VXG | | | | | | | |
| 01415 | 思 | QG | | | | | | | |
| 01416 | 怠 | SOG | | | | | | | |
| 01417 | 急 | UEG | | | | | | | |
| 01418 | 怎 | TI2G | TI=G | TKG | 'EG | | | | |
| 01419 | 怨 | AJLG | ACLG | ALG | U.LG | C.LG | | | |
| 01420 | 恍 | I23R | I3-R | I3R | | | | | |
| 01421 | 恰 | I28O | I8-O | I8O | | | | | |
| 01422 | 恨 | I2BK | IBK | | | | | | |
| 01423 | 恢 | I2+W | I+W | I-'W | I+'W | I2[W | I[W | I['W | |
| 01424 | 恆 | I22B | I2=B | ICC- | ICC. | ICC | I2B | I=B | |
| 01425 | 恃 | I2HJ | IHJ. | IHJ | IIHJ | | | | |
| 01426 | 恬 | I2HO | I'+O | I'[O | | | | | |
| 01427 | 恫 | IU-O | | | | | | | |
| 01428 | 恪 | I2XO | IXO | I'XO | | | | | |
| 01429 | 恤 | I2'4 | I'4- | I24- | I'4 | | | | |
| 01430 | 扁 | 'PUH | .PUH | | | | | | |
| 01431 | 拜 | E'4O | E'HH | | | | | | |
| 01432 | 挖 | FU2Z | FU8Z | FURZ | FUZ | | | | |
| 01433 | 按 | F.UV | FUV | | | | | | |
| 01434 | 拼 | F2HH | F222 | | | | | | |
| 01435 | 拭 | FHM | FMH | | | | | | |
| 01436 | 持 | FHJ. | FHJ | FIHJ | | | | | |
| 01437 | 拮 | FIHO | FHO | F+-O | F[-O | | | | |
| 01438 | 拽 | FQM | FIQM | FQL' | FBM | FBL' | | | |
| 01439 | 指 | FFB | F7B | | | | | | |
| 01440 | 拱 | FHH2 | FHH8 | FH2 | FH8 | | | | |
| 01441 | 拷 | FH'S | FH'5 | FH5 | | | | | |
| 01442 | 拯 | FL3- | FJ3- | F3- | FL4- | FJ4- | F4- | | |
| 01443 | 括 | F'+O | FHIO | F'[O | ( | | | | |
| 01444 | 拾 | F8-O | F8O | F+ | F1O | F[ | | | |
| 01445 | 拴 | F8E | | | | | | | |
| 01446 | 挑 | FKKL | FKK | F2K | | | | | |
| 01447 | 挂 | FHH | F2IH | | | | | | |
| 01448 | 政 | -GTX | GTX | | | | | | |
| 01449 | 故 | +OTX | [OTX | | | | | | |
| 01450 | 斫 | TOLT | TOT | +LT | [LT | | | | |
| 01451 | 施 | DT+L | DTLL | DTJL | TDTL | TDL | DTL | DT[L | |
| 01452 | 既 | BFCR | BFR | BSCR | BSR | B7CR | B7R | | |
| 01453 | 春 | E8B | 3TB | | | | | | |
| 01454 | 昭 | BDO | BUO | | | | | | |
| 01455 | 映 | BUK | | | | | | | |

| | | | | | | | | | | | |
|---|---|---|---|---|---|---|---|---|---|---|---|
| 01456 | 昧 | B+Y | B-Y | B[Y | | | | | | | |
| 01457 | 是 | B-G | BG | | | | | | | | |
| 01458 | 星 | B.'E | | | | | | | | | |
| 01459 | 昨 | BTI2 | BTI= | BTK | | | | | | | |
| 01460 | 昱 | B'+K | BTK | BT2- | B'[K | | | | | | |
| 01461 | 昤 | B8.S | B8-S | B8S | | | | | | | |
| 01462 | 曷 | BCTL | BCLT | BCL | | | | | | | |
| 01463 | 柿 | YTE | YTUI | | | | | | | | |
| 01464 | 染 | 39Y | | | | | | | | | |
| 01465 | 柱 | Y.E | | | | | | | | | |
| 01466 | 柔 | SJJY | SJY | SLJY | | | | | | | |
| 01467 | 某 | 202Y | 20-Y | H2Y | H=Y | =0=Y | =0-Y | | | | |
| 01468 | 柬 | Y02 | Y4 | | | | | | | | |
| 01469 | 架 | COY | C'OY | J'OY | | | | | | | |
| 01470 | 枯 | Y+O | Y[O | | | | | | | | |
| 01471 | 柵 | YUU- | Y40 | | | | | | | | |
| 01472 | 柩 | YCU. | YCC. | YC9 | | | | | | | |
| 01473 | 柯 | Y-JO | YJO | | | | | | | | |
| 01474 | 柄 | Y-UT | | | | | | | | | |
| 01475 | 柑 | Y202 | Y20- | YH2 | YH= | Y20= | | | | | |
| 01476 | 枴 | YOC | YOC' | | | | | | | | |
| 01477 | 柚 | YIQ | | | | | | | | | |
| 01478 | 查 | YB-I | YB- | | | | | | | | |
| 01479 | 枸 | YCO | Y'CO | Y'JO | | | | | | | |
| 01480 | 柏 | Y'B | | | | | | | | | |
| 01481 | 柞 | YTI2 | YTI= | YTK | Y'E | | | | | | |
| 01482 | 柳 | YC'P | YPP | | | | | | | | |
| 01483 | 枰 | YK+ | YH2I | YHI2 | Y-2+ | YH8I | YHI8 | Y-8+ | YK[ | Y-2[ | Y- |
| 01484 | 柙 | YQI | | | | | | | | | |
| 01485 | 柢 | YK- | YK. | Y°K- | Y'K. | | | | | | |
| 01486 | 柝 | YLT. | | | | | | | | | |
| 01487 | 柒 | 37Y | 3FY | 27Y | 2FY | 37 | =7Y | =FY | | | |
| 01488 | 歪 | -3-G | -3G | T8G | | | | | | | |
| 01489 | 殃 | -AUK | | | | | | | | | |
| 01490 | 殆 | -ASO | | | | | | | | | |
| 01491 | 段 | 'ERX | ERX | | | | | | | | |
| 01492 | 毒 | EQ- | E02- | E0=- | E0-2 | E0-= | E02- | E0=- | E0-2 | E0-= | |
| 01493 | 毗 | QFF- | Q2F- | Q77- | Q27- | QFF | Q2F | Q77 | Q27 | Q%- | Q% |
| 01494 | 氟 | 752 | 75'I | 752I | 75II | TZ52 | | | | | |
| 01495 | 泉 | 'B3 | 'B4 | | | | | | | | |
| 01496 | 洋 | 32EI | 323I | | | | | | | | |
| 01497 | 洲 | 3TTT | 330 | 33T | 3+++ | 3[[[ | | | | | |
| 01498 | 洪 | 3HH2 | 3222 | | | | | | | | |
| 01499 | 流 | 3TS3 | 3TSR | | | | | | | | |
| 01500 | 津 | 3EH | 3E2I | 3E=I | 3EI= | 3E20 | 3E++ | 3E[[ | | | |
| 01501 | 洌 | 3-AJ | | | | | | | | | |
| 01502 | 洱 | 3P | 3-4 | | | | | | | | |
| 01503 | 洞 | 3U-O | | | | | | | | | |
| 01504 | 洗 | 3'HR | 3HR | | | | | | | | |
| 01505 | 活 | 3'+O | 3HIO | 3°[O | | | | | | | |
| 01506 | 洽 | 38-O | 38O | | | | | | | | |
| 01507 | 派 | 3L'K | | | | | | | | | |
| 01508 | 洶 | 3CXU | 3CUX | 3'CU | | | | | | | |
| 01509 | 洛 | 3XO | 3'XO | | | | | | | | |
| 01510 | 泵 | TO3I | TO4I | TO3 | TO4 | +3I | +4I | +3 | +4 | +ILL | +J |
| | | [3I | [4I | [3 | [4 | [ILL | [JLL | | | | |
| 01511 | 洹 | 3-B- | 32B | 3=B | | | | | | | |
| 01512 | 洧 | 3+A | 3-'A | 3+'A | 3[A | 3['A | | | | | |
| 01513 | 洸 | 33-R | 33R | | | | | | | | |
| 01514 | 洩 | 3QL' | 3QM | 3BL' | 3BM | | | | | | |
| 01515 | 洮 | 3KKL | 3KK | 32K | | | | | | | |
| 01516 | 洵 | 3'CB | 3CB | | | | | | | | |
| 01517 | 洎 | 3'4 | 3'02 | 3'0= | 3'02 | 3'0= | | | | | |
| 01518 | 洫 | 3'4- | | | | | | | | | |
| 01519 | 炫 | WTN | | | | | | | | | |
| 01520 | 為 | '3S4 | .'S4 | TS4 | T54 | A'S4 | AS4 | A'54 | A54 | | |
| 01521 | 炳 | W-UT | W-A | | | | | | | | |
| 01522 | 炬 | WCC | WE | | | | | | | | |
| 01523 | 炯 | WUO | WA | | | | | | | | |
| 01524 | 炭 | ELW | IULW | \LW | | | | | | | |
| 01525 | 炸 | WTI2 | WTI= | WTK | W'E | | | | | | |
| 01526 | 炮 | WUOL | WUPL | WUCL | WUL | WCOL | WCPL | WCCL | WCL | W'CL | WJO |
| | | WJPL | WJCL | W'JL | | | | | | | |

| | | | | | | | | | | |
|---|---|---|---|---|---|---|---|---|---|---|
| 01527 | 炤 | WDO | WUO | | | | | | | |
| 01528 | 爰 | '3HX | AHX | | | | | | | |
| 01529 | 牲 | 'F'E | 'FE | Z'E | | | | | | |
| 01530 | 牯 | 'F+O | Z+O | 'F[O | Z[O | | | | | |
| 01531 | 牴 | 'FK- | 'FK. | ZK- | ZK. | Z'K- | Z'K. | | | |
| 01532 | 狩 | Z.UJ | ZUJ | | | | | | | |
| 01533 | 狠 | ZBK | | | | | | | | |
| 01534 | 狡 | ZT2X | ZT8X | | | | | | | |
| 01535 | 玷 | ETO | EI-O | | | | | | | |
| 01536 | 珊 | EUU- | E40 | | | | | | | |
| 01537 | 玻 | EUIX | EEX | | | | | | | |
| 01538 | 玲 | E8.S | E8-S | E8S | | | | | | |
| 01539 | 珍 | E83 | E83' | | | | | | | |
| 01540 | 珀 | E'B | | | | | | | | |
| 01541 | 玳 | ETM | | | | | | | | |
| 01542 | 甚 | H2KL | H=KL | H=2L | H22L | H2RL | H=RL | H2L | | |
| 01543 | 甭 | -3UH | -3A | T8UH | | | | | | |
| 01544 | 畏 | Q-K | QK | | | | | | | |
| 01545 | 界 | Q8'I | Q8II | Q82 | | | | | | |
| 01546 | 畎 | QK. | Q.K | | | | | | | |
| 01547 | 畋 | QTX | | | | | | | | |
| 01548 | 疫 | L2RX | LRX | | | | | | | |
| 01549 | 疤 | L2BL | LBL | | | | | | | |
| 01550 | 疥 | L282 | L82 | | | | | | | |
| 01551 | 疢 | .L2W | L2W | LW | | | | | | |
| 01552 | 疣 | L2K. | L2.K | L.K | | | | | | |
| 01553 | 癸 | W'K | W-K | W2T | W=T | WH8 | | | | |
| 01554 | 皆 | FF'B | 2F'B | =F'B | 77'B | 27'B | =7'B | %'B | %B | |
| 01555 | 皇 | 'BE | | | | | | | | |
| 01556 | 皈 | 'BLX | | | | | | | | |
| 01557 | 盈 | 'S4- | S'4- | SX4- | 'S4 | S'4 | SX4 | '34- | '34 | |
| 01558 | 盆 | 8D4- | 2D4- | 8D4 | 2D4 | =D4- | =D4 | | | |
| 01559 | 盃 | -34- | -34 | T84- | T84 | | | | | |
| 01560 | 盅 | OI4- | O4- | OI4 | O4 | OI4- | OI4 | | | |
| 01561 | 省 | 3'4 | I2'4 | I8'4 | J2'4 | J8'4 | | | | |
| 01562 | 盹 | 4-UL | 4+UL | 4-EL | 4+EL | 4. | 4[UL | 4[EL | | |
| 01563 | 相 | YO= | YO= | Y4 | | | | | | |
| 01564 | 眉 | B'4 | PI4 | | | | | | | |
| 01565 | 看 | E'4 | 3'4 | '2'4 | '='4 | | | | | |
| 01566 | 盾 | L+4 | L[4 | | | | | | | |
| 01567 | 盼 | 48D | 42D | | | | | | | |
| 01568 | 眇 | 43' | 43 | | | | | | | |
| 01569 | 矜 | SJ8L | SJ8J | | | | | | | |
| 01570 | 砂 | TO3' | +3' | [3' | | | | | | |
| 01571 | 研 | TOHH | +2HI | +2HH | +222 | +HH | [2HI | [2HH | [222 | [HH |
| 01572 | 砌 | TO7D | +7D | TOFD | +FD | [7D | [FD | | | |
| 01573 | 砍 | TOUT | TO- | +UT | [UT | | | | | |
| 01574 | 祆 | 23'K | 23-K | 232T | 23=T | -Y'K | -Y-K | -Y2T | -Y=T | =3'K =3-K =3=T |
| 01575 | 祉 | 23G | =3G | -YG | -Y-G | KG | | | | |
| 01576 | 祈 | 23LT | 23T | -YLT | -YT | KLT | KT | =3LT | =3T | |
| 01577 | 祇 | 23CM | -YCM | 23'K | 23K | -Y'K | -YK | =3CM | =3'K | =3K |
| 01578 | 禹 | 'OUS | 'OA | 'OUS | 'OA | | | | | |
| 01579 | 禺 | QUS | | | | | | | | |
| 01580 | 科 | 'Y2+ | 'Y=+ | '2+ | '=+ | 'Y2[ | 'Y=[ | '2[ | '=[ | |
| 01581 | 秒 | 'Y3' | '3' | | | | | | | |
| 01582 | 秋 | 'YW | 'W | | | | | | | |
| 01583 | 穿 | .UCJ | U2CJ | U8CJ | URCJ | UCJ' | UCJ | | | |
| 01584 | 突 | .U.K | .UK. | .UK | U.K | UK. | .U2K | .U8K | .URK | U2K. U8K. URK. U2.K U8.K UR.K U2K U8K URK |
| 01585 | 竿 | FFHI | FF2I | FF=I | FF-+ | FF-[ | /HI | /2I | /=I | /-+ /-[ |
| 01586 | 竽 | FF2J | FF=J | FFHJ | /2J | /=J | /HJ | | | |
| 01587 | 籽 | 2YZ- | =YZ- | | | | | | | |
| 01588 | 紂 | N3J. | N3J | NJ. | | | | | | |
| 01589 | 紅 | N3H | NH | | | | | | | |
| 01590 | 紀 | N3CL | NCL | | | | | | | |
| 01591 | 紉 | N3D. | N3D | ND. | ND' | ND | | | | |
| 01592 | 紇 | N3TZ | NTZ | | | | | | | |
| 01593 | 約 | N3C | N'C. | NC. | | | | | | |
| 01594 | 紆 | N32J | N3=J | N3HJ | N2J | N=J | | | | |
| 01595 | 缸 | 'HEH | HEH | | | | | | | |
| 01596 | 美 | 2EK | =EK | | | | | | | |
| 01597 | 羿 | EE20 | EE++ | EEH | 2E20 | 2E++ | =E20 | =E++ | 2C2H | =C2H EE 2E[[ =E[[ |

| | | | | | | | | | | | |
|---|---|---|---|---|---|---|---|---|---|---|---|
| 01598 | 耐 | TAJ. | TAJ | TU2J | | | | | | | |
| 01599 | 耍 | TAV | TU2V | | | | | | | | |
| 01600 | 耑 | ETAI | ETA | ETU2 | IUTA | \TAI | \TA | \MI | \M | | |
| 01601 | 耶 | -4P | 4P | | | | | | | | |
| 01602 | 胖 | A220 | A2++ | A22I | A2=I | A2H | A2X | A2[[ | | | |
| 01603 | 胥 | LGA | JGA | | | | | | | | |
| 01604 | 胚 | A-3- | A23 | A=3 | | | | | | | |
| 01605 | 胃 | QA | | | | | | | | | |
| 01606 | 胄 | 98A3 | | | | | | | | | |
| 01607 | 背 | F'LA | FL'A | F-LA | FL-A | 'LFA | L'FA | L-FA | -LFA | FFA | 2FA |
| | | 7'LA | 7L'A | 7L-A | 7-LA | 'L7A | L'7A | L-7A | -L7A | 77A | 27A |
| | | =FA | =7A | | | | | | | | |
| 01608 | 胡 | +OA | [OA | | | | | | | | |
| 01609 | 胛 | AQI | | | | | | | | | |
| 01610 | 胎 | ASO | | | | | | | | | |
| 01611 | 胞 | AUOL | AUPL | AUCL | ACOL | ACPL | ACCL | A'CL | AJOL | AJPL | AJC |
| | | A'JL | | | | | | | | | |
| 01612 | 胤 | 'NAL | | | | | | | | | |
| 01613 | 胝 | AK- | AK. | A'K- | A'K. | | | | | | |
| 01614 | 致 | SHTX | | | | | | | | | |
| 01615 | 舢 | 'AIU | A-IU | AIU | 'A-E | 'A-\ | 'A\ | A-\ | A\ | | |
| 01616 | 苧 | ++UJ | HU-J | HUJ | XU-J | XUJ | [[UJ | | | | |
| 01617 | 范 | H3JL | H3CL | X3JL | X3CL | X3L | [[3L | | | | |
| 01618 | 茅 | ++SJ | HSJJ | HSJ' | XSJJ | XSJ' | XSJ | [[SJ | | | |
| 01619 | 苣 | ++CC | ++E | HCC | XCC | [[CC | [[E | | | | |
| 01620 | 苛 | ++JO | HJO | XJO | [[JO | | | | | | |
| 01621 | 苦 | +++O | H+O | X+O | [[[O | H[O | X[O | | | | |
| 01622 | 茄 | ++CO | HCO | HC'O | XCO | XC'O | HJ'O | XJ'O | [[CO | | |
| 01623 | 若 | +++O | H-'O | H+'O | H+O | X-'O | X+'O | X+O | [[[O | H['O | H[O |
| | | X['O | X[O | | | | | | | | |
| 01624 | 茂 | ++'M | ++LM | HLM | H'M | XLM | X'M | [['M | [[LM | | |
| 01625 | 茉 | ++Y+ | +++Y | ++Y | HY+ | H+Y | HY | XY+ | X+Y | XY | [[Y |
| | | [[+Y | [[Y | HY[ | H[Y | XY[ | X[Y | | | | |
| 01626 | 苒 | ++UH | HUH | XUH | [[UH | | | | | | |
| 01627 | 苗 | ++Q | HQ | XQ | [[Q | | | | | | |
| 01628 | 英 | ++UK | HUK | XUK | [[UK | | | | | | |
| 01629 | 茁 | HUIU | HIUU | XUIU | XIUU | [[EE | [[2E | ++\\ | [[\\ | H\\ | X\\ |
| | | ++2\ | [[2\ | H2\ | X2\ | | | | | | |
| 01630 | 苜 | ++4 | ++O2 | ++O= | HO2 | HO= | HO2 | HO= | H4 | XO2 | XO= |
| | | XO2 | XO= | X4 | [[4 | [[O2 | [[O= | | | | |
| 01631 | 苔 | ++SO | HSO | XSO | [[SO | | | | | | |
| 01632 | 苑 | ++AL | HAJL | HACL | HAL | XAJL | XACL | XAL | [[AL | | |
| 01633 | 苞 | ++UL | HUOL | HUPL | HUCL | HUL | HCOL | HCPL | HCCL | H'CL | XU |
| | | XUPL | XUCL | XUL | XCOL | XCPL | XCCL | X'CL | HJOL | HJPL | HJ |
| | | H'JL | XJOL | XJPL | XJCL | X'JL | [[UL | [[CL | | | |
| 01634 | 苓 | ++8S | H8.S | H8-S | X8.S | X8-S | X8S | [[8S | | | |
| 01635 | 苟 | ++CO | HCO | H'CO | XCO | X'CO | H'JO | X'JO | [[CO | | |
| 01636 | 苯 | ++Y- | ++Y | HY- | HY | XY- | XY | [[Y- | [[Y | | |
| 01637 | 茆 | ++PP | ++2P | HC'P | HPP | H2P | XC'P | XPP | X2P | [[PP | [[ |
| 01638 | 虐 | TU7E | T7E | U7E | | | | | | | |
| 01639 | 虹 | OSH | OSH | | | | | | | | |
| 01640 | 虻 | OS.C | OSTL | OSC | S.C | STL | SC | OS.C | OSTL | OSC | |
| 01641 | 虺 | -ROS | -RS | ROS | -ROS | ROS | | | | | |
| 01642 | 衍 | 'T3J | T32J | T3=J | T3J | ]32J | ]3=J | ]3J | | | |
| 01643 | 衫 | K3' | K3 | | | | | | | | |
| 01644 | 要 | -4V | 4V | | | | | | | | |
| 01645 | 觔 | UAC | UAC' | UUHC | | | | | | | |
| 01646 | 計 | T20+ | T=0+ | 40+ | ;+ | T20[ | T=0[ | 40[ | ;[ | & | |
| 01647 | 訂 | 40-J | 40J | ;-J | ;J | | | | | | |
| 01648 | 訃 | 40T | ;I. | ;T | | | | | | | |
| 01649 | 貞 | T42 | T48 | I-42 | I-48 | | | | | | |
| 01650 | 負 | D48 | U48 | D42 | U42 | | | | | | |
| 01651 | 赴 | HGT | HGI. | | | | | | | | |
| 01652 | 赳 | HGLI | HGUI | GLI | GUI | | | | | | |
| 01653 | 趴 | OG8 | G8 | | | | | | | | |
| 01654 | 軍 | U+Q+ | UHQ | UQ | U[Q[ | | | | | | |
| 01655 | 軌 | +Q+9 | HQ9 | Q9 | [Q[9 | | | | | | |
| 01656 | 述 | Y.Z | .YZ | | | | | | | | |
| 01657 | 迦 | C'OZ | COZ | J'OZ | | | | | | | |
| 01658 | 迢 | DOZ | UOZ | | | | | | | | |
| 01659 | 迪 | IQZ | | | | | | | | | |
| 01660 | 迥 | UOZ | | | | | | | | | |
| 01661 | 迭 | TKZ | '+KZ | '-KZ | '2TZ | '=TZ | 'H2Z | 'H8Z | '[KZ | | |

| | | |
|---|---|---|
| 01662 | 迫 | 'BZ |
| 01663 | 迭 | TJLZ TLLZ T+LZ T[LZ |
| 01664 | 迪 | SOZ |
| 01665 | 郊 | T2XP T8XP |
| 01666 | 郎 | -BSP .BSP -BFP .BFP -B7P .B7P |
| 01667 | 郁 | +AP -'AP +'AP [AP ['AP |
| 01668 | 郃 | 8-OP 8OP- 8OP 803I |
| 01669 | 酋 | 29 KQ =9 |
| 01670 | 酊 | -Q-J -QJ 9-J 9J |
| 01671 | 重 | '-QH '+QH HQH '[QH |
| 01672 | 閂 | PP- M- |
| 01673 | 限 | PBK |
| 01674 | 陋 | P-AL PAL |
| 01675 | 陌 | PTB P-'B |
| 01676 | 降 | P'XH PXH |
| 01677 | 面 | TOH |
| 01678 | 革 | 200+ 200+ HO+ HO+ =00+ =00+ 200[ 200[ HO[ HO[ =00[ =00[ |
| 01679 | 韋 | HOH |
| 01680 | 韭 | EE- 2E- =E- |
| 01681 | 音 | TKB T2-B |
| 01682 | 頁 | T42 T48 -'42 -'48 -I42 -I48 |
| 01683 | 風 | R-S RS R-OS R-OS R'S R'OS R'OS |
| 01684 | 飛 | ZZ'H ZZH ZZTI KK'H KKH KKTI ZL'H LK'H |
| 01685 | 食 | 8-BK 8.BK 8BK |
| 01686 | 首 | 2T4 K'4 K4 =T4 |
| 01687 | 香 | 'YB |
| 01688 | 乘 | 'YFF 'Y77 'FF '77 ※ 'YFI 'Y7I |
| 01689 | 亳 | TOUL TUHL |
| 01690 | 倌 | T.UB TUB TUOO |
| 01691 | 倍 | TTKO |
| 01692 | 倣 | TTDX |
| 01693 | 俯 | TLTJ TLJ |
| 01694 | 倦 | T2HL T2L |
| 01695 | 倥 | TU2H TU8H TURH |
| 01696 | 俸 | T3TH TE8H TEH |
| 01697 | 倩 | TEA TIEA |
| 01698 | 倖 | TH2H |
| 01699 | 倆 | TTUT TTA |
| 01700 | 值 | T+4L T+4- T[4L T[4- TI |
| 01701 | 借 | THHB T22B THB |
| 01702 | 倚 | TKJO TKJ |
| 01703 | 倒 | TSHJ \ |
| 01704 | 們 | TPP |
| 01705 | 俺 | TKQL |
| 01706 | 倀 | TE-K TEK |
| 01707 | 倔 | TPEE TP2E |
| 01708 | 倨 | TP+O TP[O |
| 01709 | 俱 | T4K T4-2 T4-8 TAK |
| 01710 | 倡 | TBB T2B |
| 01711 | 個 | TO+O TO+O TO[O TO[O |
| 01712 | 候 | TICK TIC- |
| 01713 | 倘 | T3UO |
| 01714 | 俳 | TEE T2E |
| 01715 | 修 | TIX3 T'X3 TX3 |
| 01716 | 倭 | T'YV TYV T'V |
| 01717 | 倪 | TEER T2ER T;R |
| 01718 | 俾 | T'Q4 T'Q+ TQ4 TQ'+ TQ+ T'Q[ TQ'[ TQ[ |
| 01719 | 倫 | T8-A |
| 01720 | 倉 | 8-EO 8.EO 8E'O 8EO |
| 01721 | 兼 | KE22 KE28 KE4 |
| 01722 | 冤 | UDBR UUBR UDR |
| 01723 | 冥 | UB6 UBT2 UBT8 |
| 01724 | 冢 | UZ. |
| 01725 | 凍 | 2YQ 2YB =YQ =YB |
| 01726 | 凌 | 2H2X 2H8X 2HRX 2HX =H2X =H8X =HRX =HX |
| 01727 | 准 | 2THH 2T.E 2TTE 2TE 2:E 2E =THH =T.E =TTE =TE ='E =E |
| 01728 | 凋 | 2UHO =UHO |
| 01729 | 剖 | TKOJ TOIJ |
| 01730 | 剜 | UALJ |
| 01731 | 剔 | BC2J BCJ BC=J |
| 01732 | 剛 | UKEJ UEIJ |

01733 剉 O-3J O3J O-4J O4J
01734 匪 CEE C2E
01735 卿 PBFP PBSP PB7P
01736 原 L'B3 LB3
01737 厝 LHHB L22B LHB
01738 叟 EIEX ;IX ;X
01739 哨 O3A
01740 唐 .LEO LEIO LEO
01741 唁 OT2O OT=O O;
01742 唷 OTSA
01743 哼 OTOZ
01744 哥 JOJO 2JO =JO
01745 哲 FLTO
01746 唆 OS2X OS8X OSRX
01747 哺 O•A. O•A O|A. O|A
01748 唔 O5O
01749 哩 OQH OQIH
01750 哭 OO.K OOK. 2O.K 2OK. 2OK =O.K =OK. =OK
01751 員 O42I O48I O42 O48
01752 唉 OSTK OS-
01753 哮 OH'Z OHZ
01754 哪 OAP OU2P OU=P
01755 哦 O'FM OFM
01756 唧 OBFP OBSP OB7P
01757 唇 L2KO L=KO LKO
01758 哽 O-QX OTQX O-BX OTBX
01759 唏 OX+E OXE OX[E
01760 圃 O+A. O[A.
01761 圄 O5O
01762 埂 H-QX HTQX H-BX HTBX IH-X IHTX
01763 埔 H+A. IH+A H[A.
01764 埋 HQH HQIH IHQH
01765 埃 HSTK HSK HS-
01766 堉 HTSA
01767 夏 T4'X T4X
01768 套 KE-S KES
01769 奘 UUHK ULHK UTHK KHK
01770 奚 '3NK ANK
01771 娑 33'V 33V
01772 娘 V-BK V.BK VBK
01773 娜 VAP VU2P VU=P
01774 娟 VOA
01775 娛 VONK
01776 娓 VPEL VP3L
01777 姬 VC2O VC2C VC=O VC=C
01778 娠 VL2K VL=K VLK
01779 娣 V25J V=5J
01780 娩 VDBR VUBR VDR VUR
01781 娥 V'FM VFM
01782 娌 VQH VQIH
01783 娉 VIQS VQS VIQ5 VQ5 VQ-C VQTC
01784 孫 Z'N3 Z'N Z''N Z-N3 ZN3 Z-N Z-'N
01785 屘 PELZ P3LZ PLZ- PLZ
01786 宰 UT2H
01787 害 .UEO .UO UEO
01788 家 .UZ UZL UZ
01789 宴 .UBV UBV
01790 宮 .UOO UO'O UOIO UOO
01791 宵 .U3A U3A
01792 容 .U4O U22O U28O U88O U4O
01793 宸 .ULK UL2K UL=K
01794 射 '4JJ 4JJ. 4JJ
01795 屑 P3A
01796 展 PHHK P22K PHK
01797 屐 PT+X P'TX P]+X P]X PT[X P][X
01798 峭 E3A IU3A \3A
01799 峽 EKTT EK2T EKT E-3T IUKT \KTT \K2T \-3T \KT
01800 峻 ES2X ES8X ESRX \S2X \S8X \SRX
01801 峪 E22O E88O E28O E4O IU4O \22O \88O \28O \4O
01802 峨 IUFM E'FM EFM \'FM \FM
01803 峰 E'XE EXE EX3I EX3O EX3+ IUXE EX3[ \'XE \XE \X3 \X3O \X3+ \X3[
01804 島 'BSE 'B5E BSE B5E BSIU B5IU 'BS\ 'B5\ BS\ B5\

01805 峽 IUHT EHUT EH- \HUT \H-
01806 峴 IU4R
01807 差 2E'H 2EH 23'H =E'H =EH =3'H
01808 席 L2OE .LHE LHUI LHE
01809 師 'B-E 'BTE 'BTU B-E BTE
01810 庫 .LHQ .LQ
01811 庭 .LEZ LEZ
01812 座 LTTH L2IH .LTH
01813 弱 5252 252 5=5= 25=
01814 徒 'THG ]HG
01815 徑 'T3H 'TXH ]-3H ]3H ]XH
01816 徐 'T8Y 'T8' T8-Y T823 T8=3 T8H3 T8Y T8' ]8-Y ]82
]8=3 ]8H3 ]8Y ]8'
01817 恙 2EG =EG
01818 恣 2UTG 2-G =UTG =-G
01819 恥 -4G
01820 恐 HR.G HRG
01821 恕 VOG
01822 恭 HH8G 228G HH84 2284 ==8G ==84
01823 恩 OKG OKG
01824 息 '4G
01825 悄 I23A I3A
01826 悟 I25O I5O
01827 悚 I2YO I2YO IYO IYO
01828 悍 I2BH IBHI IB2I IB=I IB-+ IB-[
01829 悔 I2TQ ITQ- ITQ
01830 悌 I25J I2J'
01831 悅 I2OR
01832 悖 I2+Z I+UZ I2[Z I[UZ
01833 扇 'PEE 'P2E .PEE .P2E
01834 拳 2H8J 2H8F 2HEJ 2H3J =H8J =H8F =HEJ =H3J 'P2 .P2
01835 挈 EDEJ ED3J EDF
01836 拿 8-OJ 8-OF 8OF 8OEJ 8O3J 8OJ
01837 捎 F3A
01838 挾 FKTT FK2T FKT F-3T
01839 振 FL2K FL=K
01840 捕 F+A. F+A F[A. F[A
01841 捂 F5O
01842 捆 FOY
01843 捏 FPEL FP3L FPL
01844 捉 FOG FOTT
01845 挺 FEZ
01846 捐 FOA
01847 挽 FDBR FUBR
01848 挪 FAP FU2P FU=P
01849 挫 FTTH F2TH
01850 挨 FSTK FSK FS-
01851 捍 FBHI FB2I FB=I FB-+ FBH FB-[
01852 捌 FODJ FOUJ FO8 F8
01853 效 T2XX T8XX TXTX
01854 敉 2YTX =YTX
01855 料 2Y2+ 2Y=+ =Y2+ =Y=+ 2Y2[ 2Y=[ =Y2[ =Y=[
01856 旁 TUTD T2UD TUD
01857 旅 TDTK DT'K DTK
01858 時 BHJ. BHJ BIHJ
01859 晉 2SSB =SSB 22SB =2SB ==SB 2SB =SB
01860 晏 B.UV BUV
01861 晃 B3-R B3R
01862 晒 B-4 B-O2 B-O8 B-OR B-O2 B-O8 B-OR
01863 晌 B'UO B'A- B'A
01864 晅 B-B- B2B B=B
01865 晁 BKKL BKK B2K
01866 書 EHIB EIHB E2IB E=IB EHB
01867 朔 KU'A KE'A KEA
01868 朕 A2-K A22T A2=T A2H8 A8-K A82T A8=T A8H8 A8K
01869 朗 -BSA .BSA BSA -BFA .BFA BFA -B7A .B7A B7A
01870 校 YT2X YT8X
01871 核 YTUT
01872 案 .UVY UVY
01873 框 YCE
01874 桓 Y-B- Y2B Y=B
01875 根 YBK

| | | |
|---|---|---|
| 01876 | 桂 | YHH Y2IH |
| 01877 | 桔 | Y+-O YIHO YHO Y[-O |
| 01878 | 栩 | Y2J2 Y2C2 YEE Y2E Y2 |
| 01879 | 梳 | YTS3 YT3 YTSR |
| 01880 | 栗 | -4Y 4Y |
| 01881 | 桌 | TBY I-BY |
| 01882 | 桑 | 3XY XXXY |
| 01883 | 栽 | HYM HMY |
| 01884 | 柴 | GFY G7Y |
| 01885 | 桐 | YU-O YUO |
| 01886 | 桀 | AHY ACIY |
| 01887 | 格 | YXO Y'XO |
| 01888 | 桃 | YKKL YKK Y2K |
| 01889 | 株 | Y'+Y Y'-Y YTY Y'[Y |
| 01890 | 桅 | YULL YUL |
| 01891 | 栓 | Y8E |
| 01892 | 栘 | Y2U. Y2C. YAA Y2A |
| 01893 | 桁 | Y'TJ YT2J YT=J Y]2J Y]=J Y]J |
| 01894 | 殊 | -ATY -AY A'-Y A'+Y ATY A'[Y |
| 01895 | 殉 | -ACB ACB A'CB |
| 01896 | 殷 | BDRX BURX |
| 01897 | 氣 | 72Y TZ2Y TL2Y |
| 01898 | 氧 | 72EI TZ2E TL2E |
| 01899 | 氨 | 7.UV 7UV TZUV TLUV |
| 01900 | 氦 | 7TUT 7TT TZTT TLTT |
| 01901 | 氤 | 7OK TZOK TLOK 7OK TZOK TLOK |
| 01902 | 泰 | E8I4 3TI4 E8J4 3TJ4 E83 E84 3T3 3T4 |
| 01903 | 浪 | 3-BK 3.BK 3BK |
| 01904 | 涕 | 325J 32J' |
| 01905 | 消 | 33A |
| 01906 | 涇 | 3-3H 33H |
| 01907 | 浦 | 3+A. 3[A. |
| 01908 | 浸 | 3EUX |
| 01909 | 海 | 3TQ- |
| 01910 | 浙 | 3FLT 3FT |
| 01911 | 涓 | 3OA |
| 01912 | 浬 | 3QH 3QIH |
| 01913 | 涉 | 3G3' 3G3 |
| 01914 | 浮 | 3'3Z 3AZ- 3AZ |
| 01915 | 浚 | 3S2X 3S8X 3SRX |
| 01916 | 浴 | 3220 3880 3280 340 |
| 01917 | 浩 | 3'HO |
| 01918 | 涌 | 3SUH 3SA |
| 01919 | 涊 | 3D.G 3D'G 3DG |
| 01920 | 浹 | 3KTT 3K2T 3KT 3-3T |
| 01921 | 涅 | 3BH |
| 01922 | 浥 | 3OBL |
| 01923 | 涔 | 3E8L 3E8J |
| 01924 | 烊 | W2EI W23I W2E |
| 01925 | 烘 | WHH2 WHH8 WH2- WH8- WH2 WH8 W222 W228 |
| 01926 | 烤 | WH'5 WH'S WH5 WHS |
| 01927 | 烙 | W'XO WXO |
| 01928 | 烈 | -AJ4 AIJ4 AJ4 -AJW AIJW AJW |
| 01929 | 烏 | 'OS4 OS4 'O54 O54 |
| 01930 | 爹 | 8XAA 8X2A 2XAA 2X2A =XAA =X2A |
| 01931 | 特 | 'FHJ ZHJ. ZIHJ ZHJ |
| 01932 | 狼 | Z-BK Z.BK |
| 01933 | 狹 | ZKTT ZK2T ZKT Z-3T |
| 01934 | 狽 | Z42 Z48 |
| 01935 | 狸 | ZQH ZQIH |
| 01936 | 狷 | ZOA |
| 01937 | 玆 | ++NN ++2N HNN H2N KNN K2N XNN X2N [[NN [[2I |
| 01938 | 班 | E.'E ETE |
| 01939 | 琉 | ETS3 ET3 |
| 01940 | 珮 | ER-E ERTE ERE |
| 01941 | 珠 | E'-Y E'+Y ETY E'[Y |
| 01942 | 珪 | EHH E2IH E2H |
| 01943 | 珞 | E'XO EXO |
| 01944 | 畔 | Q220 Q22I Q2=I Q2++ Q2HI Q2[[ |
| 01945 | 畝 | TQU. TQ9 TQC. |
| 01946 | 畜 | TNQ |
| 01947 | 畚 | SKQ |
| 01948 | 留 | SDQ |

| | | | | | | | | | | | |
|---|---|---|---|---|---|---|---|---|---|---|---|
| 01949 | 疾 | L2TK | L2- | L'-K | L'2T | L'=T | L'H8 | | | | |
| 01950 | 病 | L2-A | | | | | | | | | |
| 01951 | 症 | L2-G | L2G | L-G | | | | | | | |
| 01952 | 疲 | L2EX | LUIX | LEX | | | | | | | |
| 01953 | 痔 | L2H2 | L2H= | LH2 | LH= | | | | | | |
| 01954 | 疸 | L2A- | L24- | L24 | LA- | | | | | | |
| 01955 | 疹 | L2X2 | L2X= | LX2 | LX= | | | | | | |
| 01956 | 痧 | L283 | L83 | | | | | | | | |
| 01957 | 痂 | L2CO | LC'O | LJ'O | | | | | | | |
| 01958 | 疽 | L2B- | LB- | | | | | | | | |
| 01959 | 皐 | 'BY- | BY- | 'BK+ | BK+ | 'BY | 'BK[ | BK[ | | | |
| 01960 | 皰 | EXDL | EXUL | | | | | | | | |
| 01961 | 益 | 224- | 884- | 284- | 2-24 | 2-84 | 8-84 | 2K4 | 2K24 | 2K84 | 884- |
| | | 34- | 44- | =-24 | =-84 | =K4 | =K24 | =K84 | | | |
| 01962 | 盒 | HS4- | HS4 | IHS4 | | | | | | | |
| 01963 | 盃 | UK4- | UK4 | | | | | | | | |
| 01964 | 眩 | 4TN | | | | | | | | | |
| 01965 | 眞 | F4L2 | F4L8 | F4K | +4L2 | +4L8 | +4K | 74L2 | 74L8 | 74K | [4L2 |
| | | [4L8 | [4K | | | | | | | | |
| 01966 | 眠 | 4OK- | 4OK | 4CK- | 4CK | 4OLM | 4CLM | | | | |
| 01967 | 眨 | 4'.Z | 4TZ | 4'Z | | | | | | | |
| 01968 | 矩 | TKCC | TKE | | | | | | | | |
| 01969 | 砰 | TOK+ | +K+ | +H2I | +HI2 | +-2+ | +H8I | +HI8 | +-8+ | TOK[ | [K[ |
| | | [H2I | [HI2 | [-2[ | [H8I | [HI8 | [-8[ | | | | |
| 01970 | 砧 | TOTO | +TO | +I-O | [TO | [I-O | | | | | |
| 01971 | 硒 | TOCE | +CE | [CE | | | | | | | |
| 01972 | 砝 | TOHS | +IHS | +HS | [IHS | [HS | | | | | |
| 01973 | 破 | TOEX | +EX | [EX | | | | | | | |
| 01974 | 砷 | TOBI | TOO | +IQI | +BI | +O | [IQI | [BI | [O | | |
| 01975 | 砥 | TOK- | TOK. | +K- | +K. | +'K- | +'K. | [K- | [K. | ['K- | ['K |
| 01976 | 砭 | TOTZ | TO'Z | +TZ | +'Z | [TZ | ['Z | | | | |
| 01977 | 砠 | TOA- | TO4- | +A- | [A- | | | | | | |
| 01978 | 砟 | TOTK | TO'E | +TI2 | +TI= | +TK | [TI2 | [TI= | [TK | | |
| 01979 | 砲 | +UOL | +UPL | +UCL | +COL | +CPL | +CCL | +'CL | +JOL | +JPL | +JC |
| | | +'JL | [UOL | [UPL | [UCL | [COL | [CPL | [CCL | ['CL | [JOL | [JP |
| | | [JCL | ['JL | | | | | | | | |
| 01980 | 祕 | =3G' | 23G' | -YG' | KG' | | | | | | |
| 01981 | 祐 | =3+O | 23+O | -Y+O | K-'O | K+O | K+'O | =3[O | 23[O | -Y[O | K[O |
| | | K['O | | | | | | | | | |
| 01982 | 祠 | =3CO | 23CO | -YCO | KC-O | =3JO | 23JO | -YJO | KJ-O | | |
| 01983 | 祟 | EE23 | =E23 | =E=3 | 2E23 | EE3 | =E3 | 2E3 | EE-Y | =E-Y | 2E- |
| 01984 | 祖 | =3A- | =34- | =34 | 23A- | 234- | 234 | -YA- | -Y4- | KA- | |
| 01985 | 神 | =3BI | 23BI | -YBI | KBI | KIQI | KQI | | | | |
| 01986 | 祝 | =3OR | 23OR | -YOR | KOR | | | | | | |
| 01987 | 祗 | =3K- | =3K. | 23K- | 23K. | -YK- | -YK. | KK- | KK. | K'K- | K'K |
| 01988 | 祚 | =3TK | =3'K | 23TK | 23'E | -YTK | -Y'E | KTI2 | KTI= | KTK | K'E |
| 01989 | 秤 | 'YK+ | 'YH2 | 'H2I | '2HI | 'H2 | 'YK[ | | | | |
| 01990 | 秣 | 'YY+ | 'YY- | 'Y-Y | 'Y+Y | 'Y+ | 'YY[ | 'Y[Y | 'Y[ | | |
| 01991 | 秧 | 'YUK | 'UK | | | | | | | | |
| 01992 | 租 | 'YA- | 'A- | | | | | | | | |
| 01993 | 秉 | E8'Y | E8-Y | E8Y | 3T'Y | 3T-Y | E8' | 3T' | | | |
| 01994 | 秩 | 'YTK | 'Y2T | 'Y=T | 'YH8 | 'Y- | 'TK | '2T | '=T | 'H8 | '- |
| 01995 | 秘 | 'YG' | 'YG | 'G' | 'G | | | | | | |
| 01996 | 窄 | .UTK | .U'E | U2TK | U8TK | U2'E | U8'E | | | | |
| 01997 | 窈 | .UNC | U2NC | U8NC | UNC' | UNC | | | | | |
| 01998 | 站 | TKTO | | | | | | | | | |
| 01999 | 笆 | FFBL | /BL | | | | | | | | |
| 02000 | 笑 | FF'K | FF-K | FF2T | FF=T | FFK | /'K | /-K | /'-T | | |
| 02001 | 粉 | 2Y8D | 2Y2D | =Y8D | =Y=D | =Y2D | | | | | |
| 02002 | 紡 | N3TD | NTD | N3D | ND | | | | | | |
| 02003 | 紗 | N33' | N3' | | | | | | | | |
| 02004 | 紋 | N3TX | NTX | | | | | | | | |
| 02005 | 紊 | TXN3 | TXN | | | | | | | | |
| 02006 | 素 | EN3 | IEN3 | IEN | EN | | | | | | |
| 02007 | 索 | +UN3 | +UN | [UN3 | [UN | | | | | | |
| 02008 | 純 | N3-L | N3+L | N3. | N-UL | N+UL | N-EL | N+EL | N-L | N+L | N. |
| | | N3[L | N[UL | N[EL | N[L | | | | | | |
| 02009 | 紐 | N3C+ | N3EI | NC+ | NEI | N3C[ | NC[ | | | | |
| 02010 | 紕 | N3FF | N32F | NFF | N2F | N377 | N327 | N77 | N27 | N3% | N% |
| 02011 | 級 | N3'S | N3ST | N3SX | N3S | N3'3 | N33T | N33X | N'S. | NS'. | NST |
| | | NSX | N'3. | N3'. | | | | | | | |
| 02012 | 紜 | N32S | N3=S | N2S | N=S | | | | | | |
| 02013 | 納 | N3UT | N3A | NUT | NA | | | | | | |

| | | | | | | | | | | | |
|---|---|---|---|---|---|---|---|---|---|---|---|
| 02014 | 紙 | N3'K | N3K | N'K | NK | | | | | | |
| 02015 | 紛 | N38D | N32D | N8D | N2D | | | | | | |
| 02016 | 缺 | HELK | | | | | | | | | |
| 02017 | 罟 | 4+O | 4[O | | | | | | | | |
| 02018 | 羔 | 2E4 | =E4 | | | | | | | | |
| 02019 | 翅 | +XEE | +X2E | +X2 | [XEE | [X2E | [X2 | | | | |
| 02020 | 翁 | 2SEE | 2S2E | 8SEE | 8S2E | =SEE | =S=E | =S2E | 2S2 | 8S2 | |
| 02021 | 耆 | H'FB | HFB | H'7B | H7B | | | | | | |
| 02022 | 耄 | H'FL | HFEL | HF3L | HFL | H'7L | H7EL | H73L | H7L | | |
| 02023 | 耘 | 2Y2S | 2Y=S | =Y2S | =Y=S | | | | | | |
| 02024 | 耕 | 2YHH | =YHH | 2YH | =YH | 2Y22 | =Y22 | =Y== | 2Y# | =Y# | |
| 02025 | 耙 | 2YBL | =YBL | | | | | | | | |
| 02026 | 耗 | 2YEL | 2Y3L | =YEL | =Y3L | | | | | | |
| 02027 | 耽 | -4UR | -4ER | PUR | PER | | | | | | |
| 02028 | 耿 | -4W | PW | | | | | | | | |
| 02029 | 胱 | A3-R | A3R | | | | | | | | |
| 02030 | 脂 | AFB | A7B | | | | | | | | |
| 02031 | 胰 | AK5 | A-5T | A+5T | A[5T | | | | | | |
| 02032 | 脅 | CCCA | 3C'A | 3CA | | | | | | | |
| 02033 | 胭 | AOK | AOK | | | | | | | | |
| 02034 | 胴 | AU-O | | | | | | | | | |
| 02035 | 脆 | AULL | AUJL | | | | | | | | |
| 02036 | 胸 | ACXU | ACUX | ACU | A'CU | | | | | | |
| 02037 | 胳 | AXO | A'XO | | | | | | | | |
| 02038 | 脈 | ALK | AL'K | | | | | | | | |
| 02039 | 能 | SAFF | SA2F | SA77 | SA27 | SAF | SA7 | SA2 | | | |
| 02040 | 脊 | 4TA | 22TA | ==TA | | | | | | | |
| 02041 | 胼 | A2HH | A222 | | | | | | | | |
| 02042 | 胯 | AK-S | AK-5 | AK2C | AK=C | AK2J | AK=J | AKS | AKC | | |
| 02043 | 臭 | '4.K | '4K. | '4K | | | | | | | |
| 02044 | 臬 | '4Y | | | | | | | | | |
| 02045 | 舀 | '3EE | '3; | A; | | | | | | | |
| 02046 | 舐 | HOK- | HOK. | | | | | | | | |
| 02047 | 航 | 'ATR | A-TR | | | | | | | | |
| 02048 | 舫 | 'ATD | A-TD | | | | | | | | |
| 02049 | 舨 | 'ALX | A-LX | | | | | | | | |
| 02050 | 般 | 'ARX | A-RX | | | | | | | | |
| 02051 | 芻 | CECE | 2CE | =CE | | | | | | | |
| 02052 | 茫 | H3.C | H3TL | | | | | | | | |
| 02053 | 荒 | ++C3 | HTL3 | H.C3 | HC3 | ++CR | HTLR | H.CR | HCR | XTL3 | X.C: |
| | | XC3 | XTLR | X.CR | XCR | [[C3 | [[CR | | | | |
| 02054 | 荔 | ++3C | HCCC | H3C | H3C' | XCCC | X3C | X3C' | [[3C | | |
| 02055 | 荊 | HHHJ | H22J | H=2J | H==J | XHHJ | X22J | X=2J | X==J | | |
| 02056 | 茸 | ++-4 | ++P | H-4 | X-4 | XP | [[-4 | [[P | | | |
| 02057 | 荐 | +++Z | H+IZ | H+Z | H-TZ | X+IZ | X+Z | X-TZ | [[[Z | H[IZ | H[Z |
| | | X[IZ | X[Z | | | | | | | | |
| 02058 | 草 | ++B+ | HB+ | XB+ | [[B[ | HB[ | XB[ | | | | |
| 02059 | 茵 | ++OK | HOK | XOK | [[OK | | | | | | |
| 02060 | 茴 | ++OO | HOO | XOO | [[OO | | | | | | |
| 02061 | 荏 | ++TE | HTE | HT'H | XTE | XT'H | [[TE | | | | |
| 02062 | 茲 | 9BDB | | | | | | | | | |
| 02063 | 茹 | ++VO | HVO | XVO | [[VO | | | | | | |
| 02064 | 茶 | ++8Y | H8Y | X8Y | [[8Y | | | | | | |
| 02065 | 茗 | ++AO | HAO | HU.O | HC.O | XAO | XU.O | XC.O | [[AO | | |
| 02066 | 荀 | ++CB | HCB | H'CB | XCB | X'CB | [[CB | | | | |
| 02067 | 茱 | ++TY | H'-Y | H'+Y | HTY | X'-Y | X'+Y | XTY | [[TY | H'[Y | X'[Y |
| 02068 | 茨 | ++2- | H2UT | H2- | X2UT | X2- | [[2- | | | | |
| 02069 | 荃 | ++8E | H8E | X8E | [[8E | | | | | | |
| 02070 | 虔 | TU7X | T7TX | U7TX | | | | | | | |
| 02071 | 蚊 | OSTX | STX | OSTX | | | | | | | |
| 02072 | 蚪 | OS2+ | OS=+ | S2+ | S=+ | OS2+ | OS=+ | OS2[ | OS=[ | S2[ | S=[ |
| | | OS2[ | OS=[ | | | | | | | | |
| 02073 | 蚓 | OS5I | S5I | OS5I | | | | | | | |
| 02074 | 蚤 | X2OS | X=OS | X2S | X=S | X2OS | X=OS | | | | |
| 02075 | 蚩 | E-OS | E-S | E-OS | IU-S | \-OS | \-S | \-OS | | | |
| 02076 | 蚌 | OS3I | OS30 | OSE | S30 | S3I | SE | S+++ | OS3I | OS30 | OSE |
| | | S[[[ | | | | | | | | | |
| 02077 | 蚣 | OS8S | OS2S | OSS | S8S | OS8S | OS2S | OSS | | | |
| 02078 | 蚜 | OSCJ | SCJ' | SCJ | OSCJ | | | | | | |
| 02079 | 衰 | TO-K | TO-K | TO'K | TO'K | TOK | TH'K | TX'K | T-HK | T-XK | |
| 02080 | 衷 | TOIK | TO'K | TOK | -OIK | -O'K | +O'K | +O'K | +OK | +OK | [O'K |
| | | [O'K | [OK | [OK | | | | | | | |
| 02081 | 袁 | HO'K | | | | | | | | | |

| | | | | | | | | | | | |
|---|---|---|---|---|---|---|---|---|---|---|---|
| 02082 | 袂 | KLK | KJK | | | | | | | | |
| 02083 | 衽 | K'H | KE | K'+- | K'IH | K'[- | | | | | |
| 02084 | 衹 | KCM | KC+ | KC-L | K'K | KC[ | | | | | |
| 02085 | 記 | 40CL | ;CL | | | | | | | | |
| 02086 | 訐 | 40HI | 402I | 40=I | 40-+ | ;HI | ;2I | ;=I | ;-+ | ;--I | ;-[ |
| 02087 | 討 | 40J. | ;J. | | | | | | | | |
| 02088 | 訌 | 40H | ;H | | | | | | | | |
| 02089 | 訕 | 40IU | ;IU | ;E | 40\ | ;\ | | | | | |
| 02090 | 訊 | 40XZ | 40ZX | 40XL | 40LX | 40+Z | 40Z+ | 40+L | 40L+ | ;XZ | ;ZX |
| | | ;XL | ;LX | ;+Z | ;Z+ | ;+L | ;L+ | 40[Z | 40Z[ | 40[L | 40L[ |
| | | ;[Z | ;Z[ | ;[L | ;L[ | ;R. | | | | | |
| 02091 | 託 | 40HL | 402L | 40=L | ;HL | ;2L | ;=L | | | | |
| 02092 | 訓 | 403I | 403 | ;III | ;'II | ;3I | ;3 | | | | |
| 02093 | 訖 | 40TZ | ;TZ | ;T-L | | | | | | | |
| 02094 | 訏 | 40HJ | 402J | 40=J | ;HJ | ;2J | ;=J | | | | |
| 02095 | 訑 | 40JL | 40LL | 40+L | ;JIL | ;JL | ;LIL | ;LL | ;+L | 40[L | ;[L |
| 02096 | 豈 | E-OK | IU-K | IU. | \-OK | \. | | | | | |
| 02097 | 豺 | AZJ' | AZJ | ZJ' | ZJ | | | | | | |
| 02098 | 豹 | AZC- | AZC. | AZC | Z'C- | Z'C. | ZC- | ZC. | | | |
| 02099 | 財 | 42J' | 48J' | | | | | | | | |
| 02100 | 貢 | H42 | H48 | | | | | | | | |
| 02101 | 起 | HGCL | HGL | GCL | | | | | | | |
| 02102 | 躬 | '4J5 | 4J5 | J5 | | | | | | | |
| 02103 | 軒 | HQHI | HQ2I | HQ=I | HQ-+ | QHI | Q2I | Q=I | Q-+ | HQ-[ | Q-[ |
| 02104 | 軔 | HQD. | HQD' | HQD | QD. | QD' | QD | | | | |
| 02105 | 軏 | HQ-R | Q-R | | | | | | | | |
| 02106 | 辱 | L2KJ | L=KJ | LKJ. | LKJ | | | | | | |
| 02107 | 送 | 2-KZ | 22TZ | 2=TZ | 2H2Z | =-KZ | ==TZ | =H=Z | =H2Z | | |
| 02108 | 逆 | KU'Z | KE'Z | KEZ | | | | | | | |
| 02109 | 迷 | 2YZ | =YZ | | | | | | | | |
| 02110 | 退 | BKZ | | | | | | | | | |
| 02111 | 迺 | -4Z | | | | | | | | | |
| 02112 | 迴 | OOZ | | | | | | | | | |
| 02113 | 逃 | KKLZ | KKZ | 2KZ | =KZ | | | | | | |
| 02114 | 追 | 'OOZ | '2OZ | | | | | | | | |
| 02115 | 逅 | L-OZ | LOZ | | | | | | | | |
| 02116 | 迸 | 2HHZ | 222Z | 2HZ | =HHZ | ===Z | =22Z | =HZ | | | |
| 02117 | 邕 | 3OBL | 3LOL | 3LBL | | | | | | | |
| 02118 | 郡 | E'OP | EOP | | | | | | | | |
| 02119 | 郝 | H22P | H4P | IH4P | | | | | | | |
| 02120 | 郢 | O'HP | OEP | | | | | | | | |
| 02121 | 酒 | 3-Q | | | | | | | | | |
| 02122 | 配 | -QJL | -QOL | -QPL | -QCL | 9JL | 9OL | 9PL | 9CL | 9L | |
| 02123 | 酌 | -QC- | -QC. | -QC | 9'C- | 9'C. | 9C- | 9C. | 9C | | |
| 02124 | 釘 | 8E2J | 8K-J | 8KJ | $-J | $J | 6-J | 6J | | | |
| 02125 | 針 | 8E2+ | 8K+ | $+ | 6+ | 8E2[ | 8K[ | $[ | 6[ | | |
| 02126 | 釗 | 8KIJ | $IJ | 6IJ | | | | | | | |
| 02127 | 釜 | 2XE2 | 8XE2 | 2XK | 8XK | =XE= | =ZK | | | | |
| 02128 | 釙 | 8E2T | 8KI. | 8KT | $I. | $T | 6I. | 6T | | | |
| 02129 | 閃 | PPT | MT | | | | | | | | |
| 02130 | 院 | PU2R | PU=R | P.UR | | | | | | | |
| 02131 | 陣 | P-Q- | P+Q+ | PHQ | PQ | P[Q[ | | | | | |
| 02132 | 陡 | PHG | PHTT | PIHG | | | | | | | |
| 02133 | 陛 | PFFH | P2FH | P77H | P27H | P2IH | P%IH | P2H | | | |
| 02134 | 陝 | PKTT | PK2T | PKT | P-3T | | | | | | |
| 02135 | 除 | P8-Y | P8Y | P8H3 | P823 | P8=3 | P83 | | | | |
| 02136 | 陘 | P-3H | P3H | | | | | | | | |
| 02137 | 陞 | P'HH | PT+H | PT[H | | | | | | | |
| 02138 | 隻 | THHX | T.EX | TTEX | TEX | 'EX | | | | | |
| 02139 | 飢 | 8BSR | 8SR | 8BFR | 8FR | 8B7R | 87R | 8R | | | |
| 02140 | 馬 | EJ4 | EC4 | | | | | | | | |
| 02141 | 骨 | QUA | | | | | | | | | |
| 02142 | 高 | TOUO | THUO | | | | | | | | |
| 02143 | 鬥 | EIEI | IEEI | EEII | IIEE | IEIE | EIIE | | | | |
| 02144 | 鬲 | -OUT | -OA | | | | | | | | |
| 02145 | 鬼 | 'QRS | QRS | 'QR | QR | | | | | | |
| 02146 | 乾 | HBTZ | HBZ | HBTL | +BTZ | +BTL | +B+Z | [BTZ | [BTL | [B[Z | |
| 02147 | 偺 | TATB | TAB | | | | | | | | |
| 02148 | 偽 | TAS4 | TA54 | TA4 | TTS4 | TT54 | TT4 | | | | |
| 02149 | 停 | TTOJ | TTUJ | | | | | | | | |
| 02150 | 假 | TP2X | TP=X | TPCX | TPRX | | | | | | |
| 02151 | 偃 | TCBV | TCV | | | | | | | | |
| 02152 | 偌 | TH+O | TH[O | | | | | | | | |

| | | | | | | | | | |
|---|---|---|---|---|---|---|---|---|---|
| 02153 | 做 | T+OX | T[OX | | | | | | |
| 02154 | 偉 | THOH | | | | | | | |
| 02155 | 健 | TEHZ | | | | | | | |
| 02156 | 偶 | TQUS | TQA | | | | | | |
| 02157 | 偎 | TQ-K | TQK | | | | | | |
| 02158 | 偕 | TFFB | T2FB | T77B | T27B | T%'B | T%B | | |
| 02159 | 偵 | TT42 | TT48 | | | | | | |
| 02160 | 側 | T42J | T48J | | | | | | |
| 02161 | 偷 | T8AJ | | | | | | | |
| 02162 | 偏 | T'PA | T.PA | TPA | | | | | |
| 02163 | 倏 | TIXK | TXK. | TX.K | TXK | | | | |
| 02164 | 偯 | TTOK | | | | | | | |
| 02165 | 偭 | TTOH | TTQ | | | | | | |
| 02166 | 兜 | 'BCR | 'CBR | CBCR | BCCR | | | | |
| 02167 | 冕 | BUBR | BURI | BUR | BBR | | | | |
| 02168 | 凰 | R'BE | RBE | | | | | | |
| 02169 | 剪 | KAJD | | | | | | | |
| 02170 | 副 | -OQJ | -QIJ | | | | | | |
| 02171 | 勒 | HO+C | HO+C | H+C | H+C' | HO[C | HO[C | H[C | H[C' |
| 02172 | 務 | SJXC | | | | | | | |
| 02173 | 勘 | H2LC | HRLC | HLC | | | | | |
| 02174 | 動 | HQHC | HHC | HHC' | | | | | |
| 02175 | 匐 | C-OQ | 'C-Q | 'COQ | J-OQ | 'J-Q | 'JOQ | | |
| 02176 | 匏 | KSCL | K5CL | | | | | | |
| 02177 | 匙 | BGF | BG7 | | | | | | |
| 02178 | 匿 | CH+O | CHO | CH[O | | | | | |
| 02179 | 區 | COOO | C30 | CX | | | | | |
| 02180 | 匾 | C'PA | C.PA | CPA | | | | | |
| 02181 | 參 | 3S83 | S83 | SK3 | S3 | | | | |
| 02182 | 曼 | B4X | | | | | | | |
| 02183 | 商 | T2UO | TURO | TU2O | TU8O | | | | |
| 02184 | 啪 | OF'B | OFB | | | | | | |
| 02185 | 啦 | OFTK | | | | | | | |
| 02186 | 啄 | OZ. | OZ | | | | | | |
| 02187 | 啞 | O-U- | O2UU | O=UU | | | | | |
| 02188 | 啡 | OEE | O2E | | | | | | |
| 02189 | 啃 | OGA | | | | | | | |
| 02190 | 啊 | OPJO | OPJ | | | | | | |
| 02191 | 唱 | OBB | | | | | | | |
| 02192 | 啖 | OWW | O2W | | | | | | |
| 02193 | 問 | PPO | MO | ? | | | | | |
| 02194 | 啕 | OCHE | | | | | | | |
| 02195 | 唯 | OTHH | OT.E | OTTE | OTE | O'E | | | |
| 02196 | 啤 | O'Q4 | O'Q+ | OQ4 | OQ+ | O'Q[ | OQ[ | | |
| 02197 | 唸 | O8LG | O8JG | O8-G | | | | | |
| 02198 | 售 | THHO | T.EO | TTEO | TEO | 'EO | EO | | |
| 02199 | 啜 | O4X | | | | | | | |
| 02200 | 唬 | OTUR | OT7R | OU7R | | | | | |
| 02201 | 啣 | OHGP | | | | | | | |
| 02202 | 唳 | O'PK | O.PK | OP.K | OPK. | OPK | | | |
| 02203 | 啁 | OUHO | | | | | | | |
| 02204 | 啗 | ODEE | OD2E | ODE | OUEE | OU2E | OUE | OD: | OU: |
| 02205 | 圈 | O2HL | O2L | O2HL | O2L | | | | |
| 02206 | 國 | OO-M | OMO- | OOM | OMO | OE. | OE | OO-M | OMO- OE. |
| 02207 | 圉 | OH2H | O6 | O6 | | | | | |
| 02208 | 域 | HO-M | HMO- | IHOM | | | | | |
| 02209 | 堅 | CUXH | EXH | EXIH | | | | | |
| 02210 | 堊 | -U-H | 2UUH | =UUH | 2UH | =UH | 2UIH | =UIH | |
| 02211 | 堆 | HTHH | HT.E | HTTE | H'E | IHTE | IH'E | IHE | |
| 02212 | 埠 | H'B+ | IHB+ | H'B[ | IHB[ | | | | |
| 02213 | 埤 | H'Q4 | H'Q+ | IHQ4 | IHQ+ | H'Q[ | IHQ[ | | |
| 02214 | 基 | H28H | H=8H | H8IH | | | | | |
| 02215 | 堂 | 3UOH | | | | | | | |
| 02216 | 堵 | HH'B | | | | | | | |
| 02217 | 執 | H2H9 | HH9. | HH9 | | | | | |
| 02218 | 培 | HTKO | IHTO | | | | | | |
| 02219 | 夠 | AACO | 2ACO | =ACO | AAC | 2AC | =AC | AAJO | 2AJO =AJO |
| 02220 | 奢 | KH'B | KHB | | | | | | |
| 02221 | 娶 | PXV | -4XV | 4XV | | | | | |
| 02222 | 婁 | BOV | BOV | QOV | QOV | | | | |
| 02223 | 婉 | VUAL | VUL | | | | | | |
| 02224 | 婦 | VEUE | VEE | | | | | | |
| 02225 | 婪 | YYV | | | | | | | |

| | | | | | | | | | | | |
|---|---|---|---|---|---|---|---|---|---|---|---|
| 02226 | 婉 | VPJO | VPJ | | | | | | | | |
| 02227 | 婦 | VBB | | | | | | | | | |
| 02228 | 婢 | V'Q4 | V'Q+ | VQ4 | VQ+ | V'Q[ | VQ[ | | | | |
| 02229 | 婚 | V'KB | VKB | | | | | | | | |
| 02230 | 婁 | 3EXV | 3XV | | | | | | | | |
| 02231 | 婊 | VE'K | VEK | | | | | | | | |
| 02232 | 孰 | TOZ9 | TZ9. | TZ9 | | | | | | | |
| 02233 | 寇 | U2RX | U=RX | URTX | .URX | | | | | | |
| 02234 | 寅 | U-Q2 | UTQ2 | UQ2 | .UQ2 | U-Q8 | UTQ8 | UQ8 | .UQ8 | | |
| 02235 | 寄 | UKJO | UKJ | .UKJ | | | | | | | |
| 02236 | 寂 | UTYX | .UTX | UG3X | UGX | .UGX | .UYX | UYX | | | |
| 02237 | 宿 | UTTB | UTB | .UTB | | | | | | | |
| 02238 | 密 | UG'E | UGE | .UGE | UGIU | UG'\ | UG\ | .UG\ | | | |
| 02239 | 尉 | P23J | P3J | P-YJ | PYJ | | | | | | |
| 02240 | 專 | +QSJ | +ASJ | +QJ | +SJ | [QSJ | [ASJ | [QJ | [SJ | | |
| 02241 | 將 | UUAJ | ULAJ | UTAJ | KAJ | KU2J | KU=J | KC2J | KC=J | | |
| 02242 | 屠 | PH'B | PHBI | PHB | | | | | | | |
| 02243 | 屜 | P3HL | P'TH | P]HL | P]H | | | | | | |
| 02244 | 屝 | C'EE | C'2E | P23I | PEE | P2E | | | | | |
| 02245 | 崇 | IUU3 | IUUY | EU23 | EU3 | EU-Y | EUY | \U23 | \U3 | \U-Y | \UY |
| 02246 | 崆 | IUUH | EU2H | EU8H | EURH | EUH | \U2H | \U8H | \URH | \UH | |
| 02247 | 崎 | IUKJ | EKJO | EKJ | \KJO | \KJ | | | | | |
| 02248 | 崛 | IUPE | EPEE | EP2E | EPE | \PEE | \P2E | \PE | | | |
| 02249 | 崖 | ELHH | EL2H | \LHH | \L2H | | | | | | |
| 02250 | 崢 | IUAJ | EAEJ | EAJ | \AEJ | \AJ | | | | | |
| 02251 | 崑 | IUBF | EBFF | EB2F | EBF | IUB7 | EB77 | EB27 | EB=7 | EB7 | IUI |
| | | EB% | \BFF | \B2F | \BF | \B77 | \B27 | \B=7 | \B7 | \B% | |
| 02252 | 崩 | IUAA | IU2A | EAA | E2A | \AA | \2A | | | | |
| 02253 | 崔 | IUTE | IU'E | ETHH | ET.E | ETTE | E'E | \THH | \T.E | \TTE | \'E |
| 02254 | 崙 | IU8A | E8-A | E8A | \8-A | \8A | | | | | |
| 02255 | 崤 | IUXA | EX+A | EX[A | \X+A | \X[A | | | | | |
| 02256 | 崧 | IUYS | EY8S | EY2S | \Y8S | \Y2S | | | | | |
| 02257 | 崗 | IUUE | IUA | EUKE | \UKE | \A | | | | | |
| 02258 | 巢 | 3QY | 3LQY | | | | | | | | |
| 02259 | 常 | 3UOE | 3UE | | | | | | | | |
| 02260 | 帶 | 2OUE | HUUI | HUE | EUUI | EUE | =OUE | | | | |
| 02261 | 帳 | UIEK | UIK | EE-K | | | | | | | |
| 02262 | 帷 | UITE | UI'E | UIE | ETHH | ET.E | ETTE | E'E | | | |
| 02263 | 康 | .LE3 | LE3 | .LE4 | LE4 | | | | | | |
| 02264 | 庸 | .LEA | LEUH | LEA | | | | | | | |
| 02265 | 庶 | .LH4 | L2O4 | L++4 | LH4 | L[[4 | | | | | |
| 02266 | 庵 | .LKL | LKQL | LKL | | | | | | | |
| 02267 | 庾 | ..L;T | LEET | L;T | | | | | | | |
| 02268 | 張 | 5E-K | 5EK | 22S | =2S | ==S | | | | | |
| 02269 | 強 | 5OS | 5OOS | 5OOS | 5OOS | 5SS | 5SOS | 5SOS | | | |
| 02270 | 彗 | EEE | EEC- | 2EC- | =EC- | | | | | | |
| 02271 | 彬 | YY3 | 2Y3 | =Y3 | | | | | | | |
| 02272 | 彩 | '2Y3 | '3Y3 | AY3 | '=Y3 | | | | | | |
| 02273 | 彫 | UHO3 | UO3 | | | | | | | | |
| 02274 | 得 | 'TBJ | TB-J | TBJ | ]B-J | ]BJ | | | | | |
| 02275 | 徙 | 'TGG | TGG | ]GG | | | | | | | |
| 02276 | 從 | 'TTG | TTTG | TTG | ]TTG | ]2TG | ]TG | | | | |
| 02277 | 徘 | 'TEE | ]EE | ]2E | | | | | | | |
| 02278 | 御 | 'THP | THGP | ]HGP | ]HP | | | | | | |
| 02279 | 徠 | 'TYT | TYTT | ]YTT | ]Y2T | ]YT | | | | | |
| 02280 | 徜 | 'T3A | ]3UO | ]3A | | | | | | | |
| 02281 | 恿 | SUHG | SAG | | | | | | | | |
| 02282 | 患 | OOIG | OOIG | OOG | | | | | | | |
| 02283 | 悉 | '2YG | AYG | | | | | | | | |
| 02284 | 悠 | TIXG | TTXG | | | | | | | | |
| 02285 | 您 | TU3G | T3G | | | | | | | | |
| 02286 | 惋 | I2UL | IUAL | | | | | | | | |
| 02287 | 悴 | ITT+ | IT4+ | ITT[ | IT4[ | | | | | | |
| 02288 | 惦 | I2LO | ILTO | | | | | | | | |
| 02289 | 悽 | I2+V | I+EV | I+V | I2-V | I-EV | I-V | I2[V | I[EV | I[V | |
| 02290 | 情 | I2EA | IIEA | | | | | | | | |
| 02291 | 悻 | IH2H | | | | | | | | | |
| 02292 | 悵 | I2EK | IE-K | | | | | | | | |
| 02293 | 惜 | I2HB | IHHB | | | | | | | | |
| 02294 | 悼 | ITB+ | ITB[ | | | | | | | | |
| 02295 | 惘 | I2UC | IUKC | | | | | | | | |
| 02296 | 惕 | I2BC | IBC2 | IBC | | | | | | | |
| 02297 | 惆 | IUHO | | | | | | | | | |

| | | | | | | | | | | | |
|---|---|---|---|---|---|---|---|---|---|---|---|
| 02298 | 惟 | I2TE | I2E | ITHH | IT.E | ITTE | ITE | | | | |
| 02299 | 悴 | I2YZ | I'YZ | IYZ | I2'Z | I'Z- | I'Z | | | | |
| 02300 | 惆 | I2CG | IC2G | ICG | | | | | | | |
| 02301 | 悸 | ITOZ | | | | | | | | | |
| 02302 | 戚 | LTYM | LG3M | TYM | G3M | MTY | MG3 | | | | |
| 02303 | 爽 | T4M | | | | | | | | | |
| 02304 | 扈 | 'POL | .POL | POBL | | | | | | | |
| 02305 | 掠 | FTO3 | FT3 | | | | | | | | |
| 02306 | 控 | FU2H | FU8H | FURH | FUH | | | | | | |
| 02307 | 捲 | F2HL | | | | | | | | | |
| 02308 | 掖 | FTTA | | | | | | | | | |
| 02309 | 探 | FU2Y | FU8Y | FURY | FUY | | | | | | |
| 02310 | 接 | FTKV | FTV | | | | | | | | |
| 02311 | 捷 | F-EG | F-G | F+EG | F+G | F[EG | F[G | | | | |
| 02312 | 捧 | FE8H | F3TH | FEH | | | | | | | |
| 02313 | 掘 | FPEE | FPE | FP2E | | | | | | | |
| 02314 | 措 | FHHB | F22B | FHB | | | | | | | |
| 02315 | 捱 | FLHH | FL2H | FLH | | | | | | | |
| 02316 | 掩 | FKQL | FKL | | | | | | | | |
| 02317 | 掉 | FTB+ | FTB[ | | | | | | | | |
| 02318 | 掃 | FEUE | | | | | | | | | |
| 02319 | 掛 | FHHT | F2HT | FHT | | | | | | | |
| 02320 | 捫 | FPP | F2P | | | | | | | | |
| 02321 | 推 | FTHH | FT.E | FTTE | FTE | F'E | | | | | |
| 02322 | 掄 | F8-A | F8A | | | | | | | | |
| 02323 | 授 | FAUX | FAX | | | | | | | | |
| 02324 | 掙 | FAEJ | | | | | | | | | |
| 02325 | 採 | F'3Y | FAY | | | | | | | | |
| 02326 | 掏 | F'CY | FC2Y | FCY | | | | | | | |
| 02327 | 排 | FEE | F2E | | | | | | | | |
| 02328 | 掬 | F'CE | FCHE | FCE | | | | | | | |
| 02329 | 掀 | FLTT | FTUT | FTT | FLT- | FT- | | | | | |
| 02330 | 捻 | F8LG | F8JG | F8G | | | | | | | |
| 02331 | 掇 | F'PK | F.PK | FP.K | FPK. | | | | | | |
| 02332 | 搶 | F8HO | | | | | | | | | |
| 02333 | 捺 | FK23 | FK3 | FK-Y | FKY | | | | | | |
| 02334 | 敝 | 3ATX | 3U3X | 3AX | | | | | | | |
| 02335 | 敖 | EDTX | EDX | EUTX | EUX | | | | | | |
| 02336 | 救 | -3TX | -3X | +3TX | +3X | -4TX | +4TX | +4X | [3TX | [3X | [4 [4X |
| 02337 | 教 | H'ZX | HZTX | HZX | X+ZX | XZTX | XZX | X[ZX | | | |
| 02338 | 敗 | 42TX | 48TX | 42X | 48X | 4TX | | | | | |
| 02339 | 啓 | 'PXO | .PXO | PTXO | PXO | | | | | | |
| 02340 | 敏 | TQ-X | TQTX | | | | | | | | |
| 02341 | 敘 | 8-YX | 8YTX | 8YX | 823X | 83TX | 83X | | | | |
| 02342 | 敕 | YOTX | YOTX | YOX | YOX | | | | | | |
| 02343 | 敔 | 5OTX | 5OX | | | | | | | | |
| 02344 | 斜 | 8-Y+ | 8Y2+ | 8Y=+ | 8Y+ | 823+ | 832+ | 83=+ | 83+ | 8-Y[ | 8Y; 8Y=[ 8Y[ 823[ 832[ 83=[ 83[ / |
| 02345 | 斛 | UA2+ | UA=+ | UA+ | UA2[ | UA=[ | UA[ | | | | |
| 02346 | 斬 | HQLT | HQT | QLT | | | | | | | |
| 02347 | 族 | DTTK | TDTK | | | | | | | | |
| 02348 | 旋 | DTLG | DTJG | TDTG | TDG | DTG | | | | | |
| 02349 | 旌 | DT'E | TDTE | TDE | DTE | | | | | | |
| 02350 | 旎 | DTPF | TDTF | TDF | DTF | DTP7 | TDT7 | TD7 | DT7 | | |
| 02351 | 晝 | EHB- | | | | | | | | | |
| 02352 | 晚 | BUBR | BUR- | BUR | | | | | | | |
| 02353 | 晤 | B5O | | | | | | | | | |
| 02354 | 晨 | BL2K | BL=K | BLK | | | | | | | |
| 02355 | 晦 | BTQ- | BTQ | | | | | | | | |
| 02356 | 晞 | BX+E | BXE | BX[E | | | | | | | |
| 02357 | 曹 | HQB | QB | -OHB | HOHB | -QB | -OHB | HOHB | | | |
| 02358 | 勗 | BA-C | B4-C | B4C | B4C' | | | | | | |
| 02359 | 望 | .CAE | CAE | CA'H | | | | | | | |
| 02360 | 梁 | 3D2Y | 3D=Y | 3DY | | | | | | | |
| 02361 | 梯 | Y25J | | | | | | | | | |
| 02362 | 梢 | Y3A | | | | | | | | | |
| 02363 | 梓 | YT2H | YTH | | | | | | | | |
| 02364 | 梵 | YYR. | YYR | 2YR. | 2YR | =YR. | =YR | | | | |
| 02365 | 桿 | YBHI | YB2I | YB=I | YBH | YB-+ | YB-[ | | | | |
| 02366 | 桶 | YSUH | YSA | | | | | | | | |
| 02367 | 梱 | YOY | | | | | | | | | |
| 02368 | 梧 | Y5O | | | | | | | | | |

| | | | | | | | | | | | |
|---|---|---|---|---|---|---|---|---|---|---|---|
| 02369 | 梗 | Y-BX | YTBX | Y-QX | YTQX | YQX | | | | | |
| 02370 | 械 | Y2OM | Y++M | YHH | YM2O | YM++ | YMH | YXM | YMX | Y[[M | YM\| |
| 02371 | 梃 | YEZ | Y'HZ | | | | | | | | |
| 02372 | 棄 | TSHY | TSY | THY | | | | | | | |
| 02373 | 梭 | YS2X | YS8X | YSRX | | | | | | | |
| 02374 | 梆 | YE'P | YEP | | | | | | | | |
| 02375 | 梅 | YTQ- | YTQ | | | | | | | | |
| 02376 | 梔 | YL-L | YLBL | | | | | | | | |
| 02377 | 條 | TIXY | TIY | .TTXY | TXY | | | | | | |
| 02378 | 梨 | 'YJY | YJY | 'IJY | 'JY | | | | | | |
| 02379 | 梟 | 'BSY | 'B5Y | BSY | B5Y | | | | | | |
| 02380 | 梳 | YU2R | YU=R | | | | | | | | |
| 02381 | 棣 | Y-3. | Y+3. | Y+3 | Y-4. | Y+4. | Y+4 | Y[3. | Y[3 | Y[4. | Y[4 |
| 02382 | 欲 | 4OUT | 40- | 220T | 220- | 280- | 880- | ==OT | ==0- | =80- | |
| 02383 | 殺 | XYRX | XYX | | | | | | | | |
| 02384 | 毫 | TOUL | TUEL | TU3L | | | | | | | |
| 02385 | 毬 | EL-3 | EL+3 | EL-4 | EL+4 | 3L-3 | 3L+3 | 3L-4 | 3L+4 | EL[3 | EL[ |
| | | 3L[3 | 3L[4 | | | | | | | | |
| 02386 | 氫 | 7-3H | 73H | TZ3H | TL3H | | | | | | |
| 02387 | 涎 | 3'GZ | 3GZ | | | | | | | | |
| 02388 | 涼 | 3TO3 | | | | | | | | | |
| 02389 | 淳 | 3TOZ- | | | | | | | | | |
| 02390 | 淙 | 3U23 | 3U3 | 3U-Y | | | | | | | |
| 02391 | 液 | 3TTA | | | | | | | | | |
| 02392 | 淡 | 3WW | 32W | | | | | | | | |
| 02393 | 淌 | 33UO | | | | | | | | | |
| 02394 | 淤 | 3TD2 | 3D82 | 3DT2 | 3D2 | 3TD= | 3D8= | 3DT= | 3D= | | |
| 02395 | 添 | 3'KG | 3-KG | 32TG | 3=TG | 3H2G | 3H8G | 3KG | 3'K4 | 3-K4 | 321 |
| | | 3=T4 | 3H24 | 3H84 | 3K4 | | | | | | |
| 02396 | 淺 | 3MM | 32M | 3=M | | | | | | | |
| 02397 | 清 | 3EA | 3IEA | | | | | | | | |
| 02398 | 淇 | 3H22 | 3H=2 | 3H28 | 3H=8 | 3H2K | 3H=K | | | | |
| 02399 | 淋 | 3YY | 32Y | | | | | | | | |
| 02400 | 涯 | 3LHH | 3L2H | 3LH | | | | | | | |
| 02401 | 淑 | 3TYX | 3G3X | 3GX | | | | | | | |
| 02402 | 涮 | 3AJ | 3U2J | 3U=J | 3C2J | 3C=J | 3AJ. | | | | |
| 02403 | 淞 | 3Y8S | 3YS | | | | | | | | |
| 02404 | 淹 | 3KQL | 3KL | | | | | | | | |
| 02405 | 涸 | 30+0 | 30+0 | 30[0 | 30[0 | | | | | | |
| 02406 | 混 | 3BFF | 3B2F | 3BF | 3B77 | 3B27 | 3B7 | 3B% | | | |
| 02407 | 淵 | 3K-K | | | | | | | | | |
| 02408 | 淅 | 3YLT | 3YT | | | | | | | | |
| 02409 | 淒 | 3-EV | 3+EV | 3-V | 3+V | 3EV | 3[EV | 3[V | | | |
| 02410 | 渚 | 3H'B | 3HB | | | | | | | | |
| 02411 | 涵 | 3-3U | 3T3U | 3-U | 3TU | 3-4U | 3T4U | | | | |
| 02412 | 淚 | 3'PK | 3.PK | 3P.K | 3PK. | 3PK | | | | | |
| 02413 | 淫 | 3'3E | 3A'H | 3AE | | | | | | | |
| 02414 | 淘 | 3'CE | 3CHE | | | | | | | | |
| 02415 | 淪 | 38-A | 38A | | | | | | | | |
| 02416 | 深 | 3U2Y | 3U8Y | 3UY | | | | | | | |
| 02417 | 淮 | 3THH | 3T.E | 3TTE | | | | | | | |
| 02418 | 淨 | 3AEJ | | | | | | | | | |
| 02419 | 淆 | 3X+A | 3X[A | | | | | | | | |
| 02420 | 淄 | 33Q | 33LQ | | | | | | | | |
| 02421 | 涪 | 3TKO | | | | | | | | | |
| 02422 | 淬 | 3TT+ | 3TT[ | | | | | | | | |
| 02423 | 涿 | 3Z. | 3ZL. | | | | | | | | |
| 02424 | 淦 | 38E2 | 38K | 3$ | 36 | | | | | | |
| 02425 | 烹 | TOZ4 | | | | | | | | | |
| 02426 | 焉 | -GS4 | GS4 | -G54 | G54 | | | | | | |
| 02427 | 焊 | WBHI | WB2I | WB=I | WBH | WB--+ | WB-[ | | | | |
| 02428 | 烽 | WXE | W'XE | | | | | | | | |
| 02429 | 烯 | WX+E | WX[E | | | | | | | | |
| 02430 | 爽 | K4X | -4XT | +4XT | [4XT | | | | | | |
| 02431 | 牽 | T2UH | TUSH | | | | | | | | |
| 02432 | 犁 | 'YJH | YJH | 'J'H | 'JH | 'JT+ | 'JT[ | | | | |
| 02433 | 猜 | ZEA | ZIEA | | | | | | | | |
| 02434 | 猛 | ZZ4- | ZZ4 | | | | | | | | |
| 02435 | 猖 | ZBB | Z2B | Z=B | | | | | | | |
| 02436 | 猓 | ZQY | | | | | | | | | |
| 02437 | 猙 | ZAEJ | ZAJ | | | | | | | | |
| 02438 | 率 | TN4+ | TN2+ | TN+ | TN4[ | TN2[ | TN[ | % | | | |
| 02439 | 琅 | E-BK | E.BK | EBK- | EBK | | | | | | |

| | | |
|---|---|---|
| 02440 | 琊 | ECJP EJP |
| 02441 | 球 | E-3. E+3. E-3 E+3 E-4. E+4. E+4 E[3. E[3 E[ E[4 |
| 02442 | 理 | EQH EQIH |
| 02443 | 現 | E4R E4'L |
| 02444 | 琍 | E'YJ EYIJ EYJ E'IJ E'J |
| 02445 | 瓠 | KSAS K5AS KCAS KSS K5S KCS |
| 02446 | 瓶 | 2HCZ 2H-Z =HCZ =H-Z |
| 02447 | 瓷 | 2UTZ 2--Z 2-CZ 2-Z 2T-Z 2TCZ =UTZ =--Z =-CZ =-Z =T-Z =TCZ |
| 02448 | 甜 | HOH2 HOH= |
| 02449 | 產 | TXLE T2LE TLE |
| 02450 | 略 | QXO Q'XO |
| 02451 | 畦 | QHH Q2IH |
| 02452 | 畢 | Q++H QHHI Q2OH QXHI QXH Q[[H |
| 02453 | 異 | QHH2 QHH8 QH2 QH8 |
| 02454 | 疏 | LGT3 LGTR JGT3 JGTR LG3 LGR JGR GT3 GTR |
| 02455 | 痔 | L2HJ LIHJ |
| 02456 | 痕 | L2BK LBK |
| 02457 | 疵 | L2GF L2G7 |
| 02458 | 痊 | L28E L8E |
| 02459 | 痍 | L2K5 LK5 L-5T L+5T L[5T |
| 02460 | 皎 | 'BTX BT2X BT8X |
| 02461 | 盔 | LW4- LW4 +W4- +W4 [W4- [W4 |
| 02462 | 盒 | 8-04 804- 804 |
| 02463 | 盛 | DM4- DM4 MD4- MD4 UM4- UM4 MU4- MU4 |
| 02464 | 眷 | 2H84 2H4 =H84 =H4 |
| 02465 | 眾 | 4TTT 43T 4Z |
| 02466 | 眼 | 4BK |
| 02467 | 眶 | 4CE |
| 02468 | 眸 | 4S'H 4SH |
| 02469 | 眺 | 4KKL 4KK 42K |
| 02470 | 硫 | TOT3 TOTR +TS3 +T3 +TSR +TR [TS3 [T3 [TSR [TR |
| 02471 | 硃 | TOTY +TY +'2Y +'=Y +'+Y +'-Y [TY ['2Y ['=Y [' ['-Y |
| 02472 | 祠 | +HHJ +22J +HJ [HHJ [22J [HJ |
| 02473 | 祥 | 232E -Y2E K2E1 K231 =32E =3=E |
| 02474 | 票 | -423 423 4=3 -4-Y 4-Y |
| 02475 | 祭 | W23 W-Y W=3 |
| 02476 | 移 | 'YAA 'Y2A 'AA '2A |
| 02477 | 窒 | U2SH U8SH |
| 02478 | 窕 | U2KK U22K U8KK U82K |
| 02479 | 笠 | FFTK /T2- /TK |
| 02480 | 笨 | FFY- /Y- |
| 02481 | 笛 | FFIQ FFQ /IQ /Q |
| 02482 | 第 | FF5J /5J' /5J |
| 02483 | 符 | FFTJ /TJ. /TJ |
| 02484 | 笙 | FF'E FFE /'E /E |
| 02485 | 笞 | FFSO /SO |
| 02486 | 笳 | FFTK FF'E /TI2 /TI= /TK /'E |
| 02487 | 粒 | 2YTK =YTK |
| 02488 | 粗 | 2YA- =YA- 2Y4- =Y4- |
| 02489 | 粕 | 2Y'B =Y'B |
| 02490 | 絆 | N32H N220 N2++ N22I N2=1 N2H N2X N2[[ |
| 02491 | 紋 | N3TN NTN |
| 02492 | 統 | N3TR NTSR NTR |
| 02493 | 紫 | YLN3 YLN YL3 |
| 02494 | 紹 | N3UO N3DO NUO NDO |
| 02495 | 紼 | N352 N5'I N5II N52 |
| 02496 | 絀 | NUIU NIUU N3EE N32E NEE N2E N3\\ N32\ N\\ N2\ |
| 02497 | 細 | N3Q NQ |
| 02498 | 紳 | N3BI N3QI NIQI NBI NQI NO |
| 02499 | 組 | N3A- NA- N4 |
| 02500 | 累 | QN3 QN |
| 02501 | 終 | N3X2 N3X= NX2 NX= |
| 02502 | 紺 | N3HL N2OL NHL |
| 02503 | 紱 | N3+X N+X. N+X N+'X N3[X N[X. N[X N['X |
| 02504 | 羝 | HEY- HEY |
| 02505 | 羞 | 2E'E 2EC+ 2EEI 2EE =E'E =EC+ =EE1 =EE 2EC[ =EC |
| 02506 | 羚 | 2E8S =E8S |
| 02507 | 翌 | EETK 2ETK =ETK ET2- 2TK =TK 2T2- =T2- |
| 02508 | 翎 | 8SEE 8S2E 8-S2 8.S2 8S2 |
| 02509 | 習 | EE'B EEB 2E'B =E'B 2EB =EB 2'B ='B |

| | | | | | | | | | | | |
|---|---|---|---|---|---|---|---|---|---|---|---|
| 02510 | 粗 | 2Y00 | =Y00 | | | | | | | | |
| 02511 | 聊 | -4PP | 4PP | PC'P | PPP | | | | | | |
| 02512 | 聆 | -48S | -4S | 48.S | 48-S | 48S | P8.S | P8-S | P8S | | |
| 02513 | 脯 | A+A. | A[A. | | | | | | | | |
| 02514 | 脖 | A+UZ | A+Z | A[UZ | A[Z | | | | | | |
| 02515 | 脣 | L2KA | L=KA | LKA | | | | | | | |
| 02516 | 脫 | A2OR | | | | | | | | | |
| 02517 | 脩 | TIXA | TIA | | | | | | | | |
| 02518 | 脰 | A-OK | A. | | | | | | | | |
| 02519 | 脤 | AL2K | AL=K | | | | | | | | |
| 02520 | 舂 | E8EE | E8E | E8; | 3TEE | 3T; | | | | | |
| 02521 | 舵 | 'AUF | A-UF | A.UF | AUF | 'AU7 | A-U7 | A.U7 | AU7 | | |
| 02522 | 舷 | 'ATN | A-TN | | | | | | | | |
| 02523 | 舶 | 'A'B | 'AB | A-'B | A-B | | | | | | |
| 02524 | 船 | 'ARO | A-RO | ARO | | | | | | | |
| 02525 | 莎 | ++33 | H33' | H33 | X33' | X33 | [[33 | | | | |
| 02526 | 莞 | ++UR | HU2R | HU=R | XU2R | XU=R | [[UR | | | | |
| 02527 | 莘 | HT2H | XT2H | | | | | | | | |
| 02528 | 莩 | +++Z | H+UZ | H+Z | X+UZ | X+Z | [[[Z | H[UZ | H[Z | X[UZ | X[Z |
| 02529 | 莢 | ++KT | ++K2 | HKTT | HK2T | HK2 | HKT | H-3T | XKTT | XK2T | XKT |
| | | X-3T | [[KT | [[K2 | | | | | | | |
| 02530 | 莖 | H-3H | X-3H | | | | | | | | |
| 02531 | 莽 | ++KH | HK2O | HK++ | HKH | HK.H | H.KH | XK2O | XK++ | XKH | XK |
| | | X.KH | [[KH | HK[[ | XK[[ | | | | | | |
| 02532 | 莫 | ++BK | HBK | XBK | [[BK | | | | | | |
| 02533 | 莒 | ++OO | ++B | HO'O | HOIO | HOO | HB | XO'O | XOIO | XOO | XB |
| | | [[OO | [[B | | | | | | | | |
| 02534 | 莊 | ++KH | HUUH | HULH | HUTH | HKH | XUUH | XULH | XUTH | XKH | [[K |
| 02535 | 莓 | ++TQ | HTQ- | HTQ | XTQ- | XTQ | [[TQ | | | | |
| 02536 | 莉 | ++YJ | H'YJ | HYJ | H'IJ | H'J | X'YJ | XYJ | X'IJ | X'J | [[Y |
| 02537 | 莠 | ++YS | ++'S | H'YS | HY'S | HYS' | HYS | H''S | H'S' | H'S | X'Y |
| | | XY'S | XYS' | XYS | X''S | X'S' | X'S | [[YS | [['S | | |
| 02538 | 荷 | ++TJ | HTJO | XTJO | [[TJ | | | | | | |
| 02539 | 荻 | ++ZW | HZW | XZW | [[XW | | | | | | |
| 02540 | 荼 | H8-Y | H823 | H8=3 | H8H3 | H8' | X8-Y | X823 | X8=3 | X8H3 | X8' |
| 02541 | 莆 | +++A | H+A. | X+A. | [[[A | H[A. | X[A. | | | | |
| 02542 | 莧 | ++4R | H4R | X4R | [[4R | | | | | | |
| 02543 | 處 | TUAR | T7AR | U7AR | | | | | | | |
| 02544 | 彪 | TUR3 | TR3 | T7R3 | U7R3 | | | | | | |
| 02545 | 蛇 | OSUF | S.UF | SUF | OSU7 | S.U7 | SU7 | OSUF | OSU7 | | |
| 02546 | 蛀 | OS.E | S.E | OS.E | | | | | | | |
| 02547 | 蚶 | OSH2 | OSH= | S202 | S20= | 'SH2 | SH= | OSH2 | OSH= | | |
| 02548 | 蛄 | OS+O | S+O | OS+O | OS[O | S[O | OS[O | | | | |
| 02549 | 蚵 | OSJO | SJO | OSJO | | | | | | | |
| 02550 | 蛆 | OSA- | OS4- | OS4 | SA- | S4- | S4 | OSA- | OS4- | | |
| 02551 | 蛋 | LGOS | LGS | JGOS | JGS | GS | LGOS | JGOS | | | |
| 02552 | 蚱 | OSTK | OS'E | OSK | STI2 | STI= | S'E | | | | |
| 02553 | 蚯 | OS'O | SLT- | S'O | OS'O | | | | | | |
| 02554 | 蛉 | OS8P | S8.S | S8-S | S8.P | S8-P | S8P | OS8P | | | |
| 02555 | 術 | 'TYJ | TY.J | TY2J | TY=J | TYJ | ]Y.J | ]YJ | | | |
| 02556 | 袞 | T2OK | T8OK | | | | | | | | |
| 02557 | 袈 | COTK | C'OK | JOTK | J'OK | | | | | | |
| 02558 | 被 | KUIX | KEX | | | | | | | | |
| 02559 | 袒 | KB- | | | | | | | | | |
| 02560 | 袖 | KIQ | | | | | | | | | |
| 02561 | 袍 | KUOL | KUPL | KUCL | KUL | KCOL | KCPL | KCCL | K'CL | KJOL | KJPf |
| | | KJCL | K'JL | | | | | | | | |
| 02562 | 袋 | TMTK | TMK | | | | | | | | |
| 02563 | 覓 | '34R | A4R | | | | | | | | |
| 02564 | 規 | +K4R | +KR | -K4R | -KR | [K4R | [KR | | | | |
| 02565 | 訪 | 40TD | 40D | ;TD | ;D | | | | | | |
| 02566 | 訝 | 40CJ | ;CJ' | ;CJ | | | | | | | |
| 02567 | 訣 | 40LK | ;LK | | | | | | | | |
| 02568 | 訥 | 40UT | ;UT | ;A | | | | | | | |
| 02569 | 許 | 40T+ | ;'-+ | ;'2I | ;'=I | ;'HI | ;T+ | 40T[ | ;'-[ | ;T[ | |
| 02570 | 設 | 40RX | ;RX | | | | | | | | |
| 02571 | 訟 | 408S | 402S | ;8S | ;2S | | | | | | |
| 02572 | 訛 | 40TF | ;TF | 40T7 | ;T7 | | | | | | |
| 02573 | 訢 | 40LT | ;LT | | | | | | | | |
| 02574 | 敗 | -K+X | -KX | OK+X | OKX | .+X | .X | -K[X | OK[X | .[X | |
| 02575 | 豚 | A'Z | A-CL | | | | | | | | |
| 02576 | 販 | 42LX | 48LX | | | | | | | | |
| 02577 | 責 | E42 | E48 | IE42 | IE48 | | | | | | |

| | | | | | | | | | | | |
|---|---|---|---|---|---|---|---|---|---|---|---|
| 02578 | 貢 | Q-42 | Q-48 | Q42 | Q48 | | | | | | |
| 02579 | 貨 | TF42 | TF48 | TF2 | TF8 | T742 | T748 | T72 | T78 | | |
| 02580 | 貪 | 8L42 | 8L48 | 8J42 | 8J48 | | | | | | |
| 02581 | 貫 | 8D42 | 8D48 | 2D42 | 2D48 | 8D2 | 8D8 | 2D2 | 2D8 | =D42 | =D48 |
| | | =D2 | =D8 | | | | | | | | |
| 02582 | 敍 | H4PX | | | | | | | | | |
| 02583 | 敖 | H4TX | | | | | | | | | |
| 02584 | 趾 | OGG | | | | | | | | | |
| 02585 | 跌 | OG+K | OG-K | OG2T | OG=T | OGH8 | OGK | G+K | G-K | G2T | G=T |
| | | GH8 | GK | OG[K | | | | | | | |
| 02586 | 軛 | HQLL | QLJL | QLCL | QLL | | | | | | |
| 02587 | 軟 | -Q-- | +Q+- | HQUT | QUT | [Q[- | | | | | |
| 02588 | 這 | T2OZ | T=OZ | 4OZ | ;Z | TXZ | .XZ | | | | |
| 02589 | 逍 | 3AZ | | | | | | | | | |
| 02590 | 通 | SUHZ | SAZ | | | | | | | | |
| 02591 | 逗 | -OKZ | | | | | | | | | |
| 02592 | 連 | +Q+Z | -Q-Z | HQZ | QZ | [Q[Z | | | | | |
| 02593 | 速 | YOZ | | | | | | | | | |
| 02594 | 逝 | FLTZ | | | | | | | | | |
| 02595 | 逐 | ZLZ | ZZ | | | | | | | | |
| 02596 | 逕 | -3HZ | 3HZ | | | | | | | | |
| 02597 | 逞 | OEZ | | | | | | | | | |
| 02598 | 造 | 'HOZ | | | | | | | | | |
| 02599 | 透 | YSZ | 'YSZ | YS'Z | Y'SZ | ''SZ | 'S'Z | | | | |
| 02600 | 逢 | XEZ | 'XEZ | | | | | | | | |
| 02601 | 逖 | ZWZ | | | | | | | | | |
| 02602 | 逛 | ZEZ | | | | | | | | | |
| 02603 | 途 | 8-YZ | 823Z | 8=3Z | 8YZ | 83Z | | | | | |
| 02604 | 部 | TKOP | | | | | | | | | |
| 02605 | 郭 | TOZP | TZP | | | | | | | | |
| 02606 | 都 | H'BP | HBP | | | | | | | | |
| 02607 | 酗 | -QXU | -QUX | -QU | 9XU | 9UX | 9U | | | | |
| 02608 | 野 | QHSJ | | | | | | | | | |
| 02609 | 釵 | 8KX. | 8KX | $X. | $X | 6X. | 6X | | | | |
| 02610 | 釦 | 8E2O | 8KO | $O | 6O | | | | | | |
| 02611 | 釣 | 8KC- | 8KC. | $'C- | $'C. | $C- | 6'C- | 6'C. | 6C- | | |
| 02612 | 釧 | 8E23 | 8K3I | 8K3 | $'II | $III | $3I | $3 | 6'II | 6III | 63 |
| | | 63 | | | | | | | | | |
| 02613 | 釭 | 8E2H | 8KH | $H | 6H | | | | | | |
| 02614 | 釩 | 8KR. | 8KR | $R. | $R | 6R. | 6R | | | | |
| 02615 | 閉 | PPJ' | PPJ | M-J' | MJ' | | | | | | |
| 02616 | 陪 | PTKO | | | | | | | | | |
| 02617 | 陵 | PH2X | PH8X | PHRX | PHX | | | | | | |
| 02618 | 陳 | PYB | PYQ | P-L3 | | | | | | | |
| 02619 | 陸 | PH2H | PH8H | P6 | | | | | | | |
| 02620 | 陰 | P8LS | P8JS | P8SS | | | | | | | |
| 02621 | 陴 | P'Q4 | P'Q+ | PQ4 | PQ+ | P'Q[ | PQ[ | | | | |
| 02622 | 陶 | PCHE | PCE | P'CE | | | | | | | |
| 02623 | 陷 | PDEE | PD2E | PUEE | PU2E | PD; | PU; | | | | |
| 02624 | 陬 | PPX | P-4X | P4X | | | | | | | |
| 02625 | 雀 | 3'IE | 3'TE | 3''E | 3'E | | | | | | |
| 02626 | 雪 | MC- | ME | -AC- | -AE | TAE | TAC- | -C- | -E | | |
| 02627 | 雩 | M2C | M=C | M-S | M-5 | -A2C | -A=C | -A-S | -A-5 | TA2C | TA= |
| | | TA-S | TA-5 | -2C | -=C | --S | --5 | | | | |
| 02628 | 章 | TKB+ | TKB[ | | | | | | | | |
| 02629 | 竟 | TKBR | TBR | | | | | | | | |
| 02630 | 頂 | JT42 | JT48 | -JT2 | -JT8 | JT2 | JT8 | | | | |
| 02631 | 頃 | FT42 | FT48 | FT2 | | | | | | | |
| 02632 | 魚 | UQ4 | | | | | | | | | |
| 02633 | 鳥 | 'BS4 | BS4 | 'B54 | B54 | | | | | | |
| 02634 | 鹵 | TOX4 | TOX | TO4X | TO4 | TOX4 | TO4X | | | | |
| 02635 | 鹿 | LHFF | LH2F | LHF | .LHF | LH77 | LH27 | LH7 | .LH7 | .LH% | LHz |
| 02636 | 麥 | KTTA | K2TA | -3TA | | | | | | | |
| 02637 | 麻 | .LYY | LYY | .L2Y | L2Y | | | | | | |
| 02638 | 傢 | T.UZ | TUZL | TUZ | | | | | | | |
| 02639 | 傍 | TTUD | TT2D | | | | | | | | |
| 02640 | 傅 | T+AJ | T+J | T[AJ | T[J | | | | | | |
| 02641 | 備 | TH'A | THA | | | | | | | | |
| 02642 | 傑 | TAHY | TAY | | | | | | | | |
| 02643 | 傀 | T'QR | TQRS | TQR | | | | | | | |
| 02644 | 傖 | T8EO | | | | | | | | | |
| 02645 | 傘 | 84X+ | 84+ | 84T+ | 8T+ | 84X[ | 84[ | 84T[ | 8T[ | | |
| 02646 | 傚 | TTXX | | | | | | | | | |

02647 最 BPX B-4X
02648 凱 E-KR EOKR EKR E.R
02649 割 UEOJ UOJ
02650 剴 E-KJ EOKJ E.IJ E.J
02651 創 8EOJ 8OJ
02652 剩 'YFJ YFFJ Y2FJ 'Y7J Y77J Y27J 'FFJ '2FJ '77J '27.
*IJ *J
02653 勞 WWUC 2WUC WUC =WUC 2UC =UC HUC KUC XUC
02654 勝 A2HC A2C
02655- 勛 O42C O48C O2C O8C O2C' O8C'
02656 博 ++AJ [[AJ
02657 厥 LKUT LKE- LKET LKT
02658 啻 T2UO TUEO
02659 喀 OUXO
02660 喧 OU2B OU=B OUB- OUB
02661 啼 OT2E OTUE
02662 喊 O-OM OOM OMO
02663 喝 OBCL OBC
02664 喘 OETA OEA OEM
02665 喂 OQ-K OQK
02666 喜 HOHO HOKO HOXO
02667 喪 HOOK H2OK HO-K +OOK +O-K +OK [OOK [O-K [OK
02668 喔 OPSH OPH
02669 喇 OYOJ OYOJ OYJ
02670 喋 OHLY OHY
02671 喃 O+UH O[UH
02672 喳 OYB- OYB
02673 單 OOQ+ 2OQ+ =OQ+ OOB+ 2OB+ =OB+ 2Q+ =Q+ OOQ[ 2OQ[
=OQ[ OOB[ 2OB[ =OB[ 2Q[ =Q[ @
02674 喟 OQA
02675 唾 O'HH OHHH OHXH
02676 喲 ON3C ONC- ONC.
02677 喚 OD4K OU4K OD42 OU42 OD48 OU48 ODAK OUAK ODA2 OUA2
ODA8 OUA8 ODQK OUQK ODQ2 OUQ2 ODQ8 OUQ8
02678 喻 O8AJ
02679 喬 'KOA -KOA 2TOA =TOA H8OA KOA KOUO
02680 喱 OLQH OLH
02681 啾 O'YW OYW O'W
02682 喉 OTCK OTC- OT-
02683 喫 OEDK OEK
02684 喙 OLLZ OOZL OOZ
02685 圍 OHOH OHH O22 O=2 O2'I O='I O2II O=II O# O#
02686 堯 HHHR 3H-R
02687 堪 HH2L HH8L HHRL HHL- HHL IHHL
02688 場 HB-C
02689 堤 HB-G HBG IHBG
02690 堰 HCBV HCV IHCV
02691 報 HHPX HHPL
02692 堡 TOYH TYH
02693 堝 HQUO HAUO IHQA
02694 堠 HTCK HTC-
02695 壹 HU-K HUOK HU. H1
02696 壺 HUU- HUUU HUU
02697 奠 8-QK 2-QK =-QK KQK 89K 29K =9K
02698 婷 VTOJ VTJ
02699 媚 VB'4 VPI4 VP4
02700 婿 VLGA VJGA VGA
02701 媒 VH2Y VH=Y VH-Y VHY
02702 媛 VAHX VAX
02703 媧 VQUO
02704 孳 KNNZ K2NZ KNZ- KNZ
02705 孱 PZZZ P3Z- P3Z
02706 寒 UH82 UH8= UH2 UH=
02707 富 U-OQ U-Q UOQ
02708 寓 UQUS UQA
02709 寐 UUUY UULY UUTY UK+Y UK-Y UKY UK[Y
02710 尊 2-QJ =-QJ 8-QJ KQJ 29J =9J 89J
02711 尋 EHOJ EHRJ
02712 就 TO3K T3.K T3K. T3K
02713 嵌 IUHT IUH- EHUT EH2- EH=- E2O- \HUT \H2- \H=- \2O
02714 嵐 IURS ER-S ER'S ERS \R-S \R'S \RS
02715 崴 IUVM E-VM EVM EM-V EMV \-VM \VM \M-V \MV
02716 嵇 'YKE YKE 'KIU 'KE 'YK\ YK\ 'K\

```
02717 巽 LLH2 LLH8 LHH2 LHH8 LH8  -2H2 -2H8 -8H2 -8H8 KHH
         KHH8
02718 幅 UI-Q UIOQ E-OQ E-Q  EOQ
02719 帽 UIB4 UI4  EU24 EB4
02720 幀 UIT2 UIT8 UI2  UI8  ET42 ET48 ET2  ET8
02721 幃 UIHH EHOH
02722 幾 NNTM NNMT NTM  NMT  NNKM NNKT NKM  2NTM 2NMT =NT
         =NMT 2NKM 2NMK =NKM =NMK
02723 廊 LBSP LBKP LBP  LBFP LB7P
02724 廁 L42J L48J L4J
02725 廂 LY4  .LY4
02726 廄 LBSX LBX  LBFX LB7X
02727 弼 5TB5 5B5
02728 彭 HOK3 HK3
02729 復 'TTX ]TBX ]TX
02730 循 'TL4 TL+4 ]L+4 ]L4  TL[4 ]L[4
02731 徨 'TBE ]'BE ]BE
02732 惑 O-MG MO-G OMG  MOG
02733 惡 2UUG =UUG 2UG  =UG  -U-G
02734 悲 23IG EEG  =3IG
02735 悶 PPG  MG
02736 惠 +ASG +AG  [ASG [AG
02737 愜 ICKT
02738 愣 I24D I4TD I4D
02739 惺 I2BE IB'E IBE
02740 愕 I2OC I2OS IOOC IO-S IOC  IOS
02741 惰 I2+A I+HA I+A  I2[A I[HA I[A
02742 惻 I24J I42J I48J I4J
02743 惴 I2EM IETA IEM
02744 慨 I2BR IBFR IBSR IB7R IBR
02745 惱 I23Q I3LQ I3QX I3Q
02746 愎 I2TX ITBX ITX
02747 惶 I2BE I'BE IBE
02748 愉 I28J I8AJ I8J
02749 愀 I2YW I'YW IYW  I2'W I'W
02750 愒 I2BL IBCL IBL
02751 戟 TB+M T+M  TB[M T[M
02752 扉 'PEE 'P2E .PEE .P2E
02753 掣 HEJF HJF  HJEJ HJ3J
02754 掌 3UOF 3UEJ 3U3J
02755 描 FHQ  F++Q FXQ  F[[Q
02756 揀 FY4
02757 揩 FFFB F2FB F77B F27B F7'B F%'B F%B
02758 揉 FSJY FSY
02759 揆 FW'K FW-K FW2T FW=T FWH8 FWK
02760 揍 FE8K F3TK
02761 插 FHEE F'+; FH;  F'[;
02762 揣 FETA FEM
02763 提 FB-G FBG
02764 握 FPSH FPH
02765 揖 FOP  FO-4 FO4
02766 揭 FBCL
02767 揮 FUHQ FUQ
02768 捶 FHHH
02769 援 FAHX
02770 揪 F'YW FYW  F'W
02771 換 FU4K FU42 FU48 FUAK FUA2 FUA8 FUQK FUQ2 FUQ8
02772 摒 FP2H FPH
02773 揚 FB-C FBC  FBC2
02774 揹 FFFA F2FA F77A F27A
02775 敞 3ATX 3UOX 3AX
02776 敦 TZTX TZX  TOZX
02777 敢 TPTX HPTX TPX  T4TX H4TX
02778 散 HATX HAX
02779 斑 ETXE
02780 斐 EETX 2ETX =ETX
02781 斯 H2LT H=LT H8LT
02782 普 2H2B =H2B =H=B K4-B 2HB  =HB  K4B
02783 晰 BYLT BYT
02784 晴 BEA  BIEA
02785 晶 BBB
02786 景 BTO3 B+O3 BT3I B+3  BO3  B[O3 B[3
02787 暑 BH'B BHB
```

| | | | | | | | | | | | |
|---|---|---|---|---|---|---|---|---|---|---|---|
| 02788 | 智 | TKOB | TOB | KOB | | | | | | | |
| 02789 | 晾 | BTO3 | BT3- | BT3 | | | | | | | |
| 02790 | 晷 | BATO | BAO | BTO | | | | | | | |
| 02791 | 曾 | 24B | 2QB | =4B | =QB | | | | | | |
| 02792 | 替 | KKB | 2KB | =KB | 2+KB | =+KB | 2-KB | 22TB | =2TB | ==TB | 2[▸ |
| | | =[KB | | | | | | | | | |
| 02793 | 期 | H2KA | H=KA | HKA | H22A | H28A | | | | | |
| 02794 | 朝 | +B+A | +BA | [B[A | [BA | | | | | | |
| 02795 | 棺 | Y.UB | YUOO | YUB、 | | | | | | | |
| 02796 | 棕 | YU23 | YU3 | YU-Y | YUY | | | | | | |
| 02797 | 棠 | 3UOY | | | | | | | | | |
| 02798 | 棘 | YUYU | YUY- | | | | | | | | |
| 02799 | 棗 | YUYU | YUYI | | | | | | | | |
| 02800 | 椅 | YKJO | YKJ | | | | | | | | |
| 02801 | 棟 | YYB | YYQ | Y-L3 | | | | | | | |
| 02802 | 棵 | YQY | | | | | | | | | |
| 02803 | 森 | YYY | | | | | | | | | |
| 02804 | 棧 | YMM | Y2M | | | | | | | | |
| 02805 | 棹 | YTB+ | YTB[ | | | | | | | | |
| 02806 | 棒 | YE8H | Y3TH | | | | | | | | |
| 02807 | 棲 | Y-EV | Y+EV | Y-V | Y+V | YEV | Y[EV | Y[V | | | |
| 02808 | 棣 | YE3 | YE4 | YEI3 | YEI4 | | | | | | |
| 02809 | 棋 | YH22 | YH=2 | YH28 | YH=8 | YH2K | YH=K | | | | |
| 02810 | 棍 | YBFF | YB2F | YBF | YB77 | YB27 | YB7 | YB% | | | |
| 02811 | 植 | Y+4L | Y+4- | Y[4L | Y[4- | YI | | | | | |
| 02812 | 椒 | YTYX | YG3X | YGX | YYX | | | | | | |
| 02813 | 椎 | YTHH | YT.E | YTTE | YTE | Y'E | | | | | |
| 02814 | 棉 | YBUI | Y'BE | YBE | | | | | | | |
| 02815 | 棚 | YAA | Y2A | Y2U2 | Y2U= | | | | | | |
| 02816 | 桔 | YH'B | YHB | | | | | | | | |
| 02817 | 棊 | H2DY | H8DY | HDY | | | | | | | |
| 02818 | 款 | H3UT | HYUT | H23T | H23- | H=3- | H3- | H-Y- | | | |
| 02819 | 欺 | H2UT | H8UT | H2K- | H=K- | H22- | H=2- | H28- | H8- | | |
| 02820 | 欽 | 8KUT | 8E2- | 8K- | $UT | $- | 6UT | 6- | | | |
| 02821 | 殘 | -AMM | -A2M | AMM | | | | | | | |
| 02822 | 殖 | -A+L | -A+- | A+4L | A+4- | -A[L | -A[- | A[4L | A[4- | -AI | AI |
| 02823 | 殼 | HRRX | | | | | | | | | |
| 02824 | 毯 | ELWW | EL2W | 3LWW | 3L2W | | | | | | |
| 02825 | 氮 | 7WW | 72W | TZWW | TZ2W | TLWW | TL2W | | | | |
| 02826 | 氯 | 70-3 | 703 | 70-4 | 704 | TZ03 | TZ04 | TL03 | TL04 | | |
| 02827 | 氬 | 72UU | 7=UU | 72U | 7=U | TZ2U | TZ=U | TL2U | TL=U | | |
| 02828 | 港 | 3H8L | 3HOL | 3HPL | 3HCL | | | | | | |
| 02829 | 游 | 3TDZ | 3DTZ | 3DZ | | | | | | | |
| 02830 | 湔 | 3KAJ | 3KJ | | | | | | | | |
| 02831 | 渡 | 3LHX | | | | | | | | | |
| 02832 | 渲 | 3U2B | 3U=B | 3UB- | | | | | | | |
| 02833 | 湧 | 3SAC | 3SC | | | | | | | | |
| 02834 | 湊 | 3E8K | 3EK | | | | | | | | |
| 02835 | 渠 | 3CCY | 3EY | | | | | | | | |
| 02836 | 渥 | 3PSH | 3PH | | | | | | | | |
| 02837 | 渣 | 3YB- | | | | | | | | | |
| 02838 | 減 | 3-OM | 3M-O | 3OM | 3MO | | | | | | |
| 02839 | 湛 | 3H2L | 3H=L | 3H8L | 3HRL | | | | | | |
| 02840 | 湘 | 3Y4 | | | | | | | | | |
| 02841 | 渤 | 3+ZC | 3+C | 3[ZC | 3[C | | | | | | |
| 02842 | 湖 | 3+OA | 3[OA | | | | | | | | |
| 02843 | 湮 | 3-4H | 34H | | | | | | | | |
| 02844 | 渭 | 3QA | | | | | | | | | |
| 02845 | 渦 | 3QUO | | | | | | | | | |
| 02846 | 湯 | 3B-C | 3BC | 3BC2 | | | | | | | |
| 02847 | 渴 | 3BCL | 3BL | | | | | | | | |
| 02848 | 湍 | 3ETA | 3EM | | | | | | | | |
| 02849 | 渺 | 343' | 343 | | | | | | | | |
| 02850 | 測 | 342J | 348J | 34J | | | | | | | |
| 02851 | 湃 | 3E40 | 3EHH | 3E'E | | | | | | | |
| 02852 | 渝 | 38AJ | 38J | | | | | | | | |
| 02853 | 渾 | 3UHQ | 3UQ | | | | | | | | |
| 02854 | 滋 | 3KNN | 3K2N | 3KN | 3HNN | 3H2N | 3HN | 3XNN | 3X2N | 3XN | |
| 02855 | 溉 | 3BFR | 3BSR | 3B7R | 3BR | | | | | | |
| 02856 | 渙 | 3U4K | 3U42 | 3U48 | 3UAK | 3UA2 | 3UA8 | 3UQK | 3UQ2 | 3UQ8 | 3U |
| 02857 | 湎 | 3TOH | 3TQ | 3TOH | | | | | | | |
| 02858 | 湣 | 3OKB | 3CKB | 3OB | | | | | | | |
| 02859 | 湄 | 3B'4 | 3P4 | 3PI4 | 3B4 | | | | | | |

| | | |
|---|---|---|
| 02860 | 湲 | 3AHX |
| 02861 | 湮 | 3HQH |
| 02862 | 湄 | 3'BE 3BE |
| 02863 | 焙 | WTKO WTO |
| 02864 | 焚 | YYW 2YW =YW |
| 02865 | 焦 | THH4 T.E4 TTE4 TE4 'E4 |
| 02866 | 焰 | WUEE WU2E WUE WU: WDEE WD2E WDE WD; |
| 02867 | 無 | 'E-4 TE-4 |
| 02868 | 然 | A.K4 AK.4 AK4 |
| 02869 | 煮 | H'BW H'B4 HBW |
| 02870 | 焜 | WBFF WB2F WBF WB77 WB27 WB7 WB% |
| 02871 | 牌 | UUQ4 UUQ+ ULQ4 ULQ+ UTQ4 UTQ+ K'Q4 K'Q+ KQ4 KQ+ UUQ[ ULQ[ UTQ[ K'Q[ KQ[ |
| 02872 | 犄 | 'FKJ ZKJO ZKJ |
| 02873 | 犀 | P3'H P3T+ P4'H P4T+ P4H P3T[ P4T[ |
| 02874 | 猶 | Z2-Q Z8-Q ZKQ Z29 Z89 |
| 02875 | 猥 | ZQ-K ZQK |
| 02876 | 猴 | ZTCK ZTK ZTC- ZT- |
| 02877 | 猩 | ZB'E ZBE |
| 02878 | 琺 | E3HS E3S |
| 02879 | 琪 | EH22 EH=2 EH2K EH=K EH28 EH=8 |
| 02880 | 琳 | EYY E2Y |
| 02881 | 琢 | EZL. EZ. |
| 02882 | 琥 | ETUR ETR ET7R EU7R |
| 02883 | 琵 | EEFF 2E2F =E2F =E=F EE77 2E27 =E27 =E=7 EE% 2E( =E% |
| 02884 | 琶 | EEBL 2EBL =EBL EEL 2EL =EL |
| 02885 | 琴 | EE8L 2E8L =E8L EE8J |
| 02886 | 琯 | E.UB EUOO EUB |
| 02887 | 琛 | EU2Y EU8Y EURY EUY |
| 02888 | 琦 | EKJO EKJ |
| 02889 | 琨 | EBFF EB2F EBF EB77 EB27 EB7 EB% |
| 02890 | 甥 | 'EQC EQC EQC' |
| 02891 | 甦 | -QXE -X'E TQXE TX'E -XE TXE |
| 02892 | 畫 | EHQ- EHQ -BE -QE -BIU -QIU TQE TQIU -B\ -Q\ Q\ |
| 02893 | 番 | '2YQ '3YQ AYQ |
| 02894 | 痢 | L2YJ L2'J L'YJ LYJ L'J |
| 02895 | 痛 | L2SA LSUH LSA |
| 02896 | 痣 | L2HG LHG |
| 02897 | 痙 | L23H L-3H L3H |
| 02898 | 痘 | L2-K L2OK L2. L-OK L-K LOK |
| 02899 | 痞 | L23O L-3O L3O LT8O |
| 02900 | 痠 | L2SX LS2X LS8X LSRX LSX |
| 02901 | 登 | W-OK WOK W. |
| 02902 | 發 | W5RX W5X |
| 02903 | 皖 | 'BUR |
| 02904 | 皓 | 'BHO B'HO 'BO BHO |
| 02905 | 皴 | SXEX SXX |
| 02906 | 盜 | 3UT4 3-4- 2UT4 2-4- =UT4 =-4- |
| 02907 | 睏 | 4OY 4OY |
| 02908 | 短 | TK-K |
| 02909 | 硝 | TO3A +3A [3A |
| 02910 | 硬 | TO-X TOTX TOQX +-QX +TQX +TX +QX [-QX [TQX [TX [QX |
| 02911 | 硯 | TO4R +4R [4R |
| 02912 | 稍 | 'Y3A '3A |
| 02913 | 稈 | 'YBH 'BHI 'B2I 'B=I 'B-+ 'BH 'B-[ |
| 02914 | 程 | 'YOE 'O'H 'OE |
| 02915 | 稅 | 'Y2R 'Y8R '2OR '8OR '2R |
| 02916 | 稀 | 'YXE 'X+E 'X[E |
| 02917 | 窘 | U2EO U8EO UREO |
| 02918 | 窗 | U2OA U8OA UROA UOA U2OA U8OA UROA UOA U2'Q U8' UR'Q U'Q |
| 02919 | 窖 | U2HO U8HO URHO U'HO |
| 02920 | 童 | TKQH |
| 02921 | 竣 | TK2X TK8X |
| 02922 | 等 | FFHJ /IHJ /HJ. /HJ = |
| 02923 | 策 | FFYU /YU |
| 02924 | 筆 | FFEH /EHI /E2O /EH /E++ /E2I /E=I /EX /E[[ |
| 02925 | 筐 | FFCE /CE |
| 02926 | 筒 | /U-O |
| 02927 | 答 | FF8O /8-O /8O |

| | | | | | | | | | | | |
|---|---|---|---|---|---|---|---|---|---|---|---|
| 02928 | 筍 | FFCB | /'CB | /CB | | | | | | | |
| 02929 | 筋 | FFAC | /AC' | /AC | | | | | | | |
| 02930 | 筏 | FFTM | /TM | | | | | | | | |
| 02931 | 筑 | FFHR | /HR. | /HR | | | | | | | |
| 02932 | 粟 | -42Y | | | | | | | | | |
| 02933 | 粥 | 52Y5 | 5Y5 | | | | | | | | |
| 02934 | 絞 | NT2X | NT8X | | | | | | | | |
| 02935 | 結 | N3HO | NIHO | N+-O | NHO | N[-O | | | | | |
| 02936 | 絨 | N3+M | N3M+ | N+M | NM+ | N3[M | N3M[ | N[M | NM[ | | |
| 02937 | 絕 | N3DL | N3UL | NDBL | NUBL | NDL | NUL | | | | |
| 02938 | 紫 | GFN3 | GF3 | GFN | G7N3 | G73 | G7N | | | | |
| 02939 | 絮 | VON3 | VON | VO3 | | | | | | | |
| 02940 | 絲 | N3N3 | 2N3 | =N3 | NN | 2N | | | | | |
| 02941 | 絡 | N3XO | N'XO | NXO | | | | | | | |
| 02942 | 給 | N380 | N8-O | N8O | | | | | | | |
| 02943 | 絢 | N3CB | NCB | N'CB | | | | | | | |
| 02944 | 絰 | N3SH | N-SH | NSH | | | | | | | |
| 02945 | 絳 | N3XH | NXH | N'XH | | | | | | | |
| 02946 | 善 | 2EKO | 2EHO | 2EO | =EKO | =EHO | =EO | | | | |
| 02947 | 翔 | 2EEE | 2E2E | =EEE | =E=E | 2E2 | =E2 | | | | |
| 02948 | 翕 | 8-EE | 8-2E | 8OEE | 8O2E | 8OE | 8-2 | 8O2 | | | |
| 02949 | 耋 | H'FH | HFSH | HFH | H'7H | H7SH | H7H | | | | |
| 02950 | 聒 | P'+O | P-+O | PHIO | PHO | -4HO | 4'+O | 4-+O | 4HIO | 4HO | P'[O |
| | | P-[O | 4'[O | 4-[O | | | | | | | |
| 02951 | 肅 | EK+K | EK-K | EKK+ | E1KK | EI2K | EIA | EK[K | EKK[ | | |
| 02952 | 腕 | AUAL | AUL | | | | | | | | |
| 02953 | 腔 | AU2H | AU8H | AURH | AUH | | | | | | |
| 02954 | 腋 | ATTA | | | | | | | | | |
| 02955 | 腑 | ALTJ | ALJ | | | | | | | | |
| 02956 | 腎 | CUXA | EXA | | | | | | | | |
| 02957 | 脹 | AE-K | AEK | | | | | | | | |
| 02958 | 腆 | AUHK | AQ2 | AQ8 | | | | | | | |
| 02959 | 脾 | A'Q4 | A'Q+ | AQ4 | AQ+ | A'Q[ | AQ[ | | | | |
| 02960 | 腌 | AKQL | AKL | | | | | | | | |
| 02961 | 腓 | AEE | A2E | | | | | | | | |
| 02962 | 腴 | AEET | A2ET | AET | A:T | | | | | | |
| 02963 | 舒 | 8OSJ | 8OJ | | | | | | | | |
| 02964 | 舜 | AUAH | AUH | | | | | | | | |
| 02965 | 菩 | HTKO | XTKO | | | | | | | | |
| 02966 | 萃 | ++T+ | HTT+ | HT4+ | HT+ | XTT+ | XT4+ | XT+ | [[T[ | HTT[ | HT4[ |
| | | HT[ | XTT[ | XT4[ | XT[ | | | | | | |
| 02967 | 菸 | HTD2 | HD2 | HTD= | HD= | XTD2 | XD2 | XTD= | XD= | | |
| 02968 | 萍 | H3H2 | X3H2 | | | | | | | | |
| 02969 | 菠 | H3EX | X3EX | | | | | | | | |
| 02970 | 菅 | ++UB | H.UB | HUB | X.UB | XUB | [[UB | | | | |
| 02971 | 萋 | H-EV | H+EV | H-V | H+V | HEV | X-EV | X+EV | X-V | X+V | XEV |
| | | H[EV | H[V | X[EV | X[V | | | | | | |
| 02972 | 菁 | ++EA | HEA | HIEA | XEA | XIEA | [[EA | | | | |
| 02973 | 華 | H-HH | H-XH | X-HH | X-XH | | | | | | |
| 02974 | 菱 | HH2X | HH8X | HHRX | HHX | XH2X | XH8X | XHRX | XHX | | |
| 02975 | 菴 | HKQL | HKL | XKQL | XKL | | | | | | |
| 02976 | 著 | ++HB | HH'B | XH'B | [[HB | | | | | | |
| 02977 | 萊 | ++YT | HYTT | HY2T | HYT | XYTT | XY2T | XYT | [[YT | | |
| 02978 | 菰 | ++ZS | HZAS | HZS | XZAS | XZS | [[ZS | | | | |
| 02979 | 萌 | ++BA | HBA | XBA | [[BA | | | | | | |
| 02980 | 菌 | ++OY | ++O' | HO'Y | HOY | HO'Y | HO' | XO'Y | XOY | XO'Y | XO' |
| | | [[OY | [[O' | | | | | | | | |
| 02981 | 菽 | ++GX | HTYX | HG3X | HGX | XTYX | XG3X | XGX | [[GX | | |
| 02982 | 菲 | ++EE | ++2E | HEE | H2E | XEE | X2E | [[EE | [[2E | | |
| 02983 | 菊 | ++CY | HC2Y | HCY | H'CY | XC2Y | XCY | X'CY | [[CY | | |
| 02984 | 萸 | ++ET | ++:T | HEET | HET | H:T | XEET | XET | X:T | [[ET | [[: |
| 02985 | 萎 | ++YV | ++'V | H'YV | HYV | H'V | X'YV | XYV | X'V | [[YV | [[' |
| 02986 | 萄 | ++CE | HCHE | HCE | XCHE | XCE | [[CE | | | | |
| 02987 | 菜 | H'3Y | HAY | X'3Y | XAY | | | | | | |
| 02988 | 萇 | ++EK | HE-K | HEK | XE-K | XEK | [[EK | | | | |
| 02989 | 菔 | HAPX | XAPX | | | | | | | | |
| 02990 | 菟 | HDBR | HUBR | HDR | XDBR | XUBR | XDR | | | | |
| 02991 | 虛 | TU74 | TU4- | T74- | T74 | U74- | U74 | | | | |
| 02992 | 蛟 | ST2X | ST8X | | | | | | | | |
| 02993 | 蛙 | OSHH | SHH | S2IH | OSHH | | | | | | |
| 02994 | 蛭 | OSSH | S-SH | SSH | OSSH | | | | | | |
| 02995 | 蛔 | OSOO | OSQ | SOO | SOO | OSOO | OSQ | | | | |
| 02996 | 蛛 | OSTY | S'+Y | S'-Y | STY | OSTY | S'[Y | | | | |

| | | | | | | | | | | | |
|---|---|---|---|---|---|---|---|---|---|---|---|
| 02997 | 蛤 | OS80 | S8-O | S80 | OS80 | | | | | | |
| 02998 | 蛐 | OSOH | OSQ | SOH | OSOH | SOH | OSOH | OSQ | OSOH | | |
| 02999 | 蛞 | A199 | | | | | | | | | |
| 03000 | 衕 | 'THJ | THHJ | T2HJ | ]HHJ | ]2HJ | | | | | |
| 03001 | 裁 | HTKM | HKM | HMTK | IHKM | | | | | | |
| 03002 | 裂 | -AJK | AJTK | AJK | | | | | | | |
| 03003 | 袱 | KT.K | KTK. | | | | | | | | |
| 03004 | 覃 | -4B+ | 4B+ | -4B[ | 4B[ | | | | | | |
| 03005 | 視 | 234R | -Y4R | K4R | K4'L | =34R | | | | | |
| 03006 | 註 | 40.E | ;.E | | | | | | | | |
| 03007 | 詠 | 40.3 | ;.3 | 40.4 | ;.4 | | | | | | |
| 03008 | 評 | 40K+ | ;K+ | ;H2I | ;HI2 | ;-2+ | ;H8I | ;HI8 | ;-8+ | 40K[ | ;K[ |
| | | ;-2[ | ;-8[ | | | | | | | | |
| 03009 | 詷 | ;C-O | ;J-O | | | | | | | | |
| 03010 | 証 | 40-G | ;-G | | | | | | | | |
| 03011 | 詁 | 40+O | ;+O | 40[O | ;[O | | | | | | |
| 03012 | 詔 | 40DO | 40UO | ;DO | ;UO | | | | | | |
| 03013 | 詛 | 40A- | 404- | 404 | ;A- | ;4- | ;4 | | | | |
| 03014 | 詐 | 40TK | 40'E | ;TI2 | ;TI= | ;TK | ;'E | | | | |
| 03015 | 詆 | 40K. | 4K- | ;K. | ;'K- | ;'K. | ;K | | | | |
| 03016 | 訴 | ;LT. | | | | | | | | | |
| 03017 | 診 | 4083 | ;83 | | | | | | | | |
| 03018 | 訶 | 40JO | ;JO | | | | | | | | |
| 03019 | 詖 | 40EX | ;UIX | ;EX | | | | | | | |
| 03020 | 象 | UBZL | UBZ | | | | | | | | |
| 03021 | 貂 | AZDO | AZUO | AZO | ZDO | ZUO | | | | | |
| 03022 | 貯 | 42UJ | 48UJ | | | | | | | | |
| 03023 | 貼 | 42TO | 48TO | 420 | 480 | 4I-O | 4TO | | | | |
| 03024 | 貳 | 242M | 22M | =42M | =2M | 248M | 28M | =48M | =8M | M242 | M=4= |
| | | M248 | M=48 | 2M | =M | M2 | M= | | | | |
| 03025 | 貽 | 42SO | 48SO | 420 | 480 | | | | | | |
| 03026 | 貢 | +H42 | +H48 | +X42 | +X48 | +H2 | +H8 | [H42 | [H48 | [X42 | [X48 |
| | | [H2 | [H8 | | | | | | | | |
| 03027 | 費 | 5242 | 5248 | 522 | 528 | 542 | 548 | 524 | | | |
| 03028 | 賀 | CO42 | CO48 | CO2 | CO8 | JO42 | JO48 | JO2 | JO8 | | |
| 03029 | 貴 | O-42 | O-48 | O42 | O48 | | | | | | |
| 03030 | 買 | 442 | 448 | | | | | | | | |
| 03031 | 貶 | 42TZ | 42'Z | 48TZ | 48'Z | 42Z | 48Z | | | | |
| 03032 | 貿 | SD42 | SD48 | SD4 | SD2 | SD8 | | | | | |
| 03033 | 貸 | TM42 | TM48 | TM4 | TM2 | TM8 | | | | | |
| 03034 | 越 | HGLM | HG'M | HGM' | HGM | GLM | G'M | GM' | | | |
| 03035 | 超 | HGDO | HGUO | GDO | GUO | HGO | | | | | |
| 03036 | 趁 | HG83 | HG3 | | | | | | | | |
| 03037 | 跎 | OGUF | GUF | OGU7 | GU7 | | | | | | |
| 03038 | 距 | OGCC | OGE | GCC | | | | | | | |
| 03039 | 跋 | OG+X | G+X. | OG[X | G[X. | | | | | | |
| 03040 | 跚 | OG40 | GUU- | G40 | | | | | | | |
| 03041 | 跑 | OGUL | OGCL | GUOL | GUPL | GUCL | GUL | GCOL | GCPL | GCCL | G'CL |
| | | GJOL | GJPL | GJCL | G'JL | | | | | | |
| 03042 | 跌 | OGTK | OG- | G'+K | G'-K | G'2T | G'=T | G'H8 | G'[K | | |
| 03043 | 跛 | OGEX | GUIX | GEX | | | | | | | |
| 03044 | 跆 | OG+Y | OG-Y | OGY | G+Y | G-Y | GY | OG[Y | G[Y | | |
| 03045 | 軻 | HQJO | Q-JO | QJO | | | | | | | |
| 03046 | 軸 | HQIQ | HQQ | QIQ | QQ | | | | | | |
| 03047 | 軼 | HQTK | HQ+K | HQ2T | HQ=T | Q'+K | Q'-K | Q'2T | Q'=T | QTK | Q+K |
| | | Q2T | Q=T | HQ[K | Q'[K | Q[K | | | | | |
| 03048 | 辜 | +OTH | +OH | [OTH | [OH | | | | | | |
| 03049 | 逮 | E3Z | E4Z | EI3Z | EI4Z | | | | | | |
| 03050 | 逯 | H2HZ | H8HZ | HRHZ | HHZ | 6Z | | | | | |
| 03051 | 週 | UHOZ | | | | | | | | | |
| 03052 | 逸 | UBRZ | UR.Z | URZ | | | | | | | |
| 03053 | 進 | THHZ | T.EZ | TTEZ | T'EZ | TEZ | 'EZ | | | | |
| 03054 | 逵 | YVZ | 'YVZ | 'VZ | | | | | | | |
| 03055 | 鄂 | O-SP | O-5P | O2CP | O=CP | OOSP | OO5P | OOCP | OSP | OCP | 2OSP |
| | | =OSP | 2O5P | =O5P | 2OCP | =OCP | | | | | |
| 03056 | 鄉 | HHHP | IQP | QP | | | | | | | |
| 03057 | 鄒 | NBFP | NBP | NBSP | NB7P | 3BP | 3BSP | 3BFP | 3B7P | 3-4P | 34P |
| 03058 | 鄄 | CBVP | CVP | | | | | | | | |
| 03059 | 酣 | -QH2 | -QH= | -QH- | 920- | 9=02 | 9H2 | 9H= | 9H- | | |
| 03060 | 酥 | -Q'Y | -QY | -Q' | 9'Y | 9Y | 9' | | | | |
| 03061 | 量 | B-QH | B-H | BQH | | | | | | | |
| 03062 | 鈔 | 8K3' | $3' | 63' | | | | | | | |
| 03063 | 鈕 | 8KC+ | 8KEI | 8KE | $C+ | $EI | $E | 6C+ | 6EI | 6E | 8KC[ |
| | | $C[ | 6[+ | | | | | | | | |

| | | | | | | | | | | | |
|---|---|---|---|---|---|---|---|---|---|---|---|
| 03064 | 鈣 | 8KGJ | $-GJ | $GJ | $T-C | 6-GJ | 6GJ | 6T-C | | | |
| 03065 | 鈉 | 8KUT | $UT | 6UT | | | | | | | |
| 03066 | 鈞 | 8KC= | 8KC2 | $'C= | $'C2 | $C= | $C2 | 6'C= | 6'C2 | 6C= | 6C2 |
| 03067 | 鈍 | 8K+L | $-UL | $+UL | $-EL | $+EL | $+L | $EL | $. | 6-UL | 6+UL |
| | | 6-EL | 6+EL | 6+L | 6EL | 6. | 8K[L | $[UL | $[EL | $[L | 6[UL |
| | | 6[EL | 6[L | | | | | | | | |
| 03068 | 鈴 | 8K8L | 8K8J | $8-L | $8.L | $8L | $8-J | $8.J | $8J | 68-L | 68.L |
| | | 68L | 68-J | 68.J | 68J | | | | | | |
| 03069 | 鈇 | 8K+K | 8K-K | 8K2T | 8K=T | $+K | $-K | $2T | $=T | $H8 | $--T |
| | | 6+K | 6-K | 62T | 6=T | 6H8 | 6--T | 8K[K | $[K | 6[K | |
| 03070 | 鈑 | 8KLX | $LX | 6LX | | | | | | | |
| 03071 | 閔 | PPTX | MTX | MX | | | | | | | |
| 03072 | 閒 | PPE | ME | | | | | | | | |
| 03073 | 開 | PPHH | PP22 | PPH | MHH | M22 | PP=2 | M=2 | | | |
| 03074 | 閑 | PPY | MY | | | | | | | | |
| 03075 | 間 | PPB | MB | | | | | | | | |
| 03076 | 閏 | PPA | MA | | | | | | | | |
| 03077 | 閎 | PP+S | M+S | M+'S | PP[S | M[S | M['S | | | | |
| 03078 | 隊 | P2Z | PKZ | P2ZL | | | | | | | |
| 03079 | 階 | PFFB | P2FB | PF'B | PFB | P77B | P27B | P7'B | P7B | P%'B | P%B |
| 03080 | 隋 | P+HA | P[HA | | | | | | | | |
| 03081 | 陽 | PB-C | PBC | PBC2 | | | | | | | |
| 03082 | 隅 | PQUS | PQA | | | | | | | | |
| 03083 | 隆 | PX'E | PX-E | PXE | | | | | | | |
| 03084 | 隍 | P'BE | PBE | | | | | | | | |
| 03085 | 隘 | PHHH | | | | | | | | | |
| 03086 | 隄 | PB-G | PBG | | | | | | | | |
| 03087 | 雁 | LTTE | LT'E | LTE | | | | | | | |
| 03088 | 雅 | CJTE | CJ'E | CJE | | | | | | | |
| 03089 | 雄 | +STE | +S'E | +SE | [STE | [S'E | [SE | | | | |
| 03090 | 集 | THHY | T.EY | TTEY | TEY | 'EY | EY | | | | |
| 03091 | 雇 | 'PTE | .PTE | 'P'E | .P'E | 'PE | .PE | PTHH | PT.E | PTTE | PTE |
| | | P'E | PE | | | | | | | | |
| 03092 | 雯 | MTX | -ATX | | | | | | | | |
| 03093 | 雲 | M2S | M=S | -A2S | -A=S | TA2S | TA=S | -2S | -=S | | |
| 03094 | 韌 | HOHD | HHD. | HHD' | HHD | | | | | | |
| 03095 | 項 | HT42 | HT48 | HT2 | | | | | | | |
| 03096 | 順 | 3T42 | 3T48 | 3T2 | 3T8 | 3IT2 | 3I2 | 3IT8 | 3I8 | | |
| 03097 | 須 | 3T42 | 3T48 | 3T2 | 3T8 | 3'T2 | 3'2 | 3'T8 | 3'8 | 3.T2 | 3.2 |
| | | 3.T8 | 3.8 | | | | | | | | |
| 03098 | 飧 | A1FC | | | | | | | | | |
| 03099 | 飪 | 8BSE | 8S'H | 8SE | 8BFE | 8F'H | 8FE | 8B7E | 87'H | 87E | 8'H |
| 03100 | 飯 | 8SLX | 8FRX | 87RX | 8LX | | | | | | |
| 03101 | 飩 | 8S+L | 8S-L | 8SEL | 8SL | 8S. | 8F+L | 8F-L | 8FEL | 8FL | 8F. |
| | | 87+L | 87-L | 87EL | 87L | 87. | 8+UL | 8+EL | 8+L | 8. | 8S[L |
| | | 8F[L | 87[L | 8[UL | 8[EL | 8[L | | | | | |
| 03102 | 飲 | 8SUT | 8ST | 8S- | 8FUT | 8FT | 8F- | 87UT | 87T | 87- | 8UT |
| | | 8- | | | | | | | | | |
| 03103 | 飭 | 8STC | 8SC | 8FTC | 8FC | 87TC | 87C | 8TC' | 8TC | | |
| 03104 | 馮 | 2EJ4 | 2EC4 | =EJ4 | =EC4 | 27 | =7 | | | | |
| 03105 | 馭 | EJ4X | EC4X | E4X | 7X | | | | | | |
| 03106 | 黃 | H-Q2 | H-Q8 | X-Q2 | X-Q8 | XQ2 | XQ8 | HQ2 | HQ8 | HHQ2 | HHQ8 |
| 03107 | 黍 | 'Y83 | 'Y84 | '83 | '84 | | | | | | |
| 03108 | 黑 | 4H4 | 44 | QH4 | | | | | | | |
| 03109 | 亂 | ASAL | AAL | HIOL | 2IOL | =IOL | -+OL | -[OL | | | |
| 03110 | 傭 | TLEA | | | | | | | | | |
| 03111 | 債 | TE42 | TE48 | TE2 | TE8 | TIE4 | TIE2 | TIE8 | | | |
| 03112 | 傲 | TEDX | | | | | | | | | |
| 03113 | 傳 | T+QJ | T+SJ | T+J | T[QJ | T[SJ | T[J | | | | |
| 03114 | 僅 | THOE | THOE | THE | | | | | | | |
| 03115 | 傾 | TFT2 | TFT8 | TFT4 | T7T2 | T7T8 | T7T4 | | | | |
| 03116 | 催 | TETE | TE'E | TIUE | T\TE | T\'E | T\E | | | | |
| 03117 | 傷 | TTBC | TTC | | | | | | | | |
| 03118 | 傻 | TU2X | TU8X | TURX | TUX | TUXX | TXUX | | | | |
| 03119 | 傯 | T'QG | TOAG | TOAG | | | | | | | |
| 03120 | 僇 | TEE3 | T2E3 | TE3 | T283 | | | | | | |
| 03121 | -剿 | 3QYJ | | | | | | | | | |
| 03122 | 劃 | TXEJ | TLEJ | TEJ | | | | | | | |
| 03123 | 剽 | -43J | 423J | 4-YJ | 43J | 4YJ | | | | | |
| 03124 | 募 | HBKC | XBKC | | | | | | | | |
| 03125 | 勦 | 3QYC | 3YC | 3YC' | | | | | | | |
| 03126 | 勤 | HOEC | HOEC | HEC | HEC' | | | | | | |
| 03127 | 勢 | HH9C | H9C | 69C | 69.C | 69C' | F9.C | | | | |

03128 勣 E42C E48C E2C E8C
03129 匯 C3TE C3'E C3E
03130 嗟 O2EH
03131 嗲 O3TQ
03132 嗓 O3XY OXY
03133 嗦 O+U3 O+UN O+3 O+N O[U3 O[UN O[3 O[N
03134 嗎 OEJ4 OEC4 OE4 O7
03135 嗜 OHFB OH7B
03136 嗇 HTOO HTOO HTTQ H2TQ
03137 嗑 OHS4
03138 嗣 OAJO OACO
03139 嗷 OE-S OEOS OEOS OES
03140 嗯 OOKG OOKG OQG
03141 嗚 OOS4 OO54 OO4
03142 嗡 O8SE O8EE O82E O2SE O2EE O22E O22
03143 嗅 O'4K O4.K O4K. O4K
03144 嗆 O8EO
03145 嗥 OBY- OBY O'BY
03146 嗉 OEN3 OE3 OEN
03147 園 OHOK OHK
03148 圓 OO42 OO48 O2R O=R OO42 OO48 OO8 O2R O=R
03149 塞 UE8H UEH
03150 塑 KEAH KAH
03151 塘 HLEO
03152 塗 38YH 38H
03153 塚 HUZ. IHUZ
03154 塔 HH8O HX8O HHO IHHO
03155 填 H+4K HF4K HFK IH+K IHFK H74K H7K IH7K H[4K IH[K
03156 塌 HBEE HB2E IHBE HB2 IHB2
03157 塭 HQ4- HQ4 IHQ4
03158 塊 H'QR HQRS HQR IHQR
03159 塢 HOS4 HO54 IHO4
03160 塒 HBHJ IHBJ
03161 塋 WWUH 2WUH =WUH WUIH WUH
03162 奧 'UYK 'OYK 'QK 'OY2 'OY8 'OY2 'OY8 UAYK OAY2 OAY8
OYK OY2 OY8 OYK OY2 OY8
03163 嫁 V.UZ VUZ
03164 嫉 VL2K VLTK
03165 嫌 VKE4
03166 媾 VEUH VEEA
03167 媽 VEJ4 VE4 VEC4 V7
03168 媼 VQ4- VQ4
03169 媳 V'4G V4G
03170 嫂 VEEX VEIX V;IX VEX V;X
03171 媲 VQFF VQ2F V'QF VQF VQ77 VQ27 V'Q7 VQ7 VQ%
03172 嵩 ETOA ETHA \TOA \THA
03173 嵯 E2EH IU2H \2EH
03174 幌 EB3R EBR UIBR \B3R \BR
03175 幹 HB8H HBH +B8H +B+H [B8H [B[H
03176 廉 LKE4 LK4
03177 廈 LT4X LTX
03178 弒 XYHM XYMH XYM
03179 彙 OUQY OUY AUQY AUY
03180 徬 'TTD ]T2D ]TUD
03181 微 TERX ]ERX T\RX ]\RX
03182 愚 QUSG QAG
03183 意 TKBG TBG
03184 慈 KNNG K2NG KNG
03185 感 -OMG M-OG OMG MOG
03186 想 Y4G
03187 愛 AUGX AU+X AU[X
03188 惹 H+OG H+G X+OG X+G H[OG H[G X[OG X[G
03189 愁 'YWG YWG 'WG
03190 愈 8AJG
03191 慎 I2+K I2FK I27K I+4K I+K IF4K IFK I74K I7K I2[K
I[4K I[K
03192 慌 I2H3 IHC3 I2X3 IXC3
03193 慄 I24Y I-4Y I4Y
03194 慍 I2Q4 IQ4- IQ4
03195 愾 I27Y I72Y ITZY ITLY
03196 愴 I8EO
03197 愧 I2QR I'QR IQRS IQR IR
03198 愍 OKXG CKXG OXG KXG

03199 猷 T3JG TJG
03200 愷 I2E. IE-K IEOK IE. I2\. I\-K I\OK I\.
03201 戡 H2LM H8LM
03202 戥 OPM O-4M O4M
03203 揍 F2EH
03204 揮 FU2E FU2K FU8E FU8K FURE FURK FUK. FU.K
03205 揣 FTOA FTHA
03206 搪 FLEO
03207 搭 FH8O FK8O FKO FX8O
03208 揉 FH8Y
03209 搬 F'AX FA-X
03210 搏 F+AJ F+J F[AJ F[J
03211 搜 FEEX FEIX F;IX F;X
03212 搔 FX2S FXS FX=S
03213 損 FO42 FO48 FO2
03214 搶 F8EO
03215 搖 FAHE FAE FAH\ FA\
03216 搗 FBSE FB5E FBS\ FB5\
03217 搆 FEUH FEEA FEA
03218 敬 HCOX HCTX KCOX KCTX HJOX HJTX HJX KJOX KJTX XCO
XJOX XCTX XJTX XJX
03219 斟 HL2+ HL=+ HL+ HL2[ HL=[ HL[
03220 新 TYLT TYT
03221 暗 BTKB
03222 暉 BUHQ BUH- BUH BUQ- BUQ
03223 暇 BP2X BP=X BPCX BPRX
03224 暈 BUHQ BUH BUHI BUQI BUQ
03225 暖 BAHX BAX
03226 暄 BU2B BU=B
03227 暘 BB-C
03228 暍 BBCL BBL
03229 會 8-4B 8-QB 84B 8QB 82S 8=S
03230 榔 Y-SP Y.SP Y-FP Y.FP Y-7P Y.7P Y-P Y.P
03231 業 4KE3 4K33 42E3 42HY 4KHY 4KY 4K3
03232 楚 YYLG 2YLG =YJG YYJG 2YJG =YJG YYG YLG YJG
03233 楷 YFFB Y2FB Y=FB YF'B YFB Y77B Y27B Y=7B Y7'B Y78
Y%'B Y%B
03234 楠 Y+UH Y[UH
03235 楔 YEDK
03236 極 YSOX YSO- YSX- YS- Y5OX Y5O- Y5X- Y5-
03237 椰 Y-4P Y4P YPP
03238 概 YBSR YBFR YB7R YBR
03239 楊 YB-C YBC2
03240 楨 YT42 YT48 YT2
03241 楫 YOP YO-4 YO4
03242 楞 Y4TD Y4D
03243 楓 YR-S YR'S YRS
03244 楹 YSX4 YS4- YS4
03245 榆 Y8AJ
03246 楝 YY4
03247 楣 YB'4 YPI4 YP4 YB4
03248 楛 YH+O YH[O
03249 歇 BCUT BLUT BCL- BL-
03250 歲 G-3M GM-3 G3'M GM3' GM3
03251 毀 EEHX EHRX EHX ;HRX ;HX
03252 殿 P2RX P2X P8RX P8X
03253 毓 TQT3 TQ3
03254 毽 ELEZ ELZ 3LEZ
03255 溢 3224 3884 3284 32K4 3K24 3K84 334- 344- 334 344
03256 溯 3KEA
03257 滓 3UTH
03258 溶 3U4O
03259 滂 3T2D 3TUD
03260 源 3LB3 3L3
03261 溝 3EUH 3EEA
03262 滇 3+4K 3+K 3F4K 3FK 374K 37K 3[4K 3[K
03263 滅 3-WM 3M-W 3WM 3MW
03264 溥 3+AJ 3+J 3[AJ 3[J
03265 溘 3HS4
03266 溼 3NNH 32NH 3-NH 3NH
03267 溺 3252 325= 355 325
03268 溫 3Q4- 3Q4
03269 滑 3QUA

| | | | | | | | | | | | |
|---|---|---|---|---|---|---|---|---|---|---|---|
| 03270 | 滓 | 3TE+ | 3'E+ | 3E+ | 3TE[ | 3'E[ | 3E[ | | | | |
| 03271 | 溜 | 3SDQ | 3SQ | | | | | | | | |
| 03272 | 滄 | 38EO | | | | | | | | | |
| 03273 | 滔 | 3AEE | 3A2E | 3A: | | | | | | | |
| 03274 | 溪 | 3ANK | 3AK | | | | | | | | |
| 03275 | 溧 | 3-4Y | 34Y | | | | | | | | |
| 03276 | 溴 | 3'4K | | | | | | | | | |
| 03277 | 煎 | KAJ4 | | | | | | | | | |
| 03278 | 煙 | W-4H | W4H | W-H | WOK | | | | | | |
| 03279 | 煩 | WT42 | WT48 | WT2 | WT8 | | | | | | |
| 03280 | 煤 | WH2Y | WH=Y | WHY | | | | | | | |
| 03281 | 煉 | WY4 | | | | | | | | | |
| 03282 | 照 | BDO4 | BUO4 | BD4 | BU4 | BO4 | | | | | |
| 03283 | 煜 | WBTK | WBT | WBK | | | | | | | |
| 03284 | 煬 | WB-C | WBC | WBC2 | | | | | | | |
| 03285 | 煦 | BCO4 | BC4 | BJO4 | BJ4 | | | | | | |
| 03286 | 煌 | W'BE | WBE | | | | | | | | |
| 03287 | 煥 | WU4K | WU42 | WU48 | WUAK | WUA2 | WUA8 | WUQK | WUQ2 | WUQ8 | |
| 03288 | 煞 | UEX4 | UX4 | | | | | | | | |
| 03289 | 煆 | WP2X | WP=X | WPCX | WPRX | WPX | | | | | |
| 03290 | 煨 | WQ-K | WQK | | | | | | | | |
| 03291 | 煖 | WAHX | WAX | | | | | | | | |
| 03292 | 爺 | 2XPP | 8XPP | 2XP | 8XP | 2X4P | 8X4P | =XPP | =XP | =X4P | |
| 03293 | 牒 | UUHY | ULHY | UTHY | KHLY | KHY | | | | | |
| 03294 | 猷 | 29.K | 29K. | KQ.K | KQK. | =9.K | =9K. | | | | |
| 03295 | 獅 | Z'BE | ZB-E | Z2-E | Z2E | | | | | | |
| 03296 | 猿 | ZHOK | ZHK | | | | | | | | |
| 03297 | 猾 | ZQUA | | | | | | | | | |
| 03298 | 瑯 | EBSP | EBKP | E-SP | E.SP | EBFP | E-FP | E.FP | EB7P | E-7P | E.7 |
| | | E-P | E.P | EBP | | | | | | | |
| 03299 | 瑚 | E+OA | E[OA | | | | | | | | |
| 03300 | 瑕 | EP2X | EP=X | EPCX | EPRX | EPX | | | | | |
| 03301 | 瑟 | EEG' | 2EG' | =EG' | | | | | | | |
| 03302 | 瑞 | EETA | EEM | EIUA | EIUM | | | | | | |
| 03303 | 瑁 | EB4 | | | | | | | | | |
| 03304 | 琿 | EUHQ | EUQ | | | | | | | | |
| 03305 | 瑙 | E3LQ | E3Q | E3OX | E3OX | E3'Q | | | | | |
| 03306 | 瑛 | EHUK | EHK | | | | | | | | |
| 03307 | 瑜 | E8AJ | | | | | | | | | |
| 03308 | 當 | 3UOQ | | | | | | | | | |
| 03309 | 畸 | QKJO | QKJ | | | | | | | | |
| 03310 | 瘀 | L2T2 | LTD2 | LTD= | | | | | | | |
| 03311 | 痰 | L2WW | L22W | LWW | | | | | | | |
| 03312 | 瘁 | L2T+ | LTT+ | LT4+ | LT+ | L2T[ | LTT[ | LT4[ | LT[ | | |
| 03313 | 痲 | L2YY | L22Y | | | | | | | | |
| 03314 | 痱 | L2EE | L22E | | | | | | | | |
| 03315 | 痺 | L2Q4 | L2Q+ | L2Q[ | | | | | | | |
| 03316 | 痿 | L2YV | L2'V | L'YV | LYV | L'V | | | | | |
| 03317 | 痴 | L2TO | LTKO | | | | | | | | |
| 03318 | 痳 | A35O | | | | | | | | | |
| 03319 | 盞 | MM4- | 2M4- | =M4- | MM4 | 2M4 | =M4 | | | | |
| 03320 | 盟 | BA4- | BA4 | | | | | | | | |
| 03321 | 睛 | 4EA | 4IEA | | | | | | | | |
| 03322 | 睫 | 4-EG | 4+EG | 4+G | 4EG | 4[EG | 4[G | | | | |
| 03323 | 睦 | 4H2H | 4H8H | 4HRH | 46 | | | | | | |
| 03324 | 睞 | 4YTT | 4Y2T | 4YT | | | | | | | |
| 03325 | 督 | TYX4 | G3X4 | GX4 | | | | | | | |
| 03326 | 睹 | 4H'B | 4HB- | 4HB | | | | | | | |
| 03327 | 睪 | 4H2H | | | | | | | | | |
| 03328 | 睬 | 4'3Y | 4AY | | | | | | | | |
| 03329 | 睜 | 4AEJ | 4AJ | | | | | | | | |
| 03330 | 睥 | 4'Q4 | 4'Q+ | 4Q4 | 4Q+ | 4'Q[ | 4Q[ | | | | |
| 03331 | 睨 | 4EER | 42ER | 4;R | | | | | | | |
| 03332 | 睢 | 4THH | 4T.E | 4TTE | 4TE | 4'E | 4E | | | | |
| 03333 | 矮 | TKYV | | | | | | | | | |
| 03334 | 碎 | TOT+ | +TT+ | +T+ | TOT[ | [TT[ | [T[ | | | | |
| 03335 | 碰 | TO24 | TO2H | +2H2 | +2H | +24 | TOK4 | +K4- | +K4 | [2H2 | [2H |
| | | [24 | [K4- | [K4 | | | | | | | |
| 03336 | 碗 | +UAL | [UAL | | | | | | | | |
| 03337 | 碘 | TOQK | TOQ2 | TOQ8 | +UHK | +QK | +Q2 | +Q8 | [UHK | [QK | [Q2 |
| | | [Q8 | | | | | | | | | |
| 03338 | 碌 | TOO3 | TOO4 | +O-3 | +O-4 | +O3 | +O4 | [O-3 | [O-4 | [O3 | [O4 |
| 03339 | 碉 | +UHO | [UHO | | | | | | | | |

| | | | | | | | | | | | |
|---|---|---|---|---|---|---|---|---|---|---|---|
| 03340 | 硼 | TOAA | TO2A | ←AA | ←2A | [AA | [2A | | | | |
| 03341 | 碑 | TOQ4 | TOQ← | ←'Q4 | ←'Q← | ←Q4 | TOQ[ | ['Q4 | ['Q[ | [Q4 | |
| 03342 | 碓 | TOTE | TO'E | ←THH | ←TTE | ←TE | [THH | [TTE | [TE | | |
| 03343 | 碇 | TOUH | ←U2H | ←U8H | ←URH | [U2H | [U8H | [URH | | | |
| 03344 | 祺 | 23HK | 23H2 | 23H8 | 238 | -YHK | -YH2 | -YH8 | -Y8 | KH22 | KH= |
| | | KH2 | KH28 | KH=8 | KH8 | =3H2 | =3H8 | =38 | | | |
| 03345 | 祿 | 2303 | 233 | 2304 | -Y03 | -Y3 | -Y04 | K0-3 | K0←3 | K03 | K0- |
| | | K0←4 | K04 | =303 | =33 | =304 | K0[3 | K0[4 | | | |
| 03346 | 禁 | YY23 | 2Y23 | =Y23 | YY-Y | 2Y-Y | =Y-Y | | | | |
| 03347 | 萬 | HQUS | HQA | ←←QA | XQUS | XQA | [[QA | | | | |
| 03348 | 禽 | 8TUA | 8QUS | 8QA | | | | | | | |
| 03349 | 稜 | 'H2X | 'H8X | /HRX | | | | | | | |
| 03350 | 稚 | 'YTE | 'Y'E | 'TE | ''E | | | | | | |
| 03351 | 稠 | 'YUO | 'UHO | | | | | | | | |
| 03352 | 稔 | 'Y8G | '8LG | '8JG | '8G | | | | | | |
| 03353 | 稟 | TQ'Y | TQ-Y | TQY | TQ' | | | | | | |
| 03354 | 稞 | 'YQY | 'QY | | | | | | | | |
| 03355 | 窟 | UPEE | UP2E | U2PE | U8PE | | | | | | |
| 03356 | 窠 | U2QY | U8QY | UQY | | | | | | | |
| 03357 | 筷 | FFGK | /GLK | /GK | | | | | | | |
| 03358 | 節 | FFBP | /BFP | /BSP | /B7P | /BP | | | | | |
| 03359 | 筠 | FFHC | /HC= | /HC2 | /HC | | | | | | |
| 03360 | 筵 | FFHT | /HTT | /HT | | | | | | | |
| 03361 | 筧 | FF4R | /4R | | | | | | | | |
| 03362 | 粱 | 3D2Y | | | | | | | | | |
| 03363 | 粳 | 2Y-X | 2YQX | =Y-X | =YQX | | | | | | |
| 03364 | 粵 | 'OYS | 'QY5 | 'QS | 'Q5 | 'Q-C | | | | | |
| 03365 | 經 | N33H | N-3H | NXIH | | | | | | | |
| 03366 | 絹 | N3OA | NOA | | | | | | | | |
| 03367 | 綑 | N3OY | NOY | NOY | | | | | | | |
| 03368 | 綁 | N3EP | N3'P | NE'P | NEP | | | | | | |
| 03369 | 綏 | N3AV | N'3V | NAV | | | | | | | |
| 03370 | 條 | TIXN | TI3 | TIN | | | | | | | |
| 03371 | 置 | 4←4L | 4←4- | 4←4 | 4←- | 4[4L | 4[4- | 4[4 | 4[- | 4I | |
| 03372 | 罩 | 4TB← | 4T← | 4TB[ | 4T[ | | | | | | |
| 03373 | 罪 | 4EE | 42E | | | | | | | | |
| 03374 | 署 | 4H'B | 4HBI | 4HB | | | | | | | |
| 03375 | 羨 | 2EFM | =EFM | | | | | | | | |
| 03376 | 羡 | 2E3- | 2E3T | =E3- | =E3T | | | | | | |
| 03377 | 群 | EO2E | | | | | | | | | |
| 03378 | 聖 | POE | -4OE | 4OE | | | | | | | |
| 03379 | 聘 | PIQS | PIQ5 | PQS | PQ5 | -4QS | -4Q5 | 4QS | 4Q5 | | |
| 03380 | 肆 | ESEH | ES4 | E4 | | | | | | | |
| 03381 | 肄 | FKEH | FKH | 7KEH | 7KH | | | | | | |
| 03382 | 腱 | AEHZ | | | | | | | | | |
| 03383 | 腰 | A-4V | A4V | | | | | | | | |
| 03384 | 腸 | AB-C | ABC | ABC2 | | | | | | | |
| 03385 | 腫 | AB'E | ABE | | | | | | | | |
| 03386 | 腮 | AQG | | | | | | | | | |
| 03387 | 腳 | A4OP | A4P | | | | | | | | |
| 03388 | 腫 | AHQH | AHH | | | | | | | | |
| 03389 | 腹 | ATBX | ATX | | | | | | | | |
| 03390 | 腺 | A'B3 | AB3 | A'B4 | AB4 | | | | | | |
| 03391 | 腦 | A3OX | A3OX | A3'Q | A3LQ | A3Q | | | | | |
| 03392 | 舅 | EEQC | 2EQC | EQC | EQC' | ;QC | ;QC' | =EQC | | | |
| 03393 | 艇 | 'AEZ | A-EZ | | | | | | | | |
| 03394 | 葬 | HT2E | HTUE | XT2E | XTUE | | | | | | |
| 03395 | 董 | ←←UQ | HUHQ | HUQ | XUHQ | XUQ | [[UQ | | | | |
| 03396 | 落 | H3XO | H3O | X3XO | X3O | | | | | | |
| 03397 | 葷 | HU2B | HU=B | XU2B | XU=B | | | | | | |
| 03398 | 葵 | ←←WK | HW'K | HW-K | HWK | XW'K | XW-K | XWK | [[WK | | |
| 03399 | 葦 | HHOH | XHOH | | | | | | | | |
| 03400 | 葫 | H←OA | X←OA | H[OA | X[OA | | | | | | |
| 03401 | 葉 | ←←HY | HHLY | HHY | XHLY | XHY | [[HY | | | | |
| 03402 | 葬 | HAFH | HA7H | XAFH | XA7H | | | | | | |
| 03403 | 葛 | HBCL | XBCL | | | | | | | | |
| 03404 | 萼 | HOOS | H2OS | HO-S | HOO5 | H2O5 | HO-5 | HOOC | H2OC | HO2C | HO=[ |
| | | XOOS | X2OS | XO-S | XOO5 | X2O5 | XO-5 | XOOC | X2OC | XO2C | XO=[ |
| 03405 | 萵 | ←←QA | HQUO | HAUO | XQUO | XAUO | XQA | [[QA | | | |
| 03406 | 葡 | HC←A | HCA | XC←A | XCA | HC[A | | | | | |
| 03407 | 葷 | HHQH | XHQH | | | | | | | | |
| 03408 | 葫 | H'BL | HBBL | X'BL | XBBL | | | | | | |
| 03409 | 葙 | HP2X | HP=X | HPCX | HPRX | HPX | XP2X | XP=X | XPCX | XPRX | XPX |

| | | | | | | | | | | | |
|---|---|---|---|---|---|---|---|---|---|---|---|
| 03410 | 猓 | HTOY | XTOY | | | | | | | | |
| 03411 | 虞 | TU7K | TUOK | T7OK | U7OK | | | | | | |
| 03412 | 虜 | 'TU7C | TUC | T7QC | T7C | TQC | U7QC | U7C | | | |
| 03413 | 號 | O5TR | O5R | OSTR | O-S | O-C | O5 | | | | |
| 03414 | 蛹 | OSSA | SSUH | SSA | OSSA | | | | | | |
| 03415 | 蜓 | OSEZ | SEZ | OSEZ | | | | | | | |
| 03416 | 蜈 | SOCK | SOK | | | | | | | | |
| 03417 | 蜇 | FLTS | FTOS | FTOS | FTS | | | | | | |
| 03418 | 蜀 | 4COS | 4CS | 4'CS | 4COS | 4JOS | 4JS | 4'JS | 4JOS | | |
| 03419 | 蛾 | OSFM | S'FM | SFM | OSFM | | | | | | |
| 03420 | 蛻 | S2OR | | | | | | | | | |
| 03421 | 蜂 | OSXE | S'XE | SX3I | SXE | OSXE | | | | | |
| 03422 | 蜃 | L2KS | L=KS | LKOS | LKS | LKOS | | | | | |
| 03423 | 蜆 | OS4R | S4R | OS4R | | | | | | | |
| 03424 | 蜊 | OSYJ | S'YJ | SYJ | OSYJ | OS'J | OS'J | S'IJ | S'J | | |
| 03425 | 衙 | 'T5J | T5OJ | T5J | ]5OJ | ]5J | | | | | |
| 03426 | 裟 | 33'K | 33TK | 33K | | | | | | | |
| 03427 | 裔 | TKUO | TKA | | | | | | | | |
| 03428 | 裙 | KE'O | KEO | | | | | | | | |
| 03429 | 補 | K+A. | K+A | K[A. | K[A | | | | | | |
| 03430 | 裝 | -3TK | +3TK | +3K | -4TK | -4K | +4TK | [3TK | [3K | [4TK | |
| 03431 | 裘 | KHTK | | | | | | | | | |
| 03432 | 裡 | KQH | KQIH | | | | | | | | |
| 03433 | 裊 | BSTK | BSK | | | | | | | | |
| 03434 | 裕 | K22O | K88O | K28O | K4O | | | | | | |
| 03435 | 裏 | TEEK | T2EK | T:'K | T:K | | | | | | |
| 03436 | 裞 | KK4R | 2K4R | =K4R | KKR | | | | | | |
| 03437 | 解 | UADH | UAUH | UAH | | | | | | | |
| 03438 | 詫 | 4OUL | :UHL | :UL | | | | | | | |
| 03439 | 該 | 4OTT | :TUT | :TT | | | | | | | |
| 03440 | 詳 | :2EI | :23I | | | | | | | | |
| 03441 | 試 | 4OHM | :HM | :MH | | | | | | | |
| 03442 | 詩 | 4OHJ | :IHJ | :HJ | | | | | | | |
| 03443 | 詰 | 4OHO | :+-O | :IHO | :HO | :[-O | | | | | |
| 03444 | 誇 | 4OKC | 4OKS | 4OK5 | :K-S | :K-5 | :KS | :K5 | :K2C | :K=C | :KC |
| 03445 | 詼 | 4O+W | :+'W | :+W | 4O[W | :['W | :[W | | | | |
| 03446 | 詣 | 4OFB | :FB | TO7B | :7B | | | | | | |
| 03447 | 誠 | 4ODM | 4OUM | 4OMD | 4OMU | :DM | :MD | | | | |
| 03448 | 話 | :'+O | :HIO | :'[O | | | | | | | |
| 03449 | 誅 | 4OTY | :'+Y | :'-Y | :TY | :'[Y | | | | | |
| 03450 | 詭 | 4OUL | :ULL | :UL | | | | | | | |
| 03451 | 詢 | 4OCB | :CB | :'CB | | | | | | | |
| 03452 | 詮 | 4O8E | :8E | | | | | | | | |
| 03453 | 詬 | 4OLO | :L-O | :LO | | | | | | | |
| 03454 | 詹 | UL2O | UL4O | ULO | UL2: | UL8: | UL: | | | | |
| 03455 | 詻 | 4OXO | :'XO | :XO | | | | | | | |
| 03456 | 訾 | GF4O | GF: | G74O | G7: | | | | | | |
| 03457 | 詨 | 4OTX | :T2X | :T8X | :TX | | | | | | |
| 03458 | 豢 | 2H8Z | =H8Z | | | | | | | | |
| 03459 | 貊 | AZTB | AZB | ZTB | Z-'B | | | | | | |
| 03460 | 貉 | AZXO | AZO | ZXO | | | | | | | |
| 03461 | 賊 | 42+M | 42M+ | 48+M | 48M+ | 42M | 48M | 4+M | 4M+ | 42[M | 42M |
| | | 48[M | 48M[ | 4[M | 4M[ | | | | | | |
| 03462 | 資 | 2UT2 | 2UT8 | 2T42 | 2T48 | 2-42 | 2-48 | =UT2 | =UT8 | =-42 | =-48 |
| | | =T42 | =T48 | | | | | | | | |
| 03463 | 賈 | -442 | -448 | | | | | | | | |
| 03464 | 賄 | 42+A | 48+A | 4+A | 42[A | 48[A | 4[A | | | | |
| 03465 | 貲 | GF42 | GF48 | G742 | G748 | | | | | | |
| 03466 | 賃 | TE42 | TE48 | TE2 | TE8 | T'H2 | T'H8 | T'H4 | | | |
| 03467 | 賂 | 42XO | 48XO | 4XO | 42O | 48O | | | | | |
| 03468 | 賅 | 42TT | 48TT | 4TUT | 4TT | 42T | | | | | |
| 03469 | 跡 | OGT4 | GT22 | GT4 | | | | | | | |
| 03470 | 跟 | OGBK | GBK | | | | | | | | |
| 03471 | 跨 | OGKC | OGKS | OGK5 | GK-S | GK-5 | OG2C | OG=C | OGKJ | GK2C | GK=C |
| | | GK2J | GK=J | GKS | GK5 | GKC | | | | | |
| 03472 | 路 | OGXO | G'XO | GXO | | | | | | | |
| 03473 | 跳 | OGKK | OG2K | GKKL | GKK | G2K | | | | | |
| 03474 | 跺 | OGRY | GRY | | | | | | | | |
| 03475 | 跪 | OGUL | GULL | | | | | | | | |
| 03476 | 跤 | OGTX | GT2X | GT8X | | | | | | | |
| 03477 | 跦 | OGTY | G'+Y | G'-Y | GTY | G'[Y | | | | | |
| 03478 | 躲 | 4JSY | 4JY | | | | | | | | |
| 03479 | 較 | HQTX | QT2X | QT8X | | | | | | | |

| | | | | | | | | | | | |
|---|---|---|---|---|---|---|---|---|---|---|---|
| 03480 | 戟 | HHQM | HHM | HMHQ | HMH | HQM | HMQ | | | | |
| 03481 | 軾 | HQHM | HQMH | QHM | QMH | | | | | | |
| 03482 | 輕 | HQSH | Q-SH | QSH | | | | | | | |
| 03483 | 辟 | POTH | POH | | | | | | | | |
| 03484 | 農 | QL2K | QL=K | QLK | | | | | | | |
| 03485 | 遷 | UHQZ | UQZ | | | | | | | | |
| 03486 | 遊 | TDZZ | DTZZ | DZZ | | | | | | | |
| 03487 | 道 | K4Z | 2T4Z | =T4Z | | | | | | | |
| 03488 | 遂 | 2ZZ | =ZG | 2ZLZ | =ZLZ | | | | | | |
| 03489 | 達 | H2EZ | | | | | | | | | |
| 03490 | 遜 | -OQZ | | | | | | | | | |
| 03491 | 違 | HOHZ | HHZ | | | | | | | | |
| 03492 | 遯 | P2XZ | P=XZ | PCXZ | PRXZ | | | | | | |
| 03493 | 遇 | QUSZ | QAZ | | | | | | | | |
| 03494 | 遍 | BCLZ | BLZ | | | | | | | | |
| 03495 | 過 | QUOZ | UTAZ | QAZ | J.Z | JZ | | | | | |
| 03496 | 遄 | 'PAZ | .PAZ | PAZ | | | | | | | |
| 03497 | 運 | 'BEZ | BEZ | | | | | | | | |
| 03498 | 逾 | 8AJZ | | | | | | | | | |
| 03499 | 遢 | L+4Z | L[4Z | | | | | | | | |
| 03500 | 都 | CECP | 2CEP | =CEP | | | | | | | |
| 03501 | 鄗 | TOAP | THAP | TAP | | | | | | | |
| 03502 | 酬 | -Q30 | -Q3T | 9TTT | 93T | 930 | | | | | |
| 03503 | 酪 | -QXO | P'XO | 9XO | | | | | | | |
| 03504 | 略 | -QAO | 9AO | | | | | | | | |
| 03505 | 釉 | AYIQ | | | | | | | | | |
| 03506 | 鈷 | 8K+O | $+O | 6+O | 8K[O | $[O | 6[O | | | | |
| 03507 | 鉗 | 8KH2 | 8KH= | 8KH- | $H2 | $H= | $20- | $H- | 6H2 | 6H= | 620- |
| | | 6H- | | | | | | | | | |
| 03508 | 鈸 | 8K+X | $+X | $+'X | $+X. | 6+X | 6+'X | 6+X. | 8K[X | $[X | $['X |
| | | $[X. | 6[X | 6['X | 6[X. | | | | | | |
| 03509 | 鈽 | 8K+E | $+E | $+'E | $+UI | 6+E | 6+'E | 6+UI | 8K[E | $[E | $['E |
| | | $[UI | 6[E | 6['E | 6[UI | | | | | | |
| 03510 | 鉀 | 8KQI | $QI | 6QI | | | | | | | |
| 03511 | 鈾 | 8KIQ | $IQ | 6IQ | | | | | | | |
| 03512 | 鉛 | 8KRO | $RO | 6RO | | | | | | | |
| 03513 | 鉋 | 8KCL | 8KJL | $UOL | $UPL | $UCL | $UL | $COL | $CPL | $CCL | $CL |
| | | $JOL | $JPL | $JCL | $JL | 6UOL | 6UPL | 6UCL | 6UL | 6COL | 6CPL |
| | | 6CCL | 6CL | 6JOL | 6JPL | 6JCL | 6JL | | | | |
| 03514 | 鉤 | 8KCO | $'CO | $CO | $'JO | 6'CO | 6CO | 6'JO | | | |
| 03515 | 鉑 | 8K'B | $'B | 6'B | | | | | | | |
| 03516 | 鈴 | $8.S | $8-S | 68.S | 68-S | | | | | | |
| 03517 | 鉉 | 8KTN | $TN | 6TN | | | | | | | |
| 03518 | 鉍 | 8KG' | $G' | 6G' | | | | | | | |
| 03519 | 鉅 | 8KCC | 8KE | $CC | $E | 6CC | 6E | | | | |
| 03520 | 鈹 | 8KEX | $UIX | $EX | 6UIX | 6EX | | | | | |
| 03521 | 鈿 | 8E2Q | 8KQ | $Q | 6Q | | | | | | |
| 03522 | 鉚 | 8KPP | $C'P | $PP | 6C'P | 6PP | | | | | |
| 03523 | 閙 | PPQI | PPQ | MQI | | | | | | | |
| 03524 | 隘 | P44- | P34- | P44 | P34 | | | | | | |
| 03525 | 隔 | P-OA | POA | | | | | | | | |
| 03526 | 隕 | PO42 | PO48 | PO2 | PO8 | PO4 | | | | | |
| 03527 | 獲 | TNTE | TN'E | TNE | | | | | | | |
| 03528 | 雋 | THHU | T.EU | TTEU | TEU | 'EU | EU | | | | |
| 03529 | 雉 | TKTE | TK'E | TKE | | | | | | | |
| 03530 | 雒 | COTE | CO'E | COE | 'COE | JOTE | JO'E | JOE | 'JOE | | |
| 03531 | 雷 | MQ | -AQ | TAQ | -Q | | | | | | |
| 03532 | 電 | MQL | -AQL | TAQL | -QL | | | | | | |
| 03533 | 霍 | MUOL | MUPL | MUCL | MUL | M'CL | MCOL | MCPL | MCCL | MCL | -AUL |
| | | -ACL | TAUL | TACL | -UOL | -UPL | -UCL | -'CL | -COL | -CPL | -CCL |
| | | -CL | M'JL | MJOL | MJPL | MJCL | MJL | -AJL | TAJL | -'JL | -JOL |
| | | -JPL | -JCL | -JL | | | | | | | |
| 03534 | 零 | M8.S | M8-S | M8S | -A8S | TA8S | -8.S | -8-S | -8S | O | |
| 03535 | 靖 | TKEA | | | | | | | | | |
| 03536 | 靴 | H+TF | H+F | H+T7 | H+7 | H[TF | H[F | H[T7 | H[7 | | |
| 03537 | 靶 | H+BL | H[BL | | | | | | | | |
| 03538 | 預 | SJT2 | SJT8 | SJ2 | SJ8 | | | | | | |
| 03539 | 頑 | 2RT2 | =RT2 | 2RT8 | =RT8 | 2R2 | =R2 | 2R8 | =R8 | | |
| 03540 | 頓 | -LT2 | -LT8 | +LT2 | +LT8 | [LT2 | [LT8 | . | | | |
| 03541 | 頊 | ET42 | ET2 | ET48 | ET8 | | | | | | |
| 03542 | 頒 | 2DT2 | 2DT8 | 8DT2 | 8DT8 | =DT= | =DT8 | | | | |
| 03543 | 頌 | 2ST2 | 2ST8 | 2S8 | 8ST2 | 8ST8 | 8S8 | =ST2 | =S2 | =ST8 | =S8 |
| 03544 | 飼 | 8SCO | 8SC | 8FCO | 8FC | 87CO | 87C | 8C-O | 8CO | 8SJO | 8FJO |
| | | 87JO | 8J-O | | | | | | | | |

| | | | | | | | | | | | |
|---|---|---|---|---|---|---|---|---|---|---|---|
| 03545 | 飴 | 8SSO | 8SO | 8FSO | 8FO | 87SO | 87O | | | | |
| 03546 | 飽 | 8SCL | 8SL | 8FCL | 8FL | 87CL | 87L | 8SUL | 8FUL | 87UL | 8UOL |
| | | 8UPL | 8UCL | 8UL | 8COL | 8CPL | 8CCL | 8CL | 8JOL | 8JPL | 8JCL |
| | | 8JL | | | | | | | | | |
| 03547 | 飾 | 8STE | 8FTE | 87TE | 8TUI | 8TE | | | | | |
| 03548 | 馳 | E4+L | E4JL | E4LL | E4L | 7LIL | 7JIL | 7+L | E4[L | 7[L | |
| 03549 | 馱 | EJ4K | EC4K | E4K | 7K | | | | | | |
| 03550 | 馴 | E43I | ES43 | EC43 | E43 | 73I | 73 | | | | |
| 03551 | 髦 | ES3R | E3R | | | | | | | | |
| 03552 | 鳩 | 9BS4 | 9B54 | 9B4 | 95 | | | | | | |
| 03553 | 麂 | LHFR | LHR | LFFR | LFR | LH7R | L77R | L7R | LH%R | | |
| 03554 | 夤 | 42SL | 42ST | 42NL | 42NT | 4SL | 4ST | 4NT | 4KK | | |
| 03555 | 鼓 | HOKX | HK+X | HK[X | | | | | | | |
| 03556 | 戡 | EEEL | 2EEL | ;EEL | EEL | ;EL | ;L | =EEL | | | |
| 03557 | 僧 | T24B | T2QB | | | | | | | | |
| 03558 | 僮 | TTQH | | | | | | | | | |
| 03559 | 僥 | T3HR | THR | | | | | | | | |
| 03560 | 僖 | THOO | THKO | THXO | | | | | | | |
| 03561 | 僭 | TKKB | T2KB | TRRB | T2RB | TCRB | | | | | |
| 03562 | 僚 | TKB3 | | | | | | | | | |
| 03563 | 僕 | T42K | T422 | T428 | | | | | | | |
| 03564 | 像 | TUBZ | | | | | | | | | |
| 03565 | 僑 | T'KA | T-KA | T2TA | TH2A | TH8A | TKOA | | | | |
| 03566 | 僱 | T'PE | T.PE | TPTE | TP'E | TPE | | | | | |
| 03567 | 僎 | TLL2 | TLL8 | TLH2 | TLH8 | TKH2 | TKH8 | | | | |
| 03568 | 僩 | TPPA | TMA | | | | | | | | |
| 03569 | 號 | +R+R | 2+OR | =+OR | [R[R | 2[OR | =[OR | | | | |
| 03570 | 兢 | W-KR | WOKR | WKR | W.R | | | | | | |
| 03571 | 劃 | EH-J | E-IJ | EHQJ | EQIJ | EQJ | -EIJ | -QEJ | TEIJ | TQEJ | |
| 03572 | 劂 | LK-J | LKTJ | LTIJ | L-IJ | | | | | | |
| 03573 | 匱 | CO-2 | CO-8 | CO42 | CO48 | CO2 | CO8 | CO4 | | | |
| 03574 | 厭 | LBAK | | | | | | | | | |
| 03575 | 嗾 | OTDK | ODTK | ODK | | | | | | | |
| 03576 | 嘀 | OT2A | OTUO | | | | | | | | |
| 03577 | 嘛 | OLYY | OL2Y | OLY | | | | | | | |
| 03578 | 嘗 | 3UOB | 3UFB | 3U7B | | | | | | | |
| 03579 | 嗽 | OYO- | OYO- | OYOT | OYOT | OYUT | OYT | | | | |
| 03580 | 嘔 | OC3O | OCX | | | | | | | | |
| 03581 | 嘆 | OHOK | OHOK | OHO2 | OHO2 | OHO8 | OHO8 | | | | |
| 03582 | 嘉 | HOCO | HKCO | HOHO | HOKO | HOJO | HHCO | | | | |
| 03583 | 嘍 | OQOV | OQOV | OQV | | | | | | | |
| 03584 | 嘎 | OT4M | OTM | | | | | | | | |
| 03585 | 嗷 | OEDX | | | | | | | | | |
| 03586 | 嘖 | OE42 | OE48 | OE2 | OE8 | | | | | | |
| 03587 | 嘟 | OHBP | OHP | | | | | | | | |
| 03588 | 嘈 | OHQB | O-QB | OQB | | | | | | | |
| 03589 | 嘐 | OEE3 | O2E3 | OE83 | OE3 | O283 | | | | | |
| 03590 | 嘩 | OQHH | OQXH | | | | | | | | |
| 03591 | 團 | O+AJ | O+QJ | O+SJ | O+J | OJ. | OJ | O+AJ | O+QJ | O+SJ | O+J |
| | | O[AJ | O[QJ | O[SJ | O[J | | | | | | |
| 03592 | 圖 | OOTQ | OO+Q | OOQ | O'X2 | OX2 | O'X= | OX= | OOTQ | OO+Q | OOQ |
| | | OO[Q | OO[Q | | | | | | | | |
| 03593 | 塵 | LHFH | LHH | LFFH | LFH | LH7H | L77H | L7H | LH%H | | |
| 03594 | 塾 | TZ9H | T9H | | | | | | | | |
| 03595 | 境 | HTBR | | | | | | | | | |
| 03596 | 墓 | HBKH | HBH | XBKH | XBH | | | | | | |
| 03597 | 墊 | HH9H | H9H | 69H | | | | | | | |
| 03598 | 塹 | HQTH | QLTH | QTH | | | | | | | |
| 03599 | 墅 | QHJH | QJH | | | | | | | | |
| 03600 | 塽 | HK4X | HKX | IHKX | | | | | | | |
| 03601 | 壽 | HLHJ | HJHJ | HLJ | E'J. | E'J | 3'J. | 3'J | | | |
| 03602 | 夥 | QYAA | QY2A | QYA | | | | | | | |
| 03603 | 夢 | H4UA | H4A | K4UA | K4A | KUA | X4UA | X4A | | | |
| 03604 | 奪 | AUQ2 | AUQ8 | AU-2 | AU-8 | AUT2 | AUT8 | AU2 | AU8 | | |
| 03605 | 寨 | KTEJ | K'EJ | KEJ | | | | | | | |
| 03606 | 寤 | KC3O | KCX | | | | | | | | |
| 03607 | 嫡 | VT2A | VTUO | VTA | | | | | | | |
| 03608 | 嫦 | V3UE | V3E | | | | | | | | |
| 03609 | 嫩 | VYOX | VYOX | VYTX | VYX | | | | | | |
| 03610 | 嫗 | VC3O | VCX | | | | | | | | |
| 03611 | 嫖 | V-43 | V423 | V43 | V-4Y | V4-Y | V4Y | | | | |
| 03612 | 嫘 | VQN3 | VQN | VQ3 | | | | | | | |
| 03613 | 嫣 | VGS4 | VG4 | | | | | | | | |

| | | | | | | | | | | | |
|---|---|---|---|---|---|---|---|---|---|---|---|
| 03614 | 孵 | PPAZ | PPZ | | | | | | | | |
| 03615 | 寞 | UHBK | | | | | | | | | |
| 03616 | 寧 | UG4J | UGJ | | | | | | | | |
| 03617 | 寡 | UT4D | UTD | U4KD | | | | | | | |
| 03618 | 寥 | UEE3 | U2E3 | UE83 | UE3 | U283 | | | | | |
| 03619 | 實 | UQ42 | UQ48 | .U2K | .U=K | U2K | U=K | | | | |
| 03620 | 寨 | UE8Y | UEY | | | | | | | | |
| 03621 | 屢 | UUUX | UUTX | UUX | UKEX | UKX | | | | | |
| 03622 | 層 | UUUO | UUTO | UULO | UUO | UK5O | UKO | | | | |
| 03623 | 察 | UW23 | UW3 | UW-Y | UWY | | | | | | |
| 03624 | 對 | 42EJ | 4KEJ | 4EJ. | 4EJ | TXJ. | TXJ | .XJ. | .XJ | | |
| 03625 | 屣 | PQOV | PQOV | PQV | | | | | | | |
| 03626 | 嶄 | IUQT | EHQT | EQLT | EQT | \HQT | \QLT | \QT | | | |
| 03627 | 嶇 | IUCO | EC3O | ECX | \C3O | \CX | | | | | |
| 03628 | 幛 | ETB+ | UIT+ | UI+ | ETB[ | UIT[ | UI[ | | | | |
| 03629 | 幣 | 3AXE | 3XE | 3XUI | | | | | | | |
| 03630 | 幕 | HBKE | | | | | | | | | |
| 03631 | 幗 | EOOM | EOMO | EOM | UIOM | UIOM | UIOE | EOE. | EOE | | |
| 03632 | 幔 | EB4X | EBX | UIBX | | | | | | | |
| 03633 | 廓 | LTZP | LTP | | | | | | | | |
| 03634 | 廖 | LEE3 | LE83 | L2E3 | L283 | | | | | | |
| 03635 | 弊 | 3AXH | | | | | | | | | |
| 03636 | 彆 | 3AX5 | 3X5 | | | | | | | | |
| 03637 | 彰 | TK+3 | TB+3 | T+3 | TK[3 | TB[3 | T[3 | | | | |
| 03638 | 徹 | 'TTX | TTAX | ]TAX | ]TX | | | | | | |
| 03639 | 態 | BDXG | BXG | | | | | | | | |
| 03640 | 慝 | LB3G | LBG | L3G | | | | | | | |
| 03641 | 慇 | SAFG | SFFG | SFG | SA7G | S77G | S7G | | | | |
| 03642 | 慷 | I2L3 | ILE3 | IL3 | I2L4 | ILE4 | IL4 | | | | |
| 03643 | 慢 | I2BX | IB4X | IBX | | | | | | | |
| 03644 | 慣 | I2Q2 | I2Q8 | IQ42 | IQ48 | IQ2 | IQ8 | | | | |
| 03645 | 慟 | I2HC | IHHC | IHQC | | | | | | | |
| 03646 | 慚 | I2HT | I2QT | IHQT | IQLT | IQT | | | | | |
| 03647 | 慘 | I2S3 | I3S3 | IS83 | IS3 | ISK3 | | | | | |
| 03648 | 慵 | I2LA | ILEA | ILA | | | | | | | |
| 03649 | 截 | HTEM | H'EM | HEM | | | | | | | |
| 03650 | 撇 | F3AX | F3X | | | | | | | | |
| 03651 | 摘 | FT2A | FTUO | | | | | | | | |
| 03652 | 摔 | FTN+ | FTN[ | | | | | | | | |
| 03653 | 撤 | FTAX | | | | | | | | | |
| 03654 | 摸 | FHBK | FHK | | | | | | | | |
| 03655 | 摟 | FQOV | FQOV | FQV | | | | | | | |
| 03656 | 摺 | FEEB | F2EB | FE'B | FEB | F2'B | F2B | | | | |
| 03657 | 摑 | FOOM | FOMO | FOM | FOE. | FOE | FOOM | FOMO | FOE. | FOE | |
| 03658 | 摧 | FETE | FE'E | F\TE | F\'E | F\E | | | | | |
| 03659 | 摹 | UE8F | UE8J | UEF | | | | | | | |
| 03660 | 摭 | FLH4 | FL4 | | | | | | | | |
| 03661 | 摻 | FS83 | FS3 | FSK3 | F3S3 | | | | | | |
| 03662 | 敲 | TATX | TOAX | THAX | TAX | | | | | | |
| 03663 | 斡 | HB8+ | +B++ | +B8+ | HB8[ | [B[[ | [B8[ | | | | |
| 03664 | 旗 | DTHK | DTH2 | DTH8 | | | | | | | |
| 03665 | 旖 | TDTJ | TDJ | DTKJ | DTJ | | | | | | |
| 03666 | 暢 | QIBC | BIBC | B1C | QB-C | QBC | QBC2 | | | | |
| 03667 | 暨 | BFRB | BFR- | BRB- | BRB | BR- | B7RB | B7R- | | | |
| 03668 | 暝 | BUB6 | BU6 | | | | | | | | |
| 03669 | 榜 | YT2D | YTUD | | | | | | | | |
| 03670 | 榨 | YU2E | YU8E | YUTK | YU'E | | | | | | |
| 03671 | 榕 | YU4O | | | | | | | | | |
| 03672 | 槁 | YTOA | YTHA | | | | | | | | |
| 03673 | 榮 | WWUY | 2WUY | =WUY | 2UY | =UY | WUY | HUY | KUY | XUY | 2UY |
| | | =UY | | | | | | | | | |
| 03674 | 槓 | YH42 | YH48 | | | | | | | | |
| 03675 | 構 | YEUH | YEEA | YEA | | | | | | | |
| 03676 | 榛 | YE8Y | Y3TY | YEY | | | | | | | |
| 03677 | 榷 | Y.UE | YUTE | YU'E | YUE | | | | | | |
| 03678 | 榻 | YBEE | YB2E | YB2 | | | | | | | |
| 03679 | 榫 | YTE+ | Y'E+ | YE+ | YTE[ | Y'E[ | YE[ | | | | |
| 03680 | 榴 | YSDQ | YSQ | | | | | | | | |
| 03681 | 槐 | Y'QR | YQRS | YQR | | | | | | | |
| 03682 | 槍 | Y8EO | Y8O | | | | | | | | |
| 03683 | 榭 | Y4JJ | Y4J | YJJ | | | | | | | |
| 03684 | 槌 | Y'BZ | YBZ | | | | | | | | |
| 03685 | 榦 | HB8Y | HBY | +B+Y | +B8Y | [B[Y | [B8Y | | | | |

| | | | | | | | | | | | |
|---|---|---|---|---|---|---|---|---|---|---|---|
| 03686 | 鰥 | 'AXY | A-XY | ARXY | AXY | | | | | | |
| 03687 | 樞 | YAHE | YAE | | | | | | | | |
| 03688 | 歉 | KE4T | KE4- | K4UT | K4T | | | | | | |
| 03689 | 歌 | JJUT | JJT | 2JOT | 2JO- | =JOT | =JO- | | | | |
| 03690 | 甌 | 7Q4- | 7Q4 | TZQ4 | TLQ4 | | | | | | |
| 03691 | 津 | 3TK+ | 3TB+ | 3TK[ | 3TB[ | | | | | | |
| 03692 | 演 | 3UQ2 | 3UQ8 | 3U-2 | 3U-8 | 3UT2 | 3UT8 | | | | |
| 03693 | 渡 | 36OK | 36K | 3T2K | 3T8K | 3TOK | | | | | |
| 03694 | 漓 | 3TUA | 3TQA | | | | | | | | |
| 03695 | 滴 | 3T2A | 3TUO | | | | | | | | |
| 03696 | 遊 | 3TDG | 3TG | 3DTG | | | | | | | |
| 03697 | 漾 | 32E3 | 32E4 | 324 | | | | | | | |
| 03698 | 溴 | 3HBK | 3HK | 3XBK | 3XK | | | | | | |
| 03699 | 漬 | 3E42 | 3E48 | 3E2 | 3E8 | | | | | | |
| 03700 | 灘 | 3P-A | 3PTA | 3PA | 3PM | | | | | | |
| 03701 | 漂 | 3-43 | 3423 | 34=3 | 343 | 3-4Y | 34-Y | | | | |
| 03702 | 漢 | 3HOK | 3HO2 | 3HO8 | 3HO2 | 3HO8 | 3XOK | 3XOK | 3XO2 | 3XO8 | 3XO |
| | | 3XO8 | 3HK | | | | | | | | |
| 03703 | 滿 | 3H-A | 3HTA | 3HUT | 3HU2 | 3HU4 | 3HA | 3HM | 3X-A | 3XTA | 3XU |
| | | 3XU2 | 3XU4 | 3XA | 3XM | | | | | | |
| 03704 | 滯 | 3EUE | | | | | | | | | |
| 03705 | 深 | 3Y83 | 3Y3 | 3Y84 | | | | | | | |
| 03706 | 激 | 3YUT | 3YOT | 3YOT | 3YO- | 3YO- | | | | | |
| 03707 | 漸 | 3HQT | 3HT | 3QLT | | | | | | | |
| 03708 | 漲 | 35EK | 35K | 322S | 32=S | | | | | | |
| 03709 | 漣 | 3HQZ | 3QZ | | | | | | | | |
| 03710 | 漕 | 3HQB | 3QB | | | | | | | | |
| 03711 | 漫 | 3B4X | 3BX | | | | | | | | |
| 03712 | 潔 | 3QN3 | 3Q3 | 3QN | | | | | | | |
| 03713 | 澈 | 3TAX | | | | | | | | | |
| 03714 | 滂 | 3ZKJ | 3ZJ | | | | | | | | |
| 03715 | 濾 | 3'PL | 3.PL | 3POL | | | | | | | |
| 03716 | 漁 | 3µQ4 | 3U4 | | | | | | | | |
| 03717 | 滲 | 3S83 | 3S3 | 3SK3 | | | | | | | |
| 03718 | 滌 | 3TIY | 3TXY | | | | | | | | |
| 03719 | 滷 | 3TOX | 3TOX | 3TQ | | | | | | | |
| 03720 | 熔 | WU4O | | | | | | | | | |
| 03721 | 熙 | CUL4 | COL4 | EOL4 | EPL4 | ECL4 | EJL4 | | | | |
| 03722 | 燔 | WPEE | WP2E | W'PE | W.PE | WPE | W'P2 | W.P2 | WP2 | | |
| 03723 | 熊 | SAF4 | SFF4 | SF4 | SA74 | S774 | S74 | | | | |
| 03724 | 熄 | W'4G | W4G | | | | | | | | |
| 03725 | 熒 | WWUW | 2WUW | =WUW | WUW | HUW | KUW | | | | |
| 03726 | 爾 | KU4X | UJ2 | UJ8 | U3 | | | | | | |
| 03727 | 犒 | 'FTA | ZTOA | ZTHA | ZTA | | | | | | |
| 03728 | 犖 | WWUH | 2WUH | =WUH | WU'H | WUH | | | | | |
| 03729 | 獄 | Z4OK | Z:.K | Z:K. | Z:K | | | | | | |
| 03730 | 獐 | ZTK+ | ZTB+ | ZT+ | ZTK[ | ZTB[ | ZT[ | | | | |
| 03731 | 瑪 | EAHE | | | | | | | | | |
| 03732 | 瑣 | E342 | E348 | E32 | E38 | | | | | | |
| 03733 | 瑞 | EEJ4 | EEC4 | EE4 | E7 | | | | | | |
| 03734 | 瑰 | E'QR | EQRS | EQR | | | | | | | |
| 03735 | 瑭 | ELEO | | | | | | | | | |
| 03736 | 甄 | 4HCZ | 4H-Z | 4HZ | -H-Z | -HCZ | -HZ | | | | |
| 03737 | 疑 | FKSG | 7KSG | 7KG | | | | | | | |
| 03738 | 瘟 | L2TE | LTUE | LT7E | LU7E | | | | | | |
| 03739 | 瘍 | L2BC | LB-C | LBC | LBC2 | | | | | | |
| 03740 | 瘋 | L2RS | LR-S | LR'S | LRS | | | | | | |
| 03741 | 瘡 | L28J | L8AJ | | | | | | | | |
| 03742 | 瘓 | L2UK | L2U2 | K2U8 | LU4K | LUAK | LUQK | LUK | LU42 | LUA2 | LUU |
| | | LU2 | LU48 | LUA8 | LUQ8 | LU8 | | | | | |
| 03743 | 盡 | EH44 | EH4 | E-44 | | | | | | | |
| 03744 | 監 | EF4- | EF4 | | | | | | | | |
| 03745 | 睹 | 4HQ | 4++Q | 4XQ | 4[[Q | | | | | | |
| 03746 | 睽 | 4W'K | 4W-K | 4W2T | 4W=T | 4WH8 | 4WK | | | | |
| 03747 | 睿 | TU44 | U-44 | | | | | | | | |
| 03748 | 瞄 | 4HHH | | | | | | | | | |
| 03749 | 磁 | TOKN | +KNN | +K2N | +KN | TOHN | +HNN | +H2N | +HN | TOXN | +XN |
| | | +X2N | +XN | [KNN | [K2N | [KN | [HNN | [H2N | [HN | [XNN | [X2 |
| | | [XN | | | | | | | | | |
| 03750 | 碟 | TOHY | +HLY | +HY | [HLY | [HY | | | | | |
| 03751 | 碧 | EBTO | EBO | E'B+ | EB+ | E'B[ | EB[ | | | | |
| 03752 | 碘 | TOEW | +ELW | +EW | [ELW | [EW | | | | | |
| 03753 | 碩 | TOT2 | TOT8 | +T42 | +T2 | +T48 | +T8 | [T42 | [T2 | [T48 | [T8 |

| | | | | | | | | | | | | |
|---|---|---|---|---|---|---|---|---|---|---|---|---|
| 03754 | 碼 | TOBC | +BCL | +BL | +BC | [BCL | [BL | [BC | | | | |
| 03755 | 禎 | 23T2 | 23T8 | 238 | -YT2 | -YT8 | -Y8 | KT42 | KT2 | KT48 | KT8 | |
| | | =3T2 | =3T8 | =38 | | | | | | | | |
| 03756 | 福 | 23-Q | 230Q | 23Q | -Y-Q | -YQ | =3-Q | =30Q | =3Q | | | |
| 03757 | 禍 | 23QA | 23AA | 23A | -YQA | -YAA | -YA | KQUO | KAUO | KQA | =3Q | |
| | | =3AA | =3A | | | | | | | | | |
| 03758 | 種 | 'YHH | YHQH | 'HQH | 'HH | | | | | | | |
| 03759 | 稱 | 'YAA | YAUH | 'YU3 | ''3A | 'AUH | | | | | | |
| 03760 | 窪 | U23H | U83H | U3HH | | | | | | | | |
| 03761 | 窩 | U2QA | U8QA | | | | | | | | | |
| 03762 | 蝸 | TKBC | TKBL | | | | | | | | | |
| 03763 | 端 | TKEM | | | | | | | | | | |
| 03764 | 管 | FFUB | /.UB | /UB | /UOO | | | | | | | |
| 03765 | 箕 | FFH2 | FFH8 | FFHK | /H2K | /H=K | /H22 | /H=2 | /H28 | /H=8 | | |
| 03766 | 箋 | FFMM | FF2M | /MM | /2M | | | | | | | |
| 03767 | 箍 | FFGZ | /'GZ | /-GZ | /GZ | | | | | | | |
| 03768 | 算 | FF4H | /4H | /4++ | /420 | /4X | /4[[ | | | | | |
| 03769 | 箝 | FFFH | /FH2 | /FH= | | | | | | | | |
| 03770 | 箔 | FF3B | /3'B | /3B | | | | | | | | |
| 03771 | 箏 | FFAJ | /AEJ | /AJ | | | | | | | | |
| 03772 | 箸 | FFHB | /H'B | /HB | | | | | | | | |
| 03773 | 箇 | FFOO | /O+O | /OO | /O+O | /O[O | /O[O | | | | | |
| 03774 | 箠 | FFQ4 | FFQ+ | /'Q4 | /'Q+ | /Q4 | /Q+ | FFQ[ | /'Q[ | /Q[ | | |
| 03775 | 粹 | 2YT+ | =YT+ | 2YT[ | =YT[ | | | | | | | |
| 03776 | 糠 | 2YU3 | 2YUY | =YU3 | =YUY | | | | | | | |
| 03777 | 精 | 2YEA | =YEA | | | | | | | | | |
| 03778 | 綻 | N3UG | NU-G | NUG | | | | | | | | |
| 03779 | 綰 | N3UB | N.UB | NUOO | NUB | | | | | | | |
| 03780 | 綜 | N3U3 | NU23 | NU3 | N3UY | NU-Y | NUY | | | | | |
| 03781 | 綽 | N3T+ | NTB+ | NT+ | N3T[ | NTB[ | NT[ | | | | | |
| 03782 | 綬 | N3HX | NH2X | NH8X | NHRX | NHX | | | | | | |
| 03783 | 綠 | N3O3 | NO-3 | NO3 | N3O4 | NO-4 | | | | | | |
| 03784 | 緊 | EXN3 | EXN | EX3 | | | | | | | | |
| 03785 | 綴 | N34X | N4X | | | | | | | | | |
| 03786 | 綢 | N3UC | NUKC | NUC | | | | | | | | |
| 03787 | 網 | N3UE | NUKE | NUE | | | | | | | | |
| 03788 | 綺 | N3KJ | NKJO | NKJ | | | | | | | | |
| 03789 | 綱 | NUHO | | | | | | | | | | |
| 03790 | 綿 | N3BE | N'BE | NBE | | | | | | | | |
| 03791 | 綵 | N3AY | N'3Y | NAY | | | | | | | | |
| 03792 | 綸 | N38A | N8-A | N8A | | | | | | | | |
| 03793 | 維 | N3TE | N3'E | NTHH | NT.E | NTTE | NTE | N'E | NE | | | |
| 03794 | 緒 | N3HB | NH'B | NHB | | | | | | | | |
| 03795 | 緇 | N33Q | N3LQ | | | | | | | | | |
| 03796 | 緞 | N3AX | NAUX | NAX | | | | | | | | |
| 03797 | 罰 | 44OJ | 44J | 4;IJ | 4;J | | | | | | | |
| 03798 | 翠 | EET+ | 2ET+ | ETT+ | =ET+ | ET4+ | 2TT+ | EET[ | 2ET[ | ETT[ | =ET[ | |
| | | ET4[ | 2TT[ | 2T2+ | 2T4+ | =T2+ | =T4+ | 2T2[ | 2T4[ | =T2[ | =T4[ | |
| 03799 | 翡 | EEEE | EE2 | | | | | | | | | |
| 03800 | 翟 | EETE | EE'E | 2ETE | =ETE | | | | | | | |
| 03801 | 聞 | MP | PP4 | PP-4 | M-4 | M4 | | | | | | |
| 03802 | 聚 | PXZ | -4XZ | 4XZ | | | | | | | | |
| 03803 | 肇 | PXEH | | | | | | | | | | |
| 03804 | 腐 | LTJA | LTA | LJA | | | | | | | | |
| 03805 | 膀 | AT2D | ATUD | | | | | | | | | |
| 03806 | 膏 | TOUA | | | | | | | | | | |
| 03807 | 膈 | A-OA | A-A | AOA | | | | | | | | |
| 03808 | 膊 | A+AJ | A+J | A[AJ | A[J | | | | | | | |
| 03809 | 腿 | ABKZ | | | | | | | | | | |
| 03810 | 臺 | TDKA | DTKA | DKA | | | | | | | | |
| 03811 | 臧 | KEM | KME | KCUM | KMCU | KCCM | KMCC | | | | | |
| 03812 | 蓋 | HOUH | HUSH | | | | | | | | | |
| 03813 | 與 | E5EK | E5K | ;5K | 2H-2 | 2H-8 | 2HK | =H-2 | =H-8 | =HK | | |
| 03814 | 舔 | HO'G | HOKG | HO'4 | HOK4 | | | | | | | |
| 03815 | 舞 | 'EAH | 'E-H | TEAH | TE-H | E-AH | EAH | | | | | |
| 03816 | 艋 | 'AZ4 | A-Z4 | AZ4- | AZ4 | | | | | | | |
| 03817 | 蓉 | HU4O | XU4O | | | | | | | | | |
| 03818 | 蒿 | HTOA | XTOA | HTHA | XTHA | | | | | | | |
| 03819 | 蔽 | HLHE | XLHE | | | | | | | | | |
| 03820 | 蓄 | HTNQ | XTNQ | | | | | | | | | |
| 03821 | 蜿 | ++UZ | HU-Z | HUZ | XU-Z | XUZ | [[UZ | | | | | |
| 03822 | 蓬 | H3TT | H3TK | X3TT | X3TK | | | | | | | |
| 03823 | 蒲 | H3+A | X3+A | H3[A | X3[A | | | | | | | |

03824 綝 ++23 ++-Y H223 H2-Y ++=3 H2=3 X223 X2-Y X2=3 [[23
[[-Y [[=3
03825 縫 HHS4 XHS4
03826 綟 ++34 ++44 H3-4 H34 H4-4 H44 X3-4 X34 X4-4 X44
[[34 [[44
03827 緎 ++ZN HZ'3 HZ'N HZN3 HZN HZ3 XZ'3 XZ'N XZN3 XZN
XZ3 [[ZN
03828 稽 HTTO XTTO
03829 覓 ++QR H'QR HQRS HQR X'QR XQRS XQR [[QR
03830 蓄 H8EO X8EO
03831 襄 HTHK HTOK XTHK XTOK
03832 繇 H8SE H8EE H2SE H2EE H22E X8SE X8EE X2SE X2EE X22E
H8S2 X8S2
03833 蜿 OSUL SUAL OSUL
03834 蜜 UG'S UGOS UGS UGOS
03835 蜻 OSEA SIEA SEA OSEA
03836 蜢 OSZ4 SZ4- SZ-4 SZ4 OSZ4
03837 蜥 OSYT SYLT SYT OSYT
03838 蜴 OSBC SBC2 SBC OSBC
03839 蜘 OSKO STKO OSKO SKO
03840 蝕 8BSS 8SOS 8SS 8BFS 8FOS 8FS 8B7S 870S 87S 8SOS
8FOS 870S 80S 80S
03841 蜷 S2HL
03842 蜩 SUHO
03843 裳 3UOK 3UTK 3OTK
03844 褂 KHHT K2HT KHT
03845 裴 EETK 2ETK =ETK ET'K 2T'K =T'K
03846 裹 TQYK
03847 裸 KQY
03848 製 HEJK HJTK
03849 裨 K'Q4 K'Q+ KQ4 KQ+ K'Q[ KQ[
03850 褚 KH'B KHB
03851 裲 KUHO
03852 誦 40SA ;SUH ;SA
03853 誌 40HG ;HG
03854 語 4050 ;50
03855 誣 40HT ;HTT ;H2T ;HT
03856 認 40DG ;D.G ;DG
03857 誡 40HM 40MH ;++M ;M++ ;20M ;M20 ;HM ;MH 40XM 40MX
;XM ;MX ;[[M ;M[[
03858 誓 FT40 FLT; FT;
03859 誤 400K ;ONK ;OK
03860 說 402R ;20R ;2R
03861 誥 ;'HO
03862 誨 40TQ ;TQ- ;TQ
03863 誘 40YS ;'YS ;YS 40'S ;'S
03864 誑 40ZE ;ZE
03865 誚 403A ;3A
03866 誧 A645
03867 豪 TOUZ THUZ
03868 貍 AZQH
03869 貌 AZBR AZR Z'BR ZBR
03870 賓 U342 U348 U32 U38
03871 賑 42LK 48LK 48K
03872 賒 4283 4883 428Y 488Y 48Y
03873 赫 H4H4 2H22 =H22 =H==
03874 趙 HG3A
03875 趕 HGBH GBHI GB2I GB=I GB-+ GBH GB-[
03876 踴 OGPC GPCO GPC OGPJ GPJO GPJ
03877 輔 HQ+A Q+A. HQ[A Q[A.
03878 輒 HQPL HQ4L QPL Q-4L Q4L
03879 輕 HQ3H HQXH Q-3H Q3H
03880 輓 HQUR QUBR QUR
03881 辣 THYO THYO THY
03882 遠 HOKZ HKZ
03883 遣 EUHZ EEAZ EAZ
03884 遞 ZN3Z Z'NZ ZNZ Z'3Z Z3Z
03885 遭 O-BZ OBZ
03886 遮 AHEZ
03887 遯 LTRZ LURZ LRZ
03888 遍 BEEZ B2EZ B2Z
03889 遲 43Z 44Z 4ZZ
03890 遛 SDQZ

| | | | | | | | | | | | |
|---|---|---|---|---|---|---|---|---|---|---|---|
| 03891 | 鄰 | OTQP | O+QP | OQP | O[QP | | | | | | |
| 03892 | 鄺 | LEAP | LAP | | | | | | | | |
| 03893 | 鄯 | HOEP | HOEP | | | | | | | | |
| 03894 | 醉 | -QHZ | 9H'Z | 9HZ | | | | | | | |
| 03895 | 酸 | -QSX | 9S2X | 9S8X | 9SRX | 9SX | | | | | |
| 03896 | 酷 | -QHO | 9'HO | 9HO | | | | | | | |
| 03897 | 酴 | -Q8Y | 98-Y | 98Y | | | | | | | |
| 03898 | 餃 | $T2X | $T8X | 6T2X | 6T8X | | | | | | |
| 03899 | 鑄 | 8KH5 | 8KHS | $H'5 | $H5 | $H'S | 6H'5 | 6H5 | 6H'S | | |
| 03900 | 鋃 | 8KBK | $BK | 6BK | | | | | | | |
| 03901 | 銅 | $U-O | 6U-O | | | | | | | | |
| 03902 | 銘 | 8KAO | $AO | 6AO | | | | | | | |
| 03903 | 銖 | 8KTY | $TY | $'+Y | $'-Y | 6TY | 6'+Y | 6'-Y | $'[Y | 6'[Y | |
| 03904 | 鉻 | 8KXO | $'XO | $XO | 6'XO | 6XO | | | | | |
| 03905 | 銓 | 8K8E | $8E | 68E | | | | | | | |
| 03906 | 銜 | 'T8J | 'T$J | T8KJ | T$J | ]8KJ | ]$2J | ]$=J | ]$J | 'T6J | T6J |
| | | ]62J | ]6=J | ]6J | | | | | | | |
| 03907 | 鋑 | 8KUV | $.UV | $UV | 6.UV | 6UV | | | | | |
| 03908 | 餅 | $2HH | $222 | 62HH | 6222 | | | | | | |
| 03909 | 銑 | 8KHR | $'HR | $HR | 6'HR | 6HR | | | | | |
| 03910 | 閘 | PPTT | MTUT | MTT | | | | | | | |
| 03911 | 闡 | PPHH | M2IH | M2H | MHH | | | | | | |
| 03912 | 闖 | PPOS | PPS | PPOS | MOS | MS | MOS | | | | |
| 03913 | 閤 | PPXO | M'XO | MXO | | | | | | | |
| 03914 | 閒 | PPTM | MTM | | | | | | | | |
| 03915 | 閻 | PP8O | M8-O | M8O | | | | | | | |
| 03916 | 隊 | P3B3 | P33 | | | | | | | | |
| 03917 | 障 | PTK+ | PTB+ | PT+ | PTK[ | PTB[ | PT[ | | | | |
| 03918 | 際 | PW23 | PW3 | PW-Y | PWY | | | | | | |
| 03919 | 雌 | GFTE | GF'E | GFE | G7TE | G7'E | G7E | | | | |
| 03920 | 雜 | XOTE | XO'E | XOE | | | | | | | |
| 03921 | 霈 | -ATA | TATA | -AM | TAM | MTA | MM | -TA | -M | | |
| 03922 | 靼 | H+B- | H+B | H[B- | H[B | | | | | | |
| 03923 | 鞅 | H+UK | H[UK | | | | | | | | |
| 03924 | 韶 | TBDO | TBUO | TBO | | | | | | | |
| 03925 | 頗 | EXT2 | EXT8 | EX2 | EX8 | | | | | | |
| 03926 | 領 | 8ST2 | 8ST8 | 8S8 | | | | | | | |
| 03927 | 颯 | TKRS | TKR | TKS | | | | | | | |
| 03928 | 颱 | RSSO | RSO | | | | | | | | |
| 03929 | 餃 | 8STX | 8FTX | 87TX | 8T2X | 8T8X | 8TX | | | | |
| 03930 | 餅 | 8S2H | 8SH | 8F2H | 8FH | 872H | 87H | 82HH | 8222 | 82H | |
| 03931 | 餌 | 8BSP | 8SP | 8S-4 | 8S4 | 8BFP | 8FP | 8F-4 | 8F4 | 8B7P | 87P |
| | | 87-4 | 874 | 8-4 | 8P | | | | | | |
| 03932 | 餉 | 8S'A | 8SA | 8F'A | 8FA | 87'A | 87A | 8'UO | 8'A | | |
| 03933 | 駁 | E4XX | E42X | 7XX | 72X | | | | | | |
| 03934 | 骯 | QATR | QAR | | | | | | | | |
| 03935 | 骰 | QARX | QAX | | | | | | | | |
| 03936 | 髦 | ES3L | E3EL | E33L | E3L | DEL | D3L | | | | |
| 03937 | 魁 | QR2+ | QR=+ | QR+ | R2+ | R=+ | QR2[ | QR=[ | QR[ | R2[ | R=[ |
| 03938 | 魂 | 2SQR | 2SR | =SQR | =SR | | | | | | |
| 03939 | 鳴 | OBS4 | OB54 | OB4 | O5 | | | | | | |
| 03940 | 鳶 | MBS4 | MB54 | MB4 | M5 | | | | | | |
| 03941 | 鳳 | RTB4 | RBS4 | RB54 | RB4 | R-B4 | R-4 | RX | R-5 | R5 | R'B4 |
| | | R'4 | R'5 | | | | | | | | |
| 03942 | 麼 | LYYN | L2YN | LYN | | | | | | | |
| 03943 | 鼻 | '4QH | 4QH | '4QX | 4QX | | | | | | |
| 03944 | 齊 | TDKH | TKH | TXH | TX2 | .XH | .X2 | | | | |
| 03945 | 億 | TTKG | TTBG | | | | | | | | |
| 03946 | 儀 | T2EM | T2FM | TX. | | | | | | | |
| 03947 | 僻 | TPOH | TPTH | TPH | | | | | | | |
| 03948 | 僵 | T3QQ | T-QQ | TQQ | | | | | | | |
| 03949 | 價 | T-42 | T442 | T-48 | T448 | | | | | | |
| 03950 | 儂 | TQLK | | | | | | | | | |
| 03951 | 儈 | T84B | T8QB | T8-B | T8B | T82S | T8=S | | | | |
| 03952 | 儉 | T8-T | T8OT | T8-2 | T8-4 | T822 | T824 | T8T | T8B2 | T8B8 | |
| 03953 | 儘 | T3UQ | T3OQ | T3E | | | | | | | |
| 03954 | 凜 | 2TQY | 2TY | =TQY | =TY | | | | | | |
| 03955 | 劇 | TUZJ | T7ZJ | U7ZJ | UZIJ | UZJ | P+OJ | POJ | P[OJ | | |
| 03956 | 劈 | POHD | PTHD | PHD | | | | | | | |
| 03957 | 劉 | SDKJ | SD$J | S$J | TXIJ | .XIJ | SD6J | S6J | | | |
| 03958 | 劍 | 8OTJ | 8TIJ | 8-TJ | 8-2J | 8-4J | 822J | 824J | 8TJ | 84J | 82J |
| | | 8B2J | 8B8J | | | | | | | | |
| 03959 | 劊 | 84BJ | 8QBJ | 8-BJ | 8BJ | 82SJ | 8=SJ | | | | |

03960 雛 3CQG CQG
03961 厲 LHQA LHA
03962 嘮 OWWC O2WC OWUC O2UC OWC OHUC OKUC OXUC
03963 嘻 OHOO OHHO OHKO OHXO
03964 嘹 OK23 OKB3
03965 嘲 OHBA OHA
03966 嘌 O4H4 OQH4
03967 嘴 OGFA OG7A
03968 嘩 OHHH
03969 噓 OU74 OTU4 OT4 OT74
03970 噎 OHUK OHU. OH. O1
03971 噗 O42K O4KK O422 O4K2 O428 O4K8
03972 噴 O+H2 O+2 O+H8 O+8 O[H2 O[2 O[H8 O[8 O+X2 O+X8
O[X2 O[X8
03973 嘶 OH2T OH8T OHKT OHLT OHT OH=T
03974 嘯 OEKK
03975 嘰 ONNM ONTM ONMT ONKM ONMK
03976 墀 HP3H HPH HP4H IHPH
03977 墟 HU74 HTU4 HT74 IHT4
03978 增 H24B H2QB
03979 墳 H+H2 H+X2 H+H8 H+X8 IH+2 IH+8 H[H2 H[X2 H[H8 H[X8
IH[2 IH[8
03980 墜 P2ZH PZH
03981 墮 P+AH P+H PAH P[AH P[H
03982 墩 HTZX
03983 墦 HAYQ HAQ IHAQ IHYQ
03984 奭 K2TB
03985 嬉 VHOO VHHO VHKO VHXO
03986 嫺 VPPY VMY
03987 嬋 VOQ+ VOO+ V2O+ V2Q+ VO+ VOQ[ VOO[ V2O[ V2Q[ VO[
V@
03988 嫵 VTE4 VE-4 VE4
03989 嬌 V'KA V-KA V2TA V=TA VH8A V2T2 V=T2 VH82 V'K2 V-K2
VKOA
03990 嫣 V3HR VHHR
03991 寮 UK23 UKB3 UK3
03992 寬 UH4R UX4R UHR
03993 審 UAYQ UAQ UYQ
03994 寫 UEE4 UEC4 UEJ4 U;C4 U;J4 U;4
03995 層 P24B P2QB P2B
03996 履 P'TX PTTX P]TX P]X
03997 嶝 IUWK IUW. EW-K EWOK EWK EW. \W-K \WOK \WK \W.
03998 嶔 IU8T IU$T IU8- IU$- E8KT E$UT E$T E$- E8K- IU6T
IU6- E6UT E6T E6- \8KT \$UT \$T \$- \8K- \6UT
\6T \6-
03999 幢 UITH ETKH ETQH ETH
04000 幟 UITM UIM ETBM ETMB
04001 幡 UIAQ UIYQ EAYQ EAQ
04002 廢 LWSX LWX
04003 廚 LHKJ
04004 廟 LHBA LHA
04005 廝 LH2T LH8T LHT
04006 廣 LHQ2 LXQ2 LHQ8 LXQ8 L2 L8
04007 廠 L3AX L3TX L3X
04008 彈 5OQ+ 5OO+ 52O+ 52Q+ 5O+ 5OQ[ 5OO[ 52O[ 52Q[ 5O[
5@
04009 影 BT33 B+33 BO33 B[33 B33
04010 德 'T+G T+4G ]+4G ]+G 'T[G T[4G ][4G ][G
04011 徹 TEEX ]EEX
04012 慶 LHLX LHJX LLGX LJGX LGX .LK. .LK
04013 慧 EEEG 2EEG =EEG EC-G
04014 慮 TU7G TUG TUQG T7QG U7QG
04015 慝 CHOG CHG COG .
04016 慕 HBKG HBK4 XBKG XBK4
04017 憂 T4UX TUGX
04018 慼 TYMG MTYG G3MG MG3G YMG MYG 3MG M3G GMG MGG
04019 慰 P3JG PJG PYJG
04020 慫 TTGG
04021 慾 4OTG 4TG
04022 憧 I2TH ITKH ITQH ITH
04023 憐 I2YH IYAH IYH
04024 憫 I2MX IPPX IMTX IMX
04025 憎 I24B I2QB I84B I8QB

04026 憬 I2B3 IBT3 IB+3 IB3 IB[3
04027 憚 I20+ IOQ+ IOO+ I2Q+ IO+ I20[ IOQ[ IOO[ I2Q[ IO[
I2@ I@
04028 憤 I2+2 I2+8 I+H2 I+2 I+H8 I+8 I2[2 I2[8 I[H2 I[2
I[H8 I[8
04029 憔 I2E4 ITE4 I'E4 IE4
04030 憮 I2E4 IE-4 I'E4 ITE4 IE4
04031 戮 EE3M E83M E3M 283M 23M
04032 摩 LYYF L2YF LYF LYYJ LYEJ LY3J L23J L2EJ
04033 摯 HH9F H9F HH9J H9EJ H9J
04034 摹 HBKF HBKJ HKEJ XBKF XBKJ XKEJ
04035 撞 FTKH FTQH
04036 撲 F42K ·F4KK F422 F4K2 F42 F428 F4K8 F48
04037 撈 FWWC F2WC FWUC F2UC FWC FKUC FHUC FXUC
04038 撐 F3UJ F3J F3OJ
04039 撰 FLL2 FLH2 FLL8 FLH8 FKH2 FKH8
04040 撥 FWSX FWX
04041 撓 F3HR FHR FHHR
04042 撕 FH2T FH8T
04043 撩 FKB3
04044 撒 FHAX FHX
04045 撮 FBPX FBX FB4X
04046 播 FAYQ FAQ FYQ
04047 撫 F'E4 FTE4 FE-4 FE4
04048 撚 FAK4 FA4
04049 撹 F3EL F33L FEL F3L
04050 撻 FKQJ F29J
04051 擇 F-4+ F4B+ F4+ F-4[ F4B[ F4[
04052 撤 F8KT F8T F8K- F8- F$UT F$T F$- F6UT F6T F6-
04053 敵 TATX HOTX HOX T2AX
04054 敷 +ADX +DTX +DX [ADX [DTX [DX
04055 數 QVTX QVX QOVX QOVX YVTX
04056 暮 HBKB
04057 暫 HQTB QLTB QTB
04058 暴 BH83 BH3 BH84 BH4
04059 暱 BCHO
04060 樣 Y2E3 Y2E4 Y24
04061 樟 YTK+ YTB+ YTK[ YTB[
04062 槨 YTZP
04063 樁 YE8E Y3TE YE8 YE8; Y3T: YE;
04064 樞 YC3O YCX
04065 標 Y-43 Y423 Y43 Y-4Y Y4-Y Y4Y Y4=3
04066 槽 YHQB YQB
04067 模 YHBK YHK YXBK YXK
04068 樓 YQOV YQOV YQV
04069 樊 YXYK YXK
04070 槳 KAJY KJY
04071 樂 BNNY B2NY NBNY BNY NBY B22Y 'B2Y B2Y 'B4Y B4Y
04072 樅 Y:TG YTTG Y]TG Y]G
04073 槭 YTYM YMTY YG3M YMG3 YTM YMT YYM YMY YGM YMG
Y3M YM3
04074 樑 Y3DY Y3Y
04075 歐 COUT C3OT COT CXUT CXT CX- C3O- CO-
04076 歎 HKUT HOK- HO8- HO8- !
04077 殤 -ATC ATBC ATC
04078 毅 TZRX TZX
04079 毆 COEX COX CXRX CXX C3OX
04080 漿 KAJ3 KJ3 KAJ4 KJ4
04081 潼 3TKH 3TQH
04082 澄 3W-K 3WOK 3WK 3W.
04083 潑 3W5X 3WX
04084 潔 3K23 3KB3 3K3
04085 澡 3ED3 3EDN 3E3 3EN
04086 澆 33HR 3HHR
04087 澤 3-4+ 34B+ 34+ 3-4[ 34B[ 34[
04088 潛 3KKB 32KB 3RRB 32RB 3RB
04089 潸 3YYA 32YA 3YA
04090 潮 3HBA 3HA 3+BA 3[BA
04091 澎 3HK3 3H3
04092 潺 3P3Z 3PZZ 3PZ
04093 潰 3O+2 3O-8 3O42 3O48
04094 潤 3PPE 3ME
04095 澗 3PPB 3MB
04096 潘 3AYQ 3AQ 3YQ

| | | |
|---|---|---|
| 04097 | [illegible] | A2H3 A2H4 A24 |
| 04098 | 潯 | 3EHJ 3EOJ |
| 04099 | 潠 | 3LL2 32L2 3LH2 3LL8 32L8 3LH8 3KH2 3KH8 |
| 04100 | 潏 | 3EC4 3:C4 3:4 3EJ4 3;J4 3EE4 |
| 04101 | 熟 | TZ94 |
| 04102 | 熬 | EDX4 EX4 |
| 04103 | 熱 | HH94 H9.4 H94 69.4 694 |
| 04104 | 贄 | P3JW PJW PYJW |
| 04105 | 牖 | KP+A UUPA ULPA UTPA KP[A |
| 04106 | 犛 | YXLH YXH |
| 04107 | 獎 | KAJK |
| 04108 | 獗 | ZLKT ZLT ZLK- |
| 04109 | 璧 | WWUE 2WUE =WUE WUE. WUE HUE. KUE. KUE |
| 04110 | 璋 | ETK+ ETB+ ETK[ ETB[ |
| 04111 | 璃 | ETUA ETQA EQA |
| 04112 | 璀 | EHOE EHOE EHE |
| 04113 | 璠 | EIUE EETE EE'E E\TE E\'E E\E |
| 04114 | 畿 | NNQM 2NQM NNMQ 2NMQ NMQ =NQM =NMQ |
| 04115 | 瘠 | L24A L4TA L4A |
| 04116 | 瘩 | L2HO L2XO LH8O LX8O LHO LXO |
| 04117 | 瘟 | LQ4- L2Q4 |
| 04118 | 瘤 | L2SQ LSDQ |
| 04119 | 瘦 | L2EX L2:X LEIX |
| 04120 | 瘴 | L28O L8EO |
| 04121 | 瘢 | L2AX L'AX LAX |
| 04122 | 皚 | 'BEK 'BE. 'B. BE-K BEOK BEK BE. 'B\K 'B\. B\-K |
| | | B\OK B\K B\. |
| 04123 | 皺 | CCEX CCX 2CEX 2CX =CEX =CX |
| 04124 | 盤 | 'AX4 A-X4 AX4- ARX4 AX4 |
| 04125 | 瞎 | 4UEO |
| 04126 | 瞇 | 42YZ 4YZ |
| 04127 | 瞌 | 4HS4 |
| 04128 | 瞑 | 4UB6 4U6 |
| 04129 | 瞋 | 4+4K 4+K 4+42 4+2 4+48 4+8 4F4K 4FK 4F42 4F2 |
| | | 4F48 4F8 474K 47K 4742 472 4748 478 4+4= 4+= |
| | | 4F4= 4F= 474= 47= 4[4K 4[K 4[42 4[2 4[48 4[8 |
| | | 4[4= 4[=4 |
| 04130 | 磋 | +2EH [2EH |
| 04131 | 磅 | TOTD +T2D +TUD +TD [T2D [TUD [TD |
| 04132 | 確 | TOUE +.UE +UTE +U'E +UE [.UE [UTE [U'E [UE |
| 04133 | 磊 | 3TO +++ [[[ |
| 04134 | 碾 | TOPK +PHK +PK [PHK [PK |
| 04135 | 磕 | TOH4 +HS4 +H4 [HS4 [H4 |
| 04136 | 碼 | TOE4 +ES4 +EJ4 +E4 +EC4 TO7 +7 [ES4 [EJ4 [E4 |
| | | [EC4 [7 |
| 04137 | 磐 | 'AXO A-XO ARXO AXTO 'AX+ A-X+ ARX+ AX+ 'AX[ A-X[ |
| | | ARX[ AX[ |
| 04138 | 稿 | 'YTA 'TOA 'THA 'TA |
| 04139 | 稼 | 'YUZ Y.UZ '.UZ 'UZ |
| 04140 | 穀 | HYRX HYX |
| 04141 | 稽 | 'YKB YKFB YK7B 'KFB 'K7B |
| 04142 | 稷 | 'YQX YQ2X YQ8X YQRX 'Q2X 'Q8X 'QRX 'QX |
| 04143 | 稻 | 'YAE 'YA: 'Y: 'AEE 'AE 'A: |
| 04144 | 黎 | U2E4 U8E4 |
| 04145 | 黏 | U245 U2J5 UJ5 U4J5 U45 U845 U8J5 |
| 04146 | 箭 | FFKJ /KAJ |
| 04147 | 箱 | FFY4 /Y4 |
| 04148 | 範 | FFHL FFQL FF+L /HQL /QJL /QCL /QL FF[' |
| 04149 | 篋 | FFOM FFMO /-OM /OM /M-O /MO |
| 04150 | 篆 | FFOZ FFZ /OZ /LLZ |
| 04151 | 篇 | FFPA /'PA /.PA /PA |
| 04152 | 篁 | FFBE /'BE /BE |
| 04153 | 箠 | /HHH /HXH |
| 04154 | 篌 | /TCK |
| 04155 | 糊 | 2Y+A Y+OA =Y+A 2Y[A Y[OA =Y[A |
| 04156 | 締 | NT2E NTUE |
| 04157 | 練 | N3Y4 NY4 N3YB NYB N3YQ NYQ N-L3 |
| 04158 | 緯 | NHOH |
| 04159 | 緻 | NSHX |
| 04160 | 緘 | N3OM N3MO N-OM NM-O NOM NMO |
| 04161 | 緬 | N3TQ NTOH NTOH NTQ |
| 04162 | 緝 | N3OP NOP NO-4 NO4 |
| 04163 | 編 | N3PA N'PA N.PA NPA |
| 04164 | 緣 | N3OZ NOZ NLLZ NOZL |

| | | |
|---|---|---|
| 04165 | 線 | N3B3 N3B4 N'B3 NB3 N'B4 NB4 N3MM N32M NMM N2M |
| 04166 | 緞 | N3EX NERX |
| 04167 | 緩 | N3AX NAHX NAX |
| 04168 | 縫 | NHHH |
| 04169 | 緯 | N3H+ NHO+ NHO+ NH+ N3H[ NHO[ NHO[ NH[ |
| 04170 | 緲 | N343 N43' N43 |
| 04171 | 緹 | N3BG NB-G NBG |
| 04172 | 罵 | 4EJ4 4EC4 47 |
| 04173 | 罷 | 4SAF 4SFF 4S2F 4SF 4AFF 4A2F 4AF 4SA7 4S77 4S27 |
| | | 4S7 4A77 4A27 4A7 |
| 04174 | 羯 | 2EBC 2EC =EBC =EC |
| 04175 | 翩 | PAEE PA2E PAE 'PAE .PAE 'PA2 .PA2 PA2 |
| 04176 | 耦 | 2YQA =YQA |
| 04177 | 膛 | A3UH |
| 04178 | 膜 | AHBK AHK |
| 04179 | 膝 | AY83 AY84 AY4 |
| 04180 | 膠 | AEE3 AE83 A283 |
| 04181 | 膚 | TU7A TUQA T7QA T7A U7QA U7A |
| 04182 | 膘 | A-43 A423 A43 A-4Y A4-Y A4Y A4=3 |
| 04183 | 艙 | HLH4 HL4 XLH4 XL4 |
| 04184 | 艘 | H3AX X3AX |
| 04185 | 蔚 | HP3J HPYJ HPJ XP3J XPYJ XPJ |
| 04186 | 蓮 | ++QZ HHQZ HQZ XHQZ XQZ [[QZ |
| 04187 | 蔬 | HSG3 XSG3 XG3 |
| 04188 | 蓬 | HP8S HPS XP8S XPS |
| 04189 | 蔓 | HB4X HBX XB4X XBX |
| 04190 | 蔭 | ++4M H4..M H4M X4.M X4M [[4M |
| 04191 | 蔣 | HKAJ XKAJ XKJ |
| 04192 | 蔡 | ++W3 ++WY HW23 HW3 HW-Y HWY HW=3 XW23 XW3 XW-Y |
| | | XWY XW=3 [[W3 [[WY |
| 04193 | 蔔 | ++JQ HC-Q HCOQ HCQ XC-Q XCOQ XCQ HJ-Q HJOQ HJQ |
| | | XJ-Q XJOQ XJQ [[JQ |
| 04194 | 蓬 | HXEZ HXZ XXEZ XXZ |
| 04195 | 蔥 | HOAG H'QG HOAG XOAG X'QG XOAG |
| 04196 | 蓿 | HUTB XUTB |
| 04197 | 蓯 | H3HX X3HX |
| 04198 | 蝗 | S-SP S.SP S-FP S.FP S-7P S.7P OSBP SBSP SBFP SB7P |
| | | OSBP |
| 04199 | 蝴 | S+OA S[OA |
| 04200 | 蝶 | OSHY SHLY SHY OSHY |
| 04201 | 蝠 | OS-Q OSOQ S-OQ S-Q SOQ OS-Q OSOQ |
| 04202 | 蝦 | OSPX SP2X SP=X SPCX SPRS SPX OSPX |
| 04203 | 蝸 | SQUO |
| 04204 | 蝨 | R.SS RSS XZSS XZS ZXSS ZXS +ZSS +ZS Z+SS Z+S |
| | | R.2S R2S XZ2S ZX2S +Z2S Z+2S [ZSS [ZS Z[SS Z[S |
| | | [Z2S Z[2S |
| 04205 | 蝙 | OSPA S'PA S.PA SPA OSPA |
| 04206 | 蝎 | OSBE S'BE SBE OSBE |
| 04207 | 蝌 | OSY+ S'Y+ SY2+ ST=+ SY+ OSY+ OS'+ OS'+ S'2+ S'=+ |
| | | S'+ OSY[ S'Y[ SY2[ ST=[ SY[ OSY[ OS'[ OS'[ S'2[ |
| | | S'=[ S'[ |
| 04208 | 蝓 | S8AJ |
| 04209 | 衝 | THEJ ]HEJ -UI |
| 04210 | 衛 | THQJ TQHJ THHJ 'TQJ ]HQJ |
| 04211 | 褐 | KBCL KBJL |
| 04212 | 複 | KTBX KTX |
| 04213 | 褒 | TTYK TYK |
| 04214 | 褓 | KTOY |
| 04215 | 褕 | K8AJ |
| 04216 | 褊 | K'PA K.PA KPA |
| 04217 | 誼 | 4OU4 ;.U4 ;UA- ;U4- ;U4 |
| 04218 | 諒 | 4OT3 ;TO3 ;T3 |
| 04219 | 談 | 4OWW 4O2W ;WW ;2W |
| 04220 | 諄 | ;TOZ |
| 04221 | 誕 | 4OGZ ;'GZ ;GZ |
| 04222 | 請 | 4OEA ;IEA ;EA |
| 04223 | 諸 | 4OHB ;H'B ;HB |
| 04224 | 課 | 4OQY ;QY |
| 04225 | 諉 | 4OYV ;'YV ;YV 4O'V ;'V |
| 04226 | 諂 | 4OUE 4OU; 4O; ;UEE ;U2E ;U; 4ODE 4OD; ;DEE ;D2E |
| | | ;D; |
| 04227 | 調 | ;UHO |
| 04228 | 誰 | 4OTE ;THH ;T.E ;TTE ;TE ;'E |
| 04229 | 論 | 4O8A ;8-A ;8A |

| | | | | | | | | | | | |
|---|---|---|---|---|---|---|---|---|---|---|---|
| 04230 | 諍 | 4OAJ | ;AEJ | ;AJ | | | | | | | |
| 04231 | 誶 | ;TT+ | ;TT[ | | | | | | | | |
| 04232 | 誹 | 4OEE | 4O2E | ;EE | ;2E | | | | | | |
| 04233 | 諛 | 4OET | 4O;T | ;EET | ;ET | ;;T | | | | | |
| 04234 | 豌 | -KUL | OKUL | .UAL | .UL | | | | | | |
| 04235 | 豎 | EX-K | EXOK | EXK | EX. | | | | | | |
| 04236 | 豬 | ZH'B | ZHB | ZLHB | | | | | | | |
| 04237 | 賠 | 4TKO | 42TO | 48TO | 42O | 48O | | | | | |
| 04238 | 賞 | 3UO2 | 3U42 | 3UO8 | 3U48 | | | | | | |
| 04239 | 賦 | 42GM | 48GM | 42MG | 48MG | 42M | 48M | 4GM | 4MG | | |
| 04240 | 賤 | 42MM | 422M | 42M | 48MM | 482M | 48M | 4MM | | | |
| 04241 | 賬 | 42EK | 48EK | 48K | 4E-K | 4EK | | | | | |
| 04242 | 賭 | 42HB | 48HB | 48B | | | | | | | |
| 04243 | 賢 | EX42 | EX48 | | | | | | | | |
| 04244 | 賣 | H442 | H448 | | | | | | | | |
| 04245 | 賜 | 42BC | 42C | 48BC | 48C | 4BC | | | | | |
| 04246 | 質 | LT42 | LT48 | 2LT2 | 2LT8 | 2LT4 | TT42 | TT48 | =LT2 | =LT8 | =LT4 |
| 04247 | 賡 | LE82 | LE42 | LE2 | LE88 | LE48 | LE8 | | | | |
| 04248 | 赭 | H4HB | H4B | | | | | | | | |
| 04249 | 趟 | HG3A | G3UO | | | | | | | | |
| 04250 | 趣 | HGPX | HG4X | G-4X | GPX | G4X | | | | | |
| 04251 | 踐 | OGK4 | G2H2 | GK4- | GK4 | | | | | | |
| 04252 | 踐 | OGMM | OG2M | GMM | G2M | | | | | | |
| 04253 | 踝 | OGQY | GQY | | | | | | | | |
| 04254 | 踢 | OGBC | GBC2 | GBC | | | | | | | |
| 04255 | 踏 | OG3B | G3B | OG4B | G4B | | | | | | |
| 04256 | 踩 | OGAY | G'3Y | GAY | | | | | | | |
| 04257 | 踟 | GTKO | | | | | | | | | |
| 04258 | 踡 | OG2L | G2HL | G2L | | | | | | | |
| 04259 | 踞 | OGPO | GP+O | GPO | GP[O | | | | | | |
| 04260 | 躺 | 4J3A | 4JA | J3UO | | | | | | | |
| 04261 | 輝 | 3RU+ | 3R+ | 3RUO | 3RO | 3RU[ | 3R[ | | | | |
| 04262 | 輛 | HQTA | QTA | | | | | | | | |
| 04263 | 輟 | HQ4X | Q4X | | | | | | | | |
| 04264 | 輩 | EEHQ | 2EHQ | =EHQ | EEQ | 2EQ | =EQ | | | | |
| 04265 | 輦 | KKHQ | 2KHQ | =KHQ | KKQ | 2KQ | =KQ | | | | |
| 04266 | 輪 | HQ8A | Q8-A | Q8A | | | | | | | |
| 04267 | 輜 | HQ3Q | Q3LQ | Q3Q | | | | | | | |
| 04268 | 輞 | HQUC | QUKC | QUC | | | | | | | |
| 04269 | 輥 | HQBF | HQB7 | QBFF | QB2F | QBF | QB77 | QB27 | QB7 | HQB% | QB% |
| 04270 | 適 | T2AZ | TUOZ | | | | | | | | |
| 04271 | 遮 | LH4Z | | | | | | | | | |
| 04272 | 遨 | EDXZ | EXZ | EUXZ | | | | | | | |
| 04273 | 遭 | HQBZ | QBZ | | | | | | | | |
| 04274 | 遷 | 4KLZ | 4LZ | | | | | | | | |
| 04275 | 鄉 | 2YHP | YAHP | =YHP | | | | | | | |
| 04276 | 鄭 | KQKP | KKP | 29KP | 2KP | =9KP | =KP | | | | |
| 04277 | 鄧 | W-KP | WOKP | WKP | W.P | | | | | | |
| 04278 | 鄰 | AYQP | AQP | YQP | | | | | | | |
| 04279 | 醇 | -QTZ | 9TOZ | 9TZ | | | | | | | |
| 04280 | 醉 | -QT+ | -Q+ | 9TT+ | 9T+ | -QT[ | -Q[ | 9TT[ | 9T[ | | |
| 04281 | 醋 | -QHB | 9HHB | 922B | 9HB | | | | | | |
| 04282 | 醃 | -QKL | 9KQL | 9KL | | | | | | | |
| 04283 | 鋅 | $T2H | 6T2H | | | | | | | | |
| 04284 | 銻 | $25J | 625J | | | | | | | | |
| 04285 | 銷 | 8K3A | $3A | 63A | | | | | | | |
| 04286 | 鋪 | $+A. | 6+A. | $[A. | 6[A. | | | | | | |
| 04287 | 鋤 | 8K4C | $4C | $4C' | 64C | 64C' | | | | | |
| 04288 | 鋁 | 8KOO | $O'O | $OIO | $OO | 6O'O | 6OIO | 6OO | | | |
| 04289 | 銳 | 8K2R | $2OR | $2R | 62OR | 62R | | | | | |
| 04290 | 鋌 | 8KTH | $TTH | $2TH | $TH | 6TTH | 62TH | 6TH | | | |
| 04291 | 鋒 | 8KXE | $'XE | $XE | 6'XE | 6XE | | | | | |
| 04292 | 鋇 | 8K42 | 8K48 | $42 | $48 | 642 | 648 | | | | |
| 04293 | 鋰 | 8KQH | $QH | 6QH | | | | | | | |
| 04294 | 鋒 | 8KBH | $BHI | $BH | 6BHI | 6BH | | | | | |
| 04295 | 閭 | PPOO | MO'O | MOIO | MOO | | | | | | |
| 04296 | 閱 | PP2R | M2OR | M2R | | | | | | | |
| 04297 | 霄 | -A3A | TA3A | M3A | -3A | | | | | | |
| 04298 | 霆 | -AEZ | TAEZ | MEZ | -EZ | | | | | | |
| 04299 | 霎 | -ALK | TALK | ML2K | ML=K | MLK | -L2K | -L=K | -LK | | |
| 04300 | 霉 | -ATQ | TATQ | MTQ- | MTQ | -TQ- | -TQ | | | | |
| 04301 | 靠 | HOEE | HO2E | 'HOE | | | | | | | |
| 04302 | 鞍 | H+UV | H+V | H[UV | H[V | | | | | | |
| 04303 | 鞋 | H+HH | X[HH | | | | | | | | |

| | | | | | | | | | | | |
|---|---|---|---|---|---|---|---|---|---|---|---|
| 04304 | 肇 | HRH+ | HR+ | HRH[ | HR[ | | | | | | |
| 04305 | 頡 | HOT2 | HOT8 | HO8 | | | | | | | |
| 04306 | 頫 | KKT2 | KKT8 | | | | | | | | |
| 04307 | 頷 | 8OT2 | 8OT8 | 8O8 | | | | | | | |
| 04308 | 颱 | RSHO | R'+O | R-+O | RHIO | R2IO | R=IO | RHO | R'[O | R-[O | |
| 04309 | 饕 | 2E8K | 2EBK | =E8K | =EBK | | | | | | |
| 04310 | 餓 | 8SFM | 8SM | 8FFM | 8FM | 87FM | 87M | 8'FM | | | |
| 04311 | 餒 | 8SAV | 8SV | 8FAV | 8FV | 87AV | 87V | 8'3V | 8AV | | |
| 04312 | 餘 | 8S8Y | 8SY | 8F8Y | 8FY | 878Y | 87Y | 88'Y | 88-Y | 88H3 | 88Y |
| | | 883 | 8S8' | 8F8' | 878' | 88' | | | | | |
| 04313 | 駝 | E4UF | E4F | E4U7 | 7.UF | 7UF | 7.U7 | 7U7 | | | |
| 04314 | 駐 | E4.E | 7.E | | | | | | | | |
| 04315 | 駟 | EJ44 | EC44 | E44 | 74 | | | | | | |
| 04316 | 駛 | E4OX | E4OX | 7OX | 7OX | | | | | | |
| 04317 | 駑 | VXE4 | VX7 | | | | | | | | |
| 04318 | 駕 | COE4 | CO4 | C'O7 | CO7 | JOE4 | JO4 | J'O7 | JO7 | | |
| 04319 | 駒 | E4CO | 7'CO | 7CO | E4JO | 7'JO | 7JO | | | | |
| 04320 | 駙 | E4TJ | 7TJ | | | | | | | | |
| 04321 | 骷 | QA+O | QAO | QA[O | | | | | | | |
| 04322 | 鬆 | ES3X | E3+X | D+X. | D+X | E3[X | D[X. | D[X | | | |
| 04323 | 鬚 | ES3A | E3UH | DU+- | DUIH | DUH | DU[- | | | | |
| 04324 | 鬧 | PPTE | MTUI | MTE | | | | | | | |
| 04325 | 魅 | QR+Y | QR-Y | QRY | R+Y | R-Y | QR[Y | R[Y | | | |
| 04326 | 魄 | 'BQR | B'QR | BQRS | 'BR | BQR | | | | | |
| 04327 | 魷 | U4.K | U4K. | J.K | JK. | | | | | | |
| 04328 | 魯 | UQ4B | UQB | | | | | | | | |
| 04329 | 鳩 | URB4 | ERB4 | UR5 | ER5 | | | | | | |
| 04330 | 鴉 | CJB4 | CJ4 | CJ5 | | | | | | | |
| 04331 | 鴃 | B4LK | B4K | 5LK | | | | | | | |
| 04332 | 麩 | KA+K | KA-K | KAK | KA[K | | | | | | |
| 04333 | 麼 | LYYL | LYEL | LY3L | LYL | | | | | | |
| 04334 | 黎 | YD83 | YD3 | YD84 | YD4 | | | | | | |
| 04335 | 墨 | 4H4H | 44H | QH4H | Q4H | | | | | | |
| 04336 | 齡 | GU4T | GUT | GQ4T | GQT | GO4T | GOT | | | | |
| 04337 | 儒 | TMTA | T-AA | T-AM | TTAA | TTAM | T-TA | T-M | | | |
| 04338 | 儘 | TEH4 | TE44 | | | | | | | | |
| 04339 | 儔 | THLJ | THJJ | TE'J | T3'J | | | | | | |
| 04340 | 儐 | TU32 | TU38 | | | | | | | | |
| 04341 | 儕 | TTDH | TTKH | TTXH | TTX2 | T.XH | T.X2 | | | | |
| 04342 | 冀 | FFQ2 | FQH2 | FFQ8 | FQH8 | 77Q2 | 7QH2 | 77Q8 | 7QH8 | 2FQ2 | 2FQ8 |
| | | =FQ2 | =FQ8 | 27Q2 | 27Q8 | =7Q2 | =7Q8 | | | | |
| 04343 | 冪 | UHBE | UHE | UHKE | | | | | | | |
| 04344 | 凝 | 2FKG | 27KG | =FKG | =7KG | | | | | | |
| 04345 | 劑 | TDHJ | TKHJ | TXHJ | TX2J | .XHJ | .X2J | | | | |
| 04346 | 劓 | 4QHJ | | | | | | | | | |
| 04347 | 勳 | H44C | | | | | | | | | |
| 04348 | 噙 | O8QA | O8A | | | | | | | | |
| 04349 | 噫 | OTKG | OTBG | OTG | | | | | | | |
| 04350 | 噹 | O3UQ | O3OQ | O3Q | O3E | | | | | | |
| 04351 | 噩 | -+-O | E4O | -[-O | | | | | | | |
| 04352 | 噗 | OYY3 | O233 | OY23 | OY3 | OYYY | O2YY | OY-Y | OYY | | |
| 04353 | 噸 | O+L2 | O+L8 | O+2 | O.T2 | O.T8 | O.2 | O.8 | O. | O[L2 | O[L8 |
| | | O[2 | . | | | | | | | | |
| 04354 | 噪 | O3OY | OOY | | | | | | | | |
| 04355 | 器 | 4O.K | 4OK. | | | | | | | | |
| 04356 | 噴 | OQLK | | | | | | | | | |
| 04357 | 嘯 | OU7Z | OUZ | OTUZ | OT7Z | | | | | | |
| 04358 | 噯 | OAUX | OAGX | OAX | | | | | | | |
| 04359 | 噬 | O/HT | OFFH | | | | | | | | |
| 04360 | 噢 | OUYK | OOYK | OOY2 | OOY8 | OQ2 | OQ8 | O'QK | O'Q2 | O'Q8 | |
| 04361 | 嘴 | OHBC | OHBL | | | | | | | | |
| 04362 | 壁 | POHH | PHIH | | | | | | | | |
| 04363 | 墾 | AZKH | ZBKH | ZKH | | | | | | | |
| 04364 | 壇 | HTQB | IHTB | | | | | | | | |
| 04365 | 壅 | TNEH | | | | | | | | | |
| 04366 | 奮 | KTEQ | K'EQ | KEQ | | | | | | | |
| 04367 | 嬉 | VBSK | VB5K | | | | | | | | |
| 04368 | 嬴 | TOAR | TLAR | TLVR | TAVR | TVR | CAVR | COAR | COVR | | |
| 04369 | 學 | EXEZ | EEUZ | EXUZ | EUZ- | EUZ | ;XUZ | ;UZ- | ;UZ | 2HUZ | =HUZ |
| | | 3UZ- | 3UZ | 3Z- | | | | | | | |
| 04370 | 寰 | U4-K | U4OK | | | | | | | | |
| 04371 | 導 | K4ZJ | KZJ | | | | | | | | |
| 04372 | 彊 | 53QQ | 532Q | 5-Q- | 5-QQ | 5QQ- | 5QQ | 5Q | | | |
| 04373 | 憲 | UE4G | | | | | | | | | |

| | | | | | | | | | | | |
|---|---|---|---|---|---|---|---|---|---|---|---|
| 04374 | 憲 | 2E4G | =E4G | 27G | =7G | | | | | | |
| 04375 | 憑 | HO4G | | | | | | | | | |
| 04376 | 憊 | THAG | | | | | | | | | |
| 04377 | 懍 | I2TY | ITQ3 | ITQY | | | | | | | |
| 04378 | 憶 | I2TG | ITKG | ITBG | ITG | | | | | | |
| 04379 | 憾 | I2MG | IOMG | IMOG | IMG | | | | | | |
| 04380 | 懊 | IUYK | I2QK | I2Q2 | I2Q8 | I'QK | I'Q2 | I'Q8 | IQK | IQ2 | IQ8 |
| 04381 | 懈 | I2UH | IUAH | | | | | | | | |
| 04382 | 戰 | OQ+M | O+M | 2O+M | 2+M | =O+M | =+M | 2Q+M | =Q+M | OO+M | TOM |
| | | OQ[M | O[M | 2O[M | 2[M | =O[M | =[M | 2Q[M | =Q[M | OO[M | ●M |
| 04383 | 擅 | FTQB | FTQ4 | | | | | | | | |
| 04384 | 擁 | FTNE | | | | | | | | | |
| 04385 | 擋 | F3UQ | F3OQ | F3Q | F3E | | | | | | |
| 04386 | 撻 | FHEZ | FHZ | | | | | | | | |
| 04387 | 撼 | FOMG | FMOG | FMG | | | | | | | |
| 04388 | 據 | FTUZ | FT7Z | FU7Z | | | | | | | |
| 04389 | 擄 | FTUC | FT7C | FTC | FTQC | FU7C | FUQC | FUC | | | |
| 04390 | 擇 | F4HH | F4H | | | | | | | | |
| 04391 | 擂 | F-AQ | FTAQ | FMQ | F-Q | | | | | | |
| 04392 | 操 | F3OY | FOY | | | | | | | | |
| 04393 | 撿 | F8OT | F8-T | F8-2 | F8-4 | F822 | F824 | F8T | F84 | F8B2 | F8B8 |
| 04394 | 擒 | F8QA | F8TA | | | | | | | | |
| 04395 | 擔 | FULO | FUL; | | | | | | | | |
| 04396 | 撾 | FQAZ | | | | | | | | | |
| 04397 | 整 | YOXG | YOXG | YTXG | YX-G | YXG | | | | | |
| 04398 | 曆 | LYYB | L2YB | | | | | | | | |
| 04399 | 曉 | B3HR | BHR | BHHR | | | | | | | |
| 04400 | 暹 | BTEZ | B'EZ | | | | | | | | |
| 04401 | 曄 | BHHH | BHH | | | | | | | | |
| 04402 | 曇 | B-AS | BTAS | BM2S | BM=S | BMS | B-2S | B-=S | B-S | | |
| 04403 | 暸 | BK23 | BKB3 | BK3 | | | | | | | |
| 04404 | 樽 | YKQJ | Y29J | | | | | | | | |
| 04405 | 樸 | Y42K | Y4KK | Y422 | Y4K2 | Y428 | Y4K8 | | | | |
| 04406 | 樺 | YHHH | YH-H | YX-H | | | | | | | |
| 04407 | 橙 | YW-K | YWOK | YWK | YW. | | | | | | |
| 04408 | 橫 | YHQ2 | YHQ8 | YXQ2 | YXQ8 | | | | | | |
| 04409 | 橘 | YSJA | | | | | | | | | |
| 04410 | 樹 | YHKJ | | | | | | | | | |
| 04411 | 橄 | YTPX | YHPX | YHX | YT4X | YH4X | Y4TX | | | | |
| 04412 | 橢 | YP+A | YP[A | | | | | | | | |
| 04413 | 橡 | YUBZ | YUZ | | | | | | | | |
| 04414 | 橋 | Y'KA | Y-KA | Y2TA | Y=TA | YH2A | YH8A | YKOA | Y'K2 | Y-K2 | |
| 04415 | 橇 | T3EL | Y33L | | | | | | | | |
| 04416 | 樵 | YTE4 | Y'E4 | YE4 | | | | | | | |
| 04417 | 機 | YNNM | YNTM | YNKM | YNM | YNMT | YMT | YNMK | YMK | | |
| 04418 | 橈 | Y3HR | YHR | YHHR | | | | | | | |
| 04419 | 歙 | 8EUT | 8ET | 8OE- | 8EE- | 8E- | 82UT | 82- | | | |
| 04420 | 歷 | LYYG | L2YG | LC' | LC | | | | | | |
| 04421 | 氅 | 3XEL | 3X3L | 3AXL | | | | | | | |
| 04422 | 濂 | 3LK4 | | | | | | | | | |
| 04423 | 澱 | 3P2X | 3P8X | 3PX | | | | | | | |
| 04424 | 澡 | 33OY | 3OOY | 3O2Y | | | | | | | |
| 04425 | 濃 | 3QLK | | | | | | | | | |
| 04426 | 澤 | 34HH | | | | | | | | | |
| 04427 | 濁 | 34CS | 34C | 34S | 34JS | | | | | | |
| 04428 | 澧 | 3Q-K | 3QOK | 3Q. | | | | | | | |
| 04429 | 澳 | 3'QK | 3'Q2 | 3'Q8 | | | | | | | |
| 04430 | 激 | 3BDX | 3BX | | | | | | | | |
| 04431 | 澹 | 3ULO | 3UL; | | | | | | | | |
| 04432 | 澶 | 3TQB | | | | | | | | | |
| 04433 | 澦 | 3SJ2 | 3SJ8 | | | | | | | | |
| 04434 | 澠 | 34BL | 34LB | 34EL | 34LE | 34L | 3QBL | 3QLB | 3QEL | 3QLE | 3QL |
| 04435 | 澴 | 34-K | 34OK | | | | | | | | |
| 04436 | 熾 | WTBM | WTM | | | | | | | | |
| 04437 | 燉 | WTZX | | | | | | | | | |
| 04438 | 燐 | W2YH | WYAH | WYH | | | | | | | |
| 04439 | 燒 | W3HR | WH-R | WHHR | | | | | | | |
| 04440 | 燈 | WW-K | WWOK | WWK | WW. | W-J | WJ | | | | |
| 04441 | 燕 | HOF4 | HFF4 | HF4 | HO74 | H774 | H74 | XOF4 | XFF4 | XF4 | XO7 |
| | | X774 | X74 | HO24 | XO24 | | | | | | |
| 04442 | 熹 | HOH4 | HOO4 | HOK4 | HXO4 | | | | | | |
| 04443 | 燎 | WK23 | WKB3 | WK3 | | | | | | | |
| 04444 | 燙 | 3BCW | 3CW | 3BJW | 3JW | | | | | | |
| 04445 | 燜 | WPPG | WMG | WPG | | | | | | | |

```
04446 燃   WAK4  WA4
04447 餤   UEWW  UEW   U;WW  U;W
04448 獨   Z4CS  Z4C   Z4S   Z4JS  Z4J
04449 璜   EHQ2  EHQ8
04450 璣   ENTM  ENKM  ENM   ENMT  EMT   ENMK  EMK
04451 璘   E2YH  E=YH  EYAH  EYH
04452 環   EBT3  EB+3  EB03  EB3   EB[3
04453 璞   E42K  E4KK  E422  E4K2  E428  E4K8
04454 瓢   43AS  43S
04455 甌   CO-Z  COCZ  C3OZ  CX-Z  CXCZ  CXZ
04456 甑   H4UZ  H4Z   X4UZ  X4Z
04457 瘵   LTK+  LTB+  L2T+  LTK[  LTB[  L2T[
04458 瘸   L2CA  LCOA  LJOA
04459 瘺   L2PA  L2PM  LP-A  LPTA  LPA   LPM   L2P-  LP-
04460 盧   TUQ4  T7Q4  TU74  U7Q4
04461 盥   EE34  E3E4  E34   ;34-  ;34   EE44  E4E4  ;44-  ;44
04462 瞠   43UH  43H
04463 瞞   4HA   4HUT
04464 瞟   4-43  4423  443   4-4Y  44-Y  44Y   44=3
04465 瞥   3AX4  3X4
04466 磨   LYYO  L2YO  LYTO  LYY+  L2Y+  LYY[  L2Y[
04467 磚   TO+J  ++QJ  TO[J  [[QJ
04468 磬   HBXO  HPXO  HBX+  HPX+  HX+   HBX[  HPX[  HX[
04469 磺   TOE2  TOE8  +E42  +E2   +E48  +E8   [E42  [E2   [E48  [E8
04470 禦   THP3  TP3   THPY  TPY
04471 積   'YE2  'YE8  'E42  'E48  'E2   'E8
04472 穎   FYT2  FY2   FYT8  FY8   7YT2  7Y2   7YT8  7Y8
04473 穆   'YB3  YB33  YB3   'B33
04474 穌   U4'Y  U4Y   J'Y   JY    UQ4'  U4'
04475 穋   'YE3  'EE3  'E83  'E3   '283
04476 窺   U2KR  U8KR  UK4R  UKR
04477 篙   /TOA  /THA
04478 篝   /TOK
04479 篛   FFHY  /HRY  /HY
04480 篤   FFE4  /EJ4  /EC4  /E4   FF7   /7
04481 篪   FF55  FF25  /252  /25=  /55
04482 篡   FF4S  /4KS  /4S
04483 篩   FFBE  FF2E  /2-E
04484 篦   FFQF  /QFF  /Q2F  /QF   FFQ7  /Q77  /Q27  /Q7
04485 糕   2Y24  =Y24  =Y=4
04486 糖   2YLO  =YLO
04487 縊   N334  N344  N224  N884  N284  N2K4  NK24  NK84  N34-  N44-
           N34   N44
04488 縑   N3K4  NKE4  NK4
04489 縈   WWU3  WUN3  WU3   WWUN  WUN
04490 縛   N3+J  N+AJ  N+J   N3[J  N[AJ  N[J
04491 縣   43N3  43'N  433   43N   4YN3  4Y'N  4Y3   4YN   4L3
04492 縞   NTOA  NTHA
04493 縝   N3+K  N+4K  N+K   N3+2  N+42  N+2   N3+8  N+48  N+8   N3FK
           NF4K  NFK   N3F2  NF42  NF2   N3F8  NF48  NF8   N37K  N74K
           N7K   N372  N742  N72   N378  N748  N78   N3[K  N[4K  N[K
           N3[2  N[42  N[2   N3[8  N[48  N[8
04494 縉   N32B  N3SB  N2SB  N2B   N3=B  N=SB  N=B
04495 縟   N3CC  NCC   N2CE  NCEC  NCE
04496 罹   4GTE  4G'E  4GE
04497 羲   2EYM  =EYM
04498 翰   HB8E  +B+E  +B8E  HB82  +B82  [B[E  [B8E  [B82
04499 翱   A995
04500 融   -AEE  -A2E  OAEE  OA2E  OAE   -OA2  -A2   OA2
04501 耨   2YLJ  =YLJ  YLKJ  YLJ
04502 膳   A2EO  A2KO
04503 膩   AM22  AM=2  AM2   A22M  A28M  A2M   AM28  AM8   A=2M  A=M
           A2
04504 膨   AHK3  AH3
04505 臻   SHEY
04506 興   EAEK  EAK   ;AK
04507 艘   'AEX  'A;X  A-EX  A-;X  A-X   AEIX  AEX   A;IX  A;X
04508 艙   'A8O  A-8O  A8EO
04509 蕊   ++3G  HGGG  H3G   XGGG  X3G   [[3G
04510 蕤   H+AG  H+QG  H+SG  H+G   X+AG  X+QG  X+SG  X+G   H[AG  H[QG
           H[SG  H[G   X[AG  X[QG  X[SG  X[G
04511 蕭   H4B+  H4+   X4B+  X4+   H4B[  H4[   X4B[  X4[
04512 蕨   HLK-  HLKT  XLK-  XLKT
04513 蕩   H3BC  X3BC
```

| | | | | | | | | | | | |
|---|---|---|---|---|---|---|---|---|---|---|---|
| 04514 | 辨 | ++AQ | ++YQ | HAYQ | HAQ | XAYQ | XAQ | [[AQ | [[YQ | | |
| 04515 | 辮 | ++E4 | HTE4 | H'E4 | HE4 | XTE4 | X'E4 | XE4 | [[E4 | | |
| 04516 | 辦 | HEKK | XEKK | | | | | | | | |
| 04517 | 辯 | HE-4 | HTE4 | HE4 | XE-4 | XTE4 | XE4 | | | | |
| 04518 | 辮 | HBPX | HB4X | HBX | XBPX | XB4X | XBX | | | | |
| 04519 | 蟧 | OSTD | ST2D | STUD | OSTD | | | | | | |
| 04520 | 螟 | OSU6 | OS6 | SUB6 | SU6 | OSU6 | OS6 | | | | |
| 04521 | 螞 | OSE4 | SEJ4 | SEC4 | SE4 | OSE4 | OS7 | OS7 | S7 | | |
| 04522 | 螢 | 2WUS | =WUS | WWUS | WUOS | WUOS | WUS | HUOS | HUOS | HUS | |
| 04523 | 酸 | -OAS | -AOS | -AS | OAOS | -AOS | OAOS | | | | |
| 04524 | 衛 | 'TUJ | 'TJJ | TUKJ | TJJ | ]UKJ | ]JJ | | | | |
| 04525 | 褔 | KBKZ | | | | | | | | | |
| 04526 | 褲 | KLHQ | KLH | KLQ | | | | | | | |
| 04527 | 褥 | KLKJ | KLJ | | | | | | | | |
| 04528 | 襯 | KLTR | KLUR | KL7R | KLR | | | | | | |
| 04529 | 褡 | KH8O | | | | | | | | | |
| 04530 | 親 | TY4R | TYR | | | | | | | | |
| 04531 | 覦 | 8J4R | 8JR | | | | | | | | |
| 04532 | 諦 | ;T2E | ;TUE | | | | | | | | |
| 04533 | 謎 | 4OT3 | ;T23 | ;TL3 | ;T3 | | | | | | |
| 04534 | 諫 | 4OY4 | ;Y4 | | | | | | | | |
| 04535 | 諱 | ;HOH | | | | | | | | | |
| 04536 | 謀 | 4OHY | ;H2Y | ;H=Y | ;H-Y | ;HY | | | | | |
| 04537 | 諜 | 4OHY | ;HLY | ;HY | | | | | | | |
| 04538 | 諧 | ;FFB | ;2FB | ;F'B | ;77B | ;27B | ;7'B | ;%'B | ;%B | | |
| 04539 | 諮 | 4O2O | ;2TO | ;2-O | | | | | | | |
| 04587 | 錨 | 8K3Q | $3LQ | $3Q | 63LQ | 63Q | | | | | |
| 04588 | 間 | PPUE | PPU: | MUEE | MUE | MU: | PPDE | PPD: | MDEE | MDE | |
| 04589 | 隧 | P2ZZ | PZZ | | | | | | | | |
| 04590 | 隨 | P+AZ | P[AZ | | | | | | | | |
| 04591 | 陵 | P8OT | P8-T | P8-2 | P8-4 | P822 | P824 | P8T | P82 | P84 | P8B2 |
| | | P8B8 | | | | | | | | | |
| 04592 | 雕 | UOTE | UO'E | UHOE | UOE | | | | | | |
| 04593 | 霎 | MTV | MTKV | -ATV | TATV | -TKV | -TV | | | | |
| 04594 | 霜 | M3TO | -3TO | | | | | | | | |
| 04595 | 霖 | MYY | M2Y | -AYY | -A2Y | TAYY | TA2Y | -YY | -2Y | | |
| 04596 | 霄 | MTHH | MT.E | MTTE | MTE | M'E | -ATE | -A'E | TATE | TA'E | -TE |
| | | -'E | | | | | | | | | |
| 04597 | 霓 | MEER | MER | M;R | -AER | -A;R | TAER | TA;R | -EER | -ER | -;R |
| 04598 | 霏 | MEE | M2E | TAEE | TA2E | -EE | -2E | | | | |
| 04599 | 靛 | EAUG | | | | | | | | | |
| 04600 | 靜 | EAAJ | | | | | | | | | |
| 04601 | 靦 | TQ4R | | | | | | | | | |
| 04602 | 鞘 | H+3A | H[3A | X+3A | X[3A | | | | | | |
| 04603 | 頰 | KTT2 | KTT8 | K2T2 | K2T8 | -3T2 | -3T8 | | | | |
| 04604 | 頸 | -HT2 | -HT8 | 3HT2 | 3HT8 | | | | | | |
| 04605 | 頻 | G3T2 | G3T8 | | | | | | | | |
| 04606 | 頷 | 8LO2 | 8-L8 | 8JO2 | 8JO8 | 8OT2 | 8OT8 | 8O8 | | | |
| 04607 | 頭 | -KT2 | -KT8 | OKT2 | OKT8 | .T42 | .T48 | 2K | =K | | |
| 04608 | 頹 | YRT2 | YRT8 | | | | | | | | |
| 04609 | 頤 | COT2 | COT8 | CUT2 | CUT8 | | | | | | |
| 04610 | 鬆 | AX8K | AXK | TX8K | TS8S | AX8S | TX8 | AX8 | | | |
| 04611 | 館 | 8SUB | 8SB | 8FUB | 8FB | 87UB | 87B | 8.UB | 8UB | | |
| 04612 | 餞 | 8SMM | 8S2M | 8SM | 8FMM | 8F2M | 87MM | 872M | 87M | 8MM | 82M |
| 04613 | 餛 | 8SBF | 8SF | 8FBF | 8FF | 8SB7 | 8S7 | 8FB7 | 8F7 | 87BF | 87F |
| | | ,87B7 | 877 | 8BFF | 8B2F | 8BF | 8B77 | 8B27 | 8B7 | 8SB% | 8FB% |
| | | 87B% | 8B% | | | | | | | | |
| 04614 | 餡 | 8SUE | 8SU; | 8S; | 8FUE | 8FU; | 8F; | 87UE | 87U; | 87; | 8SDE |
| | | 8SD; | 8FDE | 8FD; | 87DE | 87D; | 8UEE | 8UE | 8U; | 8DEE | 8D; |
| 04615 | 餚 | 8SXA | 8FXA | 87XA | 8X+A | 8XA | 8X[A | | | | |
| 04616 | 駭 | E4TT | 7TUT | 7TT | | | | | | | |
| 04617 | 駢 | E42H | 72HH | 7222 | 72H | | | | | | |
| 04618 | 駱 | E4XO | 7'XO | 7XO | | | | | | | |
| 04619 | 骸 | QATT | QAT | | | | | | | | |
| 04620 | 骼 | QAXO | QAO | | | | | | | | |
| 04621 | 髻 | E3HO | ES3O | E3O | | | | | | | |
| 04622 | 髭 | ES3F | E3GF | E3F | ES37 | E3G7' | E37 | DGF | DG7 | | |
| 04623 | 鬨 | PPH2 | PHH2 | MHH2 | M222 | PPH8 | PHH8 | MHH8 | M228 | | |
| 04624 | 鮑 | U4UL | U4CL | JUOL | JUPL | JUCL | JUL | J'CL | JCOL | JCPL | JCCL |
| | | JCL | J'JL | JJOL | JJPL | JJCL | JJL | | | | |
| 04625 | 鴕 | B4UF | B4F | B4U7 | B47 | 5.UF | 5UF | | | | |
| 04626 | 鴣 | +OB4 | +O4 | +O5 | [OB4 | [O4 | [O5 | | | | |
| 04627 | 鴦 | UKB4 | UK5 | | | | | | | | |
| 04628 | 鴨 | QIB4 | QI4 | QI5 | | | | | | | |
| 04629 | 鴿 | 8SB4 | 8PB4 | 8P4 | 8-S5 | 8-P5 | 8S5 | 8P5 | | | |
| 04630 | 鴛 | ALB4 | AJL5 | ACL5 | AL5 | | | | | | |

04587 錨 8K3Q $3LQ $3Q 63LQ 63Q
04588 閒 PPUE PPU: MUEE MUE MU: PPDE PPD: MDEE MDE
04589 隧 P2ZZ PZZ
04590 隨 P+AZ P[AZ
04591 險 P8OT P8-T P8-2 P8-4 P822 P824 P8T P82 P84 P8B2
P8B8
04592 雖 UOTE UO'E UHOE UOE
04593 霙 MTV MTKV -ATV TATV -TKV -TV
04594 霜 M3TO -3TO
04595 霖 MYY M2Y -AYY -A2Y TAYY TA2Y -YY -2Y
04596 霪 MTHH MT.E MTTE MTE M'E -ATE -A'E TATE TA'E -TE
-'E
04597 霓 MEER MER M;R -AER -A;R TAER TA;R -EER -ER -;R
04598 霏 MEE M2E TAEE TA2E -EE -2E
04599 靛 EAUG
04600 靜 EAAJ
04601 靦 TQ4R
04602 鞘 H+3A H[3A X+3A X[3A
04603 頰 KTT2 KTT8 K2T2 K2T8 -3T2 -3T8
04604 頸 -HT2 -HT8 3HT2 3HT8
04605 頻 G3T2 G3T8
04606 頷 8LO2 8-L8 8JO2 8JO8 8OT2 8OT8 8O8
04607 頭 -KT2 -KT8 OKT2 OKT8 .T42 .T48 2K =K
04608 頹 YRT2 YRT8
04609 頤 COT2 COT8 CUT2 CUT8
04610 鬚 AX8K AXK TX8K TS8S AX8S TX8 AX8
04611 館 8SUB 8SB 8FUB 8FB 87UB 87B 8.UB 8UB
04612 餞 8SMM 8S2M 8SM 8FMM 8F2M 87MM 872M 87M 8MM 82M
04613 餛 8SBF 8SF 8FBF 8FF 8SB7 8S7 8FB7 8F7 87BF 87F
,87B7 877 8BFF 8B2F 8BF 8B77 8B27 8B7 8SB% 8FB%
87B% 8B%
04614 餡 8SUE 8SU: 8S: 8FUE 8FU: 8F: 87UE 87U: 87: 8SDE
8SD; 8FDE 8FD; 87DE 87D; 8UEE 8UE 8U: 8DEE 8D;
04615 餚 8SXA 8FXA 87XA 8X+A 8XA 8X[A
04616 駭 E4TT 7TUT 7TT
04617 駢 E42H 72HH 7222 72H
04618 駱 E4XO 7'XO 7XO
04619 骸 QATT QAT
04620 骼 QAXO QAO
04621 髻 E3HO ES30 E30
04622 髭 ES3F E3GF E3F ES37 E3G7 É37 DGF DG7
04623 鬨 PPH2 PHH2 MHH2 M222 PPH8 PHH8 MHH8 M228
04624 鮑 U4UL U4CL JUOL JUPL JUCL JUL J'CL JCOL JCPL JCCL
JCL J'JL JJOL JJPL JJCL JJL
04625 鴕 B4UF B4F B4U7 B47 5.UF 5UF
04626 鴣 +OB4 +04 +05 [OB4 [04 [05
04627 鴦 UKB4 UK5
04628 鴨 QIB4 QI4 QI5
04629 鴒 8SB4 8PB4 8P4 8-S5 8-P5 8S5 8P5
04630 鴛 ALB4 AJL5 ACL5 AL5
04631 默 44.K 44K. 4H4K 44K Q4.K Q4K. QH4K Q4K
04632 黔 448L 44L 448J 44J Q48L Q48J Q4J
04633 龍 TATL TAFL TA7L TAL
04634 龜 U4QL U4EL UOQL UOEL UQQL UQEL UQL U4LQ U4LE UOLQ
UOLE UQLQ UQLE
04635 傑 TT4X TTUX
04636 償 T3U2 T3U8
04637 儡 TQQQ T3Q
04638 儲 T4OB T4HB T;HB T;B
04639 勵 LHAC LAC LAC'
04640 嚎 OTUZ OTOZ
04641 嚀 OUGJ OU4J
04642 嚐 O3UB O3OB O3FB O37B O3B
04643 嚅 O-AA O-AM OTAA OTAM OMTA OMA OTM OMM O-TA
04644 嚇 O2H4 OH44
04645 嚏 O+UG O+QG O+G O[UG O[QG O[G
04646 壕 HTUZ HTOZ
04647 壓 LBKH LKH LIH. LH.
04648 壑 TOXH TXIH
04649 壙 HH44 HH4 IHH4
04650 嬰 242V 422V 42V 248V 488V 48V =42V =48V
04651 嬪 VU32 VU38
04652 嬤 VLYN VLN
04653 孺 Z-AA Z-AM ZTAA ZTAM ZMTA ZMA ZTM ZMM Z--A Z--M
Z-TA Z-TM Z-MA Z-MM Z'-A Z'-M Z'TA Z'TM Z'MA Z'MM
Z-M

04654 尷 KEF4 +LE4 [LE4
04655 屨 P'TV PTQV PTV P]QV P]V
04656 嶼 EE5K E;5K E:K IUEK IU:K E2HK \E5K \:5K \:K \2HK
04657 嶺 E8S2 E8P2 E8S8 E8P8 IU88 \8S2 \8P2 \8S8 \8P8
04658 嶽 EZ4K EZ;K EZK IUZK \Z4K \Z:K \ZK
04659 嶸 EWUY EWWY E2WY EWY EHUY EKUY IUWY IUHY IUKY \WUY
\WWY \2WY \WY \HUY \KUY
04660 幫 HHJE HJBE
04661 彌 5T2A 5T8A 5KUX 5KU4 5KIA 5KA 5UI2 5UI8 5U3
04662 徽 TE3X TENX ]E3X ]ENX T\3X T\NX ]\3X ]\NX
04663 應 LTEG .L3-
04664 懂 IHHH IXHH
04665 懇 AZKG AKG ZBKG ZKG
04666 懦 I2MM I-AA I-AM ITAA ITAM IMTA IMM I-TA I-M
04667 懋 YSYG YJYG
04668 戲 TUKM TKM T7KM TU.M T7.M T.M TXM .XM U7KM U7.M
U7M U.M
04669 戴 HQ2M HQ8M HMQ2 HMQ8
04670 擎 HCXF HXF HXEJ HX3J HXJ
04671 擊 +EXF +XF +X3J +QSE +QE [EXF [XF [X3J [QSE [QE
04672 擘 POHF PTHF PHF PHEJ PH3J PHJ
04673 擠 FTDH FTKH FTXH FTX2 F.XH F.X2
04674 擰 FUGJ FU4J FUJ
04675 擦 FUW3 FU3 FUWY
04676 擬 FFKG F7KG F7G
04677 擱 FPPO FMXO FMO
04678 擢 FEEE F2EE FC2E FL2E F2TE F2'E
04679 擭 FHEX FHX
04680 斂 8TTX 8TX
04681 斃 3AXF 3XAF 3XF 3AX7 3XA7 3X7
04682 曙 B4HB B4B
04683 曖 BAUX BAGX BAX
04684 檀 YTQB
04685 檔 Y3UQ Y3OQ Y3E
04686 檄 YBDX YBX
04687 檢 Y8OT Y8-T Y8-2 Y8-4 Y822 Y824 Y8T Y82 Y8B2 Y8B8
04688 檜 Y84B Y8QB Y8-B Y8B Y82S Y8=S
04689 櫛 YFFP YFBP YFP Y/BP Y/P
04690 檣 YHTQ YHQ
04691 橾 Y3OY YOOY YOY
04692 檗 POHY PTHY PHY
04693 檐 YULO YUL; YU;
04694 檠 HCXY HXY
04695 歜 4CUT 4CST 4CT 4SUT 4CS- 4C- 4S-
04696 殮 -A8T -AT
04697 毚 UOFR UFUR UFR UO7R U7UR
04698 氈 TBEL TB3L T-EL T-3L
04699 濘 3UGJ
04700 濱 3U32 3U38
04701 濟 3TDH 3TKH 3TXH 3TX2 3.XH 3.X2
04702 濠 3TUZ 3TOZ
04703 濛 3HUZ
04704 濤 3HLJ 3HJJ 3E'J 33'J 3EJ
04705 濫 3EF4 3E4-
04706 濯 3EEE 32EE 32TE 32'E 32E
04707 澀 3DGG 32DG
04708 濬 3TU4 3T44
04709 濡 3-AA 3-AM 3TAA 3TAM 3MTA 3MA 3TM 3MM 3-TA 3-M
04710 濩 3HEX 3XEX
04711 濕 3BN4 3BH2
04712 濮 3T4K 3T42 3T48
04713 濰 3N3E 3NTE 3N'E 3NE
04714 燧 W2ZZ WZZ
04715 營 WWUB 2WUB =WUB WUOO WUB KUOO HUOO XUOO KUB
04716 燮 4WWX 4WX ;WWX ;WX W4WX W;WX W;X
04717 燦 WTXY WTY WAXY WAY
04718 燥 W3OY WOOY WOY
04719 燭 W4CS W4C W4S
04720 燬 WEHX WEX W;HX
04721 燴 W84B W8QB W8-B W8B W82S W8=S
04722 燠 WUYK W'QK WQK W'Q2 WQ2 W'Q8 WQ8
04723 爵 A4BJ A4J
04724 牆 UUHQ UUQ ULHQ ULQ UTHQ UTQ KHTQ KHQ
04725 獰 ZUGJ ZU4J
04726 獲 ZHEX ZHX ZXEX ZXX

| | | | | | | | | | | | |
|---|---|---|---|---|---|---|---|---|---|---|---|
| 04727 | 璩 | ETUZ | ET7Z | EU7Z | | | | | | | |
| 04728 | 環 | E4-K | E4OK | | | | | | | | |
| 04729 | 璦 | EAUX | EAGX | EAX | | | | | | | |
| 04730 | 璨 | ETXY | EAXY | | | | | | | | |
| 04731 | 癆 | L2WC | LWWC | LWUC | LWC | LHUC | LKUC | LXUC | | | |
| 04732 | 療 | L2K3 | LKB3 | LK23 | | | | | | | |
| 04733 | 癌 | L2OE | L3OE | L2O\ | L3O\ | | | | | | |
| 04734 | 盪 | 3BC4 | 3C4- | 3C4 | | | | | | | |
| 04735 | 瞳 | 4TKH | 4TQH | 4TH- | 4TH | | | | | | |
| 04736 | 瞪 | 4W-K | 4WOK | 4W. | | | | | | | |
| 04737 | 瞰 | 4TPX | 4HPX | 4PX | 4T4X | 4H4X | | | | | |
| 04738 | 瞬 | 4AAH | 4AUH | 4AH | | | | | | | |
| 04739 | 瞧 | 4TE4 | 4'E4 | 4E4 | | | | | | | |
| 04740 | 瞭 | 4K23 | 4KB3 | 4K3 | | | | | | | |
| 04741 | 矯 | TK'A | TK-A | TKKA | | | | | | | |
| 04742 | 磷 | +2YH | +YAH | +YH | [2YH | [YAH | [YH | | | | |
| 04743 | 磺 | TOH2 | TOH8 | +HQ2 | +HQ8 | [HQ2 | [HQ8 | | | | |
| 04744 | 磴 | TOWK | TOW. | +W-K | +WOK | +WK | +W. | [W-K | [WOK | [WK | [W. |
| 04745 | 磯 | TONM | +NTM | +NKM | +NM | +NMT | +NMK | [NTM | [NKM | [NM | [NMT |
| | | [NMK | | | | | | | | | |
| 04746 | 礁 | TOE4 | +TE4 | +'E4 | +E4 | [TE4 | ['E4 | [E4 | | | |
| 04747 | 禧 | 23HO | -YHO | KHOO | KHHO | KHKO | KHXO | =3HO | | | |
| 04748 | 禪 | 23O+ | -YO+ | KOO+ | KOQ+ | KO+ | =3O+ | K2Q+ | 23O[ | -YO[ | KOO[ |
| | | KOQ[ | KO[ | =3O[ | K2Q[ | 23@ | =3@ | -Y@ | K@ | | |
| 04749 | 穗 | 'Y+G | '+AG | '+QG | '+SG | '+G | 'Y[G | '[AG | '[QG | '[SG | '[G |
| 04750 | 窿 | U2PE | U8PE | UPXE | | | | | | | |
| 04751 | 簇 | FFDK | /TDK | /DTK | /DK | | | | | | |
| 04752 | 簍 | FFQV | /QOV | /QOV | /QV | | | | | | |
| 04753 | 篾 | FF4M | /4.M | /4M | /4M. | | | | | | |
| 04754 | 篷 | FFXZ | /XEZ | /XZ | | | | | | | |
| 04755 | 簌 | /YOT | /YOT | /YO- | /YO- | | | | | | |
| 04756 | 篠 | FFTY | /TIY | /TXY | | | | | | | |
| 04757 | 糠 | 2YL3 | YLE3 | 2YL4 | YLE4 | =YL3 | =YL4 | | | | |
| 04758 | 糜 | LYYY | LY2Y | | | | | | | | |
| 04759 | 糞 | 2YQ2 | 2YQ8 | YQH2 | YQH8 | =YQ2 | =YQ8 | | | | |
| 04760 | 糢 | 2YHK | =YHK | | | | | | | | |
| 04761 | 糟 | 2YHB | 2YQB | =YHB | =YQB | | | | | | |
| 04762 | 糙 | 2YHZ | YHOZ | YHZ | =YHZ | | | | | | |
| 04763 | 糝 | 2YS3 | =YS3 | | | | | | | | |
| 04764 | 縮 | NUTB | | | | | | | | | |
| 04765 | 績 | N3E2 | NE42 | N3E8 | NE48 | | | | | | |
| 04766 | 繆 | N3E3 | NEE3 | N2E3 | NE83 | NE3 | N283 | N23 | | | |
| 04767 | 縷 | N3QV | NQOV | NQOV | NQV | | | | | | |
| 04768 | 縲 | N3Q3 | NQN3 | NQ3 | NQN | | | | | | |
| 04769 | 繃 | NEAA | NE2A | | | | | | | | |
| 04770 | 縫 | N3XZ | NXEZ | NXZ | | | | | | | |
| 04771 | 總 | N3QG | N'QG | N2OG | & | | | | | | |
| 04772 | 縱 | NTTG | N'TG | NTG | N3TG | N3]G | N]TG | N]G | | | |
| 04773 | 繅 | N33Y | N3QY | | | | | | | | |
| 04774 | 繁 | TQX3 | TXN3 | TQXN | | | | | | | |
| 04775 | 縴 | N3TH | NTUH | NTH | | | | | | | |
| 04776 | 縹 | N343 | N34Y | N423 | N43 | N4-Y | N4Y | | | | |
| 04777 | 繈 | N35S | N5OS | N5SS | N5S | | | | | | |
| 04778 | 縵 | N3BX | NB4X | NBX | | | | | | | |
| 04779 | 縿 | N3S3 | NS83 | NS3 | NSK3 | | | | | | |
| 04780 | 縯 | N3U2 | N3U8 | NUQ2 | NUQ8 | | | | | | |
| 04781 | 罄 | HPXE | HBXE | HXHE | HXE | HPX\ | HBX\ | HXH\ | HX\ | | |
| 04782 | 翳 | CXEE | CX2E | CRX2 | CX2 | EXEE | EX2E | ERX2 | EX2 | | |
| 04783 | 翼 | EEQ2 | 2EQ2 | =EQ2 | EQH2 | EEQ8 | 2EQ8 | =EQ8 | EQH8 | 2QH2 | |
| 04784 | 聱 | EDXP | EXP | EX-4 | | | | | | | |
| 04785 | 聲 | HPXP | HBXP | HXP | HPX4 | HBX4 | HX-4 | HX4 | | | |
| 04786 | 聰 | P'QG | PQG | -4QG | 4'QG | | | | | | |
| 04787 | 聯 | -4NU | 4NUU | 42NU | 4NU | PNUU | P2NU | | | | |
| 04788 | 聳 | 'TGP | 'GP | TTGP | TGP | 'TG4 | 'G-4 | 'G4 | ]TGP | ]TG4 | ]GP |
| | | ]G4 | | | | | | | | | |
| 04789 | 臆 | ATKG | ATBG | ATG | | | | | | | |
| 04790 | 臃 | ATNE | | | | | | | | | |
| 04791 | 膺 | LTEA | LTA | | | | | | | | |
| 04792 | 臂 | POHA | PTHA | PHA | | | | | | | |
| 04793 | 臀 | P2SA | P8XA | PSA | | | | | | | |
| 04794 | 膿 | AQLK | | | | | | | | | |
| 04795 | 膽 | AULO | AUL; | AU; | | | | | | | |
| 04796 | 臉 | A8OT | A8-T | A8-2 | A8-4 | A822 | A824 | A8T | A82 | A84 | A8B2 |
| | | A8B8 | | | | | | | | | |

| | | | | | | | | | | | |
|---|---|---|---|---|---|---|---|---|---|---|---|
| 04797 | 膾 | A84B | A8QB | A8-B | A8H | A82S | A8=S | | | | |
| 04798 | 臨 | ET30 | ETOO | | | | | | | | |
| 04799 | 舉 | E5EH | E5H | E5KH | ;5KH | ;5H | ;KH | 3-8H | 3KH | | |
| 04800 | 艱 | HKBK | H2BK | H8BK | | | | | | | |
| 04801 | 薪 | HTYT | XTYT | | | | | | | | |
| 04802 | 薄 | H3+J | H3J | X3+J | X3J | H3[J | X3[J | | | | |
| 04803 | 藉 | ++MQ | H-AQ | HTAQ | HMQ | X-AQ | XTAQ | XMQ | [[MQ | | |
| 04804 | 薛 | HBTH | HBH | XBTH | XBH | | | | | | |
| 04805 | 薑 | ++QQ | H3QQ | H-QQ | X3QQ | X-QQ | [[QQ | | | | |
| 04806 | 薦 | HHTQ | XHTQ | | | | | | | | |
| 04807 | 蕭 | H4HB | H4B | X4HB | X4B | | | | | | |
| 04808 | 薩 | AB43 | | | | | | | | | |
| 04809 | 薇 | H'TX | XTEX | X'TX | H]EX | H]X | X]EX | X]X | XT\X | H]\X | X]\X |
| 04810 | 薨 | H4UF | H4F | HUAF | H4U7 | H47 | HUA7 | X4UF | X4F | XUAF | X4U7 |
| | | X47 | XUA7 | | | | | | | | |
| 04811 | 薊 | HU4J | HJIJ | HJJ | XU4J | XJIJ | XJJ | | | | |
| 04812 | 薦 | HLS4 | HL54 | HLH4 | HL4 | XLS4 | XL54 | XLH4 | XL4 | | |
| 04813 | 虧 | TUEC | T7EC | TEHC | U7EC | UEHC | UEC | | | | |
| 04814 | 蟀 | OST+ | STN+ | OST+ | OST[ | STN[ | OST[ | | | | |
| 04815 | 螳 | OST+ | STK+ | STB+ | OST+ | OST[ | STK[ | STB[ | OST[ | | |
| 04816 | 螢 | S3UH | S3OH | | | | | | | | |
| 04817 | 蟒 | SHKH | | | | | | | | | |
| 04818 | 蟆 | OSHK | SHBK | SHK | OSHK | | | | | | |
| 04819 | 螢 | H4XS | HXOS | HXOS | HXS | | | | | | |
| 04820 | 螻 | OSQV | SQOV | SQOV | SQV | OSQV | | | | | |
| 04821 | 螺 | OSQ3 | OSQN | SQN3 | SQ3 | SQN | OSQ3 | OSQN | | | |
| 04822 | 蟈 | OSOM | SOOM | SOMO | SOOM | SOMO | SOM | OSOM | | | |
| 04823 | 蟋 | OSAG | OSYG | SAYG | OSAG | OSYG | | | | | |
| 04824 | 褻 | TH9K | THK | T69K | T6K | | | | | | |
| 04825 | 褶 | KEEB | K2EB | KE'B | KEB | K2'B | K2B | | | | |
| 04826 | 襄 | TOOK | TOEK | | | | | | | | |
| 04827 | 褸 | KQOV | KQOV | KQV | | | | | | | |
| 04828 | 覬 | P3JK | PYJK | PJTK | PJK | | | | | | |
| 04829 | 覲 | EK4R | E.4R | \K4R | \.4R | | | | | | |
| 04830 | 謎 | 40YZ | ;2YZ | ;YZ | | | | | | | |
| 04831 | 謗 | ;T2D | ;TUD | | | | | | | | |
| 04832 | 謙 | 40K4 | ;KE4 | ;K4 | | | | | | | |
| 04833 | 講 | 40EA | ;EUH | ;EEA | | | | | | | |
| 04834 | 謊 | 40H3 | ;HC3 | ;H3 | | | | | | | |
| 04835 | 謅 | 40AE | ;AHE | ;AE | | | | | | | |
| 04836 | 謝 | 404J | 40JJ | ;4JJ | ;4J | | | | | | |
| 04837 | 膽 | A2HO | A2H; | | | | | | | | |
| 04838 | 謐 | 40G4 | ;G'4 | ;G4- | ;G4 | | | | | | |
| 04839 | 豁 | U040 | | | | | | | | | |
| 04840 | 谿 | AK40 | AKO | AN40 | ANO | | | | | | |
| 04841 | 豳 | UZIZ | EZZ | E2Z | UZZ | \ZZ | \2Z | | | | |
| 04842 | 賺 | 42K4 | 48K4 | 4KE4 | | | | | | | |
| 04843 | 賽 | UE82 | UE42 | UE88 | UE48 | | | | | | |
| 04844 | 購 | 42EA | 48EA | 4EEA | UEUH | | | | | | |
| 04845 | 賸 | A242 | A2H2 | A248 | A2H8 | | | | | | |
| 04846 | 賻 | 42+J | 48+J | 4+AJ | 42[J | 48[J | 4[AJ | | | | |
| 04847 | 趨 | HGCC | HG2C | HGCE | G2CE | | | | | | |
| 04848 | 蹉 | G2EH | | | | | | | | | |
| 04849 | 蹟 | GBEE | OGBE | GB2E | OGB2 | GB2 | | | | | |
| 04850 | 蹈 | OGAE | OGA; | OG; | GAEE | GAE | GA; | | | | |
| 04851 | 蹊 | OG'AK | GANK | GAK | | | | | | | |
| 04852 | 轄 | QUEO | | | | | | | | | |
| 04853 | 輾 | HQPK | QPHK | QPK | | | | | | | |
| 04854 | 轂 | H+RX | HQRX | HQX | H[RX | | | | | | |
| 04855 | 轅 | HQHK | QHOK | | | | | | | | |
| 04856 | 輿 | E+EK | EHEK | EHQK | EQEK | ;HK | ;QK | E[EK | | | |
| 04857 | 避 | POHZ | PTHZ | | | | | | | | |
| 04858 | 遽 | TUZZ | T7ZZ | U7ZZ | | | | | | | |
| 04859 | 還 | 4-KZ | 40KZ | 4KZ | -3Z | | | | | | |
| 04860 | 邁 | HQAZ | HQSZ | HUSZ | XQAZ | XQSZ | XUSZ | | | | |
| 04861 | 邂 | UAHZ | UHZ | | | | | | | | |
| 04862 | 邀 | BDXZ | BXZ | | | | | | | | |
| 04863 | 鄉 | PXZP | PZP | 4XZP | 4ZP | | | | | | |
| 04864 | 醣 | -QLO | 9LEO | 9LO | | | | | | | |
| 04865 | 醞 | -QQ4 | 9Q4- | 9Q4 | | | | | | | |
| 04866 | 醜 | -QQR | 9'QR | 9QRS | 9QR | 9R | | | | | |
| 04867 | 鍍 | $LHX | 6LHX | | | | | | | | |
| 04868 | 鎂 | $2EK | 62EK | | | | | | | | |
| 04869 | 錨 | 8KHQ | $++Q | $HQ | 8KXQ | $XQ | 6++Q | 6HQ | 6XQ | $[[Q | 6[[Q |
| 04870 | 鍵 | $EHZ | 6EHZ | | | | | | | | |
| 04871 | 鍊 | 8KY4 | $Y4 | 6Y4 | | | | | | | |

| | | | | | | | | | | | |
|---|---|---|---|---|---|---|---|---|---|---|---|
| 04872 | 鍜 | $EDK | 6EDK | | | | | | | | |
| 04873 | 鍋 | 8KQA | $QUO | $QA | 6QUO | 6QA | | | | | |
| 04874 | 鍾 | $HHH | $HXH | 6HHH | 6HXH | | | | | | |
| 04875 | 鍵 | $HQH | 6HQH | | | | | | | | |
| 04876 | 鍬 | 8KYW | $'YW | $YW | 8K'W | $'W | 6'YW | 6YW | 6~W | | |
| 04877 | 鍛 | $ERX | 6ERX | | | | | | | | |
| 04878 | 鍰 | 8KAX | $AHX | $AX | 6AHX | 6AX | | | | | |
| 04879 | 鍚 | $B-C | 6B-C | | | | | | | | |
| 04880 | 鍔 | 8KOS | 8KO5 | 8KOC | $O-S | $O-5 | $OS | $O5 | $O2C | $OC | $O=C |
| | | 6O-S | 6O-5 | 6OS | 6O5 | 6O2C | 6OC | 6O=C | | | |
| 04881 | 闊 | M3HO | | | | | | | | | |
| 04882 | 闋 | PPWK | MW-K | MW'K | MWK | | | | | | |
| 04883 | 闃 | PPY4 | PPYQ | MY4 | MYQ | | | | | | |
| 04884 | 闆 | MHOH | | | | | | | | | |
| 04885 | 闔 | PP3O | MOOO | M3O | | | | | | | |
| 04886 | 隱 | PAHG | PAEG | | | | | | | | |
| 04887 | 隸 | H3E3 | HYE3 | HY3 | H3E4 | HYE4 | Y3E3 | YYE3 | Y3E4 | YYE4 | |
| 04888 | 雜 | OSTE | OS'E | SSTE | SS'E | SSE | OOSE | OOSE | | | |
| 04889 | [illegible] | -AY4 | TAY4 | MY4 | -Y4 | | | | | | |
| 04890 | [illegible] | -APX | TAPX | MP2X | MP=X | MPCX | MPRX | MPX | -P2X | -P=X | -PCX |
| | | -PRX | -PX | | | | | | | | |
| 04891 | 鞠 | H+CY | H[CY | | | | | | | | |
| 04892 | 韓 | HBHH | HBH | | | | | | | | |
| 04893 | 顆 | QYT2 | QYT8 | QYT4 | | | | | | | |
| 04894 | 颶 | RS4K | RSK | R4K | | | | | | | |
| 04895 | 餵 | 8SQK | 8FQK | 87QK | 8Q-K | 8QK | | | | | |
| 04896 | 騁 | E4QS | ESQ5 | 7IQS | 7QS | 7IQ5 | 7Q5 | | | | |
| 04897 | 駿 | E4SX | 7S2X | 7S8X | 7SRX | | | | | | |
| 04898 | 鮮 | U42E | U4E | J2EI | J2E | | | | | | |
| 04899 | 鮫 | JT2X | JT8X | | | | | | | | |
| 04900 | 鮪 | U4+A | J+'A | J+A | U4[A | J['A | J[A | | | | |
| 04901 | 鮭 | U4HH | J2IH | JHH | J2H | | | | | | |
| 04902 | 鴻 | 3HB4 | 3H5 | | | | | | | | |
| 04903 | 鴿 | 8OB4 | 8-O5 | 8O5 | | | | | | | |
| 04904 | 麋 | LHFY | LHY | LFFY | LF2Y | L%2Y | LFY | LH7Y | L77Y | L72Y | L7Y |
| 04905 | 黏 | Y3TO | Y3O | Y4TO | Y4O | | | | | | |
| 04906 | 點 | 44TO | 4TO4 | 4HO4 | TOK | Q4TO | QTO4 | QEO4 | | | |
| 04907 | 黜 | 44EE | 442E | Q4EE | Q42E | 44\\ | 442\ | Q4\\ | Q42\ | | |
| 04908 | 黝 | 44NC | 44C | Q4NC | Q4C | | | | | | |
| 04909 | 黛 | TM44 | TM4 | | | | | | | | |
| 04910 | 鼾 | 4QHH | 4QKH | 4KHI | 4K-+ | 4K2I | 4K=I | 4K-[ | | | |
| 04911 | 齋 | TKH3 | TKHY | TK23 | TK2Y | TKA3 | TKAY | TDK3 | TD3 | | |
| 04912 | 叢 | 42EX | 424X | 4EPX | 4E4X | 4EX | | | | | |
| 04913 | 嚕 | OUQB | OU4B | | | | | | | | |
| 04914 | 櫥 | NBPA | NPUO | NP'A | 3BPA | 3P'A | 3PUO | | | | |
| 04915 | 壙 | HLH2 | HLH8 | IHL2 | IHL8 | HL2 | HL8 | | | | |
| 04916 | 蟲 | QQQH | | | | | | | | | |
| 04917 | 嬸 | VUYQ | VUAQ | VUQ | | | | | | | |
| 04918 | 彝 | OYNH | OYH | | | | | | | | |
| 04919 | 濟 | 3HAG | | | | | | | | | |
| 04920 | 戳 | EEEM | ETEM | E'EM | 2EEM | =EEM | 2TEM | 2'EM | 2EM | =TEM | ='EM |
| | | =EM | | | | | | | | | |
| 04921 | 擴 | FLH2 | FLH8 | FL2 | FL8 | | | | | | |
| 04922 | 擲 | F2KP | F9KP | | | | | | | | |
| 04923 | 擾 | FT4X | FTUX | | | | | | | | |
| 04924 | 攆 | FKK+ | F2K+ | FKKH | F2KH | FKKO | F2KO | FKO | FKK[ | F2K[ | |
| 04925 | 擺 | F4SF | F4AF | F4F | | | | | | | |
| 04926 | 擻 | FQVX | FQX | | | | | | | | |
| 04927 | 擷 | FHO2 | FHO8 | | | | | | | | |
| 04928 | 斷 | F4NT | FNT | FNLT | F4LT | F4T | | | | | |
| 04929 | 曜 | BEEE | B2EE | BETE | BE'E | B2TE | B2'E | B2E | | | |
| 04930 | 臍 | AHUZ | AHZ | | | | | | | | |
| 04931 | 檳 | YU32 | YU2 | YU38 | | | | | | | |
| 04932 | 檬 | YHUZ | YHZ | | | | | | | | |
| 04933 | 櫃 | YCO2 | YCO8 | UC8 | | | | | | | |
| 04934 | 檻 | YEF4 | | | | | | | | | |
| 04935 | 檸 | YUGJ | YU4J | | | | | | | | |
| 04936 | 檯 | YEEE | Y2EE | YETE | YE'E | Y2TE | Y2'E | | | | |
| 04937 | 檮 | YHLJ | YHJJ | YE'J | Y3'J | | | | | | |
| 04938 | 檣 | YHOH | YHUH | YSO | | | | | | | |
| 04939 | 歟 | EKUT | ;KUT | ;KT | E5K- | ;5K- | ;K- | | | | |
| 04940 | 歸 | BGEE | BGE | 2LEE | 2-EE | =LEE | =-EE | B-EE | | | |
| 04941 | 殯 | -AU2 | AU32 | AU2 | -AU8 | -A8 | AU38 | AU8 | | | |
| 04942 | 瀉 | 3UE4 | 3U;4 | 3U4 | | | | | | | |

04943 潘 3UAQ 3UYQ
04944 濾 3TUG 3T7G 3TG 3U7G 3UQG
04945 濱 3H42 3H48
04946 澱 34MM 342M 348M 34M
04947 瀑 3BH3 3B3 3BH4
04948 瀏 3SKJ 3S$J 3TXJ 3.XJ 3S6J
04949 燎 WHQ4 WH4
04950 燒 WEH4 WE44 WE-4
04951 燕 HLJ4 HJJ4 HHJ4 HJH4 E'J4 3'J4
04952 燭 W-AA W-AM WTAA WTAM WMTA WTA WMA WTM WMM W-TA W-M
04953 獨 ZLH2 ZL2 ZLH8 ZL8
04954 獗 Z34L Z3QL Z3L
04955 璧 POHE PTHE PHE
04956 璜 ETU4 EU44 ET4
04957 甕 TNEZ TE-Z TECZ
04958 瘩 L2PH LPOH LPTH
04959 瘸 L2HA
04960 癒 L28G L8AG L8G
04961 瞥 HKX4
04962 磊 44TE 24TE =4TE 44'E 24'E =4'E 44E 24E =4E
04963 瞭 4ULO 4UL; 4U;
04964 瞼 480T 48-T 48-2 48-4 4822 4824 48T 482 484
04965 磯 TOYG +YYG +2YG +=YG +YLG +YJG +YG [YYG [2YG [=YG [YLG [YJG [YG
04966 禪 23QK 23Q. 23. 23L -YQK -YQ. -Y. -YL KQ-K KQOK KQ. KL =3QK =3Q. =3. =3L
04967 穗 'YHQ 'HTQ 'HQ
04968 穢 'YGM YG3M YGM3 YGM 'G3M 'GM
04969 穩 'YQK YQLK 'QLK
04970 窺 U2EL U8EL UEEL U2;L U8;L U;L
04971 竅 U2BX U8BX UBDX UBX
04972 篩 FFEK /EKK /EK
04973 簀 /HQ2 /HQ8
04974 篷 FFKB FFRB /KKB /RRB /KB /RB
04975 簍 FFO+ /OQ+ /OO+ /2O+ /2Q+ /O+ FFO[ /OQ[ /OO[ /2O[ /2Q[ /O[ FF@ /@
04976 簧 FFO2 FFO8 /O-2 /O42 /O-8 /O48 /O2 /O8
04977 篇 FFMB /PPB /MB
04978 糧 2YBH YBQH =YBH
04979 織 N3TM NTBM NTM NTMB N3O2 NO2 N3O8 NO8
04980 繕 N320 N2EO N20
04981 繞 N3HR NHR
04982 繚 N3K3 NK23 NKB3
04983 繡 N3EK NEKK
04984 繪 N32B N24B N2QB N2B
04985 繃 N3YQ NAYQ NAQ NYQ
04986 鯉 HE4+ HE+ HE4[ HE[ H\4+ H\+ H\4[ H\[
04987 翹 HREE HR2E HRE 3HR2 HR2
04988 翻 AQEE AQ2E AQE YQEE YQ2E YQE AQ2
04989 職 PTBM PTM PTMB 4TBM 4TM 4TMB 4TB
04990 聶 PPP 3P
04991 臍 ATDH ATKH ATXH ATX2 AT2 A.XH A.X2
04992 臏 AU32 AU2 AU38 AU8
04993 舊 HTEE HTE; H'E; HE; XTEE XTE; X'E; XE;
04994 藏 HKEM HKME H2EM H2ME XKEM XKME X2EM X2ME
04995 薩 HPTE HPE XPTE XPE
04996 藍 HEF4 HE4- XEF4 XE4-
04997 藐 HAZR HAR HZR XAZR XAR XZR
04998 藉 H2YB H=YB X2YB X=YB
04999 薰 HH44 HH4 XH44 XH4
05000 藝 HTDH HTKH HTXH HTX2 H.XH H.X2 XTDH XTKH XTXH XTX2 X.XH X.X2
05001 藪 HHUH XHUH
05002 蟯 OSHR S3HR SHR OSHR
05003 蟬 OSO+ SOQ+ SOO+ S2O+ S2Q+ SO+ OSO+ OSO[ SOQ[ SOO[ S2O[ S2Q[ SO[ OSO[ OS@ OS@ S@
05004 蟲 SSS 3OS 3S 3OS
05005 蟠 SAYQ SAQ
05006 覆 -TX 4'TX 4TTX -4]X 4]TX 4]X
05007 覲 HOER HE4R HER
05008 觴 UATC
05009 謨 4OHK ;HBK ;HK
05010 謹 4OHE ;HOE ;HOE ;HE
05011 謬 4OE3 ;EE3 ;2E3 ;E83 ;E3 ;283
05012 謫 ;T2A ;TU+ ;TA ;TU[

| | | | | | | | | | | | |
|---|---|---|---|---|---|---|---|---|---|---|---|
| 05013 | [illegible] | U-OK | UOK | UEEK | UE-K | UEOK | UEK | UEE. | | | |
| 05014 | [illegible] | EDX2 | EX42 | EDX8 | EX48 | | | | | | |
| 05015 | [illegible] | TYMG | TMOG | TMG | G3MG | GMOG | GMG | MTYG | MYOG | MYG | MG3G |
| | | M3OG | M3G | | | | | | | | |
| 05016 | [illegible] | OGHA | GHA | | | | | | | | |
| 05017 | [illegible] | OGEA | GEAA | GE2A | | | | | | | |
| 05018 | [illegible] | G'TG | OGTG | GTTG | GT2G | GTG | OG]G | G]TG | G]2G | G]G | |
| 05019 | [illegible] | OGE2 | OGE8 | GE42 | GE2 | GE48 | GE8 | | | | |
| 05020 | [illegible] | OGQH | GQHH | GQH | | | | | | | |
| 05021 | [illegible] | 4JCO | 4JC | 4JO | JC3O | JCO | | | | | |
| 05022 | [illegible] | HQ+J | Q+AJ | Q+QJ | Q+SJ | HQ[J | Q[AJ | Q[QJ | Q[SJ | | |
| 05023 | [illegible] | QTAX | | | | | | | | | |
| 05024 | [illegible] | T2AZ | T8AZ | KUXZ | KU4Z | K1AZ | KAZ | | | | |
| 05025 | [illegible] | U2ZZ | U8ZZ | | | | | | | | |
| 05026 | [illegible] | AZRZ | ARZ | ZBRZ | ZRZ | | | | | | |
| 05027 | [illegible] | CX-Q | CXQ | CRX9 | CX9 | EX-Q | EXQ | ERX9 | EX9 | CTK | |
| 05028 | [illegible] | KAJQ | KJ-Q | KJQ | KAJ9 | KJ9 | | | | | |
| 05029 | [illegible] | YXLH | YXH | | | | | | | | |
| 05030 | [illegible] | $U4O | 6U4O | | | | | | | | |
| 05031 | [illegible] | $T2D | $TUD | 6T2D | 6TUD | | | | | | |
| 05032 | [illegible] | 8K32 | 8K38 | $342 | $32 | $348 | $38 | 6342 | 632 | 6348 | 638 |
| 05033 | [illegible] | $OS4 | $OC4 | 6OS4 | 6OC4 | | | | | | |
| 05034 | [illegible] | 8K4Y | $'4Y | $4Y | 6'4Y | 64Y | | | | | |
| 05035 | [illegible] | 8KFK | $+4K | $F4K | $FK | 8K7K | $74K | $7K | 6+4K | 6F4K | 6FK |
| | | 674K | 67K | $[4K | 6[4K | | | | | | |
| 05036 | [illegible] | 8KTA | $TOA | $THA | $TA | 6TOA | 6THA | 6TA | | | |
| 05037 | [illegible] | 8K34 | 8K44 | $224 | $884 | $284 | $2K4 | $K24 | $K84 | $34- | $44- |
| | | $34 | $44 | 6224 | 6884 | 6284 | 62K4 | 6K24 | 6K84 | 634- | 644- |
| | | 634 | 644 | | | | | | | | |
| 05038 | [illegible] | 8K-A | $-OA | $-A | 6-OA | 6-A | | | | | |
| 05039 | [illegible] | 8KBZ | $'BZ | $BZ | 6'BZ | 6BZ | | | | | |
| 05040 | [illegible] | $8EO | 68EO | | | | | | | | |
| 05041 | [illegible] | PPH4 | MHS4 | MH4 | | | | | | | |
| 05042 | [illegible] | PPE4 | MES4 | ME4 | PP7 | M7 | | | | | |
| 05043 | [illegible] | PP+K | PPFK | M+4K | M+K | MF4K | MFK | PP7K | M74K | PP[K | M[4K |
| | | M[K | | | | | | | | | |
| 05044 | [illegible] | PPKT | MKET | MKT | PPK- | MKE- | MK- | | | | |
| 05045 | [illegible] | TQAE | TUAE | TATE | TA'E | QATE | QA'E | QAE | | | |
| 05046 | [illegible] | TYTE | TY'E | TYE | | | | | | | |
| 05047 | [illegible] | 2TEX | 2'EX | EEX | EE-X | 2EX | 2E-X | =TEX | ='EX | =EX | =E-X |
| | | -X-X | 2-X | =-X | | | | | | | |
| 05048 | [illegible] | CCTE | CC'E | CCE | 2CEE | =CEE | | | | | |
| 05049 | [illegible] | AKTE | AK'E | AKE | | | | | | | |
| 05050 | [illegible] | MSDQ | MSQ | | | | | | | | |
| 05051 | [illegible] | H+SY | H[SY | | | | | | | | |
| 05052 | [illegible] | H+YW | H[YW | | | | | | | | |
| 05053 | [illegible] | H+TX | H[TX | | | | | | | | |
| 05054 | [illegible] | TBBE | | | | | | | | | |
| 05055 | [illegible] | UOT2 | UOT8 | UO8 | | | | | | | |
| 05056 | [illegible] | T3T2 | T32 | T3T8 | T38 | | | | | | |
| 05057 | [illegible] | BGT2 | BG2 | BGT8 | BG8 | | | | | | |
| 05058 | [illegible] | OST2 | OS2 | OCT2 | OST8 | OS8 | OCT8 | OC8 | O5T2 | O5T8 | O58 |
| 05059 | [illegible] | EMT2 | EM2 | EMT8 | EM8 | | | | | | |
| 05060 | [illegible] | RSBC | RSC | RB-C | RBC | | | | | | |
| 05061 | [illegible] | 8SSQ | 8SQ | 8FSQ | 8FQ | 87SQ | 87Q | 8SDQ | | | |
| 05062 | [illegible] | 8SEX | 8S;X | 8FEX | 8F;X | 87EX | 87;X | 8EEX | 8EIX | 8EX | 8;X |
| 05063 | [illegible] | 8SQR | 8FQR | 87QR | 8'QR | 8QRS | 8QR | | | | |
| 05064 | [illegible] | A38K | A3K | | | | | | | | |
| 05065 | [illegible] | YBTX | YBX | | | | | | | | |
| 05066 | [illegible] | E4KJ | 7KJO | 7KJ | | | | | | | |
| 05067 | [illegible] | QAQY | QAY | | | | | | | | |
| 05068 | [illegible] | E3U3 | E3UY | DU23 | DU=3 | DU-Y | DU3 | DUY | | | |
| 05069 | [illegible] | E3YS | E3S | DY2S | DY8S | | | | | | |
| 05070 | [illegible] | YVQR | YVR | 'VQR | 'VR | | | | | | |
| 05071 | [illegible] | 'QRM | QRM | QR-A | QRTA | 'QR- | QRS- | QR- | R-A | RTA | RM |
| 05072 | [illegible] | QRUC | QRU | QRA | RUKC | RUC | RA | | | | |
| 05073 | [illegible] | 33U4 | 33'J | 33J | | | | | | | |
| 05074 | [illegible] | U4QH | JQIH | JQH | | | | | | | |
| 05075 | [illegible] | U4BP | U4P | JBSP | JBFP | JBP | | | | | |
| 05076 | [illegible] | TIX4 | TXU4 | TIXJ | TI4 | | | | | | |
| 05077 | [illegible] | U4N3 | U4'N | U4'3 | U4-N | U4-3 | U4N | J'N3 | J'N | J'3 | JN3 |
| 05078 | [illegible] | OAB4 | OA4 | OA5 | | | | | | | |
| 05079 | [illegible] | FMB4 | FM4 | 'FM5 | FM5 | | | | | | |
| 05080 | [illegible] | HOB4 | 'HO5 | | | | | | | | |

05081 黠 44HO Q4HO
05082 鬆 HKX2 HKX= HK=
05083 雛 EELQ ELIQ ELQ ;LIQ ;LQ
05084 儷 TUOR TUFR TUUR TU7R
05085 嚥 OHO4 OHF4 OH74
05086 嚨 OTAL OTL
05087 壞 HT4K
05088 聾 TALH TLH
05089 壢 HLYG HLG IHLG
05090 襲 UTAL UTL
05091 龐 LTAL LTL
05092 廬 LTU4 LT74 LU74 LUQ4
05093 懲 TEXG 'TXG 'XG ]EXG ]XG T\XG ]\XG
05094 懷 IT4K
05095 懶 I2Y2 I2Y8 IYO2 IYO2 IYU2 IY2 IYO8 IYO8 IYU8 IY8
05096 懵 IH44 IHU4
05097 櫛 YXKF YKF YXYF YXF YXKJ YKEJ YX3J
05098 攏 FTAL FTL
05099 曠 BLH2 BL2 BLH8 BL8
05100 曝 BBH3 BB3 BBH4 BB4
05101 櫥 YLHJ YLJ
05102 檳 YH42 YH48
05103 櫚 YPPB YMOO YMB
05104 櫓 YUQB YU4B YJB
05105 瀕 3COR 3CAR 3CR
05106 瀟 3HEK 3HKK
05107 瀨 3YO2 3YO2 3YU2 3Y2 3YO8 3YO8 3YU8 3Y8
05108 瀚 3HBE 3+BE 3+8E 3+E 3[BE 3[8E 3[E
05109 瀝 3LYG
05110 灝 3G32 3G2 3G38 3G8
05111 瀘 3TU4 3T74 3U74 3TQ4
05112 爆 WBH3 WB3 WBH4
05113 爍 WBNY WBY WNBY WNY
05114 牘 UUH2 UU2 ULH2 UL2 UTH2 UT2 KH42 UUH8 UU8 ULH8
UL8 UTH8 UT8 KH48
05115 犢 'FH2 'FH8 'F2 'F8 ZH42 ZH48 ZH2 ZH8
05116 獸 OQ.K OQK. QO.K QOK. OO.K OOK. OOOK OQOK
05117 類 ZYO2 ZYO2 ZYU2 ZYD2 ZY2 ZTO8 ZYO8 ZYU8 ZYD8 ZY8
05118 璽 T2AE T8AE KUXE KU4E KIAE KAE. KAE
05119 瓊 EU4X EUAX ETO3
05120 鄉 TASH TAH
05121 疇 QHLK QHJJ QE'J Q3'J QEJ
05122 疆 5H3Q 5HQQ 5HQ
05123 癢 L24A L48A L4A
05124 癡 L2FG LFKG LFG L27G L7KG L7G
05125 矇 4HUZ 4HZ 4XUZ 4XZ
05126 礙 TOFG +FKG +FG TO7G +7KG +7G [FKG [FG [7KG [7G
05127 禱 23HJ 23J -YHJ -YJ KHLJ KHJJ KE'J K3'J =3HJ =3J
05128 穫 'YHX 'HEX 'HX
05129 穩 'YAG YAHG YAEG YAG 'AHG 'AEG 'AG
05130 簾 FFL4 /LK4 /L4
05131 簿 FF3J /3+J /3J /3[J
05132 簸 FFHX /H2X /H8X /HRX /HX
05133 簽 FF8T FF82 FF84 /8OT /8-T /8-2 /8-4 /822 /824 /8T
/82 /88
05134 簷 FFU; FF; /ULO /UL; /U;
05135 籀 FFFQ /FSQ
05136 繫 +EX3 +XN3 +X3 +EXN +XN [EX3 [XN3 [X3 [EXN [XN
05137 繭 HENS HES XENS XES
05138 繹 N34H N4HH N4H
05139 繩 N34L N4LB N48L N4LE N4EL N4L N3OL NOLB NOBL NOLE
NOEL NOL N3QL NQLB NQBL NQLE NQEL NQL
05140 繪 N38B N84B N8QB N8-B N8B N82S N8=S
05141 繳 N3BX NBDX NBX
05142 羅 4N3E 4NE
05143 羶 2ET4 =ET4
05144 羹 242K 24K =42K =4K
05145 羸 TLAR TLER TOAR TOER TAER TER COAR CAER CER
05146 臘 A34L A3L
05147 艤 H3AQ H3YQ
05148 藝 HH9S HHS H69S H6S XH9S XHS X69S X6S
05149 藪 HQVX XQVX
05150 藥 H2YA H=YA HYQA X2YA X=YA XYQA
05151 藤 HA23 HA3 HA24 HA4 XA23 XA3 XA24 XA4

05152 [illegible] HBNY HBY HNBY XBNY XBY XNBY
05153 [illegible] H4OB H;HB H;B X4OB X;HB X;B
05154 [illegible] OS2M S2EM S2M OS2M OSX. OSX. SX.
05155 [illegible] OS4L OS4L S4LB S4BL S4LE S4EL S4L OSOL OSOL SOLB
SOBL SOLE SOEL SOL OSQL OSQL SQLB SQBL SQLE SQEL
SQL
05156 [illegible] OSBT OSB- SBCT SBLT SBT SBC- SBL- SB- OSBT OSB-
05157 [illegible] UAHS UHOS UHS UHUS
05158 [illegible] OSU; OS; SULU SUL; SU; OSU; OS;
05159 [illegible] K3UQ K3OQ K3U K3E
05160 [illegible] KYY3 K2Y3 KY23 KY3 KYYY K2YY KY-Y KYY
05161 [illegible] K'QK K'Q2 K'Q8 KUYK KQ2 KQ8
05162 [illegible] POHK PTHK PHTK
05163 [illegible] ;HHH ;H-H ;H-X ;X-X
05164 [illegible] ;2HB ;K4B
05165 [illegible] 4OTM ;TBM ;TM 4OO2 4OO8 ;O2 ;O8
05166 [illegible] 4OWK 4OW. ;W-K ;WOK ;WK ;W.
05167 [illegible] 4O4+ ;4B+ ;4+ 4O4[ ;4B[ ;4[
05168 [illegible] ;SJA
05169 [illegible] 4ONM ;NTM ;NKM ;NM ;NMT ;NMK
05170 [illegible] ;HOO ;HKO ;HHO ;HXO
05171 [illegible] 4OE4 ;TE4 ;'E4 ;E4
05172 [illegible] 422B 482B 428B 488B
05173 [illegible] KK42 2K42 =K42 HR42 TK42 KK2 2K2 =K2 KK48 2K48
=K48 HR48 TK48 KK8 2K8 =K8
05174 [illegible] OG4K G42K G4KK G4K OG42 G422 G4K2 G42 OG48 G428
G4K8 G48
05175 [illegible] G29J GKQJ
05176 [illegible] GHHB
05177 [illegible] OGL- GLKT GLK-
05178 [illegible] OGWK OGW. OG. GW-K GWOK GW.
05179 [illegible] OG3R OGHR G3HR GH-R GHR
05180 [illegible] GT3K
05181 [illegible] HQYH QYAH Q2YH QYH
05182 [illegible] HQKA QKQA QKA
05183 [illegible] AATH AAH HOTH
05184 [illegible] 4UDZ 4DZ D.Z DZ
05185 [illegible] 34LZ
05186 [illegible] -QWX 9W5X 9WX
05187 [illegible] -QE4 9TE4 9'E4 9E4
05188 [illegible] $TKR $TBR 6TKR 6TBR
05189 [illegible] 8KTA $T2A $TA 6T2A 6TA
05190 [illegible] $TXE $TLE 6TXE 6TLE
05191 [illegible] 8KDK $TDK $DTK $DK 6TDK 6DTK 6DK
05192 [illegible] 8KQZ $HQZ $QZ 6HQZ 6QZ
05193 [illegible] $3UH $3OH 63UH 63OH
05194 [illegible] 8KBX $B4X $BX 6B4X 6BX
05195 [illegible] LHFK LFFK LHK LF8K L%8K LFK LHF$ LFF$ LF$ LH7K
L77K L78K L7K LH7$ L77$ L7$ LHF6 LFF6 LF6 LH76
L776 L76 L%$ L%6
05196 [illegible] 8K43 8K4Y $-43 $423 $43 $-4Y $4-Y $4Y 6-43 6423
643 6-4Y 64-Y 64Y
05197 [illegible] 8KQ3 8KQN $QN3 $Q3 $QN 6QN3 6Q3 6QN
05198 [illegible] $KAJ 6KAJ
05199 [illegible] 8KQV $QOV $QOV $QV 6QOV 6QOV 6QV
05200 [illegible] 8KEH $EXH $EH 6EXH 6EH
05201 [illegible] QT8K HQT$ QT$ HQT6 QT6
05202 [illegible] PPNU PPU PP2H M2NU MNU M2HH
05203 [illegible] PTAL PTL
05204 [illegible] HOKE HOKE HKTE HK'E HKE HO2E HO2E HO8E HO8E H8TE
H8'E
05205 [illegible] -A3E TA3E M3AE -3AE -3E
05206 [illegible] -ASC -AJC TASC TAJC MSJC MSC -SJC -JZC -SC -JC
05207 [illegible] LYYE L2YE LYEE LY2E LYE
05208 [illegible] HHAE HHA; HH;
05209 [illegible] TBO2 TBO8 TB8
05210 [illegible] YKT2 YK2 YKT8 YK8
05211 [illegible] L3T2 L3T8 L38
05212 [illegible] +KT2 +K2 +KT8 +K8 FKT2 FK2 FKT8 FK8 7KT2 7K2
7KT8 7K8 [KT2 [K2 [KT8 [K8
05213 [illegible] RSEX RS;X RSX REIX REX R;IX R;X
05214 [illegible] 8SBX 8FBX 87BX 8B4X 8BX
05215 [illegible] 8SHE 8FHE 87HE 8HOE 8HOE 8HE
05216 [illegible] SXE4 SJX7 SX7

| | | |
|---|---|---|
| 05217 | [illegible] | E4PA 7'PA 7.PA 7PA |
| 05218 | [illegible] | E3+A D+OA E3[A D[OA |
| 05219 | [illegible] | U4T3 JTO3 JT3 |
| 05220 | [illegible] | U4BB U42B U4B JBB J2B |
| 05221 | [illegible] | U4EA JIEA JEA |
| 05222 | [illegible] | JUHO |
| 05223 | [illegible] | TZB4 TOZ5 |
| 05224 | [illegible] | GMB4 GM4 MGB4 MG4 GM5 MG5 2GM5 2MF5 =GM5 =MF5 |
| 05225 | [illegible] | HBB4 HHB5 22B5 HB5 |
| 05226 | [illegible] | KLB4 KL4 KQL5 KL5 |
| 05227 | [illegible] | AAB4 2AB4 =AB4 AA4 2A4 =A4 AA5 2A5 =A5 |
| 05228 | [illegible] | LFH2 LF2 LFH8 LF8 L7H2 L72 L7H8 L78 |
| 05229 | [illegible] | -ALF -A -AL7 |
| 05230 | [illegible] | YYLF YLHF YYL7 YLH7 |
| 05231 | [illegible] | KACY KAC |
| 05232 | [illegible] | HOEC HEC HEC' XOEC XEC XEC' |
| 05233 | [illegible] | OTOK OTEK |
| 05234 | [illegible] | O44V O24V O42V O48V |
| 05235 | [illegible] | OLTX OLHX OOLX 2OLX =OLX OLPX OL4X 2LTX 2LHX 2LPX 2L4X =LTX =LHX =LPX =L4X OLX |
| 05236 | [illegible] | OA4J OABJ |
| 05237 | [illegible] | HTOK HTEK |
| 05238 | [illegible] | V-A4 VTA4 VMY4 VM4 V-Y4 V-4 |
| 05239 | [illegible] | VTOK VTEK VTK |
| 05240 | [illegible] | HBHZ XBHZ |
| 05241 | [illegible] | UEE2 UE2 UEE8 UE8 UE32 UE38 .UE. UE. |
| 05242 | [illegible] | IUUR EUOR EUFR EUUR EU7R \UOR \UFR \UUR \U7R |
| 05243 | [illegible] | 433G 43G 43NG 4NG 4L3G 4LYG |
| 05244 | [illegible] | I2TM ITEM ITME IT-M I2EM I2ME I2-M I4EM I4ME I4-M ITM I2M I4M |
| 05245 | [illegible] | FTOK FTEK |
| 05246 | [illegible] | FPPY FMY4 FMYQ FMY |
| 05247 | [illegible] | FUOR FUFR FUUR FDOR FDFR FDUR FU7R FD7R FDDR |
| 05248 | [illegible] | B2EM B2M |
| 05249 | [illegible] | ATAL ATL |
| 05250 | [illegible] | YTYR |
| 05251 | [illegible] | 3MY4 3MYQ |
| 05252 | [illegible] | 35TA 35KA |
| 05253 | [illegible] | 38TX 38X |
| 05254 | [illegible] | WTU4 WT74 WT4 WU74 WUQ4 W'P |
| 05255 | [illegible] | TUAK T7AK U7AK TAK. TA.K |
| 05256 | [illegible] | ETAL ETL- ETL |
| 05257 | [illegible] | L22K L2EK |
| 05258 | [illegible] | L2TX LTEX LTX L'TX L2]X L]EX -L]X LT\X L]\X |
| 05259 | [illegible] | TOL2 TOL8 +LH2 +LH8 +L2 +L8 [LH2 [LH8 [L2 [L8 |
| 05260 | [illegible] | TOLA +LHA +LA [LHA [LA |
| 05261 | [illegible] | YXKO YXK+ YX+ YXK[ YX[ |
| 05262 | [illegible] | TONY TOBY +NBY +NY +BNY +BY [NBY [NY [BNY [BY |
| 05263 | [illegible] | U2H2 U8H2 UH42 U2H8 U8H8 UH48 UH8 |
| 05264 | [illegible] | TRTR 2TOR =TOR 2TKR =TKR |
| 05265 | [illegible] | FFEK /HLJ /HJJ /HHJ /E'J /3'J /EJ |
| 05266 | [illegible] | FFE4 /EF4 |
| 05267 | [illegible] | FFYB /2YB /=YB /YB |
| 05268 | [illegible] | 2YMA =YMA 2YMM =YMM 2Y-A =Y-A 2Y-M =Y-M 2YM =YM |
| 05269 | [illegible] | 2YOJ 2YO YO+J =YOJ =YO YO[J |
| 05270 | [illegible] | THNH TN3H TNTH TNH |
| 05271 | [illegible] | N3U2 N3U8 NU32 NU2 NU38 NU8 |
| 05272 | [illegible] | N3F4 N3L4 NF4N NFN NL4N NLN N3YL N3LY N2YL NL2Y NYL NLY |
| 05273 | [illegible] | FF4N /4K3 /4KN /4N |
| 05274 | [illegible] | 42HE 48HE 24HE =4HE 42H\ 48H\ 24H\ =4H\ |
| 05275 | [illegible] | 3REE 3RE 3R2E |
| 05276 | [illegible] | ATU4 AT74 AT4 AU74 ATQ4 AUQ4 |
| 05277 | [illegible] | 'AE4 A-E4 AEF4 |
| 05278 | [illegible] | H3OY X3OY |
| 05279 | [illegible] | H4OC H;BC H;C H;BL H;L X4OC X;BC X;C X;BL X;L |
| 05280 | [illegible] | HLYO HLTO HLY+ HLT+ XLYO XLTO XLY+ XLT+ HLY[ HLT[ XLY[ XLT[ |
| 05281 | [illegible] | ++ME HPPE HMTE HM'E HME XPPE XMTE XM'E XME [[ME |
| 05282 | [illegible] | HTU4 HT74 HUQ4 HTQ4 XTU4 XT74 XUQ4 XTQ4 |
| 05283 | [illegible] | HG32 HG2 HG38 HG8 XG32 XG2 XG38 XG8 |
| 05284 | [illegible] | ++JY HU4Y HJ'Y HJY XU4Y XJ'Y XJY HU4' HJ' XU4' XJ' [[JY |
| 05285 | [illegible] | HN34 HNQ4 HN4 XN34 XNQ4 XN4 |
| 05286 | [illegible] | STOZ STUZ |

| | | |
|---|---|---|
| 05287 | [illegible] | OSMA OSMM S-AA S-AM STAA STAM SMTA SMA SMM OSMA OSMM OS-M OS-M S-TA S-M |
| 05288 | [illegible] | KEF4 |
| 05289 | [illegible] | EXUR EXR ;XUR ;XR |
| 05290 | [illegible] | UA4C UA4S |
| 05291 | [illegible] | ;2EM 40X. ;X. |
| 05292 | [illegible] | PH40 POH; PH; |
| 05293 | [illegible] | HX40 HCXO HCX; HX; XCXO XCX; XX; |
| 05294 | [illegible] | ;4HH |
| 05295 | [illegible] | 400Y ;30Y ;OY |
| 05296 | [illegible] | 40U; 40; ;ULO ;UL; ;U; |
| 05297 | [illegible] | TLAR TL4R TA4R COAR CO4R CA4R C4R |
| 05298 | [illegible] | 42UO 420 42U; 42; 4800 480 480; 48; |
| 05299 | [illegible] | HQAG HQUG HAOG HAG |
| 05300 | [illegible] | OGOY G30Y GOY |
| 05301 | [illegible] | OG4C OG4S G4CS G4C |
| 05302 | [illegible] | GHEZ |
| 05303 | [illegible] | -QQK -QQ. 9Q-K 9QOK 9QK 9Q. |
| 05304 | [illegible] | AY4H AYH |
| 05305 | [illegible] | $TKH $TQH 6TKH 6TQH |
| 05306 | [illegible] | 8KHR $3HR $H-R $HR 63HR 6H-R 6HR |
| 05307 | [illegible] | $EKK 6EKK |
| 05308 | [illegible] | PPO+ PP+ MOQ+ MOO+ M2O+ M2Q+ MO+ PPO[ PP[ MOQ[ MOO[ M2O[ M2Q[ MO[ PP@ M@ |
| 05309 | [illegible] | -AHX TAHX MHAX MHX -HAX -HX |
| 05310 | [illegible] | 43RS 43S 43R 4YRS 4YS 4YR |
| 05311 | [illegible] | 8SHR 8FHR 87HR 83HR 8HR |
| 05312 | [illegible] | 8NNM 8NM 8FNM 87NM 87M |
| 05313 | [illegible] | HXYB HX'B HPXB HBXB HXB |
| 05314 | [illegible] | UE84 UEE4 UE4 U8E4 UEE7 UE87 UE7 |
| 05315 | [illegible] | A2H4 A24 A2H7 |
| 05316 | [illegible] | E4XS 7X2S 7X=S 7XOS 7XOS 7XS |
| 05317 | [illegible] | E4L3 7LB3 7L3 |
| 05318 | [illegible] | U4QG JQG |
| 05319 | [illegible] | U4YW U4W J'YW JYW J'W |
| 05320 | [illegible] | TQOM TQMO TQM |
| 05321 | [illegible] | KATQ KAQ |
| 05322 | [illegible] | 3U04 3U4 3U44 |
| 05323 | [illegible] | EL50 ;L50 |
| 05324 | [illegible] | GUA- GU4- GU4 GQA- GQ4- GQ4 |
| 05325 | [illegible] | GUCO GUC GQCO GQO GQC GUJO GQJO |
| 05326 | [illegible] | GU8S GUS GQ8S GQS |
| 05327 | [illegible] | T-AF T-LF T-F T-A T-A7 T-L7 T-7 |
| 05328 | [illegible] | T4NE |
| 05329 | [illegible] | OPPP O3P O444 O3-4 |
| 05330 | [illegible] | OHQJ OQ+J OQJ OQ[J |
| 05331 | [illegible] | 40T2 40T8 OT42 OT48 |
| 05332 | [illegible] | KGLX G4LX GL2X GL8X GLRX KL2X KL8X KLRX K42X K48X GLX |
| 05333 | [illegible] | P34C P3C P34S P3S P43C P4C P44S P4S |
| 05334 | [illegible] | IUYR EYVR EYR \YVR \YR |
| 05335 | [illegible] | I24E I44E I4E |
| 05336 | [illegible] | I23P I234 IPPP I3P I444 I3-4 I34 |
| 05337 | [illegible] | FPPP F3P F444 F3-4 F34 |
| 05338 | [illegible] | FEEA FIUA F\EA |
| 05339 | [illegible] | TXMY |
| 05340 | [illegible] | BTOK BTEK |
| 05341 | [illegible] | Y42V Y44V Y4V Y48V |
| 05342 | [illegible] | YPPY YMY4 YMYQ YMY |
| 05343 | [illegible] | Y-AO YTAO YM3O YMO Y-O |
| 05344 | [illegible] | -ATM A2TM ATEM ATME AT-M A2EM A2ME A2-M A4EM A4ME A4-M ATM A4M |
| 05345 | [illegible] | 3HOE 3HE |
| 05346 | [illegible] | WPPY WMY4 WMYQ WMY |
| 05347 | [illegible] | 'F2M Z2EM Z2M |
| 05348 | [illegible] | ETOK ETEK |
| 05349 | [illegible] | E42V E44V E48V E4V |
| 05350 | [illegible] | L2Y2 L2Y8 LYO2 LYO2 LY2 LYO8 LYO8 LY8 |
| 05351 | [illegible] | 4TAL |
| 05352 | [illegible] | FFA3 /A23 /A3 FFA4 /A24 /A4 |
| 05353 | [illegible] | N3LH NLQH NLH |
| 05354 | [illegible] | NH42 NH48 |
| 05355 | [illegible] | P32E PEEE P3E |
| 05356 | [illegible] | HPHY HPY XPHY XPY |

05357 [illegible] ++MY HMY4 HMYQ XMY4 XMYQ L[MY
05358 [illegible] HU4E HJ2E XU4E XJ2E
05359 [illegible] OSLA SLHA SLA OSLA
05360 [illegible] E8BS E8SS 3TBS 3TSS
05361 [illegible] OZSS OZS
05362 [illegible] S34L S3QL
05363 [illegible] KH4M
05364 [illegible] K4SF K4F K4S7 K47
05365 [illegible] EF4R E44R EFR
05366 [illegible] ;OBZ
05367 [illegible] ;HEX ;HX ;XEX ;XX
05368 [illegible] E5KO E5EO E5K; EK; ;5K; ;K;
05369 [illegible] 42KM 42EM 42M 42ME 48KM 48EM 48M 48ME 4KEM 4KM
4KME
05370 [illegible] GHLJ GHJJ OGEJ GE'J GEJ G3'J
05371 [illegible] OGEE GEEE G2EE GETE GE'E GEE OG2E G2TE G2'E G2E
05372 [illegible] OGTH GTDH GTKH GTXH GTH GTX2 GT2 G.XH G.X2
05373 [illegible] 3-Q- 3+Q+ 3HQ QQQ 3[Q[
05374 [illegible] TH4H TH;H T;H
05375 [illegible] -QH4 9H44 9HQ4 9H4
05376 [illegible] $LK4 6LK4
05377 [illegible] 8KMQ $-AQ $TAQ $MQ 8K-Q $-Q 6-AQ 6TAQ 6MQ 6-Q
05378 [illegible] $HEM $HME 6HEM 6HME
05379 [illegible] $3UQ $3OQ $3E 63UQ 63OQ 63E
05380 [illegible] 8K4H $4HH $4H 64HH 64H
05381 [illegible] 8K4S $4CS $4S 64CS 64S
05382 [illegible] 8KEU $TEU $'EU $EU 6TEU 6'EU 6EU
05383 [illegible] PPPH MPOH MPTH MPH
05384 [illegible] MH+A MHA MH[A
05385 [illegible] -APH TAPH MPOH MPH -POH -PH
05386 [illegible] -AOO TAOO MOGO MGXO MGO -OGO -GXO -GO
05387 [illegible] NBPB NPTB NPB 3BPB 3PTB O'UO
05388 [illegible] PET2 PE2 PET8 PE8
05389 [illegible] B3T2 B32 B3T8 B38
05390 [illegible] NBPK NP8K 3BPK 3P8K
05391 [illegible] E4CO 7C3O 7CO
05392 [illegible] E443 E44Y 7-43 743 7-4Y 74Y
05393 [illegible] HBK4 HKE4 HBK7 HB7 HK7
05394 [illegible] E4Q3 E4QN E4N 7QN3 7Q3 7QN
05395 [illegible] QAQV QAV
05396 [illegible] LYYR LYQR LYR
05397 [illegible] QRTA QRQA RTUA RTQA RQUS RQA
05398 [illegible] U4HB JHFB JH7B JHB
05399 [illegible] U44Z J4Z
05400 [illegible] WWU4 2WB4 =WB4 WW4 2W4 =W4 WUB4 WU4 WWU5 2WU5
=WU5 WU5 WW5 2W5 =W5
05401 [illegible] UEB4 UTE5 U'E5 UE5
05402 [illegible] AEB4 AHE5 AE5
05403 [illegible] AE8C
05404 [illegible] LHFJ LF4J L%4J LFFJ LFJ LH7J L74J L77J L7J
05405 [illegible] 44TB 44B Q4TB Q4B
05406 [illegible] HKX4 HXQ4 HKX+ HXQ+ HX+ HKX[ HXQ[ HX[
05407 [illegible] GUGF GQGF GUG7 GQG7
05408 [illegible] GUBK GQBK
05409 [illegible] EDGU EDU EDGQ EDQ
05410 [illegible] TOLX TOOX T2OX T2LX
05411 [illegible] T3U4 T3O4 T344 T3Q4 T34
05412 [illegible] OHHS OH6S
05413 [illegible] +OUK +OK +OUK +UOK +UEK +UK [OUK [OK [OUK [UOK
[UEK [UK
05414 [illegible] O4NE O4E
05415 [illegible] N;NZ N;Z ;NNZ ;NZ TNNZ T22Z T4Z- T4Z
05416 [illegible] E+K2 E+2 E+K8 E+8 EFK2 EF2 EFK8 EF8 E7K2 E72
E7K8 E78 E[K2 E[2 E[K8 E[8 \+K2 \+2 \+K8 \+8
\FK2 \F2 \FK8 \F8 \7K2 \72 \7K8 \78 \[K2 \[2
\[K8 \[8
05417 [illegible] N;NE N;E ;NNE ;NE TNNE N;N\ N;\ ;NN\ ;N\ TNN\
05418 [illegible] N;N5 N;5 ;NN5 ;N5 TNN5 T225 T45
05419 [illegible] HK2G HKG
05420 [illegible] FHKE FH2E FH8E FHE
05421 [illegible] YHOE YHE YXOE YX
05422 [illegible] HEUT HOE- HE- TXUT .XUT .XT .X-
05423 [illegible] 3-AF 3-LF 3-A 3-F 3-A7 3-L7 3-7
05424 [illegible] 3HKE 3H2E 3H8E 3HE 05425 [illegible] Z4NE Z4E
05426 [illegible] TKAS
05427 [illegible] 3QU4 QUA- QU4- QU4
05428 [illegible] L2PG LPAG LPG
05429 [illegible] L2UE LU4E LUE L2JE LJ2E
05430 [illegible] KTOK KTEK
05431 [illegible] FFTL /TAL /TL
05432 [illegible] FFY2 FFY8 /YO2 /YO2 /Y2 /YO8 /YO8 /Y8
05433 [illegible] TALP TAL4 TL-4
05434 [illegible] PE+G PEG 4E+G PE[G 4E[G
05435 [illegible] AHKM AHEM AHME AHM
05436 [illegible] TALK TLTK
05437 [illegible] KTYR
05438 [illegible] UAUX
05439 [illegible] ;H42 ;H48
05440 [illegible] 42H2 422 42H8 428 48H2 48H8 488 4H42 4H48
05441 [illegible] L442 L448
05442 [illegible] OGKP OG2P G2KP G2P GKKP GKP
05443 [illegible] OGT2 OGT8 GTT2 GT42 GTT8 GT48
05444 [illegible] NHNO HNNO HNO NQNO NQO QNNO QNO
05445 [illegible] -AFP -LFP -AP -FP -AF7 -L7P -7P
05446 [illegible] $HLJ $HJJ $E'J $3'J $EJ 6HLJ 6HJJ 6E'J 63'J 6EJ
05447 [illegible] $EF4 6EF4
05448 [illegible] E48K EF4K EFK EF4$ EF$ E4$ EF46 EF6 E46
05449 [illegible] -ATH TATH MTDH MTKH MTXH MTH MTX2 MT2 M.XH M.X2
-TDH -TKH
05450 [illegible] MZQH MZH
05451 [illegible] H+HZ H[HZ
05452 [illegible] H+3Q H+-Q H+QQ H+Q H[3Q H[-Q H[QQ H[Q
05453 [illegible] TBT2 TBT8 T-T2 T-T8 T-2 T-8
05454 [illegible] OR8K ORK
05455 [illegible] E4KA 7'KA 7-KA 7KOA 7KA
05456 [illegible] E4HR 73HR 7HR
05457 [illegible] QAHH
05458 [illegible] E332 E32 E338 E38 D3T2 D3T8 D32 D38
05459 [illegible] 3XU4 3AXJ 3XJ
05460 [illegible] U4+Z U4QZ JHQZ JQZ U4[Z
05461 [illegible] U443 U44Y J-43 J423 J43 J-4Y J4-Y J4Y
05462 [illegible] U4BX JB4X JBX
05463 [illegible] L4B4 L44 LH45 LX45 L45
05464 [illegible] COB4 CO4 C305 CO5
05465 [illegible] ELCV ELC ;LCV ;LC ;LV
05466 [illegible] GU5O GQ5O GQO
05467 [illegible] GUOG GUG GQOG GQG
05468 [illegible] TAL2 TAL8 TLH2 TLH8
05469 [illegible] OHUY OHJY
05470 [illegible] IUOX EOLX EOX ELPX ELX EL4X EOOX E2OX E2LX \OLX
\OX \LPX \LX \L4X \OOX \2OX \2LX
05471 [illegible] ;NNG ;NG N;NG N;G TNNG T22G T4G
05472 [illegible] ;NNF ;NF N;NF N;F ;NEJ ;NJ N;EJ N;J ;N3J N;3J
TNNF T22F T4F
05473 [illegible] F44X F4EX
05474 [illegible] FEXR FEUR F;XR F;UR
05475 [illegible] B-AF B-LF B-A B-F B-A7 B-L7 B-7
05476 [illegible] Y-AF Y-LF Y-A Y-F Y-A7 Y-L7 Y-7
05477 [illegible] E242 E248 EHR2 EHR8 ETK2 ETK8 EKK2 E2K2 EK42 EK2
EKK8 E2K8 EK48 EK8 ERR2 E2R2 ER42 ER2 ERR8 E2R8
ER48 ER8
05478 [illegible] U2YA U8YA UYA UAYA
05479 [illegible] /TEM /TME /T-M /2EM /2ME /2-M /4EM /4ME /4-M
05480 [illegible] FFMY /PPY /MY4 /MYQ /MY
05481 [illegible] FF8A /8OA /8A
05482 [illegible] N34V N44V N42V N48V N4V
05483 [illegible] N3TM NTEM NTME NT-M N2EM N2ME N2-M N4EM N4ME N4-M
N2M N4M
05484 [illegible] NUOR NUFR NUUR NU7R
05485 [illegible] A242 A248 AHR2 AHR8 ATK2 ATK8 AKK2 A2K2 AK42 AK2
AKK8 A2K8 AK48 AK8 ARR2 A2R2 AR42 AR2 ARR8 A2R8
AR48 AR8
05486 [illegible] H9E4 H94 X9E4 X94
05487 [illegible] H4NE H4E X4NE X4E
05488 [illegible] SSS4 3S4- 3S4
05489 [illegible] ;NNX ;NX N;NX N;X TNNX T22X T4X
05490 [illegible] -AFZ -AZ -LFZ -FZ -A7Z -L7Z -7Z

| | | | | | | | | | | | |
|---|---|---|---|---|---|---|---|---|---|---|---|
| 05491 | [illegible] | 4NEZ | 4EZ | | | | | | | | |
| 05492 | [illegible] | $LH4 | $LF4 | $L74 | 6LH4 | 6LF4 | 6L74 | | | | |
| 05493 | [illegible] | 8KNY | 8KBY | $BNY | $BY | $NBY | $NY | 6BNY | 6BY | 6NBY | 6NY |
| 05494 | [illegible] | 8KB3 | $BH3 | $B3 | 8KB4 | $BH4 | $B4 | 6BH3 | 6B3 | 6BH4 | 6B4 |
| 05495 | [illegible] | LBKQ | LKTQ | LKQ | | | | | | | |
| 05496 | [illegible] | B4T2 | B42 | B4T8 | B48 | | | | | | |
| 05497 | [illegible] | LBKK | LK8K | | | | | | | | |
| 05498 | [illegible] | HXE4 | ! | HCX7 | HX7 | | | | | | |
| 05499 | [illegible] | E44H | 74HH | | | | | | | | |
| 05500 | [illegible] | E48T | 780T | 78-T | 78-2 | 78-4 | 7822 | 7824 | 78T | 782 | 788 |
| 05501 | [illegible] | QA+Z | QA[Z | | | | | | | | |
| 05502 | [illegible] | QAQK | QAK | QAQ. | QA. | | | | | | |
| 05503 | [illegible] | QA4C | QAC | QA4S | | | | | | | |
| 05504 | [illegible] | U420 | J2E0 | J20 | | | | | | | |
| 05505 | [illegible] | U4YH | J2YH | JYAH | JYH | | | | | | |
| 05506 | [illegible] | U4LT | U4T | U4L- | JLKT | JLT | JLK- | JL- | | | |
| 05507 | [illegible] | NNB4 | 2NB4 | =NB4 | NN4 | 2N4 | =N4 | NN5 | 2N5 | =N5 | |
| 05508 | [illegible] | LFYH | LFH | L7YH | L7H | | | | | | |
| 05509 | [illegible] | TE4X | ]E4X | T\4X | ]\4X | | | | | | |
| 05510 | [illegible] | OP3C | OPC | OP3S | OPS | OP4C | OP4S | | | | |
| 05511 | [illegible] | H-AA | HTAA | HMHA | IH-A | IHTA | IHMA | H-HA | | | |
| 05512 | [illegible] | FE4R | FEFR | | | | | | | | |
| 05513 | [illegible] | 3-AA | 3TAA | 3MHA | 3MA | 3-HA | | | | | |
| 05514 | [illegible] | L2HE | LHKE | LH2E | LH8E | | | | | | |
| 05515 | [illegible] | L2+2 | L2F2 | L2+8 | L2F8 | L+K2 | L+2 | L+K8 | L+8 | LFK2 | LF2 |
| | | LFK8 | LF8 | L272 | L278 | L7K2 | L72 | L7K8 | L78 | L2[2 | L2[8 |
| | | L[K2 | L[2 | L[K8 | L[8 | | | | | | |
| 05516 | [illegible] | 3+4L | 3+4- | 3+4 | 3[4L | 3[4- | 3[4 | 3I | | | |
| 05517 | [illegible] | HEHE | | | | | | | | | |
| 05518 | [illegible] | 4H+4 | 4H[4 | | | | | | | | |
| 05519 | [illegible] | KKBS | KBSS | KBS | RRBR | RBSS | RBS | | | | |
| 05520 | [illegible] | +OUS | +OSS | +OS | +UTS | +U+S | +UOS | +USS | +OUS | +OS | +UOS |
| | | [OUS | [OSS | [OS | [UTS | [U+S | [UOS | [USS | [OUS | [OS | [UOS |
| 05521 | [illegible] | 'T4J | T4EJ | T4J | ]4EJ | ]4J | | | | | |
| 05522 | [illegible] | ;TOK | ;TEK | | | | | | | | |
| 05523 | [illegible] | 4OUR | ;UOR | ;UFR | ;UUR | ;UR | ;U7R | | | | |
| 05524 | [illegible] | 4OTM | ;TEM | ;TME | ;T-M | ;2EM | ;2ME | ;2-M | ;4EM | ;4ME | ;4-M |
| | | ;TM | ;2M | ;4M | | | | | | | |
| 05525 | [illegible] | UKUL | UKL | U.UL | QKUL | QKL | Q.UL | Q.L | EUBL | 3IUL | |
| 05526 | [illegible] | T+X2 | T+2 | T+X8 | T+8 | T[X2 | T[2 | T[X8 | T[8 | | |
| 05527 | [illegible] | -QTK | 9TOK | 9TEK | | | | | | | |
| 05528 | [illegible] | 8KT4 | $TU4 | $T74 | $TQ4 | $U74 | $UQ4 | $T4 | 6TU4 | 6T74 | 6TQ4 |
| | | 6U74 | 6UQ4 | 6T4 | | | | | | | |
| 05529 | [illegible] | -ALG | TALG | MLYG | MLG | -LYG | -LG | | | | |
| 05530 | [illegible] | -AOH | -AH | TAOH | TAH | M3OH | MOH | M3KT | MOHT | M3OE | MOE |
| | | -3OH | -OH | -3OE | -OE | | | | | | |
| 05531 | [illegible] | -A4C | TA4C | TAC | TA4L | M4OC | M4C | M4OL | M4L | MBL | M;BC |
| | | M;C | M;BL | M;L | -4BC | -4BL | -;BC | -;BL | | | |
| 05532 | [illegible] | H+4Z | H[4Z | | | | | | | | |
| 05533 | [illegible] | G2Q4 | G24 | G2Q+ | G2+ | G8Q4 | G84 | G8Q+ | G8+ | G2Q[ | G2[ |
| | | G8Q[ | G8[ | | | | | | | | |
| 05534 | [illegible] | E4PZ | E44Z | 7PXZ | 7PZ | 74XZ | 74Z | | | | |
| 05535 | [illegible] | E3U2 | E32 | E3U8 | E38 | DU32 | DU38 | DU2 | DU8 | | |
| 05536 | [illegible] | LBKR | LKQR | LKR | | | | | | | |
| 05537 | [illegible] | EUU4 | ;UU4 | EXUJ | ;XUJ | ;UJ | | | | | |
| 05538 | [illegible] | LEB4 | LTE5 | LE5 | | | | | | | |
| 05539 | [illegible] | OOB4 | OGO5 | GXO5 | | | | | | | |
| 05540 | [illegible] | TQ8T | TQT | | | | | | | | |
| 05541 | [illegible] | EFQ4 | EQ4- | | | | | | | | |
| 05542 | [illegible] | EX4L | EXOL | EXQL | | | | | | | |
| 05543 | [illegible] | GUPH | GUH | GQPH | GQH | | | | | | |
| 05544 | [illegible] | GU'A | GU-A | GUOA | GUOA | GUA | GQ'A | GQ-A | GQOA | GQOA | GQA |
| 05545 | [illegible] | LPEG | LP+G | L4EG | L4+G | LP[G | L4[G | | | | |
| 05546 | [illegible] | YE4R | YEFR | | | | | | | | |
| 05547 | [illegible] | 3;N5 | 3;5 | 3N;5 | 3T45 | | | | | | |
| 05548 | [illegible] | FFQE | /TAE | /QAE | /QE | | | | | | |
| 05549 | [illegible] | FF4E | /4NE | /4E | | | | | | | |
| 05550 | [illegible] | N;NS | N;S | ;NNS | ;NS | NNS | TNNS | T22S | T4S | | |
| 05551 | [illegible] | HE4R | HER | XE4R | XER | .X4R | .XR | | | | |
| 05552 | [illegible] | OG3P | GPPP | G3P | OG34 | G3-4 | G444 | G34 | | | |
| 05553 | [illegible] | EU9D | EUD | ;U9D | ;UD | | | | | | |
| 05554 | [illegible] | $TOK | $TEK | 6TOK | 6TEK | | | | | | |
| 05555 | [illegible] | $8OA | 68OA | | | | | | | | |
| 05556 | [illegible] | T4T2 | T4T8 | | | | | | | | |

| | | |
|---|---|---|
| 05557 | [illegible] | 8SUR 8FUR 87UR 8UOR 8UFR 8U7R 8UUR 8UR |
| 05558 | [illegible] | QAUR QAR |
| 05559 | [illegible] | E33L E3L D34L D3QL |
| 05560 | [illegible] | EUH2 EUH8 ;UH2 ;UH8 ;U2 ;U8 |
| 05561 | [illegible] | 34NY 3N4Y 3NY 3;NY 3;Y 3N;Y 3;2Y 3;4Y |
| 05562 | [illegible] | 4P3C 4P4C 4PC 4P3S 4P4S 4PS |
| 05563 | [illegible] | 40K2 40K8 ;242 ;248 ;HR2 ;HR8 ;TK2 ;TK8 ;KK2 ;2K2 |
| | | ;K42 ;K2 ;KK8 ;2K8 ;K48 ;K8 ;RR2 ;2R2 ;R42 ;R2 |
| | | ;RR8 ;2R8 ;R48 ;R8 |
| 05564 | [illegible] | 8K3P $PPP $3P 8K34 $3-4 $444 $34 6PPP 63P 63-4 |
| | | 6444 634 |
| 05565 | [illegible] | H+H4 H[H4 |
| 05566 | [illegible] | E4T4 7TU4 7T74 7TQ4 7U74 7UQ4 |
| 05567 | [illegible] | E4F2 E4F8 E472 E478 7FF2 7FQ2 7F2 7FF8 7FQ8 7F8 |
| | | 7772 77Q2 772 7778 77Q8 778 |
| 05568 | [illegible] | NEFR NE4R |
| 05569 | [illegible] | ;3U4 ;304 ;344 ;3Q4 |
| 05570 | [illegible] | OGHE OGHM GHME GHM GHE |
| 05571 | [illegible] | -QOX -Q2X 9OLX 900X 920X 92LX 90X |
| 05572 | [illegible] | 8KK2 8KK8 8KR2 8KR8 $HR2 $HR8 $TK2 $TK8 $242 $248 |
| | | $KK2 $2K2 $K42 $K2 $KK8 $2K8 $K48 $K8 $RR2 $2R2 |
| | | $R42 $R2 $RR8 $2R8 $R48 $R8 6HR2 6HR8 6TK2 6TK8 |
| | | 6242 6248 6KK2 62K2 |
| | | 6K42 6K2 6KK8 62K8 6K48 6K8 6RR2 62R2 6R42 6R2 |
| | | 6RR8 62R8 6R48 6R8 |
| 05573 | [illegible] | ;NNK ;N8K ;NK N;NK N;K ;NN$ ;N$ N;N$ N;$ TNN$ |
| | | T22$ T4$ ;NN6 ;N6 N;N6 N;6 TNN6 T226 T46 |
| 05574 | [illegible] | 8K4E $4NE $4E 64NE 64E |
| 05575 | [illegible] | U4EO JE4O JEO |
| 05576 | [illegible] | U4T4 U44 JTU4 JT74 JTQ4 JT4 JU74 JUQ4 JU4 |
| 05577 | [illegible] | 44H2 44H8 Q4H2 Q4H8 |
| 05578 | [illegible] | UKH4 U.H4 U.4 QKH4 QK4 Q.H4 Q.4 EHS4 3IH4 3I4 |
| 05579 | [illegible] | 4X8K 4XK 4EX$ 4;X$ 4X$ 4EX6 4;X6 4X6 |
| 05580 | [illegible] | 4V84 4V4 42V5 44V5 24V5 =4V5 4V5 |
| 05581 | [illegible] | EUYW EUKW ;UYW ;UKW |
| 05582 | [illegible] | E4-A E4-F E4F E4-7 7-AF 7-LF 7-F 7-A 7-A7 7-L7 |
| | | 7-7 |
| 05583 | [illegible] | YYU3 YUU3 YHU3 YH3 |
| 05584 | [illegible] | HEB4 HOE5 HE5 |
| 05585 | [illegible] | ;NN4 ;NB4 ;N4 N;N4 N;B4 N;4 ;NN5 N;N5 ;N5 N;5 |
| | | TNN5 T225 T45 |
| 05586 | [illegible] | /8A2 /8A8 |
| 05587 | 乂 | X |
| 05588 | 乜 | JL LL |
| 05589 | 凵 | U |
| 05590 | 匚 | -L |
| 05591 | 厂 | L -' |
| 05592 | 万 | -D -C' -'C |
| 05593 | 丌 | -'I -II |
| 05594 | 乇 | 2L =L HL |
| 05595 | 亍 | 2J --J =J |
| 05596 | 口 | IL- |
| 05597 | 屮 | U' IU' |
| 05598 | 彳 | ''I 'T ] |
| 05599 | 丏 | TLC GC -GC |
| 05600 | [illegible] | +U -'U +'U [U ['U |
| 05601 | 与 | 5- -N- |
| 05602 | 卂 | Z2O Z++ ZIHI 2OZ IHIZ =OZ ZX Z[[ |
| 05603 | [illegible] | =II --II 2II 2'I ='I --'I |
| 05604 | 仂 | TC TC' |
| 05605 | 仉 | TR- TR |
| 05606 | 仈 | T8 T'. |
| 05607 | 尢 | U'L ER |
| 05608 | 匄 | 'C9 C9 'J9 J9 |
| 05609 | 卬 | CP |
| 05610 | 夳 | 9S |
| 05611 | 圠 | HL IHL |
| 05612 | [illegible] | SU. U.S C.S SC. U.3 C.3 |
| 05613 | 夬 | LK JK |
| 05614 | 心 | 3. I2. J2. |
| 05615 | 巿 | ¬UI |
| 05616 | 旡 | C'L CR |
| 05617 | [illegible] | RX R-X |
| 05618 | 毌 | O+ O+ Q+ O[ O[ Q[ |

```
05619 气   T-Z   '--Z  T--L
05620 爿   LIL   UIL   UIT   UL
05621 丱   L'IJ  LIIJ  U'IJ  UIIJ  L'JI  LIJI  U'JI  UIJI  U'UI  UIUI
05622 并   22.   HH.   #.
05623 仨   T3    T---  T3-
05624 仜   TH    T-I-
05625 仩   TT-   TI--
05626 仡   TTZ   TT-L  T'-Z
05627 仝   8H    8-I-
05628 仚   8IU   8\
05629 刌   JIJ   J.J   -J.J
05630 刏   TZIJ  TZJ
05631 匥   CLIL  CJIL  C+L   CLL   CJL   C[L
05632 册   40    -22   -4I
05633 圢   IH-J  H-J
05634 圣   XH    -XH   XIH   -XIH
05635 夗   AJL   AOL   ACL   U.JL  U.OL  U.PL  U.CL  U.L   C.JL  C.OL
           C.PL  C.CL  C.L
05636 夯   KC    KC'
05637 宁   UJ    U-J   .UJ   .U-J
05638 宂   U9    .U9
05639 尒   83    8I2   8J2   8I'.  8J'.
05640 尻   P9
05641 岁   EC    EC'   IUC   IUC'  \C    \C'
05642 屳   '.IU  '.E   '.\
05643 帄   UI-J  UIJ
05644 庀   LF    L7    .LF   .L7
05645 庆   .LT
05646 切   I2D   ID
05647 戉   LM    ML
05648 扐   FC    FC'
05649 氕   7'    TZ'   T-Z'  T-L'
05650 氶   J3    L3    L4    JJLL  LJLL  LLLL
05651 汃   38    3'.
05652 氿   39
05653 氻   3C    3C'
05654 犮   -'X.  +X.   +'X.  [X.   ['X.
05655 犰   Z9
05656 玊   E.
05657 内   US
05658 肊   AZ    A-L
05659 防   PC    PC'
05660 伎   T+X   T+-X  T[X   T[-X
05661 优   T-R.  T-R   T+L.  TK.   T[L.  T.K
05662 伬   TP.
05663 仵   TT+   T'HI  T'-+  TT[   T'-[
05664 伔   TUR   TU'L
05665 伶   T8-L  T8-J  T8.L  T8IJ  T8.J  T8L   T8J
05666 伀   T8S   T2S
05667 价   T82   T8II  T8'I
05668 伈   TG    T'L2  T.L2
05669 伝   T2S   T=S
05670 伂   TTE   TTU1
05671 佗   T-UL  T-EL  T+UL  T+EL
05672 伢   TCJ'  TCJ
05673 伓   T-3   TT8
05674 伄   T5I
05675 仴   TA
05676 伒   TLT
05677 亙   2CC   2-0-  220   2=0   =CC   =-0-  =20   ==0
05678 刓   2RIJ  2RJ   =RIJ  =RJ
05679 刑   A-IJ  A-J   UTIJ  UTJ   U-.J  U.-J
05680 劦   3C    3C'   CCC
05681 匢   CC2   CU2   CC''  C'C2  CU''
05682 匠   CTR
05683 卍   ZZ
05684 厊   LCJ'  LCJ
05685 吁   OZ-
05686 囨   OV    OV
05687 囟   'OX   'OX
05688 圮   HCL   IHCL
05689 圪   HTZ   IHTZ  HT-L  IHTL
05690 均   HC-   HC.   IHC-  IHC.  H'C-  H'C.
05691 夼   K3    K3I   KIII  K'II
```

```
05692 改   CLV
05693 妊   VHL   V2L   V=L
05694 妅   VH    V-I-
05695 奻   VV    2V
05696 妯   VIU   V\
05697 奸   V'+   V'[
05698 尥   9.V   9V
05699 孖   Z-Z-  Z'Z-
05700 尕   'S3   S'3   'S12  S'12  'SJ2  S'J2
05701 尥   -RC.  +RC.  K'C.  KC.   K'J.  KJ.
05702 屼   E-R   IU-R  \-R
05703 屺   IUCL  ECL   \CL
05704 屻   IUD.  IUD   ED.   ED    \D.   \D
05705 屾   EIU   IUIU  2IU   =IU   2\    =\
05706 巟   TL3   C3    .C3
05707 幵   HIHI  -+-+  2HI   2-+   -[-[  2-[
05708 庄   LH    .LH   LIH   .LIH  .L+-  .L[-
05709 弃   CLH   CL20  CL++  CL-2  CLX   CL[[
05710 弜   85I   85+   25I   25+   =5I   =5+   85[   25[   =5[
05711 彴   'TC.  'TC-  'TC   ]'C-  ]'C.  ]C-   ]C.
05712 忕   I2K   IK
05713 忔   I2TZ  ITZ   IT-L
05714 忏   I2'+  I2'[  I22I  I2=I  I2-+  I2-[  I'+   I'[   I-+   I-[
05715 扜   FHJ   F=J   F2J
05716 扞   FHI   F-+   F2I   F=I   F-[
05717 扤   F-R   F-'L
05718 扡   FJIL  FJL   F+L   FLIL  F[L
05719 扦   F'+   F'[
05720 扢   FTZ   FT-L
05721 扙   95CF
05722 扠   FX.   FX
05723 扚   FC-   FC.   F'C.  F'C-
05724 托   BOCB
05725 攷   5TX   -CTX  TCTX
05726 旯   B9
05727 旮   9BI   9B
05728 朾   YJ    Y-J
05729 朹   Y9
05730 朸   YC    YC'
05731 朻   YLI   YUI
05732 机   YR    Y'Z
05733 朿   YU
05734 朼   YF    Y7
05735 朳   Y8    Y'.
05736 氘   72    7'I   7II   T-Z2  TZ2
05737 氽   83    84    8ILL  8JLL
05738 汒   3.C   3TL
05739 汜   3OL   3PL
05740 汏   3K
05741 汊   3X.   3-X.
05742 汔   3TZ
05743 汋   3'C-  3'C.  3C-
05744 汌   33    3III  33I   3'II
05745 灱   WD
05746 牞   'FC   ZC    ZC'
05747 犴   ZHI   Z-+   Z2I   Z=I   Z-[
05748 犵   ZTZ   ZT-L
05749 玎   E-J
05750 甪   'UH   'U2O  'U2I  'U=I  'U++  'UX   'U[[
05751 癿   'BL
05752 穵   U8Z   U2Z   .U2Z  .U8Z
05753 网   UXX   U2X
05754 艸   U'U'  E'E'  U'UI  E'EI  UIUI  EIEI  2U'   =U'   2UI   =UI
           2E'   =E'
05755 芋   ++J   ++-J  H-J   X-J   [[J   [[-J
05756 芀   ++D   HD    XD    [[D
05757 芁   ++9   H9    X9    [[9
05758 芅   ++'S  [['S  ++S'  [[S'H'S  HS'  X'S   XS'
05759 虍   TU7
05760 襾   -UU
05761 邙   .CP   TLP
05762 邗   '+P   -+P   HIP   H'P   '[P   -[P
05763 邘   HJP   =JP   2JP
05764 邛   HP'
```

| | | | | | | | | | | | |
|---|---|---|---|---|---|---|---|---|---|---|---|
| 05765 | 邵 | CLP | | | | | | | | | |
| 05766 | 阢 | P-R | P-'L | | | | | | | | |
| 05767 | 阤 | PLIL | PJIL | P+L | PLL | PJL | P[L | | | | |
| 05768 | 阠 | PZ+ | P+Z | P'Z. | PXZ | PZX | PL+ | P+L | P'L. | PXL | PR. |
| | | PZ[ | P[Z | PL[ | P[L | | | | | | |
| 05769 | 陀 | PTZ | PT-L | PTL | | | | | | | |
| 05770 | 佖 | TG' | | | | | | | | | |
| 05771 | 伻 | TH2 | THI2 | T-2+ | TK+ | TH2I | T-2[ | TK[ | | | |
| 05772 | 佢 | TCC | | | | | | | | | |
| 05773 | 佉 | THS | TIHS | | | | | | | | |
| 05774 | 体 | TY- | TY+ | TY[ | | | | | | | |
| 05775 | 伹 | T-Z. | T-Z- | TCZ. | TCZ- | TCZ | T-FZ | | | | |
| 05776 | 伾 | T-3- | T23 | T=3 | | | | | | | |
| 05777 | 什 | TT-T | TTT. | TTT | TGI. | | | | | | |
| 05778 | 佒 | TUK | | | | | | | | | |
| 05779 | 佟 | TX2 | TX= | T'X2 | T'X= | | | | | | |
| 05780 | 伯 | TSO | | | | | | | | | |
| 05781 | 佘 | 8=3 | 823 | 8-Y | | | | | | | |
| 05782 | 伩 | TTN | | | | | | | | | |
| 05783 | 伳 | T2OL | THL | | | | | | | | |
| 05784 | 伿 | TO2 | TO8 | TO'. | | | | | | | |
| 05785 | 佡 | T8IU | T8\ | | | | | | | | |
| 05786 | 阽 | URO | U2O | U8O | | | | | | | |
| 05787 | 冹 | 2+X. | 2+'X | 2+X | =+X. | =+'X | =+X | 2[X. | 2['X | 2[X | =[X. |
| | | =['X | =[X | | | | | | | | |
| 05788 | 刜 | 52IJ | 52J | 5IIJ | 5'IJ | | | | | | |
| 05789 | 刞 | A-IJ | 4-IJ | | | | | | | | |
| 05790 | 剭 | OKIJ | OKJ | P'MJ | | | | | | | |
| 05791 | 劭 | UOC | UOC' | DOC | DOC' | | | | | | |
| 05792 | 劮 | '+KC | '[KC | TKC' | TKC | | | | | | |
| 05793 | 匄 | 'CH2 | 'CK+ | 'CK[ | CH2I | CHI2 | CK+ | CK[ | | | |
| 05794 | 卣 | TOC | TOC | | | | | | | | |
| 05795 | 卲 | UOJI | UOIJ | UOCI | UOIC | DOJI | DOIJ | DOCI | DOIC | UOP | |
| 05796 | 厎 | LK- | LK. | L'K- | L'K. | L'K | | | | | |
| 05797 | 厍 | LTI2 | LTI= | L'E | | | | | | | |
| 05798 | 呔 | O+S | O-'S | O+'S | O[S | O['S | | | | | |
| 05799 | 咉 | OLK | OJK | | | | | | | | |
| 05800 | 吪 | OTF | OT7 | | | | | | | | |
| 05801 | 呔 | OK. | | | | | | | | | |
| 05802 | 呅 | OTX | | | | | | | | | |
| 05803 | 吙 | O2T | OW | | | | | | | | |
| 05804 | 吜 | OL+- | OC+ | OEI | OL[- | | | | | | |
| 05805 | 吥 | O-3 | OT8 | | | | | | | | |
| 05806 | 吘 | OT+ | O'HI | OT[ | | | | | | | |
| 05807 | 吽 | O'2O | OT+ | O'2I | O'=I | OT{ | | | | | |
| 05808 | 呀 | O'++ | O'[[ | O'2O | O'H | O'X | | | | | |
| 05809 | 呁 | O'C2 | O'C= | O'J2 | O'J= | OC2 | OC= | | | | |
| 05810 | 吨 | O-UL | O-EL | O+EL | O+UL | O+L | O[EL | O[UL | O[L | | |
| 05811 | 吤 | O8,'I | O8II | O82 | | | | | | | |
| 05812 | 杳 | ILLO | JLLO | | | | | | | | |
| 05813 | 囲 | OTF | OT-L | OTL- | OT'L | OTL' | OT7 | | | | |
| 05814 | 囦 | O2U | O8U | ORU | O2U | O8U | ORU | | | | |
| 05815 | 囬 | OTR | | | | | | | | | |
| 05816 | 坻 | H'K | HK | IH'K | IHK | | | | | | |
| 05817 | 坅 | H8-L | H8.L | H8J | H8-J | H8.J | IH8L | IH8J | | | |
| 05818 | 坌 | 8DH | 8DIH | 2DH | 2DIH | =DH | =DIH | | | | |
| 05819 | 坉 | H-UL | H-EL | H+UL | H+EL | IH-L | IH. | H. | | | |
| 05820 | 坋 | H8D | H2D | IH8D | IH2D | | | | | | |
| 05821 | 坒 | FFH | FFIH | 2FH | =FH | 2FIH | =FIH | 77H | 77IH | 27H | =7H |
| | | =7IH | %IH | %H | | | | | | | |
| 05822 | 夆 | X3O | X3I | X3-I | XE | 'XE | 'X3O | 'X3I | | | |
| 05823 | 夹 | -3K | T8K | | | | | | | | |
| 05824 | 姅 | V3O | V3I | V'2O | V+++ | V[[[ | | | | | |
| 05825 | 妘 | V=S | V2S | | | | | | | | |
| 05826 | 妠 | VUT | VA | | | | | | | | |
| 05827 | 妗 | V8L | V8-L | V8.L | V8J | V8-J | V8.J | | | | |
| 05828 | 妎 | V82 | V8II | V8'I | | | | | | | |
| 05829 | 妢 | V8D | V2D | | | | | | | | |
| 05830 | 妐 | V8S | V2S | | | | | | | | |
| 05831 | 妏 | VTX | | | | | | | | | |
| 05832 | 妧 | V=R | V2R | | | | | | | | |
| 05833 | 妡 | VLT | V''T | | | | | | | | |
| 05834 | 宎 | U'K | .U'K | U-K | .U-K | | | | | | |
| 05835 | 宑 | UEL | U'2L | U'=L | .UEL | U3L | .U3L | | | | |

| | | | | | | | | | | | |
|---|---|---|---|---|---|---|---|---|---|---|---|
| 05836 | 尬 | -R3 | -R.3 | +L.3 | K.3 | .K3 | [L.3 | | | | |
| 05837 | 尪 | -RE | +LE | KE | [LE | | | | | | |
| 05838 | 岍 | E22 | E=2 | E=II | E2'I | E='I | IUHH | IU22 | | | |
| 05839 | 岏 | IU2R | IU=R | \2R | \=R | | | | | | |
| 05840 | 岈 | ECJ' | IUCJ | \CJ' | \CJ | | | | | | |
| 05841 | 岋 | EST- | EST | E'S. | ESX- | ESX | IUST | IUSX | IUS- | IUS | \ST- |
| | | \ST | \'S. | \SX- | \SX | | | | | | |
| 05842 | 岉 | IUC2 | E'C2 | EC'' | EC2 | \'C2 | \C'' | \C2 | | | |
| 05843 | 岭 | E8-L | E8.L | E8L- | E8L | E8-J | E8.J | E8J- | E8J | IU8L | IU8J |
| | | \8-L | \8.L | \8L- | \8L | \8-J | \8.J | \8J- | \8J | | |
| 05844 | 岜 | BLIU | BLE | BL\ | | | | | | | |
| 05845 | 岆 | IU'K | IU-K | IU2T | IU=T | E2T | E=T | \2T | \=T | | |
| 05846 | 岓 | ELT | E''T | IULT | \LT | \''T | | | | | |
| 05847 | 岕 | IU82 | E8'I | E8II | E82 | \8'I | \8II | \82 | | | |
| 05848 | 至 | -3H | | | | | | | | | |
| 05849 | 帊 | EBL | UIBL | | | | | | | | |
| 05850 | 帎 | UIUR | UIER | EUR | EER | | | | | | |
| 05851 | 庋 | L+X | L+-X | .L+X | L[X | L[-X | .L[X | | | | |
| 05852 | 庉 | L-UL | L-EL | L+UL | L+EL | L+L | .L. | L. | L[UL | L[EL | L[L |
| 05853 | 庌 | LCJ' | LCJ | .LCJ | .LJ | | | | | | |
| 05854 | 庈 | L8-L | L8.L | L8L | L8-J | L8.J | L8J | .L8L | .L8J | | |
| 05855 | 庍 | .LLT | LLT | | | | | | | | |
| 05856 | 弁 | 8D20 | 8D++ | 8DH | 2D20 | 2D++ | 2DH | =D20 | =D++ | =DH | 8DX |
| | | 2DX | =DX | 8D[[ | 2D[[ | =D[[ | | | | | |
| 05857 | 弝 | 5BL | | | | | | | | | |
| 05858 | 彸 | 'T8S | 'T2S | ]8S | ]2S | | | | | | |
| 05859 | 彶 | 'TSX | 'TST | 'TS | ]ST | ]SX | ]S | | | | |
| 05860 | 忒 | GM | MG | -L.G | | | | | | | |
| 05861 | 忑 | T.G | -TG | | | | | | | | |
| 05862 | 忐 | T-G | GG | | | | | | | | |
| 05863 | 忭 | I2TT | ITT | ITI. | I.T. | | | | | | |
| 05864 | 忨 | I22R | I2=R | I2R | I=R | | | | | | |
| 05865 | 忮 | I2+X | I+X | I+-X | I2[X | I[X | I[-X | | | | |
| 05866 | 忳 | I2-L | I2+L | I-UL | I-EL | I+EL | I+UL | I+L | I2. | I2[L | I[EL |
| | | I[UL | I[L | | | | | | | | |
| 05867 | 忡 | I2OI | I2OI | I2O | IOI | IOI | IO. | | | | |
| 05868 | 忤 | I2T+ | I2'H | IT+ | I'HI | I'H | I2T[ | IT[ | | | |
| 05869 | 忣 | I2'S | I2ST | I2SX | I'S | IST | ISX | IS | | | |
| 05870 | 忲 | I2UT | I2- | IUT | I- | | | | | | |
| 05871 | 忯 | I2'K | I'K | | | | | | | | |
| 05872 | 忷 | I2XU | I2U | IUX | IXU | | | | | | |
| 05873 | 忻 | I2LT | ILT | I''T | IT | | | | | | |
| 05874 | 怀 | I2-3 | I2T8 | I-3 | IT8 | | | | | | |
| 05875 | 忴 | I28L | I28J | I8-L | I8-J | I8.J | I8.J | | | | |
| 05876 | 戺 | POL | PPL | PCL | 'POL | 'PPL | 'PCL | .POL | .PPL | .PCL | |
| 05877 | 抃 | FTT | FTI. | F.T. | | | | | | | |
| 05878 | 扰 | FUR | FER | | | | | | | | |
| 05879 | 抎 | F=S | F2S | | | | | | | | |
| 05880 | 抏 | F=R | F2R | | | | | | | | |
| 05881 | 抔 | FT8 | F-3 | | | | | | | | |
| 05882 | 抇 | FB | | | | | | | | | |
| 05883 | 扱 | FST | F'S. | FSX | | | | | | | |
| 05884 | 抉 | FUT | F'LT | F'JT | F- | | | | | | |
| 05885 | 抵 | FK | F'K | | | | | | | | |
| 05886 | 抌 | F-R. | F+R. | F[R. | FK. | F.K | | | | | |
| 05887 | 抁 | FSR | | | | | | | | | |
| 05888 | 抈 | FA | | | | | | | | | |
| 05889 | 抶 | F'K | F-K | F2T | F=T | | | | | | |
| 05890 | 扽 | F-UL | F-EL | F+UL | F+EL | F. | F[UL | F[EL | | | |
| 05891 | 拎 | F8-L | F8.L | F8L | F8-J | F8.J | F8J | | | | |
| 05892 | 扴 | F82 | F8II | F8'I | | | | | | | |
| 05893 | 旰 | BHI- | BHI | BH- | BH | B2I- | B2I | B=I- | B=I | B-+- | B-+ |
| | | B--I | B-[ | | | | | | | | |
| 05894 | 旴 | BHJ | B=J | B2J | | | | | | | |
| 05895 | 旳 | B'C. | B'C- | BC. | | | | | | | |
| 05896 | 旲 | BK | | | | | | | | | |
| 05897 | 旵 | BIU | B\ | | | | | | | | |
| 05898 | 杅 | YHJ | Y2J | Y=J | | | | | | | |
| 05899 | 杇 | Y-5 | Y=C | Y2C | Y-S | | | | | | |
| 05900 | 杙 | YM | Y-L. | | | | | | | | |
| 05901 | 杖 | YK | | | | | | | | | |
| 05902 | 杌 | Y-R | Y-'L | | | | | | | | |
| 05903 | 杈 | YX. | Y-X. | | | | | | | | |
| 05904 | 杝 | YJL | Y+L | YLIL | YJIL | Y[L | | | | | |

05905 杍 YZ+- YZ- YZ
05906 杚 YTZ
05907 杋 YR.
05908 毒 HQ- HO+ HO+ +-Q- +-O+ +-O+ IHQ- IHO+ HO[ HO[
[-Q- [-O[ [-O[ IHO[
05909 瓩 7IU T-ZE T-LE TZIU TLIU T-Z\ T-L\ 7\
05910 [illegible] 73 73I 7III 7'II T-Z3 T-L3 TZ3
05911 访 3TD 3D
05912 汧 32HI 3HH 322
05913 讲 322 3=2 3='I 3=II 3#
05914 沄 3=S 32S
05915 沈 3-R. 3+L. 3+R. 3[L. 3[R.
05916 洄 37D 3FD
05917 汱 3.K
05918 汯 3+S 3-'S 3+'S 3[S 3['S
05919 汨 30- 30- 3B
05920 沚 3G 3TI-
05921 汭 3UT
05922 沇 3SR 3S'L
05923 沕 3C'' 3C2
05924 沜 3'LT 3UT 3U-L 3UU 3UL
05925 汦 3CM 3C-L
05926 汳 3LX 3L-X
05927 汥 3+X 3+-X 3[X 3[-X
05928 汻 3'-+ 3'-[ 3'2I 3'=I 3'HI 3T+ 3T[
05929 沘 3TF 3T7
05930 灴 WH W-I-
05931 灺 WLL WJL WLIL WJIL W+L WIL
05932 牣 'FD. 'FD ZD. ZD
05933 犿 ZTT ZTI. Z.T.
05934 犽 ZCJ ZCJ' ZJ
05935 狃 ZC+ ZEI ZL+- ZC[ ZL[-
05936 狆 ZOI ZO ZOI
05937 犹 ZSR ZS'L
05938 犺 ZTR ZT'Z ZT'L
05939 狂 Z'H Z'+- Z'IH Z'[-
05940 玕 E'+ E'-I EHI E'[
05941 玗 E-+ E--I EHI E-[
05942 玓 E'C. E'C- EC-
05943 玔 E3 E3I EIII E'II
05944 玒 EH E-I-
05945 町 QJ Q-J
05946 号 Q5 IQ5 QS IQS QTC IQTC Q-C IQ-C IQC
05947 疔 L-J L2J L2-J
05948 疕 L2F L2-L L2L- L2L' L2'L L27
05949 皁 'B+ 'B[
05950 礽 K'S KS' KS 23'S 23S' 23S -YS' -Y'S -YS =3'S
=3S' =3S
05951 耴 PL -4L 4L
05952 肕 AD. AD
05953 肙 OA'
05954 肐 ATZ AT-L
05955 肍 A9. A9
05956 肜 A3 A3' A'''
05957 芐 HT. H-T ++-T ++T. XT. X-T [[-T [[T.
05958 芏 HIH H+- ++IH +++- XIH X+- H[- [[IH [[[- X[-
05959 芼 ++M H-L. X-L. [[M
05960 芎 H5 HCIC ++5 X5 XCIC [[5
05961 芑 ++CL [[CL HCL XCL
05962 芓 HZ- ++Z- XZ- [[Z-
05963 芊 H'+ ++'+ X'+ H'[ [['[ X'[
05964 芃 HR HR. ++R ++R. XR XR. [[R [[R.
05965 芄 H9. ++9. X9. [[9.
05966 豸 '2Z '3C2
05967 迉 PZ C'Z O'Z
05968 辿 IUZ \Z
05969 邟 TRP
05970 邡 TDP
05971 邶 URP U'LP ERP
05972 邦 =TP 2TP +KP -KP [KP
05973 邧 =RP 2RP
05974 邠 8DP 2DP =DP

| | | | | | | | | | | | |
|---|---|---|---|---|---|---|---|---|---|---|---|
| 05975 | 阰 | PFF | P2F | P77 | P27 | 3IFF | 3I77 | 3I2F | 3I27 | 3I% | P% |
| 05976 | 陑 | PLJL | PLCL | PLL | | | | | | | |
| 05977 | 阯 | PG | PTI- | | | | | | | | |
| 05978 | 阬 | PSR | | | | | | | | | |
| 05979 | 弗 | 002 | 00II | 202I | 00'I | =02I | | | | | |
| 05980 | 侘 | TUHL | TU2L | TU=L | | | | | | | |
| 05981 | 佼 | TT2X | TT8X | | | | | | | | |
| 05982 | 佞 | TTUT | | | | | | | | | |
| 05983 | 佽 | T2UT | | | | | | | | | |
| 05984 | 侀 | T22J | THHJ | | | | | | | | |
| 05985 | 侇 | T-5T | T+5T | TK5 | T[5T | | | | | | |
| 05986 | 佶 | THO | T+-O | TIHO | T[-O | | | | | | |
| 05987 | 佴 | TP | T-4 | | | | | | | | |
| 05988 | 侮 | TK=C | TK2C | TK-S | TK-5 | TK2J | TK=J | TKS | TK5 | TKC | |
| 05989 | 侄 | T-SH | TSH | | | | | | | | |
| 05990 | 侲 | TBK | | | | | | | | | |
| 05991 | 佌 | TGF | TG7 | | | | | | | | |
| 05992 | 侗 | TU-O | TUO | | | | | | | | |
| 05993 | 佪 | TOO | TOO | | | | | | | | |
| 05994 | 侚 | TCB | T'CB | | | | | | | | |
| 05995 | 侻 | TULL | TUL | | | | | | | | |
| 05996 | 侁 | T'HR | THR | | | | | | | | |
| 05997 | 佸 | T'+O | THIO | T-+O | T'[O | T-[O | | | | | |
| 05998 | 侐 | T'4- | T'4 | | | | | | | | |
| 05999 | 併 | T'A- | T'A | TA- | | | | | | | |
| 06000 | 侔 | TST+ | TS'H | TST[ | | | | | | | |
| 06001 | 侞 | TVO | | | | | | | | | |
| 06002 | 侒 | TUVV | T.UV | | | | | | | | |
| 06003 | 侂 | TL2L | TL=L | TLHL | | | | | | | |
| 06004 | 侕 | TTA | TTU2 | | | | | | | | |
| 06005 | 佫 | T'XO | TXO | | | | | | | | |
| 06006 | 佮 | T8-O | | | | | | | | | |
| 06007 | 來 | U2Y | | | | | | | | | |
| 06008 | 冼 | 2'HR | ='HR | 2HR | =HR | | | | | | |
| 06009 | 冾 | 28-O | =8-O | | | | | | | | |
| 06010 | 刵 | PIJ | PJ | -4IJ | -4J | | | | | | |
| 06011 | 刲 | HHIJ | 2IHJ | HHJ | =IHJ | | | | | | |
| 06012 | 刳 | K-5J | K-SJ | K2CJ | K=CJ | K5IJ | K5J | KSIJ | KSJ | KCIJ | KCJ |
| 06013 | 剆 | BSIJ | BSJ | -BSJ | .BSJ | BFIJ | BFJ | .-BFJ | .BFJ | B7IJ | B7J |
| | | -B7J | .B7J | | | | | | | | |
| 6014 | 劶 | 22D2 | HHD2 | =2D2 | ==D2 | #D2 | | | | | |
| 6015 | 劼 | HOC | IHOC | +-OC | [-OC | | | | | | |
| 6016 | 匊 | C2Y | 'C2Y | 'CY | | | | | | | |
| 6017 | 匌 | C'HE | CT+U | CHE | 'CHE | CT[U | C'H\ | CH\ | 'CH\ | | |
| 6018 | 匼 | C8-O | C8O | | | | | | | | |
| 6019 | 厓 | LT+U | L'HE | LT[U | L'H\ | | | | | | |
| 6020 | 厔 | L-SH | LSH | LSIH | | | | | | | |
| 6021 | 咇 | OG' | | | | | | | | | |
| 6022 | 呿 | OHS | OIHS | | | | | | | | |
| 6023 | 咁 | O2O- | O2O= | OH- | OH= | | | | | | |
| 06024 | 咑 | OFJ | OF-J | | | | | | | | |
| 06025 | 咥 | OCE | OCUI | | | | | | | | |
| 06026 | 咈 | O52 | O5II | O5'I | | | | | | | |
| 06027 | 呫 | OTO | OI-O | | | | | | | | |
| 06028 | 咢 | OO-C | OOS | OO5 | | | | | | | |
| 06029 | 咀 | OB- | | | | | | | | | |
| 06030 | 呥 | OU+- | OUIH | OUH | OU[- | | | | | | |
| 06031 | 呬 | OOR | OO2 | OO8 | O4 | | | | | | |
| 06032 | 呴 | O'CO | O'JO | | | | | | | | |
| 06033 | 呦 | ONC | ONC' | | | | | | | | |
| 06034 | 咍 | OSO | | | | | | | | | |
| 06035 | 呯 | O-2+ | OK+ | OH2I | OHI2 | O-2[ | OKL | | | | |
| 06036 | 呡 | OOK | OCK | OOLM | OCLM | | | | | | |
| 06037 | 呠 | OY- | | | | | | | | | |
| 06038 | 咘 | O-'E | O+UI | O[UI | O+'E | O['E | O+E | O[E | | | |
| 06039 | 呣 | OO2- | OO-2 | OO+ | OO[ | OO- | | | | | |
| 06040 | 呧 | OK- | OK. | O'K- | O'K. | OCM- | OCM. | OCM | | | |
| 06041 | 呤 | O8-S | O8S | O8.S | | | | | | | |
| 06042 | 囷 | O'Y | O'Y | O' | O' | | | | | | |
| 06043 | 囹 | O8-S | O8S | O8.S | | | | | | | |
| 06044 | 坯 | H-3- | H23 | H=3 | IH23 | IH=3 | | | | | |
| 06045 | 坲 | H52 | IH52 | H5'I | H5II | H52I | | | | | |
| 06046 | 坭 | HPF | HP-L | HPL- | HPL' | HP'L | IHPF | HP7 | IHP7 | | |
| 06047 | 坫 | HTO | HI-O | IHTO | | | | | | | |

06048 坱 IHUK HUK
06049 垌 HUO IHUO
06050 坶 HO2- HO2- HQ- HO-2 HO-2 HO=- HO=- HO-= HO-=
06051 坪 HAJ H'2J
06052 坵 H'O HLT-
06053 坻 HK- HK. H'K- H'K. HCM- HCM.
06054 坳 HNC HNC' IHNC
06055 坌 H8H HRH
06056 坢 H22O H2++ H22I H2=I H2[[
06057 坨 HUF H.UF HU7 H.U7
06058 坽 H8-S H8.S IH8S
06059 坴 H8X H2X HRX H8'X H2'X HR'X
06060 奅 KPP KC'P
06061 妵 V.E
06062 妹 VY+ V+Y VY- VY VY[ V[Y.
06063 姏 V2O- V2O= VH- VH=
06064 姎 VUK
06065 姐 VB-
06066 姌 VU+- VUIH VUH VU[-
06067 姁 VCO V'CO VJO V'JO
06068 妶 VTN
06069 妼 VG' VG
06070 姃 V-G
06071 姖 VCC VE
06072 妱 VUO VDO
06073 妽 VBI VIQI VQI VO
06074 姀 V'Y V'
06075 姈 V8-S V8.S
06076 婴 ALV AJLV ACLV
06077 妛 TJ.V T+.V T[.V TJV
06078 孢 ZCOL ZCPL ZCCL Z'CL ZUOL ZUPL ZUCL ZUL ZJOL ZJPL ZJCL Z'JL
06079 孥 VXZ VXZ-
06080 宓 UG' .UG'
06081 宕 U-'O UTO .UTO .U+ U+ .U[ U[
06082 屄 PU8 P.U8
06083 屆 PO+ PO+ PQ PO[ PO[
06084 岮 EUF E.UF IUUF EU7 E.U7 IUU7 \UF \.UF \U7 \.U7
06085 岱 EU8 E.U8 IUU8 \U8 \.U8
06086 岠 ECC \CC
06087 岵 E+O IU+O E[O \+O \[O
06088 岯 E-3- E23 E=3 IU23 IU=3 \-3- \23 \=3
06089 岨 IUA- IU4- IU4 \A- \4- \4
06090 岬 EQI IUQI \QI
06091 峡 EUK IUUK \UK
06092 岣 ECO E'CO IUCO EJO E'JO \CO \'CO \JO \'JO
06093 岭 E8-S E8S E8.S IU8S \8-S \8S \8.S
06094 岢 E-JO EJO IUJO \-JO \JO
06095 峀 E52I E5'I E52 IU52 \52I \5'I \52
06096 岧 EUO EDO IUUO IUDO \UO \DO
06097 岩 E'E ETK ET12 ET1= IU'E IUTK \'E \TK \T12 \T1=
06098 峧 IUEX \UIX \EX
06099 岶 IU'B \'B
06100 岰 IUNC ENC' ENC \NC' \NC
06101 岦 ETK IUTK \T2- \TK
06102 帗 E+X. UI+X E[X. UI[X
06103 帔 UIEX
06104 帙 E'2T E'=T E'H8 E'+K E2T E=T EH8 E- UITK UI2T UI=T UIH8 UI- E'[K
06105 弨 5UO 5DO
06106 弢 5EX 5E-X 5IUX
06107 弣 '5TJ. 5TJ
06108 弤 5K- 5K. 5'K- 5'K. 5K
06109 弮 O-3 LL-3 O-4 LL-4
06110 徂 'TA- 'T4- 'T4 ]A- ]4- ]4'
06111 彾 'T8S ]8-S ]8.S
06112 彽 'TK- 'TK. ]'K- ]'K. ]K- ]K. ]K
06113 忢 TXG
06114 忥 7G T-ZG T-LG TZG
06115 怭 I2G' IG'
06116 怦 T2K+ IK+ IH2I IHI2 T2K[ IK[
06117 怙 I2+O I+O I2[O I[O
06118 怲 I2-A I-UT I-A IM
06119 怟 I2OK I2CK IP'M IOLM IOK ICK

| | | | | | | | | | | | |
|---|---|---|---|---|---|---|---|---|---|---|---|
| 06120 | 忮 | I2LM | I2ML | ILM | IML | | | | | | |
| 06121 | 怊 | I2DO | IDO | | | | | | | | |
| 06122 | 怗 | I2TO | ITO | II-O | | | | | | | |
| 06123 | 怳 | IOR | IO'L | I2OR | | | | | | | |
| 06124 | 怚 | I2A- | I24- | IA- | I4- | | | | | | |
| 06125 | 怞 | I2IQ | I2Q | IIQ | | | | | | | |
| 06126 | 怬 | I24 | | | | | | | | | |
| 06127 | 怢 | I2TK | I22T | I2=T | I2H8 | I'+K | I'2T | I'=T | I'H8 | ITK | I2T |
| | | I=T | IH8 | I'[K | I- | | | | | | |
| 06128 | 怍 | I2TK | I2E | ITK | I'E | ITI2 | ITI= | | | | |
| 06129 | 怐 | I2CO | I'CO | ICO | I2JO | I'JO | IJO | | | | |
| 06130 | 怮 | I2NC | INC | | | | | | | | |
| 06131 | 怓 | I2VX | IVX | IV-X | | | | | | | |
| 06132 | 怑 | I22H | I2HI | I22I | I2=I | I2++ | I2[[ | I22X | I2X | | |
| 06133 | 怌 | I223 | I2=3 | I-3- | I23 | I=3 | | | | | |
| 06134 | 怕 | I2UL | I2CL | IUOL | IUPL | IUCL | IUL | ICOL | ICPL | ICCL | ICL |
| | | I'CL | I'JL | IJOL | IJPL | IJCL | IJL | | | | |
| 06135 | 怜 | I8-S | I8.S | | | | | | | | |
| 06136 | 爽 | MM | | | | | | | | | |
| 06137 | 屛 | P2+ | P=+ | 'P2+ | 'P=+ | .P2+ | .P=+ | 'P+ | -.P+ | P+ | P2[ |
| | | P=[ | 'P2[ | 'P=[ | .P2[ | .P=[ | 'P[ | .P[ | P[ | | |
| 06138 | 抗 | F.UR | FU'L | | | | | | | | |
| 06139 | 拙 | FHL | F2OL | | | | | | | | |
| 06140 | 拑 | FH- | FH= | F2O- | F2O= | F++- | F++= | F[[- | F[[= | | |
| 06141 | 抾 | FHS | FIHS | | | | | | | | |
| 06142 | 拂 | F+E | F-'E | F+UI | F[E | F[UI | | | | | |
| 06143 | 抶 | F'2T | F'=T | F'H8 | FTK | F- | | | | | |
| 06144 | 拊 | FTJ | FT-J | FTJ. | | | | | | | |
| 06145 | 抮 | F83 | | | | | | | | | |
| 06146 | 抳 | FPF | FP7 | | | | | | | | |
| 06147 | 抯 | FA- | F4- | | | | | | | | |
| 06148 | 抻 | FIQI | FBI | | | | | | | | |
| 06149 | 抪 | FU+- | FUIH | FUH | FU[- | | | | | | |
| 06150 | 抉 | FUK | | | | | | | | | |
| 06151 | 抸 | F'.Z | FTZ | F'Z | | | | | | | |
| 06152 | 敆 | 8DTX | 2DTX | =DTX | | | | | | | |
| 06153 | 斪 | KLT | UULT | ULLT | UTLT | | | | | | |
| 06154 | 斻 | TDTR | DTR | | | | | | | | |
| 06155 | 昉 | BTD | BD | | | | | | | | |
| 06156 | 旼 | BTX- | BX- | BTX | BX | | | | | | |
| 06157 | 昄 | BLX | | | | | | | | | |
| 06158 | 昒 | BC2- | BC2 | BC'' | BC- | BC | B'C2 | | | | |
| 06159 | 昈 | BP | B'P | B.P | | | | | | | |
| 06160 | 旻 | BTXI | BXI | BTX | BX | | | | | | |
| 06161 | 昃 | BLT | B-'T | | | | | | | | |
| 06162 | 昋 | 'KB | -KB | H8B | 2TB | =TB | | | | | |
| 06163 | 昍 | BO- | BO- | BB- | | | | | | | |
| 06164 | 昅 | .B'S. | BST | BSX | | | | | | | |
| 06165 | 旽 | B-UL | B-EL | B+UL | B+EL | B. | | | | | |
| 06166 | 昑 | B8-L | B8L | B8-J | B8J | B8.L | B8.J | | | | |
| 06167 | 昐 | B8D | B2D | | | | | | | | |
| 06168 | 曶 | C''B | C2B | 'C2B | C=B | 'C=B | | | | | |
| 06169 | 朊 | A2R | A=R | | | | | | | | |
| 06170 | 枅 | Y22 | YHH | | | | | | | | |
| 06171 | 杬 | Y=R | Y2R | | | | | | | | |
| 06172 | 柣 | Y+K | Y-K | Y=T | Y2T | YH8 | Y[K | | | | |
| 06173 | 杍 | YCJ | YCJ' | | | | | | | | |
| 06174 | 杶 | Y-UL | Y-EL | Y+UL | Y+EL | Y[UL | Y[EL | | | | |
| 06175 | 杻 | YEI | YC+ | YL+- | YC[ | YL[- | | | | | |
| 06176 | 枘 | YUT | YA | | | | | | | | |
| 06177 | 枆 | YEL | Y3L | | | | | | | | |
| 06178 | 枃 | YCS | Y'CS | | | | | | | | |
| 06179 | 杴 | YUT | | | | | | | | | |
| 06180 | 柃 | Y8-C | Y8TC | Y85 | Y2-C | Y2TC | Y25 | | | | |
| 06181 | 枌 | Y8D | Y2D | | | | | | | | |
| 06182 | 杺 | YG | | | | | | | | | |
| 06183 | 枟 | Y2S | Y=S | | | | | | | | |
| 06184 | 枑 | Y-O- | Y2O | Y=O | YCC | | | | | | |
| 06185 | 枇 | YLJL | YLCL | YLL | | | | | | | |
| 06186 | 杓 | Y'C2 | Y'C= | YC2 | YC= | | | | | | |
| 06187 | 杼 | Y3J | YEJ | YF | | | | | | | |
| 06188 | 极 | Y'S. | YST | YSX | | | | | | | |
| 06189 | 杸 | YRX | | | | | | | | | |
| 06190 | 杔 | YTF | YT7 | | | | | | | | |

| | | |
|---|---|---|
| 06191 | 柃 | Y8-L Y8L Y8-J Y8J |
| 06192 | 眹 | BUT |
| 06193 | 殀 | -A'K A'K -A-K A-K -A2T -A=T -AH8 A2T A=T AH8 |
| 06194 | 歾 | -AC2 -AC AC2 |
| 06195 | 皆 | FFEL 2FEL FF3L 2F3L 77EL 27EL 773L 273L =FEL =F3L |
| | | =7EL =73L %EL %3L |
| 06196 | 氛 | 7A T-ZA 7UT |
| 06197 | 沓 | ILLB JLLB 4B |
| 06198 | 汏 | 3U88 3.U8 |
| 06199 | 泫 | 3TN |
| 06200 | 泮 | 3220 32H |
| 06201 | 泙 | 3K+ 3H2 3H2I 3K[ |
| 06202 | 泝 | 323 3=3 |
| 06203 | 泔 | 320- 320= 3H- 3H= |
| 06204 | 沭 | 3Y. 3.Y |
| 06205 | 泧 | 3LM 3ML |
| 06206 | 泼 | 3+X. 3[X. |
| 06207 | 泐 | 3PC |
| 06208 | 泂 | 3UO |
| 06209 | 沺 | 3Q |
| 06210 | 泃 | 3CO 3'CO 3'JO |
| 06211 | 泆 | 3'2T 3'=T 3'H8 3TK 3- |
| 06212 | 泭 | 3TJ 3T-J 3TJ. |
| 06213 | 沸 | 3SJ 3SJ' 35J' 35J |
| 06214 | 泒 | 3AS 3LS. |
| 06215 | 泝 | 3LT. |
| 06216 | 沴 | 383 |
| 06217 | 汯 | UR3 UR4 ER3 ER4 |
| 06218 | 林 | I4I4 J4J4 |
| 06219 | 杼 | 3SLJ 3SJJ |
| 06220 | 泞 | 3.UJ 3U-J 3UJ |
| 06221 | 河 | 3J-O |
| 06222 | 洰 | 3CC |
| 06223 | 泍 | 3Y- |
| 06224 | 泇 | 3CO 3C'O 3J'O |
| 06225 | 沰 | 3TO 3-'O |
| 06226 | 泹 | 3B- |
| 06227 | 泏 | 3EE 3UUI 3UIU |
| 06228 | 泩 | 3'E |
| 06229 | 泑 | 3NC' 3NC |
| 06230 | 炔 | WLK WJK |
| 06231 | 炘 | WLT W''T |
| 06232 | 炅 | BWI BW |
| 06233 | 炓 | W2+ W=+ W+ W2[ W=[ W[ |
| 06234 | 炆 | WTX |
| 06235 | 烟 | WC+ WEI WE WC[ |
| 06236 | 炑 | WY |
| 06237 | 炧 | W-UL W-EL W-L W+UL W+EL W[UL W[EL |
| 06238 | 炂 | W2S W8S |
| 06239 | 昳 | BW- BW |
| 06240 | 炃 | 8DW 2DW =DW |
| 06241 | 牉 | 'H'H T+T+ 2T+ 2'H =T+ ='H 'X'X 2'X ='X T[T[ |
| | | 2T[ =T[ |
| 06242 | 狖 | ZU8 Z.U8 |
| 06243 | 狋 | Z23 Z=3 Z--3 Z-Y |
| 06244 | 狘 | ZLM ZML |
| 06245 | 狉 | Z¬3- Z23 Z=3 |
| 06246 | 狜 | Z+O Z[O |
| 06247 | 狒 | Z52 Z5'I Z5II Z52I |
| 06248 | 狔 | ZPF ZP-L ZPL- ZPL' ZP'L ZP7 |
| 06249 | 狚 | ZB- |
| 06250 | 狌 | Z'E |
| 06251 | 狑 | Z8-S Z8S Z8.S |
| 06252 | 玤 | E30 E'20 E'=I E+++ E[[[ |
| 06253 | 玡 | ECJ ECJ' |
| 06254 | 玭 | EFF E2F E77 E27 E% |
| 06255 | 玦 | ELK EJK |
| 06256 | 玢 | E8D E2D |
| 06257 | 玠 | E82 E8'I E8II |
| 06258 | 玥 | EU.- |
| 06259 | 玶 | E'-+ E'-[ E'2I E'=I E'HI ET+ ET[ |
| 06260 | 瓝 | ASC- ASC. ASC |
| 06261 | 瓨 | HCZ- HCZ. H-Z HCZ |

| | | | | | | | | | | | |
|---|---|---|---|---|---|---|---|---|---|---|---|
| 06262 | 町 | Q.C | QTL | | | | | | | | |
| 06263 | 异 | Q20 | Q++ | Q-'I | Q-II | QX | Q[[ | | | | |
| 06264 | 甾 | LLLQ | 3LQ | | | | | | | | |
| 06265 | 逹 | -EG | +EG | [EG | | | | | | | |
| 06266 | 疘 | L2H | .L2H | | | | | | | | |
| 06267 | 訐 | EXHI | EX-+ | EX2I | EX=I | EX-[ | | | | | |
| 06268 | 肛 | 4.C | 4TL | | | | | | | | |
| 06269 | 肟 | 4HJ | 4=J | 42J | | | | | | | |
| 06270 | 肝 | 4HI | | | | | | | | | |
| 06271 | 肐 | 4TZ | 4T-L | | | | | | | | |
| 06272 | 矸 | TOHI | +HI | [HI | | | | | | | |
| 06273 | 矼 | TOH | | | | | | | | | |
| 06274 | 矶 | TO-R | +-R | [-R | | | | | | | |
| 06275 | 矻 | TOTZ | +TZ | [TZ | | | | | | | |
| 06276 | 砒 | TOHL | TO2L | TO=L | +HL | +2L | +=L | [HL | [2L | [=L | |
| 06277 | 矷 | +Z- | +Z | [Z- | [Z | | | | | | |
| 06278 | 衪 | 23+L | -Y+L | =3+L | 23[L | -Y[L | =3[L | | | | |
| 06279 | 礿 | K'C- | K'C. | K'C | KC. | 23'C | 23C. | 23C- | 23C | -Y'C | -YC. |
| | | -YL- | -YC | =3'C | =3C. | =3C- | =3C | | | | |
| 06280 | 秏 | 'Y2L | 'Y=L | 'YHL | 'YL | ''-L | ''+L | 'HL | ''[L | | |
| 06281 | 穸 | U2A | U8A | .U2A | .U8A | | | | | | |
| 06282 | 穻 | .UHI | .U-+ | .U2I | .U=I | U2HI | U8HI | URHI | U2-+ | U8-+ | UR-+ |
| | | U2-[ | U8-[ | UR-[ | U22I | U2=I | U82I | U8=I | UR2I | UR=I | .U-[ |
| 06283 | 竻 | FFC' | FFC | /C' | /C | | | | | | |
| 06284 | 籵 | 2Y+ | =Y+ | 2Y[ | =Y[ | | | | | | |
| 06285 | 紅 | N3-J | N3J | N-J | NJ | | | | | | |
| 06286 | 耵 | PJ | P-J | -4-J | -4J | | | | | | |
| 06287 | 肏 | 8A | | | | | | | | | |
| 06288 | 肮 | ATR | AT'L | | | | | | | | |
| 06289 | 肣 | A8-L | A8-J | A8.L | A8.J | A8L | A8J | | | | |
| 06290 | 肸 | A8+ | A2+ | A8[ | A2[ | | | | | | |
| 06291 | 肵 | ALT | A''T | | | | | | | | |
| 06292 | 肭 | AUT | | | | | | | | | |
| 06293 | 舠 | 'A-D | 'AD | A-D | | | | | | | |
| 06294 | 芆 | ++TX | XTX | [[TX | | | | | | | |
| 06295 | 芃 | HTR | ++TR | XTR | [[TR | | | | | | |
| 06296 | 芄 | H2R | H=R | ++2R | ++=R | X2R | X=R | [[2R | [[=R | | |
| 06297 | 芚 | H-UL | H-EL | H-L | H+UL | H+EL | ++-L | +++L | X-UL | X-EL | X-L |
| | | X+UL | X+EL | H[UL | H[EL | [[-L | [[[L | X[UL | X[EL | | |
| 06298 | 芘 | HFF | H2F | ++FF | ++2F | H77 | H27 | ++77 | ++27 | XFF | X2F |
| | | X77 | X27 | [[FF | [[2F | [[77 | [[27 | ++% | [[% | H% | X% |
| 06299 | 芓 | HE' | ++E' | XE' | [[E' | | | | | | |
| 06300 | 芖 | ++LK | [[LK | ++JK | [[JK | HLK | HJK | XLK | XJK | | |
| 06301 | 芋 | HSJ | HSJJ | ++SJ | XSJ | XSJJ | [[SJ | | | | |
| 06302 | 芮 | HA | HUT | ++A | ++UT | XA | XUT | [[A | [[UT | | |
| 06303 | 芼 | H3L | HEL | ++EL | ++3L | ++L | X3L | XEL | [[EL | [[3L | [[L |
| 06304 | 芞 | ++7 | HT-Z | XT-Z | [[7 | | | | | | |
| 06305 | 芺 | H'K | ++'K | X'K | [['K | | | | | | |
| 06306 | 芴 | HC'' | H'C2 | ++C2 | XC'' | X'C2 | [[C2 | | | | |
| 06307 | 芨 | HSX | HST | ++SX | ++ST | XSX | X'S. | XST | [[SX | [[ST | |
| 06308 | 芵 | HUT | ++UT | ++T | ++- | XUT | X- | [[UT | [[T | [[- | |
| 06309 | 芩 | H8-L | H8-J | H8.L | H8.J | H8J | ++8L | ++8J | X8-L | X8-J | X8.L |
| | | X8.J | X8J | [[8L | [[8J | | | | | | |
| 06310 | 芡 | HW | ++W | XW | [[W | | | | | | |
| 06311 | 芤 | HZL | HZ'L | ++ZL | XZ'L | XZL | [[XL | | | | |
| 06312 | 茇 | +++X | [[[X | H+'X | H['X | H-'X | H+X | H[X | X+'X | X['X | X-'X |
| | | X+X | X[X | | | | | | | | |
| 06313 | 苛 | HCS | H'CS | ++CS | XCS | X'CS | [[CS | | | | |
| 06314 | 芢 | ++T2 | [[T2 | ++T= | [[T= | HT2 | HT= | XT2 | XT= | | |
| 06315 | 虰 | OS-J | OSJ | S-J | OSJ | | | | | | |
| 06316 | 蚪 | OSLI | SLI | OSLI | | | | | | | |
| 06317 | 虭 | OSD | SD | | | | | | | | |
| 06318 | 虮 | OSR | | | | | | | | | |
| 06319 | 豖 | ZL. | | | | | | | | | |
| 06320 | 迊 | TRZ | | | | | | | | | |
| 06321 | 迋 | -+-Z | -[-Z | EZ | | | | | | | |
| 06322 | 迓 | CJZ | CJ'Z | | | | | | | | |
| 06323 | 迆 | -ULZ | -ELZ | +ULZ | +ELZ | [ULZ | [ELZ | | | | |
| 06324 | 迏 | K.Z | .KZ | KZ | | | | | | | |
| 06325 | 迕 | T+Z | 'HIZ | T[Z | | | | | | | |
| 06326 | 迗 | -KZ | 2TZ | =TZ | H8Z | | | | | | |
| 06327 | 邲 | G'P | GP | | | | | | | | |
| 06328 | 邴 | -AP | MP | -UTP | | | | | | | |
| 06329 | 邯 | 20-P | 20=P | H-P | H=P | =0-P | =0=P | | | | |

| | | | | | | | | | | | |
|---|---|---|---|---|---|---|---|---|---|---|---|
| 06330 | 邢 | -3-P | 23P | =3P | | | | | | | |
| 06331 | 邰 | SOP | | | | | | | | | |
| 06332 | 陆 | PHS | PIHS | P+-S | P[-S | | | | | | |
| 06333 | 阽 | PTO | PI-O | | | | | | | | |
| 06334 | 阼 | P'E | PTI2 | PTI= | | | | | | | |
| 06335 | 阺 | P'K- | P'K. | PK- | PK. | | | | | | |
| 06336 | 陃 | P-A | P-UT | | | | | | | | |
| 06337 | 侵 | T-BK | T.BK | | | | | | | | |
| 06338 | 俅 | T-3. | T+3. | T+3 | T-4. | T+4. | T+4 | TL3. | TL3 | TL4. | TL4 |
| 06339 | 俓 | T-3H | T3H | | | | | | | | |
| 06340 | 偃 | TL2K | TL=K | TLK | | | | | | | |
| 06341 | 俉 | T5O | | | | | | | | | |
| 06342 | 俋 | TOBL | | | | | | | | | |
| 06343 | 俱 | TONK | | | | | | | | | |
| 06344 | 俔 | T4R | T4'L | | | | | | | | |
| 06345 | 傅 | TQS | TIQS | TQ-C | | | | | | | |
| 06346 | 俌 | TX+E | TX[E | | | | | | | | |
| 06347 | 倪 | T2OR | T8OR | T2R- | T8R- | T2R | T8R | | | | |
| 06348 | 侳 | TTTH | | | | | | | | | |
| 06349 | 俛 | TUBR | TDBR | | | | | | | | |
| 06350 | 侹 | TZE | | | | | | | | | |
| 06351 | 佰 | T-3O | TT8O | T3O | | | | | | | |
| 06352 | 俘 | TE8L | TE8J | | | | | | | | |
| 06353 | 侫 | T'3V | TAV | | | | | | | | |
| 06354 | 侹 | TEZ | T'HZ | | | | | | | | |
| 06355 | 伭 | T'YS | TYS | | | | | | | | |
| 06356 | 剄 | -3HJ | 3HIJ | | | | | | | | |
| 06357 | 剉 | THIJ | TTHJ | | | | | | | | |
| 06358 | 勀 | +ORC | +RC | [ORC | [RC | | | | | | |
| 06359 | 劬 | 'HOC | | | | | | | | | |
| 06360 | 匧 | CBV | | | | | | | | | |
| 06361 | 尮 | -RUL | RULL | RUL | | | | | | | |
| 06362 | 厗 | LT+ | LT2H | LTK+ | LTH | LT[ | LTK[ | | | | |
| 06363 | 厝 | LK3 | LK.3 | L.K3 | L-R3 | L+L3 | L[L3 | | | | |
| 06364 | 厍 | L+Q+ | LHQ | LQ | L[Q[ | | | | | | |
| 06365 | 匴 | LQH | LQIH | | | | | | | | |
| 06366 | 咟 | O-B- | O2B | O=B | | | | | | | |
| 06367 | 咠 | O-4- | O-4 | | | | | | | | |
| 06368 | 咭 | OHO | O+-O | OIHO | O[-O | | | | | | |
| 06369 | 啞 | O-SH | | | | | | | | | |
| 06370 | 哏 | OBK | | | | | | | | | |
| 06371 | 哃 | OU-O | OUO | | | | | | | | |
| 06372 | 咁 | B458 | | | | | | | | | |
| 06373 | 咷 | OKKL | OKK | O2K | | | | | | | |
| 06374 | 咮 | OTY | O'+Y | O'-Y | O'[Y | | | | | | |
| 06375 | 咩 | OTL+ | OTH | OTL[ | | | | | | | |
| 06376 | 咶 | O'+O | O'[O | | | | | | | | |
| 06377 | 咰 | OCXU | OCUX | OCU | O'CU | | | | | | |
| 06378 | 哆 | OAA | | | | | | | | | |
| 06379 | 咢 | O-4I | O4I | O-4 | | | | | | | |
| 06380 | 呰 | GFO | G7O | | | | | | | | |
| 06381 | 咼 | QUO | AUO | ULUO | | | | | | | |
| 06382 | 咢 | OOHC | OHC | | | | | | | | |
| 06383 | 咤 | OH'F | OHF | OH'7 | OH7 | | | | | | |
| 06384 | 呲 | OGF | OG7 | | | | | | | | |
| 06385 | 哞 | OST+ | OS'H | OST[ | | | | | | | |
| 06386 | 咰 | O'CB | O'JB | OCB | | | | | | | |
| 06387 | 垵 | HUV | H.UV | IHUV | | | | | | | |
| 06388 | 垞 | HUHL | HU2L | HU=L | IHUL | | | | | | |
| 06389 | 垟 | H2EI | H23I | IH2E | | | | | | | |
| 06390 | 垔 | H-SH | HSIH | HSH | IHSH | | | | | | |
| 06391 | 垌 | HU-O | IHUO | | | | | | | | |
| 06392 | 垗 | HKKL | HKK | IHKK | IH2K | | | | | | |
| 06393 | 垝 | HULL | IHUL | | | | | | | | |
| 06394 | 垛 | HS'Y | H'SY | HSY | HRY | IHSY | IHRY | | | | |
| 06395 | 垩 | 4H | -4H | 4IH | -4IH | | | | | | |
| 06396 | 垘 | HTK. | HT.K | IHTK | | | | | | | |
| 06397 | 埤 | HEH | HEIH | IHEH | | | | | | | |
| 06398 | 垙 | H3-R | H3R | IH3R | | | | | | | |
| 06399 | 垥 | H8-O | IH8O | | | | | | | | |
| 06400 | 垚 | HHH | 3IH | | | | | | | | |
| 06401 | 垦 | L-OH | LOH | | | | | | | | |
| 06402 | 豆 | +-OK | HOK | IHOK | [-OK | | | | | | |
| 06403 | 㚈 | TB'X | | | | | | | | | |

| | | | | | | | | | | | |
|---|---|---|---|---|---|---|---|---|---|---|---|
| 06404 | 妻 | KAA | | | | | | | | | |
| 06405 | 姡 | V'+O | ['+O | | | | | | | | |
| 06406 | 婄 | VHO | VIHO | | | | | | | | |
| 06407 | 媪 | V-B- | V2B | V=B | | | | | | | |
| 06408 | 娍 | V+M | VM+ | V[M | VM[ | | | | | | |
| 06409 | 婍 | VK2C | VK=C | VK-S | VK-5 | VK2J | VK=J | VKS | VKC | | |
| 06410 | 姝 | VTY | V'+Y | V'-Y | V'[Y | | | | | | |
| 06411 | 娆 | V'HR | VTTR | VHR | | | | | | | |
| 06412 | 婠 | VULL | VUL | | | | | | | | |
| 06413 | 姼 | V2C. | V2U. | VAA | V2A | | | | | | |
| 06414 | 姶 | V8-O | V8O | | | | | | | | |
| 06415 | 姤 | VL-O | VLO | | | | | | | | |
| 06416 | 姲 | VUV | V.UV | | | | | | | | |
| 06417 | 姷 | V+'A | V+A | V['A | V[A | | | | | | |
| 06418 | 婀 | VU-O | | | | | | | | | |
| 06419 | 婞 | VTCI | VTL+ | VTH | VTL[ | | | | | | |
| 06420 | 姳 | VAO | | | | | | | | | |
| 06421 | 姵 | VR-E | VRUI | VRE | | | | | | | |
| 06422 | 姠 | V'UO | V'O | V'A | | | | | | | |
| 06423 | 娃 | V8E | | | | | | | | | |
| 06424 | 裂 | ADV | -ADV | -AJV | AJV | | | | | | |
| 06425 | 娑 | CCCV | 3CV | | | | | | | | |
| 06426 | 冤 | UKKL | UKK | .UKK | | | | | | | |
| 06427 | 屖 | POE | POUI | | | | | | | | |
| 06428 | 岐 | ETUT | ETT | IUTT | \TUT | \TT | | | | | |
| 06429 | 峘 | E-B- | E2B | E=B | IU2B | \-B- | \2B | \=B | | | |
| 06430 | 峌 | E-SH | ESIH | ESH | IUSH | \-SH | \SIH | \SH | | | |
| 06431 | 峸 | EULL | EUL | EUL- | IUUL | \ULL | \UL | \UL- | | | |
| 06432 | 峋 | E'CB | ECB | IUCB | \'CB | \CB | | | | | |
| 06433 | 峛 | E-AJ | EAIJ | EAJ | IUAJ | \-AJ | \AIJ | \AJ | | | |
| 06434 | 峵 | EULL | EUL | EULI | IUUL | \ULL | \UL | \ULI | | | |
| 06435 | 峚 | EKIH | EKH | IUKH | \KIH | \KH | | | | | |
| 06436 | 峉 | E'XO | EXO | IUXO | \'XO | \XO | | | | | |
| 06437 | 峇 | E8-O | E8O | IU8O | E8OI | \8-O | \8O | \8OI | | | |
| 06438 | 峊 | 'OOE | 'BIU | OOIU | 'OO\ | 'B\ | B\ | | | | |
| 06439 | 峖 | EUV | E.UV | IUUV | \UV | \.UV | | | | | |
| 06440 | 峽 | E-5T | E+5T | EK5 | IUK5 | E[5T | \-5T | \+5T | \K5 | \[5T | |
| 06441 | 峔 | IUHF | IUH7 | EHF | EH7 | \HF | \H7 | | | | |
| 06442 | 峒 | ETU2 | ETA | EM | IUTA | IUM | \TU2 | \TA | \M | | |
| 06443 | 峈 | IUXO | E'XO | EXO | \'XO | \XO | | | | | |
| 06444 | 峆 | IU8O | E8-O | E8O- | E8O | \8-O | \8O- | \8O | | | |
| 06445 | 峎 | EBK | IUBK | \BK | | | | | | | |
| 06446 | 峟 | E+'A | E+A | IU+A | E['A | E[A | IU[A | \+'A | \+A | \['A | \[A |
| 06447 | 峸 | IUDM | EDM | \DM | | | | | | | |
| 06448 | 峑 | L3CL | J3CL | 3-CL | | | | | | | |
| 06449 | 帲 | E222 | E2HH | UI2H | | | | | | | |
| 06450 | 帢 | E8-O | UI8O | | | | | | | | |
| 06451 | 帣 | 2H8E | 2HE | 2HUI | =H8E | =HE | =HUI | | | | |
| 06452 | 帟 | EEUI | 2EUI | =EUI | | | | | | | |
| 06453 | 帤 | VOE | VOUI | | | | | | | | |
| 06454 | 庰 | L2HH | L222 | | | | | | | | |
| 06455 | 庤 | LH-J | LHJ. | LHJ | .LHJ | | | | | | |
| 06456 | 庢 | L-SH | LSH | .LSH | LSIH | | | | | | |
| 06457 | 庛 | LGF | .LGF | LG7 | .LG7 | | | | | | |
| 06458 | 庬 | LKKL | LKK | .LKK | .L2K | | | | | | |
| 06459 | 庥 | LTY | .LTY | | | | | | | | |
| 06460 | 弇 | 8-OH | 8O2O | 8OH | | | | | | | |
| 06461 | 弮 | 2H85 | =H85 | | | | | | | | |
| 06462 | 彖 | O-Z | LL-Z | LLZ | | | | | | | |
| 06463 | 徆 | 'T-4 | ]-4 | ]4 | | | | | | | |
| 06464 | 恋 | Y.G | .YG | | | | | | | | |
| 06465 | 怹 | T+LG | T[LG | | | | | | | | |
| 06466 | 恔 | I2TX | IT2X | ITX | | | | | | | |
| 06467 | 恲 | I22H | I222 | I2HH | I2H | | | | | | |
| 06468 | 悏 | I2K5 | I-5T | I+5T | IK5 | I[5T | | | | | |
| 06469 | 恅 | I2HF | I2H7 | IH'F | IHF | IH'7 | IH7 | | | | |
| 06470 | 恓 | I2-4 | I-4 | | | | | | | | |
| 06471 | 恒 | I2CE | ICE | | | | | | | | |
| 06472 | 恉 | I2FB | I27B | IFB | I7B | | | | | | |
| 06473 | 恫 | I2OO | I2OO | IOO | IOO | | | | | | |
| 06474 | 恌 | I2KK | I2KL | IKKL | IKK | IKL | | | | | |
| 06475 | 恀 | I2AA | I22A | IAA | I2A | | | | | | |
| 06476 | 恂 | I2CB | I'CB | ICB | I2JB | I'JB | IJB | | | | |
| 06477 | 恟 | I2CU | I'CU | ICUX | ICXU | ICU | I2JU | I'JU | IJUX | IJXU | IJU |

| | | |
|---|---|---|
| 06478 | 怴 | TJ.G T+.G T[.G TJG |
| 06479 | 恉 | I2HO IIH1 1+-O I[-O 1HO |
| 06480 | 悇 | I2TY 1TY |
| 06481 | 恦 | I2'A 12UU 1'UU |
| 06482 | 恮 | I28E 18E |
| 06483 | 扂 | 'PTO .PTO |
| 06484 | 扃 | 'PUO .PUO |
| 06485 | 挙 | VXF VXEJ VXJ |
| 06486 | 投 | FT2X FT8X |
| 06487 | 拒 | FCU FE FC2C |
| 06488 | 拵 | F+IZ F-TZ F+Z F[IZ F[Z |
| 06489 | 拘 | F,K2C FK=C FH-S FK-5 FKS FK5 |
| 06490 | 揺 | F-SH FSIH FSH |
| 06491 | 掋 | FBK |
| 06492 | 搯 | F3C FCCC |
| 06493 | 挏 | FU-O |
| 06494 | 挌 | F'XO FXO |
| 06495 | 拶 | FAA F2A F2U. F2C. |
| 06496 | 摻 | F3U. F3C. |
| 06497 | 掋 | FL'K |
| 06498 | 挓 | FUHL |
| 06499 | 拔 | FT'K |
| 06500 | 捭 | F-U3 FYU |
| 06501 | 揖 | FP F-4 F4 |
| 06502 | 挾 | F+'W F['W F+W F[W |
| 06503 | 捱 | FT'H FTE |
| 06504 | 敁 | TOTX |
| 06505 | 毆 | OKTX OKX |
| 06506 | 斲 | COLT COT 'COT JOLT 'JOT |
| 06507 | 斿 | TDTZ TDZ DTZ |
| 06508 | 湘 | -3B .3B -4B .4B |
| 06509 | 昡 | BTN |
| 06510 | 晞 | B52 B5'I B5II B52I |
| 06511 | 昵 | BPF BP7 |
| 06512 | 昜 | B-C B-C2 |
| 06513 | 昪 | BK2 B-82 BK'I BKII |
| 06514 | 昢 | BUIU BIUU B2IU B\\ B2\ |
| 06515 | 昳 | B'2T B'=T B'H8 BTK |
| 06516 | 昫 | BCO B'CO BJO B'JO |
| 06517 | 昺 | B-UT |
| 06518 | 昝 | ATB U.TB C.TB |
| 06519 | 昴 | BPP BC'P |
| 06520 | 眿 | B-3 B.3 B.4 B.L3 B.L4 B.J3 B.J4 |
| 06521 | 昱 | BHC' BHC |
| 06522 | 朏 | AUIU AIUU A2IU A\\ A2\ |
| 06523 | 朐 | A'CO ACO A'JO AJO |
| 06524 | 柁 | YUF Y.UF YU7 Y.U7 |
| 06525 | 柲 | YG' |
| 06526 | 柈 | Y22O Y2++ Y22I Y2=I Y2H Y2X Y2[[ |
| 06527 | 株 | YY+ YY- Y+Y YY[ Y[Y |
| 06528 | 柜 | YCC |
| 06529 | 枻 | Y2OL YHL |
| 06530 | 柾 | Y-3- Y23 Y=3 |
| 06531 | 柘 | YTO Y-'O |
| 06532 | 柀 | YEX YUIX YE-X |
| 06533 | 枷 | YCO YC'O YJ'O |
| 06534 | 柅 | YPF YP7 |
| 06535 | 柫 | Y52 Y5'I Y5II Y52I |
| 06536 | 柤 | YA- Y4- |
| 06537 | 柟 | YUIH YU+- YUH YU[- |
| 06538 | 柯 | YOS YO5 YO-C YO-J |
| 06539 | 柍 | YUK |
| 06540 | 枳 | YO2 YO'. YO8 |
| 06541 | 柷 | YOR YO'L |
| 06542 | 柶 | Y4 YOR YO'L |
| 06543 | 柮 | YUIU YIUU Y2IU Y\\ Y2\ |
| 06544 | 柣 | Y'2T Y'=T Y'H8 YTK |
| 06545 | 枸 | YT+L YTL YT[L |
| 06546 | 柂 | YUOL YUPL YUCL YUL YCOL YCPL YCCL Y'CL YJOL YJPL YJCL Y'JL |
| 06547 | 柎 | YT-J YTJ. YTJ |
| 06548 | 柧 | YAS YLS. |
| 06549 | 柰 | Y23 Y-Y |

| | | |
|---|---|---|
| 06550 | 龚 | SOY |
| 06551 | 栿 | Y.U8 YU8 |
| 06552 | 柆 | YTK YT2- |
| 06553 | 柭 | Y+X. Y[X. |
| 06554 | 桐 | YC-O YJ-O |
| 06555 | 枮 | YTO YI-O |
| 06556 | 柦 | YB-- YB- |
| 06557 | 柛 | YIQI YOI Y8I |
| 06558 | 枴 | YO'C YOD |
| 06559 | 柉 | YTZ Y'.Z Y'Z |
| 06560 | 栘 | Y'X2 YX2 YX.' Y'X= YX= |
| 06561 | 柃 | Y8-S Y8-P Y8P Y8.S Y8.I. |
| 06562 | 柪 | YNC' YNC |
| 06563 | 柒 | TMY |
| 06564 | 钦 | COUT COT 'CO- CO- JOUT JOT 'JO- JO- |
| 06565 | 殂 | -AA- AA- -A4- -A4 A4- A4 |
| 06566 | 殄 | -A83 -A3 |
| 06567 | 毁 | .ERX |
| 06568 | 虒 | FFG' 2FG' FFG 2FG 77G' 27G' 77G =FG' =FG =7G' %G' %G |
| 06569 | 毙 | QFFI Q2FI QFF Q2F Q77I Q27I Q77 Q27 Q%I Q% |
| 06570 | 氇 | CO3L COEL |
| 06571 | 氠 | T-ZO 7IQI 7BI |
| 06572 | 氱 | TZX2 TZX= TLX2 TLX= 7'X2 7'X= 7X2 7X= |
| 06573 | 泧 | 3T2X 3T8X |
| 06574 | 洴 | 3222 32HH |
| 06575 | 洭 | 3CE |
| 06576 | 洟 | 3-5T 3K5 |
| 06577 | 洼 | 32IH 3HH |
| 06578 | 洿 | 3K2C 3K-S 3KC 3KS |
| 06579 | 洒 | 3-O2 3-OR 3-O2 3-OR 3-4 |
| 06580 | 洊 | 3+IZ 3-TZ 3[IZ |
| 06581 | 泚 | 3GF 3G7 |
| 06582 | 洳 | 3VO |
| 06583 | 洄 | 3OO 3OO |
| 06584 | 洙 | 3'+Y 3TY 3'-Y 3'[Y |
| 06585 | 洛 | 3AO |
| 06586 | 洚 | 3'XH 3XH |
| 06587 | 洑 | 3TK. 3T.K |
| 06588 | 洅 | 3'A- 3'A |
| 06589 | 洝 | 3UV 3.UV |
| 06590 | 浂 | 32H8 322T 32=T 38H8 382T 38=T 32-K 38-K |
| 06591 | 洁 | 3IHO 3+-O 3HO 3[-O |
| 06592 | 洘 | 3H'5 3H'S |
| 06593 | 浭 | 3-SH 3SH |
| 06594 | 浃 | 3+W 3-'W 3[W |
| 06595 | 洏 | 3TA 3TU2 3M |
| 06596 | 浀 | 3OH 3OH |
| 06597 | 洇 | 3OK |
| 06598 | 浲 | 3S'H 3ST+ 3ST[ |
| 06599 | 渢 | 3R-A 3RA |
| 06600 | 洈 | 3ULL |
| 06601 | 洢 | 3TE' |
| 06602 | 洉 | 3L-O 3LO |
| 06603 | 洐 | 3T=J 3'TJ 3]2J 3]=J 3]J |
| 06604 | 炷 | W.E |
| 06605 | 炟 | WB- |
| 06606 | 炾 | WOR WO'L |
| 06607 | 炱 | SOW |
| 06608 | 炰 | UOL4 UPL4 UCL4 UL4 COL4 CPL4 CCL4 CL4 'CL4 JOL4 JPL4 JCL4 JL4 'JL4 |
| 06609 | 炡 | W-G WG |
| 06610 | 炴 | WUK |
| 06611 | 炵 | W'X2 WX2 WX= WX.. |
| 06612 | 炩 | W8-S W8.S |
| 06613 | 牁 | UUJO ULJO UTJO |
| 06614 | 牂 | UU2H UL2H UT2H K22O K2++ K22I K2=I K2H K2X K2[I |
| 06615 | 牊 | UUDO ULDO UTDO |
| 06616 | 牫 | 'FSJ 'FJ ZSJ' ZSJ |
| 06617 | 牰 | 'FIQ 'FQ ZIQ ZQ |
| 06618 | 牳 | 'FQ- 'FQ ZO2- ZO=- ZO-2 ZO-= ZQ- ZO2- ZO=- ZO-2 ZO-= |
| 06619 | 窂 | TM'H TMT+ TMH TMT[ |
| 06620 | 昊 | 4K. 4.K |

| | | | | | | | | | | | |
|---|---|---|---|---|---|---|---|---|---|---|---|
| 06621 | 狤 | Z+-O | ZIHO | ZHO | Z[-O | | | | | | |
| 06622 | 狓 | Z+M | ZM+ | Z[M | ZM[ | | | | | | |
| 06623 | 猪 | ZH'F | ZHF | ZH'7 | ZH7 | | | | | | |
| 06624 | 狟 | Z-B- | Z2B | Z=B | | | | | | | |
| 06625 | 狪 | ZU-O | | | | | | | | | |
| 06626 | 猯 | Z2U2 | Z2U= | ZUU2 | ZUU= | | | | | | |
| 06627 | 狣 | ZKKL | ZKK | ZKL | | | | | | | |
| 06628 | 玅 | TN3' | TN3 | | | | | | | | |
| 06629 | 珌 | EG' | | | | | | | | | |
| 06630 | 珂 | E-JO | EJO | | | | | | | | |
| 06631 | 珈 | ECO | EC'O | EJ'O | | | | | | | |
| 06632 | 珅 | EIQI | EOI | EBI | | | | | | | |
| 06633 | 玹 | ETN | | | | | | | | | |
| 06634 | 玶 | EK+ | EH2I | EHI2 | EHI8 | EH2 | EK[ | | | | |
| 06635 | 玵 | EH2 | EH= | E++- | E[[- | E2O- | EH- | | | | |
| 06636 | 玴 | E2OL | EHL | | | | | | | | |
| 06637 | 玧 | ETSR | ETR | | | | | | | | |
| 06638 | 玿 | EUO | EDO | | | | | | | | |
| 06639 | 珇 | EA- | E4- | | | | | | | | |
| 06640 | 玾 | EQI | EQ | | | | | | | | |
| 06641 | 珃 | EU+- | EUH | EU[- | | | | | | | |
| 06642 | 珆 | ESO | | | | | | | | | |
| 06643 | 玸 | EUOL | EUPL | EUCL | EUL | ECOL | ECPL | ECCL | ECL | E'CL | EJOL |
| | | EJPL | EJCL | EJL | E'JL | | | | | | |
| 06644 | 珋 | EC'P | EPP | | | | | | | | |
| 06645 | 瓬 | TD-Z | TDCZ | TDZ | D-Z | DCZ | | | | | |
| 06646 | 瓫 | 8S-Z | 8SCZ | 2S-Z | 2SCZ | 8SZ | 2SZ | =S-Z | =SCZ | =SZ | |
| 06647 | 畗 | C2UH | C2A | 'C2A | | | | | | | |
| 06648 | 畇 | QC2 | QC= | QC-- | QC.. | Q'C2 | Q'C= | | | | |
| 06649 | 畈 | QL-X | QLX | | | | | | | | |
| 06650 | 疧 | L2'K | | | | | | | | | |
| 06651 | 疪 | 9EAF | | | | | | | | | |
| 06652 | 癸 | WR-X | WRX | WX | | | | | | | |
| 06653 | 盄 | SI4- | SI4 | | | | | | | | |
| 06654 | 眈 | 4UR | 4U'L | 4ER | 4E'L | | | | | | |
| 06655 | 眃 | 42S | 4=S | 4--S | | | | | | | |
| 06656 | 眄 | 4TLJ | 4GJ | | | | | | | | |
| 06657 | 眅 | 4L-X | 4LX | | | | | | | | |
| 06658 | 眊 | 4EL | 4'2L | 4'=L | | | | | | | |
| 06659 | 盷 | 4'C2 | 4'C= | 4'J2 | 4'J= | 4C2 | 4C= | | | | |
| 06660 | 盻 | 48S | 48-C | 42-C | 42S | | | | | | |
| 06661 | 盺 | 4LT | | | | | | | | | |
| 06662 | 矧 | TKSI | H8SI | HSI | | | | | | | |
| 06663 | 矨 | TK'K | TK-K | TK2T | TK=T | | | | | | |
| 06664 | 砄 | TO+K | TOH8 | TO2T | TO=T | ++K | +H8 | TO[K | [[K | [H8 | |
| 06665 | 砑 | TOCJ | +CJ | +J | [CJ | [J | | | | | |
| 06666 | 砒 | TOFF | TO2F | TOF | +FF | +2F | TO77 | TO27 | +77 | +27 | [FF |
| | | [2F | [77 | [27 | TO% | +% | [% | | | | |
| 06667 | 砅 | TO3- | TO4- | TO3 | TO4 | +3- | +3 | +4 | +ILL | +JLL | [3- |
| | | [3 | [4 | [ILL | [JLL | | | | | | |
| 06668 | 破 | TOSX | TOS | +'S. | +'SX | +ST | +SX | ['S. | ['SX | [ST | [SX |
| 06669 | 砏 | TO8D | TO2D | +8D | +2D | [8D | [2D | | | | |
| 06670 | 砎 | TO82 | +8'I | +82I | +8II | +82 | [8'I | [82I | [8II | [82 | |
| 06671 | 砉 | 3OTO | 3O+ | 3ITO | 3I+ | 3O[ | 3I[ | | | | |
| 06672 | 研 | +U-. | +U.- | TOA- | +A- | [U-. | [U.- | [A- | | | |
| 06673 | 砓 | TORX | +RX | [RX | | | | | | | |
| 06674 | 祊 | KTD | 23TD | -YTD | =3TD | | | | | | |
| 06675 | 祌 | 23OI | 23OI | 23O | -YOI | -YOI | -YO | =3OI | =3OI | =3O | |
| 06676 | 祋 | KRX | KR-X | 23RX | 23X | -YRX | -YX | =3RX | =3X | | |
| 06677 | 祅 | 99E8 | | | | | | | | | |
| 06678 | 祄 | 2382 | =382 | -Y82 | K82 | | | | | | |
| 06679 | 秕 | 'YFF | 'Y2F | 'YF- | 'Y77 | 'Y27 | 'Y7- | 'FF | '2F | '77 | '27 |
| | | 'Y% | '% | | | | | | | | |
| 06680 | 种 | 'Y,OI | 'YOI | 'YO | 'OI | 'OI | 'O | | | | |
| 06681 | 秏 | 'YEL | 'Y3L | 'EL | '3L | | | | | | |
| 06682 | 秖 | 'Y'K | 'YCM | ''K | 'CM | | | | | | |
| 06683 | 秎 | 'Y8D | 'Y2D | '8D | '2D | | | | | | |
| 06684 | 窀 | U2-L | U8-L | UR-L | U-UL | U+UL | U-EL | U+EL | U+L | U[UL | U[EL |
| | | U[L | U2. | U8. | UR. | | | | | | |
| 06685 | 穾 | U2'K | U8'K | U2-K | U8-K | | | | | | |
| 06686 | 竑 | TK+S | T+S | TK[S | T[S | | | | | | |
| 06687 | 竻 | FF.C | FFTL | /.C | /TL | | | | | | |
| 06688 | 竿 | FFH | /H | | | | | | | | |

06689 籺 2YTZ =YTZ
06690 粇 2YXZ 2YZX 2YZ+ 2Y+Z YXZ YZX TZ+ =YXZ =YZX =YZ+
=Y+Z 2YZ[ 2Y[Z =YZ[ =Y[Z
06691 敉 2YV =YV
06692 籿 2Y+. 2YJ. 2YJ =Y+. =YJ. =YJ
06693 粀 2Y+X 2Y+. 2Y[X 2Y[. =Y+X =Y+. =Y[X =Y[.
06694 粁 2Y'+ 2YHI Y'+ =Y'+ =YHI 2Y'[ Y'[ =Y'|
06695 紃 N'II NIII N31 N331 N33
06696 紈 N39. N39 N9. N9
06697 紋 N3X. N3X NX.
06698 粜 4-3 4T8
06699 粪 2EU. 2E9 =EU. =E9
06700 [illegible] K2EI K2E
06701 羾 2C2H EEH =C2H
06702 耇 H'CO
06703 耎 TU2K TAK MK
06704 耏 TA3
06705 耔 =YZ- =YZ
06706 聿 K-4
06707 肱 ATN
06708 胇 A52 A5'I A5II
06709 胠 AIHS AHS
06710 胑 AO2 AO'. AO8
06711 肢 A+X. A[X.
06712 胂 ABI AIQI
06713 胐 B4F9
06714 胅 A'+K A'-K A'2T A'=T A'H8 ATK A'[K
06715 胞 AT+L ATLL ATJL ATL AT[L
06716 胙 ATI2 ATI=
06717 胜 A'E A'IE AE
06718 朐 B4FA
06719 胕 AT-J ATJ. ATJ
06720 胉 A'B AB
06721 胏 ASJ' ASJ
06722 胗 A83
06723 胦 AUK
06724 胍 AAS ALS.
06725 臿 '+; '+EE '[; '[EE
06726 舡 'A-H 'AH A-H
06727 舛 3U' 3E'
06728 苙 ++TK HT2- HTK XT2- XTK [[TK
06729 苰 ++G' HG' XG' [[G'
06730 苹 ++K+ ++H2 HK+ HH2I HH12 XK+ XH2I XH12 XH2 [[K[
[[H2 HK[ XK[
06731 苃 H+X. X+X. H[X. X[X.
06732 苊 ++PF HPF ++P7 HP7 XPF XP7 [[PF [[P7
06733 茆 ++52 H52 H5'I H5II H52I X52 X5'I X5II X52I [[52
06734 苔 ++DO ++UO HDO HUO XDO XUO [[DO [[UO
06735 苵 HTSR XTSR
06736 茴 ++TO HI-O HTO XI-O XTO [[TO
06737 苗 ++IQ HIQ XIQ [[IQ
06738 苷 ++A- ++4- HA- H4- XA- X4- [[A= [[4-
06739 苬 ++OT ++OT HOT HOT XOT XOT [[OT [[OT
06740 苡 HL.T XL.T
06741 苼 ++'E HTI2 HTI= H'E XTI2 XTI= X'E [['E
06742 茣 ++TK ++- HTK H'+K H'H8 H'=T H'2T XTK X'+K X'H8
X'=T X'2T [[TK [[- H'[K X'[K
06743 茌 ++TH HT+- HTIH HTH XT+- XTIH XTH [[TH HT[- XT[-
06744 苻 ++TJ HT-J HTJ. HTJ XT-J XTJ. XTJ [[TJ
06745 苶 ++83 H83 X83 [[83
06746 茳 ++5S [[5S H5S X5S
06747 茼 ++-A H-UT H-A X-UT X-A [[-A
06748 茥 ++3- [[3- H-3- X-3- H23 H=3 X23 X=3
06749 茛 ++OK ++CK HCLM HP'M HCK XCLM XP'M XCK XOK [[OK
[[CK
06750 茝 ++Q- HO2- HO2- HQ- XO2- XO2- XQ- HO-2 HO-2 XO-2
XO-2 [[Q-
06751 茡 ++X2 ++X= H'X2 H'X= HX= HX2 X'X2 X'X= XX= XX2
[[X2 [[X=
06752 茐 ++NC [[NC HNC XNC
06753 虷 OSHI OS-+ OS2I OS=I SHI S-+ S2I S=I OSHI OS-+
OS2I OS=I OS-[ S-[ OS-[
06754 虴 OSHL OS2L OS=L S'-L SHL S2L S=L OSHL OS2L OS=L

| | | | | | | | | | | | |
|---|---|---|---|---|---|---|---|---|---|---|---|
| 06755 | 虼 | OSTZ | OSTZ | STZ | | | | | | | |
| 06756 | 虳 | OSC. | SC. | OSC. | | | | | | | |
| 06757 | 扁 | .C'4 | .C4- | TL4- | TL'4 | C4- | C'4 | | | | |
| 06758 | 衎 | 'THJ | 'TJJ | THJJ | TJJ | ]HJJ | ]2JJ | ]=JJ | | | |
| 06759 | 衦 | KHI | K-+ | K2I | K=I | K-[ | | | | | |
| 06760 | 衪 | KJIL | KLIL | K+L | K[L | | | | | | |
| 06761 | 衩 | K-X. | KX. | KX | | | | | | | |
| 06762 | 觓 | UALI | UAUI | UAU | | | | | | | |
| 06763 | 旭 | 940 | 9; | 9T20 | 9T=0 | | | | | | |
| 06764 | 訇 | 'C40 | C40 | C; | | | | | | | |
| 06765 | 赵 | HGC' | HGC | | | | | | | | |
| 06766 | 迣 | 2OLZ | HLZ | =OLZ | | | | | | | |
| 06767 | 迡 | PFZ | P7Z | | | | | | | | |
| 06768 | 迋 | TI2Z | TI=Z | 'EZ | TKZ | | | | | | |
| 06769 | 坫 | I-OZ | TOZ | | | | | | | | |
| 06770 | 郱 | 2HHP | 222P | =HHP | =22P | ===P | | | | | |
| 06771 | 邽 | 2IHP | 2HP | HHP | =IHP | =HP | | | | | |
| 06772 | 郣 | H-JP | HJ.P | HJP | | | | | | | |
| 06773 | 郿 | DMP | LCMP | LJMP | MDP | | | | | | |
| 06774 | 郅 | -SHP | SHP | | | | | | | | |
| 06775 | 郲 | '+YP | '-YP | TYP | '[YP | | | | | | |
| 06776 | 郇 | CBP | 'CBP | | | | | | | | |
| 06777 | 郋 | '43I | '4P | | | | | | | | |
| 06778 | 郈 | L-OP | LOP | | | | | | | | |
| 06779 | 釔 | 8E2Z | 8K-L | 8KZ | $-L | $Z | 6-L | 6Z | | | |
| 06780 | 釓 | 8KL | $L | 6L | | | | | | | |
| 06781 | 陜 | PTUT | PTT | | | | | | | | |
| 06782 | 陏 | P+A | P+'A | P[A | P['A | | | | | | |
| 06783 | 陑 | PTU2 | PTA | | | | | | | | |
| 06784 | 陓 | PK2C | PK=C | PK-S | PK-5 | PK2J | PK=J | PKC | PKS | PK5 | |
| 06785 | 陊 | PAA | P2A | | | | | | | | |
| 06786 | 陎 | P'-Y | P'+Y | PTY | P'[Y | | | | | | |
| 06787 | 倞 | TTO3 | TT3 | | | | | | | | |
| 06788 | 俥 | TTT+ | TT4+ | TTT[ | TT4[ | | | | | | |
| 06789 | 倪 | TUAL | | | | | | | | | |
| 06790 | 俠 | TWW | T2W | | | | | | | | |
| 06791 | 偅 | T-EG | T+EG | T[EG | | | | | | | |
| 06792 | 俊 | TH2X | TH8X | THRX | THX | | | | | | |
| 06793 | 倛 | TH2K | TH=K | TH22 | TH=2 | TH28 | TH=8 | | | | |
| 06794 | 俵 | TE'K | TEK | | | | | | | | |
| 06795 | 儀 | TMM | T2M | | | | | | | | |
| 06796 | 停 | T-OJ | T+OJ | T-EJ | TOEJ | TOEJ | T[OJ | | | | |
| 06797 | 倴 | TK23 | TK=3 | TK-Y | | | | | | | |
| 06798 | 倬 | TTB+ | TTB[ | | | | | | | | |
| 06799 | 傲 | TG3X | TTYX | | | | | | | | |
| 06800 | 俷 | TABL | | | | | | | | | |
| 06801 | 倗 | TAA | T2A | T2U2 | T2U= | | | | | | |
| 06802 | 倜 | TUHO | | | | | | | | | |
| 06803 | 倕 | TTHH | TTTE | TTE | T'E | | | | | | |
| 06804 | 倷 | TU23 | TU=3 | TU-Y | | | | | | | |
| 06805 | 侇 | T2GM | T2MG | TEGM | TGM | TMG | | | | | |
| 06806 | 倯 | TY2S | TY8S | TYS | | | | | | | |
| 06807 | 倔 | TBFF | TB2F | TBF | TB77 | TB27 | TB7 | TB% | | | |
| 06808 | 倎 | TOH2 | TOH8 | TUHK | TQ2 | TQ8 | | | | | |
| 06809 | 党 | 3UOR | | | | | | | | | |
| 06810 | 孱 | OB2J | OB=J | OBHJ | OBJ | | | | | | |
| 06811 | 搆 | EEUH | EU+- | EUH | EU[- | EEA | | | | | |
| 06812 | 清 | 2EA | 2IEA | =EA | =IEA | | | | | | |
| 06813 | 湊 | 2-EV | 2+EV | =-EV | =+EV | 2+V | =+V | 2[EV | =[EV | 2[V | =[V |
| 06814 | 涸 | 20+0 | 20+0 | 200 | 200 | =0+0 | =0+0 | =00 | =00 | 20[0 | 20[0 |
| | | =0[0 | =0[0 | | | | | | | | |
| 06815 | 淨 | 2AEJ | 2AJ | =AEJ | =AJ | | | | | | |
| 06816 | 淦 | 28E2 | 28K | 2$ | 26 | =8E2 | =8K | =$ | =6 | | |
| 06817 | 焧 | WWIJ | WWJ | 2WIJ | =WIJ | 2WJ | =WJ | | | | |
| 06818 | 剸 | -OJJ | +OJJ | -EJJ | +EJJ | [OJJ | [EJJ | | | | |
| 06819 | 剻 | HHBJ | HBIJ | HBJ | | | | | | | |
| 06820 | 剷 | KJOJ | KJIJ | KJJ | | | | | | | |
| 06821 | 剫 | 4XIJ | 4XJ | | | | | | | | |
| 06822 | 剛 | EEIJ | EEJ | 2EIJ | 2EJ | | | | | | |
| 06823 | 剢 | ZL.J | ZLIJ | ZLJ | | | | | | | |
| 06824 | 勆 | TO3C | T3C | T3C' | | | | | | | |
| 06825 | 匎 | 'CKL | 'JKL | CKQL | CKL | | | | | | |
| 06826 | 厞 | LEE | L2E | | | | | | | | |

| | | | | | | | | | | | |
|---|---|---|---|---|---|---|---|---|---|---|---|
| 06827 | 吵 | 033' | 033 | | | | | | | | |
| 06828 | 呯 | OE2O | OE++ | OEH | OEX | OE[[ | | | | | |
| 06829 | 呲 | OIHG | OHG | | | | | | | | |
| 06830 | 哂 | O-Q | O9 | | | | | | | | |
| 06831 | 哧 | OH22 | OH4 | | | | | | | | |
| 06832 | 哳 | OFLT | OFT | | | | | | | | |
| 06833 | 咆 | O+L3 | O-R3 | OK.3 | O.K3 | OK3 | O[L3 | | | | |
| 06834 | 喓 | OEUX | | | | | | | | | |
| 06835 | 谺 | COJO | COJ | JOJ | | | | | | | |
| 06836 | 唄 | O42- | O48- | O42 | O48 | | | | | | |
| 06837 | 唈 | OOBL | OOL | | | | | | | | |
| 06838 | 呢 | OOG | | | | | | | | | |
| 06839 | 唑 | OTTH | O2TH | | | | | | | | |
| 06840 | 唅 | O8LO | O8JO | O.LO | O.JO | | | | | | |
| 06841 | 哱 | O+UZ | O+Z- | O+Z | O[UZ | O[Z- | O[Z | | | | |
| 06842 | 唊 | OKTT | OK2T | OKT | O-3T | | | | | | |
| 06843 | 啤 | OB-+ | OB-[ | OB2I | OB=I | OBHI | OBH | | | | |
| 06844 | 哷 | O'3J | OA+. | OA[. | OAJ. | OAJ | | | | | |
| 06845 | 咹 | OAV | O'3V | | | | | | | | |
| 06846 | 哠 | O'HO | OHO | | | | | | | | |
| 06847 | 唎 | O'YJ | OYIJ | OYJ | O'IJ | O'J | | | | | |
| 06848 | 唃 | OUUH | ODUH | OUA | ODA | | | | | | |
| 06849 | 唋 | O8H3 | O823 | O8=3 | O8-Y | O83 | O8Y | | | | |
| 06850 | 圕 | OT2O | OT=O | O; | | | | | | | |
| 06851 | 國 | OZ | OZL | | | | | | | | |
| 06852 | 堖 | H-BK | H.BK | IH-K | IH.K | | | | | | |
| 06853 | 堅 | BSPH | BFPH | BPH | | | | | | | |
| 06854 | 埕 | HO'H | HOE | | | | | | | | |
| 06855 | 埒 | HU2J | HC2J | HAJ | H'3J | IHAJ | | | | | |
| 06856 | 垺 | H'3Z | HAZ- | HAZ | IHAZ | | | | | | |
| 06857 | 埆 | HUUH | HUA | IHUA | | | | | | | |
| 06858 | 堊 | 3LTH | | | | | | | | | |
| 06859 | 堡 | 'TXH | TRXH | ]RXH | | | | | | | |
| 06860 | 墝 | HU2R | HU=R | HUR | IHUR | | | | | | |
| 06861 | 埣 | HT2H | IHTH | | | | | | | | |
| 06862 | 垿 | HLSJ | HLJ | | | | | | | | |
| 06863 | 埇 | HSUH | HSA | IHSA | | | | | | | |
| 06864 | 埁 | IHEX | HEUX | | | | | | | | |
| 06865 | 垹 | HE'P | HEP | | | | | | | | |
| 06866 | 埗 | IHEL | IHEJ | HE8L | HE8J | IH\L | IH\J | H\8L | H\8J | | |
| 06867 | 壄 | TTHX | 2THX | =THX | | | | | | | |
| 06868 | 墺 | LHHK | HHLK | 2HLK | =HLK | | | | | | |
| 06869 | 娙 | V-3H | V3H | | | | | | | | |
| 06870 | 妮 | VOTT | VOG | | | | | | | | |
| 06871 | 娭 | VS2T | VS=T | VSH8 | VSTK | VSK | | | | | |
| 06872 | 姞 | VT2O | VT=O | V4O | V; | | | | | | |
| 06873 | 娽 | VYO | VYO | | | | | | | | |
| 06874 | 㚿 | VK.3 | V.K3 | VK3 | | | | | | | |
| 06875 | 姡 | V'HZ | VEZ | | | | | | | | |
| 06876 | 娊 | V4R | | | | | | | | | |
| 06877 | 媛 | V'3V | VAV | | | | | | | | |
| 06878 | 㛤 | V'YJ | VYIJ | VYJ | V'IJ | V'J | | | | | |
| 06879 | 孭 | -3VZ | 3VZ | 3VZ- | | | | | | | |
| 06880 | 宫 | UC2O | | | | | | | | | |
| 06881 | 宭 | UE'O | | | | | | | | | |
| 06882 | 宬 | ULJM | ULCM | .UDM | .UMD | UDM ' | UMD | | | | |
| 06883 | 峷 | +A.J | +AJ | [A.J | [AJ | | | | | | |
| 06884 | 厚 | PT2H | PTH | | | | | | | | |
| 06885 | 屔 | 'OPF | 'OP7 | | | | | | | | |
| 06886 | 峭 | E+A. | IU+A | E[A. | IU[A | \+A. | \[A. | | | | |
| 06887 | 峈 | IU5O | E5O | \5O | | | | | | | |
| 06888 | 峼 | EE'O | EEO | IUEO | \E'O | \EO | | | | | |
| 06889 | 狤 | ZEIE | ZC+E | ZEE | .ZEIU | ZC[E | ZEI\ | ZC+\ | ZE\ | ZC[\ | |
| 06890 | 崋 | ET2H | ETH | IUTH | \T2H | \TH | | | | | |
| 06891 | 崀 | E.BK | IU.K | \.BK | | | | | | | |
| 06892 | 峕 | 8-YE | 823E | 8=3E | 8YE | 83E | 8YIU | 83IU | 8'IU | 8'E | 8-Y\ |
| | | 823\ | 8=3\ | 8Y\ | 83\ | 8'\ | | | | | |
| 06893 | 帩 | UI3A | E3A | | | | | | | | |
| 06894 | 帨 | UI2R | E2OR | | | | | | | | |
| 06895 | 庨 | LH'Z | LHZ | | | | | | | | |
| 06896 | 庴 | .L-Q | .L9 | | | | | | | | |
| 06897 | 庲 | LF+X | LFX | LF[X | | | | | | | |
| 06898 | 庖 | LK.3 | L.K3 | .LK3 | LK3 | | | | | | |
| 06899 | 弳 | 5-3H | 53H | | | | | | | | |

06900 蛸 53A
06901 蜮 O-M3 O'M3 OM3
06902 韶 EDG
06903 惹 HHG 21HG 2HG =1HG =HG
06904 忽 TU2G TAG
06905 愬 T'HG TEG
06906 悢 I2.K 1.BK
06907 憾 I2HM I2MH IHM IMH I2XM IXM I2MX
06908 悑 I2SA ISUH ISA
06909 悒 I2OL IOBL IOL
06910 悄 I2OA IOA
06911 慳 I2QH IQIH IQH
06912 悃 I2OY I2OY IOY IOY
06913 悌 I2XE IX+E IXE IX[E
06914 悛 IS2X IS8X ISRX
06915 恍 I2DR IDBR IUBR IDR
06916 悇 I28Y I283 I8-Y I823 I8Y 183
06917 悝 I2OE IO'H IOE
06918 悎 I2HO I'HO
06919 戕 U-OM UOM AM
06920 庋 'PTK .PTK PTK
06921 毒 228F HH8F H8F H8EJ H83J =28F ==8F
06922 挈 VOEJ VO3J VOJ VOF
06923 挠 FU2R FU=R
06924 挬 F+UZ F+Z F[UZ F[Z
06925 捄 F+3. F+4. F-3. F-4. F[3. F[4.
06926 捕 FSUH FSA
06927 搗 FPJO FPJ
06928 措 FE'O FEO
06929 揤 FBSP FBFP FBP
06930 挹 FOBL FOL
06931 捋 F'3J FAJ
06932 捊 F'3Z FAZ- FAZ
06933 挼 F'3V FAV
06934 挩 F2OR
06935 捁 F'HO
06936 挴 FTQ- FTQ
06937 捘 FS2X FS8X FSRX
06938 捔 FUUH FUA
06939 捭 F-Q- F+Q+ F[Q[ FHQ FQ
06940 挭 F-QX FTQX FQX
06941 捇 FH22 FH4
06942 挳 F-3H F3H
06943 捏 FQH FQIH
06944 捵 FBTK FB2T FB=T FBH8
06945 挸 F4R
06946 抄 FG3' FG3
06947 捧 F'XE FXE
06948 捈 F8'Y F8-Y F823 F8=3 F8'
06949 枝 G3TX TYTX
06950 敍 8OTX 8OX
06951 旆 TDTE DTTE TDE
06952 旃 TDTA DTUT DTA. TDA DTA
06953 旄 TDTL TDL DTEL DT3L DTL
06954 旂 TDTT TDT DTLT DTT
06955 晊 B-SH BSH
06956 晨 BLJM BLCM BDM BMD
06957 晦 BK-S BK-5 BK2C BK=C BK2J BK=J BKS BK5 BKC BKJ
06958 晷 B'UO B'AI B'A
06959 朒 AUTT AAT
06960 朓 AKK AKKL A2K
06961 栟 Y222 Y2HH
06962 栚 Y2-K Y22T Y2=T Y2H8 Y28
06963 校 Y.UV YUV
06964 栲 YH'S YH'5 YHS YH5
06965 栳 YH'F YHF YH'7 YH7
06966 栻 YHM YMH
06967 栧 Y-5T Y+5T YK5 Y[5T
06968 郴 YHP
06969 栖 Y-4 Y-02 Y-08 Y-OR Y-02 Y-08 Y-OR
06970 栱 Y222 Y228 YHH2 YHH8
06971 梀 YYU
06972 栵 Y-AJ YAJ

| | | |
|---|---|---|
| 06973 | 桙 | Y-TZ Y+IZ Y+Z Y[IZ Y[Z |
| 06974 | 栭 | YTU2 YTA |
| 06975 | 棈 | Y+A Y+'A Y[A Y['A |
| 06976 | 樫 | Y-SH YSH |
| 06977 | 桄 | Y3-R Y3R |
| 06978 | 栫 | YTA- |
| 06979 | 栝 | Y'+O Y-+O YHIO Y'[O Y-[O |
| 06980 | 栒 | Y'CB YCB |
| 06981 | 栔 | EDY |
| 06982 | 栦 | YTTT Y3T |
| 06983 | 枎 | Y2UT Y=UT Y2- Y=- |
| 06984 | 栮 | YP Y-4 |
| 06985 | 桍 | YK-5 YK-S YK2C YK2J YK=C YK=J YKS |
| 06986 | 栺 | YFB Y7B |
| 06987 | 桊 | 2UTY 2-Y =UTY =-Y |
| 06988 | 桬 | T'HY TEY |
| 06989 | 欸 | TTUT TUT- |
| 06990 | 欯 | HOUT HO- |
| 06991 | 欧 | OKUT OKT OKUT OK- |
| 06992 | 欫 | 8ODT 8OUT 8OT 8O- |
| 06993 | 欥 | .SUT BSDT BSUT .BS- BS- .S- .FUT BFDT BFUT BFT .BF- BF- .F- |
| 06994 | 歭 | GHJ GHJ. |
| 06995 | 殍 | -AEH AEH |
| 06996 | 殈 | -A'4 A'4- A'4 |
| 06997 | 毦 | -4EL -43L |
| 06998 | 毨 | 2REL 8REL 2RL 8RL =REL =RL |
| 06999 | 毞 | ELHR ELR 3LHR 3LR |
| 07000 | 毷 | EEEL 2EEL EE3L 2E3L EEL =EEL =E3L |
| 07001 | 氄 | 3L-4 EL-4 3L4 EL4 |
| 07002 | 氅 | EL+M ELM+ ELM 3L+M 3LM+ EL\|M ELM\| 3L\|M 3LM[ |
| 07003 | 氋 | T-Z4 T-L4 TZ-4 TZ4 7-4 74 |
| 07004 | 沖 | 3I2O 3IOI 3IO |
| 07005 | 洸 | 3U2R 3U=R |
| 07006 | 浤 | 2U+S =U+S 3US 2U[S =U[S |
| 07007 | 洋 | 3UT+ 3U'H 3UH 3UT[ |
| 07008 | 洍 | 3C2O 3C2C |
| 07009 | 浡 | 3+UZ 3[UZ |
| 07010 | 浯 | 3E'O 3EO |
| 07011 | 浘 | 3PEL 3P3L |
| 07012 | 浀 | 3-OK |
| 07013 | 浭 | 3-QX 3TQX |
| 07014 | 浛 | 35O |
| 07015 | 涑 | 3YO 3YO |
| 07016 | 浮 | 3H'Z |
| 07017 | 涌 | 3TSA |
| 07018 | 浿 | 342 348 |
| 07019 | 浙 | 3BHI 3B-+ 3B2I 3B=I 3B-[ |
| 07020 | 浞 | 3OG 3OTT |
| 07021 | 浧 | 3O'H 3OE |
| 07022 | 浠 | 3X+E 3XE 3X[E |
| 07023 | 涗 | 32OR 38OR |
| 07024 | 浰 | 3'YJ 3YJ 3'IJ 3'J |
| 07025 | 浼 | 3DBR 3UBR 3DR |
| 07026 | 浟 | 3TIX 3TTX |
| 07027 | 涂 | 38-Y 3823 38=3 38H3 38Y |
| 07028 | 涘 | 3S2T 3S=T 3STK 3SH8 |
| 07029 | 挈 | ED3 ED4 |
| 07030 | 涞 | 3.UY 3UY |
| 07031 | 涋 | 3UK. 3U.K 3UK |
| 07032 | 浾 | 3H22 3H4 |
| 07033 | 涀 | 34R |
| 07034 | 涄 | 3IQS 3IQ5 3Q-C 3Q-J 3QS |
| 07035 | 涢 | 3ONK |
| 07036 | 涸 | 3OY 3OY |
| 07037 | 淴 | 3URO 3U2O 3U8O |
| 07038 | 渓 | 3'3V 3AV |
| 07039 | 浵 | 3A-3 3A3 3UT3 |
| 07040 | 浌 | 3'FM 3FM |
| 07041 | 烜 | W-B- W2B W=B |
| 07042 | 烓 | WHH W2IH W2H |
| 07043 | 烑 | WKKL WKK W2K |
| 07044 | 烝 | L3-4 J3-4 |

| | | | | | | | | | |
|---|---|---|---|---|---|---|---|---|---|
| 07045 | 烋 | TY4 | TYW | | | | | | |
| 07046 | 烝 | 'HE4 | HE4 | | | | | | |
| 07047 | 烢 | WUHL | WU2L | WU=L | WUL | | | | |
| 07048 | 烪 | WTUT | WTT | | | | | | |
| 07049 | 烒 | WHM | WMH | | | | | | |
| 07050 | 烞 | WYI. | WYT | | | | | | |
| 07051 | 烳 | W+A | W+'A | W[A | W['A | | | | |
| 07052 | 烔 | WU-O | | | | | | | |
| 07053 | 烑 | W'HR | WHR | | | | | | |
| 07054 | 烅 | W'4- | W'4 | W4- | | | | | |
| 07055 | 烆 | W'TJ | WT2J | WT=J | WTJ | W]2J | W]=J | W]J | |
| 07056 | 烇 | W8E | | | | | | | |
| 07057 | 烚 | W8-O | W8O | | | | | | |
| 07058 | 烖 | HHW | 2HIW | =HIW | 2HW | =HW | | | |
| 07059 | 烘 | W222 | W228 | WHH2 | WHH8 | WH2I | WH8I | | |
| 07060 | 牂 | UU2E | UL2E | UT2E | K2EI | K2E | | | |
| 07061 | 牸 | 'FUZ | Z.UZ | ZUZ- | ZUZ | | | | |
| 07062 | 牷 | 'F8E | Z8E | | | | | | |
| 07063 | 牶 | 2H8H | 2H'H | =H8H | =H'H | | | | |
| 07064 | 狕 | Z33' | Z33 | | | | | | |
| 07065 | 狺 | ZT2O | ZT=O | Z4O | Z; | | | | |
| 07066 | 猎 | ZFFH | Z2FH | ZFH | Z77H | Z27H | Z7H | Z%IH | Z%H |
| 07067 | 狾 | ZYLT | ZYT | | | | | | |
| 07068 | 狶 | ZX+E | ZXE | ZX[E | | | | | |
| 07069 | 狳 | Z8-Y | Z823 | Z8=3 | Z8H3 | Z8Y | Z83 | | |
| 07070 | 狻 | ZS2X | ZS8X | ZSRX | ZSX | | | | |
| 07071 | 猁 | Z'YJ | ZYIJ | ZYJ | Z'IJ | Z'J | | | |
| 07072 | 玟 | ET2X | ET8X | ETRX | | | | | |
| 07073 | 珙 | E222 | E228 | EHH2 | EHH8 | EH2 | EH8 | | |
| 07074 | 珥 | E-4 | | | | | | | |
| 07075 | 珖 | E3-R | E3R | | | | | | |
| 07076 | 玼 | EGF | EG7 | | | | | | |
| 07077 | 珧 | EKKL | EKK | E2K | | | | | |
| 07078 | 玽 | E'CB | ECB | | | | | | |
| 07079 | 珩 | E'TJ | ET2J | ET=J | ETJ | E]2J | E]=J | E]J | |
| 07080 | 珜 | E2EI | E23I | | | | | | |
| 07081 | 珒 | EE2I | EE=I | EE++ | EEHI | EEH | EE[[ | | |
| 07082 | 珛 | E+A | E+'A | E[A | E['A | | | | |
| 07083 | 珔 | E-TZ | E+IZ | E+Z | E[IZ | E[Z | | | |
| 07084 | 珝 | E2J2 | E2C2 | EEE | E2E | E2 | | | |
| 07085 | 珚 | EOK | | | | | | | |
| 07086 | 珗 | E'HR | EHR | | | | | | |
| 07087 | 珕 | E'A- | E'A | EA- | | | | | |
| 07088 | 珨 | E8-O | E8O | | | | | | |
| 07089 | 骪 | AST.K | AS2T | AS=T | ASH8 | ASK | AS2 | AS8 | |
| 07090 | 骲 | ASCL | ASUL | ASL | | | | | |
| 07091 | 瓴 | 8S-Z | 8SCZ | 8SZ | | | | | |
| 07092 | 瓵 | SO-Z | SOCZ | | | | | | |
| 07093 | 甡 | 'E'E | | | | | | | |
| 07094 | 畛 | Q83 | | | | | | | |
| 07095 | 畟 | Q2'X | Q8'X | QR'X | Q2X | Q8X | QRX | | |
| 07096 | 疰 | L2.E | L.E | | | | | | |
| 07097 | 痁 | L2TO | | | | | | | |
| 07098 | 疻 | L2O2 | L2O8 | LO2 | LO8 | | | | |
| 07099 | 痄 | L2TK | L2'E | LTI2 | LTI= | L'E | | | |
| 07100 | 痀 | L2CO | L'CO | LCO | L2JO | L'JO | LJO | | |
| 07101 | 痍 | L252 | L5'I | L52I | L5II | L52 | | | |
| 07102 | 痓 | L2HL | L2OL | LHL | | | | | |
| 07103 | 疺 | L2TZ | L'.Z | L-.Z | | | | | |
| 07104 | 盻 | 'B8S | 'B8P | | | | | | |
| 07105 | 盓 | 'Y4- | | | | | | | |
| 07106 | 眝 | 4.UJ | 4U-J | 4UJ | | | | | |
| 07107 | 眛 | 4-Y | 4+Y | 4[Y | | | | | |
| 07108 | 眐 | 4-G- | 4-G | 4G- | 4G | | | | |
| 07109 | 眡 | 4LM | 4ML | | | | | | |
| 07110 | 眒 | 4IQI | 4BI | | | | | | |
| 07111 | 眣 | 4'2T | 4'=T | 4'H8 | 4TK | 42T | 4=T | 4H8 | |
| 07112 | 眑 | 4SC | | | | | | | |
| 07113 | 眕 | 483 | | | | | | | |
| 07114 | 眙 | 4SO | | | | | | | |
| 07115 | 眷 | 'EO2 | 'EO= | 'EO2 | 'EO= | 'E4 | | | |
| 07116 | 眢 | AJL4 | ACL4 | | | | | | |
| 07117 | 眧 | 4DO | 4UO | | | | | | |

| | | | | | | | | | | | |
|---|---|---|---|---|---|---|---|---|---|---|---|
| 07118 | 碇 | TOUF | +.UF | +UF | TOU7 | +.U7 | +U7 | [.UF | [UF | [.U7 | [U7 |
| 07119 | 砬 | TOTK | +TK | +T2- | [TK | [T2- | | | | | |
| 07120 | 砢 | TOJO | +-JO | +JO | [-JO | [JO | | | | | |
| 07121 | 砵 | TOY- | +Y- | [Y- | | | | | | | |
| 07122 | 砯 | TO.3 | TO.4 | +.3 | +.4 | [.3 | [.4 | | | | |
| 07123 | 硊 | TOPZ | +'PZ | +.PZ | +PZ | ['PZ | [.PZ | [PZ | | | |
| 07124 | 磐 | VXTO | VXO | VX+ | VX[ | | | | | | |
| 07125 | 硅 | TO.E | +.E | [.E | | | | | | | |
| 07126 | 砡 | TOE. | +E. | [E. | | | | | | | |
| 07127 | 硑 | TO52 | +5'I | +5II | +52 | [5'I | [5II | [52 | | | |
| 07128 | 砳 | TOTO | | | | | | | | | |
| 07129 | 碯 | TOQ- | +O2- | +O-2 | +Q- | [O2- | [O-2 | [Q- | | | |
| 07130 | 砛 | TO8S | +8-S | +8.S | +8S | [8-S | [8..S | [8S | | | |
| 07131 | 祔 | 23TJ | -YTJ | KT-J | KTJ. | KTJ | =3TJ | | | | |
| 07132 | 祛 | 23HS | -YHS | =3HS | | | | | | | |
| 07133 | 祏 | 23TO | -YTO | K-'O | KTO | =3TO | | | | | |
| 07134 | 祜 | 23+O | -Y+O | K+O | =3+O | 23[O | -Y[O | .K[O | =3[O | | |
| 07135 | 祓 | 23+X | -Y+X | K+X. | =3+X | 23[X | -Y[X | K[X. | =3[X | | |
| 07136 | 祒 | 23DO | -YDO | =3DO | KDO | KUO | | | | | |
| 07137 | 祑 | 23TK | 23- | -YTK | -Y- | K'2T | K'=T | K'H8 | KTK | K- | =3TK |
| | | =3- | | | | | | | | | |
| 07138 | 秫 | 'YY. | 'Y.Y | 'Y. | '.Y | | | | | | |
| 07139 | 秬 | 'YCC | 'CC | | | | | | | | |
| 07140 | 秹 | 'Y23 | 'Y=3 | '23 | '=3 | | | | | | |
| 07141 | 秮 | 'YSO | 'SO | | | | | | | | |
| 07142 | 秭 | 'YSJ | 'Y5J | 'SJ | '5J | YSJ | Y5J | | | | |
| 07143 | 秖 | 'YK. | 'YK- | 'K. | 'K- | | | | | | |
| 07144 | 秜 | 'YPF | 'YP7 | 'PF | 'P7 | | | | | | |
| 07145 | 秞 | 'YIQ | 'IQ | | | | | | | | |
| 07146 | 秝 | 'Y'Y | Y'Y | 'YY | ''Y | '' | | | | | |
| 07147 | 窐 | U2TZ | U8TZ | UTZ | | | | | | | |
| 07148 | 窉 | U2-A | U8-A | U-A | | | | | | | |
| 07149 | 窅 | U24 | U84 | | | | | | | | |
| 07150 | 窋 | U2EE | U22E | U8EE | U82E | UREE | UR2E | UEE | UUIU | UIUU | U2\\ |
| | | U22\ | U8\\ | U82\ | UR\\ | UR2\ | U\\ | | | | |
| 07151 | 窊 | U2PP | U8PP | URPP | UPP | UC'P | | | | | |
| 07152 | 窇 | U2AS | U8AS | URAS | | | | | | | |
| 07153 | 窓 | U2UL | U8UL | URUL | UUOL | UUPL | UUCL | | | | |
| 07154 | 竘 | TKCO | | | | | | | | | |
| 07155 | 笓 | FFTR | /TR | | | | | | | | |
| 07156 | 笄 | FF22 | FF=2 | FF== | FFHH | /22 | /=2 | /== | /HH | | |
| 07157 | 笸 | FFFF | FF2F | /FF | /2F | FF77 | FF27 | /77 | /27 | | |
| 07158 | 笅 | FFXX | FF2X | /XX | /2X | | | | | | |
| 07159 | 笏 | FFC2 | FFC | /C'' | /C2 | /C | | | | | |
| 07160 | 笺 | FFST | FFSX | /SX | /'S. | /ST | | | | | |
| 07161 | 笊 | FF'3 | /'3 | | | | | | | | |
| 07162 | 笎 | FF2R | FF=R | /2R | /=R | | | | | | |
| 07163 | 笱 | FFC2 | FFC= | /'C2 | /'C= | /C2 | /C= | | | | |
| 07164 | 笒 | FF8L | FF8J | /8-L | /8-J | /8.L | /8.J | /8L | /8J | | |
| 07165 | 粄 | 2YLT | 2YT | =YLT | =YT | | | | | | |
| 07166 | 粑 | 2YBL | =YBL | | | | | | | | |
| 07167 | 粱 | FF2Y | 2F2Y | =F2Y | =F=Y | %2Y | | | | | |
| 07168 | 籾 | 2Y5I | =Y5I | | | | | | | | |
| 07169 | 粗 | 2YC+ | 2YC[ | 2YEI | =YC+ | =YC[ | =YEI | | | | |
| 07170 | 粍 | 2YEL | 2Y3L | =YEL | =Y3L | | | | | | |
| 07171 | 粐 | 2YC2 | 2YC | =YC2 | =YC | | | | | | |
| 07172 | 紞 | N3UR | N3ER | NUR | NER | | | | | | |
| 07173 | 紝 | N3'H | N3E | N'H | | | | | | | |
| 07174 | 紑 | N3-3 | N-3 | | | | | | | | |
| 07175 | 紎 | N3K. | N3.K | NK. | N.K | | | | | | |
| 07176 | 紘 | N3+S | N+S | N+'S | N3[S | N[S | N['S | | | | |
| 07177 | 紖 | N35I | N5I | | | | | | | | |
| 07178 | 紓 | N3SJ | NSLJ | NSJJ | NSJ | | | | | | |
| 07179 | 紟 | N38L | N38J | N8L | N8J | | | | | | |
| 07180 | 紒 | N382 | N8'I | N82I | N8II | N82 | | | | | |
| 07181 | 紏 | N32+ | N3=+ | N2+ | N=+ | N3+ | N+ | N32[ | N3=[ | N2[ | N=[ |
| | | N3[ | N[ | | | | | | | | |
| 07182 | 紻 | N3K. | N3.K | N-R. | N+R. | N[R. | | | | | |
| 07183 | 罜 | 4.E | | | | | | | | | |
| 07184 | 罣 | 4-GI | 4-G | 4GI | 4G | | | | | | |
| 07185 | 罤 | 4SLJ | 4SJJ | 4SJ | | | | | | | |
| 07186 | 罠 | 4OKI | 4OK | 4CKI | 4CK | 4OLM | 4CLM | | | | |
| 07187 | 罝 | 4A- | | | | | | | | | |
| 07188 | 罛 | 4'3S | 4AS | | | | | | | | |

07189 羖 2ERX =ERX
07190 羒 2E8D 2E2D 2ED =E8D =E2D =ED
07191 翋 +SEE +S2E +'S2 +S2 [SEE [S2E ['S2 [S2
07192 翂 EE8D EE2D 2E8D =E8D 28D 22D =8D =2D ==D
07193 翀 EEOI 2EOI EEOI EEO 2EOI 2EO 2OI 2OI =OI =OO
07194 耖 2Y3' =Y3'
07195 耾 P+S P+'S -4+S P[S P['S -4[S
07196 聆 P8-L P8-J P8.L P8.J P8L P8J -48L -48J
07197 胺 A.UV AUV
07198 胲 ATUT ATT
07199 胹 ATU2 ATA
07200 胵 A-SH ASH
07201 脁 B776
07202 胕 A'TJ AT2J AT=J A]2J A]=J A]J
07203 脊 L3-A J3-A 4-A
07204 拜 EE2O EE++ EEH ;2O ;++ ;X EE[[ ;[[
07205 肿 'A-O A-O 'AOI A-OI AOI AO
07206 舥 'ABL A-BL
07207 茌 ++3H H3H X3H [[3H
07208 茭 HT2X HT8X XT2X XT8X
07209 茿 HTUT XTUT
07210 茷 +++M ++M+ H+M HM+ X+M XM+ [[[M [[M[ H[M HM[
X[M XM[
07211 莛 ++K5 H-5T H+5T HK5 X-5T X+5T XK5 [[K5 H[5T X[5T
07212 茥 ++HH ++2H H2IH HHH XHH X2IH X2H [[HH [[2H
07213 荖 ++HF HH'F HHF ++H7 HH'7 HH7 XH'F XHF XH'7 XH7
[[HF [[H7
07214 茪 ++HR HHR. HHR XHR. XHR [[HR
07215 苴 ++B- ++2B ++=B H-B- H2B H=B X-B- X2B X=B [[B-
[[2B [[=B
07216 茦 ++YU HYU XYU [[YU
07217 茴 ++-4 H-4 X-4 H-O2 H-O8 H-OR H-O2 H-O8 H-OR X-O2
X-O8 X-OR X-O2 X-O8 X-OR [[-4
07218 荊 H-AJ X-AJ
07219 荂 ++KS ++K5 ++KC HK-S HK-5 HK2B HK=C HK2J HK=J HKS
HK5 HKC XK-S XK-5 XK2B XK=C XK2J XH=J XKS XK5
XKC XKJ [[KS [[K5 [[KC
07220 荎 ++SH H-SH HSH X-SH XSH [[SH
07221 茛 ++BK HBK XBK [[BK
07222 茖 ++3R H3-R H3R X3-R X3R '[[3R
07223 茈 ++GF ++G7 HGF HG7 XGF XG7 [[GF [[G7
07224 茼 HU-O XU-O
07225 荍 ++UX HLIX HUTX HUX XLIX XUTX XUX [[UX
07226 荅 ++XO H'XO HXO X'XO XXO [[XO
07227 芧 ++AA ++2A HAA H2A XAA X2A [[AA [[2A
07228 茱 ++TY HTY XTY [[TY
07229 茷 ++TM HTM XTM [[TM
07230 茯 HTK. XTK.
07231 茩 ++LO HL-O HLO XL-O XLO [[LO
07232 荇 H'TJ HT2J HT=J X'TJ XT2J XT=J H]2J H]=J H]J X]2J
X]=J X]J
07233 荅 ++8O H8-O X8-O X8O [[8O
07234 荽 ++UV H.UV HUV X.UV XUV [[UV
07235 荓 ++2H [[2H H2HH H222 X2HH X222 X2H
07236 荁 ++CU HC2C HCU ++E XC2C XCU [[CU [[E
07237 荏 +++H H+IH H-TH H+H X+IH X-TH X+H [[[H H[IH H[H
X[IH X[H
07238 荋 ++TA HTU2 HTA XTU2 XTA [[TA
07239 茧 ++OS ++OS ++S HOS HOS XOS XOS XS [[OS [[OS
[[S
07240 莽 ++AH HAH XAH [[AH
07241 虓 9TUR 9T7R 9U7R 9TR
07242 虒 LTUR LT7R LU7R LTR LUR
07243 蚢 OSTR STR OSTR
07244 蚨 OS+K OS-K OS2T OS=T OSK S+K S2T S=T OS+K OS-K
OS2T OS=T OS[K S[K OS[K
07245 蚖 OS2R OS=R S2R S=R OS2R OS=R
07246 蚍 OSFF OS2F SFF S2F OSFF OS2F OS77 OS27 S77 S27
OS77 OS27 OS% OS% S%
07247 蚑 OS+X S+X OS+X OS[X S[X OS[X
07248 蚞 OSY SY OSY
07249 蚇 OSP. SP. OSP. OSCT SCT OSCT
07250 蚗 OSLK SLK OSLK OSJK SJK OSJK

| | | | | | | | | | | | |
|---|---|---|---|---|---|---|---|---|---|---|---|
| 07251 | 蚆 | OSBL | SBL | OSBL | | | | | | | |
| 07252 | 蚋 | OSUT | OSA | SUT | OSUT | OSA | | | | | |
| 07253 | 蚚 | OSLT | OST | SLT | OSLT | OST | | | | | |
| 07254 | 蛇 | OSLL | SLJL | SLCL | SLL | OSLL | | | | | |
| 07255 | 蚥 | OS2X | OS8X | S2X | S8X | | | | | | |
| 07256 | 蛉 | OS8L | OS8J | S8-L | S8-J | S8.L | S8.J | S8L | S8J | OS8L | OS8J |
| 07257 | 蚡 | OS8D | OS2D | S8D | S2D | OS8D | OS2D | | | | |
| 07258 | 蚧 | OS82 | S82 | S8'I | S8II | OS82 | | | | | |
| 07259 | 蠢 | 'K8S | 'KS | -KOS | -KS | 2TOS | 2TS | 2TOS | =TOS | =TS | =TOS |
| | | H8OS | H8S | 8OS | | | | | | | |
| 07260 | 蚘 | OSK. | OS.K | OSK. | OS.K | S-R. | S+R. | S[R. | SK. | S.K | |
| 07261 | 蛆 | OSB | SB | OSB | | | | | | | |
| 07262 | 蚝 | OSEL | OS3L | SEL | S3L | OSEL | OS3L | | | | |
| 07263 | 虳 | OSC2 | OSC= | S'C2 | S'C= | SC2 | SC= | OSC2 | OSC= | | |
| 07264 | 蚳 | OS'K | OSK | OS'K | OSK | S'K | SK | | | | |
| 07265 | 虾 | '4-3 | 4--3 | | | | | | | | |
| 07266 | 蛵 | '4C+ | '4EI | 4-C+ | 4-EI | '4-E | '4E | '4C[ | 4-C[ | | |
| 07267 | 祑 | K2T | K=T | K-K | K+K | K[K | | | | | |
| 07268 | 祖 | KB | | | | | | | | | |
| 07269 | 神 | KOI | KOI | KO | | | | | | | |
| 07270 | 衲 | KUT | KA | | | | | | | | |
| 07271 | 袀 | K'C2 | K'C= | KC2 | KC= | | | | | | |
| 07272 | 袚 | K'S. | KST | KSX | | | | | | | |
| 07273 | 衿 | K8-L | K8-J | K8.L | K8.J | K8L | K8J | | | | |
| 07274 | 衯 | K8D | K2D | | | | | | | | |
| 07275 | 褩 | FDTK | 7DTK | FDK | 7DK | | | | | | |
| 07276 | 衾 | 8LTK | 8JTK | 8LK | 8JK | | | | | | |
| 07277 | 枕 | KUR | KER | | | | | | | | |
| 07278 | 袨 | K+-X | K+X | K[-X | K[X | | | | | | |
| 07279 | 紉 | 4OD. | :D. | | | | | | | | |
| 07280 | 豇 | -OKH | -KH | OKH | .H | | | | | | |
| 07281 | 雁 | -RZL | RZL | -RZ | RZ | | | | | | |
| 07282 | 豜 | AZHI | AZ-+ | AZ2I | AZ=I | AZH | AZ-[ | | | | |
| 07283 | 貤 | 42+L | 48+L | 42L | 48L | 42[L | 48[L | | | | |
| 07284 | 貢 | M42 | M48 | | | | | | | | |
| 07285 | 赶 | HGHI | HG-+ | HG2I | HG=I | HGH | GHI | G-+ | G2I | G=I | HG-[ |
| | | G-[ | | | | | | | | | |
| 07286 | 赸 | HGIU | GIU | HGE | HG\ | | | | | | |
| 07287 | 豹 | OGC- | OGC. | G'C- | G'C. | GC- | GC. | | | | |
| 07288 | 跎 | OGTZ | GTZ | | | | | | | | |
| 07289 | 趼 | OG2J | OG=J | OGHJ | G2J | G=J | GHJ | | | | |
| 07290 | 軼 | +Q+K | HQK | QK | [Q[K | | | | | | |
| 07291 | 軓 | +Q+R | HQR. | QR. | [Q[R | | | | | | |
| 07292 | 迾 | -AJZ | AIJZ | AJZ | | | | | | | |
| 07293 | 迴 | U-OZ | | | | | | | | | |
| 07294 | 适 | '+OZ | -+OZ | HIOZ | 2IOZ | =IOZ | '[OZ | -[OZ | | | |
| 07295 | 迵 | 'CBZ | CBZ | | | | | | | | |
| 07296 | 迻 | AAZ | 2AZ | =AZ | 2U.Z | =U.Z | 2C.Z | =C.Z | | | |
| 07297 | 達 | 'XHZ | XHZ | | | | | | | | |
| 07298 | 造 | +-OZ | IHOZ | HOZ | [-OZ | | | | | | |
| 07299 | 逌 | +'AZ | +AZ | ['AZ | [AZ | | | | | | |
| 07300 | 郖 | -OKP | OKP | | | | | | | | |
| 07301 | 郹 | -QXP | QXP | | | | | | | | |
| 07302 | 郙 | +A.P | [A.P | | | | | | | | |
| 07303 | 部 | 5OP | | | | | | | | | |
| 07304 | 郛 | +UZP | +ZP | [UZP | [ZP | | | | | | |
| 07305 | 郟 | K2TP | KTTP | KTP | -3TP | | | | | | |
| 07306 | 耶 | 42P | 48P | | | | | | | | |
| 07307 | 郘 | O'OP | O.OP | OOP | | | | | | | |
| 07308 | 邪 | '3ZP | AZ-P | AZP | | | | | | | |
| 07309 | 郗 | X+EP | XEP | X[EP | | | | | | | |
| 07310 | 部 | 'HOP | | | | | | | | | |
| 07311 | 郤 | 22OP | 88OP | 28OP | 403I | 4OP | =2OP | ==OP | =8OP | | |
| 07312 | 酐 | -QHI | -Q-+ | -QH | 9HI | 9-+ | 92I | 9=I | 9H | -Q-[ | 9-[ |
| 07313 | 酎 | -QJ. | 9J. | | | | | | | | |
| 07314 | 酏 | -Q+L | 9LIL | 9JIL | 9+L. | -Q[L | 9[L | | | | |
| 07315 | 釘 | 8KLJ | 8KJJ | $LJ | $JJ | 6LJ | 6JJ | | | | |
| 07316 | 釸 | 8K'S | 8KS' | 8KS | $'S | $S' | $S | 6'S | 6S' | 6S | |
| 07317 | 釚 | 8K9 | $9 | 69 | | | | | | | |
| 07318 | 陝 | 9CE4 | | | | | | | | | |
| 07319 | 陟 | PG3' | PG3 | | | | | | | | |
| 07320 | 隼 | TTE+ | THH+ | TE+ | 'E+ | TTE[ | THH[ | TE[ | 'E[ | | |
| 07321 | 釘 | 8BSJ | 8BFJ | 8B7J | 8S-J | 8F-J | 87-J | 8SJ | 8FJ | 87J | 8J |

| | | |
|---|---|---|
| 07322 | 彫 | E-S3 ES3 |
| 07323 | 凹 | UX4F UX.F X4UF X.UF UXF XUF UX47 UX.7 X4U7 X.U7 UX7 XU7 |
| 07324 | 乳 | '3NL AN3L ANL |
| 07325 | 傒 | TEDK |
| 07326 | 傴 | T-OQ |
| 07327 | 傶 | TH2L TH=L THKL |
| 07328 | 傑 | THLY THY |
| 07329 | 僨 | T-4V T4V |
| 07330 | 偪 | TPSH TPH |
| 07331 | 偋 | TP2H TPH |
| 07332 | 偶 | TFFA T2FA T77A T27A TFA |
| 07333 | 偲 | TQG |
| 07334 | 偈 | TBCL TBC TBL |
| 07335 | 偍 | TB-G TBG |
| 07336 | 偊 | T'3A TAUH |
| 07337 | 偛 | T'+; T'+E T-+; T-+E THEE TH; T'[; T'[E T-[; T-[E |
| 07338 | 倆 | T'OA T'OA TOA |
| 07339 | 傚 | T'YW T'W |
| 07340 | 偭 | THHH THXH |
| 07341 | 僅 | THQH |
| 07342 | 倶 | T'BE TBE |
| 07343 | 偵 | TD42 TD48 TU42 TU48 TD2 TD8 TU8 |
| 07344 | 侍 | T'TJ TTHJ T]HJ T]J |
| 07345 | 偣 | TTKB |
| 07346 | 倘 | T2-Q TKQ T2Q |
| 07347 | 偆 | T3TB TE8B TEB |
| 07348 | 偰 | THUK THK |
| 07349 | 偕 | TOP TO-4 |
| 07350 | 備 | TETA TEM TIUA TIUM |
| 07351 | 偖 | T3'4 T34 |
| 07352 | 偶 | TR-S TR'S TRS |
| 07353 | 溼 | 2+4H 24IH 24H =-4H =4IH =4H |
| 07354 | 劂 | LHXJ LXIJ LXJ |
| 07355 | 剮 | PSHJ PHIJ PHJ |
| 07356 | 劊 | ETAJ EAIJ EMIJ EMJ |
| 07357 | 剻 | AAIJ AUOJ QAIJ QUOJ QAJ |
| 07358 | 勖 | B4C B4C' |
| 07359 | 勸 | FFBC 2FBC =FBC 2'BC ='BC 77BC 27BC =7BC |
| 07360 | 匰 | CQ9 CHQ9 |
| 07361 | 厴 | LHHH LHH LHXH |
| 07362 | 啵 | O3EX |
| 07363 | 啶 | OU-G OUG |
| 07364 | 喉 | OTKV OTV |
| 07365 | 啍 | OTZ- OTOZ |
| 07366 | 啐 | OTT+ OT4+ OTT[ OT4[ |
| 07367 | 哾 | O2ER |
| 07368 | 唪 | O3TH OE8H |
| 07369 | 噓 | O-EG O+EG OEG O[EG |
| 07370 | 啢 | OTA OM |
| 07371 | 啗 | O22B OHHB OHB |
| 07372 | 嚨 | OKQL OKL |
| 07373 | 喇 | OPEJ |
| 07374 | 嗮 | OPEE OP2E OPE OP\\ OP2\ OP\ |
| 07375 | 啅 | OTB+ OTB[ |
| 07376 | 唌 | O'GZ OGZ |
| 07377 | 唲 | OEER O;R |
| 07378 | 啥 | O8HO |
| 07379 | 捂 | T+50 'H50 H50 T[50 |
| 07380 | 唹 | OTD2 OTD= |
| 07381 | 啈 | OH2H |
| 07382 | 唭 | OH2K OH=K OH22 OH=2 OH28 OH=8 |
| 07383 | 唻 | OY2T OYTT OYT OY4 |
| 07384 | 喱 | OLHH OL2H |
| 07385 | 啋 | O'3Y OAY |
| 07386 | 圇 | OEA OIEA |
| 07387 | 圂 | O8-A O8-A O8A |
| 07388 | 埻 | HTOZ HTZ- |
| 07389 | 堔 | HU2Y HU8Y HURY HUY 1HUY |
| 07390 | 増 | H2HL IH2L |
| 07391 | 埶 | H2H9 H8H9 HRH9 HH9. 69. |
| 07392 | 埜 | YYH 2YH YYIH 2YIH |
| 07393 | 埴 | H+4L H+4- IH+L IH+- H[4L H[4- IH[L IH[- |

| | | | | | | | | | | |
|---|---|---|---|---|---|---|---|---|---|---|
| 07394 | 堀 | HPEE | HP2E | HPE | IHPE | HP\\ | HP2\ | HP\ | IHP\ | |
| 07395 | 埭 | HEI3 | HEI4 | HE3 | HE4 | IHE3 | IHE4 | | | |
| 07396 | 埽 | HEUE | IHEE | | | | | | | |
| 07397 | 堈 | HUKE | IHUE | | | | | | | |
| 07398 | 場 | HBC2 | HBC | IHBC | | | | | | |
| 07399 | 堋 | HAA | H2A | IHAA | IH2A | | | | | |
| 07400 | 埳 | HDEE | HUEE | HD: | HU: | IHDE | IHUE | IHD: | IHU: | |
| 07401 | 埏 | H'GZ | HGZ | IHGZ | | | | | | |
| 07402 | 堇 | 2OOE | 2OOE | HOE | HOE | =OOE | =OOE | | | |
| 07403 | 埃 | HWW | H2W | IHWW | IH2W | | | | | |
| 07404 | 埣 | HTT+ | HT4+ | HT+ | IHT+ | HTT[ | HT4[ | HT[ | IHT[ | |
| 07405 | 埤 | H3TH | HE8H | IHEH | | | | | | |
| 07406 | 埥 | HIEA | HEA | IHEA | | | | | | |
| 07407 | 埬 | HYB | HYQ | IHYB | IHYQ | | | | | |
| 07408 | 埡 | IH2U | IH=U | H-U- | H2U | H=U | | | | |
| 07409 | 堎 | HH2X | HH8X | HHRX | HHX | IHHX | | | | |
| 07410 | 埼 | HKJO | HKJ | IHKJ | | | | | | |
| 07411 | 堰 | HLHH | HLH | IHLH | | | | | | |
| 07412 | 埧 | H4K | H4L2 | H4L8 | H4-2 | H4-8 | HAK | IH4K | IHAK | |
| 07413 | 堞 | IHQY | HQY | | | | | | | |
| 07414 | 堙 | HO+O | HO+O | IHOO | IHOO | HO[O | HO[O | | | |
| 07415 | 埱 | HTYX | HG3X | HGX | IHGX | IHYX | | | | |
| 07416 | 埩 | HAEJ | IHAJ | | | | | | | |
| 07417 | 埰 | H'3Y | HAY | IHAY | | | | | | |
| 07418 | 塊 | HDBR | HUBR | HDR | IHDR | | | | | |
| 07419 | 堄 | HEER | H:R | IHER | IH:R | | | | | |
| 07420 | 奜 | EEK | | | | | | | | |
| 07421 | 婠 | V.UB | VUB | | | | | | | |
| 07422 | 婎 | V2HL | | | | | | | | |
| 07423 | 婕 | V-EG | V+EG | V+G | VEG | V[EG | V[G | | | |
| 07424 | 婧 | VEA | VIEA | | | | | | | |
| 07425 | 婞 | VH2H | | | | | | | | |
| 07426 | 娸 | VH2K | VH=K | VH22 | VH=2 | VH28 | VH=8 | | | |
| 07427 | 娵 | VPX | V-4X | V4X | | | | | | |
| 07428 | 婭 | V2UU | V=UU | V-U- | V2U | V=U | | | | |
| 07429 | 婐 | VQY | | | | | | | | |
| 07430 | 婣 | VO+O | VO+O | VOO | VOO | VO[O | VO[O | | | |
| 07431 | 婥 | VTB+ | VT+ | VTB[ | VT[ | | | | | |
| 07432 | 婬 | V'3E | VA'H | VAE | | | | | | |
| 07433 | 婓 | EEV | | | | | | | | |
| 07434 | 婤 | VUHO | | | | | | | | |
| 07435 | 婗 | VEER | V:R | | | | | | | |
| 07436 | 婃 | VU23 | VU=3 | VU-Y | | | | | | |
| 07437 | 婝 | VU-G | VUG | | | | | | | |
| 07438 | 娭 | VWW | | | | | | | | |
| 07439 | 婄 | VTKO | VTO | | | | | | | |
| 07440 | 婛 | VTO3 | VT3 | | | | | | | |
| 07441 | 婈 | VH2X | VH8X | VHRX | VHX | | | | | |
| 07442 | 婖 | VH'B | VHB | | | | | | | |
| 07443 | 婩 | VLHH | VL2H | VLH | | | | | | |
| 07444 | 婍 | VKJO | VKJ | | | | | | | |
| 07445 | 婑 | V5TN | V5N | | | | | | | |
| 07446 | 婌 | VTYX | VG3X | VGX | | | | | | |
| 07447 | 婰 | VOH2 | VOH2 | VUHK | VOH8 | VOH8 | VQ2 | VQ8 | | |
| 07448 | 婢 | VELH | VEH | | | | | | | |
| 07449 | 婇 | V'3Y | VAY | | | | | | | |
| 07450 | 婏 | V'YV | VYV | V'V | | | | | | |
| 07451 | 婂 | V'KG | V-KG | VKG | V'K4 | V-K4 | VK4 | | | |
| 07452 | 婦 | V'BE | VBE | VBUI | | | | | | |
| 07453 | 婜 | CUXV | EXV | | | | | | | |
| 07454 | 琁 | Z-U- | Z2U | Z=U | Z'2U | Z'=U | Z-2U | Z-=U | | |
| 07455 | 琮 | ZU23 | ZU=3 | Z'U3 | Z-U3 | ZU-Y | ZUY | Z'UY | Z-UY | |
| 07456 | 寁 | U-EG | U+EG | U+G | U[EG | U[G | | | | |
| 07457 | 寀 | U'3Y | UAY | | | | | | | |
| 07458 | 屙 | PPJO | | | | | | | | |
| 07459 | 崞 | ETOZ | IUTZ | \TOZ | | | | | | |
| 07460 | 崋 | EHHH | ETXH | E-HH | E-XH | IUXH | \HHH | \TXH | \-HH | \-XH |
| 07461 | 崝 | EEA | EIEA | IUEA | \EA | \IEA | | | | |
| 07462 | 崚 | EH2X | EH8X | EHRX | IUHX | \H2X | \H8X | \HRX | | |
| 07463 | 崠 | EYQ | EYB | IUYQ | IHYB | \YQ | \YB | | | |
| 07464 | 崓 | EP+O | EPO | IUPO | EP[O | \P+O | \PO | \P[O | | |
| 07465 | 崨 | E-EG | E+EG | IU-G | IU+G | IUEG | E[EG | IU[G | \-EG | \+EG | \[EG |
| 07466 | 崍 | EYTT | EY2T | EY4 | IUYT | IUY4 | \YTT | \Y2T | \Y4 | |

| | | | | | | | | | | | |
|---|---|---|---|---|---|---|---|---|---|---|---|
| 07467 | 嶂 | EKQL | EKL | IUKL | \KQL | \KL | | | | | |
| 07468 | 崥 | E'Q4 | E'Q+ | EQ4 | EQ+ | IUQ4 | IUQ+ | E'Q[ | EQ[ | IUQ[ | \'Q4 |
| | | \'Q+ | \Q4 | \Q+ | \'Q[ | \Q[ | | | | | |
| 07469 | 崏 | E'KB | EKB | IUKB | \'KB | \KB | | | | | |
| 07470 | 嵫 | E3LQ | E3Q | IU3Q | \3LQ | \3Q | | | | | |
| 07471 | 崒 | ET4+ | ETT+ | IUT+ | ET4[ | ETT[ | IUT[ | \T4+ | \TT+ | \T4[ | \TT[ |
| 07472 | 崣 | E'YV | EYV | E'V | IUYV | IU'V | \'YV | \YV | \'V | | |
| 07473 | 崟 | E8E2 | E8K | E$ | IU8K | IU$ | E6 | IU6 | \8E2 | \8K | \$ |
| | | \6 | | | | | | | | | |
| 07474 | 崮 | EO+O | EU+O | EOO· | IUOO | IUOO | EO[O | EO[O | \O+O | \O+O | \OO |
| | | \O[O | \O[O | | | | | | | | |
| 07475 | 帾 | EH'B | UIHB | | | | | | | | |
| 07476 | 幉 | EMM | E2M | UIMM | UI2M | | | | | | |
| 07477 | 廋 | LH2X | LH8X | LHRX | | | | | | | |
| 07478 | 庴 | .LHB | | | | | | | | | |
| 07479 | 虒 | LHP. | LHP | .LHP | | | | | | | |
| 07480 | 庲 | LY2T | LYTT | LYT | .LYT | .LY4 | LY4 | | | | |
| 07481 | 庳 | L'Q4 | L'Q+ | LQ4 | LQ+ | .LQ4 | .LQ+ | L'Q[ | LQ[ | .LQ[ | |
| 07482 | 弶 | 5TO3 | 5T3 | | | | | | | | |
| 07483 | 弸 | 5AA | 52A | | | | | | | | |
| 07484 | 徛 | 'TKJ | ]KJO | ]KJ | | | | | | | |
| 07485 | 徖 | 'TU3 | 'TUY | ]U23 | ]U=3 | ]U-Y | ]U3 | ]UY | | | |
| 07486 | 徟 | 'TUO | ]UHO | ]UO | | | | | | | |
| 07487 | 惄 | FLTG | FTG | | | | | | | | |
| 07488 | 怸 | ZWG | | | | | | | | | |
| 07489 | 念 | 8-YG | 8H3G | 823G | 8=3G | 8YG | 83G | | | | |
| 07490 | 悾 | I2UH | IU2H | IU8H | IURH | IUH | | | | | |
| 07491 | 悰 | I2U3 | I2UY | IU23 | IU3 | IU-Y | IUY | | | | |
| 07492 | 悺 | I2UB | I.UB | IUB | | | | | | | |
| 07493 | 惓 | I22L | I2HL | I2L | | | | | | | |
| 07494 | 惔 | I2WW | I22W | IWW | I2W | | | | | | |
| 07495 | 惏 | I2YY | I22Y | IYY | I2Y | | | | | | |
| 07496 | 悈 | I25N | I5TN | I5N | | | | | | | |
| 07497 | 惙 | I24X | I4X | | | | | | | | |
| 07498 | 惝 | I3UO | | | | | | | | | |
| 07499 | 惈 | I2QY | IQY | | | | | | | | |
| 07500 | 悱 | I2EE | I22E | IEE | I2E | | | | | | |
| 07501 | 惛 | I2KB | I'KB | IKB | | | | | | | |
| 07502 | 惧 | I2PK | I'PK | I.PK | IP.K | IPK. | IPK | | | | |
| 07503 | 惊 | I2T3 | ITO3 | IT3 | | | | | | | |
| 07504 | 悿 | I2KG | I2HG | I2K4 | I2H4 | I'KG | I-KG | IKG | I2TG | I=TG | IH8G |
| | | I'K4 | I-K4 | IK4 | I2T4 | I=T4 | IH84 | | | | |
| 07505 | 慨 | I2BF | IBFF | IB2F | IBF | I2B7 | IB77 | IB27 | IB7 | | |
| 07506 | 惍 | I28K | I2$ | I8E2 | I8K | I$ | I26 | I6 | | | |
| 07507 | 惀 | I28A | I8-A | I8A | | | | | | | |
| 07508 | 棠 | 33'F | 33F | 33EJ | | | | | | | |
| 07509 | 捥 | FUAL | | | | | | | | | |
| 07510 | 捨 | FTKO | | | | | | | | | |
| 07511 | 据 | FLTO | F.LO | | | | | | | | |
| 07512 | 捽 | FT4+ | FTT+ | FT+ | FT4[ | FTT[ | FT[ | | | | |
| 07513 | 捶 | FK4- | F24- | F2H2 | | | | | | | |
| 07514 | 掞 | FWW | F2W | | | | | | | | |
| 07515 | 掭 | F'KG | F-KG | F2TG | F=TG | FH8G | FKG | FHG | F'K4 | F-K4 | F2T4 |
| | | FH24 | FH84 | FK4 | | | | | | | |
| 07516 | 掝 | FO-M | FMO- | FOM | FMO | | | | | | |
| 07517 | 掗 | F-U- | F2UU | F=UU | F2U | F=U | | | | | |
| 07518 | 掫 | FPX | F-4X | | | | | | | | |
| 07519 | 掎 | FKJO | FKJ | | | | | | | | |
| 07520 | 捯 | FSHJ | | | | | | | | | |
| 07521 | 撖 | F4X | | | | | | | | | |
| 07522 | 掐 | FDEE | FUEE | FD: | FU: | | | | | | |
| 07523 | 掘 | FP+O | FPO | FP[O | | | | | | | |
| 07524 | 掮 | FGA | | | | | | | | | |
| 07525 | 換 | FUHK | FOH2 | FOH8 | FQ2 | FQ8 | | | | | |
| 07526 | 挩 | FEER | F:R | | | | | | | | |
| 07527 | 捭 | F'Q4 | F'Q+ | FQ4 | FQ+ | F'Q[ | FQ[ | | | | |
| 07528 | 揙 | F'PA | F.PA | FPA | | | | | | | |
| 07529 | 捼 | F'YV | FYV | F'V | | | | | | | |
| 07530 | 掤 | FAA | F2A | F2U2 | F2U= | | | | | | |
| 07531 | 挺 | F'GZ | FGZ | | | | | | | | |
| 07532 | 掟 | FU-G | FUG | | | | | | | | |
| 07533 | 捸 | FEI4 | FE3 | FE4 | | | | | | | |
| 07534 | 掅 | FEA | FIEA | | | | | | | | |

| | | | | | | | | | | | |
|---|---|---|---|---|---|---|---|---|---|---|---|
| 07535 | 損 | FE-K | FEK | | | | | | | | |
| 07536 | 拱 | BA87 | | | | | | | | | |
| 07537 | 掘 | FBFF | FB2F | FBF | FB77 | FB27 | FB7 | | | | |
| 07538 | 捰 | FQY | | | | | | | | | |
| 07539 | 敓 | 2ORX | 2RTX | =ORX | =RTX | | | | | | |
| 07540 | 旃 | TDTS | TDS | DT8S | DTS | | | | | | |
| 07541 | 睆 | BU2R | BU=R | BUR | | | | | | | |
| 07542 | 晡 | B+A. | B[A. | | | | | | | | |
| 07543 | 晛 | B4R | | | | | | | | | |
| 07544 | 睃 | BS2X | BS8X | BSRX | | | | | | | |
| 07545 | 男 | B25J | | | | | | | | | |
| 07546 | 晢 | FLTB | FTB | | | | | | | | |
| 07547 | 朘 | AS2X | AS8X | ASRX | ASX | | | | | | |
| 07548 | 根 | Y-CK | Y.BK | | | | | | | | |
| 07549 | 栟 | YE2O | YE++ | YEH | YE[[ | | | | | | |
| 07550 | 楷 | YFFH | Y2FH | YFH | Y77H | Y27H | Y7H | Y%1H | Y%H | | |
| 07551 | 梜 | YKTT | YK2T | YK4 | YKT | Y-3T | | | | | |
| 07552 | 梶 | YL2K | YL=K | YLK | | | | | | | |
| 07553 | 栖 | Y-3O | Y3O | | | | | | | | |
| 07554 | 楄 | YPJO | YPJ | | | | | | | | |
| 07555 | 梫 | YEUX | | | | | | | | | |
| 07556 | 柳 | YBSP | YBFP | YB7P | YBP | | | | | | |
| 07557 | 桯 | YO'H | YOE | | | | | | | | |
| 07558 | 桻 | YE8L | YE8J | Y\8L | Y\8J | | | | | | |
| 07559 | 梼 | YIQS | YIQ5 | YQ-C | YQS | YQ5 | YQC | | | | |
| 07560 | 梩 | YQH | YQIH | | | | | | | | |
| 07561 | 桜 | Y'3V | YAV | | | | | | | | |
| 07562 | 桴 | Y'3Z | YAZ- | YAZ | | | | | | | |
| 07563 | 梲 | Y2OR | | | | | | | | | |
| 07564 | 梒 | Y'HO | | | | | | | | | |
| 07565 | 梅 | YUUH | YUA | | | | | | | | |
| 07566 | 枱 | Y8LO | Y8JO | | | | | | | | |
| 07567 | 桊 | Y8I4 | Y83 | Y84 | | | | | | | |
| 07568 | 杪 | Y33' | Y33 | | | | | | | | |
| 07569 | 梈 | Y+UZ | Y+Z- | Y+Z | Y[UZ | Y[Z- | Y[Z | | | | |
| 07570 | 梎 | Y-OK | YOK | | | | | | | | |
| 07571 | 梀 | YYO | YYO | | | | | | | | |
| 07572 | 桱 | Y-3H | Y3H | | | | | | | | |
| 07573 | 梧 | YE'O | YEO | | | | | | | | |
| 07574 | 梛 | YAP | | | | | | | | | |
| 07575 | 梖 | Y42 | Y48 | | | | | | | | |
| 07576 | 梮 | YOA | | | | | | | | | |
| 07577 | 梠 | YO'O | YOIO | YO.O | YOO | | | | | | |
| 07578 | 梻 | YUUH | YULH | YUTH | YKJH | YKH | | | | | |
| 07579 | 榜 | YE8D | YE2D | YED | Y\8D | Y\2D | Y\D | | | | |
| 07580 | 桸 | YX+E | YX[E | | | | | | | | |
| 07581 | 梐 | Y'XE | YXE | | | | | | | | |
| 07582 | 椒 | YZW | | | | | | | | | |
| 07583 | 梌 | Y8-Y | Y8H3 | Y823 | Y8=3 | Y8Y | | | | | |
| 07584 | 桀 | FLTY | FTY | | | | | | | | |
| 07585 | 亟 | YTTH | Y2TH | | | | | | | | |
| 07586 | 欶 | YOUT | YOUT | YOT | YOT | YO- | YO- | | | | |
| 07587 | 猷 | TAUT | TAT | TA- | | | | | | | |
| 07588 | 歃 | XEUT | X+E- | XE- | X[E- | | | | | | |
| 07589 | 欸 | SKUT | S2UT | S8UT | STK- | S-- | | | | | |
| 07590 | 殑 | -A+R | A+OR | A+R | -A[R | A[OR | A[R | | | | |
| 07591 | 殏 | -A+3 | -A+4 | A+3. | A-3. | A-4. | A+4. | A-4 | A+4 | -A[3 | -A[4 |
| | | A[3. | A[4. | A[4 | | | | | | | |
| 07592 | 殍 | -AAZ | | | | | | | | | |
| 07593 | 殃 | -AKT | AKTT | AK2T | A-2T | AKT | | | | | |
| 07594 | 殌 | -A3H | A-3H | A3H | | | | | | | |
| 07595 | 氮 | 7+OR | 7+R | TZ+R | TL+R | 7[OR | 7[R | TZ[R | TL[R | | |
| 07596 | 淀 | 3U-G | 3UG | | | | | | | | |
| 07597 | 淯 | 3.UB | 3UB | | | | | | | | |
| 07598 | 涴 | 3UAL | | | | | | | | | |
| 07599 | 涳 | 3U2H | 3U8H | 3URH | | | | | | | |
| 07600 | 涎 | 32H2 | 3K4- | | | | | | | | |
| 07601 | 涬 | 3H2H | | | | | | | | | |
| 07602 | 浸 | 3H2X | 3H8X | 3HRX | 3HX | | | | | | |
| 07603 | 淢 | 3O-M | 3MO- | 3OM | 3MO | | | | | | |
| 07604 | 涷 | 3YQ | 3-B3 | 3+B3 | 3+Q3 | | | | | | |
| 07605 | 涞 | 3Y2T | 3YTT | 3YT | | | | | | | |
| 07606 | 淔 | 3+4- | 3+4L | 3+4 | 3[4- | 3[4L | 3[4 | | | | |

| | | | | | | | | |
|---|---|---|---|---|---|---|---|---|
| 07607 | 漭 | 3K+H | 3K+X | 3K[H | 3K[X | | | |
| 07608 | 湮 | 3PEE | 3P2E | 3PE | 3P\\ | 3P2\ | 3P\ | |
| 07609 | 湃 | 3QK | 3Q-2 | 3QX | | | | |
| 07610 | 潢 | 3UHK | 3OH2 | 3OH8 | 3Q2 | 3Q8 | | |
| 07611 | 滭 | 3TB+ | 3TB[ | | | | | |
| 07612 | 湝 | 33B | 34B | | | | | |
| 07613 | 潒 | 3OT4 | 3O-3 | 3O-4 | 3O3 | 3O4 | | |
| 07614 | 湖 | 3AA | 32A | | | | | |
| 07615 | 淝 | 3ABL | 3AL | | | | | |
| 07616 | 澍 | 3HEJ | | | | | | |
| 07617 | 漗 | 3C2G | 3CG | 3J2G | 3JG | | | |
| 07618 | 淊 | 3DEE | 3UEE | 3D; | 3U; | | | |
| 07619 | 潘 | 3'KB | 3KB | | | | | |
| 07620 | 溗 | 3'PY | 3.PY | 3PY | | | | |
| 07621 | 淰 | 38LG | 38JG | 38G | | | | |
| 07622 | 涺 | 3P+O | 3PO | 3P[O | | | | |
| 07623 | 濊 | 3H2H | 3H8H | 3HRH | 3G | | | |
| 07624 | 浔 | 3BJ | 3B-J | | | | | |
| 07625 | 溴 | 3B-K | 3B'K | 3B2T | 3B=T | 3BH3 | 3BH8 | 3BK |
| 07626 | 渫 | 3QY | | | | | | |
| 07627 | 淐 | 3BB | | | | | | |
| 07628 | 淲 | 3TUR | 3T7R | 3U7R | | | | |
| 07629 | 涝 | 3HTD | 3HD | 3XTD | 3XD | | | |
| 07630 | 淀 | 3++G | 3[[G | 3HG | 3XG | | | |
| 07631 | 淘 | 3C2Y | 3'CY | 3CY | | | | |
| 07632 | 淍 | 3UHO | | | | | | |
| 07633 | 涚 | 3EER | 3;R | | | | | |
| 07634 | 淪 | 38HO | | | | | | |
| 07635 | 烺 | W-BK | W.BK | WBK | | | | |
| 07636 | 焍 | W25J | W2J | | | | | |
| 07637 | 焼 | WU2R | WU=R | WUR | | | | |
| 07638 | 焗 | WPJO | WPCO | WPJ | WPC | | | |
| 07639 | 烴 | W-3H | W3H | | | | | |
| 07640 | 焕 | WS2X | WS8X | WSRX | WSX | | | |
| 07641 | 烰 | W'3Z | WAZ- | WAZ | | | | |
| 07642 | 羔 | E'O4 | EO4 | | | | | |
| 07643 | 焴 | W+A. | W[A. | | | | | |
| 07644 | 焐 | W5O | | | | | | |
| 07645 | 烼 | WZ | WZL | | | | | |
| 07646 | 烿 | WA-3 | WA3 | WUT3 | | | | |
| 07647 | 烔 | WOA | | | | | | |
| 07648 | 焓 | W8LO | W8JO | | | | | |
| 07649 | 焀 | W22O | W88O | W28O | W4O | | | |
| 07650 | 焨 | WTQ- | WTQ | | | | | |
| 07651 | 焳 | W'HZ | WEZ | | | | | |
| 07652 | 焚 | UUHW | ULHW | UTHW | KHW | | | |
| 07653 | 焂 | TIXW | TTXW | TXW | | | | |
| 07654 | 焏 | FLTW | FTW | | | | | |
| 07655 | 牾 | 'F5O | Z5O | | | | | |
| 07656 | 牰 | 'FK3 | ZK.3 | Z.K3 | ZK3 | | | |
| 07657 | 牼 | 'F3H | Z-3H | Z3H | | | | |
| 07658 | 牿 | 'FHO | Z'HO | | | | | |
| 07659 | 猝 | ZT4+ | ZTT+ | ZT+ | ZT4[ | ZTT[ | ZT[ | |
| 07660 | 猗 | ZKJO | ZKJ | | | | | |
| 07661 | 猇 | ZTUR | ZT7R | ZUFR | ZU7R | ZUR | | |
| 07662 | 猑 | ZBFF | ZB2F | ZBF | ZB77 | ZB27 | ZB7 | ZB% |
| 07663 | 猢 | ZHEJ | | | | | | |
| 07664 | 猊 | ZEER | Z;R | | | | | |
| 07665 | 猈 | Z'Q4 | Z'Q+ | ZQ4 | ZQ+ | Z'Q[ | ZQ[ | |
| 07666 | 猔 | Z'GZ | ZGZ | | | | | |
| 07667 | 猏 | Z'PA | Z.PA | ZPA | | | | |
| 07668 | 猞 | Z8HO | Z8O | | | | | |
| 07669 | 玆 | TNTK | | | | | | |
| 07670 | 珶 | E25J | E2J | | | | | |
| 07671 | 珸 | E5O | | | | | | |
| 07672 | 珵 | EO'H | EOE | | | | | |
| 07673 | 珦 | EOA | | | | | | |
| 07674 | 珽 | ETLG | ETJG | ETG | | | | |
| 07675 | 琁 | E'HZ | EEZ | | | | | |
| 07676 | 琇 | E'YS | EY'S | EYS' | EYS | E''S | E'S' | E'S |
| 07677 | 琀 | E8LO | E8JO | | | | | |
| 07678 | 琚 | EE'O | EEO | | | | | |
| 07679 | 琄 | E42 | E48 | | | | | |

07680 琚 EOG
07681 瑀 EE8L EE8J
07682 琋 EX+E EX[E
07683 珴 E'FM EFM
07684 琈 E'3Z EAZ- EAZ
07685 畤 QH-J QHJ. QHJ
07686 畲 8-OQ 8-Q 8OQ
07687 瘦 L2TT
07688 痒 L22E
07689 痏 L2+A L+A L+'A L2[A L[A L['A
07690 痤 L2OS L2S L2OS .L2S
07691 疴 L2UO LU-O LUO
07692 痑 L2AA L22A LAA L2A
07693 痼 L2OO L2OO LOO LOO
07694 皏 'B2H B222 B2HH B2H
07695 皉 'BGF BGF 'BG7 BG7
07696 盬 3HI4 3-+4 3214 3=14 3H4- 3-[4
07697 眣 482T 422T 48=T 42=T 48-K 42-K
07698 眯 42Y
07699 眭 4HH- 4HH 42IH 42H- 42H
07700 眱 4-5T 4+5T 4K5 4[5T
07701 眲 4-4 4P
07702 眴 4'CB 4CB
07703 眳 4AO 4U.O 4C.O
07704 眽 4L'K 4LK
07705 眥 GF4 G74
07706 眻 42EI 4231
07707 眵 4AA 42A
07708 硞 TOHO +1HO ++-O +HO [1HO [[-O [HO
07709 硒 TO-4 +-4 [-4
07710 碑 TOEH +E2O +E++ +EH [E2O [E[[ [EH
07711 硍 TOBK +BK [BK
07712 硊 +ULL [ULL
07713 硌 TOXO +'XO +XO ['XO [XO
07714 砦 GFTO GF+ G7TO G7+ GF[ G7[
07715 硅 TOHH TO2H +HH +2IH +2H [HH [2IH [2H
07716 硐 +U-O +UO [U-O [UO
07717 祤 -YEE -Y2E 23EE 232E =3EE =32E =3=E K2J2 K2C2 -Y2
232 =32 =3=
07718 祧 -YKK -Y2K 23KK 232K =3KK =32K =3=K KKKL KKK K2K
07719 祩 -YTY -Y+Y -Y-Y 23TY 23+Y 23-Y =3TY =3+Y =3-Y KTY
K'+Y K'-Y K+Y -Y[Y 23[Y =3[Y K'[Y K[Y
07720 祪 -YUL 23UL =3UL KULL
07721 祣 -YTK 23TK =3TK KT'K KTK
07722 祫 -Y8O 238O =38O K8-O K8O
07723 祡 GF23 GF=3 GF3 GF-Y G723 G7=3 G73 G7-Y
07724 禼 TUXA TXUA .QUS TUA
07725 秅 'YUL YU2L YU=L YUHL 'U2L 'U=L 'UHL 'UL
07726 秸 'YHO 'IHO '+-O '[-O
07727 桼 2T'Y 2UTY 2-'Y 2TY 2-Y =T'Y =UTY =-'Y =TY =-Y
2UT' =UT' 2-' =-'
07728 秷 'YSH '-SH 'SH
07729 窂 U23J U83J UR3J U32J U3=J U3HJ U3J
07730 窔 U2TX U8TX URTX UT2X UT8X UYRX
07731 窒 U2HH U8HH URHH U22H U82H UR2H .UHH UHH
07732 笵 /3CL /3JL /3L
07733 笻 FFHP /HP /HJ1 /H1J /HC1 /H1C
07734 笥 FFJO /JO
07735 笞 /C-O
07736 笰 FF52 /5'I /521 /5I1 /52
07737 笶 FFOK FFCK /OK /CK /OLM /CLM
07738 笘 FFDO FFUO /DO /UO
07739 笳 FFCO /C'O /CO /J'O
07740 笤 FFTO /I-O /TO
07741 笪 FFB- /B-
07742 笸 FFOX FFOX /O-X /O-X /OX /UX
07743 笱 FFCO /'CO /CO /'JO
07744 第 FFSJ /SJ' /SJ FF5J /5J' /5J
07745 筌 FF8S /8-S /8.S /8S
07746 筏 FFVX /VX /V-X
07747 筓 FFSH /S2O /S++ /SH /S[[
07748 筒 FFCO /CO
07749 筆 FFQI /QI

| | | | | | | | | | | | |
|---|---|---|---|---|---|---|---|---|---|---|---|
| 07750 | 筱 | FFCL | /COL | /CPL | /CL | FFUL | /UOL | /UPL | /UCL | /UL | FFJL |
| | | /JOL | /JPL | /JL | | | | | | | |
| 07751 | 粔 | 2YCC | 2YE | =YCC | =YE | | | | | | |
| 07752 | 粘 | 2YTO | =YTO | | | | | | | | |
| 07753 | 粖 | 2YY+ | 2YY[ | 2Y-Y | =YY+ | =YY[ | =Y-Y | | | | |
| 07754 | 粣 | 2Y40 | =Y40 | | | | | | | | |
| 07755 | 紵 | N3UJ | N.UJ | NU-J | NUJ | | | | | | |
| 07756 | 絶 | N3UF | N.UF | NUF | N3U7 | N.U7 | NU7 | | | | |
| 07757 | 絓 | N3.E | N.E | | | | | | | | |
| 07758 | 紶 | N3HS | NIHS | NHS | | | | | | | |
| 07759 | 紺 | N3H2 | N3H= | N3H- | N2O2 | N2O= | N2O- | N++2 | N++= | N++- | NH2 |
| | | NH= | N[[2 | N[[= | N[[ | | | | | | |
| 07760 | 絅 | N3UO | NUO | | | | | | | | |
| 07761 | 紬 | N3IQ | NIQ | | | | | | | | |
| 07762 | 紩 | N3TK | N32T | N3=T | N3H8 | N'+K | N'-K | NTK | N3- | N2T | N=T |
| | | NH8 | N- | N'[K | | | | | | | |
| 07763 | 絁 | N3TL | NT+L | NTL | NT[L | | | | | | |
| 07764 | 絇 | N3CO | N'CO | NCO | N3JO | N'JO | NJO | | | | |
| 07765 | 紾 | N383 | N83 | | | | | | | | |
| 07766 | 紿 | N3SO | NSO | | | | | | | | |
| 07767 | 絊 | N3Y- | NY- | | | | | | | | |
| 07768 | 紻 | N3UK | NUK | | | | | | | | |
| 07769 | 紨 | N3TJ | NT-J | NTJ. | NTJ | | | | | | |
| 07770 | 罟 | 4HHI | 4HH | 42H1 | 42H | 42JH | | | | | |
| 07771 | 羙 | 2E.3 | 2E.4 | =E.3 | =E.4 | | | | | | |
| 07772 | 羜 | 2EUJ | =EUJ | | | | | | | | |
| 07773 | 羝 | 2EK. | 2EK- | =EK. | =EK- | EK- | EK. | | | | |
| 07774 | 羐 | 2E52 | =E52 | | | | | | | | |
| 07775 | 翊 | TKEE | TK2E | TK2 | | | | | | | |
| 07776 | 翋 | EETK | 2ETK | =ETK | ET2- | 2TK | 2T2- | =TK | =T2- | | |
| 07777 | 翍 | EEEX | 2EEX | =EEX | 2EX | =EX | 2U1X | =U1X | | | |
| 07778 | 翐 | EETK | 2ETK | =ETK | EE- | 2E- | =E- | 2'+K | ='+K | 2'-K | ='-K |
| | | ='2T | 2'=T | ='=T | 2'H8 | ='H8 | 2'[K | ='[K | | | |
| 07779 | 翑 | EECO | 2ECO | =ECO | E'CO | 2'CO | ='CO | 2CO | =CO | EEJO | 2EJO |
| | | =EJO | E'JO | 2'JO | ='JO | | | | | | |
| 07780 | 翌 | EE+X | 2E+X | =E+X | 2+X. | =+X. | 2+X | =+X | EE[X | 2E[X | =E[X |
| | | 2[X. | =[X. | 2[X | =[X | | | | | | |
| 07781 | 翇 | EE83 | 2E83 | =E83 | 283 | =83 | | | | | |
| 07782 | 栩 | Y-EE | Y-2E | Y-2 | | | | | | | |
| 07783 | 耟 | 2YCC | 2YE | =YCC | =YE | | | | | | |
| 07784 | 耞 | 2YCO | =YCO | 2YJO | =YJO | | | | | | |
| 07785 | 耛 | 2YSO | =YSO | | | | | | | | |
| 07786 | 聇 | -4-G | P-G | | | | | | | | |
| 07787 | 聃 | -4UH | 4UIH | 4H+- | 4UH | PUIH | PU+- | 4H[- | PU[- | | |
| 07788 | 聈 | PSC' | PSC' | -4NC | | | | | | | |
| 07789 | 脘 | AU2R | AU=R | AUR | | | | | | | |
| 07790 | 脥 | AKTT | AK2T | AKT | A-3T | | | | | | |
| 07791 | 脙 | A+4. | A+4 | A-3. | A+3 | A[4. | A[4 | A[3 | | | |
| 07792 | 脛 | A-3H | A3H | | | | | | | | |
| 07793 | 腥 | AQ'H | AOE | | | | | | | | |
| 07794 | 脟 | AA-J | AAJ. | AAJ | | | | | | | |
| 07795 | 脬 | AAZ- | A'3Z | AAZ | | | | | | | |
| 07796 | 脞 | A2TH | ATTH | | | | | | | | |
| 07797 | 脡 | A'HZ | AEZ | | | | | | | | |
| 07798 | 脕 | ADBR | AUBR | ADR | | | | | | | |
| 07799 | 脧 | BA92 | | | | | | | | | |
| 07800 | 脝 | ATOZ | ATOJ | | | | | | | | |
| 07801 | 脤 | ATQ- | ATQ' | ATQ | | | | | | | |
| 07802 | 舑 | HOUH | HOA | | | | | | | | |
| 07803 | 舸 | 'A-J | A-JO | AJO | | | | | | | |
| 07804 | 舳 | 'AIQ | A-IQ | AIQ | | | | | | | |
| 07805 | 舺 | 'AQI | A-Q1 | | | | | | | | |
| 07806 | 舴 | 'ATK | 'A'E | A-TK | A-'E | | | | | | |
| 07807 | 舲 | 'A8S | A-8S | A8-S | A8.S | A8S | | | | | |
| 07808 | 艳 | 52DL | 52UL | 52L | | | | | | | |
| 07809 | 茺 | H3UR | H3ER | X3UR | X3ER | | | | | | |
| 07810 | 荖 | ++CG | H.CG | HCG | X.CG | XCG | [[CG | | | | |
| 07811 | 莨 | H-BK | H.BK | X-BK | X.BK | | | | | | |
| 07812 | 荼 | +++3 | +++4 | H+3. | H+4. | H-3. | H-4. | H+3 | H+4 | X+3. | X+4 |
| | | X-3. | X-4. | [[[3 | [[[4 | H[3. | H[4. | H[3 | H[4 | X[3. | X[4 |
| 07813 | 莠 | ++HC | HHC2 | HHC= | XHC2 | XHC= | XHC | [[HC | | | |
| 07814 | 荳 | ++. | H-OK | H. | X-OK | X. | [[. | | | | |
| 07815 | 莔 | ++-Q | H-Q | X-Q | [[-Q | | | | | | |

| | | | | | | | | | | | |
|---|---|---|---|---|---|---|---|---|---|---|---|
| 07816 | 扶 | ++FK | ++F2 | ++F8 | HF2T | HF=T | HF-K | HFH8 | HFK | HF2 | HF8 |
| | | XF2T | XF=T | XF-K | XFH8 | XFK | XF2 | XF8 | [[FK | [[F2 | [[F |
| 07817 | 抄 | ++F3 | HF3' | HF3 | XF3' | XF3 | [[F3 | | | | |
| 07818 | 趏 | ++HT | HH2T | HHTT | XH2T | XHTT | XHT | [[HT | | | |
| 07819 | 菩 | ++YO | HYO | XYO | [[YO | | | | | | |
| 07820 | 菁 | ++EO | HE'O | HEO | XE'O | XEO | [[EO | | | | |
| 07821 | 怒 | ++DG | HD.G | HDG | XD.G | XDG | [[DG | | | | |
| 07822 | 莤 | ++OU | ++OU | HO2U | HO2U | HO8U | HO8U | HORU | HORU | HOU | HOU |
| | | XO2U | XO2U | XO8U | XO8U | XORU | XORU | XOU | XOU | [[OU | [[OU |
| 07823 | 華 | ++AZ | H'3Z | HAZ- | HAZ | X'3Z | XAZ- | XAZ | [[AZ | | |
| 07824 | 萋 | ++AV | H'3V | HAV | X'3V | XAV | [[AV | | | | |
| 07825 | 莃 | ++XE | HX+E | HXE | XX+E | XXE | [[XE | HX[E | XX[E | | |
| 07826 | 楚 | H2OR | X2OR | | | | | | | | |
| 07827 | 基 | HTTH | H2TH | XTTH | X2TH | | | | | | |
| 07828 | 蓬 | ++EZ | H'HZ | HEZ | X'HZ | XEZ | [[EZ | | | | |
| 07829 | 蕺 | ++FM | H'FM | HFM | X'FM | XFM | [[FM | | | | |
| 07830 | 稀 | HTTK | HT'E | XTTK | XT'E | | | | | | |
| 07831 | 蒺 | HS2X | HS8X | HSRX | XS2X | XS8X | XSRX | | | | |
| 07832 | 鞋 | ++ZE | HZC+ | HZEI | HZE | XZC+ | XZEI | XZE | [[ZE | HZC[ | XZC[ |
| 07833 | 袜 | ++3Y | [[3Y | H3Y | X3Y | | | | | | |
| 07834 | 稜 | ++3X | [[3X | H3UX | H3DX | X3UX | X3DX | X3X | | | |
| 07835 | 鞏 | ++HQ | H-Q- | H+Q+ | HHQ | X+Q+ | XHQ | [[HQ | H[Q[ | X[Q[ | |
| 07836 | 玦 | +4H- | HIH- | HHUT | XIH- | XHUT | XH- | [[H- | | | |
| 07837 | 旌 | ++DM | ++MD | HDM | HMD | XDM | XMD | [[DM | [[MD | | |
| 07838 | 荷 | ++3A | H3A | X3A | [[3A | | | | | | |
| 07839 | 舫 | ++4C | H4C' | H4C | X4C' | X4C | [[4C | | | | |
| 07840 | 芻 | ++QC | [[QC | HQC' | HQC | XQC' | XQC | | | | |
| 07841 | 琦 | HO8L | HO8J | XO8L | XO8J | OH8L | OH8J | | | | |
| 07842 | 慼 | TU7G | TUG' | T7G' | U7G' | TUG | U7G | | | | |
| 07843 | 摩 | TU7J | T7AJ | U7AJ | T7J | U7J | UAJ | | | | |
| 07844 | 蛟 | OSTN | STN | OSTN | | | | | | | |
| 07845 | 蚷 | OSCC | OSE | SCC | SE | OSCC | OSE | | | | |
| 07846 | 蚑 | S+X. | S[X. | | | | | | | | |
| 07847 | 蛁 | OSDO | OSUO | SDO | SUO | OSDO | OSUO | | | | |
| 07848 | 蛅 | OSTO | SI-O | STO | OSTO | | | | | | |
| 07849 | 蚋 | OSUH | SUIH | SU+- | OSUH | SU[- | | | | | |
| 07850 | 蚰 | OSIQ | SIQ | SQ | OSIQ | | | | | | |
| 07851 | 蛈 | OSTK | OS- | S'+K | S'-K | S'2T | S'=T | S'H8 | OSTK | OS- | S'[K |
| 07852 | 蚹 | OSTJ | ST-J | STJ. | STJ | OSTJ | | | | | |
| 07853 | 蚳 | OSK- | OSK. | S'K- | S'K. | SK- | SK. | SK | OSK- | OSK. | |
| 07854 | 蚚 | SLT. | | | | | | | | | |
| 07855 | 蛌 | OSAS | S'3S | S'AS | SLS. | OSAS | | | | | |
| 07856 | 蚴 | OSNC | SNC | SNC' | OSNC, | | | | | | |
| 07857 | 蛍 | YLOS | YLS | YLOS | | | | | | | |
| 07858 | 蚼 | OSCO | S'CO | SCO | OSCO | S'JO | | | | | |
| 07859 | 蚒 | OS-A | OSTA | S-UT | S-A | STA | OS-A | OSTA | | | |
| 07860 | 蚽 | OS23 | OS=3 | S-3- | S23 | S=3 | OS23 | OS=3 | | | |
| 07861 | 蚾 | OSEX | SUIX | SEX | OSEX | | | | | | |
| 07862 | 衎 | 'TTJ | TTNJ | TNJ | JTNJ | JTJ | JNJ | | | | |
| 07863 | 祂 | K.UF | KUF | K.U7 | KU7 | | | | | | |
| 07864 | 袕 | K.U8 | KU8 | | | | | | | | |
| 07865 | 袨 | KTN | | | | | | | | | |
| 07866 | 袢 | K220 | K2++ | K221 | K2=1 | K2H | K2X | K2[[ | | | |
| 07867 | 袪 | KIHS | KHS | | | | | | | | |
| 07868 | 袚 | K+X. | K[X. | | | | | | | | |
| 07869 | 袑 | KDO | KUO | | | | | | | | |
| 07870 | 衲 | KUH | KUIH | KU+- | KU[- | | | | | | |
| 07871 | 袟 | K'2T | K'=T | K'H8 | KTK | K- | | | | | |
| 07872 | 袘 | KT+L | KTL | KT[L | | | | | | | |
| 07873 | 袧 | K'CO | KCO | K'JO | | | | | | | |
| 07874 | 袙 | K'B | | | | | | | | | |
| 07875 | 袛 | K'K- | K'K. | KK- | KK. | | | | | | |
| 07876 | 袗 | K83' | K83 | | | | | | | | |
| 07877 | 袞 | TSJK | TSK | TJ'K | | | | | | | |
| 07878 | 袞 | TSOK | TS'K | | | | | | | | |
| 07879 | 袤 | TCLK | TJLK | TULK | | | | | | | |
| 07880 | 袓 | KA- | K4- | | | | | | | | |
| 07881 | 袎 | KNC' | KNC | | | | | | | | |
| 07882 | 墅 | -4TZ | -4'Z | | | | | | | | |
| 07883 | 舦 | UALK | UAJK | UAK | | | | | | | |
| 07884 | 舨 | UASX | UAST | UAX | | | | | | | |
| 07885 | 犄 | 'FUA | ZUA | | | | | | | | |
| 07886 | 訰 | ;-UL | ;+UL | ;-EL | ;+EL | ;. | ;[UL | ;[EL | | | |

7887 訧 40.K ;.K ;-R. ;.-R ;+L. ;.+L ;[L. ;.[L
7888 訬 403' ;3'
7889 訞 40'K 40-K 402T 40=T 40H8 ;'K ;-K ;2T ;=T ;H8
7890 訤 40+S 40[S
7891 訩 4QHZ 4OZH 4OR2 4OR=
7892 豜 Z22 ZHH ZL22 ZLHH
7893 豝 ZBL ZLBL
7894 豽 AZUT AZA ZA
7895 貥 42TR 42R
7896 赽 HGLK HGJK
7897 赻 HG3'
7898 赹 HGC2 HGC= G'C2 G'C= GC2 GC=
7899 趼 OG22 OGHH OGH G22 GHH GH
7900 跂 OG+X G+X OG[X G[X
7901 趹 OGLK OHJK GLK GJK
7902 跋 OGST OGSX G'S. GST GSX
7903 跁 OGBL GBL
7904 軘 -Q-. +Q+. HQ-L HQ+L Q-UL Q+UL Q-EL Q+EL Q-L Q+L
QUL [Q[. HQ[L Q[UL Q[EL Q[L
7905 軞 HQEL HQ3L Q'2L Q'=L QEL
7906 軝 HQ'K HQCM Q'K QCM
7907 軜 +Q+A HQUT QUT [Q[A
7908 軗 HQRX QR-X QRX
7909 軠 -Q-E +Q+E HQ'H HQE Q'H QE [Q[E
7910 軡 HQ8L HQ8J Q8-L Q8-J Q8.L Q8.J Q8L Q8J
07911 迣 33'Z 33Z
07912 迠 +A.Z [A.Z
07913 述 +3.Z +4.Z -3.Z -4.Z +3Z +4Z [3.Z [4.Z [3Z [4Z
07914 迼 5OZ
07915 迶 TOCZ TQZ
07916 迲 S2XZ S8XZ SRXZ SXZ
07917 郯 WWP 2WP =WP
07918 鄯 -EVP +EVP -VP +VP EVP [EVP [VP
07919 郰 PXP -4XP 4XP
07920 郴 YYP 2YP =YP
07921 郲 YTTP Y2TP YTP
07922 郳 EERP ;RP
07923 郹 'GZP GZP
07924 郼 'Q4P 'Q+P Q4P Q+P 'Q[P Q[P
07925 郶 IEAP EAP
07926 郙 X+AP X[AP XAP
07927 酖 -QUR -QER 9UR 9ER
07928 酘 -QRX 9RX
07929 酚 -Q8D -Q2D 98D 92D
07930 酓 8L-Q 8J-Q 8L9 8J9 8-L9 8.L9 8-J9 8.J9
07931 酕 -Q3L -QEL 93L 9EL
07932 釬 8KHI 8K-+ 8K2I 8K=I $HI $-+ $2I $=I 6HI 6-+
62I 6=I 8K-[ $-[ 6-[
07933 釴 8E2M 8KM $M 6M
07934 釱 8E2K 8KK $K 6K
07935 釳 8KTZ $TZ 6TZ
07936 釸 8KU. 8KC. $U. $C. 6U. 6C.
07937 釤 8E23 8K3 $3 63
07938 釹 8E2V 8KV $V 6V
07939 釪 8K2J 8K=J 8KHJ $2J $=J $HJ 62J 6=J 6HJ
07940 釫 8K-S 8K-5 8K2C 8K=C $-S $-5 $2C $=C 6-S 6-5
62C 6=C
07941 釷 8KIH 8K+- $IH $+- 6IH 6+- 8K[- $[- 6[-
07942 釨 8KZ- $Z- 6Z-
07943 釖 8KJ' $J' 6J'
07944 䭾 ES'K ES-K ES2T ES=T ESH8 ESK
07945 閅 PP3 M3
07946 閈 PPHI PP-+ PPH MHI M-+ PP-[ M-[
07947 陏 PH'B PHB- PHB
07948 陭 PK-J PKJ. PKJ
07949 陫 3IEE 3I2E PEE P2E
07950 陶 PC2Y P'CY P'JY PCY
07951 陯 P8-A P8A
07952 雔 -L.E -LTE -L'E -LE' MTTE MTHH MT.E MTE ME
07953 靪 HO+J HO+J H+-J H+J HO[J HO[J H[-J H[J
07954 頏 9T42 9T48 9T2 9T8
07955 飥 8S2L 8S=J 8SHL 8SL 8F2L 8F=J 8FHL 8FL 872L 87=
87HL 87L 8'-L 82L 8=L 8HL 8L

| | | | | | | | | | | | |
|---|---|---|---|---|---|---|---|---|---|---|---|
| 07956 | 尶 | 92-4 | 92T4 | 9K4 | | | | | | | |
| 07957 | 偺 | TU40 | | | | | | | | | |
| 07958 | 偭 | TUTE | TU'E | TUE | | | | | | | |
| 07959 | 傈 | TKE4 | | | | | | | | | |
| 07960 | 偣 | T2EH | | | | | | | | | |
| 07961 | 傅 | TEEA | TEUH | | | | | | | | |
| 07962 | 傑 | TE83 | TE3 | TE84 | T3T3 | T3T4 | | | | | |
| 07963 | 傢 | TEN3 | TEN | TE3 | TIEN | | | | | | |
| 07964 | 偏 | TEJ4 | TEC4 | T7 | | | | | | | |
| 07965 | 傎 | T+4K | T+42 | T+48 | T+2 | T+8 | TF4K | TFK | T74K | T[4K | T[4 |
| | | T[48 | T[2 | T[8 | | | | | | | |
| 07966 | 傴 | TBEE | TB2E | TBE | TB2 | | | | | | |
| 07967 | 偞 | TGFY | TGY | TG7Y | | | | | | | |
| 07968 | 傜 | TAHE | | | | | | | | | |
| 07969 | 傒 | TANK | | | | | | | | | |
| 07970 | 傂 | TLTR | TLUR | TLR | | | | | | | |
| 07971 | 傕 | T++P | THP | TXP | TH-4 | TH4 | TX-4 | TX4 | T[[P | | |
| 07972 | 兟 | HRHR | HRR | | | | | | | | |
| 07973 | 凔 | 28E0 | =8E0 | | | | | | | | |
| 07974 | 匔 | 'CHO | 'JHO | 'CXO | 'JXO | CH80 | CX80 | | | | |
| 07975 | 翢 | C4J5 | J4J5 | C45 | | | | | | | |
| 07976 | 厤 | L2'Y | L'' | L2' | | | | | | | |
| 07977 | 厦 | L+4K | L+42 | L+48 | LF4K | LF42 | LF48 | L74K | L742 | L748 | L[4] |
| | | L[42 | L[48 | | | | | | | | |
| 07978 | 喑 | QTKB | | | | | | | | | |
| 07979 | 嘵 | OTOR | OTUR | | | | | | | | |
| 07980 | 嗾 | OLHX | OLX | | | | | | | | |
| 07981 | 嗪 | OTL3 | OT23 | OTX3 | OT3 | | | | | | |
| 07982 | 嘟 | O.SP | O.FP | O.7P | OBSP | OBFP | OB7P | | | | |
| 07983 | 喲 | OTS4 | OT54 | OT4 | | | | | | | |
| 07984 | 嘢 | OHEE | OH; | | | | | | | | |
| 07985 | 嘦 | O-4V | O4V | | | | | | | | |
| 07986 | 嗜 | OFFB | O2FB | O77B | O27B | O%'B | O%B | | | | |
| 07987 | 嗒 | OH+O | OH[O. | | | | | | | | |
| 07988 | 嗤 | O++Q | OHQ | OXQ | O[[Q | | | | | | |
| 07989 | 嗎 | OQUS | | | | | | | | | |
| 07990 | 嗔 | OC04 | OC4 | OJ04 | OJ4 | | | | | | |
| 07991 | 嗐 | OATB | OAB | | | | | | | | |
| 07992 | 嗹 | O'BE | OBE | | | | | | | | |
| 07993 | 嗶 | O8OH | O8-H | O8H | | | | | | | |
| 07994 | 粥 | OOTT | OO3T | OO3O | 2O3T | 2OTT | =O3T | =OTT | | | |
| 07995 | 嗇 | OOOE | 3OE | 3O1U | OOO\ | 3O\ | | | | | |
| 07996 | 嗤 | OH2L | | | | | | | | | |
| 07997 | 嗰 | OTOH | OTOH | OTQ | | | | | | | |
| 07998 | 嗥 | OHOH | | | | | | | | | |
| 07999 | 嗚 | OQUO | OAUO | | | | | | | | |
| 08000 | 圖 | OETA | OEM | | | | | | | | |
| 08001 | 堩 | HI2E | H12B | H1=B | HIEE | HICC | HICE | HIE | | | |
| 08002 | 堉 | HTKB | HTB | IHTB | | | | | | | |
| 08003 | 堙 | H-4H | H4H | IH4H | | | | | | | |
| 08004 | 堞 | HHLY | HHY | IHHY | | | | | | | |
| 08005 | 堨 | HTAK | HMK | IHMK | | | | | | | |
| 08006 | 堣 | HQUS | IHQA | | | | | | | | |
| 08007 | 堀 | HBCL | IHBC | IHBL | | | | | | | |
| 08008 | 堰 | HHHH | HHXH | IHXH | | | | | | | |
| 08009 | 塈 | BFRH | BSRH | B7RH | BCRH | BRH | BFKH | BSKH | B7KH | BKH | |
| 08010 | 堅 | SJXH | SXH | STXH | JTXH | | | | | | |
| 08011 | 堜 | IHY4 | HY4 | | | | | | | | |
| 08012 | 堛 | H-OQ | HOQ | IH-Q | IHOQ | | | | | | |
| 08013 | 堝 | HB'4 | HPI4 | HP4 | HB4 | IHB4 | IHP4 | | | | |
| 08014 | 堿 | HLOM | H-OM | IHOM | | | | | | | |
| 08015 | 堶 | IH+A | IH[A | H+HA | H[HA | | | | | | |
| 08016 | 塢 | HOOS | H2OS | HO-S | HOO5 | H2O5 | HO-5 | HOOC | H2OC | HO2C | HO= |
| | | IHOS | IHO5 | | | | | | | | |
| 08017 | 塭 | IHHH | HHQH | | | | | | | | |
| 08018 | 堌 | HR-S | HR'S | HRS | IHRS | | | | | | |
| 08019 | 堭 | H'BE | HBE | IHBE | | | | | | | |
| 08020 | 堬 | H8AJ | IH8J | | | | | | | | |
| 08021 | 遾 | 3EHH | | | | | | | | | |
| 08022 | 畁 | T4K2 | | | | | | | | | |
| 08023 | 媯 | VAS4 | VA54 | VA4 | VTS4 | VT54 | VT4 | | | | |
| 08024 | 媔 | VTOH | VTOH | VTQ | | | | | | | |
| 08025 | 媟 | VHLY | VHY | | | | | | | | |

08026 嫛 SJXV SXV STXV JTXV
08027 媢 VB4
08028 媞 VB-G VBG
08029 媎 VB-C VBC.
08030 媧 VQA
08031 婼 VH+O VH[O
08032 媥 V'PA V.PA VPUH VPA
08033 媬 VTOY
08034 媕 V8OH V8-H V8H
08035 媮 V8AJ
08036 媨 VHHH VHXH
08037 媖 V2EK
08038 媊 VKAJ
08039 媗 VU2B VU=B VUB- VU- VU2 VU=
08040 嬬 VSJY VSY VJY
08041 媋 VE8B VEB V3TB
08042 媩 V+OA V[OA
08043 婤 V+UH V+A V[UH V[A
08044 婽 VP2X VP=X VPX
08045 媘 V++Q VHQ VXQ V[[Q
08046 媜 VT42 VT48 VT2 VT8
08047 媏 VETA VEM V\TA V\M
08048 媓 V'BE VBE
08049 嫈 'YWV 'WV
08050 寫 UAS4 UA54 UTS4 UT54
08051 寍 UG4- UG4
08052 寎 UE8L
08053 寋 UB-G
08054 僕 UTEX
08055 寉 UT42 UT48 UT2 UT8
08056 猻 UUUA UULA UUTA UK-A UKA UUUM UULM UUTM UKM
08057 對 HOKJ
08058 尲 KHQH
08059 嵛 E2-Q EKQ E29 IU29 IUKQ \2-Q \KQ \29
08060 嵃 ETL3 ET23 ETX3 IUT3 \TL3 \T23 \TX3
08061 嵈 EKNN EK2N EKN EHNN EH2N EHN EXNN EX2N EXN \KNN
\K2N \KN \HNN \H2N \HN \XNN \X2N \XN
08062 嵑 EH2L EHL \H2L \HL
08063 嵋 EB'4 EP4 EP14 IUP4 IUB4 \B'4 \P4 \P14
08064 嵝 EOOC EOOS EOO5 EO-S EO-5 EO2C EO=C EOS EO5 EOC
IUOS IUO5 IUOC \OOC \OOS \OO5 \O-S \O-5 \O2C \O=C
\OS \O5 \OC
08065 嵎 EB-C EBC IUBC \B-C \BC
08066 嵑 EBCL EBC IUBC IUBL \BCL \BC
08067 嵘 EQUS EQA IUQA \QUS \QA
08068 嵕 EU2X EU8X EURX EUX IUUX EXUX EUXX \U2X \U8X \URX
\UX \XUX \UXX
08069 崳 EVAJ EVJ IU8J \VAJ \VJ
08070 嵫 ETDL EDTL ETL IUDL \TDL \DTL \TL
08071 嵓 BCDA
08072 嵐 EQG IUQG \QG
08073 嵙 E42J E48J \42J \48J
08074 嶙 E'Y+ EY2+ EY=+ EY+ E'2+ E'=+ IUY+ IU'+ E'Y[ EY2[
EY=[ EY[ E'2[ E'=[ IUY[ IU'[ \'Y+ \Y2+ \Y=+ \Y+
\'2+ \'=+ \'Y[ \Y2[ \Y=[ \Y[ \'2[ \'=[
08075 嵟 ETEH ETH E]EH E]H IUTH IU]H \TEH \TH \]EH \]H
08076 嵛 IUTE ET2E ETUE \T2E \TUE
08077 嵂 IUTJ ETOJ ETUJ ETJ \TOJ \TUJ \TJ
08078 嵒 IU+K IU+2 IU+8 E+4K E+42 E+48 IUFK IUF2 IUF8 EF4K
EF42 EF48 IU7K IU72 IU78 E74K E742 E748 IU[K IU[2
IU[8 E[4K E[42 E[48 \+4K \+42 \+48 \F4K \F42 \F48
\F4K \742 \748 \[4K \[42 \[48
08079 嵃 IUBG EB-G EBG \B-G \BG
08080 嵼 IUBE E'BE EBE \'BE \BE
08081 嵺 EHHJ IUHJ \HHJ
08082 嵻 EYHH EY2H EYH IUYH \YHH \Y2H \YH
08083 嵸 IUOM IUMO E-OM EM-O EOM EMO \-OM \M-O \OM \MO
08084 幅 EPSH EPH UIPH
08085 幀 UIT2 UIT8 ET42 ET48
08086 鑫 OFHF OFTF OFKF O-FF O-FK OFF O7H7 O7T7 O7K7 O-77
O-7K O77 O-%K O%K
08087 徦 'TPX ]P2X ]P=X ]PCX ]PRX ]PX
08088 徥 'TBG ]B-G ]BG
08089 徫 'THH ]HOH ]HH

| | | | | | | | | | | | |
|---|---|---|---|---|---|---|---|---|---|---|---|
| 08090 | 悰 | 3TOG | 3TG | | | | | | | | |
| 08091 | 憲 | .UBG | UBG | | | | | | | | |
| 08092 | 愸 | UALG | UAG | | | | | | | | |
| 08093 | 惢 | GGG | | | | | | | | | |
| 08094 | 惎 | H28G | H=8G | | | | | | | | |
| 08095 | 怒 | TYXG | G3XG | GXG | | | | | | | |
| 08096 | 㥓 | I2TB | ITKB | ITB | | | | | | | |
| 08097 | 惲 | I2UQ | IUHQ | IUQ | | | | | | | |
| 08098 | 愊 | I2-Q | I2OQ | I-OQ | I-Q | IOQ | | | | | |
| 08099 | 愮 | I2HL | IH2L | IHRL | | | | | | | |
| 08100 | 愺 | I2H+ | IHO+ | IHO+ | IH+ | I2H[ | IHO[ | IHO[ | IH[ | | |
| 08101 | 惵 | I2HY | IHLY | IHY | | | | | | | |
| 08102 | 惕 | IB-C | | | | | | | | | |
| 08103 | 悖 | I2CZ | ICBZ | ICZ | | | | | | | |
| 08104 | 惼 | I2PA | I'PA | I.PA | IPUH | IPA | | | | | |
| 08105 | 愯 | I2UX | IU2X | IU8X | IURX | IXUX | IUXX | | | | |
| 08106 | 慜 | YLTG | YTG | | | | | | | | |
| 08107 | 愃 | I2U- | IU2B | IU=B | IUB- | IU- | | | | | |
| 08108 | 愘 | IUXO | | | | | | | | | |
| 08109 | 愝 | I2CV | ICBV | ICV | | | | | | | |
| 08110 | 恓 | I2TQ | ITOH | ITOH | ITQ | | | | | | |
| 08111 | 惿 | I2BG | IB-G | IBG | | | | | | | |
| 08112 | 悵 | I2QK | IQ-K | IQK | | | | | | | |
| 08113 | 愋 | I2AX | IAHX | IAX | | | | | | | |
| 08114 | 廤 | 'PWW | 'P2W | .PWW | .P2W | PWW | P2W | | | | |
| 08115 | 掔 | EXF | EX3J | EXEJ | CUXF | | | | | | |
| 08116 | 掱 | FFF | 3F | | | | | | | | |
| 08117 | 掰 | F8DF | F2DF | F8F | FDF | | | | | | |
| 08118 | 揎 | FU2B | FU=B | FUB- | FU- | FUB | | | | | |
| 08119 | 揥 | FTUE | FT2E | | | | | | | | |
| 08120 | 揨 | FTOJ | FTUJ | | | | | | | | |
| 08121 | 揯 | FI2E | FI2B | FI=B | FIEE | FICC | FICE | FIE | | | |
| 08122 | 撤 | FKAJ | | | | | | | | | |
| 08123 | 搗 | FAS4 | FA54 | FA4 | FTS4 | FT54 | | | | | |
| 08124 | 揳 | FEDK | | | | | | | | | |
| 08125 | 揊 | F-OQ | FOQ | | | | | | | | |
| 08126 | 揠 | FCBV | FCV | | | | | | | | |
| 08127 | 揶 | F-4P | F4P | | | | | | | | |
| 08128 | 搖 | FH2L | FH8L | FHRL | | | | | | | |
| 08129 | 揲 | FHLY | FHY | | | | | | | | |
| 08130 | 揵 | FEHZ | | | | | | | | | |
| 08131 | 摡 | FBFR | FBSR | FB7R | FBR | | | | | | |
| 08132 | 揹 | FLGA | FLA | FJGA | FJA | | | | | | |
| 08133 | 掾 | FOZ | FLLZ | FOZL | | | | | | | |
| 08134 | 揝 | FATB | FAB | | | | | | | | |
| 08135 | 搶 | F8OH | F8-H | F8H | | | | | | | |
| 08136 | 揄 | F8AJ | | | | | | | | | |
| 08137 | 搏 | F'BE | FBE | | | | | | | | |
| 08138 | 摙 | FTDL | FDTL | FTL | FDL | | | | | | |
| 08139 | 搞 | F2-Q | FKQ | F2O | | | | | | | |
| 08140 | 揇 | F+UH | F+A | F[UH | F[A | | | | | | |
| 08141 | 揔 | FQG | | | | | | | | | |
| 08142 | 搌 | FQ-K | FQK | | | | | | | | |
| 08143 | 掏 | F'C; | F'J; | FC4O | FC; | | | | | | |
| 08144 | 揰 | FHQH | | | | | | | | | |
| 08145 | 揗 | FL+4 | FL4 | FL[4 | | | | | | | |
| 08146 | 揙 | F'PA | F.PA | FPUH | FPA | | | | | | |
| 08147 | 敍 | KJ+X | KJX | KJ[X | | | | | | | |
| 08148 | 敘 | KJTX | KJX | | | | | | | | |
| 08149 | 敠 | 4XTX | 4XX | | | | | | | | |
| 08150 | 敹 | QYTX | QYX | | | | | | | | |
| 08151 | 敆 | 8LGX | 8JGX | 8GTX | 8GX | | | | | | |
| 08152 | 故 | TKOX | TOTX | TOX | | | | | | | |
| 08153 | 敥 | WWTX | 2WTX | =WTX | | | | | | | |
| 08154 | 斌 | TXGM | TXMG | XGM | | | | | | | |
| 08155 | 斝 | OOU+ | OU2+ | OU=+ | OU+ | =U2+ | OOU[ | OU2[ | OU=[ | OU[ | =U2 |
| 08156 | 斞 | EET+ | ET2+ | ET=+ | ;T2+ | ;T=+ | EET[ | ET2[ | ET=[ | ;T2[ | ;T= |
| 08157 | 斮 | HBLT | HHBT | HBT | | | | | | | |
| 08158 | 旋 | TDTK | DTKK | DT2K | | | | | | | |
| 08159 | 旐 | TDT3 | TD3 | DTT3 | | | | | | | |
| 08160 | 晼 | BUAL | BUL | | | | | | | | |
| 08161 | 晬 | BTT+ | BT4+ | BT+ | BTT[ | BT4[ | BT[ | | | | |
| 08162 | 晻 | BKQL | BKL | | | | | | | | |

| | | | | | | | | | | | |
|---|---|---|---|---|---|---|---|---|---|---|---|
| 08163 | 眭 | B'TE | BT.E | B].E | B]E | | | | | | |
| 08164 | 睒 | BWW | B2W | | | | | | | | |
| 08165 | 睗 | BBC2 | BBC | | | | | | | | |
| 08166 | 睓 | BUHK | BQ2 | BQ8 | | | | | | | |
| 08167 | 睨 | BEER | B2ER | BER | B:R | | | | | | |
| 08168 | 睿 | CRRB | 2CRB | =CRB | RRB | | | | | | |
| 08169 | 椌 | YU2H | YU8H | YURH | YUH | | | | | | |
| 08170 | 棓 | YTKO | | | | | | | | | |
| 08171 | 椄 | YTKV | YTV | | | | | | | | |
| 08172 | 棜 | YTD2 | YTD= | YT2 | YT= | YD82 | YD8= | YD2 | YD= | | |
| 08173 | 椪 | Y2H2 | YK4- | | | | | | | | |
| 08174 | 棬 | Y2HL | Y2L | | | | | | | | |
| 08175 | 棪 | YWW | Y2W | | | | | | | | |
| 08176 | 椶 | YH2X | YH8X | YHRX | YHX | | | | | | |
| 08177 | 椏 | Y-U- | Y2UU | Y=UU | Y2U | Y=U | | | | | |
| 08178 | 棖 | YE-K | YEK | | | | | | | | |
| 08179 | 椒 | Y-4X | YPX | | | | | | | | |
| 08180 | 棫 | YO-M | YOM | YMO- | | | | | | | |
| 08181 | 棤 | YHHB | Y22B | YHB | | | | | | | |
| 08182 | 棶 | YYTT | YY2T | YYT | | | | | | | |
| 08183 | 椓 | YZL. | YZL | YZ. | | | | | | | |
| 08184 | 椐 | YP+O | YPO | YP[O | | | | | | | |
| 08185 | 椵 | Y4X | | | | | | | | | |
| 08186 | 棡 | YUKE | | | | | | | | | |
| 08187 | 椇 | Y4-2 | Y4-8 | YAK | Y4K | | | | | | |
| 08188 | 棌 | Y'3Y | YAY | | | | | | | | |
| 08189 | 椈 | YC2Y | Y'CY | YCY | YJ2Y | Y'JY | | | | | |
| 08190 | 椷 | YEET | Y:T | | | | | | | | |
| 08191 | 梃 | Y'GZ | YGZ | | | | | | | | |
| 08192 | 椑 | Y'Q4 | Y'Q+ | YQ4 | YQ+ | Y'Q[ | YQ[ | | | | |
| 08193 | 棯 | Y8LG | Y8JG | Y8G | | | | | | | |
| 08194 | 棆 | Y8-A | Y8A | | | | | | | | |
| 08195 | 棩 | Y3LQ | Y3Q | | | | | | | | |
| 08196 | 棃 | -4XY | 4XY | PXY | | | | | | | |
| 08197 | 棐 | EEY | 2EY | =EY | | | | | | | |
| 08198 | 棽 | YY8L | YY8J | YYL | YYJ | 2Y8L | 2Y8J | =Y8L | =Y8J | | |
| 08199 | 棼 | YY8D | YY2D | YYD | | | | | | | |
| 08200 | 棨 | 'PXY | .PXY | PTXY | PXY | | | | | | |
| 08201 | 椋 | YTO3 | YT3 | | | | | | | | |
| 08202 | 椊 | YTT+ | Y2T+ | YT4+ | YTT[ | Y2T[ | YT4[ | | | | |
| 08203 | 椗 | YU-G | YUG | | | | | | | | |
| 08204 | 棎 | YU2Y | YU8Y | YURY | YUY | | | | | | |
| 08205 | 棈 | YIEA | YEA | | | | | | | | |
| 08206 | 棝 | YO+O | YO[O | YO+O | YO[O | | | | | | |
| 08207 | 椢 | YO'Y | YO' | YO'Y | YO' | | | | | | |
| 08208 | 椁 | YAEJ | YAJ | | | | | | | | |
| 08209 | 椴 | YAPK | YAPX | YAX | | | | | | | |
| 08210 | 棑 | YEE | Y2E | | | | | | | | |
| 08211 | 椆 | YUHO | | | | | | | | | |
| 08212 | 橎 | Y'KB | YKB | | | | | | | | |
| 08213 | 椕 | YK-K | | | | | | | | | |
| 08214 | 栟 | Y8DY | Y2DY | YDY | | | | | | | |
| 08215 | 椥 | YTKO | | | | | | | | | |
| 08216 | 椶 | Y8SG | Y2SG | Y8G | Y2G | | | | | | |
| 08217 | 欹 | KJUT | KJOT | KJT | KJO- | KJ- | | | | | |
| 08218 | 欻 | WWUT | 2WUT | =WUT | WWT | 2WT | =WT | WW- | 2W- | =W- | |
| 08219 | 欲 | UEET | UEUT | UET | U:UT | U:T | UEE- | UE- | U:- | DEET | DEUT |
| | | DET | D:UT | D:T | DEE- | DE- | D:- | | | | |
| 08220 | 歐 | 4XUT | 4XT | 4X- | | | | | | | |
| 08221 | 肆 | -AE3 | AE3 | -AE4 | AE4 | | | | | | |
| 08222 | 殗 | -AKL | AKQL | | | | | | | | |
| 08223 | 殙 | -AKB | A'KB | AKB | | | | | | | |
| 08224 | 殕 | -ATO | ATKO | | | | | | | | |
| 08225 | 殽 | XARX | XAX | | | | | | | | |
| 08226 | 毰 | ELTO | 3LTO | | | | | | | | |
| 08227 | 毲 | 4XEL | 4XL | 4L3L | | | | | | | |
| 08228 | 毳 | ELLL | 3EL | 33L | | | | | | | |
| 08229 | 氰 | 7EA | 7IEA | TZEA | | | | | | | |
| 08230 | 淼 | 333 | 444 | | | | | | | | |
| 08231 | 湆 | 3TKB | | | | | | | | | |
| 08232 | 湇 | 3TKA | | | | | | | | | |
| 08233 | 湥 | 3TOJ | 3TUJ | | | | | | | | |
| 08234 | 湉 | 3I2O | 3I'O | 3IHO | 3IO | | | | | | |

08235 潙 3AS4 3A54 3A4 3TS4 3T54
08236 潢 32EK
08237 濺 3HOM
08238 潄 3Y4 3-43 3+43 3[43
08239 湽 3-OQ 3OQ
08240 潗 3HLY 3HY
08241 滐 3Y23 3Y-Y
08242 溚 3F8O 3FO 3F+ 3F|
08243 湝 3FFB 32FB 3F'B 3FB 377B 327B 37'B 37B 3%'B 3%B
08244 湳 3+UH 3[UH
08245 溴 3TAK 3MK
08246 溺 35P 35-4 354
08247 漄 3HOH
08248 溪 3W'K 3W-K 3W2T 3W=T 3WH8 3WK
08249 濟 3LGA 3JGA 3LA 3JA 3GA
08250 渚 33'4
08251 溶 3H+O 3X+O 3H[O 3X[O
08252 渮 3HJO 3XJO
08253 湞 3I-2 3I-8 3T42 3T48
08254 溟 34K. 34.K 34K
08255 湜 3B-G 3BG
08256 溝 3QUS
08257 渱 3OSH 3OSH 3SH
08258 湲 3Q-K 3QK
08259 渙 3ELW 3EW 3\LW 3\W
08260 湷 3E+O 3ETO 3EO 31E+ 3E+ 3E[O 31E[ 3E[
08261 湫 3'YW 3YW 3'W
08262 淘 3C4O 3'C: 3J4O 3'J:
08263 渢 3R-S 3R'S 3RS
08264 渰 38OH 38-H 38H
08265 滏 38D4 32D4
08266 溶 3U2K 3U8K 3URK
08267 滴 3TUE 3T2E
08268 洸 3TOR 3TUR
08269 漩 3TDL 3DTL
08270 溍 3E8B 33TB 3EB
08271 漣 3EHZ 3EZ
08272 滙 3LQH
08273 潛 3O-4 3O4 3OP
08274 潭 3B'E 3BE
08275 溢 3++Q 3[[Q 3HQ 3XQ
08276 渶 3HUK 3HK 3XUK 3XK
08277 淵 3'NL 3'AL 3'L 32NA 3RNA
08278 焠 WTT+ WT4+ WT+ WTT[ WT4[ WT[
08279 焞 WTOZ WTZ
08280 焯 WTB+ WT+ WTB[ WT[
08281 熅 W'GZ W-GZ WGZ
08282 焮 WLTT WLT- WT-
08283 焱 WWW 3W
08284 熙 PX4 -4X4 4X4
08285 燒 WUAL
08286 焢 WU2H WU8H WURH WUH
08287 烣 WTTA
08288 熠 WHHB W22B WHB
08289 焆 WBA
08290 焩 WB'H WBT+ WBT[ WBH WBX
08291 閞 PPK MK
08292 膣 UUMM UU2M ULMM UL2M UTMM UT2M KMM K2M
08293 篁 3UOJ 3UCJ
08294 牷 'F2L Z2HL Z2L
08295 犉 'FTZ ZTOZ
08296 犆 'F+L 'F+- Z+4L Z+4- Z+4 Z+- 'F[L 'F[- Z[4L Z[4
Z[4 Z[-
08297 犅 'FUE ZUKE ZUE
08298 犋 'F4K 'F42 'F48 ZA-2 ZA-8 Z4K Z42 Z48
08299 猒 BAK. BA.K BAK
08300 猋 3K. 3.K
08301 猰 ZEDK ZEK
08302 猢 Z+OA Z+A Z[OA Z[A
08303 猱 ZSJY ZSY ZJY
08304 猳 ZP2X ZP=X ZPCX ZPRX ZPX
08305 猶 ZQUO ZAUO ZQA ZAA
08306 獨 ZBCL ZBC ZBJL ZBJ
08307 猿 ZLLZ ZOZL ZOZ

| | | | | | | | | | | | |
|---|---|---|---|---|---|---|---|---|---|---|---|
| )8308 | 颸 | ZR-S | ZR'S | ZRS | | | | | | | |
| )8309 | 獀 | ZU2X | ZU8X | ZURX | ZUX | ZXUX | ZUXX | | | | |
| )8310 | 猵 | Z'PA | Z.PA | ZPUH | ZPA | | | | | | |
| )8311 | 猌 | YTK. | YT.K | YTTK | | | | | | | |
| )8312 | 球 | EU23 | EU-Y | EU3 | EUY | | | | | | |
| )8313 | 琍 | EUAL | EUL | | | | | | | | |
| )8314 | 琰 | EWW | E2W | | | | | | | | |
| )8315 | 琿 | EH8H | E3TH | | | | | | | | |
| )8316 | 琎 | EMM | E2M | | | | | | | | |
| )8317 | 琚 | EP+O | EPO | EP[O | | | | | | | |
| )8318 | 琡 | ETYX | EG3X | | | | | | | | |
| )8319 | 琭 | EOT4 | EO-3 | EO-4 | EO3 | EO4 | | | | | |
| )8320 | 琱 | EUHO | | | | | | | | | |
| )8321 | 琤 | EAEJ | EAJ | | | | | | | | |
| )8322 | 琣 | ETKO | | | | | | | | | |
| )8323 | 琝 | EBTX | EBX | | | | | | | | |
| )8324 | 瑁 | EBB | | | | | | | | | |
| )8325 | 琠 | EUHK | EOH2 | EQ2 | EOH8 | EQ8 | | | | | |
| )8326 | 琲 | EEE | E2E | | | | | | | | |
| )8327 | 甈 | XE-Z | XECZ | X+EZ | X[EZ | | | | | | |
| )8328 | 甯 | UGUH | .UGA | UGA | | | | | | | |
| )8329 | 畯 | QS2X | QS8X | QSRX | QSX | | | | | | |
| )8330 | 畬 | 8H3Q | 823Q | 8=3Q | 8-YQ | 8YQ | | | | | |
| )8331 | 痧 | L233 | L33' | L33 | | | | | | | |
| )8332 | 痒 | L2HZ | LH'Z | | | | | | | | |
| )8333 | 痡 | L2+A | L+A. | L+A | L2[A | L[A. | L[A | | | | |
| )8334 | 痦 | L25O | L5O | | | | | | | | |
| )8335 | 痞 | L2K3 | LK.3 | LK3 | | | | | | | |
| )8336 | 痟 | L23A | L3A | | | | | | | | |
| )8337 | 痤 | L2TH | LTTH | | | | | | | | |
| )8338 | 痯 | L2TQ | LTQ- | LTQ | | | | | | | |
| )8339 | 皕 | TBTB | 2TB | =TB | | | | | | | |
| )8340 | 皒 | 'BFM | B'FM | BFM | | | | | | | |
| )8341 | 盄 | +34- | +44- | -34- | -44- | +34 | +44 | -34 | -44 | -3.4 | -4.4 |
| | | +3.4 | +4.4 | [34- | [44- | [34 | [44 | [3.4 | [4.4 | | |
| )8342 | 睆 | 4U2R | 4U=R | | | | | | | | |
| )8343 | 睇 | 425J | | | | | | | | | |
| )8344 | 睄 | 43A | | | | | | | | | |
| )8345 | 睍 | 44R | | | | | | | | | |
| )8346 | 睅 | 4BHI | 4B-+ | 4B2I | 4B=1 | 4BH | 4B-[ | | | | |
| )8347 | 睊 | 4OA | | | | | | | | | |
| )8348 | 睎 | 4X+E | 4XE | 4X[E | | | | | | | |
| 08349 | 睋 | 4'FM | 4FM | | | | | | | | |
| 08350 | 睌 | 4UBR | | | | | | | | | |
| 08351 | 矞 | SJUO | SJA | | | | | | | | |
| 08352 | 矬 | TKTH | | | | | | | | | |
| 08353 | 硍 | TOBK | TO.K | +-BK | +.BK | +-K | +.K | [-BK | [.BK | [-K | [.K |
| 08354 | 硤 | TOKT | +KTT | +K2T | +KT | +-3T | [KTT | [K2T | [KT | [-3T | |
| 08355 | 硥 | TOK3 | +K.3 | +.K3 | +K3 | [K.3 | [.K3 | [K3 | | | |
| 08356 | 硜 | TO3H | +-3H | +3H | [-3H | [3H | | | | | |
| 08357 | 硭 | TOHC | +++C | +H.C | +HTL | +HC | TOXC | +X.C | +XC | [[[C | [H.C |
| | | [HTL | [HC | [X.C | [XC | | | | | | |
| 08358 | 硱 | TOOY | TOOY | TOQ | +OY | +OY | [OY | [OY | | | |
| 08359 | 硪 | TOFM | +'FM | +FM | [ 'FM | [FM | | | | | |
| 08360 | 确 | +UUH | +UA | [UUH | [UA | | | | | | |
| 08361 | 硰 | 33TO | 33'O | 33'+ | 33+ | 33'[ | 33[ | | | | |
| 08362 | 硩 | FTTO | FLT+ | FT+ | FLT[ | FT[ | | | | | |
| 08363 | 硨 | TOHQ | ++Q+ | +HQ | +Q | [[Q[ | [HQ | [Q | | | |
| 08364 | 硞 | TOHO | +'HO | ['HO | | | | | | | |
| 08365 | 硢 | TO8Y | TO83 | +8-Y | +823 | +8=3 | +8H3 | +8Y | +83 | [8-Y | [823 |
| | | [8=3 | [8H3 | [8Y | [83 | | | | | | |
| 08366 | 祴 | 23HM | =3HM | 23MH | =3MH | -YHM | -YMH | K++M | KM++ | K2OM | KM2O |
| | | KHM | KMH | KXM | KMX | K[[M | KM[[ | | | | |
| 08367 | 祳 | 23LK | =3LK | -YLK | KL2K | KL=K | | | | | |
| 08368 | 祲 | 23EX | =3EX | -YEX | KEUX | | | | | | |
| 08369 | 祮 | K'HO | | | | | | | | | |
| 08370 | 稂 | 'YBK | 'Y-K | 'Y.K | '-BK | '.BK | 'BK | | | | |
| 08371 | 稊 | 'Y2J | 'Y25 | '25J | | | | | | | |
| 08372 | 稃 | 'YAZ | 'AZ- | ''3Z | 'AZ | | | | | | |
| 08373 | 稌 | 'Y8Y | 'Y83 | '823 | '8=3 | '8H3 | '8-Y | '8' | | | |
| 08374 | 稄 | 'YSX | 'S2X | 'S8X | 'SRX | 'SX | | | | | |
| 08375 | 窞 | U2HZ | U8HZ | URHZ | UHZ | | | | | | |
| 08376 | 竦 | TKYO | TKYO | TYO | TYO | | | | | | |

08377 跿 TKUS TU+S TUS TU[S
08378 笶 FFTX /T2X /T8X /TRX /TX
08379 笰 FFHP /HP /H3I /HI3
08380 笓 FFKK FF2K /KKL /KK /2K
08381 筶 FFHO /'+O /HO /'[O
08382 筀 FF8E /8E
08383 筈 FFVO /VO
08384 筓 FFHH FF2H /HH /2IH /2H
08385 筘 FFFO /FO
08386 筅 FFHR /'HR /HR
08387 桊 2UTY 2-2Y 2TY 2-Y =UTY =-2Y =TY =-Y
08388 栖 2Y-4 2Y4 =Y-4 =Y4
08389 栢 2YTB =YTB
08390 桐 2YUO =YUO
08391 絞 N32T N32- N2UT N2T N2-
08392 絯 N3TT NTUT NTT
08393 絣 N32H N2HH N222
08394 絓 N3HH NHH
08395 絖 N33R N3-R N3R
08396 絧 NU-O
08397 絪 N3OK N3OK NOK NOK
08398 絨 N3BM N3QM NBL' NQL' NBM NQM
08399 絭 2H8N 22TN 2=TN 2H83 22T3 2=T3 2HN 2H3 =H8N =2TN
==TN =H83 =2T3 ==T3 =HN =H3
08400 絜 EDN3 EDN
08401 絫 3SN3 SSSN 3SN 3S3
08402 絒 N330 N3T NTTT N30 N+++ N33+ N[[[ N33[
08403 絔 N3TB NTB N-'B
08404 絩 N3KK NKKL NKK N2K
08405 絑 N3TY NTY N'+Y N'-Y N'[Y
08406 絟 N38E N8E
08407 絎 N'TJ N3]J N]2J N]=J N]J
08408 缾 TE2H HE2H T\2H H\2H
08409 缿 TELO HELO T\LO H\LO
08410 罟 4BA
08411 罜 4'3Z 4AZ- 4AZ
08412 羢 2E+M =E+M 2EM+ =EM+ 2E[M =E[M 2EM[ =EM[
08413 羠 2EK5 =EK5
08414 羡 2E2T 2E2- =E2T =E2-
08415 翔 AAEE AA2 2A2E =A2E =A=E 2A2 =A2 =A=
08416 耶 -4-4 2-4 =-4 2P =P
08417 聏 PTU2 PTA -4TA 4TU2 -4M 4M
08418 聐 -4HO 4HO PIHO P+-O P[-O PHO
08419 胾 HAM HATM HMAT HMA
08420 胔 GFUT GFAT GFA G7UT G7AT G7A
08421 脆 A2HL A2L
08422 脂 AHHB AHB A22B
08423 腒 AP+O APO AP[O
08424 腶 A4X
08425 腰 A'YV AYV A'V
08426 脽 ATTE ATHH AT.E ATE
08427 脸 A8LG A8JG A8G
08428 脺 ATT+ AT4+ AT+ ATT[ AT4[ AT[
08429 臦 CUCU
08430 臮 '4Z '43T
08431 舙 HSHM HHM HMSH HMH
08432 舝 SHSH 2-SH 2SH =-SH =SH
08433 舣 SHDM
08434 艵 EEC4 2EC4 ;'C4 ;'J4 ;C4
08435 舼 'AH2 'AH8 A-H2 A-H8 AHH2 AHH8 A228
08436 舽 'AXH A-XH A'XH AXH
08437 舿 'AKS 'AK5 'AKC 'AKJ A-KS A-K5 A-KC A-KJ
08438 艳 2HUL =HUL
08439 芔 4U' 4E' 4U1 4E1
08440 菏 H3JO X3JO H3J X3J
08441 蒩 ++34 H3A- H34- H34 X3A- X34- X34 [[34
08442 莚 ++UG HU-G H.UG HUG XU-G X.UG XUG [[UG
08443 莥 HUAL XUAL
08444 莰 ++TV HTKV HTV XTKV XTV [[TV
08445 莌 ++6R H6SR H6R X6SR X6R HT2R HT8R HTRR XT2R XT8R
XTRR [[6R
08446 莝 HLK- HLK. XLK- XLK.
08447 莘 H2HL X2HL

08448 [illegible] ++WW ++2W HWW H2W XWW X2W [[WW [[2W
08449 [illegible] ++EH HE8H H3TH XE8H X3TH XEH [[EH
08450 [illegible] ++EG H-EG H+EG H-G H+G HEG X-EG X+EG X-G X+G
XEG [[EG H[EG H[G X[EG X[G
08451 [illegible] ++PX ++4X H-4X HPX H4X X-4X XPX X4X [[PX [[4X
08452 [illegible] HFTK HFT XFTK XFT
08453 [illegible] HHOE H-OE HHOE H-OE
08454 [illegible] ++EX HCUX XCUX XEX [[EX
08455 [illegible] ++YJ HYUJ HYJ XYUJ XYJ [[YJ
08456 [illegible] HH22 HH=2 HH28 HH=8 XH22 XH=2 XH28 XH=8
08457 [illegible] ++FX HF+X HFX XF+X XFX [[FX HF[X XF[X
08458 [illegible] HYLT XYLT
08459 [illegible] HY8S HY2S XY8S XY2S
08460 [illegible] HSHJ XSHJ
08461 [illegible] ++3U ++4U HL3U HL4U HJ3U HJ4U H3U H4U XL3U XL4U
XJ3U XJ4U X3U X4U [[3U [[4U
08462 [illegible] ++OY HO+Y HO-Y HOY XO+Y XO-Y XOY [[OY HO[Y XO[Y
08463 [illegible] ++BF HBFF HB2F HBF ++B7 HB77 HB27 HB7 XBFF XB2F
XBF XB77 XB27 XB7 [[BF [[B7 ++B% [[B% HB% XB%
08464 [illegible] ++BB HBB XBB [[BB
08465 [illegible] ++UC HUKC XUKC XUC [[UC
08466 [illegible] ++O3 HOT4 HO-3 HO-4 HO3 HO4 XOT4 XO-3 XO-4 XO3
XO4 [[O3
08467 [illegible] HABL XABL
08468 [illegible] HUEE HU; XUEE XU;
08469 [illegible] ++YD ++'D H'YD HYD H'D X'YD XYD X'D [[YD [['D
08470 [illegible] ++TE HTTE HTHH HTE H'E XTTE XTHH XTE X'E [[TE
08471 [illegible] ++Q4 H'Q4 H'Q+ HQ4 HQ+ X'Q4 X'Q+ XQ4 XQ+ [[Q4
H'Q[ HQ[ X'Q[ XQ[
08472 [illegible] ++BC H'BC HBC. X'BC XBC. XBC ++BJ H'BJ HBJ. X'BJ
XBJ. XBJ [[BC [[BJ
08473 [illegible] ++8K ++$ H8E2 H8K H$ X8E2 X8K X$ ++6 H6
X6 [[8K [[$ [[6
08474 [illegible] ++8A H8-A H8A X8-A X8A [[8A
08475 [illegible] ++PA H'PA H.PA HPA X'PA X.PA XPA [[PA
08476 [illegible] HV+O XV+O HV[O XV[O
08477 [illegible] ++3Q H3LQ H3Q X3LQ X3Q [[3Q
08478 [illegible] ++U+ [[U[ HUTO XUTO HU+ HU[ XU+ XU[
08479 [illegible] ++U4 HUA- HU4- HU4 XUA- XU4- XU4 [[U4
08480 [illegible] ++GZ H'GZ HGZ X'GZ XGZ [[GZ
08481 [illegible] ++3E [[3E H3CC H3E X3CC X3E
08482 [illegible] H3UO H3DO H3O X3UO X3DO X3O
08483 [illegible] ++L2 ++L8 HLET HLE2 HLE8 XLET XLE2 XLE8 XL2 XL8
[[L2 [[L8
08484 [illegible] ++YQ ++YB HYQ HYB XYQ XYB [[YQ [[YB
08485 [illegible] ++YY ++2Y HYY XYY X2Y [[YY PP2Y
08486 [illegible] ++FQ [[FQ H3IQ X3IQ
08487 [illegible] HFUL HFL XFUL XFL
08488 [illegible] ++4H [[4H H4++ H4[[ H420 H4H X4++ X4[[ X420 X4H
08489 [illegible] ++PP HPP XPP [[PP
08490 [illegible] ++KG ++K4 [[KG [[K4 H'KG H'K4 H-KG H-K4 HKG HK4
X'KG X'K4 X-KG X-K4 XKG HK4
08491 [illegible] OS2E S2E OS2E
08492 [illegible] OS2H S2HH S2H S222 OS2H
08493 [illegible] OSK5 S-5T S+5T SK5 OSK5 S[5T
08494 [illegible] HOSM HMOS HSM HMS OSSM OSMS
08495 [illegible] OSHO S+-O SIHO SHO OSHO S[-O
08496 [illegible] OSAJ S-AJ SAIJ SAJ OSAJ
08497 [illegible] EDOS EDS EDOS
08498 [illegible] OSBK SBK OSBK
08499 [illegible] OSUL SULL SUL OSUL
08500 [illegible] STE'
08501 [illegible] HH8S 228S H8OS H8S H8OS
08502 [illegible] HROS HR.S HRS HROS
08503 [illegible] 'BOS BOS 'BS BS 'BOS BOS
08504 [illegible] OSTB STB S-'B OSTB
08505 [illegible] OSSH SST+ SS'H SSH OSSH SST[
08506 [illegible] '4-4 '44 4--4
08507 [illegible] 'THJ TH2J TH8J ]H2J ]H8J
08508 [illegible] 'TAJ TUOJ ]UOJ ]AJ
08509 [illegible] KIHO K+-O KHO K[-O
08510 [illegible] KTS3 KT3 KTSR KTR
08511 [illegible] KTB K-'B
08512 [illegible] K+IZ K-TZ K+Z K[IZ K[Z

| | | | | | | | | | |
|---|---|---|---|---|---|---|---|---|---|
| 08513 | 裀 | KOK | KOK | | | | | | |
| 08514 | 袾 | KTY | K'+Y | K'-Y | K'[Y | | | | |
| 08515 | 袶 | KXH | K'XH | KX'H | | | | | |
| 08516 | 袼 | KXO | K'XO | | | | | | |
| 08517 | 袷 | K8-O | K8O | | | | | | |
| 08518 | 袇 | KVO | | | | | | | |
| 08519 | 衰 | TAAK | T2AK | | | | | | |
| 08520 | 長 | QYK | QY'K | | | | | | |
| 08521 | 裉 | KBK | | | | | | | |
| 08522 | 峴 | G'4R | G4R | G'R | | | | | |
| 08523 | 硯 | TO4R | | | | | | | |
| 08524 | 哯 | CO4R | JO4R | C-OR | J-OR | | | | |
| 08525 | 舐 | UAK- | UAK. | UAK | | | | | |
| 08526 | 舡 | UAAS | | | | | | | |
| 08527 | 䑨 | UAB- | UAB | | | | | | |
| 08528 | 詎 | 4OCC | 4OE | ;CC | ;E | | | | |
| 08529 | 詍 | 4OHL | ;2OL | ;HL | | | | | |
| 08530 | 訹 | 4OY. | 4O.Y | ;Y. | ;.Y | ;Y | | | |
| 08531 | 詙 | 4O+X | ;+X. | ;+X | 4O[X | ;[X. | ;[X | | |
| 08532 | 詀 | 4OTO | ;TO | ;I-O | | | | | |
| 08533 | 詷 | 4OUO | ;UO | | | | | | |
| 08534 | 詘 | ;UIU | ;IUU | ;2IU | | | | | |
| 08535 | 詄 | 4OTK | ;'+K | ;'-K | ;TK | ;'[K | | | |
| 08536 | 詅 | ;8-S | ;8.S | | | | | | |
| 08537 | 詒 | 4OSO | ;SO | | | | | | |
| 08538 | 訾 | 4T2O | 4T=O | 44O | 4; | | | | |
| 08539 | 詑 | 4OUF | ;.UF | ;UF | TOU7 | ;.U7 | ;U7 | | |
| 08540 | 詊 | 4O2H | ;22O | ;2H | | | | | |
| 08541 | 詌 | 4OH2 | 4OH= | ;++2 | ;++= | ;[[2 | ;[[= | ;H2 | ;H= |
| 08542 | 詏 | 4ONC | ;NC' | ;NC | | | | | |
| 08543 | 豟 | Z'PZ | Z.PZ | ZPZ | ZLPZ | | | | |
| 08544 | 䝔 | AZU8 | ZU8 | Z.U8 | | | | | |
| 08545 | 䝚 | AZEE | ZEE | ZUIU | ZIUU | | | | |
| 08546 | 貺 | 42OR | 48OR | 4OR | | | | | |
| 08547 | 貾 | 42K- | 42K. | 48K- | 48K. | | | | |
| 08548 | 貰 | HL42 | HL48 | | | | | | |
| 08549 | 貹 | 42'E | 48'E | 48E | 4'E | | | | |
| 08550 | 賫 | SK42 | SK48 | SK4 | SK2 | SK8 | | | |
| 08551 | 趄 | HGA- | HG4- | | | | | | |
| 08552 | 趀 | HG5J | G5J | | | | | | |
| 08553 | 趉 | HGEE | HG2E | GUIU | GIUU | HG\\ | HG2\ | | |
| 08554 | 跘 | OG2H | G2H | G2X | G22I | G2=I | G2++ | G22O | G2[[ |
| 08555 | 跓 | OG.E | G.E | | | | | | |
| 08556 | 跍 | OG+O | G+O | OG[O | G[O | | | | |
| 08557 | 跇 | OGHL | G2OL | GHL | | | | | |
| 08558 | 跖 | OGTO | G-'O | GTO | OG+ | G+ | OG[ | G[ | |
| 08559 | 跜 | OGPF | GPF | OGP7 | GP7 | | | | |
| 08560 | 跏 | OGCO | GC'O | GCO | GJ'O | | | | |
| 08561 | 跕 | OGTO | GI-O | GTO | | | | | |
| 08562 | 跙 | OGA- | OG4- | GA- | G4- | G4 | | | |
| 08563 | 跈 | OG83 | G83 | | | | | | |
| 08564 | 跗 | OGTJ | GTJ | GT-J | GTJ. | | | | |
| 08565 | 跅 | OGLT | GLT. | GLT | | | | | |
| 08566 | 軯 | HQK+ | HQH2 | QK+ | QH2I | QHI2 | HQK[ | QK[ | |
| 08567 | 軷 | HQ+X | Q+X. | Q+X | HQ[X | Q[X. | Q[X | | |
| 08568 | 軺 | HQUO | HQDO | QDO | | | | | |
| 08569 | 軹 | HQO2 | HQO8 | QO2 | QO8 | | | | |
| 08570 | 軦 | HQOR | QOR | | | | | | |
| 08571 | 軮 | HQUK | QUK | | | | | | |
| 08572 | 軥 | HQCO | Q'CO | QCO | Q'JO | | | | |
| 08573 | 軵 | HQTJ | QTJ | QT-J | QTJ. | | | | |
| 08574 | 軧 | HQK- | HQK. | Q'K- | Q'K. | QK- | QK. | | |
| 08575 | 軨 | HQ8S | Q8-S | Q8.S | Q8S | | | | |
| 08576 | 軶 | HQPZ | Q'PZ | Q.PZ | QPZ | | | | |
| 08577 | 軫 | HQ83 | Q83 | | | | | | |
| 08578 | 軱 | HQAS | Q'3S | QAS | QLS. | | | | |
| 08579 | 軬 | SKHQ | SKQ | | | | | | |
| 08580 | 軴 | HQ.E | Q.E | | | | | | |
| 08581 | 軩 | HQSO | QSO | | | | | | |
| 08582 | 逌 | .UBZ | UBZ | | | | | | |
| 08583 | 逑 | TB+Z | TB[Z | | | | | | |
| 08584 | 逘 | OT4Z | O-3Z | O-4Z | O4Z | O3Z | | | |
| 08585 | 鄆 | UHQP | UQP | | | | | | |

| | | | | | | | | | | | |
|---|---|---|---|---|---|---|---|---|---|---|---|
| 08586 | 鄬 | TS4P | T54P | T4P | AS4P | A54P | A4P | | | | |
| 08587 | 鄄 | -4HP | 4HP | | | | | | | | |
| 08588 | 鄘 | B'4P | B4P | PI4P | P4P | | | | | | |
| 08589 | 鄣 | HOHP | | | | | | | | | |
| 08590 | 鄈 | W'KP | W-KP | W2TP | W=TP | WH2P | WH8P | WKP | W2P | W8P | |
| 08591 | 郹 | 4K.P | 4.KP | 4KP | | | | | | | |
| 08592 | 鄹 | 4L3P | 43LP | 43P | | | | | | | |
| 08593 | 鄫 | FFAP | 2FAP | 77AP | 27AP | =FAP | =7AP | | | | |
| 08594 | 郤 | H+OP | X+OP | H[OP | X[OP | | | | | | |
| 08595 | 鄉 | TCKP | TC2P | TC8P | | | | | | | |
| 08596 | 鄗 | 'OAP | 'OAP | OAP | | | | | | | |
| 08597 | 鄱 | 8AJP | 8AP | 8JP | | | | | | | |
| 08598 | 酡 | -QUF | 9.UF | 9UF | -QU7 | 9.U7 | 9U7 | | | | |
| 08599 | 酤 | -Q+O | 9+O | -Q[O | 9[O | | | | | | |
| 08600 | 酟 | -QTO | 9TO | | | | | | | | |
| 08601 | 酢 | -QTK | 9TI2 | 9TI= | 9TK | | | | | | |
| 08602 | 酮 | -QJO | 9JO | | | | | | | | |
| 08603 | 鈁 | 8KTD | 8KD | $TD | $D | 6TD | 6D | | | | |
| 08604 | 鈊 | 8KG | $G | 6G | | | | | | | |
| 08605 | 鈥 | 8KW | $W | 6W | | | | | | | |
| 08606 | 鈃 | 8KHH | 8K22 | $HH | $22 | 6HH | 622 | | | | |
| 08607 | 鈚 | 8KFF | 8K2F | $FF | $2F | 8K77 | 8K27 | $77 | $27 | 6FF | 62F |
| | | 677 | 627 | 8K% | $% | 6% | | | | | |
| 08608 | 鈇 | 8KK. | $K. | 6K. | | | | | | | |
| 08609 | 釧 | 8K5I | $5I | 65I | | | | | | | |
| 08610 | 鈌 | 8KLK | $LK | 6LK | | | | | | | |
| 08611 | 鈀 | 8KBL | $BL | 6BL | | | | | | | |
| 08612 | 鈒 | 8KST | 8KSX | $ST | $SX | 6ST | 6SX | | | | |
| 08613 | 釿 | 8KLT- | $LT | 6LT | | | | | | | |
| 08614 | 釽 | 8K'3 | $'3 | 6'3 | | | | | | | |
| 08615 | 鈆 | 8K8S | 8K2S | $8S | $2S | 68S | 62S | | | | |
| 08616 | 鈄 | 8K2+ | 8K=+ | $2+ | $=+ | 62+ | 6=+ | 8K2[ | 8K=[ | $2[ | $=[ |
| | | 62[ | 6=[ | | | | | | | | |
| 08617 | 鈨 | 8KTR | $TR | 6TR | | | | | | | |
| 08618 | 鈦 | 8KUR | 8KER | $UR | $ER | 6UR | 6ER | | | | |
| 08619 | 鈜 | 8K+S | $+S | 6+S | 8K[S | $[S | 6[S | | | | |
| 08620 | 鉬 | 8E2B | 8KB | $B | 6B | | | | | | |
| 08621 | 鈹 | 8KTX | $TX | 6TX | | | | | | | |
| 08622 | 鈧 | 8KSR | $SR | 6SR | | | | | | | |
| 08623 | 鈅 | 8E2A | 8KA | $A | 6A | | | | | | |
| 08624 | 鈖 | 8K8D | 8K2D | $8D | $2D | 68D | 62D | | | | |
| 08625 | 趺 | ESTK | | | | | | | | | |
| 08626 | 陟 | PPTD | PPD | MTD | | | | | | | |
| 08627 | 陏 | PPTR | MTR | | | | | | | | |
| 08628 | 陷 | PP3L | PPEL | M3L | MEL | | | | | | |
| 08629 | 隇 | P-VM | PVM | | | | | | | | |
| 08630 | 陝 | PTAK | PMK | PMK. | PM.K | | | | | | |
| 08631 | 隁 | PQK. | | | | | | | | | |
| 08632 | 隉 | PEEH | P;H | | | | | | | | |
| 08633 | 隃 | P8AJ | | | | | | | | | |
| 08634 | 陲 | PHQH | | | | | | | | | |
| 08635 | 雂 | 8LTE | 8JTE | 8LE | 8JE | | | | | | |
| 08636 | 菑 | BF81 | | | | | | | | | |
| 08637 | 雃 | HHTE | HH'E | 22TE | 22'E | HHE | 22E | =2TE | ==TE | =='E | =2'E |
| | | ==E | =2E | | | | | | | | |
| 08638 | 莠 | -ATD | TATD | MTD | -TD | | | | | | |
| 08639 | 荮 | -A8D | -A2D | TA8D | TA2D | M8D | M2D | -8D | -2D | | |
| 08640 | 靬 | H+HI | H+-+ | H+2I | H+=I | H[HI | H[-[ | H[2I | H[=I | | |
| 08641 | 靰 | H+-R | H+R | H[-R | H[R | | | | | | |
| 08642 | 靮 | H+C- | H+C. | H+J- | H+J. | H[C- | H[C. | H[J- | H[J. | | |
| 08643 | 鞙 | HIT4 | HIT2 | HIT8 | -+T4 | -+T2 | -+T8 | 2IT4 | 2IT2 | 2IT8 | =IT4 |
| | | =IT2 | =IT8 | -[T4 | -[T2 | -[T8 | | | | | |
| 08644 | 彫 | R-S3 | R'S3 | RS3' | RS3 | R3 | | | | | |
| 08645 | 飫 | 8S'K | 8S-K | 8S2T | 8S=T | 8SH8 | 8SK | 8F'K | 8F-K | 8F2T | 8F=T |
| | | 8FH8 | 8FK | 87'K | 87-K | 872T | 87=T | 87H8 | 87K | 8'K | 8-K |
| 08646 | 紇 | 'B4Z | BS4Z | B54Z | B4Z | 5-L | 5Z | | | | |
| 08647 | 粦 | 4KU3 | 4KA | 42U3 | 43U3 | | | | | | |
| 08648 | 乳 | 2YHL | =YHL | YAHL | | | | | | | |
| 08649 | 亂 | HUKL | HU.L | 1L | | | | | | | |
| 08650 | 董 | TQB- | TQA- | TQ4- | TQB | | | | | | |
| 08651 | 偉 | TTB+ | TTK+ | TTB[ | TTK[ | | | | | | |
| 08652 | 傱 | TGS4 | TG54 | TG4 | | | | | | | |
| 08653 | 儘 | THQZ | TQZ | | | | | | | | |
| 08654 | 僐 | THQB | | | | | | | | | |

| | | |
|---|---|---|
| 08655 | 傈 | T-43 T-4Y T423 T4=3 T4-Y T-Y T43 T4Y |
| 08656 | 傪 | T4KL |
| 08657 | 傴 | TC30 TCX |
| 08658 | 僾 | TB4X |
| 08659 | 僕 | TQOV TQOV TQV |
| 08660 | 僩 | TEAA TE2A T\AA T\2A |
| 08661 | 偲 | TAYG TYG |
| 08662 | 傺 | TW23 TW=3 TW3 TW-Y TWY |
| 08663 | 從 | T'TG TTTG T]TG T]G |
| 08664 | 僨 | T842 T848 T8L2 T8L8 T8J2 T8J8 T88 |
| 08665 | 效 | 8-OT 8-02 8-08 |
| 08666 | 儀 | TG3M TMG3 TTYM TMTY |
| 08667 | 傸 | TK4X T-XT TK4 |
| 08668 | 凒 | 2IUE 2ETE 2E'E 2EE =IUE =ETE =E'E =EE 2\TE 2\'E |
| | | 2\E =\TE =\'E =\E |
| 08669 | 脐 | YXLD YXD |
| 08670 | 剸 | +QJJ +SJJ +AJJ +JJ [QJJ [SJJ [AJJ [JJ |
| 08671 | 删 | EAAJ E2AJ \AAJ \2AJ |
| 08672 | 劍 | 3S3J S83J S3IJ S3J 3IJ |
| 08673 | 嗃 | OTOA OTHA |
| 08674 | 嗛 | OKE4 O2E4 O24 OK4 |
| 08675 | 嗌 | O34- O44- O224 O884 O284 O2K4 OK24 OK84 O34 O44 |
| 08676 | 啃 | OUEO |
| 08677 | 嗡 | O3CA OCA |
| 08678 | 嗊 | OH42 OH48 |
| 08679 | 嗝 | O-OA OOA OH2 OH8 |
| 08680 | 嗀 | HORX HOX |
| 08681 | 嗔 | O+4K O+42 O+48 O+K O+2 O+8 OF4K OF42 OF48 OFK |
| | | OF2 OF8 O74K O742 O748 O7K O72 O78 O[4K O[42 |
| | | O[48 O[K O[2 O[8 |
| 08682 | 嗄 | OT4X |
| 08683 | 嗩 | O342 O348 O32 O38 |
| 08684 | 桑 | OOOY 3OY |
| 08685 | 嗒 | OH8O OX8O |
| 08686 | 嗦 | OGFY OG7Y |
| 08687 | 嗏 | OH8Y OX8Y |
| 08688 | 嗥 | OLKJ OLJ |
| 08689 | 嗞 | OQ4- OQ4 |
| 08690 | 嗖 | OEEX OEIX O;IX O;X |
| 08691 | 嗤 | O3OL O3L O3BL |
| 08692 | 嗲 | O2XA O8XA O2A O8A O2AA O8AA OXAA |
| 08693 | 嗍 | OKEA OKA |
| 08694 | 嗙 | OT2D OTUD OTD |
| 08695 | 嗑 | OAHE OAE |
| 08696 | 圖 | OHS4 OH4 |
| 08697 | 塓 | HUB6 HU6 IHU6 |
| 08698 | 埽 | IHHG IHH4 HH8G HH84 |
| 08699 | 墳 | HO42 HO48 IHO2 IHO8 |
| 08700 | 增 | HEOK HE. IHE. H\OK H\. IH\. |
| 08701 | 塍 | A2HH A2KH |
| 08702 | 墒 | H4TA H4A IH4A |
| 08703 | 塯 | HSDQ HSQ IHSQ |
| 08704 | 墸 | H8SE H2SE H8S2 H2S2 IH8E IH82 |
| 08705 | 塎 | HU4O |
| 08706 | 塝 | HTUD HT2D |
| 08707 | 塙 | HTOA IHTA HTHA |
| 08708 | 塥 | H-OA IH-A IHOA |
| 08709 | 塛 | IH4Y H-4Y H4Y |
| 08710 | 堙 | H4-G H4G IH4G |
| 08711 | 遅 | 3OEH |
| 08712 | 塑 | BSAH .SAH |
| 08713 | 壷 | HU2U HU=U |
| 08714 | 嫇 | VUB6 VU6 |
| 08715 | 嫄 | VLB3 |
| 08716 | 嫋 | V525 V252 V255 V55 |
| 08717 | 媺 | VERX VEX V\RX V\X |
| 08718 | 嬍 | VE-S VES V\-S V\S |
| 08719 | 嫸 | VAHE VAH\ |
| 08720 | 媵 | A2HV A2V |
| 08721 | 媢 | V2CE V2JE VCC VJJ |
| 08722 | 嫭 | V'QR VQRS VQR VR |
| 08723 | 嫈 | WWUV 2WUV =WUX WUV KUV |
| 08724 | 嬖 | 'AXV A-XV ARXV AXV |
| 08725 | 嫆 | VU4O |

08726 嫭 VLKJ VLJ
08727 嫌 VE8Y V3TY VE8' V3T' VE'Y VE'
08728 嫌 VEN3 VIEN VEN VE3
08729 嫬 VHOK VHK
08730 嫵 V++P VHP VXP V++4 VH-4 VH4 VX-4 VX4 V[[P V[[4
08731 嫮 VAEE VA2E V'3: VA:
08732 嫺 VSDQ VSQ
08733 嬖 EOLV EULV ECLV EPLV ELV
08734 覆 U3EX U3X
08735 賈 U+4K U+42 U+48 U+K U+2 U+8 UF4K UF42 UF48 UFK
UF2 UF8 U74K U742 U748 U7K U72 U78 U[4K U[42
U[48 U[K U[2 U[8
08736 匭 UASA USAS U2AS
08737 匙 BG3' BG3
08738 尷 KQUA
08739 嵱 EU40 EU20 EU80 IUU4 IUUO \U40 \U20 \U80
08740 嵴 ELEO IULO \LEO
08741 嵻 E'YF EYEE E'Y7 EY77 E'FF E'77 E'F E'7 IUYF IU'F
IUY7 IU≠ E≠ \'YF \YEE \'Y7 \Y77 \'FF \'77 \'F
\'7 \≠
08742 嵘 EAHY EAY IUAY \AHY \AY
08743 嵲 E'4Y E4Y IU4Y \'4Y \4Y
08744 嵬 E'QR EQRS EQR IUQR \'QR \QRS \QR
08745 嵞 8YEE 83EE 8Y2E 832E 8'EE 8'2E 8Y\\ 83\\ 8Y2\ 832\
8'\\ 8'2\
08746 嶋 EOS4 E054 IU04 \OS4 \054
08747 嵧 ESDQ ESQ IUSQ \SDQ \SQ
08748 嵢 E8EO IU80 \8EO
08749 彍 3HT3 3HS3 3H3 3HTR 3HSR
08750 幪 E.UZ EUZ UIUZ
08751 幘 EUB6 EU6 UIU6
08752 幜 UIH2 UIH8 EH42 EH48
08753 幧 UIAE UIA: E'3E EAEE EA2E EA:
08754 幣 'AXE A-XE ARXE AXE AXUI
08755 廑 LHS4
08756 廌 LHS4 LH54
08757 廐 L'QR LQRS LQR LR
08758 廋 LEEX L:IX L:X
08750 廔 LSDQ LSQ
08760 彀 H5RX H5X
08761 徯 'TAK ]ANK ]AK
08762 徭 'TAE ]AHE ]AE
08763 慇 E8BG 3TBG
08764 愫 ITNQ
08765 慊 I2K4 I224 IKE4
08766 慄 I2EN I2E3 IEN3 IIEN IEN IE3
08767 慅 I2XS IX2S IX=S IX.S IXS
08768 慉 I2CA I3CA
08769 慆 I2QA IQUA
08770 愮 I2AE IAHE IAE
08771 慆 I2AE I2A: IAEE IAE IA:
08772 慢 I2EX ITEX I'EX IEX
08773 愩 I2U6 IUB6
08774 憤 I2H2 I2H8 IH42 IH48
08775 慀 I2AK IANK IAK
08776 截 TKBM TBM
08777 戠 H-QM H9M
08778 戣 W'KM W-KM W2TM W=TM WH2M WH8M WKM
08779 戥 B'EM BEM
08780 戤 SX4M SA4M S4M
08781 犨 TOHF +HHF +22F +HF +H3J +HEJ [HHF [22F [HF [H3J
[HEJ
08782 掣 3AJF 3JF 3J3J 3JEJ
08783 搴 'YWF YWF YW3J YWEJ 'W3J 'WEJ 'WF
08784 摘 FTNQ
08785 撈 FTUD FT2D FTD
08786 摚 F.UE FUE FUTE FU'E
08787 搠 FKEA FKA
08788 搖 F44- F44 F224 F34-
08789 搢 FUEO
08790 摃 FH42 FH48
08791 摒 FHQH FQHI FQ-+ FQ2I FQ=I FQ-[
08792 搸 FHS4
08793 擂 FHFB

08794 搨 F-OA
08795 搷 F+4K F+42 F+48 F+2 F+8 FF4K FF42 FF48 F74K F742
F748 F7K F72 F78 F[4K F[42 F[48 F[2 F[8
08796 播 F2SB F=SB F-SB
08797 搣 F-WM FWM FM-W FMW
08798 搌 FPHK
08799 搦 F525 F252 F255 F55
08800 搰 FQUA FQA
08801 搹 FBEE FB2E FB2
08802 摁 FOKG FOKG FQG
08803 搖 FQ4- FQ4
08804 搯 FAEE FA; FAE
08805 搿 F2CE F2JE FJJ
08806 搶 F3CA FCA
08807 搗 FOS4 FO54
08808 搥 F'BZ FBZ
08809 搧 FPEE FP2E F'PE F.PE FPE F'P2 F.P2 FP2
08810 搋 FLUR FLTR FL7R FLR
08811 槊 YOJE YOJE YJE
08812 搛 FKE4 F2E4
08813 搩 F-4Y F4Y
08814 搮 F3XY FXY
08815 搽 FZN3 FZ'N FZN
08816 骰 OKBX CKBX OBTX KBTX OBX KBX
08817 媥 TXPA
08818 旃 TDTA DT3A DTA
08819 晩 BTDL BDTL BTL BDL
08820 暌 BW'K BW2T BW=T BWH2 BWH8 BW-K BWK BW2 BW8
08821 晬 BY4
08822 峰 BHOH BHH
08823 暋 OKXB CKXB OXB KXB
08824 暝 BT42 BT48 BT2 BT8
08825 暗 B3TB BE8B BEB
08826 暔 B+UH B+A B[UH B[A
08827 皺 B-GX BGTX BGX
08828 腆 AHUK AHK AXUK AXK
08829 楦 YU2B YU=B YUB-
08830 桴 YTOJ YTUJ
08831 桅 YTDL YDTL YTL YDL
08832 楠 YUHQ YUQ
08833 楢 Y2-Q YKQ Y2Q
08834 楱 YE8K Y3TK
08835 椿 YE8B YEB Y3TB
08836 楅 Y-OQ YOQ
08837 楪 YHLY YHY
08838 楷 YH2L YH8L YHRL
08839 楂 YYB-
08840 楗 YEHZ
08841 楙 YSJY YSY YSY-
08842 楺 YSJY YSY YSYI
08843 楈 YJGA YLGA YGA
08844 楛 YH+O YX+O YH[O YX[O
08845 椵 YP2X YP=X YPCX YPRX YPX
08846 楊 YBCL YBJL
08847 椳 YQ-K YQK
08848 椽 YLLZ YOZL YOZ
08849 楥 YAHX YAX
08850 棰 YHHH YHXH
08851 楸 Y'YW Y'W
08852 椴 Y'EX YERX
08853 楩 YT-X YTTX
08854 楇 Y'OA Y'OA YOA Y'A
08855 楯 YL+4 YL4 YL[4
08856 楄 Y'PA Y.PA YPA
08857 業 2UTY 2TOY 2-OY 2TY 2-Y =UTY =TOY =-OY =TY =-Y
08858 楘 SJXY STXY SXY
08859 楁 YUXO
08860 楴 YTUE YT2E
08861 楾 YTL3 YT3 YT23 YTX3
08862 榧 YCBV YCV
08863 楋 YYOJ YYOJ YYJ
08864 槭 Y-OM YOM YM-O
08865 楜 Y+OA Y[OA
08866 楏 YKHH YK2H

08867 楱 YW'K YW-K YW2T YW=T YWH2 YWH8 YWK YW2 YW8
08868 榫 YHOH
08869 橀 YQG
08870 樠 YETA YEM
08871 樘 Y'BE YBE
08872 榹 YT3J Y]3J
08873 歃 TKBT TKB- TBUT
08874 歎 -4H- 4HUT 4H-
08875 歐 HEE- H:UT H:-
08876 歔 ETAT ETA- EAUT EAT EMUT EM- \TAT \TA- \AUT \AT
\MUT \M-
08877 歛 8AJT 8AJ- 8JUT 8J-
08878 歜 HLUT H2L- H8L- HRL- HL-
08879 殨 -AS- ASOX ASO- AS- -A5- A5OS A5O- A5-
08880 毻 +AEL +A3L +HAL +AL [AEL [A3L [HAL [AL
08881 毹 BCEL BJEL BC3L BJ3L BCLL BJLL
08882 㲣 8AJL 8JEL 8J3L
08883 氇 B43L B4EL B4L
08884 氆 ELQG ELG 3LQG 3LG
08885 漩 3UAS 3U2S 3U8S 3URS 3US
08886 漯 3TOK 3THK 3TXK
08887 滴 3TOA 3THA
08888 漉 3LEO
08889 漘 3TNQ
08890 潩 3UB6 3U6
08891 漮 3KE4 32-4 324
08892 潾 32E4 324
08893 漾 32EH
08894 潥 3E8Y 33TY 3E8' 33T' 3E'Y
08895 潻 3+UN 3+N 3+3 3[UN 3[N 3[3
08896 漏 3-OA
08897 潯 3JOJ 32JO 3JJ
08898 澊 3LKJ 3LJ
08899 潹 3P8Y
08900 潑 3X2S 3X=S 3X.S 3XS
08901 潖 3B3R 3BR
08902 潿 3OZ 3OZ 3OZL 3OZL
08903 澂 3EOK 3E-K 3EK 3E. 3\OK 3\-K 3\K 3\.
08904 潵 3E-S 3ES 3\-S 3\S
08905 澈 3ERX 3\RX
08906 溢 32XK 38XK 32$ 38$ 326 386
08907 澯 3EEX 3EIX 3;IX 3;X
08908 澆 3'QR 3QRS 3QR 3R
08909 澮 38SE 38EE 32SE 32EE 38S2 32S2
08910 澕 3'BY 3BY- 3BY
08911 澘 3U2O 3U8O 3URO 3UHO
08912 澿 3E83 3E84 33T3 33T4
08913 澬 3HOK 3HK
08914 濉 3YHH 3Y2H 3YH
08915 潘 32SB 3=SB
08916 澸 3EJ4 3EC4 37
08917 澍 3BHJ
08918 澥 3Q2H
08919 澴 3O42 3O48
08920 澲 3AHY 3AY
08921 澸 372Y 3TZY 3TLY
08922 澡 3'YF 3YFF 3'Y7 3Y77 3* 3'FF 3'77 3'F 3'7
08923 澌 3'BE 3B-E 32-E
08924 澰 3T8A
08925 燀 WUHQ WUQ
08926 熓 WWTO WWO 2WTO 2WO =WTO =WO
08927 燁 WHOH
08928 燊 WSJY WSY WJY
08929 燡 WHLY WHY
08930 燄 WH2L WH8L WHRL WHL
08931 燏 WB'4 WB4 WPI4 WP4
08932 熒 WWUR WUR. WUXZ WUZX WU+Z WUZ+ 2WUR =WUR WU[Z WUZ[
08933 燚 TOYW
08934 燏 W'PA W.PA WPA
08935 燂 W2-Q WKQ W2Q
08936 燋 WEHZ
08937 燁 WHO+ WHO+ WXO+ WXO+ WHO[ WHO[ WXO[ WXO[
08938 燬 W-OM WOM WM-O WMO

| | | |
|---|---|---|
| 08939 | 煃 | WKHH WK2H WKH |
| 08940 | 烟 | WB'E WBE |
| 08941 | 熰 | WOOO W3O |
| 08942 | 燗 | WQA |
| 08943 | 焕 | WHUK WHK WXUK WXK |
| 08944 | 煓 | WETA WEA WEM |
| 08945 | 燻 | WHQH |
| 08946 | 燉 | W'YW W'W |
| 08947 | 熨 | BCCW BEW |
| 08948 | 牏 | UU8J UL8J UT8J K8AJ |
| 08949 | 犍 | 'FEZ ZEHZ |
| 08950 | 犌 | 'FPX ZP2X ZP=X ZPCX ZPRX ZPX |
| 08951 | 犋 | 'F4K Z4K. Z4.K Z4K |
| 08952 | 犐 | 'FY+ 'F'+ Z'Y+ ZY2+ ZY=+ ZY+ Z'2+ Z'=+ Z'+ 'FY[ 'F'[ Z'Y[ ZY2[ ZY=[ ZY[ Z'2[ Z'=[ Z'[ |
| 08953 | 輊 | HHJH HJ'H 2HJH HJH =HJH |
| 08954 | 猼 | Z+AJ Z+J Z-J Z[AJ Z[J |
| 08955 | 獂 | ZLB3 ZL3 |
| 08956 | 猻 | ZZ'N ZZN3 ZZN ZZ3 |
| 08957 | 狧 | ZAHE ZAE |
| 08958 | 獀 | ZEEX ZEIX Z;IX ZEX Z;X |
| 08959 | 獊 | Z8-O Z8.O Z8EO Z8O |
| 08960 | 獫 | Z3TY Z3T' ZE8Y ZE8' ZE' |
| 08961 | 瑄 | EU2B EU=B EUB- |
| 08962 | 瑊 | E-OM EOM EM-O EMO |
| 08963 | 瑋 | EHOH |
| 08964 | 瑒 | EB-C EBC2 EBC |
| 08965 | 瑑 | ELLZ EOZL EOZ |
| 08966 | 瑗 | EAHX EAX |
| 08967 | 瑪 | E'OA E'OA EOA |
| 08968 | 琈 | EU2J EU8J EURJ EUCJ EUJ |
| 08969 | 瑜 | EKAJ |
| 08970 | 瑎 | EFFB E2FB EF'B EFB E77B E27B E7'B E7B E%'B E%B |
| 08971 | 瑂 | EB'4 EPI4 EP4 |
| 08972 | 瑆 | EB'E EBE |
| 08973 | 瑍 | EUQK EUQ2 EUQ8 EU4K EU42 EU48 EUAK EA42 EA48 |
| 08974 | 瑔 | E'B3 EB3 E'B4 |
| 08975 | 瓡 | HHAS |
| 08976 | 甀 | TKOZ TO-Z TOCZ |
| 08977 | 甄 | 'YVZ YV-Z YVCZ 'V-Z 'VCZ 'VZ |
| 08978 | 甇 | 3UOZ 3U-Z 3UCZ |
| 08979 | 甝 | TURH TRH2 T7RH U7RH URH2 TRH= URH= |
| 08980 | 畹 | QUAL QUL |
| 08981 | 畷 | Q4X |
| 08982 | 畺 | YYQ |
| 08983 | 痯 | L2UB LUB |
| 08984 | 瘏 | L2HB LH'B |
| 08985 | 瘃 | L2Z LZ L2ZL LZL |
| 08986 | 瘇 | L2KL LKQL |
| 08987 | 痾 | L2PJ LPJO LPJ |
| 08988 | 瘑 | L2OO L2OO LO+O LO+O LOO LOO LO[O LO[O |
| 08989 | 瘐 | L2QK LQK L2QH |
| 08990 | 痸 | L2HJ LHEJ |
| 08991 | 瘓 | L2ET L2;T |
| 08992 | 痻 | L2KB L'KB LKB |
| 08993 | 瘨 | L2QK L2Q2 L2Q8 |
| 08994 | 瘛 | L2AA L22A |
| 08995 | 瘒 | L2YZ L'YZ LYZ L2'Z L'Z- L'Z |
| 08996 | 瘤 | L2TE L2'E LTHH LTE L'E L2E LE |
| 08997 | 皙 | YLTB YTB |
| 08998 | 皺 | HBEX HBX |
| 08999 | 盠 | OT44 O-34 O34- O44- O-44 O34 O44 |
| 09000 | 睕 | 4UAL 4UL |
| 09001 | 睟 | 4TT+ 4T4+ 4T+ 4TT[ 4T4[ 4T[ |
| 09002 | 睠 | 42HL 42L |
| 09003 | 睒 | 4WW 42W |
| 09004 | 睃 | 4H2X 4H8X 4HRX 4HX |
| 09005 | 睚 | 4LHH 4L2H 4LH |
| 09006 | 睞 | 4OT4 4O-3 4O-4 4O4' |
| 09007 | 睧 | 4'KB 4KB |
| 09008 | 睔 | 48-A 48A |
| 09009 | 睺 | 4'PK 4.PK 4PK. 4P.K 4PK |
| 09010 | 睊 | 4UHO |
| 09011 | 猎 | SJHB SJB |

| | | | | | | | | | | | |
|---|---|---|---|---|---|---|---|---|---|---|---|
| 09012 | 碇 | TOUG | +U-G | +UG | [U-G | [UG | | | | | |
| 09013 | 硞 | +TKO | [TKO | | | | | | | | |
| 09014 | 碔 | TOGM | TOMG | +GM | +MG | [GM | [MG | | | | |
| 09015 | 碏 | TOHB | +HHB | +HB | +22B | [HHB | [HB | [22B | | | |
| 09016 | 碄 | TOYY | TO2Y | +YY | +2Y | [YY | [2Y | | | | |
| 09017 | 碕 | TOKJ | +KJO | +KJ | [KJO | [KJ | | | | | |
| 09018 | 碅 | TOOY | TOOY | TOQ | +O'Y | +O'Y | TOO' | TOO' | +O' | +O' | [O'Y |
| | | [O'Y | [OY | [OY | [O' | [O' | | | | | |
| 09019 | [illegible] | 3EXO | 3EX+ | 3XTO | 3X+ | 3EX[ | 3X[ | | | | |
| 09020 | 碡 | TOEQ | +EQ- | +EQ | [EQ- | [EQ | | | | | |
| 09021 | 碃 | TOEA | +IEA | +EA | [IEA | [EA | | | | | |
| 09022 | 硹 | TOYS | +Y8S | +Y2S | +YS | [Y8S | [Y2S | [YS | | | |
| 09023 | 碉 | +UKE | [UKE | | | | | | | | |
| 09024 | 碑 | TOAJ | +AEJ | [AEJ | | | | | | | |
| 09025 | 碖 | TO8A | +8-A | +8A | [8-A | [8A | | | | | |
| 09026 | 砦 | EXTO | CUX+ | EX+ | CUX[ | EX[ | | | | | |
| 09027 | 棵 | -YQY | 23QY | =3QY | KQY | | | | | | |
| 09028 | 椆 | -YUO | 23UO | =3UO | KUHO | | | | | | |
| 09029 | 椊 | 23T+ | =3T+ | KTT+ | K2T+ | KT2+ | KT4+ | KT+ | 23T[ | =3T[ | KTT[ |
| | | K2T[ | KT2[ | KT4[ | KT[ | | | | | | |
| 09030 | 梅 | -YCE | 23CE | =3CE | KCHE | KCE | -YJE | 23JE | =3JE | KJHE | KJE |
| 09031 | 稑 | 'YHH | YH2H | YH8H | YHRH | 'H2H | 'H8H | 'HRH | 'HH | 'Y6 | '6 |
| 09032 | 稘 | 'YHK | 'H2K | 'H=K | 'H22 | 'H=2 | 'H28 | 'H=8 | 'HK | | |
| 09033 | 稙 | 'Y+L | 'Y+4 | 'Y+- | '+4L | '+4- | '+4 | '+L | 'Y[L | 'Y[4 | 'Y[- |
| | | '[4L | '[4- | '[4 | '[L | | | | | | |
| 09034 | 稛 | 'YOO | 'YOO | 'YQ | YO+O | YO+O | YOO | 'O+O | 'O+O | 'OO | 'OO |
| | | YO[O | YO[O | 'O[O | 'O[O | | | | | | |
| 09035 | 稗 | 'YQ4 | 'YQ+ | ''Q4 | ''Q+ | 'YQ[ | ''Q[ | | | | |
| 09036 | 稕 | 'YTZ | YTOZ | :TOZ | 'TZ | | | | | | |
| 09037 | 稜 | 'YOM | 'YMO | YO-M | YMO- | 'O-M | 'O-M | 'OM | 'MO | | |
| 09038 | 稭 | 'YHB | 'HHB | '22B | 'HB | | | | | | |
| 09039 | 稒 | 'YOY | 'YOY | 'YO' | 'YO' | YO'Y | YO'Y | 'O' | | | |
| 09040 | 稐 | 'Y8A | '8-A | '8A | | | | | | | |
| 09041 | 窣 | U2T+ | U8T+ | URT+ | UTT+ | UT4+ | UT+ | U2T[ | U8T[ | URT[ | UTT[ |
| | | UT4[ | UT[ | | | | | | | | |
| 09042 | 窡 | U2OM | U8OM | UROM | UO-M | U2MO | U8MO | URMO | UMO- | UMO | |
| 09043 | 窨 | U2U; | U8U; | URU; | UUEE | UUE | UU; | | | | |
| 09044 | 竫 | TKAJ | TAEJ | | | | | | | | |
| 09045 | 笵 | FFUR | /U2R | /U=R | /UR | | | | | | |
| 09046 | 筫 | FFBK | /-BK | /.BK | /BK | | | | | | |
| 09047 | 箕 | FFEH | /H20 | /EH | /E++ | /EX | /E[[ | | | | |
| 09048 | 筴 | FFKT | /KTT | /K2T | /KT | /-3T | | | | | |
| 09049 | 箈 | FFSA | /SUH | /SA | | | | | | | |
| 09050 | 箇 | FF3A | /3A | | | | | | | | |
| 09051 | 箁 | FFOO | /O'O | /OIO | /O.O | /OO | | | | | |
| 09052 | 箎 | FFEZ | /'HZ | /-HZ | /EZ | | | | | | |
| 09053 | 筱 | FFTX | /TIX | /TTX | /TX | | | | | | |
| 09054 | 筰 | FFTE | /TTK | /T'E | /TE | | | | | | |
| 09055 | 筿 | FF8Y | FF83 | /8Y | FF8' | /8'Y | /8-Y | /823 | /8=3 | /8' | |
| 09056 | 箑 | FFBH | /BHI | /B2I | /B=I | /B-+ | /B-[ | /BH | | | |
| 09057 | 箬 | FFHO | /'HO | /HO | | | | | | | |
| 09058 | 箣 | FFYJ | /'YJ | /YJ | FF'J | /'IJ | /'J | | | | |
| 09059 | 粲 | TAXY | TX2Y | AX2Y | AXY | | | | | | |
| 09060 | 粴 | 2YQH | =YQH | | | | | | | | |
| 09061 | 粯 | 2Y4R | =Y4R | | | | | | | | |
| 09062 | 綈 | N325 | N25J | | | | | | | | |
| 09063 | 綆 | N3-X | N3QX | N-QX | N-X | NQX | | | | | |
| 09064 | 綀 | N3YO | N3YO | NYO | NYO | | | | | | |
| 09065 | 綒 | N3+Z | N+UZ | N+Z | N3[Z | N[UZ | N[Z | | | | |
| 09066 | 綠 | N3+3 | N-3. | N+3. | N+3 | N3-4 | N3+4 | N-4. | N+4. | N-4 | N+4 |
| | | N3[3 | N[3. | N[3 | N3[4 | N[4. | N[4 | | | | |
| 09067 | 綏 | N3EX | NEUX | | | | | | | | |
| 09068 | 綈 | N3XE | NX+E | NXE | NX[E | | | | | | |
| 09069 | 綖 | N3EZ | N'HZ | NEZ | | | | | | | |
| 09070 | 綄 | NUBR | NDBR | | | | | | | | |
| 09071 | 綃 | N33A | | | | | | | | | |
| 09072 | 綌 | N3AZ | N3Z | N'3Z | N'2Z | NAZ | | | | | |
| 09073 | 綌 | N340 | N220 | N880 | N280 | N40 | | | | | |
| 09074 | 綝 | KS'N | K5'N | KC'N | KJ'N | KSN3 | K5N3 | KCN3 | KJN3 | KSN | K5N |
| | | KCN | KJN | | | | | | | | |
| 09075 | 綩 | NU2R | NU=R | | | | | | | | |
| 09076 | 綰 | N300 | N3B | NO'O | NOIO | NO.O | NOO | NB | | | |
| 09077 | 綒 | N3AZ | N'3Z | NAZ- | NAZ | | | | | | |

| | | | | | | | | | | | |
|---|---|---|---|---|---|---|---|---|---|---|---|
| 09078 | [illegible] | 4O-M | 4OM | 4MO- | 4MO | | | | | | |
| 09079 | [illegible] | 4HHT | 42HT | | | | | | | | |
| 09080 | [illegible] | 4YY | | | | | | | | | |
| 09081 | [illegible] | 4KQL | 4KL | | | | | | | | |
| 09082 | [illegible] | 44X | | | | | | | | | |
| 09083 | [illegible] | 2EUR | =EUR | | | | | | | | |
| 09084 | [illegible] | 2E3H | =E3H | | | | | | | | |
| 09085 | [illegible] | 2ESX | =ESX | | | | | | | | |
| 09086 | [illegible] | TIXE | TXEE | TX2E | TIX2 | | | | | | |
| 09087 | [illegible] | EEKT | 2EKT | =EKT | 2KTT | 2KT | 2-3T | =KTT | =KT | =-3T | |
| 09088 | [illegible] | 2Y4C | =Y4C | Y4C' | Y4C | | | | | | |
| 09089 | [illegible] | ATKB | | | | | | | | | |
| 09090 | [illegible] | AE8K | A3TK | | | | | | | | |
| 09091 | [illegible] | A-OQ | A-Q | AOQ | | | | | | | |
| 09092 | [illegible] | AH2Y | AH=Y | | | | | | | | |
| 09093 | [illegible] | A+UH | A+A | A[UH | A[A | | | | | | |
| 09094 | [illegible] | APSH | APH | | | | | | | | |
| 09095 | [illegible] | AQUS | AQA | | | | | | | | |
| 09096 | [illegible] | AQ-K | AQK | | | | | | | | |
| 09097 | [illegible] | AU2X | AU8X | AURX | AXUX | AUXX | | | | | |
| 09098 | [illegible] | ALLZ | AOZL | AOZ | | | | | | | |
| 09099 | [illegible] | A'EX | AERX | AEX | | | | | | | |
| 09100 | [illegible] | A8AJ | | | | | | | | | |
| 09101 | [illegible] | AL+4 | AL4 | AL[4 | | | | | | | |
| 09102 | [illegible] | AHHH | AHXH | AHH | | | | | | | |
| 09103 | [illegible] | AQUO | AAUO | AQA | | | | | | | |
| 09104 | [illegible] | H3UH | | | | | | | | | |
| 09105 | [illegible] | 'APL | A-PL | | | | | | | | |
| 09106 | [illegible] | 'A3A | A-3A | A3A | | | | | | | |
| 09107 | [illegible] | 'AAZ | A-AZ | | | | | | | | |
| 09108 | [illegible] | 'AXE | A-XE | AXE | | | | | | | |
| 09109 | [illegible] | 'A8Y | A-8Y | 'A8' | A-8' | A8'Y | A8-Y | A823 | A8=3 | A8' | |
| 09110 | [illegible] | H32H | X32H | | | | | | | | |
| 09111 | [illegible] | H3HO | H3O | X3HO | X3O | | | | | | |
| 09112 | [illegible] | HU2K | HU8K | HURK | HUK. | HU.K | XU2K | XU8K | XURK | XUK. | XU.[illegible] |
| 09113 | [illegible] | HTOJ | HTUJ | XTOJ | XTUJ | | | | | | |
| 09114 | [illegible] | HTDL | HDTL | HDL | XTDL | XDTL | XDL | | | | |
| 09115 | [illegible] | ++U9 | HU-Q | HU9 | XU-Q | XU9 | [LU9 | | | | |
| 09116 | [illegible] | HTS4 | HT54 | HAS4 | HA54 | XTS4 | XT54 | XAS4 | XA54 | | |
| 09117 | [illegible] | HKAJ | XKAJ | | | | | | | | |
| 09118 | [illegible] | HHHJ | H2HJ | XHHJ | X2HJ | | | | | | |
| 09119 | [illegible] | HFHO | HFO | XFHO | XFO | | | | | | |
| 09120 | [illegible] | HHRV | HHV | XHRV | XHV | | | | | | |
| 09121 | [illegible] | H+ZC | X+ZC | H[ZC | X[ZC | | | | | | |
| 09122 | [illegible] | ++Y4 | HY4 | XY4 | [[Y4 | | | | | | |
| 09123 | [illegible] | ++OQ | H-OQ | HOQ | X-OQ | XOQ | [[OQ | | | | |
| 09124 | [illegible] | ++4V | H-4V | H4V | X-4V | X4V | [[4V | | | | |
| 09125 | [illegible] | HH2L | HH8L | HHRL | HHL. | XH2L | XH8L | XHRL | XHL | | |
| 09126 | [illegible] | ++Y4 | HY4 | XY4 | [[Y4 | | | | | | |
| 09127 | [illegible] | ++OM | ++MO | H-OM | HM-O | X-OM | XOM | XMO | [[OM | [[MO | |
| 09128 | [illegible] | ++VM | H-VM | HVM | HM-V | HMV | X-VM | XVM | XM-V | XMV | [[V[illegible] |
| 09129 | [illegible] | H3HC | X3HC | | | | | | | | |
| 09130 | [illegible] | HBSR | HBFR | HB7R | HBR | XBSR | XBFR | XB7R | XBR | | |
| 09131 | [illegible] | ++5P | ++54 | H5-4 | H5P | H54 | X5-4 | X5P | X54 | [[5P | [[54 |
| 09132 | [illegible] | H3AJ | X3AJ | | | | | | | | |
| 09133 | [illegible] | ++B4 | HB4 | XB4 | [[B4 | | | | | | |
| 09134 | [illegible] | ++4J | H42J | H48J | H4J | X42J | X48J | X4J | [[4J | | |
| 09135 | [illegible] | ++OP | HOP | ++O4 | HO-4 | HO4 | XOP | XO-4 | XO4 | [[OP | [[O4 |
| 09136 | [illegible] | HBTK | HB'E | XBTK | XB'E | | | | | | |
| 09137 | [illegible] | ++QG | HQG | XQG | [[QG | | | | | | |
| 09138 | [illegible] | HAHX | XAHX | | | | | | | | |
| 09139 | [illegible] | ++T4 | HTA- | HT4- | HTT4 | H2T4 | HT4 | XTA- | XTT4 | XT4 | [[T4 |
| 09140 | [illegible] | ++YW | H'YW | HYW | X'YW | XYW | ++'W | H'W | X'W | [[YW | [['[illegible] |
| 09141 | [illegible] | HHHH | HHXH | XHHH | XHXH | | | | | | |
| 09142 | [illegible] | ++AC | HACO | HAC | XACO | XAC | HAJO | XAJO | [[AC | | |
| 09143 | [illegible] | HD42 | HD48 | HD2 | HD8 | XD42 | XD48 | XD2 | XD8 | HU42 | HU48 |
| | | HU2 | HU8 | XU42 | XU48 | XU2 | XU8 | | | | |
| 09144 | [illegible] | HURC | XURC | | | | | | | | |
| 09145 | [illegible] | H'OA | H'OA | H'A | HOA | HOA | X'OA | X'OA | X'A | | |
| 09146 | [illegible] | ++BE | H'BE | HBE | X'BE | XBE | [[BE | | | | |
| 09147 | [illegible] | HTSX | XTSX | | | | | | | | |
| 09148 | [illegible] | ++PA | H'PA | H.PA | HPUH | HPA | X'PA | X.PA | XPUH | XPA | [[PA |

| | | |
|---|---|---|
| 09149 | 褚 | H'TH H]EH H]H X'TH X]EH X]H |
| 09150 | 蕣 | ++3V HVVV H3V XVVV X3V [[3V |
| 09151 | 葒 | ++NH HN3H HNH XN3H XNH [[NH |
| 09152 | 葯 | ++NC HN3C HNC. HNC XN3C XNC. XNC ++NJ HN3J HNJ. HNJ XN3J XNJ. XNJ [[NC [[NJ |
| 09153 | 虢 | H3T3 H3TR X3T3 X3TR |
| 09154 | 菰 | ++3K [[3K H3LK H3K X3LK X3K |
| 09155 | 替 | ++TB HTKB HTB XTKB XTB [[TB |
| 09156 | 葉 | ++SY HSJY HSY XSJY XSY [[SY |
| 09157 | 蓁 | ++EB HE8B H3TB HEB XE8B X3TB XEB [[EB |
| 09158 | 荷 | +++A H+UH H+A X+UH [[[A H[UH H[A X[UH |
| 09159 | 萁 | ++QK [[QK HQ-K HQK XQ-K XQK |
| 09160 | 絮 | HALG HAG XALG XAG |
| 09161 | 薛 | HATK HAK XATK XAK |
| 09162 | 著 | H'YB X'YB X'B |
| 09163 | 葎 | HTEX XTEX |
| 09164 | 蓰 | HTCK XTCK |
| 09165 | 蔎 | HERX XERX |
| 09166 | 菉 | H8D4 X8D4 |
| 09167 | 蛾 | OS-K OS.K S-BK S.BK OS-K OS.K |
| 09168 | 蜒 | SL2K SL=K |
| 09169 | 蛛 | OS-3 OS+3 OS3 S-3. S+3. S-3 S+3 OS-4 OS+4 OS4 S-4. S+4. S-4 S+4 OS-3 OS+3 OS3 OS[3 S[3. S[3 OS[4 S[4. S[4 OS[3 |
| 09170 | 蛭 | OSFH SFFH S2FH SFH OSFH OS7H S77H S27H S7H OS7H OS%H OS%H S%IH S%H |
| 09171 | 蛺 | OSKT SKTT SK2T SKT S-3T OSKT |
| 09172 | 蜷 | OSK3 SK.3 OSK3 |
| 09173 | 蛵 | OS3H S-3H S3H OS3H |
| 09174 | 蜘 | OSBP SBSP SBP OSBP |
| 09175 | 蛸 | OS3A S3A OS3A |
| 09176 | 蛹 | OSOA SOA OSOA |
| 09177 | 蜉 | OSAZ S'3Z SAZ- OSAZ |
| 09178 | 蜿 | OSTG OSTG STLG STJG STG |
| 09179 | 蛉 | OSAJ OSAJ SAJ S'3J |
| 09180 | 蜍 | OS8Y S8-Y S8H3 S8Y OS8Y OS8' OY8' S8' |
| 09181 | 蜅 | OS+A S+A. S+A OS+A OS[A S[A. S[A OS[A |
| 09182 | 裾 | KL2K KL=K |
| 09183 | 裋 | K-OK |
| 09184 | 裀 | KOY KOY |
| 09185 | 裎 | KOE KO'H |
| 09186 | 祝 | K2OR K2R |
| 09187 | 褰 | TOBK TOLK |
| 09188 | 裝 | FLTK FTTK |
| 09189 | 裌 | KKTT KK2T KKT K-3T |
| 09190 | 裯 | KOA |
| 09191 | 觔 | -VC2 4VC2 -VC 4VC -4VC |
| 09192 | 覡 | LK4R |
| 09193 | 觟 | UAHH UAH |
| 09194 | 觥 | UA3R UAR |
| 09195 | 觤 | UAUL |
| 09196 | 觡 | UAXO UAO |
| 09197 | 觠 | 2H8A 2HA =H8A =HA |
| 09198 | 觱 | EDUA EDA |
| 09199 | 觜 | GFUA G7UA |
| 09200 | 触 | UUHS UAOS UAOS UAS |
| 09201 | 訓 | 4030 403T ;TTT ;3T ;30 ;+++ ;[[[ |
| 09202 | 誆 | 40CE ;CE |
| 09203 | 詿 | 40HH ;HH |
| 09204 | 詡 | 40EE 402E ;2C2 ;2J2 ;EE ;2E 402 ;2 |
| 09205 | 詘 | 40GF ;GF 40G7 ;G7 |
| 09206 | 訶 | ;U-O |
| 09207 | 誂 | 40KK 402K ;KKL ;KK ;2K |
| 09208 | 誄 | 402Y 40=Y ;2Y ;=Y |
| 09209 | 詵 | 40HR ;'HR ;HR |
| 09210 | 誃 | 40AA 402A ;AA ;2A |
| 09211 | 訮 | 402H ;222 ;2HH ;2H |
| 09212 | 詥 | 40+A ;+A 40[A ;[A |
| 09213 | 詺 | 40AO ;C.O ;U.O ;AO |
| 09214 | 詄 | 40H2 40H8 408 |
| 09215 | 登 | W-OK WOK W. AP-K APOK APK AP. |
| 09216 | 豋 | Q-OK QOK Q. |
| 09217 | 致 | ZTUT ZLTT |

| | | | | | | | | | | | |
|---|---|---|---|---|---|---|---|---|---|---|---|
| 09218 | 翫 | ZLBK | | | | | | | | | |
| 09219 | 康 | TU7Z | T7Z | U7Z | | | | | | | |
| 09220 | 齟 | AZ2B | AZ=B | | | | | | | | |
| 09221 | 齛 | AZEH | ZEH | | | | | | | | |
| 09222 | 齚 | AZTY | ZTY | | | | | | | | |
| 09223 | 黃 | TUT2 | TUT8 | TT42 | TT48 | TUT4 | | | | | |
| 09224 | 赽 | H4OS | H4S | H4OS | | | | | | | |
| 09225 | 赩 | H4UL | H4L | H4DL | | | | | | | |
| 09226 | 赵 | HG2T | HG2- | G2UT | G2- | | | | | | |
| 09227 | 趌 | HGHO | HGO | GHO | GIHO | G+-O | GI-O | | | | |
| 09228 | 趝 | HGTY | HGY | G'+Y | G'-Y | GTY | G'[Y | | | | |
| 09229 | 趏 | HGHO | G'+O | GHIO | GHO | G'[O | | | | | |
| 09230 | 趍 | HGAA | HG2A | HGA | | | | | | | |
| 09231 | 趦 | HGRY | GRY | HGSY | GSY | | | | | | |
| 09232 | 趥 | HGAJ | G-AJ | GA1J | GAJ | | | | | | |
| 09233 | 趧 | HGEE | HG2E | HG2 | | | | | | | |
| 09234 | 趚 | HGKK | HG2K | | | | | | | | |
| 09235 | 跰 | OG2H | G2HH | G222 | G2H | | | | | | |
| 09236 | 跠 | OGK5 | G-5T | G+5T | GK5 | G[5T | | | | | |
| 09237 | 跬 | OGHH | OG2H | GHH | G2H | | | | | | |
| 09238 | 跱 | OGHJ | GHJ | GH-J | GHJ. | | | | | | |
| 09239 | 踁 | OGSH | G-SH | GSH | | | | | | | |
| 09240 | 跳 | OGGF | GGF | OGG7 | GG7 | | | | | | |
| 09241 | 跩 | OGQM | OGBM | GQL' | GBL' | GQM | GBM | | | | |
| 09242 | 跣 | OGHR | G'HR | GHR | | | | | | | |
| 09243 | 跢 | OGAA | OG2A | GAA | G2A | | | | | | |
| 09244 | 跧 | OG8E | G8E | | | | | | | | |
| 09245 | 路 | OG8O | G8-O | G8O | | | | | | | |
| 09246 | 跫 | HROG | | | | | | | | | |
| 09247 | 跴 | OG-4 | OG4 | G-4 | G4 | | | | | | |
| 09248 | 輆 | HQTT | QTUT | QTT | | | | | | | |
| 09249 | 軿 | HQ2H | Q2HH | Q222 | Q2H | | | | | | |
| 09250 | 輁 | HQH2 | QHH2 | QHH8 | QH2- | QH8- | QH2 | QH8 | | | |
| 09251 | 輀 | HQTA | QTU2 | QTA | | | | | | | |
| 09252 | 輅 | HQXO | Q'XO | QXO | | | | | | | |
| 09253 | 輇 | HQ8E | Q8E | | | | | | | | |
| 09254 | 輈 | HQ'A | HQA- | Q'A- | Q'A | QA- | | | | | |
| 09255 | 輋 | H8HQ | HH8Q | H8Q | | | | | | | |
| 09256 | 輩 | EKHQ | EKQ | 1UKQ | \KHQ | \KQ | | | | | |
| 09257 | 遒 | 2-QZ | KQZ | 2QZ | =-QZ | =QZ | | | | | |
| 09258 | 遫 | B-CZ | BCZ | | | | | | | | |
| 09259 | 遄 | ETAZ | EMZ | 1UMZ | | | | | | | |
| 09260 | 遇 | T42Z | T48Z | | | | | | | | |
| 09261 | 遊 | H+OZ | H[OZ | | | | | | | | |
| 09262 | 鄐 | TNQP | TQP | | | | | | | | |
| 09263 | 郹 | UB6P | U6P | | | | | | | | |
| 09264 | 郰 | LKJP | LJP | | | | | | | | |
| 09265 | 鄱 | 2SBP | 2BP | =SBP | =BP | | | | | | |
| 09266 | 郼 | O42P | O48P | O2P | O8P | | | | | | |
| 09267 | 郶 | OS4P | O54P | O4P | | | | | | | |
| 09268 | 鄭 | EEXP | ;IXP | ;XP | | | | | | | |
| 09269 | 鄍 | '4GP | 4GP | | | | | | | | |
| 09270 | 酮 | -QUO | 9U-O | 9UO | 9A | | | | | | |
| 09271 | 酯 | -QFB | 9FB | -Q7B | 97B | | | | | | |
| 09272 | 鉈 | 8KUF | $.UF | $UF | 8KU7 | $.U7 | $U7 | 6.UF | 6UF | 6.U7 | 6U7 |
| 09273 | 鉒 | 8K.E | $.E | 6.E | | | | | | | |
| 09274 | 鈰 | 8KTE | $TE | $TUI | 6TE | 6TUI | | | | | |
| 09275 | 鈺 | 8KE. | $E. | 6E. | | | | | | | |
| 09276 | 鉦 | 8K-G | $-G | 6-G | | | | | | | |
| 09277 | 鈳 | 8KJO | $JO | 6JO | | | | | | | |
| 09278 | 鉥 | 8KY. | 8K.Y | 8KY | $Y. | $.Y | $Y | 6Y. | 6.Y | 6Y | |
| 09279 | 鉞 | 8KLM | 8KML | $LM | $ML | 6LM | 6ML | | | | |
| 09280 | 銃 | $TSR | 6TSR | | | | | | | | |
| 09281 | 鈮 | 8KPF | $PF | 6PF | 8KP7 | $P7 | 6P7 | | | | |
| 09282 | 鉊 | 8KUO | 8KDO | $UO | $DO | 6UO | 6DO | | | | |
| 09283 | 鈷 | 8KTO | $I-O | $TO | 6I-O | 6TO | | | | | |
| 09284 | 鉅 | 8KB- | $B- | 6B- | | | | | | | |
| 09285 | 鉬 | 8E24 | 8K4 | $4 | 64 | | | | | | |
| 09286 | 鉏 | 8KA- | 8K4- | $A- | $4- | 6A- | 64- | | | | |
| 09287 | 鉠 | 8KUK | $UK | 6UK | | | | | | | |
| 09288 | 鉧 | 8KQ- | $Q- | $02- | $02- | $0-2 | 6Q- | 602- | 602- | 60-2 | |
| 09289 | 鉯 | $L.T | 6L.T | | | | | | | | |
| 09290 | 鈶 | 8KSO | $SO | 6SO | | | | | | | |

| | | |
|---|---|---|
| 09291 | 鉡 | $220 $2++ $22I $2=I $2X 6220 62++ 622I 62=I 62) $2[[ 62[[ |
| 09292 | 鈳 | 8KCO $C-O $J-O 6C-O 6J-O |
| 09293 | 鋃 | 8KOK $OK 6OK |
| 09294 | 鋋 | 8KCE $CE $CUI 6CE 6CUI |
| 09295 | 鉣 | 8KHS $HS $IHS 6HS 6IHS |
| 09296 | 鉐 | 8KTO $-'O $TO 6-'O 6TO |
| 09297 | 鉎 | 8KGT $T-T $GT 6T-T 6GT |
| 09298 | 銈 | 8K'E $'IE $'E 6'1E 6'E |
| 09299 | 鈽 | 8KTE $TUI 6TUI |
| 09300 | 鉌 | 8K'Y $'Y 8K' $' 6'Y 6' |
| 09301 | 鉾 | 8KX2 8KX= $X2 $X= 6X2 6X= |
| 09302 | 鈲 | 8KAS $AS 6AS |
| 09303 | 陑 | PPG' MG' |
| 09304 | 陱 | PPJO MJO |
| 09305 | 陗 | PPSH MSH MS2O MS++ MSX MS[[ |
| 09306 | 陙 | PPH2 MH21 MH12 MK+ MKL MH2 |
| 09307 | 陝 | PKE4 PK4 P2E4 P24 |
| 09308 | 陸 | P+HH P2+H P+H P[HH P2LH PLH |
| 09309 | 隓 | PE-K PEOK PEK PE. P1UK P1U. P\-K P\OK P\K P\. |
| 09310 | 陼 | P'QR PQRS PQR PR |
| 09311 | 睢 | A-TE A-'E A-E 4-TE 4-'E 4-E |
| 09312 | 掌 | -ASJ TASJ MSLJ MSJJ MSJ' MSJ -SJJ -SLJ -SJ' -SJ |
| 09313 | 挲 | -AAJ TAAJ MAJ -'2J -'3J |
| 09314 | 掔 | TAH= TAH2 TAH- M202 M20= M20- MH2 MH= MH- -H2 -H= -H- |
| 09315 | 棠 | -AUK TAUK MUK -UK |
| 09316 | 斬 | H+LT H+T H[LT H[T |
| 09317 | 剸 | H+5I H[5I |
| 09318 | 毄 | H+ST H+SX H+S H[ST H[SX H[S |
| 09319 | 軨 | H+8L H+8J H[8L H[8J |
| 09320 | 頎 | TRT2 TRT8 |
| 09321 | 頍 | +XT2 +XT8 +X8 [XT2 [XT8 [X8 |
| 09322 | 頏 | LTT2 LTT8 LT2 LT8 |
| 09323 | 鬿 | RSCJ RSJ RCJ RJ |
| 09324 | 鮅 | 8SG' 8SG 8FG' 8FG 87G' 87G 8G' |
| 09325 | 鯽 | 8SPP 8FPP 87PP 8C'P 8PP |
| 09326 | 馯 | E4HI E4-+ E42I E4=I E4H 7HI 7-+ 721 7=I 7H E4-[ |
| 09327 | 馲 | E4HL E42L E4=L E4L 7'-L 7HL 72L 7=L 7L |
| 09328 | 馰 | E4C. E4C 7'C. 7C. 7C E4J. 7'J. 7J. 7J |
| 09329 | 骭 | EJ4H EC4H E420 E4++ E4H E4X 720 7++ 7H E4[[ 7[[ |
| 09330 | 骭 | QAHI QA-+ QA2I QA=1 QAH QA-[ |
| 09331 | 骫 | QUA9 QA9. QA9 |
| 09332 | 魛 | UQ4D U4D |
| 09333 | 鳥 | I.B4 TBS4 TB54 TB4 I.5 |
| 09334 | 鳭 | DBS4 DB54 DB4 D5 |
| 09335 | 鳧 | BS4R B54R 5R |
| 09336 | 麈 | LFFF L2FF LHFF LHF L777 L277 LH77 LH7 LH%F L%F LH%7 L%7 |
| 09337 | 匭 | 4BBL 42BL 4EEL 42EL 4LBB 4L2B 4LEE 4L2E 4BL OBBL O2BL OEEL O2EL OLBB OL2B OLEE OL2E OEL QBBL Q2BL QEEL Q2EL QLBB QL2B QLEE QL2E QEL |
| 09338 | 僦 | TT3K |
| 09339 | 僗 | T29J T2QJ T8QJ TKQJ |
| 09340 | 僗 | TWWC T2WC TWUC TWC |
| 09341 | 僙 | T+H2 T+H8 T+2 T+8 T[H2 T[H8 T[2 T[8 |
| 09342 | 僷 | T-4Y T4Y |
| 09343 | 僛 | TH2T TH8T TH2- TH8- THT TH- |
| 09344 | 僑 | TSJA |
| 09345 | 僱 | TP3Z TPZ TPZ- |
| 09346 | 僤 | TOQ+ TOO+ T2O+ T2Q+ TOQ[ TOO[ T2O[ T2Q[ T@ |
| 09347 | 僨 | TO-2 TO-8 TO42 TO48 TO2 TO8 |
| 09348 | 僬 | TTE4 T'E4 TE4 |
| 09349 | 僰 | YUYT 2YUT =YUT |
| 09350 | 僥 | TYAH T2YH TYH |
| 09351 | 僭 | TKKB T2KB T+KB T-KB T[KB |
| 09352 | 僪 | TAYQ TAQ TYQ |
| 09353 | 凘 | 2H2T 2H8T =H2T =H8T |
| 09354 | 劀 | SJAJ |
| 09355 | 劁 | TE4J 'E4J E41J E4J |
| 09356 | 勱 | HL2C HL8C H42C H48C H2C' H8C' H8C |

| | | | | | | | | | | | |
|---|---|---|---|---|---|---|---|---|---|---|---|
| 09357 | 勵 | C441 | | | | | | | | | |
| 09358 | 匱 | COQ+ | COO+ | C2O+ | C2Q+ | CO+ | COQ[ | COO[ | C2O[ | C2Q[ | CO[ |
| | | C⊕ | | | | | | | | | |
| 09359 | 厲 | LBAO | LAO | LBO | | | | | | | |
| 09360 | 嘧 | OUGE | | | | | | | | | |
| 09361 | 嘱 | OGS4 | OG54 | O-G4 | | | | | | | |
| 09362 | 嘿 | O-43 | O-4Y | O423 | O4=3 | O4-Y | O43 | O4Y | | | |
| 09363 | 嗒 | OEEE | O2EE | OEC- | | | | | | | |
| 09364 | 嗅 | OHBK | OXBK | | | | | | | | |
| 09365 | 鍜 | +OPX | [OPX | | | | | | | | |
| 09366 | 嘍 | OKTA | OKA | | | | | | | | |
| 09367 | 喊 | OTYM | OG3M | OMTY | OMG3 | OTM | OMY | OM3 | | | |
| 09368 | 嘓 | OOOM | OOOM | OOM | OOE | | | | | | |
| 09369 | 蹦 | BTB | BXB | 4OX | | | | | | | |
| 09370 | 嗺 | OETE | OE'E | OIUE | O\TE | O\'E | O\E | | | | |
| 09371 | 嘝 | OUA+ | OU+ | OUA[ | OU[ | | | | | | |
| 09372 | 嘞 | OBSY | OB5Y | | | | | | | | |
| 09373 | 嘖 | O8L2 | O8J2 | O8L8 | O8J8 | | | | | | |
| 09374 | 嘡 | OHQZ | OQZ | | | | | | | | |
| 09375 | 墉 | HLEA | HLA | IHLA | | | | | | | |
| 09376 | 墫 | H+QJ | H+SJ | IH+J | H[QJ | H[SJ | IH[J | | | | |
| 09377 | 墐 | HHOE | HHOE | IHHE | | | | | | | |
| 09378 | 墶 | H+BZ | HHBZ | IH+Z | IHBZ | H[BZ | IH[Z | | | | |
| 09379 | 墆 | HEUE | IHEE | HHUE | | | | | | | |
| 09380 | 墁 | HB4X | HBX | IHBX | | | | | | | |
| 09381 | 壞 | HQOV | HQOV | HQV | IHQV | | | | | | |
| 09382 | 塴 | HEAA | HE2A | | | | | | | | |
| 09383 | 墦 | HS83 | H3S3 | HS3 | IHS3 | | | | | | |
| 09384 | 壓 | LYYH | L2YH | LYIH | LYH | | | | | | |
| 09385 | 墱 | HTK+ | HTB+ | HT+ | IHT+ | HTK[ | HTB[ | HT[ | IHT[ | | |
| 09386 | 墒 | IHTA | HT2A | HTUO | | | | | | | |
| 09387 | 墎 | HTZP | HTP | IHTP | | | | | | | |
| 09388 | 墟 | IHLF | IHL7 | HLHF | HLH7 | | | | | | |
| 09389 | 塛 | H-43 | H-4Y | H423 | H4=3 | H4-Y | H43 | H4Y | IH43 | IH4Y | |
| 09390 | 墈 | HHLC | IHHC | | | | | | | | |
| 09391 | 墺 | HHBK | HHK | HXBK | IHHK | IHXK | | | | | |
| 09392 | 墭 | HETE | HE'E | IHEE | | | | | | | |
| 09393 | 墍 | KAJH | KJH | | | | | | | | |
| 09394 | 鉅 | HOKE | HKCC | HKE | | | | | | | |
| 09395 | 彌 | K3KK | K3A | K3K | | | | | | | |
| 09396 | 嫥 | VTK+ | VTB+ | VT+ | VTK[ | VTB[ | VT[ | | | | |
| 09397 | 嫮 | V-AS | V-A5 | V-AC | V-AJ | VTAS | VTA5 | VTAC | VTAJ | VM-S | VM- |
| | | VM2C | VM=C | VM2J | VM=J | VMS | VM5 | VMC | VMJ | V-2C | V-= |
| | | V-2J | V-=J | V--S | V--5 | V-S | V-5 | V-C | V-J | | |
| 09398 | 嫭 | V+QJ | V+SJ | V+AJ | V+J | V[QJ | V[SJ | V[AJ | V[J | | |
| 09399 | 嫣 | VCKG | VCG | | | | | | | | |
| 09400 | 嫸 | VE83 | VEE3 | V2E3 | VE3 | V283 | V23 | | | | |
| 09401 | 嫚 | VB4X | VBX | | | | | | | | |
| 09402 | 嫜 | VTUJ | VT7J | VTAJ | VU7J | VUAJ | VTJ | VUJ | | | |
| 09403 | 嫫 | VHBK | VHK | VXBK | VXK | | | | | | |
| 09404 | 嫳 | 3AXV | 3TXV | 3XV | | | | | | | |
| 09405 | 嫈 | K4RV | KRV | | | | | | | | |
| 09406 | 嫠 | YXLV | YXV | | | | | | | | |
| 09407 | 嫛 | CKXV | CRXV | CXV | | | | | | | |
| 09408 | 嫭 | VLH4 | VL4 | | | | | | | | |
| 09409 | 嫞 | VLEA | VLA | | | | | | | | |
| 09410 | 嫭 | VLE3 | VLE4 | VL3 | VL4 | | | | | | |
| 09411 | 嫙 | VTDG | VDTG | VTG | VDG | | | | | | |
| 09412 | 嫫 | VHOK | VHOK | VHO2 | VHO2 | VHO8 | VHO8 | VHK | | | |
| 09413 | 嫬 | VCHO | VCXO | | | | | | | | |
| 09414 | 瘳 | YXLZ | YXZ | | | | | | | | |
| 09415 | 寰 | UQOV | UQOV | UQV | | | | | | | |
| 09416 | 屜 | UUU; | UUL; | UUT; | .UK; | UK; | | | | | |
| 09417 | 履 | P'TG | PTGG | PTG | P]GG | P]G | | | | | |
| 09418 | 嶟 | ETK+ | ETB+ | IUT+ | ETK[ | ETB[ | IUT[ | \TK+ | \TB+- | \TK[ | \TB |
| 09419 | 嶀 | E-AS | E-A5 | E-AC | ETAS | ETA5 | ETAC | EM-S | EM-5 | EM2C | EM=( |
| | | EM2J | EM=J | EMS | EM5 | EMC | E-2C | E-=C | E--S | E--5 | E--( |
| | | E-5 | E-C | IUMS | IUM5 | IUMC | IUMJ | \-AS | \-A5 | \-AC | \TA: |
| | | \TA5 | \TAC | \M-S | \M-5 | \M2C | \M=C | \M2J | \M=J | \MS | \M5 |
| | | \MC | \-2C | \-=C | | | | | | | |
| 09420 | 嶓 | EEUE | EHUE | IUEE | IUHE | \EUE | \HUE | | | | |
| 09421 | 嶒 | EHQB | EQB | IUHB | IUQB | \HQB | \QB | | | | |
| 09422 | 嶧 | EE83 | EEE3 | E2E3 | E283 | IHE3 | \E83 | \EE3 | \2E3 | \283 | |

| | | | | | | | | | | | |
|---|---|---|---|---|---|---|---|---|---|---|---|
| 09423 | 嶁 | EQOV | EQOV | EQV | IUQV | \QOV | \QOV | \QV | | | |
| 09424 | 嵷 | E'TG | ETTG | ET2G | 1UTG | IU'G | E]TG | E]G | IU\|G | \'TG | \TT( |
| | | \T2G | \]TG | \]G | | | | | | | |
| 09425 | 摧 | EFTE | EF'E | EFE | 1UFE | \FTE | \F'E | \FE | | | |
| 09426 | 嶉 | EOTE | EO'E | IUOE | \OTE | \O'E | | | | | |
| 09427 | 嶟 | EKAJ | \KAJ | | | | | | | | |
| 09428 | 嵾 | ES83 | E3S3 | IUS3 | \S83 | \3S3 | | | | | |
| 09429 | 嶂 | ETXE | ETLE | ET2E | \TXE | \TLE | \T2E | | | | |
| 09430 | 嶨 | IUEB | EEEB | E2'B | E2'B | \EEB | \2'B | \2'B | | | |
| 09431 | 嶮 | E5OS | E5SS | E5S | 1U5S | \5OS | \5SS | \5S | | | |
| 09432 | 幝 | EJT2 | EJT8 | EJ8 | 1UJ2 | 1UJ8 | \JT2 | \JT8 | \J8 | | |
| 09433 | 幘 | EE42 | EE48 | UIE2 | UJE8 | | | | | | |
| 09434 | 幞 | EHBK | EHK | EXBK | EXK | U1HK | U1XK | | | | |
| 09435 | 幓 | ES83 | E3S3 | U1S3 | | | | | | | |
| 09436 | 廏 | LLHF | LLFF | LL2F | LLF | LLH7 | LL77 | LL27 | LL7 | LLH% | LL% |
| 09437 | 廑 | LHOE | LHOE | | | | | | | | |
| 09438 | 廓 | LEUE | LHUE | | | | | | | | |
| 09439 | 廚 | LFT2 | LFT8 | LF2 | LF8 | L7T2 | L7T8 | L72 | L78 | | |
| 09440 | 廝 | LPHB | LPB | | | | | | | | |
| 09441 | 廦 | LP8S | LPS | | | | | | | | |
| 09442 | 廣 | LQH2 | LQH8 | LQ2 | LQ8 | | | | | | |
| 09443 | 廢 | LEDX | LHDX | | | | | | | | |
| 09444 | 廔 | LQOV | LQOV | LQV | | | | | | | |
| 09445 | 彄 | 5C30 | 5CX | 5CO | | | | | | | |
| 09446 | 彈 | 5QHH | 5QXH | 5QH | | | | | | | |
| 09447 | 影 | -433 | -4Y3 | 4233 | 4=33 | 4-Y3 | 433 | 4Y3 | | | |
| 09448 | 徹 | TEAX | ]EAX | T\AX | ]\AX | | | | | | |
| 09449 | 慹 | KEAG | KAG | | | | | | | | |
| 09450 | 慤 | H-XG | HRXG | HXG | | | | | | | |
| 09451 | 慝 | OZG | OZG | OZLG | OZLG | | | | | | |
| 09452 | 憚 | ITK+ | ITB+ | 1TK[ | ITB[ | | | | | | |
| 09453 | 慱 | I2+J | I+QJ | 1+SJ | I+AJ | 1+J | 12[J | I[QJ | 1[SJ | I[AJ | 1\|J |
| 09454 | 慳 | I2EH | IEXH | IEH | | | | | | | |
| 09455 | 慒 | I2QB | IHQB | IQB | | | | | | | |
| 09456 | 憀 | I2-Y | 1243 | I24Y | I-43 | I-4Y | 1423 | I4=3 | I4-Y | I-Y | 143 |
| | | I4Y | | | | | | | | | |
| 09457 | 慲 | I2HA | IHA | | | | | | | | |
| 09458 | 慬 | I2HE | IHOE | IHOE | | | | | | | |
| 09459 | 慘 | I2E3 | IE83 | IEE3 | IE3 | 1283 | | | | | |
| 09460 | 慴 | I2EB | IEEB | IE'B | IEB | | | | | | |
| 09461 | 慔 | I2HK | IHBK | 12XK | IXBK | IXK | | | | | |
| 09462 | 慺 | I2QV | IQOV | IQOV | 1QV | | | | | | |
| 09463 | 慛 | I2EE | IETE | IE'E | I1UE | I2\E | I\TE | I\'E | I\E | | |
| 09464 | 慥 | IHOZ | | | | | | | | | |
| 09465 | 慭 | Z'NG | ZNG | | | | | | | | |
| 09466 | 慪 | I2CO | I2CX | IC30 | ICO | ICX | | | | | |
| 09467 | 慓 | I2KX | IK4X | IKX | | | | | | | |
| 09468 | 慖 | I2OM | I2OM | IOOM | IOOM | IOMO | IOMO | IOM | IOM | I2OE | |
| 09469 | 戩 | 2SBM | =SBM | 22BM | =2BM | 2BM | =BM | SBM | | | |
| 09470 | 截 | 8-OM | 8.OM | 8EOM | 8OM | | | | | | |
| 09471 | 戧 | +AOM | +AMO | +AM | [AOM | [AMO | [AM | | | | |
| 09472 | 摰 | 'AXF | A-XF | ARXF | AXF | AXEJ | AX3J | | | | |
| 09473 | 摍 | FUTB | FUB | | | | | | | | |
| 09474 | 摛 | FTUA | FTQA | FQUS | FTUS | FTA | FQA | | | | |
| 09475 | 摝 | FLHF | FLF | FLH7 | FL7 | | | | | | |
| 09476 | 摴 | F-AS | F-A5 | F-AC | F-AJ | FTAS | FTA5 | FTAC | FTAJ | FM-S | FM-5 |
| | | FM2C | FM=C | FM2J | FM=J | FMS | FM5 | FMC | FMJ | F--S | F--5 |
| | | F-2C | F-=C | F-2J | F-=J | F-S | F-5 | F-C | | | |
| 09477 | 摶 | F+QJ | F+SJ | F+J | F[QJ | F[SJ | F[J | | | | |
| 09478 | 摲 | FHQT | FQLT | FQT | | | | | | | |
| 09479 | 摳 | FC30 | FCX | | | | | | | | |
| 09480 | 摎 | F-43 | F-4Y | F423 | F4=3 | F4-Y | F43 | F4Y | | | |
| 09481 | 摵 | FTYM | FG3M | FMTY | FMG3 | FTM | FMY | FGM | FM3 | | |
| 09482 | 摦 | FKSS | FK5S | FKCS | | | | | | | |
| 09483 | 摸 | FKHB | FKB | | | | | | | | |
| 09484 | 摻 | FE83 | FEE3 | F2E3 | F283 | F23 | | | | | |
| 09485 | 摽 | FQXO | FQO | | | | | | | | |
| 09486 | 摷 | FQN3 | FQN | FQ3 | | | | | | | |
| 09487 | 摜 | FQ42 | FQ48 | | | | | | | | |
| 09488 | 撖 | FXYX | FXX | | | | | | | | |
| 09489 | 摓 | FXEZ | FXZ | | | | | | | | |
| 09490 | 摠 | F'QG | | | | | | | | | |
| 09491 | 摐 | F'TG | FTTG | F]TG | F]G | | | | | | |

```
09492 揜 F8TB F8B
09493 擀 F8OF F8F FOF
09494 撓 FTKR FTBR
09495 撥 FK4R FKR
09496 撻 FHQZ FQZ
09497 撝 FTBC FTC
09498 擐 F3QY F3Y
09499 數 EKTX EKX IUKX E.TX E.X
09500 斛 EA2+ EA=+ EA+ EA2[ EA=[ EA[
09501 晴 B8SE B2SE B8E B8S2 B2S2 B82 B22
09502 暠 BTOA BTHA BTA
09503 暨 BE-K BEOK BEK BIU. BE.
09504 搨 HSBC HSBJ HSBL
09505 棟 BIY4 BIYQ QIY4 QITQ
09506 盟 EAE CUAE EA'H
09507 樓 YTOK YTHK YTXK
09508 榶 YLEO YLO
09509 槉 YL2K YLTK
09510 槇 YUB6 YU6
09511 樫 Y2EH
09512 穀 HYRX HYX HUYX H'RX HU'X
09513 樒 YHFB YH7B
09514 槾 YHOK YHK
09515 樝 YHS4
09516 樽 Y+AJ Y+J Y[AJ Y[J
09517 榕 YH8O YX8O
09518 槓 YT4X
09519 樞 YCEE YC2E
09520 槅 YP3A
09521 榛 YTUX YT7X YU7X YUTX
09522 構 YQUA YQA
09523 榭 YBHJ YBJ
09524 橙 YE-K YEOK YIU. YE. Y\-K Y\OK Y\.
09525 榴 YAEE YA2E Y'3; YA;
09526 榽 YANK
09527 標 YAHY
09528 樟 YBY- YBY
09529 概 YLTR YLUR YLR
09530 槩 KEAY KAY
09531 樵 Y2E4
09532 槺 YKE4
09533 槪 YLEZ YLZ
09534 楢 YG'4 YG4- YG4
09535 楊 YEC4 YEJ4 YE4 Y7
09536 榛 YIEN YEN3 YEN
09537 榞 YLB3 YL3
09538 楨 Y+4K Y+42 Y+48 Y+2 Y+8 YF4K YF42 YF48 YFK YF2
          YF8 Y74K Y742 Y748 Y7K Y72 Y78 Y[4K Y[42 Y[48
          Y[2 Y[8
09539 槽 Y2SB Y=SB YSB
09540 榥 YPHK YPK
09541 樑 YZN3 YZN YZ3
09542 樲 Y++P YHP YXP YH-4 YH4 Y[[P
09543 槐 YB3R YBR
09544 楕 YHCB YXCB
09545 歊 TAUT TOAT THAT THA-
09546 歃 O4UT O4T O54-
09547 歐 LTR- LTRT LRUT LURT LUR- LRT LR-
09548 殞 -AO2 -AO8 AO42 AO48
09549 殟 -AQ4
09550 殨 -A4K A4K. A4.K A4K
09551 毃 TARX
09552 毂 QORX QOX
09553 毹 BEEL BE3L B2EL BEL B23L
09554 毿 WWU3 2WU3 WU3 HU3 KU3 XU3 WWU4 2WU4 WU4
09555 溼 3UGE 3UE
09556 滓 3U2X 3U=X 3URX
09557 漃 3UTX 3UGX 3UYX
09558 漥 3U2H 3U8H 3URH 3UHH
09559 滸 34OH 3;'H 3;T+ 3:H 3;T[
09560 漷 3TZP 3TP
09561 滻 3TXE 3TLE 3T2E
09562 漂 3LE3 3L3 3LE4
09563 漉 3LHF 3LF 3LH7 3L7
```

09564 澂 33AX
09565 潭 3+QJ 3+SJ 3+J 3[QJ 3[SJ 3[J
09566 滙 3C30 3CX
09567 漧 3+BZ 3HBZ 3[BZ
09568 澱 3LKA 3LA
09569 澤 3E83 3EE3 3E3 3283
09570 漒 35SS 350S
09571 潬 3QHH 3QXH
09572 濮 3QOV 3QOV 3QV
09573 澁 300G 300G 30G
09574 潺 3PHB 3PB
09575 澊 3TUJ 3T7J 3TAJ 3U7J 3UAJ
09576 澔 3TR3 3UR3
09577 湃 3HKH 3XKH 3XKX
09578 滾 343T 34ZL 34Z
09579 澌 3EAA 3E2A 3\AA 3\2A
09580 濰 3ETE 3E'E 3EE 3]UE 3\TE 3\'E 3\E
09581 激 38YX 38X
09582 澥 3TIA 3TXA
09583 潍 3'TG 3TGG 3]GG 3]G
09584 漎 3'TG 3TTG 3]TG 3]G
09585 潏 3'TA 3TXA 3]XA 3]A
09586 濼 33QY 33Y
09587 潚 3LEA 3LA
09588 澈 3EDX 3ETX
09589 澗 3GS4 3G54 3G4
09590 澀 3YYH 32YH 3YIH 3YH
09591 濴 3YYR 32YR 3YR. 3YR
09592 澳 3K4X 3KXX 3KX 3-XT
09593 澢 33UH
09594 潤 300M 300M 30MO 30MO 30M 30E. 30E. 30E
09595 澩 3A4R 3AR
09596 濲 3W23 3W3 3W-Y
09597 滌 3TBC 3TC
09598 熵 WTOA WTHA WTA
09599 燠 WUB6 WU6
09600 燉 WO42 WO48 WU2 WU8
09601 燒 WB3R WBR
09602 熘 WQ4- WQ4
09603 熾 W72Y W7Y WTZY WTLY
09604 熹 HQH4
09605 燎 WLEO WLO
09606 燧 WHS4 WH4
09607 燔 W3CA WCA
09608 燴 W8EO
09609 膾 UU80 UL80 UT80 K8EO
09610 膀 UUTD ULTD UTTD KTUD KT2D
09611 犒 'FUO ZUEO
09612 犓 'FHA ZH'A ZHHA ZHA
09613 犆 'FCC Z2CE ZCC 'FJJ Z2JE ZJJ
09614 獃 E-KK EOKK EKK. EK.K E.K. E..K E.K \-KK \OKK \KK.
\K.K \.K. \..K \.K
09615 獍 ZTKR ZTBR
09616 撕 ZHQT ZQLT ZQT
09617 擻 ZB4X ZBX
09618 瑠 EU40 EU20 EU80
09619 璉 E2EH
09620 瑱 E+4K E+42 E+48 E+K E+2 E+8 EF4K EF42 EF48 EFK
EF2 EF8 E74K E742 E748 E7K E72 E78 E[4K E[42
E[48 E[K E[2 E[8
09621 璲 EX2S EX=S EXOS EXOS EXS
09622 璯 E8EO
09623 瑧 EE8Y E3TY EE8' E3T'
09624 璞 E-4Y E4Y
09625 甎 HH-Z HHCZ
09626 甌 PA-Z PACZ
09627 甓 'YWZ YW-Z YWCZ YWZ 'W-Z 'WCZ 'WZ
09628 疇 QHQH
09629 疐 HUQG HQJG
09630 瘖 L2TB LTKB LTB
09631 瘦 L2EK LEDK LEK
09632 瘸 L2YJ LYOJ LYOJ LYJ
09633 瘢 L2PX LP2X LP=X LPCX LPRX LPX

| | | |
|---|---|---|
| 09634 | [illegible] | L2QA LQUO LQA |
| 09635 | [illegible] | LTCK |
| 09636 | [illegible] | L2HO L2XO LH+O LH[O LX+O LX[O LHO LXO |
| 09637 | [illegible] | UQEX UQX |
| 09638 | [illegible] | 4'4K 44K. 44.K 44K |
| 09639 | [illegible] | 4B-G 4BG |
| 09640 | [illegible] | 4'YW 4YW 4'W |
| 09641 | [illegible] | L4+X L4X L4[X |
| 09642 | [illegible] | 48AJ |
| 09643 | [illegible] | SJX4 JX4 |
| 09644 | [illegible] | OKX4 CKX4 OX4 KTX4 KX4 |
| 09645 | [illegible] | '4HH 4H2H |
| 09646 | [illegible] | 4L+4 4L[4 4L4 |
| 09647 | [illegible] | +T2E +TUE [T2E [TUE |
| 09648 | 磁 | +H2L +H8L +HRL [H2L [H8L [HRL |
| 09649 | [illegible] | TOYB +YB- +YB [YB- [YB |
| 09650 | 碼 | TOBC +B-C +BC [B-C [BC |
| 09651 | [illegible] | +Q-K +QK [Q-K [QK |
| 09652 | [illegible] | +HHH +HXH [HHH [HXH |
| 09653 | [illegible] | +ERX [ERX |
| 09654 | [illegible] | 3OTO OOO+ 3O+ OOO[ 3O[ |
| 09655 | [illegible] | TOPA +'PA +.PA +PA ['PA [.PA [PA |
| 09656 | 砰 | TOTJ +TOJ +TUJ +TJ [TOJ [TUJ [TJ |
| 09657 | [illegible] | TOPX +P2X +P=X +PCX +PRX +PX [P2X [P=X [PCX [PRX [PX |
| 09658 | [illegible] | TOQA +QUO +QA [QUO [QA |
| 09659 | [illegible] | TOHK +HUK +HK TOXK +XUK +XK [HUK [HK [XUK [XK |
| 09660 | [illegible] | -YTE 23TE =3TE KT2E KTUE KTE |
| 09661 | [illegible] | -YEK 23EK =3EK KEDK |
| 09662 | [illegible] | -Y4H 234H =34H K-4H K4H |
| 09663 | [illegible] | -YHY 23HY =3HY KH2Y KH=Y KH-Y KHY |
| 09664 | [illegible] | -YHH 23HH =3HH KHOH |
| 09665 | [illegible] | -YBG 23BG =3BG KB-G KBG |
| 09666 | [illegible] | -YBC 23BC =3BC KB-C |
| 09667 | [illegible] | -YQG 23QG =3QG KQG |
| 09668 | [illegible] | -YUQ 23UQ =3UQ KUHQ KUQ |
| 09669 | [illegible] | -YOZ 23OZ =3OZ KLLZ KOZL KOZ |
| 09670 | [illegible] | -YAX 23AX =3AX KAHX KAX |
| 09671 | [illegible] | 'Y-Q 'YOQ '-OQ '-Q 'OQ |
| 09672 | [illegible] | 'YBR 'BSR 'BFR 'B7R |
| 09673 | [illegible] | 'YGA 'LGA 'JGA 'GA |
| 09674 | [illegible] | 'YUX YU2X YU8X YURX YUX YXUX YUXX 'U2X 'U8X 'URX 'XUX 'UXX |
| 09675 | [illegible] | 'YPA Y'PA Y.PA ''PA '.PA |
| 09676 | [illegible] | 'YHH 'HOH 'HH |
| 09677 | [illegible] | U2TB U8TB URTB UTKB |
| 09678 | [illegible] | U2EK U8EK UREK UEDK UEK |
| 09679 | [illegible] | U28J U88J URAJ U8AJ U8J |
| 09680 | [illegible] | TKPH |
| 09681 | [illegible] | FF3O /3SO /3O |
| 09682 | [illegible] | FFUH /U2H /U8H /URH /UH |
| 09683 | [illegible] | FFT2 FFD2 FFT= FFD= /TD2 /TD= /D82 /D8= /T2 /T= /D2 /D= |
| 09684 | [illegible] | FF+G /-EG /+EG /-G /+G /EG FF[G /[EG /[G |
| 09685 | [illegible] | FFEA /IEA /EA |
| 09686 | [illegible] | FFYY /YY /2Y |
| 09687 | [illegible] | FFFC /FCE /FC |
| 09688 | [illegible] | /SHJ |
| 09689 | [illegible] | FFZS /ZAS /ZS |
| 09690 | [illegible] | /TUR /T7R /U7R |
| 09691 | [illegible] | FFQK FFQH /QK /QH |
| 09692 | [illegible] | FFOY FFOY /O'Y /O'Y /OY /OY FFO' FFO' /O' /O' |
| 09693 | [illegible] | /8OJ /8J |
| 09694 | [illegible] | FFAX /APX /AX |
| 09695 | [illegible] | FFT+ /TT+ /T4+ /T+ FFT[ /TT[ /T4[ /T[ |
| 09696 | [illegible] | FFYT /YTT /Y2T /YT |
| 09697 | [illegible] | 2YEK =YEK |
| 09698 | [illegible] | 2YQY =YQY |
| 09699 | [illegible] | 2YH2 YAH2 =YH2 |
| 09700 | [illegible] | 2YQ4 2YQ+ =YQ4 =YQ+ 2YQ[ =YQ[ |
| 09701 | [illegible] | NTOZ |
| 09702 | [illegible] | N3T+ NTT+ NT4+ NT+ N3T[ NTT[ NT4[ NT[ |
| 09703 | [illegible] | N3WW N32W NWW N2W |

| | | |
|---|---|---|
| 09704 | [illegible] | N32L N2HL N2L |
| 09705 | 綪 | N3EA NIEA NEA |
| 09706 | 維 | N3-G N3+G N3EG N-EG N+EG N-G N+G NEG N3[G N[EG N[G |
| 09707 | 緌 | N3+V N+EV N+V N3[V N[EV N[V |
| 09708 | 緅 | N3PX NPX N-4X |
| 09709 | 綝 | N3YY N32Y NYY N2Y |
| 09710 | 絨 | N3OM NOM NO-M NMO- NMO |
| 09711 | 緹 | N3BF NBFF NB2F NBF N3B7 NB77 NB27 NB7 N3B% NB% |
| 09712 | 緺 | N3BC NBC2 NBC |
| 09713 | 緋 | N3EE N32E NEE N2E |
| 09714 | 綬 | N3YV N'YV NYV N3'V N'V |
| 09715 | 綯 | N3CE NCHE NCE N3JE NJHE NJE |
| 09716 | 綹 | N3AO NATO NAO |
| 09717 | 綖 | N3GZ N'GZ NGZ |
| 09718 | [illegible] | N3Q4 N3Q+ N'Q4 N'Q+ NQ4 NQ+ N3Q[ N'Q[ NQ[ |
| 09719 | 緱 | N3PK N'PK N.PK NPK. NP.K NPK |
| 09720 | 素 | H8N3 H8N H28N H=8N |
| 09721 | 紫 | PXN3 'PXN .PXN PX3 PXN |
| 09722 | 絖 | NUAL |
| 09723 | 綠 | N3T3 NTO3 NT3 |
| 09724 | 網 | N3TA NTUT NTA |
| 09725 | [illegible] | 4QG |
| 09726 | [illegible] | UOEE UO2E UHO2 UO2 |
| 09727 | 翠 | EETV ETKV 2TKV =TKV 2TV =TV |
| 09728 | [illegible] | HBEE HB2E H'B2 |
| 09729 | 翞 | EET3 2ET3 =ET3 2TO3 =TO3 ETO3 2T3 =T3 |
| 09730 | [illegible] | 2YHB =YHB |
| 09731 | [illegible] | PO-M PMO- POM PMO -4OM -4MO |
| 09732 | [illegible] | -4UH 4U2H 4U8H 4URH PU2H PU8H PURH |
| 09733 | [illegible] | A224 A884 A284 A2K4 AK24 AK84 A34- A44- A34 A44 |
| 09734 | [illegible] | AEN3 AIEN AEN |
| 09735 | [illegible] | AQ4- AQ4 |
| 09736 | [illegible] | A'BZ ABZ |
| 09737 | [illegible] | A'QF AQFF AQ2F AQF A'Q7 AQ77 AQ27 AQ7 A'Q5 AQ% |
| 09738 | [illegible] | A4TA |
| 09739 | [illegible] | WWUA 2WUA =WUA WUA |
| 09740 | [illegible] | HOWW HO2W HOW |
| 09741 | [illegible] | H3.K H3BK H3K X3.K X3BK X3K |
| 09742 | [illegible] | H38Y X38Y H38' X38' |
| 09743 | [illegible] | HT2D HTUD XT2D XTUD |
| 09744 | [illegible] | HTKC HTCO XTKC XTCO |
| 09745 | [illegible] | HL2K HLTK XL2K XLTK |
| 09746 | [illegible] | HLEO XLEO |
| 09747 | [illegible] | ++U6 HUB6 HU6 XUB6 XU6 [[U6 |
| 09748 | [illegible] | HUUR XUUR HUDR XUDR |
| 09749 | [illegible] | ++UE HUTE HU'E XUTE XU'E XUE [[UE |
| 09750 | [illegible] | H2EH X2EH |
| 09751 | [illegible] | ++K4 HKE4 HK4 XKE4 XK4 [[K4 |
| 09752 | [illegible] | HKEA XKEA |
| 09753 | [illegible] | ++EY HE8Y H3TY HE8' H3T' XE8Y X3TY XE8' X3T' XEY [[EY |
| 09754 | [illegible] | HHFB HH7B XHFB XH7B |
| 09755 | [illegible] | H+AJ X+AJ H[AJ X[AJ |
| 09756 | [illegible] | ++OA H-OA X-OA [[OA |
| 09757 | [illegible] | ++FA HF+A HFA XF+A XFA [[FA HF[A XF[A |
| 09758 | [illegible] | ++LJ HLKJ HLJ XLKJ XLJ [[LJ |
| 09759 | [illegible] | HLB3 HL3 XLB3 XL3 |
| 09760 | [illegible] | HTOM XTOM |
| 09761 | [illegible] | ++55 ++25 H525 H252 H55 X525 X252 X55 [[55 [[25 |
| 09762 | [illegible] | HP8Y HPY XP8Y XPY |
| 09763 | [illegible] | HBHJ XBHJ |
| 09764 | [illegible] | HQUA XQUA |
| 09765 | [illegible] | HTHX XTHX |
| 09766 | [illegible] | HHEK XHEK |
| 09767 | [illegible] | H'Y4 HYA- HY4- X'Y4 XYA- XY4- ++'4 H'A- H'4- X'A- X'4- [['4 |
| 09768 | [illegible] | HAAJ H2AJ XAAJ X2AJ |
| 09769 | [illegible] | HTEA XTEA |
| 09770 | [illegible] | ++QF HQFF HQ2F HQF ++Q7 HQ77 HQ27 HQ7 XQFF XQ2F XQF XQ77 XQ27 XQ7 [[QF [[Q7 ++Q% [[Q% HQ% XQ% |
| 09771 | [illegible] | HVOF HVF XVOF XVF |
| 09772 | [illegible] | HN3D HN8D HN2D HND XN3D XN8D XN2D XND |

09773 髗 ++SS HASA HASS H2AS HSS XASA XASS X2AS XSS [[S:
09774 虩 ++4G H'4G H4G X'4G X4G [[4G
09775 謎 ++TG [[TG ++]G [[]G HTHG H'TG H]HG H]G X'TG XTHG
X]HG X]G
09776 蕆 ++24 [[24 H2E4 X2E4 H24 X24
09777 靬 ++QH HHQH HQHI HQ-+ HQ2I HQ=I XHQH XQHI XQ-+ XQ2I
XQ=I XQH [[QH HQ-[ XQ-[
09778 鞍 HYUX HYTX HYX XYUX XYTX XYX
09779 鞁 H'AX HA-X HARX X'AX XA-X XARX
09780 鞍 HEOX XEOX
09781 齒 TU4K TU42 TU48 TU7K TU72 TU78 T74K T742 T748 TU8
09782 蜉 STOZ
09783 蜕 S2ER
09784 蜷 OS-G OS+G S+EG S-EG S+G S-G OS-G OS+G OS[G S[EG
S[G OS[G
09785 蝫 OSHB SH'B SHB OSHB
09786 蝀 OSYQ OSYB SYQ SYB OSYQ OSYB
09787 蜮 OSOM OSMO SO-M SMO- SOM SMO OSOM OSMO
09788 蜞 OSH2 OSH8 SH22 SH-2 SH28 SH=8 SH2 SH8 OSH2 OSH8
09789 蜡 OSHB SHHB SHB OSHB
09790 蜥 OSTS SY8S SY2S SYS OSTS
09791 蜩 OSPO SP+O SPO OSPO SP[O
09792 蜷 OS4X S4X OS4X
09793 蝕 OS-U OSTU OSLU OSJU ST3U S-3U SL3U SJ3U S3U ST4U
S-4U SL4U SJ4U S4U STU S-U OS-U OSTU
09794 蝆 2UUS =UUS 2UOS =UOS 2US =US 2UOS =UOS
09795 蝶 OSQY SQY OSQY
09796 蝆 S++H SH2I SH=I SH2O SX2O SX++ SX2I SX=I S[[H SX[[
09797 蝴 OSOY OSOY SO'Y SO'Y SOY OSOY OSOY OSO' OSO' OSO'
OSO' SO' SO'
09798 蝬 OSYV S'YV SYV OSYV OS'V OS'V S'V
09799 蝙 OSCE SCHE SCE OSCE
09800 蝠 OSUE OSDE OSU; OSD; SUEE SDEE SUE SDE SU; SD;
OSUE OSDE OSU; OSD;
09801 蝗 OSTE OS'E STTE STHH STE S'E OSTE OS'E
09802 蜒 OSGZ S'GZ SGZ OSGZ
09803 蜺 OSER OS;R SEER S;R OSER OS;R
09804 蟀 OSQ4 OSQ+ S'Q4 S'Q+ SQ4 SQ+ OSQ4 OSQ+ OSQ[ S'Q[
SQ[ OSQ[
09805- 蝸 OSKK SK-K SKK OSKK
09806 蝂 OSKX SKLX SKX OSKX
09807 蝓 OS8A S8-A S8A OS8A
09808 蝦 OSPK S'PK S.PK SPK. SP.K SPK OSPK
09809 監 EXOS CUXS EXS EXOS
09810 哲 YLTS YTOS YTS YTOS
09811 豁 EEOS 2EOS =EOS EES 2ES =ES EEOS 2EOS =EOS
09812 豁 ABLS ALOS ALS ALOS
09813 豃 'GZS GZOS GZS GZOS
09814 裕 K2HL K2L
09815 裌 KWW K2W
09816 裬 KE'K KEK
09817 補 KTA KTUT
09818 裺 KKQL
09819 裾 KP+O KPO KP[O
09820 褔 KBB
09821 褐 KBC2 KBC
09822 裶 KEE K2E
09823 裂 TYXK G3XK TXTK GXTK YXTK
09824 襪 K4-X K4X
09825 裬 KH2X KH8X KHRX KHX
09826 裫 KK-K KKK
09827- 覘 HW4R HWR
09828 覡 HT4R
09829 覩 HG4R HGR
09830 覝 4R4R 24R =4R
09831 觫 UA+3 UA+4 UA-3 UA-4 UA3 UA4 UA[3 UA[4
09832 觶 UAYO UAYO
09833 觮 UAH3 UAH4
09834 諓 ;L2K ;L=K
09835 誙 4O3H ;-3H ;3H
09836 誋 4OLG 4OCG ;CLG ;CG ;LG
09837 誒 4OSK ;STK ;SK
09838 諆 4OBK ;-BK ;.BK ;BK

| | | | | | | | | | | | |
|---|---|---|---|---|---|---|---|---|---|---|---|
| 09839 | 諄 | :+UZ | ;[UZ | | | | | | | | |
| 09840 | 谿 | 4080 | | | | | | | | | |
| 09841 | 豨 | ZX+E | ZXE | ZLXE | ZX[E | | | | | | |
| 09842 | 豧 | ZLZL | 2ZL | =ZL | 2Z | =Z | | | | | |
| 09843 | 賕 | 42-3 | 42-4 | 42+3 | 42+4 | 424 | 48-3 | 48-4 | 48+3 | 48+4 | 42[ |
| | | 42[4 | 48[3 | 48[4 | | | | | | | |
| 09844 | 䝭 | OGG3 | GG3' | GG3 | | | | | | | |
| 09845 | 䝴 | 4200 | 4800 | 400 | | | | | | | |
| 09846 | 趌 | HGTH | GTTH | GTH | | | | | | | |
| 09847 | 踉 | 4242 | 242 | =42 | 4848 | 248 | =48 | | | | |
| 09848 | 踧 | OGPL | OG4L | G-4L | G4L | GPL | | | | | |
| 09849 | 跿 | OGHG | GHG | | | | | | | | |
| 09850 | 跱 | OGHZ | GH'Z | GHZ | | | | | | | |
| 09851 | 跍 | OGCG | OGLG | GCLG | GCG | GLG | | | | | |
| 09852 | 踊 | OGSA | GSUH | GSA | | | | | | | |
| 09853 | 踃 | OG3A | G3A | | | | | | | | |
| 09854 | 踄 | OGTQ | GTQ- | GTQ | | | | | | | |
| 09855 | 踆 | GS2X | GS8X | GSRX | | | | | | | |
| 09856 | 跫 | FTOG | FLTG | | | | | | | | |
| 09857 | 蹇 | TXOG | | | | | | | | | |
| 09858 | 踪 | OGOG | GOG | | | | | | | | |
| 09859 | 𨀁 | OG.K | G.BK | G.K | | | | | | | |
| 09860 | 輐 | HQUR | QU2R | QU=R | QUR | | | | | | |
| 09861 | 軺 | HQEO | QE'O | QEO | | | | | | | |
| 09862 | 輎 | HQ3A | Q3A | | | | | | | | |
| 09863 | 軳 | HQ40 | Q220 | Q880 | Q280 | Q40 | | | | | |
| 09864 | 郝 | TK+P | TB+P | T+P | TK[P | TB[P | T[P | | | | |
| 09865 | 鄜 | LHFP | LFP | LH7P | L7P | | | | | | |
| 09866 | 鄸 | -ASP | -A5P | -ACP | -AJP | TASP | TA5P | TACP | TAJP | M-SP | M-5 |
| | | M2CP | M=CP | M2JP | M=JP | MSP | M5P | MCP | MJP | --SP | --5 |
| | | --CP | --JP | -SP | -5P | -CP | -JP | | | | |
| 09867 | 鄢 | GS4P | G54P | G4P | | | | | | | |
| 09868 | 郼 | +QJP | +SJP | +AJP | +JP | [QJP | [SJP | [AJP | [JP | | |
| 09869 | 郢 | E83P | EE3P | 283P | =83P | | | | | | |
| 09870 | 鄭 | HBKP | HKP | XBKP | XBP | | | | | | |
| 09871 | 郹 | B4XP | BXP | | | | | | | | |
| 09872 | 鄔 | BSYP | B5YP | BYP | | | | | | | |
| 09873 | 鄰 | 3QYP | 3YP | | | | | | | | |
| 09874 | 酺 | -Q+A | 9+A. | 9+A | -Q[A | 9[A. | 9[A | | | | |
| 09875 | 醒 | -QOE | 9O'H | 9OE | | | | | | | |
| 09876 | 酵 | -QAJ | 9'3J | 9AJ | | | | | | | |
| 09877 | 醋 | -QNA | 9NA | | | | | | | | |
| 09878 | 鈙 | 8KTK | $T'K | $TK | 6T'K | 6TK | | | | | |
| 09879 | 銖 | 8K2Y | $2Y | 62Y | | | | | | | |
| 09880 | 鉶 | $HHJ | $22J | 6HHJ | 622J | | | | | | |
| 09881 | 銛 | 8KHO | $'+O | $HO | 6'+O | 6HO | $'[O | 6'[O | | | |
| 09882 | 鉺 | 8K-4 | $-4 | 8KP | $P | 6-4 | 6P | | | | |
| 09883 | 銠 | 8KHF | $H'F | $HF | 8KH7 | $H'7 | $H7 | 6H'F | 6HF | 6H'7 | 6H7 |
| 09884 | 鉼 | 8K3+ | $-3+ | $3+ | 6-3+ | 63+ | 8K3[ | $-3[ | $3[ | 6-3[ | 63[ |
| 09885 | 銪 | 8K+A | $+A | 6+A | 8K[A | $[A | 6[A | | | | |
| 09886 | 銍 | 8KSH | $-SH | $SH | 6-SH | 6SH | | | | | |
| 09887 | 銦 | 8KOK | $OK | 6OK | | | | | | | |
| 09888 | 銚 | 8KKK | 8K2K | $KKL | $KK | $2K | 6KKL | 6KK | 62K | | |
| 09889 | 銫 | 8KUL | $UBL | $UL | 6UBL | 6UL | | | | | |
| 09890 | 鉹 | 8KAA | 8K2A | $AA | $2A | $2C. | $2U. | 6AA | 62A | 62C. | 62U |
| 09891 | 銗 | 8KLO | $L-O | $LO | 6L-O | 6LO | | | | | |
| 09892 | 鉿 | 8K8O | $8-O | $8O | 68-O | 68O | | | | | |
| 09893 | 銣 | 8KVO | $VO | 6VO | | | | | | | |
| 09894 | 鋮 | 8KDM | 8KMD | $DM | $MD | 6DM | 6MD | | | | |
| 09895 | 銴 | HR8K | HRK | HR.$ | HR$ | HR.6 | HR6 | | | | |
| 09896 | 銂 | 8K3O | 8K3T | $TTT | $3O | $3T | 6TTT | 63O | 63T | | |
| 09897 | 鉠 | 8KK5 | $-5T | $K5 | 6-5T | 6K5 | | | | | |
| 09898 | 鉥 | 8KL3 | 8KL4 | 8KJ3 | 8KJ4 | $L3 | $L4 | $J3 | $J4 | 6L3 | 6L4 |
| | | 6J3 | 6J4 | | | | | | | | |
| 09899 | 鉽 | 8KHM | 8KMH | $HM | $MH | 6HM | 6MH | | | | |
| 09900 | 銈 | 8KHH | 8K2H | $HH | $2H | 6HH | 62H | | | | |
| 09901 | 鋯 | 8KHO | $IHO | $+-O | $HO | 6IHO | 6+-O | 6HO | $[-O | 6[-O | |
| 09902 | 釴 | 8K.M | $.M | 6.M | 8KM. | $M. | 6M. | | | | |
| 09903 | 銆 | 8KTB | $TB | 6TB | | | | | | | |
| 09904 | 鋢 | 8K+Z | $+IZ | $+Z | 6+IZ | 6+Z | 8K[Z | $[IZ | $[Z | 6[IZ | 6[Z |
| 09905 | 鉤 | 8KKS | 8KK5 | 8KKC | $K-S | $K-5 | $K2C | $K=C | $K2J | $K=J | $KS |
| | | $K5 | $KC | 6K-S | 6K-5 | 6K2C | 6K=C | 6K2J | 6K=J | 6KS | 6K5 |
| | | 6KC | | | | | | | | | |

| | | | | | | | | | | | |
|---|---|---|---|---|---|---|---|---|---|---|---|
| 09906 | 鈋 | 8K3R | $3-R | $3R | 63-R | 63R | | | | | |
| 09907 | 鉾 | 8KSH | $S'H | $SH | 6S'H | 6SH | | | | | |
| 09908 | 鋉 | 8K=Y | $=Y | 6=Y | | | | | | | |
| 09909 | 銩 | 8KES | $'HS | $ES | 6'HS | 6ES | | | | | |
| 09910 | 銤 | 8KTY | $TY | 6TY | | | | | | | |
| 09911 | 銋 | 8KTE | $TE | $T'H | 6TE | 6T'H | | | | | |
| 09912 | 蜌 | GF8K | GFK | GF$ | G78K | G7K | G7$ | GF6 | G76 | | |
| 09913 | 陂 | PEDX | | | | | | | | | |
| 09914 | 隨 | PTXE | PTLE | PT2E | | | | | | | |
| 09915 | 窕 | -AKK | -A2K | TAKK | TA2K | MKKL | MKK | M2K | -KKL | -KK | -2K |
| 09916 | 艳 | EAUL | EAL | | | | | | | | |
| 09917 | 絆 | H+2H | H[2H | | | | | | | | |
| 09918 | 絑 | H+Y+ | H+Y- | H+-Y | H++Y | H+Y | H\|Y[ | H[Y- | H[-Y | H[[Y | H\|Y |
| 09919 | 紬 | H+HL | H[HL | | | | | | | | |
| 09920 | 紭 | H+5S | H[5S | | | | | | | | |
| 09921 | 紹 | H+UO | H+DO | H[UO | H[DO | | | | | | |
| 09922 | 絿 | H+'Y | H+Y | HO+' | HO+' | H+' | H['Y | H[Y | HO[' | HO[' | H\| |
| 09923 | 組 | H+A- | H+4- | H[A- | H[4- | | | | | | |
| 09924 | 絁 | H+CL | H+UL | H[CL | H[UL | | | | | | |
| 09925 | 紴 | H+EX | H[EX | | | | | | | | |
| 09926 | 絇 | H+NC | H[NC | | | | | | | | |
| 09927 | 綝 | HHY+ | HHY- | HH+Y | HH-Y | HHY[ | HH[Y | | | | |
| 09928 | 紱 | HH+X | HH[X | | | | | | | | |
| 09929 | 頖 | 2ET2 | 2ET8 | =ET2 | =ET8 | | | | | | |
| 09930 | 點 | RSTO | RTO | | | | | | | | |
| 09931 | 鶻 | RSCL | RSUL | RSL | RUOL | RUPL | RUCL | RCOL | RCPL | RCCL | RCL |
| | | RSJL | RJOL | RJPL | RJL | | | | | | |
| 09932 | 餂 | 8SHO | 8FHO | 87HO | 8'+O | 8--+O | 8H1O | 82IO | 8=JO | 8HO | 8'\|O |
| | | 8-[O | | | | | | | | | |
| 09933 | 餃 | 8SHX | 8FHX | 87HX | 8++X | 8HX | 8XX | 8[[X | | | |
| 09934 | 餇 | 8SUO | 8FUO | 87UO | 8U-O | 8UO | | | | | |
| 09935 | 鼧 | 'YBG | YBG' | YBG | 'BG' | 'BG | | | | | |
| 09936 | 鼫 | 'YBF | YBPF | 'YB7 | YBP7 | 'BPF | 'BP7 | | | | |
| 09937 | 駃 | E4LK | 7LK | E4JK | 7JK | | | | | | |
| 09938 | 駔 | EJ4B | EC4B | E4B | 7B | | | | | | |
| 09939 | 馻 | E4SR | 7SR | | | | | | | | |
| 09940 | 駁 | E4ST | E4S | 7'S. | 7ST | 7SX | | | | | |
| 09941 | 犑 | F+E4 | F+4 | 7+E4 | 7+4 | F+7 | 7+7 | F[E4 | F\|4 | 7[E4 | 7\|4 |
| | | F[' | 7[7 | | | | | | | | |
| 09942 | 羈 | E4OI | EJ4O | EC4O | 7O1 | 7OI | 7O | | | | |
| 09943 | 敀 | E4TX | 7TX | | | | | | | | |
| 09944 | 齡 | WA82 | WA2 | | | | | | | | |
| 09945 | 髴 | ES3D | E3TD | E3D | DTD | DD | | | | | |
| 09946 | 髭 | ES3R | E3UR | E3ER | D.UR | DUR | DER | | | | |
| 09947 | 魁 | QR+X | R+X | QR[X | R[X | | | | | | |
| 09948 | 魠 | QRLT | QRT | | | | | | | | |
| 09949 | 魹 | U4HL | U42L | U4=L | JHL | J2L | J=L | | | | |
| 09950 | 魡 | U4C. | U4C | U4J. | J'C. | J'J. | J'C | J'J | | | |
| 09951 | 魟 | UQ4H | U4H | JH | | | | | | | |
| 09952 | 穚 | HIB4 | -+B4 | 2IB4 | =IB4 | HI5 | -+5 | 2I5 | =I5 | -[B4 | - |
| 09953 | 戶 | PBS4 | PB54 | PB4 | P5 | | | | | | |
| 09954 | 禡 | XZB4 | ZXB4 | +ZB4 | Z+B4 | R.B4 | XZ4 | ZX4 | +Z4 | XZ5 | Z> |
| | | +Z5 | Z+5 | R.5 | XLB4 | LXB4 | +LB4 | L+B4 | LX4 | +L4 | XI |
| | | LX5 | +L5 | L+5 | [ZB4 | Z[B4 | [Z4 | [Z5 | Z\|5 | [LB4 | L |
| | | [L4 | [L5 | L[5 | | | | | | | |
| 09955 | 螯 | KATZ | | | | | | | | | |
| 09956 | 僂 | TUEH | | | | | | | | | |
| 09957 | 僵 | TTQB | TTQ4 | | | | | | | | |
| 09958 | 傜 | THA4 | THT4 | TXA4 | TXT4 | | | | | | |
| 09959 | 傑 | TYY3 | TY23 | TY=3 | T2Y3 | T223 | T2=3 | TY3 | TYYY | T2YY | TY |
| | | T2-Y | TYY | | | | | | | | |
| 09960 | 儆 | THCX | THJX | THX | TXCX | TXJX | TXX | | | | |
| 09961 | 僳 | T4-K | T4OK | | | | | | | | |
| 09962 | 僱 | T4LB | T4BL | T4LE | T4EL | TOLB | TOBL | TOLE | TOEL | TQLB | TL |
| | | TQLE | TQEL | | | | | | | | |
| 09963 | 儇 | TAUX | TAGX | | | | | | | | |
| 09964 | 儈 | TULO | TUL; | TU; | | | | | | | |
| 09965 | 傲 | TBDX | | | | | | | | | |
| 09966 | 憋 | TYWG | T'WG | | | | | | | | |
| 09967 | 僅 | TYYG | T2YG | TYLG | TYJG | T2LG | T2JG | | | | |
| 09968 | 剩 | 3OYJ | OYJ | | | | | | | | |
| 09969 | 齣 | G3MJ | GM3J | GMJ | | | | | | | |
| 09970 | 勈 | HQAC | HAC' | HAJ' | HAC | XQAC | XAC' | XAJ' | XAC | | |

| | | |
|---|---|---|
| 09971 | 勣 | TQBC TQ-C TBC |
| 09972 | 啾 | OT3K |
| 09973 | 嘷 | O29J OKQJ |
| 09974 | 噌 | O24B O2QB |
| 09975 | 嘵 | O3HR OH-R OHR |
| 09976 | 嘿 | O2UG O=UG |
| 09977 | 嘀 | OSJA |
| 09978 | 噉 | OTPX OHPX OPX OT4X OH4X |
| 09979 | 嘶 | OKKB O2KB ORRB O2RB OCRB |
| 09980 | 噘 | OLKT OLK- |
| 09981 | 噚 | OEHJ OEOJ OEJ |
| 09982 | 噗 | OLL2 OLL8 OLH2 OLH8 O2H2 O2H8 OL2 OL8 OKH2 OH |
| 09983 | 嘖 | OO-2 OO-8 OO42 OO48 |
| 09984 | 嘩 | OOQ+ OOO+ O2O+ O2Q+ OOQ[ OOO[ O2O[ O2Q[ O@ |
| 09985 | 噭 | OBPX OB4X OBX |
| 09986 | 嚜 | O4B+ O-4+ O4+ O4B[ O-4[ O4[ |
| 09987 | 嘸 | OE-4 OTE4 O'E4 OE4 |
| 09988 | 噼 | O442 O448 |
| 09989 | 嘺 | O'KA O-KA OKOA OKA |
| 09990 | 圖 | OO-2 OO42 OO-8 OO48 OO2 OO8 |
| 09991 | 塼 | H29J HKQJ IHKJ |
| 09992 | 墝 | H3HR IHHR |
| 09993 | 墱 | HW-K HWOK HWK HW. IHWK IHW. |
| 09994 | 墿 | HOQ+ HOO+ H2O+ H2Q+ HOQ[ HOO[ H2O[ H2Q[ IHO+ IH |
| | | IH2+ IH2[ IH@ H@ |
| 09995 | 墣 | H42K H4KK H422 H428 H4K2 H4K8 |
| 09996 | 壇 | I2AH I+AH TAH I[AH |
| 09997 | 墬 | POZH PZH |
| 09998 | 墦 | HTKH HTQH IHTH |
| 09999 | 墡 | H2EO H2KO H2HO IH2O |
| 10000 | 墫 | C7O2 |
| 10001 | 嫿 | VEH- VEHQ VE- VEQ V-UE VTQE |
| 10002 | 嫽 | V+OH V+TH V+H V[OH V[TH V[H |
| 10003 | 嫁 | VK23 VKB3 |
| 10004 | 嬏 | VP+A VP[A |
| 10005 | 嫵 | VTE4 V'E4 VE4 |
| 10006 | 嬰 | 3T2V 3T8V 38V |
| 10007 | 嬉 | V2EO V2HO V2KO V2O |
| 10008 | 嫩 | VTBM VTMB VTM |
| 10009 | 嬇 | VHQ2 VHQ8 VXQ2 VXQ8 VX2 VX8 |
| 10010 | 嬁 | VW-K VWOK VWK VW. |
| 10011 | 嫧 | VO-2 VO-8 VO42 VO48 VO2 VO8 |
| 10012 | 嬋 | VH-H VH-X |
| 10013 | 嬗 | VAYQ VAQ VYQ |
| 10014 | 幟 | P'TY PTHY P]HT P]Y |
| 10015 | 嶫 | E2YH EYAH IUYH \2YH \YAH |
| 10016 | 嶗 | EWWC E2WC EWUC E2UC EWC IUWC EHUC EKUC EXUC \W |
| | | \2WC \WUC \2UC \WC \HUC \KUC \XUC |
| 10017 | 嶂 | E29J EKQJ \29J \KQJ |
| 10018 | 嶒 | E24B E2QB \24B \2QB |
| 10019 | 嶢 | E3HR EHR IUHR \3HR \HR |
| 10020 | 嶓 | EAYQ EAQ IUAQ \AYQ \AQ |
| 10021 | 嶕 | ETE4 E'E4 IUE4 \TE4 \'E4 |
| 10022 | 嶠 | E'KA EKOA EKA IUKA \'KA \KOA \KA |
| 10023 | 嶨 | EKKB E2KB ERRB E2RB ERB IURB \KKB \2KB \RRB \2 |
| | | \RB |
| 10024 | 嶡 | ELKT ELK- EL- IUL- \LKT \LK- \L- |
| 10025 | 嶚 | EK23 EKB3 EK3 IUK3 \K23 \KB3 \K3 |
| 10026 | 嶜 | P+AE PAE PAIU P[AE P+A\ PA\ P[A\ |
| 10027 | 幘 | E+H2 E+H8 E+2 E+8 UI+2 UI+8 E+X2 E+X8 E[H2 E[ |
| | | E[2 E[8 UI[2 UI[8 E[X2 E[X8 |
| 10028 | 幝 | EOO+ E2O+ EOQ+ E2Q+ EO+ UIO+ EOO[ E2O[ EOQ[ E2 |
| | | EO[ UIO[ UI2+ UI2[ UI@ E@ |
| 10029 | 幠 | ETE4 E'E4 UIE4 |
| 10030 | 幨 | UIB3 EB+3 EB[3 EBO3 EB3 |
| 10031 | 廄 | LEDN LED3 LEN |
| 10032 | 廛 | LQHH LQ2H LQ8H LQKH LQO |
| 10033 | 廞 | L8KT L8K- L8T L8- L8UT L8- LOUT L0- |
| 10034 | 廡 | LE-4 LTE4 L'E4 |
| 10035 | 彈 | 5HQ2 5HQ8 |
| 10036 | 徸 | 'TPH TP3H TP4H IP3H IP4H IPH |
| 10037 | 憋 | 3AXG |

| | | | | | | | | | | | |
|---|---|---|---|---|---|---|---|---|---|---|---|
| 10038 | 憼 | E8EG | 3TEG | E8;G | 3T;G | E8G | 3TG | | | | |
| 10039 | 愁 | HH9G | H9G | | | | | | | | |
| 10040 | 憱 | IT3K | | | | | | | | | |
| 10041 | 憰 | ISJA | | | | | | | | | |
| 10042 | 憢 | I2HR | I3HR | IHR | | | | | | | |
| 10043 | 憉 | I2H3 | IHK3 | | | | | | | | |
| 10044 | 憆 | I24+ | I-4+ | I4B+ | I4+ | I24[ | I-4[ | I4B[ | I4[ | | |
| 10045 | 憐 | I+QG | I+SG | I+AG | I+G | I[QG | I[SG | I[AG | I[G | | |
| 10046 | 憯 | I2KB | I2RB | IKKB | IRRB | ICRB | IRB | | | | |
| 10047 | 憬 | I2K3 | IK23 | IKB3 | IK3 | | | | | | |
| 10048 | 憮 | I24Y | I-4Y | I42Y | I4Y | | | | | | |
| 10049 | 憤 | I202 | I208 | I0-2 | I0-8 | I042 | I048 | I02 | I08 | | |
| 10050 | 憪 | I2MA | IPPA | IMA | | | | | | | |
| 10051 | 憫 | I2/Y | IFFY | I/YU | I/Y | | | | | | |
| 10052 | 懦 | I2'A | I2KA | I-KA | I'KA | IKOA | IKA | | | | |
| 10053 | 憨 | +3XG | +4XG | -3XG | -4XG | 3TXG | 4TXG | 4XG | [3XG | [4XG | |
| 10054 | 憛 | I2EJ | IEHJ | IEOJ | IEJ | | | | | | |
| 10055 | 戲 | U-2M | U-8M | UQ2M | UQ8M | U2M | U8M | | | | |
| 10056 | 擊 | EDXF | | | | | | | | | |
| 10057 | 擎 | HH9F | 69.F | 69F | H9F | 69EJ | 693J | | | | |
| 10058 | 撤 | FTPX | FHPX | FT4X | FH4X | FHX | | | | | |
| 10059 | 撼 | FT+M | FTM | FT[M | | | | | | | |
| 10060 | 撅 | FLKT | FLK- | | | | | | | | |
| 10061 | 撗 | FHQ2 | FHQ8 | | | | | | | | |
| 10062 | 擢 | FW-K | FWOK | FWK | FW. | | | | | | |
| 10063 | 撏 | FEHJ | FEOJ | FEJ | | | | | | | |
| 10064 | 撊 | FPPE | FME | | | | | | | | |
| 10065 | 撋 | FPPA | FMA | | | | | | | | |
| 10066 | 撌 | F0-2 | F0-8 | F042 | F048 | F02 | F08 | | | | |
| 10067 | 撣 | F0D+ | F20+ | F0Q+ | F2Q+ | F0+ | F0O[ | F20[ | F0Q[ | F2Q[ | F0[ |
| | | F@ | | | | | | | | | |
| 10068 | 擩 | F'KA | F-KA | FKOA | FKA | | | | | | |
| 10069 | 擇 | FP3H | FP4H | FPH | | | | | | | |
| 10070 | 撊 | FP+A | FP[A | | | | | | | | |
| 10071 | 搭 | F/80 | F/0 | | | | | | | | |
| 10072 | 隞 | PYQX | PYBX | PYTX | PYX | | | | | | |
| 10073 | 敺 | COTX | COX | CXTX | CXX | | | | | | |
| 10074 | 敷 | TYTX | TUYX | UYTX | | | | | | | |
| 10075 | 敻 | UA4X | UQ4Z | U44X | UAX | UQX | | | | | |
| 10076 | 斲 | 0OUT | 4ULT | OULT | 2ULT | 4UT | =ULT | | | | |
| 10077 | 斳 | HOET | HOET | HELT | | | | | | | |
| 10078 | 暵 | BHOK | BHOK | BHO2 | BHO2 | BHO8 | BHO8 | BHK | | | |
| 10079 | 暶 | B'.TG | BTTG | BTG | B]TG | B]G | | | | | |
| 10080 | 暸 | BW23 | BW3 | BQ-Y | BWY | | | | | | |
| 10081 | 暻 | BTK+ | BTB+ | BT+ | BTK[ | BTB[ | BT[ | | | | |
| 10082 | 暷 | B+AJ | B+QJ | B+SJ | B+J | B[AJ | B[QJ | B[SJ | B[J | | |
| 10083 | 暳 | BHUT | BHA | BXUT | BXA | | | | | | |
| 10084 | 暝 | BHBK | BHK | BXBK | BXK | | | | | | |
| 10085 | 樀 | YT2A | YTUO | | | | | | | | |
| 10086 | 槶 | YTUA | YTQA | YQA | | | | | | | |
| 10087 | 樗 | Y-AS | Y-A5 | Y-AC | YTAS | YTA5 | YTAC | YTAJ | YM-S | YM-5 | YM2C |
| | | YM=C | YM2J | YM=J | YMS | YM5 | YMC | YMJ | Y--S | Y--5 | Y--C |
| | | Y--J | | | | | | | | | |
| 10088 | 樥 | YEEE | Y2EE | YEC- | | | | | | | |
| 10089 | 樌 | YHH9 | YH9 | Y69 | | | | | | | |
| 10090 | 橄 | YYOT | YYOT | YYO- | YYO- | | | | | | |
| 10091 | 樛 | Y-Q4 | Y94 | | | | | | | | |
| 10092 | 樫 | YHQZ | YQZ | | | | | | | | |
| 10093 | 樇 | YHTA | YHUT | | | | | | | | |
| 10094 | 槾 | YHOE | YHOE | YHE | | | | | | | |
| 10095 | 樧 | YKSS | YK5S | YKCS | YKJS | | | | | | |
| 10096 | 樒 | YEEB | Y2EB | YE'B | YEB | | | | | | |
| 10097 | 樛 | YEE3 | YE83 | Y283 | | | | | | | |
| 10098 | 樝 | YTU4 | YT74 | YU74 | YT4 | YU4 | | | | | |
| 10099 | 樱 | YB4X | YBX | | | | | | | | |
| 10100 | 樧 | YXYX | YXX | | | | | | | | |
| 10101 | 榭 | YUA+ | YU+ | YUA[ | YU[ | | | | | | |
| 10102 | 樑 | YS83 | Y3S3 | YS3 | | | | | | | |
| 10103 | 樵 | Y3QY | Y3Y | | | | | | | | |
| 10104 | 鰲 | HH9Y | H9Y | 69.Y | 69Y | | | | | | |
| 10105 | 鬃 | HQTY | QLTY | QTY | | | | | | | |
| 10106 | 樠 | YTS4 | YT34 | YTR4 | YT4 | | | | | | |
| 10107 | 樴 | YTKR | YTBR | | | | | | | | |

10108 櫥 YLEA YLA
10109 櫬 YK4R YKR
10110 橫 YE42 YE48 YE2 YE8
10111 櫱 K4RY KRY
10112 樽 Y+AJ Y+QJ Y+SJ Y+J Y[AJ Y[QJ Y[SJ Y[J
10113 櫻 YK4X YKX
10114 櫛 YPYQ YPYB YPY
10115 檔 Y3UH
10116 樺 YHXE YXXE
10117 櫟 YQN3 YQN YQ3
10118 櫃 YOOM YOOM YOE. YOE. YOE
10119 檉 YFFE YF'E Y/'E Y/E
10120 櫓 YTIA YTXA
10121 檻 Y'PL Y.PL YPOL YPL
10122 奪 8OYJ 8YJ
10123 歎 TUJT T7JT TAJT U7JT UAJT TUJ- T7J- TAJ- U7J- UA
TJUT TJ- UJUT UJ-
10124 殯 -AU2 -AU8 AU-2 AU-8 AUT2 AUT8 AUQ2 AUQ8 AU2 AU
10125 殲 -AHE AHOE AHOE AHE
10126 殤 -AEE AEUE
10127 殘 -AB4 ABS4 AB54 -A5 A5
10128 毽 ELHK ELXK 3LHK 3LXH
10129 氈 QOVL QOVL QVEL QV3L QVL
10130 毹 S83L 383L S3EL S33L
10131 氅 YXLL YXL
10132 穎 F3T2 F3T8 F32 F38 73T2 73T8 732 738 F4T2 F4
F42 F48 74T2 74T8 742 748
10133 氂 YXL3 YX3 YXL4
10134 滿 32YH 3YAH
10135 澇 3WWC 32WC 3WUC 32UC 3WC 3HUC 3KUC 3XUC
10136 瀆 3+H2 3+H8 3+X2 3+X8 3[H2 3[H8 3[X2 3[X8
10137 潁 3HT2 3HT8
10138 澍 3HKJ
10139 澈 3TPX 3HPX 3T4X 3H4X
10140 澌 3H2T 3H8T 3HLT 3HT
10141 潢 3HQ2 3HQ8
10142 潏 3SJA
10143 潼 3EH- 3EHQ 3E- 3EQ 3-QE 3TQE
10144 瀟 3EKK
10145 瀾 3PPY 3MY
10146 潕 34H4 3QH4
10147 潤 300+ 320+ 30Q+ 32Q+ 300[ 320[ 30Q[ 32Q[ 3■
10148 澂 3EEX 3\EX
10149 漁 3TE4 3E-4 3E4
10150 瀨 3'YA 3Y3A 3'3A
10151 潦 3UBZ
10152 潐 3TE4 3'E4 3E4
10153 潗 3TEY 3'EY 3EY
10154 澔 3BHO 3BO
10155 潰 3'TX 3TTX 3]TX 3]X
10156 澉 38-E 380E 38EE 38-2 3802
10157 漿 HBX3 HPX3 HX3 HBX4 HPX4 HX4
10158 激 3TZX
10159 潾 32HN 32H3 32N
10160 潛 32HB 3K4B
10161 潽 324B 32QB
10162 澄 3-AS 3TAS 3M2S 3M=S 3MS 3-2S 3-=S 3-S
10163 澹 3+AG 3+QG 3+SG 3+G 3[AG 3[QG 3[SG 3[G
10164 澱 3BT3 3B+3 3B03 3B3 3B[3
10165 潠 3QH2 3QH8
10166 澗 3OHH 3OHH 3O# 3O#
10167 澤 3HHH 3H-H 3HXH
10168 濶 3PPX 3MTX 3MX
10169 濐 3FFH 3/EH 3/H
10170 澼 3KOB
10171 澯 3'Y3 3Y83 3'83 3'3 3'Y4 3Y84 3'84
10172 螟 FWT2 FWT8 FW2 FW8 7WT2 7WT8 7W2 7W8
10173 燨 WHOK WHOK WHO2 WHO2 WHO8 WHO8 WHK
10174 爆 W-43 W-4Y W423 W4=3 W4-Y W43 W4Y
10175 燴 WC3O WCO WCX
10176 熠 WEEB W2EB WE'B WEB
10177 燁 WQHH WQXH WQH
10178 燼 WPOL WPL

| | | |
|---|---|---|
| 10179 | 熵 | WT2A WTUO WTA |
| 10180 | 燒 | WLHF WLF WLH7 WL7 |
| 10181 | 燧 | WSAZ WSZ |
| 10182 | 燬 | WEXH WEH |
| 10183 | 熠 | WEEK WETK W2TK WEK |
| 10184 | 燠 | WQOV WQOV WQV |
| 10185 | 熮 | W'YA WY2A WYAA WYA W'AA W'2A W'A |
| 10186 | 熜 | W'QG WQG |
| 10187 | 熢 | 'TGW TTGW TGW \|TGW \|GW |
| 10188 | 燰 | WB4X WBX . |
| 10180 | 犀 | LYYH L2YH LY'H LYH |
| 10190 | 犎 | P3JH PYJH PJ'H PJH |
| 10191 | 獘 | 3AXK 3XK. 3X.K 3XK |
| 10192 | 獎 | EDXK EXK. EX.K EXK |
| 10193 | 獗 | ZTKH ZTQH ZTH |
| 10194 | 獟 | Z3HR ZHR |
| 10195 | 獠 | ZK23 ZKB3 |
| 10196 | 獢 | ZSJA ZSA |
| 10197 | 獛 | Z42K Z4KK Z422 Z4K2 Z428 Z4K8 |
| 10198 | 獦 | ZEJ4 Z;J4 ZEC4 Z;C4 ZE4 Z;4 |
| 10199 | 獚 | ZHQ2 ZHQ8 ZH2 ZH8 ZXQ2 ZXQ8 ZX2 ZX8 |
| 10200 | 獥 | Z3AX Z3X |
| 10201 | 獝 | Z'KA Z-KA ZKOA |
| 10202 | 璇 | ETDG EDTG |
| 10203 | 璉 | EHQZ EQZ |
| 10204 | 璃 | EHA EHUT |
| 10205 | 瑯 | EEE3 EE83 E283 |
| 10206 | 璁 | E'QG EQG |
| 10207 | 瑽 | E'TG ETTG ET2G E\|TG E]G |
| 10208 | 璅 | E3QY |
| 10209 | 璈 | EEDX |
| 10210 | 璕 | E+QJ E+SJ E+AJ E+J E[QJ E[SJ E[AJ E[J |
| 10211 | 璲 | EH8Y EH8' EHY EH' EX8Y EX8' EXY EX' |
| 10212 | 甂 | 4Y-Z 4YCZ 4YZ |
| 10213 | 甇 | WWUZ WU-Z WUCZ WWZ WUZ |
| 10214 | 晶 | QQQ |
| 10215 | 瘴 | L22H L2EH |
| 10216 | 瘞 | L2KH LKTH LKH |
| 10217 | 瘝 | L2XS LX2S LX=S LXOS LXOS LXS |
| 10218 | 瘭 | L24Z L4Z L243 L244 |
| 10219 | 瘱 | L24G L'4G L4G |
| 10220 | 瘣 | L2QR L'QR LQRS L2R |
| 10221 | 瘯 | L2KT L2K- LKET LKE- LKT |
| 10222 | 瘨 | L2+K L2+2 L2+8 L+4K L+42 L+48 L+K L+2 L+8 L2F |
| | | L2F2 L2F8 LF4K LF42 LF48 LFK LF2 LF8 L27K L27 |
| | | L278 L74K L742 L748 L7K L72 L78 L2[K L2[2 L2[ |
| | | L[4K L[42 L[48 L[K L[2 L[8 |
| 10223 | 瘳 | L2EG LEDG LEG |
| 10224 | 瞞 | 'BTA BTOA BTHA |
| 10225 | 眺 | BE3R |
| 10226 | 瞕 | 'BBY B'BY BBY- BBY |
| 10227 | 矗 | 3'B |
| 10228 | 瞍 | 4EEX 4EIX 4;IX 4EX 4;X |
| 10220 | 瞠 | 4HOK 4HK |
| 10230 | 瞉 | H4RX |
| 10231 | 瞵 | 48SE 48S2 48EE 482E 42SE 42S2 42EE 422E |
| 10232 | 磠 | +UEO [UEO |
| 10233 | 磆 | TOTA +TOA +THA +TA '[TOA [THA [TA |
| 10234 | 磏 | +KE4 +2E4 [KE4 [2E4 |
| 10235 | 磌 | ++4K ++42 ++48 +F4K +F42 +F48 +FK +F2 +F8 +74F |
| | | +742 +748 +7K +72 +78 [[4K [[42 [[48 [F4K [F42 |
| | | [F48 [FK [F2 [F8 [74K [742 [748 [7K [72 [78 |
| 10236 | 磄 | +E-K +EOK +EK +E. [E-K [EOK [EK [E. |
| 10237 | 磎 | TOAK +ANK +AK [ANK [AK |
| 10238 | 磔 | TOAY +AHY +AY [AHY [AY |
| 10239 | 磈 | TOQR +'QR +QRS +QR +R ['QR [QRS [QR [R |
| 10240 | 磃 | TOLR +LTR +LUR +LR [LTR [LUR [LR |
| 10241 | 磍 | TOLO +LEO +LO [LEO [LO |
| 10242 | 磷 | TOXY +3XY +XY [3XY [XY |
| 10243 | 禠 | -Y24 2324 =324 K2E4 K24 |
| 10244 | 禡 | -YE4 23E4 =3E4 KEJ4 KEC4 -Y7 237 =37 K7 |
| 10245 | 禢 | 23TR =3TR 23UR =3UR -YTR -YUR KLTR KLUR KLR |
| 10246 | 禜 | WWU3 WU23 WW3 WU3 WWUY WU-Y WWY |

| | | |
|---|---|---|
| 10247 | 褯 | 23BE =3BE 23B2 =3B2 -YBE -YB2 KBEE KB2E KB2 |
| 10248 | 稹 | -Y+K -Y+2 -Y+8 -YFK -YF2 -YF8 -Y7K -Y72 -Y78 23+K |
| | | 23+2 23+8 23FK 23F2 23F8 237K 2372 2378 =3+K =3+2 |
| | | =3+8 =3FK =3F2 =3F8 =37K =372 =378 K+4K K+42 K+48 |
| | | KF4K KF42 KF48 K74K K742 K748 -Y[K -Y[2 -Y[8 23[K |
| | | 23[2 23[8 |
| 10249 | 粦 | GFQA G7QA |
| 10250 | 積 | 'Y+K 'Y+2 'Y+8 'YFK 'YF2 'YF8 'Y7K 'Y72 'Y78 '+4K |
| | | '+42 '+48 'F4K 'F42 'F48 '74K '742 '748 'Y[K 'Y[2 |
| | | 'Y[8 '[4K '[42 '[48 |
| 10251 | 穤 | U2Y+ U8Y+ URY+ UY2+ UY=+ UY+ U2Y[ U8Y[ URY[ UY2[ |
| | | UY=[ UY[ |
| 10252 | 實 | U2+K U2+2 U2+8 U8+K U8+2 U8+8 UR+K UR+2 UR+8 U2FK |
| | | U2F2 U2F8 U8FK U8F2 U8F8 URFK URF2 URF8 U27K U272 |
| | | U278 U87K U872 U878 UR7K UR72 UR78 U2[K U2[2 U2[8 |
| | | U8[K U8[2 U8[8 UR[K UR[2 UR[8 |
| 10253 | 甒 | U2AA U8AA URAA U2SS U8SS URSS U2AS UAA USS |
| 10254 | 箍 | FFDL /TDL /DTL /DL |
| 10255 | 篋 | /CKT |
| 10256 | 節 | FF3J /3AJ /3J |
| 10257 | 箏 | /H+O /X+O /H[O /X[O |
| 10258 | 篩 | FF43 /43' /43 |
| 10259 | 箯 | /T-X /TQX |
| 10260 | 箹 | FFNC /N3C /NC. /NC FFNJ /N3J /NJ. /NJ |
| 10261 | 篌 | FF32 FF38 /3H2 /3H8 /32 /38 |
| 10262 | 篙 | FF34 /3'4 /34 |
| 10263 | 糅 | 2YSY =YSY |
| 10264 | 糈 | 2YLA 2YJA 2YGA =YLA =YJA =YGA |
| 10265 | 糌 | 2YAB YATB =YAB |
| 10266 | 糒 | 2YKJ =YKJ YKAJ 2YJ =YJ |
| 10267 | 緷 | N3UQ NUHQ NUQ |
| 10268 | 緶 | N3MK NTAK NMK |
| 10269 | 緘 | N3IE NI2E NICC NI2B NI=B NIE |
| 10270 | 緰 | N329 N3KQ N29 NKQ |
| 10271 | 緗 | N3Y4 NY4 |
| 10272 | 緟 | N3OB N3KB NOKB NOB NCKB NKB |
| 10273 | 緍 | N3LA N3JA NLGA NJGA NLA NJA NGA |
| 10274 | 緺 | N3QA NQUO NQA |
| 10275 | 緦 | N3QG NQG |
| 10276 | 緶 | NT-X NTTX NTQX |
| 10277 | 緱 | NTCK |
| 10278 | 緰 | N8AJ |
| 10279 | 績 | NTBX |
| 10280 | 緷 | NHQH |
| 10281 | 罶 | 4SDQ 4SQ |
| 10282 | 羬 | 2EOM 2EMO =EOM =EMO |
| 10283 | 羧 | 2EEW 2EW =EEW =EW |
| 10284 | 羭 | 2E8J =E8J |
| 10285 | 猴 | EETK 2ETK =ETK ETCK 2TCK =TCK |
| 10286 | 翫 | EEBR EB2R EB=R 2B2R 2B=R EBR 2BR =B2R =B=R =BR |
| 10287 | 翪 | EEUX 2U2X 2U8X 2URX =U2X =U8X =URX 2UX =UX 2XU |
| | | 2UXX =XUX =UXX EU2X EU8X EURX EXUX EUXX |
| 10288 | 翨 | EEUQ 2EUQ =EUQ 2UHQ =UHQ 2UQ =UQ |
| 10289 | 翡 | KAJE KAEE KJEE KJ2E KAJ2 KJ2 |
| 10290 | 翠 | EEBG 2EBG =EBG 2B-G =B-G 2BG =BG |
| 10291 | 脝 | -4TJ 4TOJ 4TUJ 4TJ PTOJ PTUJ |
| 10292 | 膆 | -4WK 4W'K 4W-K 4WK PW'K PW-K PWK |
| 10293 | 膣 | AUSH |
| 10294 | 膟 | ATN+ AT+ ATN[ AT[ |
| 10295 | 膞 | A+QJ A+SJ A+J A[QJ A[SJ A[J |
| 10296 | 膕 | AOOM AOOM AOM AOM AOE. AOE AOE. |
| 10297 | 膜 | AQOV AQOV AQV |
| 10298 | 膡 | A5OS A5SS A5S |
| 10299 | 膗 | AIUE AETE AE'E AEE A\TE A\'E A\E |
| 10300 | 舖 | 8O+A 8O[A |
| 10301 | 艖 | 'AK4 A-K4 |
| 10302 | 艓 | 'AHY A-HY AHLY |
| 10303 | 艒 | 'AB4 A-B4 'A4 |
| 10304 | 艘 | 'AUX A-UX AU2X AU8X AURX AXUX AUXX |
| 10305 | 艎 | 'ABE A-BE A'BE |
| 10306 | 艑 | 'APA A-PA A'PA A.PA APA |
| 10307 | 窨 | HUGE XUGE |
| 10308 | 寇 | HU2X HU=X HURX XU2X XU=X XURX |

| | | | | | | | | | | | |
|---|---|---|---|---|---|---|---|---|---|---|---|
| 10309 | [illegible] | HT2A | HTUO | XT2A | XTUO | | | | | | |
| 10310 | [illegible] | HTOP | HTP | XTOP | XTP | | | | | | |
| 10311 | [illegible] | HU-2 | HU-8 | HUT2 | HUT8 | HUQ2 | HUQ8 | HU2 | HU8 | XU-2 | XU- |
| | | XUT2 | XUT8 | XUQ2 | XUQ8 | XU2 | XU8 | | | | |
| 10312 | [illegible] | H4OX | H;RX | H;X | X4OX | X;RX | X;X | | | | |
| 10313 | [illegible] | HT2K | HT8K | HTRK | XT2K | XT8K | XTRK | | | | |
| 10314 | [illegible] | ++LF | HLHF | HLF | ++L7 | HLH7 | HL7 | XLHF | XLF | XLH7 | XL7 |
| | | [[LF | [[L7 | | | | | | | | |
| 10315 | [illegible] | HTDK | HDTK | HDK | XTDK | XDTK | XDK | | | | |
| 10316 | [illegible] | HWBH | HWH | XWBH | XWH | | | | | | |
| 10317 | [illegible] | HEEE | XEEE | H2EE | X2EE | HEC- | XEC- | | | | |
| 10318 | [illegible] | HEDX | HDX | XEDX | XDX | | | | | | |
| 10319 | [illegible] | HHH9 | XHH9 | XH9 | | | | | | | |
| 10320 | [illegible] | HGS4 | HG54 | HG4 | XGS4 | XG54 | XG4 | | | | |
| 10321 | [illegible] | ++69 | HHH9 | H69. | H69 | XHH9 | X69. | X69 | [[69 | | |
| 10322 | [illegible] | ++43 | ++4Y | H-43 | H-4Y | H423 | H4=3 | H4-Y | H-Y | H43 | H4Y |
| | | X-43 | X-4Y | X423 | X4=3 | X4-Y | X-Y | X43 | X4Y | [[43 | [[4 |
| 10323 | [illegible] | HYUT | HYU- | XYUT | XYU- | | | | | | |
| 10324 | [illegible] | +++J | H+QJ | H+SJ | X+QJ | X+SJ | X+J | [[[J | H[QJ | H[SJ | X[Q |
| | | X[SJ | X[J | | | | | | | | |
| 10325 | [illegible] | ++QT | HHQT | HQLT | XHQT | XQLT | [[QT | | | | |
| 10326 | [illegible] | HC30 | HCX | XC30 | XCX | | | | | | |
| 10327 | [illegible] | HHUE | XEUE | XHUE | | | | | | | |
| 10328 | [illegible] | ++FE | HFTE | HF'E | HFE | XFTE | XF'E | XFE | [[FE | | |
| 10329 | [illegible] | ++ZZ | HZZ | XZZ | [[ZZ | | | | | | |
| 10330 | [illegible] | HHOE | HHOE | XHOE | XHOE | XHE | | | | | |
| 10331 | [illegible] | HE83 | HEE3 | H2E3 | XE83 | XEE3 | X2E3 | XE3 | H283 | X283 | |
| 10332 | [illegible] | HE04 | XE04 | | | | | | | | |
| 10333 | [illegible] | HSAZ | HSZ | XSAZ | XSZ | | | | | | |
| 10334 | [illegible] | HSJC | HJC | XSJC | XJC | XSC | | | | | |
| 10335 | [illegible] | HTU4 | HT74 | HU74 | XTU4 | XT74 | XU74 | | | | |
| 10336 | [illegible] | HTOX | HTOX | XTOX | XTOX | | | | | | |
| 10337 | [illegible] | HO2L | HO2L | HOL | XO2L | XO2L | XOL | | | | |
| 10338 | [illegible] | H42Y | H4Y | X42Y | X4Y | | | | | | |
| 10339 | [illegible] | ++OM | ++OE | HOOM | HOOM | XOOM | XOOM | XOM | [[OM | [[OE | |
| 10340 | [illegible] | ++QN | ++Q3 | HQN3 | HQ3 | HQN | XQN3 | XQN | XQ3 | [[QN | [[Q |
| 10341 | [illegible] | HQHH | HQXH | XQHH | XQXH | | | | | | |
| 10342 | [illegible] | ++QV | HQOV | HQOV | HQV | XQOV | XQOV | XQV | [[QV | | |
| 10343 | [illegible] | ++OE | HOTE | HO'E | XOTE | XO'E | XOE | [[OE | | | |
| 10344 | [illegible] | HXYX | HXX | XXYX | XXX | | | | | | |
| 10345 | [illegible] | HBS4 | HB54 | XBS4 | XB54 | | | | | | |
| 10346 | [illegible] | HTIY | HTXY | XTIY | XTXY | | | | | | |
| 10347 | [illegible] | HTIA | HTXA | XTIA | XTXA | | | | | | |
| 10348 | [illegible] | H'TG | HTGG | HTG | X'TG | XTGG | XTG | H]GG | H]G | X]GG | X]G |
| 10349 | [illegible] | H'TG | HTTG | HT2G | HTG | X'TG | XTTG | XT2G | XTG | H]TG | H]G |
| | | X]TG | X]G | | | | | | | | |
| 10350 | [illegible] | H'TP | HTHP | HTGP | HTP | X'TP | XTHP | XTGP | XTP | H]HP | H]G |
| | | H]P | | | | | | | | | |
| 10351 | [illegible] | ++S3 | HS83 | H383 | HS3 | XS83 | X383 | XS3 | [[S3 | | |
| 10352 | [illegible] | HN32 | HNX2 | HNX= | HN2 | HN= | XN32 | XNX2 | XNX= | XN2 | XN= |
| 10353 | [illegible] | H'PL | H.PL | HPOL | X'PL | X.PL | XPOL | XPL | | | |
| 10354 | [illegible] | H3TX | H3GX | H3YX | X3TX | X3GX | X3YX | | | | |
| 10355 | [illegible] | HTDG | HDTG | HTG | XTDG | XDTG | XTG | | | | |
| 10356 | [illegible] | ++PY | [[PY | HPYQ | HPYB | HPY | XPYQ | XPYB | XPY | | |
| 10357 | [illegible] | AJTR | AJUR | AJR | | | | | | | |
| 10358 | [illegible] | OSU- | OSUB | SU2B | SU=B | SUB- | SUB | OSU- | OSUB | | |
| 10359 | [illegible] | OSDZ | STDZ | SDTZ | SDZ | OSDZ | | | | | |
| 10360 | [illegible] | OS29 | OSKQ | S2-Q | S29 | SKW | OS29 | OSKQ | | | |
| 10361 | [illegible] | OSLE | SLKE | SLE | OSLE | | | | | | |
| 10362 | [illegible] | OST4 | STS4 | ST54 | ST4 | OST4 | OSA4 | SAS4 | SA54 | SA4 | OAT |
| 10363 | [illegible] | OSEQ | SEQ- | SEQ | OSEQ | | | | | | |
| 10364 | [illegible] | OSCV | SCBV | SCV | OSCV | | | | | | |
| 10365 | [illegible] | OSFB | SFFB | S2FB | SF'B | SFB | OSFB | OS7B | S77B | S27B | S7' |
| | | S7B | OS7B | OS%B | OS%B | S%'B | S%B | | | | |
| 10366 | [illegible] | OSVM | OSMV | S-VM | SM-V | SVM | SMV | OSVM | OSMV | | |
| 10367 | [illegible] | OSTQ | STOH | STOH | STQ | OSTQ | | | | | |
| 10368 | [illegible] | OSMK | STAK | SMK | OSMK | | | | | | |
| 10369 | [illegible] | OSSY | SSJY | SSY | OSSY | | | | | | |
| 10370 | [illegible] | OSLA | OSJA | OSGA | SLGA | SJGA | SGA | OSLA | OSGA | | |
| 10371 | [illegible] | OSP4 | SB'4 | SPI4 | SP4 | OSP4 | | | | | |
| 10372 | [illegible] | OSBG | SB-G | SBG | OSBG | | | | | | |
| 10373 | [illegible] | SB-C | | | | | | | | | |
| 10374 | [illegible] | OSB4 | SB4 | OSB4 | | | | | | | |

10375 蝸 SBCL SBJL
10376 蜥 OSQA SQA OSQA
10377 蝝 OSOZ SLLZ SOZL SOZ OSOZ
10378 蝯 OSAX SAHX SAX OSAX
10379 蝬 OSUX SU2X SU8X SURX SUX' OSUX SXUX SUXX
10380- 蝺 OSOA S'OA SOA OSOA
10381 蝮 STBX
10382 蝔 SU42 SU48 SU2 SU8
10383 螢 SJXS SXOS SXOS JXOS JXOS SXS JXS
10384 蜉 STOJ STUJ
10385 蝻 OS+A S+A S+UH OS+A OS[A S[A S[UH OS[A
10386 螯 'YWS 'WOS 'WOS 'WS YWOS YQOS YWS
10387 蝢 OST2 OST8 ST42 ST48 ST2 ST8
10388 蝵 OSHK OSHK SHUK SHK SXUK SXK
10389 螝 SHQH
10390 蝑 'T+J ]+OJ ]+AJ ]+J 'T[J ][OJ ][AJ ][J
10391 褊 KT2E KTUE KTE
10392 襌 KUHQ KUQ
10393 褔 K+OQ K-Q KOQ
10394 褋 KHLY KHY
10395 襬 KCBV KCV
10396 褘 KHOH
10397 褙 KFFA K2FA KFA K77A K27A K7A
10398 褆 KB-G KBG
10399 褖 KLLZ KOZL KOZ
10400 褑 KAHX KAX
10401 褰 TEYK
10402 褉 KEDK
10403 覡 WW4R =W4R 2W4R WWR W4R
10404 覷 TR4R UR4R
10405 覻 YV4R YVR 'V4R
10406 觭 UAKJ UAJ
10407 觰 UAHB
10408 觬 UAER UA;R UAR
10409 諏 40PX ;PX 404X ;-4X ;4X
10410 諆 ;H2K ;H=K ;H22 ;H=2 ;H28 ;H=8 ;HK ;H2
10411 諓 405N ;5TN ;5N
10412 諑 40MM 402M ;MM ;2M
10413 諍 40ZL ;ZL
10414 諔 40TX 40YX 40GX ;TYX ;G3X ;TX ;YX ;GX
10415 諕 40TR 40UR ;TUR ;T7R ;U7R ;TR ;UR
10416 諮 403B ;3B 404B ;4B
10417 諗 408G ;8LG ;8JG ;8G
10418 讕 PP40 MT20 MT=0 M40 PP; M;
10419 諀 40Q4 40Q+ ;'Q4 ;'Q+ ;Q4 ;Q+ 40Q[ ;'Q[ ;Q[
10420 譽 H840 H2K; H28; H=8; H8;
10421 諚 40EK ;E'K ;EK
10422 諃 40YY ;YY
10423 諫 40YT ;YTT ;YT
10424 諕 40ER 40;R ;EER ;2ER ;ER ;;R
10425 諳 40KB ;'KB ;KB
10426 諠 40UH
10427 諢 -KQ4 -KQ+ OKQ4 OKQ+ .'Q4 .'Q+ .Q4 .Q+ -KQ[ OKQ
.'Q[ .Q[
10428 豍 AZQ4 AZQ+ Z'Q4 Z'Q+ ZQ4 ZQ+ AZQ[ Z'Q[ ZQ[
10429 賥 42T+ 48T+ 42+ 48+ 42T[ 48T[ 42[ 48[
10430 賟 42Q2 48Q2 42Q8 48Q8 422 428 488
10431 賙 42UO 48UO 42U 48U
10432 賚 UY42 UY48 U232 U238 UY2 UY8
10433 賨 KT42 KT48 KT2 KT8
10434 賝 42UY 48UY 48Y
10435 賧 42WW 422W 48WW 482W 48W
10436 趌 HGT+ HG+ GTB+ GT+ HGT[ HG[ GTB[ GT[
10437 趐 HGCY GC2Y GCY HGJY GJ2Y GJY
10438 趍 HGTE HG'E GTE G'E GE
10439 趎 HG8K G8K HG$ G$ HG6 G6
10440 踠 GUAL
10441 踣 GTKO
10442 踥 OGTV GTKV GTV
10443 踤 OGT+ GTT+ GT4+ GT+ OGT[ GTT[ GT4[ GT[
10444 踮 OGLO GLTO GLO
10445 踺 OG-G OG+G OGEG G-EG G+EG G-G G+G GEG OG[G G[EG
G[G

10446 蹬 GH2H GH8H GHRH OG6 G6
10447 踏 OGHB GHHB G22B GHB
10448 踑 OGH2 OGH8 GH2K GH=K GH22 GH=2 GH28 GH=8 GHK GH2
GH8
10449 踙 OGPX OG4X GPX G-4X G4X
10450 踦 OGKJ GKJO GKJ
10451 踧 OGTX OGGX GTYX GG3X GYX GGX
10452 踔 OGT+ GTB+ GT+ OGT[ GTB[ GT[
10453 踥 OGYV G'YV GYV OG'V G'V
10454 踘 OGCY GC2Y GCY OGJY GJ2Y GJY
10455 踓 OGTE OG'E GTTE GTHH GTE G'E GE
10456 踆 OGHX GH2X GH8X GHRX GHX
10457 踗 OG8G G8LG G8JG G8G
10458 踚 OG8A G8-A G8A
10459 輬 HQT3 QTO3 QT3
10460 輤 HQEA QIEA QEA
10461 輘 HQHX QH2X QH8X QHRX QHX
10462 輚 HQMM HQ2M QMM Q2M
10463 輮 HQQY QQY
10464 輣 HQAA HQ2A QAA Q2A
10465 輞 QUHO
10466 輗 HQER QEER QER Q:R
10467 逕 HTHZ XTHZ
10468 遷 EUEZ HUEZ
10469 逝 AZLZ AZZ
10470 連 TK+Z TB+Z TK[Z TB[Z
10471 邀 YOXZ YOXZ YTXZ YXZ
10472 都 2EOP 2OP =EOP =OP
10473 鄙 24BP 2QBP 2BP =4BP =QBP =BP
10474 郈 EHJP EOJP
10475 郵 522P 528P 542P
10476 鄲 OQ+P OO+P 2Q+P =Q+P 2O+P =O+P O+P OQ[P OO[' 2
=Q[P 2O[' =O[P O[P 郵P
10477 鄦 TE4P E-4P E4P
10478 鄭 SD2P SD8P
10479 酷 9TKO
10480 醆 -QMM -Q2M 9MM 92M
10481 酘 -Q4X 94X
10482 酴 -QO3 9O-3 9O3 -QO4 9O-4 9O4
10483 醂 -QYY -Q2Y 9YY 92Y
10484 醄 -QCE 9CHE 9CE
10485 醮 -QTE -Q'E 9TE 9'E 9E
10486 鋐 8KUS $U+S $US 6U+S 6US $U[S 6U[S
10487 鋭 8K.K $.BK $.K 6.BK 6.K
10488 鋄 8KWX $-WX $WX 6-WX 6WX
10489 鋀 8K. $-OK $. 6-OK 6.
10490 錧 8K50 $50 650
10491 錄 8K-3 8K+3 $-3. $+3. $-3 $+3 8K+4 $-4. $+4. $+
6-3. 6+3. 6-3 6+3 6-4. 6+4. 6+4 8K[3 $[3. $[
8K[4 $[4. $[4 6[3. 6[3 6[4. 6[4
10492 鉠 8KKT $KTT $K2T $KT $-3T 6KTT 6K2T 6KT 6-3T
10493 鉽 8KGM 8KMG $GM $MG 6GM 6MG
10494 錽 $EUX 6EUX
10495 鋘 $ONK $OSK 6ONK 6OSK
10496 鉈 8KHC $H.C $HC 6H.C 6HC
10497 鎷 8KOA $OA 6OA
10498 銬 8KAJ $'3J $AJ. $AJ 6'3J 6AJ. 6AJ
10499 銋 8KEZ $EZ 6EZ
10500 銛 $'HO 6'HO
10501 鋂 8KTQ $TQ- $TQ 6TQ- 6TQ
10502 鋨 8KFM $'FM $FM 6'FM 6FM
10503 鋊 8K40 $220 $880 $280 $40 6220 6880 6280 640
10504 鋈 3K8K 3'K$ 3-K$ 3K$ 3'K6 3-K6 3K6
10505 鋎 $U2R $U=R 6U2R 6U=R
10506 鍋 8KPC $PCO $PC $PJO $PJ 6PCO 6PC 6PJ
10507 鋝 8K+Z $+UZ $+Z- $+Z 6+UZ 6+Z- 6+Z 8K[Z $[UZ $[
$[Z 6[UZ 6[Z- 6[Z
10508 鋕 8KHG $IHG $+-G $HG 6IHG 6+-G 6HG $[-G 6[-G
10509 錸 8KYO 8KYO $YO $YO 6YO 6YO
10510 鋃 $L2K $L=K 6L2K 6L=K
10511 鋞 8K3H $-3H $3H 6-3H 63H
10512 鋧 8K4R $4R 64R
10513 鋑 $S2X $S8X $SRX 6S2X 6S8X 6SRX

10514 鋓 8KYJ $'YJ $YJ 8K'J $'1J $'J 6'YJ 6YJ 6'1J 6'J
10515 錩 8K4J $'4J $4J' $4J 6'4J 64J' 64J
10516 鋯 $8LO $8JO 68LO 68JO
10517 錆 8KTA $TSA $TA 6TSA 6TA
10518 鏨 HC8K HC2$ HC=$ HC$ HJ8K HJ2$ HJ=$ HJ$ HC26 HC=6
HC6 HJ26 HJ=6 HJ6
10519 鉦 FT8K FLT$ FLT6 FT$ FT6
10520 闢 ESPE ESE
10521 闌 PPBK PP.K M.BK MBK
10522 闆 PPOY PPOY MOY MOY
10523 闍 PPEZ MEZ
10524 闡 PPEE PP2E PP; M;
10525 陝 PO-2 PO-8 PO42 PO48 PO2 PO8
10526 院 P3HR PHR
10527 錐 8YTE 8Y'E 8YE 8'TE 8''E 8'E 83TE 83'E 83E
10528 罐 -A40 -A; TA40 TA; MT20 MT=0 M40 M; -40 -4
10529 稲 -A3E TA3E M3TE -3TE -3E
10530 穄 -A3Y TA3Y M3Y -3Y
10531 靚 EA4R IEAR EAR
10532 鞀 H+HO H[HO
10533 鞎 H+BK H[BK
10534 鞈 H+80 H[80
10535 韐 HH80 HHO
10536 鞏 2H8H 22TH 2=TH ==TH 2HHH =H8H =HHH
10537 頍 UVT2 UVT8 UV2 UV8
10538 頞 TXT2 TXT8
10539 頰 TTT2 TTT8
10540 頮 2HT2 2HT8 =HT2 =HT8
10541 辮 2C22 2C28 2J22 2J28 EET2 2ET2 EET8 2ET8 2T42 2T48
=C22 =C28 =J22 =J28 =ET2 =ET8 =T42 =T48
10542 頯 ULT2 ULT8 UL2 UL8
10543 頳 2YT2 =YT2 2YT8 =YT8
10544 頤 'BT2 'BT8 'B2 'B8
10545 鬮 RSAJ RAJ R-AJ RAIJ
10546 姿 2T8S 2-8S 2T8K 2-8K 2UT8 2-8 =T8S =-8S =T8K =-8K
=UT8 =-8
10547 餈 GF8S GF8K G78S G78K GF8 G78
10548 餑 8S+Z 8F+Z 8FZ 87+Z 87Z 8+UZ 8+Z 8S[Z 8F[Z 87[Z
8[UZ 8[Z
10549 餔 8S+A 8F+A 87+A 8+A. 8+A 8S[A 8F[A 87[A 8[A. 8[A
10550 餖 8S-K 8SOK 8S. 8F-K 8FOK 8F. 87-K 87OK 87. 8-OK
8OK 8.
10551 餗 8SYO 8SYO 8SY 8FYO 8FYO 8FY 87YO 87YO 87Y 8YO
8YO
10552 餕 8SSX 8FSX 87SX 8S2X 8S8X 8SRX
10553 駅 E4G' E4G 7G'
10554 駍 E4K+ E4H2 7K+ 7HI2 7H2I 7H2 E4K[ 7K[
10555 駏 E4CC E4E 7CC 7E
10556 駓 E423 E4=3 7-3- 723 7=3
10557 駔 E4A- E44- 7A- 74-
10558 駎 E4IQ E4Q 7IQ 7Q
10559 駉 E4UO E4A 7UO
10560 駖 E48S 78-S 78.S 78S
10561 駘 E4SO 7SO
10562 駋 E4UO E4DO 7UO 7DO
10563 駗 E483 783
10564 驁 ALE4 AJL7 ACL7 AL7
10565 骸 QAEX QAX
10566 髻 E323 E3=3 D-3- D23 D=3
10567 鬙 E3DO E3UO ES3O E3O DDO
10568 鬃 ES3J E3SJ E3J DSLJ DSJJ DSJ' DSJ
10569 鬆 ES3X E3EX DUIX DEX
10570 鬣 ES3L E3UL DUOL DUPL DUCL DUL
10571 魖 QRLM QRML RLM RML
10572 魃 QR+X R+X. QR[X R[X.
10573 魧 U4TR JTR
10574 魴 U4TD U4D JTD JD
10575 魱 U4CC U42O U4=O J-O- JCC J2O J=O
10576 魦 U43' U43 J3'
10577 魶 U4UT U4A JUT JA
10578 魵 U48D U42D J8D J2D
10579 魰 U4TX U4X JTX JX

| | | | | | | | | | | | |
|---|---|---|---|---|---|---|---|---|---|---|---|
| 10580 | 飩 | U4-L | U4+L | U4. | J-UL | J-EL | J-L | J+UL | J+EL | J+L | U4\| |
| | | J[UL | J[EL | J[L | | | | | | | |
| 10581 | 飪 | U4TF | U4F | JTF | U4T7 | U47 | JT7 | | | | |
| 10582 | 飯 | U4LX | JLX | | | | | | | | |
| 10583 | 媽 | TXB4 | TX5 | | | | | | | | |
| 10584 | 駃 | +KB4 | -KB4 | KB4 | +K5 | -K5 | \|KB4 | [K5 | | | |
| 10585 | 駉 | HHB4 | 22B4 | HH5 | 225 | =2B4 | ==B4 | =25 | ==5 | | |
| 10586 | 瑪 | EBS4 | EB54 | | | | | | | | |
| 10587 | 馶 | +XB4 | +X4 | +X5 | [XB4 | [X4 | \|X5 | | | | |
| 10588 | 犸 | F+B4 | F+4 | 7+B4 | 7+4 | F+5 | 7+5 | F[B4 | F[4 | 7[B4 | 7\|4 |
| | | F[5 | 7[5 | | | | | | | | |
| 10589 | 馮 | T8B4 | -3B4 | T85 | -35 | | | | | | |
| 10590 | 鴒 | 8LB4 | 8JB4 | 8L4 | 8J4 | 8-L5 | 8-J5 | 8.L5 | 8.J5 | 8L5 | 8J5 |
| 10591 | 鴿 | 8DB4 | 2DB4 | =DB4 | 8D5 | 2D5 | =D5 | | | | |
| 10592 | 騰 | LTB4 | LT5 | | | | | | | | |
| 10593 | 騰 | A-B4 | UTB4 | A-5 | UT5 | | | | | | |
| 10594 | 鴯 | CRB4 | C2B4 | C8B4 | CR4 | C24 | C84 | CR5 | C25 | C85 | C5 |
| 10595 | 脈 | LHF4 | LF4 | LH74 | L74 | | | | | | |
| 10596 | 貳 | 4H4M | 44M | QH4M | Q4M | | | | | | |
| 10597 | 倆 | U4KK | U42K | | | | | | | | |
| 10598 | 潺 | S4KK | | | | | | | | | |
| 10599 | 俘 | TUGJ | TU4J | | | | | | | | |
| 10600 | 傭 | THOH | THUH | | | | | | | | |
| 10601 | 僻 | TFKG | TFSG | TKSG | TFG | T7KG | T7SG | T7G | | | |
| 10602 | 傪 | TH4A | THUA | TX4A | TXUA | | | | | | |
| 10603 | 儸 | TBN4 | TBH2 | TBH | | | | | | | |
| 10604 | 瀝 | 2EL4 | =EL4 | | | | | | | | |
| 10605 | 匯 | CFFH | C/4H | C/H | CFFX | C/4X | C/X | | | | |
| 10606 | 叡 | TU4X | T-4X | | | | | | | | |
| 10607 | 嚅 | OTNE | OT3E | | | | | | | | |
| 10608 | 嘍 | OHEZ | | | | | | | | | |
| 10609 | 嘶 | O4-K | O4OK | | | | | | | | |
| 10610 | 噓 | OTUK | OT7K | OU7K | OHOK | | | | | | |
| 10611 | 嘰 | OG3M | OGM3 | | | | | | | | |
| 10612 | 嘲 | O4CS | O4JS | O4C | O4S | | | | | | |
| 10613 | 噭 | OBDX | OBX | | | | | | | | |
| 10614 | 噲 | O8-B | O84B | O8QB | O8B | | | | | | |
| 10615 | 噞 | O8OT | O8-T | O8-2 | O8-4 | O822 | O824 | O8T | O82 | O84 | O8 |
| | | O8B8 | | | | | | | | | |
| 10616 | 嗽 | OTBT | OTB- | OT- | | | | | | | |
| 10617 | 圖 | O4-K | O4OK | O4K | | | | | | | |
| 10618 | 圖 | O4HH | O4H | | | | | | | | |
| 10619 | 壕 | HTQY | HTQ' | IHTY | IHT' | | | | | | |
| 10620 | 墩 | HBDX | HBX | | | | | | | | |
| 10621 | 墉 | IHTZ | HTUZ | HT7Z | HU7Z | | | | | | |
| 10622 | 墎 | IH4H | H4HH | | | | | | | | |
| 10623 | 壞 | H'QK | IHQK | | | | | | | | |
| 10624 | 墜 | P2XH | P8XH | PRXH | | | | | | | |
| 10625 | 塹 | +EXH | +RXH | +XH | [EXH | [RXH | [XH | | | | |
| 10626 | 壆 | EXEH | EXUH | ;XUH | ;XH | ;UH | | | | | |
| 10627 | 嬗 | VTQB | VTQ4 | VTQ- | VTB | VT- | | | | | |
| 10628 | 嬸 | VHTQ | | | | | | | | | |
| 10629 | 嫖 | V4-K | V4OK | V4K | | | | | | | |
| 10630 | 嫂 | VAUX | VAGX | VAX | | | | | | | |
| 10631 | 嬈 | VURE | VUE | | | | | | | | |
| 10632 | 嬓 | VBDX | VBX | | | | | | | | |
| 10633 | 嬐 | V8OT | V8-T | V8-2 | V8-4 | V822 | V824 | V8T | V84 | V8B2 | V8 |
| 10634 | 嬃 | POHV | PTHV | PHV | | | | | | | |
| 10635 | 嬤 | VKNG | VHNG | VHG | VXNG | | | | | | |
| 10636 | 嫌 | VLK4 | VL24 | | | | | | | | |
| 10637 | 嬝 | V3OY | VOY | | | | | | | | |
| 10638 | 嫚 | VHHH | VHQH | VXHH | VXQH | VXH | | | | | |
| 10639 | 嶌 | UTEU | U'EU | UEU | | | | | | | |
| 10640 | 巆 | E2EM | IU2M | \2EM | | | | | | | |
| 10641 | 嶋 | EHBC | EHBJ | EHBL | EHC | EXBC | EXBJ | EXBL | EXC | IUHC | \H |
| | | \HBJ | \HBL | \HC | \XBC | \XBJ | \XBL | \XC | | | |
| 10642 | 嶬 | EQLK | EQK | IUQK | \QLK | \QK | | | | | |
| 10643 | 嶂 | E4HH | IU4H | \4HH | | | | | | | |
| 10644 | 嶠 | E4EE | E42E | IU4E | \4EE | \42E | | | | | |
| 10645 | 嶰 | EUAH | IUUH | \UAH | | | | | | | |
| 10646 | 嶮 | E8OT | E8-T | E8-2 | E8-4 | E822 | E824 | E8T | E8B2 | E8B8 | IU |
| | | IU88 | \8OT | \8-T | \8-2 | \8-4 | \822 | \824 | \8T | \8B2 | \8 |
| 10647 | 巢 | E42Y | E423 | E4KY | E4K3 | IU4Y | IU43 | \42Y | \423 | \4KY | \4 |

10648 嵤 EXEE EXUE ;XUE ;XE ;UE EUIU ;UIU EXE\ EXU\ ;XU
;X\ ;U\
10649 漪 ETEU E'EU EEU IUEU \TEU \'EU \EU
10650 鮮 EBTH EBH IUBH \BTH \BH
10651 縱 IU4M IUPM IUOM EO4M EOPM E4M EPM \U4M \UPM \4M
\PM
10652 礬 'QKE QKE QKIU 'QK\ QK\
10653 蝶 E3OY E3Y EOY UIOY UI3Y
10654 幢 EULO EUL; UIUO UIU;
10655 幣 PHUI POHE PTHE PHE
10656 幟 EFFP E/BP EFP E/P UIFP UI/P
10657 廢 LTQY LTQ' LT'
10658 廠 LHTQ
10659 廨 LPOH LPTH LPH
10660 廝 LUAH LUH
10661 廚 L8-B L84B L8QB L8B L82S L8=S
10662 彈 54-K 54OK 54K
10663 徵 'TBX ]BDX ]BX
10664 德 'T8B ]8-B ]84B ]8QB ]8B ]82S ]8=S
10665 慾 TZXG
10666 感 TPXG HPXG T4XG H4XG PTXG
10667 慾 YTKG Y2KG YK.G Y.KG YKG
10668 慷 ITUZ IT7Z IU7Z
10669 慨 I24L I2OL I2QL I4LB I4BL I4LE I4EL I4L IOLB IOB
IOLE IOEL IOL IQLB IQBL IQLE IQEL IQL
10670 憬 I2OY I3OY IOOY IOY I3Y
10671 憚 I24K I4-K I4OK I4K
10672 憫 I24H I4HH I4H
10673 憧 I2U; IULO IUL; IU;
10674 憿 I2BX IBDX IBX
10675 憤 I28T I282 I284 I8OT I8-T I8-2 I8-4 I822 I824 I8T
I82 I84 I8B2 I8B8
10676 敷 8KCG $C2G $C=G $CG 8KJG $J2G $J=G $JG 6C2G 6C=
6CG 6J2G 6J=G 6JG
10677 撚 FPOH FPTH FPH
10678 撝 FHBC FHBL FXBC FXBL
10679 撣 F4-K F4OK
10680 撤 FHCX FHX FXCX FXX
10681 撥 F4CS F4C F4JS F4J
10682 撒 FBDX FBX
10683 擊 TZSF TZXJ TX3J TXEJ TXF
10684 撲 FQLK FQK
10685 撰 FHHY FXHY
10686 擲 FFFP F/BP F/P
10687 撰 F'QK F'Q2 F'Q8 FQK FQ2 FQ8
10688 越 +XEJ +XJ [XEJ [XJ
10689 敵 KATX KOAX KAX
10690 鼓 HHOX HKOX HXOX HOTX
10691 斛 H22+ H2=+ H82+ H8=+ H2+ H8+ H22[ H2=| H82| H8=
H2[ H8[
10692 暴 BTKH BTQH BTH
10693 暾 BTZX
10694 瞳 BHUK BHU. BHK BH1 B1
10695 暢 B522 B528 B542 B548 B52 B58
10696 暸 B-4+ B-4[ B4B+ B4B[ B4+ B4[
10697 瞞 BSBP B3BP
10698 瞋 B2YH BYAH BYH
10699 瞑 BBT3 BB+3 BB3 BB[3
10700 瞬 BOQ+ BOO+ B2O+ B2Q+ BO+ BOQ[ BOO[ B2O[ B2Q[ BI
B@
10701 望 BAUH BAH
10702 朧 ATKH ATQH ATH
10703 機 YTBM YTM
10704 橦 YTKH YTQH
10705 樺 Y2YH YYAH
10706 檜 Y24B Y2QB
10707 樲 Y22M YM22 Y=2M YM=2 Y28M YM28 Y=8M YM=8 Y2M YI
YM8 Y2
10708 橫 Y+H2 Y+H8 Y+X2 Y+X8 Y+2 Y+8 Y[H2 Y[H8 Y[X2 Y
Y[2 Y[8
10709 橋 YHGM YGLM YGML
10710 標 Y4B+ Y4+ Y4B[ Y4[
10711 樺 Y+OH Y+TH Y+H Y[OH Y[TH Y[H

| | | |
|---|---|---|
| 10712 | 檝 | YT+M YTM YT[M |
| 10713 | 橛 | YLKT YLK- |
| 10714 | 橑 | YK23 YKB3 YK3 |
| 10715 | 橝 | YP3H YP4H YPH |
| 10716 | 橣 | YEKK YE2K YE1H |
| 10717 | 横 | YO-2 YO-8 YO42 YO48 |
| 10718 | 橦 | YOQ+ YOO+ Y2O+ Y2Q+ YO+ YOQ[ YOO[ Y2O[ Y2Q[ Y( Y@ |
| 10719 | 橁 | YFFC Y/CB Y/C Y/JB Y/J |
| 10720 | 橪 | YAK4 YA4 |
| 10721 | 橤 | GGGY 3GY |
| 10722 | 橐 | +OUY +UTY +U+Y +UY [OUY [UTY [U[Y [UY |
| 10723 | 橒 | Y2EO Y2KO Y2HO Y2XO Y2O |
| 10724 | 橔 | YTZX |
| 10725 | 橯 | YWWC Y2WC YWUC Y2UC YWC YHUC YKUC YXUC |
| 10726 | 橩 | YWWR YWUR YWR |
| 10727 | 橠 | YTAK YT2K |
| 10728 | 橱 | YP3Z YPZ |
| 10729 | 樲 | Y+AG Y+QG Y+SG Y+G Y[AG Y[QG Y[SG Y[G |
| 10730 | 樸 | Y3UY Y3Y |
| 10731 | 橕 | Y3UJ Y3OJ Y3J |
| 10732 | 橌 | YPPE YME |
| 10733 | 橀 | YAYQ YAQ |
| 10734 | 橆 | TEYY TE2Y E-YY E-2Y |
| 10735 | 歔 | +H2T +H8T +H2- +H8- +2UT +8UT +X2T +X2- +X8T +: +2- [H2T [H8T [H2- [H8- [2UT [8UT [X2T [X2- [ [X8- [2- |
| 10736 | 歕 | TU4T TU4- T4UT T4- |
| 10737 | 歖 | HOOT HOO- HHOT HHO- HKOT HKO- HXOT HXO- |
| 10738 | 殧 | -ATK AT3K |
| 10739 | 殨 | -AHK AHUK AHK -AH. AH. -A1 A1 |
| 10740 | 殫 | -AO+ AOQ+ AOO+ A2O+ A2Q+ AO+ -AO[ AOQ[ AOO[ A2O[ A2Q[ AO[ A@ |
| 10741 | 毇 | PPEX |
| 10742 | 毈 | EYRX ;YRX EYX ;YX |
| 10743 | 毸 | SAEL SA3L SJAL SAL |
| 10744 | 氅 | TKHL TQHL TH3L THEL |
| 10745 | 氆 | EL2B ELKB ELB 3L2B 3LKB 3LB |
| 10746 | 澭 | 3TNE 3T3E |
| 10747 | 澨 | 3YYG 3YLG 3YJG 3YG |
| 10748 | 澼 | 3+BH 3HBH 3+H 3[BH 3[H |
| 10749 | 澛 | 3HTQ |
| 10750 | 澥 | 3POH 3PTH 3PH |
| 10751 | 澫 | 34KK 342K |
| 10752 | 澰 | 3OPM 3O4M |
| 10753 | 澔 | 3OGO 3GXO 3GO 3OO |
| 10754 | 澘 | 3QAZ |
| 10755 | 澽 | 3TUZ 3T7Z 3U7Z |
| 10756 | 澸 | 3TUK 3T7K 3U7K |
| 10757 | 澺 | 3G3M 3GM3 3GM |
| 10758 | 澿 | 3FFH 3FHT 3FH 3/HT 3/H |
| 10759 | 濁 | 3FFP 3FBP 3/BP 3/P |
| 10760 | 濈 | 3UAH |
| 10761 | 澮 | 38-B 384B 38QB 38B 382S 38=S |
| 10762 | 澬 | 3TKG 3TBG 3TG |
| 10763 | 濆 | 32T2 32T8 32-2 32-8 |
| 10764 | 澤 | 3-AS 3TAS 3M8S 3MS 3-8S 3-S |
| 10765 | 濇 | 3EEG 32EG 3EG' 3EG |
| 10766 | 澯 | 3YY3 3Y23 3Y3 3YYY 32Y3 |
| 10767 | 濊 | 3OMG |
| 10768 | 濉 | 33UQ 33OQ 33E |
| 10769 | 濰 | 34TE 34'E 34E |
| 10770 | 濎 | 3HQA 3HA 3XQA |
| 10771 | 濏 | 3HCG 3XCG |
| 10772 | 濐 | 3TXY 3AXY |
| 10773 | 濋 | 342Y 34KY 3423 34K3 |
| 10774 | 澰 | 38OT 38-T 38-2 38-4 3822 3824 38T 382 384 38B: 38B8 |
| 10775 | 鼓 | HHWW HH2W 6WW 62W |
| 10776 | 燂 | W4B+ W-4+ W4+ W4B[ W-4[ W4[ |
| 10777 | 燌 | WHQ2 WHQ8 |
| 10778 | 燔 | WCRB WKKB W2KB WRRB W2RB WKB WRB |
| 10779 | 燖 | WEHJ WEOJ WEJ |

10780 爛 WOQ+ WOO+ W2O+ W2Q+ WO+ WOQ[ WOO[ W2O[ W2Q[ WO[ W嗖
10781 爆 WHHH WXHH WH-H WH-X WX-H WX-X
10782 燻 WTE4 W'E4 WE4
10783 燔 WAYQ WAQ WYQ
10784 燊 WWWY 3WY
10785 燁 W29J WKQJ W2J WKJ
10786 燏 WSJA WSA WJA
10787 燸 WEKK WE2K WEK WEA
10788 燗 WPPX WMTX WMX
10789 燠 WQH2 WQH8
10790 燿 W'KA W-KA WKOA WKA
10791 燚 WWWW 4W
10792 燛 2CUW =CUW EEW 2EW =EW
10793 犍 'FTH ZTKH ZTQH ZTH
10794 犏 'FKA Z'KA Z-KA
10795 獗 ZG3M ZGM3 ZGM
10796 獨 ZHBC ZHBJ ZHBL ZHC ZXBC ZXBJ ZXBL ZXC
10797 獯 Z4-K Z4OK
10798 獬 ZUAH ZUH
10799 獥 ZBDX ZBX
10800 獫 Z8OT Z8-T Z8-2 Z8-4 Z822 Z824 Z8T Z82 Z84 Z8B2 Z8B8
10801 獪 Z8-B Z84B Z8QB Z8B Z82S Z8=S
10802 豎 CKXE CRXE CXE. CXE
10803 璚 ESJA ESA EJA
10804 璠 EAYQ EAQ
10805 璔 E2QB E24B
10806 璒 EW-K EWOK EWK EW.
10807 璕 EEHJ EEOJ
10808 璡 ETEZ E'EZ
10809 甗 TA-Z TACZ
10810 縺 3Q+G 3Q-G 3QG 3Q[G
10811 瘯 LTDK LDTK
10812 瘰 L2-3 L2-Y L242 L24Y L-43 L-4Y L423 L4=3 L4-Y L43 L4Y
10813 瘺 L2KG LKTG LK2G LKG
10814 瘻 L2HE LHOE LHOE
10815 瘳 L2E3 LEE3 L223 LE83
10816 瘼 L2HK LHBK LHK L2XK LXBK LXK
10817 瘵 L2W3 LW23 LW3 L2WY LW-Y LWY
10818 瘲 L2TG LTTG LTG L2]G L]TG L]G
10819 瘭 L2Q3 L2QN LQN3 LQN LQ3
10820 皺 T4EX U4EX
10821 盦 8094 80Q4 80-4
10822 瞋 4U-2 4U-8 4UT2 4UT8 4UQ2 4UQ8 4U2 4U8
10823 瞞 4TUA 4QUS 4QA
10824 覷 4K4R 4+KR 4-KR 4KR 4[KR
10825 瞜 4QOV 4QOV 4QV
10826 瞛 4'TG 4TTG 4TG 4]TG 4]G
10827 瞀 H4U4 X4U4
10828 瞟 4OOG 42OG 4OG
10829 瞕 4TK+ 4TB+ 4T+ 4TK[ 4TB[ 4T[
10830 瞙 4HBK 4HK 4XBK 4XK
10831 瞘 4BS4 4B54 45
10832 磝 +EDX [EDX
10833 磩 +TYM +G3M +MTY +MG3 +TM +YM +MY +3M +M3 [TY [G3M [MTY [MG3 [TM [YM [MY [3M [M3
10834 磔 TOQ3 TOQN +QN3 +QN [QN3 [QN
10835 磪 TOEE +ETE +E'E +EE +IUE [ETE [E'E [EE [IUE TO\ +\TE +\'E +\E [\TE [\'E [\E
10836 磡 TOEA +EAA +E2A +EA [EAA [E2A [EA TO\A +\AA +\2 +\A [\AA [\2A [\A
10837 磟 TOS3 +3S3 +S83 +S3 [3S3 [S83 [S3
10838 磛 HQTO HQT+ QLTO QLT+ QTO QT+ HQT[ QLT[ QT[
10839 磁 +HLC [HLC
10840 磢 TOKX +K4X +KX [K4X [KX
10841 磃 TOLA +LKA +LA [LKA [LA
10842 磟 TOE3 +EE3 +E83 +E3 +283 +23 [EE3 [E83 [E3 [28 [23
10843 磠 TOTQ +TOY +TQ [TOY [TQ
10844 磡 -Y4E 234E =34E K4EE K42E K4E -Y42 2342 =342 K42

| | | |
|---|---|---|
| 10845 | 穇 | 'YW3 YW23 YW3 'YWY YW2Y YWY ''W23 'W=3 'W3 'W- 'WY |
| 10846 | 糜 | LYYY LY'Y LYY' L2Y' LY' |
| 10847 | 穆 | 'YS3 'Y3 '3S3 'S83 'S3 |
| 10848 | 窶 | U2QV U8QV URQV UQOV UQOV UQV |
| 10849 | 窯 | U2YG U8YG URYG UAYG UAG UYG |
| 10850 | 窳 | U2B4 U8B4 UBS4 UB54 UB4 U25 U85 U5 |
| 10851 | 窸 | U2TY U8TY URTY UTIY UTXY UTY |
| 10852 | 窺 | U2PP U8PP URPP UPPP UPP U24P U84P UR4P U4PP U4P |
| 10853 | 簟 | FF3H /3BH /3H |
| 10854 | 簩 | FFTD /T2D /TUD /TD |
| 10855 | 簪 | FFUE /UTE /U'E /UE |
| 10856 | 簙 | /EEA /EUH |
| 10857 | 篷 | FFH4 /HS4 /H4 |
| 10858 | 籅 | FF4Y /-4Y /4Y |
| 10859 | 簏 | /CEE /C2E |
| 10860 | 簲 | FFPY /P8Y /PY |
| 10861 | 簺 | FF4L /4KL /4L |
| 10862 | 簣 | FFO2 FFO8 /O42 /O48 /O2 /O8 |
| 10863 | 簇 | FFLR /LTR /LR |
| 10864 | 簀 | /H42 /H48 |
| 10865 | 簌 | FF34 FF44 /L34 /L44 /J34 /J44 |
| 10866 | 簝 | FFHF /HRF /HRJ /HF |
| 10867 | 簫 | FFCC /2CE /CC FFJJ /2JE /JJ |
| 10868 | 篟 | /TEA /TA |
| 10869 | 糒 | 2YHA YHHA YH'A YHA =YHA |
| 10870 | 糘 | 2YXS YX2S YX=S YXS =YXS |
| 10871 | 糗 | 2Y4K Y'4K Y4K. Y4.K =Y4K |
| 10872 | 糐 | 2Y+J =Y+J Y+AJ Y+J 2Y[J =Y[J Y[AJ Y[J |
| 10873 | 糨 | 2Y55 2Y25 2Y52 =Y55 =Y25 =Y52 Y252 Y55 |
| 10874 | 縺 | N2EH |
| 10875 | 繂 | NUTH NUH |
| 10876 | 縷 | NTOK NTHK NTXK |
| 10877 | 繆 | NKEZ NKZ |
| 10878 | 縛 | NLKJ NLJ |
| 10879 | 縠 | H3RX HNRX HUNX HU3X HNX |
| 10880 | 綠 | NLB3 NL3 |
| 10881 | 綪 | NQUA |
| 10882 | 縯 | NO42 NO48 |
| 10883 | 縕 | N3Q4 NQ4- NQ4 |
| 10884 | 縚 | N3AE N3A; N'3; NAE NA; |
| 10885 | 膷 | A2HN A2H3 A2N |
| 10886 | 縎 | N3BZ N'BZ NBZ |
| 10887 | 綮 | 'AX3 'AXN A-X3 A-XN ARX3 ARXN AXN3 AX3 AXN |
| 10888 | 絡 | NUEO |
| 10889 | 縍 | NT2D NTUD |
| 10890 | 縸 | N3XY NXY |
| 10891 | 練 | N3EY N3E' N3TY NE8Y N3Y' NE8' NEY NE' |
| 10892 | 緃 | N3EN NEN3 NIEN NEN NE3 |
| 10893 | 嚳 | WWUE WUHE WWE |
| 10894 | 尉 | 4P3J 4PYJ 4PJ |
| 10895 | 曐 | 4QHH 4QXH |
| 10896 | 冀 | 43QY |
| 10897 | 翲 | 2EL3 =EL3 |
| 10898 | 翳 | EETA ETOA ETHA 2TOA =TOA 2THA =THA |
| 10899 | 耪 | 2YTD =YTD |
| 10900 | 耩 | 2YEA =YEA YEUH YEEA YEA |
| 10901 | 聯 | P8SE P8S2 P2SE P2S2 -48E -482 -42E -422 48SE 48S 42SE 42S2 |
| 10902 | 膱 | ATBM ATM |
| 10903 | 膵 | A2YH AYAH AYH |
| 10904 | 膮 | A3HR AH-R AHR |
| 10905 | 膭 | A+H2 A+X2 A+H8 A+X8 A+2 A+8 A[H2 A[X2 A[H8 A[> A[2 A[8 |
| 10906 | 膳 | AHT+ AXT+ AH+ AHT[ AXT[ AH[ |
| 10907 | 膝 | AK23 AKB3 AK3 |
| 10908 | 膰 | AAYQ AAQ |
| 10909 | 膬 | ALLL A3EL A33L |
| 10910 | 膴 | ATE4 AE-4 |
| 10911 | 臙 | ATE4 A'E4 AE4 |
| 10912 | 膞 | ANBP ANP A3BP A3P |
| 10913 | 膧 | CB64 |
| 10914 | 艷 | 4YUL 4YL |

| | | | | | | | | | | | |
|---|---|---|---|---|---|---|---|---|---|---|---|
| 10915 | [illegible] | 'ATD | A-TD | AT2D | ATUD | | | | | | |
| 10916 | [illegible] | 'A2H | A2EH | A-2H | | | | | | | |
| 10917 | 艦 | 'A34 | 'A44 | A-34 | A-44 | A224 | A884 | A284 | A2K4 | AK24 | AK |
| | | A34- | A44- | A34 | A44 | | | | | | |
| 10918 | [illegible] | H3EY | X3EY | | | | | | | | |
| 10919 | [illegible] | H3QA | X3QA | | | | | | | | |
| 10920 | [illegible] | HTKH | HTQH | XTKH | XTQH | | | | | | |
| 10921 | [illegible] | H38J | X38J | | | | | | | | |
| 10922 | [illegible] | ++MS | H-AS | HTAS | HM2S' | HM=S | HMS | XTAS | XM2S | XM=S | XM |
| | | H-2S | H-=S | [[MS | | | | | | | |
| 10923 | [illegible] | H+H2 | H+H8 | H+X2 | H+X8 | X+H2 | X+H8 | X+X2 | X+X8 | X+2 | X+8 |
| | | H[H2 | H[H8 | H[X2 | H[X8 | X[H2 | X[H8 | X[X2 | X[X8 | X[2 | X[8 |
| 10924 | [illegible] | H3HR | X3HR | | | | | | | | |
| 10925 | [illegible] | HYUY | H2YU | XYUY | X2YU | | | | | | |
| 10926 | [illegible] | HL4M | HL2M | HL8M | HLM4 | HLM2 | HLM8 | XL4M | XL2M | XL8M | XLM |
| | | XLM2 | XLM8 | | | | | | | | |
| 10927 | [illegible] | HZ'E | HXLE | XZ'E | XZLE | | | | | | |
| 10928 | [illegible] | HEHJ | HEOJ | XEHJ | XEOJ | XEJ | | | | | |
| 10929 | [illegible] | HO-2 | HO-8 | HO42 | HO48 | XO-2 | XO-8 | XO42 | XO48 | | |
| 10930 | [illegible] | ++MG | HMG | XMG | [[MG | | | | | | |
| 10931 | [illegible] | HPPA | HMA | XPPA | XMA | | | | | | |
| 10932 | [illegible] | HOQ+ | HOO+ | H2O+ | H2Q+ | XOQ+ | XOO+ | X2O+ | X2Q+ | XO+ | HOQ |
| | | HOO[ | H2O[ | H2Q[ | XOQ[ | XOO[ | X2O[ | X2Q[ | XO[ | ++@ | [[@ |
| | | H@ | X@ | | | | | | | | |
| 10933 | [illegible] | HAUH | HAAH | XAUH | XAAH | | | | | | |
| 10934 | [illegible] | HYDY | XYDY | | | | | | | | |
| 10935 | [illegible] | H'YJ | HY2J | HY25 | X'YJ | XY2J | XY25 | H'2J | H'25 | X'2J | X'2 |
| 10936 | [illegible] | H'YA | HY3A | X'YA | XY3A | H'3A | X'3A | | | | |
| 10937 | [illegible] | HKOA | XKOA | | | | | | | | |
| 10938 | [illegible] | HEC4 | H;C4 | H;4 | XEC4 | X;C4 | X;4 | HEJ4 | H;J4 | XEJ4 | X;J |
| 10939 | [illegible] | HA8K | HA8S | XA8K | XA8S | | | | | | |
| 10940 | [illegible] | HZ29 | HZKQ | HZ9 | HZQ | XZ29 | XZKQ | XZ9 | XZQ | | |
| 10941 | [illegible] | H'TX | HTTX | X'TX | XTTX | H]TX | H]X | X]TX | X]X | | |
| 10942 | [illegible] | HVO3 | HVON | HV3 | HVN | XVO3 | XVON | XV3 | XVN | | |
| 10943 | [illegible] | HNBP | H3BP | XNBP | X3BP | | | | | | |
| 10944 | [illegible] | H3T2 | H3T8 | H32 | H38 | X3T2 | X3T8 | X32 | X38 | | |
| 10945 | [illegible] | HN3L | HNUL | HNDL | HNL | XN3L | XNUL | XNDL | XNL | | |
| 10946 | [illegible] | HHHX | HHPX | XHHX | XHPX | | | | | | |
| 10947 | [illegible] | ++JE | HCJE | HJE | XCJE | XJE | [[JE | | | | |
| 10948 | [illegible] | ++NN | H2N3 | H2N | X2N3 | XNN | [[NN | | | | |
| 10949 | 虢 | GMTR | MGTR | GMUR | MGUT | GMR | MGR | | | | |
| 10950 | [illegible] | TRMM | TR2M | URMM | UR2M | | | | | | |
| 10951 | [illegible] | TRTR | 2TUR | 2T7R | 2U7R | =TUR | =T7R | =U7R | | | |
| 10952 | [illegible] | TSET | TS;T | XSET | XS;T | | | | | | |
| 10953 | [illegible] | SUEO | | | | | | | | | |
| 10954 | [illegible] | SL2K | SLTK | | | | | | | | |
| 10955 | [illegible] | OSLA | SLEO | SLO | OSLO | | | | | | |
| 10956 | [illegible] | OSEY | OSE' | SE8Y | S3TY | SEY | SE' | OSEY | OSE' | | |
| 10957 | [illegible] | +B8S | HB8S | [B8S | | | | | | | |
| 10958 | [illegible] | OSL3 | SLB3 | SL3 | OSL3 | | | | | | |
| 10959 | [illegible] | OSBZ | SBKZ | SBZ | OSBZ | | | | | | |
| 10960 | [illegible] | SQUA | | | | | | | | | |
| 10961 | [illegible] | OSEK | OSE. | SE-K | SEOK | SEK | SE. | OSEK | OSE. | OS\K | OS\. |
| | | S\-K | S\OK | S\K | S\. | OS\K | OS\. | | | | |
| 10962 | [illegible] | OSQ4 | SQ4- | SQ4 | OSQ4 | | | | | | |
| 10963 | [illegible] | OSAK | SANK | SAK | OSAK | | | | | | |
| 10964 | [illegible] | A2HS | A2S | | | | | | | | |
| 10965 | [illegible] | OS4G | S'4G | S4G | OS4G | | | | | | |
| 10966 | [illegible] | OSO4 | SOS4 | SO54 | SO4 | OSO4 | | | | | |
| 10967 | [illegible] | OS4K | S'4K | S4K. | S4.K | S4K | OS4K | | | | |
| 10968 | [illegible] | OSQR | S'QR | SQRS | SQR | OSQR | | | | | |
| 10969 | [illegible] | S'BE | SB-E | SBTE | | | | | | | |
| 10970 | [illegible] | OSLR | SLTR | SLR | OSLR | | | | | | |
| 10971 | [illegible] | HUXS | H-XS | HRXS | HXOS | HXS | | | | | |
| 10972 | [illegible] | SAFS | SFOS | SFOS | SFS | SA7S | S7OS | S7OS | S7S | | |
| 10973 | [illegible] | S8SE | S2SE | S8S2 | S2S2 | S8E | | | | | |
| 10974 | [illegible] | KQ4- | KQ4 | | | | | | | | |
| 10975 | [illegible] | KSAF | KSFF | KSF | KSA7 | KS77 | KS7 | | | | |
| 10976 | [illegible] | UE8K | UEK | | | | | | | | |
| 10977 | [illegible] | TE4K | T7'K | T7K | | | | | | | |
| 10978 | [illegible] | WWUK | WUTK | WWK | WUK | | | | | | |
| 10979 | [illegible] | PWTK | 4WTK | PWK | | | | | | | |
| 10980 | [illegible] | T43K | T44K | | | | | | | | |

| | | |
|---|---|---|
| 10981 | 蹇 | TQRK TR'K TRK |
| 10982 | [illegible] | 'AXK A-XK ARXK AXTK |
| 10983 | 裕 | KU40 |
| 10984 | 褫 | KLHE KLXE KLE |
| 10985 | [illegible] | K3XY KXY |
| 10986 | [illegible] | KBEE KB2E KBE KB2 |
| 10987 | [illegible] | -OMA M-OA OMUA MOUA OMA MOA |
| 10988 | 誼 | ;U2B ;U=B ;UB- ;UB |
| 10989 | 諢 | 40UQ ;UHQ ;UQ |
| 10990 | [illegible] | 404H ;-4H ;4H |
| 10991 | 諴 | 400M 40MO ;-OM ;M-O ;OM ;MO |
| 10992 | [illegible] | ;+UH ;[UH |
| 10993 | [illegible] | 40GA ;LGA ;JGA ;GA |
| 10994 | [illegible] | ;TUE ;T7E ;U7E |
| 10995 | 諤 | 400S 4005 400C 400J ;0-S ;0-5 ;02C ;0=C ;02J ;0= |
| | | ;OS ;05 ;OC ;OJ |
| 10996 | 諟 | 40BG ;B-G ;BG |
| 10997 | [illegible] | 40QG ;QG |
| 10998 | [illegible] | ;HHH ;HXH |
| 10999 | 諞 | 40PA ;'PA ;.PA ;PA |
| 11000 | [illegible] | ;8S4 ;2S4 ;854 ;254 |
| 11001 | [illegible] | 40-Q 400Q ;-OQ ;-Q ;OQ |
| 11002 | [illegible] | 400P 4004 ;OP ;O-4 ;04 |
| 11003 | [illegible] | 40EM ;IUM ;ETA ;EM 40\M ;\TA ;\M |
| 11004 | [illegible] | 40BE ;'BE ;BE |
| 11005 | [illegible] | AZPX ZP2X ZP=X ZPCX ZPRX ZPX |
| 11006 | [illegible] | AZEA ZETA AZEM ZEM |
| 11007 | [illegible] | AZ8J Z8AJ Z8J |
| 11008 | [illegible] | 42B4 48B4 4B4 |
| 11009 | 賽 | E-42 E-48 E442 E448 |
| 11010 | [illegible] | 42U+ 42UH 42UQ 48U+ 48UH 48UQ |
| 11011 | [illegible] | 42EB 48EB 4E8B 43TB 42B 48B |
| 11012 | [illegible] | 42HM 48HM 42M 48M |
| 11013 | [illegible] | H4T2 H4T8 |
| 11014 | [illegible] | H4PX |
| 11015 | 趨 | HG29 HGKQ HG9 HGQ G29 GKQ |
| 11016 | 趧 | HGBG HGG GB-G GBG |
| 11017 | [illegible] | OGEB GE8B G3TB GEB |
| 11018 | 蹈 | OG-Q OG0Q G-OQ G-Q GOQ |
| 11019 | [illegible] | GH2L GH8L |
| 11020 | 蹀 | OGHY GHLY GHY |
| 11021 | [illegible] | OGYB GYB- GYB |
| 11022 | 踶 | OGBG GB-G GBG |
| 11023 | [illegible] | GB-C |
| 11024 | 蹄 | G'OA G'A GOA |
| 11025 | 蹁 | OGPA G'PA G.PA GPUH GPA |
| 11026 | 踰 | G8AJ G8J |
| 11027 | [illegible] | OG'W OGYW G'YW G'W GYW |
| 11028 | 軀 | 4JCV 4JV |
| 11029 | [illegible] | HQ29 HQKQ Q29 QKQ |
| 11030 | [illegible] | HQSY QSJY QSY |
| 11031 | 輻 | HQBC HQBJ HQBL QBCL QBJL QBC QBJ QBL |
| 11032 | [illegible] | HQEM QETA QEM Q1UA Q1UM |
| 11033 | 輹 | QTBX |
| 11034 | [illegible] | HQC; QC40 Q'C; QC; QJ40 Q'J; QJ; |
| 11035 | 輜 | HQL4 QL+4 QL4 QL[4 |
| 11036 | 遞 | 3HRZ H-RZ HRZ |
| 11037 | 遙 | SJAZ |
| 11038 | [illegible] | OKEZ OOEZ |
| 11039 | [illegible] | W-KZ WOKZ WKZ W.Z |
| 11040 | [illegible] | AA3L 2A3L =A3L |
| 11041 | 鄉 | 4LBP 4LEP 4BLP 4ELP OLBP OLEP OBLP OELP QLBP QLEP |
| | | QBLP QELP 4LP OLP QLP |
| 11042 | 鄒 | 3OYP OYP |
| 11043 | [illegible] | 8-BP 84BP 8QBP 82SP 8=SP |
| 11044 | 醞 | 9UR4 9ER4 9R4 |
| 11045 | 醐 | 9+OA 9[OA |
| 11046 | [illegible] | -QGA 9LGA 9JGA 9GA |
| 11047 | 醍 | -QBG 9B-G 9BG |
| 11048 | [illegible] | -QHB 9H'B 9HB |
| 11049 | [illegible] | 8KUB $.UB $UB 6.UB 6UB |
| 11050 | [illegible] | $TOZ 6TOZ |
| 11051 | 錐 | $2HL $2L 62HL 62L |

11052 鋏 8KWW 8K2W $WW $2W 6WW 62W
11053 錆 8KEA $IEA $EA 6IEA 6EA
11054 [illegible] 8K2U 8K=U $-U- $2U $=U 6-U- 62U 6=U
11055 [illegible] 8KHB $H'B $HB 6H'B 6HB
11056 [illegible] 8KYT $YTT $Y2T $YT 6YTT 6Y2T 6YT
11057 [illegible] 8KK3 8KKY $K23 $K=3 $K-Y $KY $K3 6K23 6K=3 6K-Y
6KY 6K3
11058 鋅 $K+H $KH $K+X $KX 6K+H 6KH 6K+X 6KX $K[H $K[X
6K[H 6K[X
11059 [illegible] 8K4X $4X 64X
11060 鋼 8KPJ $PJO $PJ 6PJO 6PJ
11061 [illegible] 8KQY $QY 6QY
11062 [illegible] 8KPP 8K2P $PP $2P 6PP 62P
11063 銅 $UHO 6UHO
11064 鉛 8KDE 8KUE 8KD; 8KU; $DE $UE $D; $U; 6DE 6UE
6D; 6U;
11065 [illegible] 8KQ4 8KQ+ $'Q4 $'Q+ $Q4 $Q+ 6'Q4 6'Q+ 6Q4 6Q+
8KQ[ $'Q[ $Q[ 6'[+ 6Q[
11066 鋌 8KGZ $'GZ $GZ 6'GZ 6GZ
11067 [illegible] 8KU3 8KUY $U23 $U=3 $U-Y $U3 $UY 6U23 6U=3 6U-Y
6U3 6UY
11068 [illegible] $UAL 6UAL
11069 [illegible] 8K2R $2ER $2R 62ER 62R
11070 [illegible] 8KEK $E-K $EK 6E-K 6EK
11071 [illegible] 8KPX 8K4X $PX $-4X $4X 6PX 6-4X 64X
11072 [illegible] 8K6 $H2H $H8H $HRH $6 6H2H 6H8H 6HRH 66
11073 [illegible] 8KHX $H2X $H8X $HRX $HX 6H2X 6H8X 6HRX 6HX
11074 [illegible] 8KHK 8KH2 8KH8 $H2K $H=K $H22 $H=2 $H28 $H=8 $HK
6H2K 6H=K 6H22 6H=2 6H28 6H=8 6HK
11075 [illegible] $3U0 63U0
11076 [illegible] 8KBB 8K2B $BB $2B 6BB 62B
11077 [illegible] 8KGA $GA 6GA
11078 [illegible] $HTF $HT7 $XTF $XT7 6HTF 6HT7 6XTF 6XT7
11079 [illegible] 8KQK 8KQ2 8KQ8 $UHK $QK $Q2 $Q8 6UHK 6QK 6Q2
6Q8
11080 [illegible] 8K3B $3B 8K4B $4B 63B 64B
11081 [illegible] 8KEH $ELH $EH 6ELH 6EH 8K\H $\LH $\H 6\LH 6\H
11082 [illegible] 8KAA 8K2A $AA $2A 6AA 62A
11083 [illegible] $CHE $JHE 6CHE 6JHE $CH\ $JH\ 6CH\ 6JH\
11084 [illegible] 8KKB $'KB $KB 6'KB 6KB
11085 [illegible] 8K8A $8-A $8A 68-A 68A
11086 [illegible] EX8K EXK EX$ EX6
11087 [illegible] YX8K TYX$ G3X$ YX$ TYX6 G3X6 YX6
11088 [illegible] MTD2 MTD= MDT2 MDT= MD82 MD8= MT2 MT= MD2 MD=
11089 [illegible] PPHB MH'B MHB
11090 [illegible] PPOM PPMO MO-M MMO- MOM MMO
11091 [illegible] MKQL MKL
11092 [illegible] MBTX MBX
11093 [illegible] PPBB PP2B MBB M2B
11094 [illegible] MAUX MAX
11095 [illegible] PPTE PP'E M'E
11096 [illegible] PPKB M'KB MKB
11097 [illegible] P'QK P'Q2 P'Q8 PQK PQ2 PQ8
11098 [illegible] 'E'E TETE
11099 [illegible] -A-V -A+V -A[V TA-V TA+V TA[V M-EV M+EV M[EV M+V
M[V --EV -+EV -[EV --V -+V -[V
11100 [illegible] -S8L -S8J TS8L TS8J MS8L MS8J
11101 [illegible] -A3S TA3S M35S M3S
11102 [illegible] H+OA H[OA
11103 [illegible] TIX+ TXH+ TX+ TIX[ TXH[ TX[
11104 [illegible] H+UR H+DR H[UR H[DR
11105 [illegible] TXEE AXEE AX2E TXE- AXE-
11106 [illegible] TBXE
11107 [illegible] EOT2 EOT8 EO2 EO8
11108 [illegible] AHT2 AHT8 AXT2 AXT8
11109 [illegible] EZT2 EZT8 EZ2 EZ8
11110 [illegible] 8SWW 8S2W 8SW 8FWW 8F2W 8FW 87WW 872W 87W 8WW
82W
11111 [illegible] 8S4X 8SX 8F4X 8FX 874X 87X 84X
11112 [illegible] 8SYV 8SV 8FYV 8FV 87YV 87V 8'YV 8YV 8S'V 8F'V
87'V 8'V
11113 [illegible] 8S8T 8F8T 878T 88TT 88T
11114 [illegible] YB+Z 'B+Z YB[Z 'B[Z

| | | | | | | | | | | | | |
|---|---|---|---|---|---|---|---|---|---|---|---|---|
| 11115 | 駮 | 7T2X | 7T8X | | | | | | | | | |
| 11116 | 駬 | E4-4 | E4P | 7-4 | 7P | | | | | | | |
| 11117 | 駇 | E4+M | E4M+ | E4M | 7+M | 7M+ | 7M | E4[M | E4M[ | 7[M | 7M[ | |
| 11118 | 駤 | E4SH | 7-SH | 7SH | | | | | | | | |
| 11119 | 駰 | E4OK | 7OK | 7OK | | | | | | | | |
| 11120 | 駣 | E4KK | 7KKL | 7KK | 72K | | | | | | | |
| 11121 | 駪 | E4HR | 7'HR | 7HR | | | | | | | | |
| 11122 | 駩 | E48E | 78E | | | | | | | | | |
| 11123 | 駧 | 7U-O | | | | | | | | | | |
| 11124 | 齩 | QATX | QAX | | | | | | | | | |
| 11125 | 齝 | QA2H | | | | | | | | | | |
| 11126 | 齜 | QAGF | QAF | QAG7 | QA7 | | | | | | | |
| 11127 | 齮 | QAKS | QAK5 | | | | | | | | | |
| 11128 | 鬐 | ES3P | ES34 | E3-4 | E3P | D-4 | | | | | | |
| 11129 | 鬙 | ES3O | E3'O | E3HO | E3O | D'+O | D-+O | DH1O | DHO | D'[O | D-[O | |
| 11130 | 鬆 | E3TY | DTY | | | | | | | | | |
| 11131 | 鬠 | ES3Q | E3OH | E3OH | DOH | DOH | DQ | | | | | |
| 11132 | 麠 | T7-A | T7OA | TU7A | T7A | U7-A | U7OA | U7A | | | | |
| 11133 | 鮀 | U4UF | U4F | J.UF | JUF | U4U7 | U47 | J.U7 | JU7 | | | |
| 11134 | 鮅 | U4G' | U4G | JG' | | | | | | | | |
| 11135 | 鮇 | U4+Y | U4-Y | U4Y | J+Y | J-Y | JY | U4[Y | J[Y | | | |
| 11136 | 鮭 | U4HS | U4S | JIHS | JHS | | | | | | | |
| 11137 | 鮏 | U423 | U4=3 | J-3- | J23 | J=3 | | | | | | |
| 11138 | 鮃 | U4QI | JQI | | | | | | | | | |
| 11139 | 鮂 | U4OT | U4OT | U4Q | JOT | JOT | JQ | | | | | |
| 11140 | 鮓 | U4TK | U4'E | U4E | JTI2 | JTI= | JTK | J'E | JE | | | |
| 11141 | 鮒 | U4TJ | JT-J | JTJ. | JTJ | | | | | | | |
| 11142 | 鮐 | U4SO | JSO | | | | | | | | | |
| 11143 | 魺 | U4JO | U4J | J-JO | JJO | | | | | | | |
| 11144 | 鮎 | U4+O | J+O | U4[O | J[O | | | | | | | |
| 11145 | 魽 | U4H2 | U4H= | U4H- | JH2 | JH= | JH- | | | | | |
| 11146 | 鮈 | U4CO | J'CO | JCO | J'JO | | | | | | | |
| 11147 | 駥 | B4U8 | B48 | 5.U8 | 5U8 | | | | | | | |
| 11148 | 鴗 | TKB4 | T2-5 | TK5 | | | | | | | | |
| 11149 | 鴠 | B-B4 | B-5 | | | | | | | | | |
| 11150 | 鴞 | OSB4 | O5B4 | O-C5 | O-J5 | OS5 | O55 | | | | | |
| 11151 | 鴟 | 'ZB4 | -ZB4 | TZB4 | ZB4 | 'Z5 | -Z5 | TZ5 | Z5 | | | |
| 11152 | 鴙 | TKB4 | '+K5 | '-K5 | TK5 | '[K5 | | | | | | |
| 11153 | 鴚 | COB4 | CO4 | 'CO5 | CO5 | JOB4 | 'JO5 | JO5 | | | | |
| 11154 | 鴘 | SHB4 | SXB4 | SH4 | S2O5 | S++5 | SH5 | SX5 | S[[5 | | | |
| 11155 | 鴢 | NCB4 | NC4 | NC'5 | NC5 | NJB4 | NJ4 | NJ'5 | NJ5 | | | |
| 11156 | 鴐 | COB4 | CO4 | C'O5 | CO5 | JOB4 | J'O5 | JO5 | | | | |
| 11157 | 鴙 | TKB4 | '-K5 | TK5 | | | | | | | | |
| 11158 | 鴎 | K-B4 | K.B4 | K.4 | K.5 | | | | | | | |
| 11159 | 麆 | LHFE | LF.E | LFE | LH7E | L7.E | L7E | | | | | |
| 11160 | 麈 | LFA- | LF4- | LHF4 | LF4 | L7A- | L74- | LH74 | L74 | | | |
| 11161 | 麋 | LF'Y | LHFY | LHY | LFY | L7'Y | LH7Y | L7Y | LHF' | LH' | LF' | |
| | | LH7' | L7' | | | | | | | | | |
| 11162 | 麮 | KAHS | KAS | | | | | | | | | |
| 11163 | 麭 | KACL | KAUL | KAL | | | | | | | | |
| 11164 | 黕 | 44UR | 44ER | Q4UR | Q4ER | Q4R | | | | | | |
| 11165 | 黗 | 44CR | Q4CR | Q4R | | | | | | | | |
| 11166 | 黺 | 4A2D | 4A8D | 4AD | | | | | | | | |
| 11167 | 黼 | J4KK | J42K | J4K | | | | | | | | |
| 11168 | 鼽 | 4QH9 | 4H9 | 4QK9 | 4K9 | 4QX9 | 4X9 | | | | | |
| 11169 | 儦 | TLH4 | TLF4 | TJ74 | | | | | | | | |
| 11170 | 儨 | TH42 | TH48 | | | | | | | | | |
| 11171 | 儵 | TTUG | TT7G | TTQG | | | | | | | | |
| 11172 | 儠 | TBH3 | TBH4 | TB3 | | | | | | | | |
| 11173 | 儆 | T34L | T3QL | T3L | | | | | | | | |
| 11174 | 儑 | T42C | T48C | T4BC | | | | | | | | |
| 11175 | 勸 | TUGC | TQGC | T7GC | U7GC | UQGC | TGC | UGC | | | | |
| 11176 | 嗓 | OUW3 | OUWY | OU3 | | | | | | | | |
| 11177 | 嚌 | OTDH | OTKH | OTXH | OTX2 | O.XH | O.X2 | | | | | |
| 11178 | 嚍 | OEH4 | OE44 | | | | | | | | | |
| 11179 | 嚆 | OHTA | OHA | OXTA | OXA | | | | | | | |
| 11180 | 嚄 | OHEX | OXEX | | | | | | | | | |
| 11181 | 嚁 | O4ZZ | O43Z | O44Z | | | | | | | | |
| 11182 | 嚐 | OUTB | | | | | | | | | | |
| 11183 | 嚂 | OEF4 | | | | | | | | | | |
| 11184 | 嘽 | OEE+ | O2E+ | OET+ | OE+ | O2+ | OEE[ | O2E[ | OET[ | OE[ | O2[ | |
| 11185 | 嚠 | OEEE | O2EE | O2TE | O2'E | | | | | | | |
| 11186 | 壩 | H-AA | H-AM | HTAA | HTAM | HMTA | HMM | [H-A | [H-M | [HMA | [HMM | |
| | | H-TA | H-M | | | | | | | | | |

| | | |
|---|---|---|
| 11187 | 壔 | HHLJ HHJJ HE'J H3'J 1HEJ |
| 11188 | 壚 | 1HE4 HEF4 |
| 11189 | 壗 | HHH4 HXH4 |
| 11190 | 嬭 | V-2A V-8A VT2A VT8A VKUX VKU4 VK1A VKA |
| 11191 | 嬥 | VEEE V2EE VEE V2TE V2'E V2E |
| 11192 | 嬲 | QCVC QVC |
| 11193 | 嬉 | VUGJ VUJ |
| 11194 | 嬬 | V-AA V-AM VTAA VTAM VMTA VMA VMM V-TA V-M |
| 11195 | 嬨 | VEH4 VE44 |
| 11196 | 嬦 | VHLJ VHJJ VHHJ VHJ VE'J V3'J |
| 11197 | 嬏 | VHOH VHUH |
| 11198 | 嬖 | LBKV LKV |
| 11199 | 孻 | ZEH4 Z'E4 ZE-4 ZE44 ZE4 |
| 11200 | 寱 | UK4Y |
| 11201 | 嶷 | UKSG UFKG UFG U7KG U7G |
| 11202 | 嶷 | EKSG EFKG EFG E7KG E7G 1UFG 1U7G 1UKG \KSG \FKG \FG \7KG \7G |
| 11203 | 嶹 | EHLJ EHJJ EE'J E3'J U1HJ U1EJ |
| 11204 | 巇 | EHUZ EXUZ U1HZ U1XZ |
| 11205 | 徹 | TEOX TE;X ]EOX ]E;X T\OX T\;X ]\OX ]\;X |
| 11206 | 憋 | HECG |
| 11207 | 憷 | POHG PTHG |
| 11208 | 憖 | HCXG HJXG HOXG HXG XCXG XJXG XOXG XXG |
| 11209 | 懌 | I2UJ IUGJ IU4J |
| 11210 | 懠 | I2TH ITDH ITH ITXH 1TX2 1.XH 1.X2 |
| 11211 | 懂 | I+UG I+QG I+G I[UG 1[QG 1[G |
| 11212 | 懤 | IHLJ IHJJ IE'J I3'J |
| 11213 | 懨 | ILBK |
| 11214 | 懮 | IHUZ IXUZ |
| 11215 | 擯 | FU32 FU38 FU2 FU8 |
| 11216 | 擩 | F-AA F-AM FTAA FTAM FMTA FMM F-TA F-M |
| 11217 | 擣 | FHLJ FHJJ FE'J F3'J |
| 11218 | 擫 | FLBK |
| 11219 | 擠 | F4QH F4QK F4QX F4H |
| 11220 | 擻 | FLRT FLR- |
| 11221 | 斅 | 4HHX 4HTX |
| 11222 | 斃 | 4CTX 4JTX 4CSX 4JSX 4STX 4CX 4JX 4SX |
| 11223 | 旝 | LT4C LT4J LT4S T4CS T4JS |
| 11224 | 旚 | TDT3 TDTY DT43 DT4Y DT3 |
| 11225 | 曒 | BBDX BBX |
| 11226 | 檫 | YTKG YTBG |
| 11227 | 檨 | Y2ZZ YKZZ YZZ |
| 11228 | 檏 | YTQY YTQ' YT'. |
| 11229 | 檥 | Y2EM |
| 11230 | 樫 | YPOE Y4OE YPE Y4E |
| 11231 | 檟 | Y-42 Y442 Y-48 Y448 Y-8 |
| 11232 | 檛 | YQAZ |
| 11233 | 檸 | Y4HH Y4H |
| 11234 | 檞 | YUAH |
| 11235 | 檇 | YTEU Y'EU YEU |
| 11236 | 檓 | YEHX Y;HX Y;X |
| 11237 | 檎 | Y8TA Y8QA |
| 11238 | 檕 | +EXY +RXY [EXY [RXY |
| 11239 | 檃 | PAEY PEY |
| 11240 | 檪 | Y2ET Y2E- |
| 11241 | 檑 | YK4Z YKZ |
| 11242 | 檣 | Y-AQ YTAQ YMQ Y-Q |
| 11243 | 檶 | Y-Q- Y-QQ YQ-Q YQQ- Y3QQ YQQ |
| 11244 | 檝 | Y43J Y4YJ Y4J |
| 11245 | 檤 | Y2YG YYYG |
| 11246 | 檬 | YG3M YGM3 YGM |
| 11247 | 檷 | Y4EE Y42E Y4E |
| 11248 | 歛 | YYRS 2YRS =YRS YYR 2YR =YR |
| 11249 | 歘 | 8OTT 8OT- 8-TT 8-T- 8TUT 8TT 8T- |
| 11250 | 殭 | -A-Q -AQ- -AQQ -A3Q A-Q- A-QQ AQ-Q AQQ- A3QQ AQQ |
| 11251 | 氈 | 3OYL 3Y3L 3YEL OY3L OYEL 3YL OYL |
| 11252 | 氊 | HQHB HH3B HH4B HQ3B HQ4B |
| 11253 | 濴 | EXE3 EXU3 ;XU3 ;X3 ;U3 EXE4 EXU4 ;XU4 ;X4 EU4 |
| 11254 | 濼 | 3WW3 3WW4 3WU3 3WU4 3W3 3W4 |
| 11255 | 濔 | 3-2A 3-8A 3T8A 3KUX 3KA |
| 11256 | 濍 | 3+B+ 3HB+ 3[B[ 3HB[ |
| 11257 | 瀘 | 3EH4 3E44 |
| 11258 | 濜 | 3HH4 3XH4 |

| | | |
|---|---|---|
| 11259 | 澍 | 34EJ |
| 11260 | 潺 | 3AHG 3AEG 3AG |
| 11261 | 澳 | 34QH 34QK 34QX |
| 11262 | 澱 | 3HYX 3H'X |
| 11263 | 濂 | 3H83 3H8N 3HN 3H3 |
| 11264 | 澤 | 3EE+ 3ET+ 32T+ 32+ 3EE[ 3ET[ 32T[ 32[ |
| 11265 | 澇 | 3HNG 3H2G 3KNG 3K2G 3XNG 3X2G 3HG 3XG |
| 11266 | 燁 | W4HH |
| 11267 | 燎 | WTKG WTBG WTG |
| 11268 | 燐 | W2EM W2FM W2M |
| 11269 | 燴 | WC42 WC48 WC2 WC8 |
| 11270 | 燭 | WHQA WHA WXQA WXA |
| 11271 | 燮 | WAUX WAGX WAX |
| 11272 | 毀 | EXEW EXUW ;XUW EXW ;XW EUW ;UW |
| 11273 | 獼 | Z-AA Z-AM ZTAA ZMTA ZTAM ZMA ZTM ZMM Z-TA Z-M |
| 11274 | 獨 | Z-2A Z-8A ZT2A ZT8A ZKUX ZKU4 ZKIA ZKA |
| 11275 | 獲 | ZHQ4 ZH4 |
| 11276 | 縈 | 3BCE |
| 11277 | 璣 | E2ZZ EKZZ |
| 11278 | 璜 | E3UQ E3OQ E3E |
| 11279 | 璘 | EOGO EGXO EOO EGO |
| 11280 | 璨 | E3OY EOY |
| 11281 | 璵 | EUQZ |
| 11282 | 璲 | EEEG E2EG |
| 11283 | 璬 | EHCX EHJX EHOX EXCX EXJX EXOX |
| 11284 | 璯 | CBDO |
| 11285 | 甑 | YAHZ YH-Z YHCZ |
| 11286 | 甌 | 24BZ 2QBZ 84BZ 8QBZ 2B-Z 2BCZ 2BZ =4BZ =QBZ =B-Z |
| | | =BCZ =BZ |
| 11287 | 甎 | TE4Z T4-Z T4CZ E4-Z E4CZ E-4Z |
| 11288 | 甏 | HK3Z H3-Z H3CZ H3Z |
| 11289 | 疄 | Q2YH QYAH QYH |
| 11290 | 癃 | L2PE LPXE LPE |
| 11291 | 癈 | L2WX LW5X |
| 11292 | 瘴 | L20+ LOQ+ LOO+ L2Q+ LO+ L20[ LOQ[ LOO[ L2Q[ LO[ |
| | | L2● L● |
| 11293 | 瘸 | LPPA L2MA LMA |
| 11294 | 皤 | 'BAQ 'BYQ BAYQ BAQ BYQ |
| 11295 | 盩 | HHX4 HX4- |
| 11296 | 瞵 | 42YH 4YAH 4YH |
| 11297 | 瞶 | 4-4+ 4-B+ 44B+ 44+ 4-4[ 4-B[ 44B[ 44[ |
| 11298 | 瞧 | 4SJA 4SA |
| 11299 | 瞯 | 4PPB 4MB |
| 11300 | 瞲 | 40-2 40-8 4042 4048 402 408 |
| 11301 | 瞴 | 4TE4 4E-4 4E4 |
| 11302 | 瞤 | 4HHH 4HXH 4XXH |
| 11303 | 瞨 | 44KK 442K 44K2 4422 44K8 4428 |
| 11304 | 矰 | TK2B TK8B K24B K2QB |
| 11305 | 磳 | TO2B TO8B +24B +2QB +84B +8QB [24B [2QB [84B [8QB |
| 11306 | 磽 | TOHR +3HR +H-R +HR [3HR [H-R [HR |
| 11307 | 磯 | +HOO +HKO +HHO +HXO [HOO [HKO [HHO [HXO |
| 11308 | 磻 | TOAQ TOYQ +AYQ +AQ +YQ [AYQ [AQ [YQ |
| 11309 | 磼 | TOEY +TEY +'EY +EY [TEY ['EY [EY |
| 11310 | 礀 | LYYO L2YO LYY+ LYY[ L2Y+ L2Y[ LYO LY+ LY[ |
| 11311 | 礫 | +3EY +3Y [3EY [3Y |
| 11312 | 磝 | +TZX [TZX |
| 11313 | 礐 | +-4+ +4B+ +-+ +4+ [-4[ [4B[ [-[ [4[ |
| 11314 | 礑 | CE99 |
| 11315 | 礌 | +'KA +KOA +KA ['KA [KOA [KA |
| 11316 | 禫 | 23-+ 234+ -Y-+ -Y4+ K-4+ K4B+ K4+ =3-+ =34+ 23- |
| | | 234[ -Y-[ -Y4[ K-4[ K4B[ K4[ =3-[ =34[ |
| 11317 | 禨 | 23NM -YNM KNNM KNTM KNKM KNMT KNMK KNM =3NM |
| 11318 | 穜 | 'YTH 'TKH 'TQH 'TH |
| 11319 | 穛 | 'YE4 'TE4 ''E4 |
| 11320 | 穖 | 'YNM 'NNM 'NTM 'NMT 'NKM 'NMK YNNM YNTM YNMT YNKM |
| | | YNMK |
| 11321 | 穘 | 'YHR '3HR |
| 11322 | 穔 | 'HQ2 'HQ8 |
| 11323 | 穚 | 'YKA ''KA '-KA 'KOA 'KA |
| 11324 | 窾 | U2HT U2H- UH3T UH3- UHYT UHY- UHT UH- U8HT U8H- |
| | | U8T URHT URH- URT |
| 11325 | 窺 | U2GR UG4R U8GR U8R URGR URR |
| 11326 | 窸 | U23L U2EL U83L U8EL UR3L UREL |

11327 [illegible] /TXE /T2E /TLE
11328 [illegible] /LHF /L7F /LF /L7
11329 [illegible] /EEE /2EE /EC- /EE /2C- /2E
11330 [illegible] /E42 /E48 /E2 /E8
11331 [illegible] /+QJ /+SJ /+AJ /+J /[QJ /[SJ /[AJ /[J
11332 [illegible] /-43 /-4Y /423 /4=3 /4-Y /-3 /43
11333 [illegible] /FHB /FB
11334 [illegible] FFZZ /ZLZ /ZZ
11335 [illegible] FFB4 /BK4 /B4
11336 [illegible] /QHH /QXH
11337 [illegible] FFOM FFOE FFOE /OOM /OOM /OM /OE. /OE /OE. /OE
11338 [illegible] /HOZ /HZ
11339 [illegible] /'YA /YAA /YA /'AA /'2A /'A
11340 [illegible] /'TG /TGG /]GG /]G
11341 [illegible] FFS3 FF3 /3S3 /S83 /S3 /3
11342 [illegible] /'TP /THP /TGP /]HP /]GP /]P
11343 [illegible] /U2X /U=X /URX /UX
11344 [illegible] /TOP /TP
11345 [illegible] FFTA FFQA /TUA /TA /QA
11346 [illegible] FFQT FFQ- /HQT /HQ- /OUT /QT /Q-
11347 [illegible] /H8H
11348 [illegible] 2Y5S =Y5S Y5OS Y5SS Y5S
11349 [illegible] NTUA NTQA NQUS
11350 [illegible] N3TG N3DG NTDG NDTG NTG NDG
11351 [illegible] N3T+ NTN+ NT+ N3T| NTN[ NT[
11352 [illegible] N+QJ N+SJ N+J N[QJ N[SJ N|J
11353 [illegible] FNT2 FNT8 FN2 FN8 7NT2 7NT8 7N2 7N8
11354 [illegible] N3HK NHBK NHK
11355 [illegible] N3QH NQHH NQXH NQH
11356 [illegible] N4KK N42K
11357 [illegible] NETE NE'E NEE NIUE
11358 [illegible] AE'3 AE-3 AE'N AE-N AEN
11359 [illegible] N3W3 N3WY NW23 NW=3 NW-Y NW3 NWY
11360 [illegible] N3QX NQ2X NQ8X NQRX NQX
11361 [illegible] N3TG N'TG NTGG NTG N3|G N|GG N|G
11362 [illegible] LYY3 L2Y3 LYYN L2YN LYN3 LY3
11363 [illegible] HH93 HH9N H9N3 H93 H9N
11364 [illegible] CXN3 CKX3 CKXN CRX3 CRXN CX3 CXN
11365 [illegible] N3QZ NHQZ BQZ
11366 [illegible] HETJ HEUJ
11367 [illegible] 4TKH 4TQH 4THI 4TH
11368 [illegible] 424B 42QB 42B
11369 [illegible] 4LWJ 4LJ
11370 [illegible] EEQZ 2EQZ 2HQZ 2QZ =EQZ =HQZ =QZ
11371 [illegible] 43EE 432E 4YEE 4Y2E 423E 4-YE -43E -4YE -432 -4Y2
432 4Y2
11372 [illegible] =YQV =YV 2YQV 2YV
11373 [illegible] ATQB ATQ-
11374 [illegible] ATUZ AT7Z AU7Z
11375 [illegible] AHKX
11376 [illegible] A3OY AOY
11377 [illegible] A4CS A4JS A4C
11378 [illegible] ATEU A'EU AEU
11379 [illegible] AQAZ AQZ
11380 [illegible] EEK2 =EK2 2EK2
11381 [illegible] 'AQV A-QV AQOV AQOV AQV
11382 [illegible] 'AHB 'AQB A-HB A-QB AHQB AQB
11383 [illegible] 'AEE 'AHE A-EE A-HE AEUE AHUE
11384 [illegible] H3TA X3TA
11385 [illegible] H3Q4 X3Q4
11386 [illegible] HTKG HTBG HTG XTKG XTBG XTG
11387 [illegible] HTOF HTUF HTO7 HTU7 XTOF XTUF XTO7 XTU7
11388 [illegible] HLK4 HL4 HL24 XLK4 XL4 XL24
11389 [illegible] HWT2 HWT8 HW2 HW8 XWT2 XWT8 XW2 XW8
11390 [illegible] H2T2 H2-2 H2T8 H2-8 X2T2 X2-2 X2T8 X2-8 X22 X28
11391 [illegible] HTKX XTKX
11392 [illegible] HES2 HES8 HE2 HE8 XES2 XES8 XE2 XE8
11393 [illegible] ++AE H-AE H-A- HAEE HAE- HAE X-AE X-A- XAEE XAE-
XAE [[AE
11394 [illegible] H-AC HABC X-AC XABC XAC
11395 [illegible] H-AK H-A8 HA8K HA8S X-AK X-A8 XA8K XA8S
11396 [illegible] HSJ2 HSJ8 HS2 HS8 HJT2 HJT8 HJ2 HJ8 XSJ2 XSJ8
XS2 XS8 XJT2 XJT8 XJ2 XJ8

| | | | | | | | | | | | |
|---|---|---|---|---|---|---|---|---|---|---|---|
| 11397 | [illegible] | HESH | XESH | | | | | | | | |
| 11398 | [illegible] | HG3M | XG3M | | | | | | | | |
| 11399 | [illegible] | H4KK | H42K | X4KK | X42K | | | | | | |
| 11400 | [illegible] | HOPM | HO4M | XOPM | XO4M | | | | | | |
| 11401 | [illegible] | HPXZ | HPZ | XPXZ | XPZ | | | | | | |
| 11402 | [illegible] | HOGO | HGXO | XOGO | XGXO | XGO | | | | | |
| 11403 | [illegible] | H4UM | HUTM | H4M | X4UM | XUTM | X4M | | | | |
| 11404 | [illegible] | HQAZ | HJ.Z | XQAZ | XJ.Z | | | | | | |
| 11405 | [illegible] | HAUX | HAGX | XAUX | XAGX | | | | | | |
| 11406 | [illegible] | HAAL | HHOL | XAAL | XHOL | | | | | | |
| 11407 | [illegible] | ++KE | HTKE | HKE | XTKE | XKE | [[KE | | | | |
| 11408 | [illegible] | HULO | HUL; | XULO | XUL; | | | | | | |
| 11409 | [illegible] | ++QK | H'QK | X'QK | XQK | [[QK | | | | | |
| 11410 | [illegible] | HUAH | XUAH | | | | | | | | |
| 11411 | [illegible] | HBDX | HBX | XBDX | XBX | | | | | | |
| 11412 | [illegible] | H8-B | H84B | H8QB | H82S | H8=S | X8-B | X84B | X8QB | X82S | X8=S |
| | | X8B | | | | | | | | | |
| 11413 | [illegible] | HVLJ | HVJ | XVLJ | XVJ | | | | | | |
| 11414 | [illegible] | HTNE | XTNE | | | | | | | | |
| 11415 | [illegible] | H-AS | HTAS | HM8S | H-8S | X-AS | XTAS | XM8S | X-8S | | |
| 11416 | [illegible] | HHEZ | HHZ | XHEZ | | | | | | | |
| 11417 | [illegible] | H'YX | HYHX | X'YX | XYHX | H'HX | H'X | X'HX | X'X | | |
| 11418 | [illegible] | ++8T | ++84 | H8OT | H8-T | H822 | H824 | H8T | H8B2 | H8B8 | X8OT |
| | | X8-T | X8-2 | X8-4 | X822 | X824 | X8T | X84 | X8B2 | X8B8 | [[8T |
| | | [[84 | | | | | | | | | |
| 11419 | 彪 | TUY3 | T7Y3 | U7Y3 | TYY3 | UYY3 | | | | | |
| 11420 | [illegible] | SU-2 | SU-8 | SUT2 | SUT8 | SUQ2 | SUQ8 | SU2 | SU8 | | |
| 11421 | [illegible] | ST2A | STUO | | | | | | | | |
| 11422 | [illegible] | STUA | STQA | SQUS | | | | | | | |
| 11423 | [illegible] | OSL4 | SLH4 | SL4 | OSL4 | | | | | | |
| 11424 | [illegible] | OSLF | SLHF | SLF | OSLF | OSL7 | SLH7 | SL7 | OSL7 | | |
| 11425 | [illegible] | OSQB | SHQB | SQB | OSQB | | | | | | |
| 11426 | [illegible] | OSQT | SHQT | SQLT | SQT | OSQT | | | | | |
| 11427 | 螺 | OS-Y | OS43 | OS4Y | S-43 | S-4Y | S423 | S4=3 | S4-Y | S-Y | S43 |
| | | S4Y | OS-Y | OS43 | OS4Y | | | | | | |
| 11428 | [illegible] | OSHE | SHOE | SHE | OSHE | | | | | | |
| 11429 | [illegible] | OSEE | SEUE | SHUE | SEE | OSEE | | | | | |
| 11430 | [illegible] | OSE3 | SE83 | SEE3 | SE3 | OSE3 | S283 | | | | |
| 11431 | [illegible] | OSBX | SB4X | SBX | OSBX | | | | | | |
| 11432 | [illegible] | OSBY | SBSY | SB5Y | SBY | S5Y | USBY | OS5Y | | | |
| 11433 | [illegible] | OSQG | S'QG | SQG | OSQG | | | | | | |
| 11434 | [illegible] | LQ4S | LQ+S | LQS | L4OS | L4OS | L4S | L+OS | L+OS | L+S | LQ[S |
| | | L[OS | L[OS | L[S | | | | | | | |
| 11435 | [illegible] | EDXS | ETXS | | | | | | | | |
| 11436 | [illegible] | HH9S | H9OS | H9OS | | | | | | | |
| 11437 | [illegible] | SJSS | SJOS | SJOS | SJ2S | | | | | | |
| 11438 | [illegible] | PYQS | PYBS | PYOS | PYOS | | | | | | |
| 11439 | [illegible] | CCSS | CC2S | ESS | E2S | | | | | | |
| 11440 | [illegible] | KAJS | KJOS | KJOS | | | | | | | |
| 11441 | [illegible] | 4OTS | 4O-S | 2TOS | 8TOS | 2-OS | 8-OS | =TOS | =-OS | | |
| 11442 | [illegible] | X2SS | X22S | X=SS | X=2S | | | | | | |
| 11443 | [illegible] | 3AXS | 3XOS | 3XOS | | | | | | | |
| 11444 | [illegible] | SU2S | SU8S | SURS | SUSH | | | | | | |
| 11445 | [illegible] | KTUA | KTQA | KQUA | | | | | | | |
| 11446 | [illegible] | KHQZ | KQZ | | | | | | | | |
| 11447 | [illegible] | K-4L | K4KL | K-L | K4L | | | | | | |
| 11448 | [illegible] | K-43 | K-4Y | K423 | K4=3 | K4-Y | K-3 | K43 | K4Y | | |
| 11449 | [illegible] | K5OS | K5SS | K5S | | | | | | | |
| 11450 | [illegible] | K3AX | | | | | | | | | |
| 11451 | [illegible] | K'TG | KTGG | KTG | KJGG | KJG | | | | | |
| 11452 | [illegible] | KS83 | KS3 | | | | | | | | |
| 11453 | [illegible] | U64R | U6R | | | | | | | | |
| 11454 | [illegible] | EA4R | EEAR | EAR | | | | | | | |
| 11455 | [illegible] | WWUR | WU4R | | | | | | | | |
| 11456 | 解 | UA2H | | | | | | | | | |
| 11457 | [illegible] | HARX | | | | | | | | | |
| 11458 | [illegible] | ;TOA | ;THA | ;TA | | | | | | | |
| 11459 | [illegible] | 4OPH | ;PTH | ;PH | | | | | | | |
| 11460 | [illegible] | 4OQX | ;Q2X | ;Q8X | ;QRX | ;QX | | | | | |
| 11461 | [illegible] | 4OAK | ;ANK | ;AK | | | | | | | |
| 11462 | [illegible] | ;2CE | ;2JE | ;JJ | | | | | | | |
| 11463 | [illegible] | 4OAY | ;AHY | ;AY | | | | | | | |
| 11464 | [illegible] | 4OEX | ;TEX | ;'EX | ;EX | | | | | | |
| 11465 | [illegible] | ;EEX | ;EIX | ;;IX | ;;X | | | | | | |
| 11466 | [illegible] | ;8-O | ;8.O | ;8EO | ;8O | | | | | | |

11467 [illegible] 4OLR ;LTR ;LUR ;LR
11468 [illegible] UE8O UE8; UEEO UEE; UE;
11469 [illegible] WWUO 2WUO WWU; 2WU; WU; =WUO =WU;
11470 [illegible] BH8O BH8; BH;
11471 [illegible] 4OPE ;'PE ;.PE ;PEE ;P2E ;PE 4OP2 ;'P2 ;.P2 ;P2
11472 [illegible] 4OL3 ;LB3 ;L3
11473 [illegible] 4O+K 4O+2 4O+8 4OFK 4OF2 4OF8 ;+4K ;+42 ;+48 ;F4K
;F42 ;F48 ;+K ;+2 ;+8 TO7K TO72 TO78 ;74K ;742
4O[K 4O[2 4O[8 ;[4K ;[42 ;[48 ;[K ;[2 ;[8
11474 [illegible] 4O34 4O44 ;224 ;884 ;284 ;2K4 ;K24 ;K84 ;34- ;44-
;34 ;44
11475 [illegible] -KK4 OKK4 .KE4 .K4 -K24 OK24 .2E4 .24
11476 [illegible] HZRX
11477 [illegible] ZLB3 ZLL3
11478 [illegible] ZQ4- ZLQ4
11479 [illegible] ZANK ZAK ZLAK
11480 [illegible] AZAK AZK ZANK ZAK
11481 [illegible] AZQF AZF Z'QF ZQFF ZQF AZQ7 AZ7 Z'Q7 ZQ77 ZQ7
AZQ% Z'Q% ZQ%
11482 [illegible] 4234 4244 4834 4844
11483 [illegible] H4LO H4O
11484 [illegible] OG+2 OG+8 OGFK OGF2 OGF8 GF4K GFK G+4K G+42 G+48
G+2 G+8 OG7K OG72 OG78 G74K G7K OG[2 OG[8 G[4K
G[42 G[48 G[2 G[8
11485 [illegible] OGPK GPHK GPK
11486 [illegible] OGSQ GSDQ GSQ
11487 [illegible] OG4A G4TA G4A
11488 [illegible] G8EO G8.O
11489 [illegible] UE8G
11490 [illegible] HQEY HQE' QE8Y QE8' Q3TY Q3T' QEY QE'
11491 [illegible] HQQ4 QQ4- QQ4
11492 [illegible] TQ4Z TQBZ TQ-Z
11493 [illegible] FFHZ /HTZ /HZ
11494 [illegible] H4AP HUAP HAP
11495 [illegible] -QYZ 92YZ 9YZ
11496 [illegible] -Q+4 9+O4 9+4 -Q[4 9[O4 9[4
11497 [illegible] -QHE 9H8E 9HE
11498 [illegible] -QEX -Q;X 9E1X 9;1X 9EX 9;X
11499 [illegible] WWUQ WWU9 WU-Q WU9
11500 [illegible] -QUK -QUE 9U2K 9U8K 9URK 9U2E 9U8E 9URE 9UK 9UE
11501 [illegible] -Q2H 92EH 92H
11502 [illegible] -QK4 9UK4 9K4-
11503 [illegible] 8KKN $KNN $K2N $KN 8KHN $HNN $H2N $HN 8KXN $XNN
$X2N $XN 6KNN 6K2N 6KN 6HNN 6H2N 6HN 6XNN 6X2N
6XN
11504 [illegible] 8K3K $3LK $3K 63LK 63K
11505 [illegible] 8KBP $BSP $BFP $BKP $BP 6BSP 6BFP 6BKP 6BP
11506 [illegible] 8KHE 8KH; 8K; $HE $H; 6HE 6H;
11507 [illegible] 8KHL $H2L $H8L $HRL $HL 6H2L 6H8L 6HRL 6HL
11508 [illegible] 8KFB $FFB $2FB $F'B $FB 8K7B $77B $27B $7'B $7B
6FFB 62FB 6F'B 6FB 677B 627B 67'B 67B 8K%B $%'B
$%B 6%'B 6%B
11509 [illegible] 8KOM 8KMO $-OM $M-O $OM $MO 6-OM 6M-O 6OM 6MO
11510 [illegible] $42J $48J 642J 648J
11511 [illegible] 8KPX $P2X $P=X $PCX $PRX $PX 6P2X 6P=X 6PCX 6PRX
6PX
11512 [illegible] 8KQG $QG 6QG
11513 [illegible] 8KBG $B-G $BG 6B-G 6BG
11514 [illegible] 8KUX $U2X $U8X $URX $XUX $UXX $UX 6U2X 6U8X 6URX
6XUX 6UXX 6UX
11515 [illegible] $TBX 6TBX
11516 [illegible] 8KBE $'BE $BE 6'BE 6BE
11517 [illegible] $TCK 6TCK
11518 [illegible] 338K 3T3K 3T3$ 3TRK 3TR$ 3T36 3TR6
11519 [illegible] 3R8K 3HR$ 3HRK 3HR6
11520 [illegible] SX8K SJXK STXK JTXK SXK SJX$ STX$ JTX$ SX$ SJX6
STX6 JTX6 SX6
11521 [illegible] 8KU- 8KUB $U2B $U=B $UB- $U- $UB 6U2B 6U=B 6UB-
6U- 6UB
11522 [illegible] $T2E $TUE 6T2E 6TUE
11523 [illegible] 8KU+ 8KUQ $UHQ $U+ $UQ 6UHQ 6U+ 6UQ 8KU| $U|
6U[
11524 [illegible] 8KSY $SJY $SY 6SJY 6SY
11525 [illegible] $HOH 6HOH
11526 [illegible] 8KHY $HLY $HY 6HLY 6HY 11528 錮 $BCL 6BCL
11520 鐵 8KQK $Q-K $QK 6Q-K 6QK
11530 鎮 $T42 $T48 $T2 $T8 6T42 6T48 6T2 6T8
11531 錯 $HUO $HDO 6HUO 6HDO $XUO $XDO 6XUO 6XDO
11532 鉤 8KC; 8K; $C40 $C; 8KJ; $J40 $J; 6C40 6C; 6J40
6J;
11533 縮 8KL4 $L+4 $L4 6L+4 6L4 $L[4 6L[4
11534 鑑 328K 388K 3H2$ 3H8$ 3H26 3H86
11535 闇 PPTB MTKB MTB
11536 闕 PPHL MH8L MHL
11537 闖 PP-H PP4H M-4H M-H M4H
11538 闋 PP4K M'4K M4K. M4.K M4K
11539 闌 PP4X M4TX M4X
11540 網 XYMT XYM
11541 隋 PTDH PTKH PTH
11542 隰 PBN4 PBH2 PBH
11543 隬 P-2A P-8A PT2A PT8A PKUX PKH4 PK[A PKA
11544 璘 -ATL -ATJ TATL TATJ MTKL MTKJ MTL MTJ
11545 璣 -A32 -A38 TA32 TA38 M3H2 M3H8 M32 M38 -3H2 -3H8
11546 璃 -A3A TA3A M3UO M3A -3UO -3A
11547 瑞 -A30 TA30 M30 -AO TAO 30
11548 璽 -AHK TAHK MHUK MXUK MHK MXK -HUK -XUK -HK -XK
11549 粹 H+UH H[UH
11550 粒 H+FT H+FK H[FT H[FK
11551 糌 H+3B H+4B H[3B H[4B
11552 粺 H+Q4 H+Q+ H++ H[Q4 H[Q[ H[[
11553 精 H+3A X+3A H[3A X[3A
11554 綜 HHTZ
11555 緬 HHEK
11556 鐵 TTEM TTME TE-M TME- 2E-M =E-M 2TEM =TEM 2TME =TME
4E-M 4ME-
11557 碩 UGT2 UGT8 UG2 UG8
11558 頤 -UT2 -UT8 TUT2 TUT8 -U2 -U8
11559 顧 B+T2 B+T8 B[T2 B[T8
11560 鎖 $T42 $T48 $T2 $T8 6T42 6T48 6T2 6T8
11561 贖 PAT2 PAT8 PA8
11562 類 WWT2 2WT2 =WT2 WWT8 2WT8 =WT8 WW2 WW8
11563 裝 EE8K EE8 2E8 =E8
11564 鮮 8SU+ 8SUQ 8SQ 8FU+ 8FUQ 8FQ 87U+ 87UQ 87Q 8HHL
8UQ 8SU[ 8FU[ 87U[
11565 鯛 8S+A 8F+A 87+A 8+OA 8S[A 8F[A 87[A 8[OA
11566 餓 8STK 8FTK 87TK 8TAK 8MK
11567 餳 8SBC 8SC 8FBC 8FC 87BC 87C 8B-C 8BC
11568 餡 8SBC 8SBL 8SC 8SL 8FBC 8FBL 8FC 8FL 87BC 87BL
87C 87L 8BCL 8BC 8BL
11569 餘 8SOZ 8FOZ 8FZ 87OZ 87Z 8LLZ 8OZL 8OZ
11570 館 8SBE 8FBE 87BE 8'BE 8BE
11571 餱 8STK 8FTK 87TK 8TCK 8TK
11572 餬 8STJ 8FTJ 87TJ 8'TJ 8T3J 8S[J 8F]J 87[J 8[3J 8[J
11573 敵 K4OM K4MO K4M
11574 麵 YBKL
11575 翡 'BEE 'B2E YBEE YB2E
11576 騂 E4TH 7T2H 7TH
11577 駺 E4BK E4.K 7-BK 7.BK 7-K 7.K 7BK
11578 驗 E4HM E4M 7++M 72OM 7HM 7M E4XM E4MX 7XM 7MX
7[[M
11579 騋 E4YO E4YO 7YO 7YO 7Y
11580 騅 E4K3 7.K3 7K.3 7K3
11581 駿 E4EX 7EUX 7EX
11582 騎 E4PC E4PO 7PCO 7PC 7PO E4PJ 7PJO 7PJ
11583 騂 E4BH 7BHI 7B-+ 7B2I 7B=I 7BH 7B-[
11584 駉 E4OA 7OA
11585 駾 E42R 72OR 72R
11586 駼 E48Y E48' 7823 78=3 78H3 78-Y 78Y 78'
11587 騃 E4SK 7STK 7SK
11588 鯁 QA-X QAQX QAX
11589 驚 E33A D3A
11590 鑑 E3TH E3H DTTH D2TH D2H
11591 蔚 E3YJ E3'J E3J D'YJ D'1J D'J
11592 鱉 E3XE D'XE DXE
11593 趙 QR3A R3A
11594 踏 U4HO JIHO J+-O JHO J[-O
11595 鰭 U4FB JFB U47B J7B 11596 [illegible] U4TA JTA JM
11597 [illegible] U4TY U4G3 JTY JG3
11598 [illegible] U4UO JU-O
11599 [illegible] U4KK U42K JKKL JKK
11600 [illegible] U4XO J'XO JXO
11601 [illegible] AJU4 -AJJ AJJ
11602 [illegible] GFU4 GFJ G7U4 G7J
11603 [illegible] U4TY J'+Y J'[Y J'-Y JTY
11604 [illegible] U4UL JULL JUL
11605 [illegible] U480 J8-O J80
11606 [illegible] UVB4 UV4 .UV5 UV5
11607 [illegible] TXB4 T2X5 T8X5
11608 [illegible] 2HB4 2H4 2225 2HH5 2H5 =HB4 =H4 =225 =HH5 =H5
11609 [illegible] HOB4 IHO5 +-05 HO5 [-05
11610 [illegible] KSB4 K5B4 KCB4 KS4 K54 KC4 K-S5 K-55 K-C5 KS5
K55 KC5
11611 [illegible] TAB4 TA5
11612 [illegible] HXB4 XXB4 ++X5 HX5 XX5 |[X5
11613 [illegible] TYB4 '+Y5 '-Y5 TY5
11614 [illegible] HOB4 '+05 -+05 HI05 '[05 -|05
11615 [illegible] XOB4 'XO5 XO5
11616 [illegible] TYB4 TY5
11617 [illegible] 'AB4 A-B4 ABS4 AB54 'A-5 'A5 A-5
11618 [illegible] SHB4 SH4 S'H5 ST+5 SH5 ST|5
11619 [illegible] AJB4 -AJ5 A[J5 AJ5
11620 [illegible] TEB4 T'H5 TE5
11621 [illegible] VOB4 VO4 VO5
11622 [illegible] EEB4 2EB4 =EB4 EE5 2E5 =E5
11623 [illegible] 'BB4 '005 'B5 B5
11624 [illegible] 2YLF YLHF 2YL7 YLH7 =YLF =YL7
11625 [illegible] HJLF 2JLF =JLF HHLF HLHF HLF HHL7 HLH7 HL7
11626 [illegible] LFC3 LFCR LHF3 LF3 L7C3 L7CR LH73 L73
11627 [illegible] KASH KAH
11628 [illegible] H2.E H8.E HQ2E HQ88
11629 [illegible] 44H2 44H= 44H- 4420 44H Q4H2 Q4H= Q4H- Q420 Q4
11630 [illegible] 42AX 4KAX 4AX
11631 [illegible] 2R4L =R4L 2ROL =ROL 2RQL =RQL 2RL =RL
11632 [illegible] ELTX ;LTX ELX
11633 [illegible] ELK. ;LK.
11634 [illegible] EL8D EL2D ;L8D ;L2D ELD ;LD
11635 [illegible] GUTF GQF GUT7 GQ7
11636 [illegible] 830A 8-OA 8-3A 80A
11637 [illegible] TTAL TTL
11638 [illegible] TTYR
11639 [illegible] TLYG TL2G TLC' TLC
11640 [illegible] OT4X OTUX
11641 [illegible] O4HH O44H OQ4H O4H
11642 [illegible] OBH3 OBH4 OB3
11643 [illegible] 4OCU
11644 [illegible] OLH2 OLH8 OLX2 OLX8
11645 [illegible] OGUT OGU OGQT OGQ
11646 [illegible] 444K 34K
11647 [illegible] VSKJ VS$J VS6J VTXJ V.XJ
11648 [illegible] P'TA PTKA P]KA P]A
11649 [illegible] PUK3 PU3
11650 [illegible] E3EM E3M IU3M \3EM \3M
11651 [illegible] EH4M EX4M EHM EXM HIHM UIXM
11652 [illegible] HILJ ELHJ ELJ
11653 [illegible] 3EEG 3HEG 3EG
11654 [illegible] 4EJG 4JG
11655 [illegible] I2L2 I2L8 ILH2 ILH8 IL2 IL8
11656 [illegible] I2TX IT4X ITUX ITX
11657 [illegible] I2HM IH4M IX4M
11658 [illegible] I2B3 I2B4 IBH3 IBH4 IB3 IB4
11659 [illegible] I2SJ ISKJ IS$J ISJ ITXJ I.XJ IS6J
11660 [illegible] I2T2 I2T8 ITT2 ITT8 I242 I248 IT2
11661 [illegible] 8KOG $HOG $OG 6HOG 6OG
11662 [illegible] I22K I2EK I228 I2E8
11663 [illegible] FTAZ FHOZ
11664 [illegible] FTUG FT7G FTQG FU7G FUQG
11665 [illegible] FBNY FNBY FB2Y FB4Y FBY FNY
11666 [illegible] F34L F3QL
11667 [illegible] F2EK F2E8
11668 [illegible] FHW3 FHWY FH3 FXW3 FXWY FX3

| | | | | | | | | | | | |
|---|---|---|---|---|---|---|---|---|---|---|---|
| 11669 | 擼 | FUQB | FU4B | FJB | | | | | | | |
| 11670 | [illegible] | TSET | TS;T | | | | | | | | |
| 11671 | 旛 | TDTQ | TDQ | DTAQ | DTYQ | DTQ | | | | | |
| 11672 | [illegible] | BHUZ | BHZ | BXUZ | BXZ | | | | | | |
| 11673 | [illegible] | BH44 | BHQ4 | BH4 | | | | | | | |
| 11674 | [illegible] | B-AA | B-AM | BTAA | BTAM | BMTA | BMA | BTM | BMM | B-TA | B-M |
| 11675 | [illegible] | YTDH | YTKH | YTXH | YTX2 | Y.XH | Y.X2 | | | | |
| 11676 | [illegible] | YTDJ | YDTJ | | | | | | | | |
| 11677 | [illegible] | Y-AA | Y-AM | YTAA | YTAM | YMTA | YMA | Y-TA | Y-M | | |
| 11678 | [illegible] | Y/HB | | | | | | | | | |
| 11679 | [illegible] | YQR+ | YR2+ | YR=+ | YR+ | YQR[ | YR2[ | YR=[ | YR[ | | |
| 11680 | 檬 | YTHZ | YTOZ | YTUZ | | | | | | | |
| 11681 | [illegible] | YKCO | YKCX | YKC | | | | | | | |
| 11682 | [illegible] | Y-2A | YT2A | YKA | | | | | | | |
| 11683 | [illegible] | YEX2 | YEX8 | YE2 | YE8 | | | | | | |
| 11684 | [illegible] | YHEX | YHX | YXEX | YXX | | | | | | |
| 11685 | [illegible] | Y8KK | Y8K | Y$BK | Y$K | Y6BK | Y6K | | | | |
| 11686 | [illegible] | B4UT | BN4T | BN4- | B4T | B4- | BH2T | BH2- | BHUT | BH- | |
| 11687 | [illegible] | CXHT | CXH | EXHT | CRXH | ERXH | | | | | |
| 11688 | [illegible] | HUZL | HZ3L | HZEL | XUZL | XZ3L | XZEL | | | | |
| 11689 | 濱 | 3LH2 | 3LH8 | 3L2 | 3L8 | | | | | | |
| 11690 | [illegible] | 3LH4 | 3LF4 | 3L74 | | | | | | | |
| 11691 | [illegible] | 3LQ6 | 3LQH | 3L46 | 3L4H | 3L6 | | | | | |
| 11692 | [illegible] | 32EK | 32E8 | | | | | | | | |
| 11693 | [illegible] | 3WWE | 32UE | 3WHE | 3WE | | | | | | |
| 11694 | [illegible] | 3HYX | 3H'X | | | | | | | | |
| 11695 | [illegible] | 3H4M | 3X4M | | | | | | | | |
| 11696 | [illegible] | 3LHA | 3LXA | 3LA | | | | | | | |
| 11697 | [illegible] | 3T4X | 3TUX | | | | | | | | |
| 11698 | [illegible] | 3PO2 | 3PO8 | 3P2 | 3P8 | | | | | | |
| 11699 | [illegible] | 3ZHB | 3ZB | | | | | | | | |
| 11700 | [illegible] | 3BNY | 3NBY | 3NY | 3B2Y | 3B4Y | | | | | |
| 11701 | [illegible] | 33HA | 43HA | | | | | | | | |
| 11702 | [illegible] | 3AX4 | | | | | | | | | |
| 11703 | [illegible] | WEF4 | | | | | | | | | |
| 11704 | [illegible] | WEEE | W2EE | WEE | W2TE | W2'E | | | | | |
| 11705 | [illegible] | ZZW | 2ZLW | =ZLW | 2ZW | =ZW | | | | | |
| 11706 | [illegible] | WWWY | WWUY | W2WY | W2UY | WHUY | WKUY | WXHY | WKY | WXY | |
| 11707 | [illegible] | WHLJ | WHJJ | WHJ | WE'J | W3'J | | | | | |
| 11708 | [illegible] | ZT4X | ZTUX | | | | | | | | |
| 11709 | [illegible] | EU32 | EU38 | | | | | | | | |
| 11710 | [illegible] | E-AA | E-AM | ETAA | ETAM | EMTA | EMA | EMM | E-TA | E-M | |
| 11711 | [illegible] | EE5K | E;5K | E;K | E2HK | | | | | | |
| 11712 | [illegible] | EHEX | EXEX | | | | | | | | |
| 11713 | [illegible] | ETKH | ETDH | ETH | ETXH | ETX2 | E.XH | E.X2 | | | |
| 11714 | [illegible] | EE-4 | EE44 | EE4 | | | | | | | |
| 11715 | [illegible] | EEE+ | EET+ | E2E+ | E2T+ | E2+ | EEE[ | EET[ | E2E[ | E2T[ | E2[ |
| 11716 | [illegible] | EHH4 | EH4 | EXH4 | EX4 | | | | | | |
| 11717 | [illegible] | UO-Z | UOCZ | U;-Z | U;CZ | U;Z | | | | | |
| 11718 | [illegible] | PH-Z | PHCZ | PHZ | | | | | | | |
| 11719 | [illegible] | L2PX | LP2X | LP8X | LPX | | | | | | |
| 11720 | [illegible] | L2/P | L/BP | L/P | | | | | | | |
| 11721 | [illegible] | L2EL | L2;L | LEEL | LEL | L;L | | | | | |
| 11722 | [illegible] | L28B | L8-B | L84B | L8QB | L82S | L8=S | | | | |
| 11723 | [illegible] | L2TX | LTEX | LTRX | LTX | L'TX | L[EX | L[RX | | | |
| 11724 | [illegible] | L2-Q | L2TQ | L2MQ | L-AQ | LTAQ | LMQ | L-Q | | | |
| 11725 | [illegible] | L2UO | L2U; | LULO | LUL; | LUO | LU; | | | | |
| 11726 | [illegible] | 'BBX | BBDX | BBX | | | | | | | |
| 11727 | [illegible] | TBEX | T-EX | | | | | | | | |
| 11728 | [illegible] | ETO4 | | | | | | | | | |
| 11729 | [illegible] | 43OY | 43Y | | | | | | | | |
| 11730 | [illegible] | 48-B | 484B | 48QB | 48B | 482S | 48=S | | | | |
| 11731 | [illegible] | TO-Q | TOMQ | +-AQ | +TAQ | +-Q | +MQ | [-AQ | [TAQ | [-Q | [MQ |
| 11732 | [illegible] | TOQ- | TOQQ | +-Q- | +-QQ | +Q-Q | +QQ | +3QQ | +Q | +QQ | [-Q |
| | | [-QQ | [Q-Q | [QQ- | [3QQ | [Q- | [QQ | | | | |
| 11733 | [illegible] | TOPH | +POH | +PTH | +PH | [POH | [PTH | [PH | | | |
| 11734 | [illegible] | TOBX | +BTX | +BDX | +BX | [BTX | [BDX | [BX | | | |
| 11735 | [illegible] | EXEO | EXUO | EXE+ | EXE[ | EXH+ | EXU[ | ;XHO | ;XU+ | ;XU[ | ;U+ |
| | | ;U[ | | | | | | | | | |
| 11736 | [illegible] | TO2M | +2EM | +2M | [2EM | [2M | TOX. | | | | |
| 11737 | [illegible] | TO3E | +3UQ | +3OQ | +3E | [3UQ | [3OQ | [3E | | | |
| 11738 | [illegible] | -Y2Z | -YZZ | 232Z | 23ZZ | =32Z | =3ZZ | K2ZZ | K2Z | KZZ | |
| 11739 | [illegible] | -Y8B | 238B | =38B | K8-B | K84B | K8QB | K8B | K82S | K8=S | |

| | | | | | | | | | | | |
|---|---|---|---|---|---|---|---|---|---|---|---|
| 11740 | [illegible] | 'Y2Z | 'YZZ | '2ZZ | 'ZZ | | | | | | |
| 11741 | [illegible] | FF3C | /3BC | /3C | | | | | | | |
| 11742 | [illegible] | FFWC | /WWC | /2WC | /WUC | /2UC | /WC | /KUC | /HUC | /XUC | |
| 11743 | [illegible] | FF+J | /++J | FF[J | /[[J | | | | | | |
| 11744 | [illegible] | FF+4 | /+A4 | /+4 | FF[4 | /[A4 | /[4 | | | | |
| 11745 | [illegible] | FF4+ | /-4+ | /4B+ | /4+ | FF4[ | /-4[ | /4B[ | /4[ | | |
| 11746 | [illegible] | /H80 | /HTO | | | | | | | | |
| 11747 | [illegible] | FFK3 | /K23 | /KB3 | /K3 | | | | | | |
| 11748 | [illegible] | FFWK | FFW. | /W-K | /WUK | /WK | /W. | | | | |
| 11749 | [illegible] | FFL2 | FFL8 | /LL2 | /LL8 | /LH2 | /LH8 | /KH2 | /KH8 | /2H2 | /2H |
| 11750 | [illegible] | FFMX | /PPX | /MTX | /MX | | | | | | |
| 11751 | [illegible] | FFKA | /'KA | /-KA | /KOA | /KA | | | | | |
| 11752 | [illegible] | FFK4 | FFK+ | /KQ4 | /KQ+ | /K4 | /K+ | FFK[ | /KQ[ | /K[ | |
| 11753 | [illegible] | N2QJ | NKQJ | | | | | | | | |
| 11754 | [illegible] | N3+G | N+QG | N+SG | N+AG | N+G | N3[G | N[QG | N[SG | N[AG | N[G |
| 11755 | [illegible] | N3HX | NHAX | NHX | | | | | | | |
| 11756 | [illegible] | N3E- | N3EQ | NEH- | NEHQ | NE- | NEQ | N-QE | NTQE | | |
| 11757 | [illegible] | N3SA | NSJA | NSA | NJA | | | | | | |
| 11758 | [illegible] | N302 | N308 | NO-2 | NO-8 | NO42 | NO48 | NO2 | NO8 | | |
| 11759 | [illegible] | N3O+ | NOQ+ | NOO+ | N2O+ | N2Q+ | NO+ | N3O[ | NOQ[ | NOO[ | N2O |
| | | N2Q[ | NO[ | N3@ | N@ | | | | | | |
| 11760 | [illegible] | N3KA | N'KA | N-KA | NKOA | NKA | | | | | |
| 11761 | [illegible] | GGGN | 3GN3 | 3GN | | | | | | | |
| 11762 | [illegible] | N3YH | N2YH | NYAH | NYH | | | | | | |
| 11763 | [illegible] | N3BX | NBPX | NB4X | NBX | | | | | | |
| 11764 | [illegible] | 2E+2 | 2E+8 | =E+2 | =E+8 | 2E[2 | 2E[8 | =E[2 | =E[8 | | |
| 11765 | [illegible] | 2EAQ | 2EYQ | =EAQ | =EYQ | | | | | | |
| 11766 | [illegible] | YAHE | YAH2 | YHEE | YH2E | | | | | | |
| 11767 | [illegible] | +2EE | +22E | +H2E | +H22 | +X2E | +X22 | +8EE | +82E | +H8E | +H8 |
| | | +X8E | +X82 | [2EE | [22E | [H2E | [H22 | [X2E | [X22 | [8EE | [82 |
| | | [H8E | [H82 | [X8E | [X82 | | | | | | |
| 11768 | [illegible] | PO-2 | PO-8 | PO42 | PO48 | PO2 | PO8 | -402 | -408 | -42 | -4 |
| | | 40-2 | 40-8 | 4042 | 4048 | 402 | 408 | | | | |
| 11769 | [illegible] | A-AA | A-AM | ATAA | ATAM | AMTA | AMA | A-TA | A-M | | |
| 11770 | [illegible] | AHEX | AXEX | | | | | | | | |
| 11771 | [illegible] | AH44 | AHQ4 | AH4 | | | | | | | |
| 11772 | [illegible] | 'ATH | A-TH | ATKH | ATQH | ATH | | | | | |
| 11773 | [illegible] | 'AFK | A-FK | 'A/K | A-/K | AFFK | A/KK | A/2K | A/K | | |
| 11774 | [illegible] | HUGJ | XUGJ | | | | | | | | |
| 11775 | [illegible] | HUEF | HUEJ | XUEF | XUEJ | | | | | | |
| 11776 | [illegible] | HWWW | HWUW | H2WW | H2UW | XWWW | XWUW | X2WW | X2UW | HHUW | HK |
| | | HXUW | XHUW | XKUW | XXUW | | | | | | |
| 11777 | [illegible] | HTAT | HTA- | HT- | XTAT | XTA- | XT- | XTT | | | |
| 11778 | [illegible] | H4XZ | HPXZ | HPZ | X4XZ | XPXZ | XPZ | | | | |
| 11779 | [illegible] | HHKZ | XHKZ | | | | | | | | |
| 11780 | [illegible] | HHLJ | HHJJ | XHLJ | XHJJ | HE'J | H3'J | XE'J | X3'J | | |
| 11781 | [illegible] | H-HZ | H4HZ | H4Z | X-HZ | X4HZ | X-Z | X4Z | | | |
| 11782 | [illegible] | ++;K | HE5K | H;5K | H;K | XE5K | X;5K | X;K | [[;K | | |
| 11783 | [illegible] | ++HN | HH83 | HH8N | HHN | XH83 | XH8N | XHN | [[HN | | |
| 11784 | [illegible] | HFKG | HFG | XFKG | XFG | | | | | | |
| 11785 | [illegible] | HEEE | H2EE | XEEE | X2EE | H2TE | H2'E | X2TE | X2'E | | |
| 11786 | [illegible] | HEH4 | HE-4 | HE44 | XEH4 | XE-4 | XE44 | | | | |
| 11787 | [illegible] | H4WK | X4WK | X4K | | | | | | | |
| 11788 | [illegible] | H44J | H4OJ | H4;J | X44J | X4;J | | | | | |
| 11789 | [illegible] | H4EJ | X4EJ | HTXJ | H.XJ | XTXJ | X.XJ | | | | |
| 11790 | [illegible] | HAZH | HZQH | HZH | XAZH | XZQH | XZH | | | | |
| 11791 | [illegible] | H'YC | H'YL | HYBC | HYBL | HYL | X'YC | X'YL | XYBC | XYBL | XY |
| | | H'BC | H'BL | H'L | X'BC | X'BL | X'L | | | | |
| 11792 | [illegible] | HBT4 | XBT4 | HBA4 | XBA4 | | | | | | |
| 11793 | [illegible] | H3-3 | H343 | X3-3 | X343 | | | | | | |
| 11794 | [illegible] | ++MM | H-AA | H-AM | HTAA | HTAM | HMTA | HMM | X-AA | X-AM | XT |
| | | XTAM | XMTA | XMM | H-TA | H-M | [[MM | | | | |
| 11795 | [illegible] | ++KA | H-2A | H-8A | HT2A | HT8A | HKUX | HKU4 | HK[A | HKA | X- |
| | | X-8A | XT2A | XT8A | XKUX | XKU4 | XK[A | XKA | [[KA | | |
| 11796 | [illegible] | 33TR | 33UR | | | | | | | | |
| 11797 | [illegible] | OSWC | SWWC | S2WC | SWUC | S2UC | SWC | OSWC | SHUC | SKUC | SX |
| 11798 | [illegible] | OS+2 | OS+8 | S+H2 | S+H8 | S+X2 | S+X8 | S+2 | S+8 | OS+2 | OS |
| | | OS[2 | OS[8 | S[H2 | S[H8 | S[X2 | S[X8 | S[2 | S[8 | OS[2 | OS |
| 11799 | [illegible] | SHOO | SHHO | SHKO | SHXO | | | | | | |
| 11800 | [illegible] | OSH3 | OSH3 | SHK3 | SH3 | | | | | | |
| 11801 | [illegible] | OS4+ | S-4+ | S4B+ | S4+ | OS4+ | OS4[ | S-4[ | S4B[ | S4[ | OS |
| 11802 | [illegible] | OS+G | S+QG | S+SG | S+AG | S+G | OS+G | OS[G | S[QG | S[SG | S[ |
| | | S[G | OS[G | | | | | | | | |

| | | |
|---|---|---|
| 11803 | 蟥 | SHQ2 SHQ8 |
| 11804 | 蟓 | SK23 SKB3 |
| 11805 | 蟳 | OSEJ SEHJ SEOJ SEJ OSEJ |
| 11806 | [illegible] | OSL2 OSL8 SLL2 SLL8 SLH2 SLH8 S2H2 S2H8 OSL2 OS SKH2 SKH8 |
| 11807 | [illegible] | OS44 S4H4 SOH4 S44 OS44 |
| 11808 | [illegible] | OSKA S'KA S-KA SKOA SKA OSKA |
| 11809 | [illegible] | OSUZ SUBZ SUZ OSUZ |
| 11810 | 蟭 | OSE4 STE4 S'E4 SE4 OSE4 |
| 11811 | 蟦 | STM2 STM8 |
| 11812 | 蟣 | OSNM SNNM SNTM SNKM SNMT SNMK SNM OSNM |
| 11813 | [illegible] | +OUS +UES +OS +US +ES [OUS [UES [OS [US [ES |
| 11814 | [illegible] | OSTM STBM STM OSTM OSO2 OSO8 OSO2 OSO8 SO2 SO8 |
| 11815 | [illegible] | SBPS SPOS SPOS SPS 3BPS 3POS 3POS 3PS |
| 11816 | [illegible] | H2TS H8TS HTOS HTOS HTS |
| 11817 | [illegible] | LKTS LK-S LYOS LTS |
| 11818 | 蟝 | OS3Y OS3Y S3EY S3Y |
| 11529 | [illegible] | K3HR KH-R KHR |
| 11820 | [illegible] | KYUY K2YU KYY |
| 11821 | 襏 | KW5X KWX |
| 11822 | 襌 | KOQ+ KOO+ K2O+ K2Q+ KO+ KOQ[ KOO[ K2O[ K2Q[ KO[ K@ |
| 11823 | 襆 | K42K K4KK K422 K428 K4K2 K4K8 K4K K48 |
| 11824 | [illegible] | KUBZ KUZ |
| 11825 | [illegible] | KEHJ |
| 11826 | 襉 | KPPA KMA |
| 11827 | [illegible] | ;T2A ;TUR ;TA |
| 11828 | [illegible] | ;TUA ;TQA ;QUS ;TA |
| 11829 | [illegible] | 40-S 40-5 40-C 40MS 40M5 40MC ;-AS ;-A5 ;-AC ;TA ;TA5 ;TAC ;M-S ;M-5 ;M2C ;M=C ;-S ;-5 ;-C ;TS ;T5 ;TC ;MS ;M5 ;MC |
| 11830 | 謳 | 40CO 40CX ;C30 ;CX ;CO |
| 11831 | 謰 | 40QZ ;HQZ ;QZ |
| 11832 | 謵 | 40EB 402B ;EEB ;E'B ;EB ;2'B ;2B |
| 11833 | [illegible] | ;KHB |
| 11834 | [illegible] | ;TU4 ;T74 ;U74 |
| 11835 | [illegible] | ;TUJ ;T7J ;TAJ ;U7J ;UAJ ;TJ |
| 11836 | [illegible] | ;B4X ;BX |
| 11837 | [illegible] | 40QV ;QOV ;QOV ;QV |
| 11838 | 譓 | ;'QG |
| 11839 | [illegible] | EDXO EDX; EX; |
| 11840 | [illegible] | HBXO HBX; HPXO HPX; HXTO HX; |
| 11841 | 譙 | 40L4 ;LH4 ;LX4 ;L4 |
| 11842 | [illegible] | 40E2 40E8 ;E42 ;E48 ;E2 ;E8 |
| 11843 | [illegible] | 40-Y 4043 404Y ;-43 ;423 ;4-Y ;-3 ;-Y ;43 ;4Y |
| 11844 | [illegible] | 40YA 40'A ;'YA ;'AA ;'2A ;'A ;YAA ;Y2A ;YA |
| 11845 | [illegible] | 5SSO 5OSO 5SS; 5OS; 5S40 5SO 5S; |
| 11846 | [illegible] | HH9O HHO; HO40 HOO HO; |
| 11847 | [illegible] | 40E3 4023 |
| 11848 | [illegible] | Z'TG ZTTG ZTG ZL]G Z]TG Z]G |
| 11849 | [illegible] | AZCX AZCO ZC3O ZCX |
| 11850 | [illegible] | AZHK AZK ZHBK ZHK AZXK ZXBK ZXK |
| 11851 | [illegible] | AZQV AZV ZQOV ZQOV ZQV |
| 11852 | [illegible] | EE42 EE48 CUE2 CUE8 COE2 COE8 |
| 11853 | [illegible] | HH92 HH98 HO42 HO48 HO2 HO8 |
| 11854 | [illegible] | 42S3 48S3 423 483 |
| 11855 | [illegible] | CRX2 CRX8 ERX2 ERX8 CX42 CX48 EX42 EX48 CX2 CX8 EX2 EX8 |
| 11856 | 蹈 | OGUB GUTB |
| 11857 | 蹢 | OGTA GT2A GTUO GTA |
| 11858 | 蹠 | OGL4 GLH4 GL4 |
| 11859 | [illegible] | OGLF GLHF GLF OGL7 GLH7 GL7 |
| 11860 | [illegible] | OGEE OGE; OG; GE8E G3TE GE8; G3T; GE; |
| 11861 | 蹪 | OGF2 OGF8 GFT2 GFT8 OG72 OG78 G7T2 G7T8 |
| 11862 | 蹥 | OGQZ GHQZ GQZ |
| 11863 | 蹭 | OGQB GHQB GQB |
| 11864 | [illegible] | OGEE GEUE GHUE GEE |
| 11865 | [illegible] | OG3H G3UH G3H |
| 11866 | [illegible] | GKAJ |
| 11867 | 蹤 | OGTG G'TG GTGG GTG OG]G G]GG G]G |
| 11868 | [illegible] | 3AXG 3XOG |
| 11869 | [illegible] | HQTG +TOG QTOG QLTG +TG QTG [TOG [TG |
| 11870 | [illegible] | HQLF QLHF QLF HQL7 QLH7 QL7 |
| 11871 | [illegible] | HQE3 QEE3 QE83 QE3 HQ23 Q283 Q23 |
| 11872 | [illegible] | HQ3Y Q3QY Q3Y |

| | | | | | | | | | | | |
|---|---|---|---|---|---|---|---|---|---|---|---|
| 11873 | [illegible] | HQHZ | HQQZ | QZQ | | | | | | | |
| 11874 | [illegible] | 3AXL | 3XOL | | | | | | | | |
| 11875 | [illegible] | LH2P | LH8P | LQ2P | LQ8P | L2P | L8P | | | | |
| 11876 | [illegible] | KK+P | KHQP | 2HQP | =HQP | K+P | KQP | 2QP | =QP | KK[P | K[P |
| 11877 | [illegible] | T4XP | TUXP | | | | | | | | |
| 11878 | [illegible] | -QTA | -QQA | 9TUA | 9TUA | 9TA | 9QA | | | | |
| 11879 | [illegible] | -Q-3 | -Q-Y | -Q43 | -Q4Y | 9-4Y | 9423 | 94-Y | 9-3 | 9-Y | 943 |
| | | 94Y | | | | | | | | | |
| 11880 | [illegible] | -QCX | -QC0 | 9C30 | 9C0 | 9CX | | | | | |
| 11881 | [illegible] | -QT4 | 9TS4 | 9T34 | 9TR4 | 9T4 | | | | | |
| 11882 | [illegible] | -QE3 | 9EE3 | 9E83 | 9E3 | -Q23 | 9283 | 923 | | | |
| 11883 | [illegible] | 8KUZ | $.UZ | $UZL | $UZ | 6.UZ | 6UZL | 6UZ | | | |
| 11884 | [illegible] | 8KK4 | $KE4 | 8K24 | $2E4 | $K4 | $24 | 6KE4 | 62E4 | 6K4 | 624 |
| 11885 | [illegible] | $L2J | $L=J | $LKJ | 6L2J | 6L=J | 6LKJ | | | | |
| 11886 | [illegible] | 8KE4 | $ES4 | $E54 | $E4 | 8K7 | $7 | 6ES4 | 6E54 | 6E4 | 67 |
| 11887 | [illegible] | 8K+J | $+AJ | $+J | 6+AJ | 6+J | 8K[J | $[AJ | $[J | 6[AJ | 6[J |
| 11888 | [illegible] | $H80 | $X80 | 6H80 | 6X80 | | | | | | |
| 11889 | [illegible] | $BEE | $B2E | $B2 | 6BEE | 6B2E | 6B2 | | | | |
| 11890 | [illegible] | $E-K | $EOK | $IU. | 6E-K | 6EOK | 6IU. | $\-K | $\OK | 6\-K | 6\O |
| 11891 | [illegible] | 8K7Y | $TZY | $TLY | $72Y | $7Y | 6TZY | 6TLY | 672Y | 67Y | |
| 11892 | [illegible] | 8K;X | $EIX | $;IX | $;X | 6EIX | 6;IX | 6;X | | | |
| 11893 | [illegible] | 8KQF | $'QF | $'Q2 | $QF | 6'QF | 6'Q2 | 6QF | | | |
| 11894 | [illegible] | 8KSQ | $SDQ | $SQ | 6SDQ | 6SQ | | | | | |
| 11895 | [illegible] | $LEO | 6LEO | | | | | | | | |
| 11896 | [illegible] | $2EH | 62EH | | | | | | | | |
| 11897 | [illegible] | $KEA | 6KEA | | | | | | | | |
| 11898 | [illegible] | 8KXY | $3XY | $XY | $3Y | 63XY | 6XY | 63Y | | | |
| 11899 | [illegible] | 8KT3 | $TI3 | $TX3 | $T3 | 6TI3 | 6TX3 | 6T3 | | | |
| 11900 | [illegible] | 8K+N | $+U3 | $+UN | $+N | 6+U3 | 6+UN | 6+N | 8K[N | $[U3 | $[U |
| | | $[N | 6[U3 | 6[UN | 6[N | | | | | | |
| 11901 | [illegible] | $HOK | $HK | 6HOK | 6HK | | | | | | |
| 11902 | [illegible] | $HS4 | 6HS4 | | | | | | | | |
| 11903 | [illegible] | $3UR | $3OR | 63UR | 63OR | | | | | | |
| 11904 | [illegible] | 8KBR | $B3R | $BR | 6B3R | 6BR | | | | | |
| 11905 | [illegible] | 8KE+ | $TE+ | $'E+ | $E+ | 6TE+ | 6'E+ | 6E+ | 8KE[ | $TE[ | $'E |
| | | $E[ | 6TE[ | 6'E[ | 6E[ | | | | | | |
| 11906 | [illegible] | 8K4G | $'4G | $4G | 6'4G | 64G | | | | | |
| 11907 | [illegible] | WWUK | WW8K | WU8K | 2WUK | =WUK | WWU$ | 2WU$ | =WU$ | WU$ | 2U$ |
| | | =U$ | WWK | WUK | WWU6 | 2WU6 | =WU6 | WU6 | 2U6 | =U6 | |
| 11908 | [illegible] | PPBE | PPB2 | MBEE | MB2E | MBE | MB2 | | | | |
| 11909 | [illegible] | PPEK | PPE. | ME-K | MEOK | MEK | ME. | | | | |
| 11910 | [illegible] | PP4Y | M'4Y | M4Y | | | | | | | |
| 11911 | [illegible] | P+AG | P+A4 | PA8G | PA84 | PAG | PA4 | P[AG | P[A4 | | |
| 11912 | [illegible] | +B8E | +BE | HB8E | [B8E | [BE | | | | | |
| 11913 | [illegible] | HOOE | H2OE | XOOE | X2OE | | | | | | |
| 11914 | [illegible] | ETEA | E'EA | EEUO | IUEA | \TEA | \'EA | \EUO | | | |
| 11915 | [illegible] | ETEA | E'EA | EEUO | U'EA | \TEA | \'EA | \EUO | | | |
| 11916 | [illegible] | A-HX | UTHX | AHEX | A-XX | UTXX | AXEX | | | | |
| 11917 | [illegible] | 3LTE | 3L'E | 3OLE | 3LE | | | | | | |
| 11918 | [illegible] | -AO2 | -AO8 | TAO2 | TAO8 | MAO2 | MAO8 | MO42 | MO48 | -A8 | TA2 |
| | | TA8 | MA2 | MA8 | -O42 | -O48 | | | | | |
| 11919 | [illegible] | -AAK | TAAK | MALK | MAK | -ALK | -AK | | | | |
| 11920 | [illegible] | -AHZ | TAHZ | MHUZ | MHZ | -HUZ | -HZ | -AXZ | TAXZ | MXUZ | MXZ |
| | | -XUZ | -XZ | | | | | | | | |
| 11921 | [illegible] | H+EZ | H[EZ | | | | | | | | |
| 11922 | [illegible] | H+BG | H+G | H[BG | H[G | | | | | | |
| 11923 | [illegible] | H+BC | H+BJ | H+BL | H[BC | H[BJ | H[BL | | | | |
| 11924 | [illegible] | H+CO | H+C; | H+; | H+JO | H+J; | H[CO | H[C; | H[; | H[JO | H[J |
| 11925 | [illegible] | HJH+ | HHJ+ | HJ+ | HJH[ | HHJ[ | HJ[ | | | | |
| 11926 | [illegible] | SXH+ | SJX+ | SJ+ | SXH[ | SJX[ | SJ[ | | | | |
| 11927 | [illegible] | H+HY | X+HY | H[HY | X[HY | | | | | | |
| 11928 | [illegible] | H+8H | H+8X | X+8H | X+8X | H[8H | H[8X | X[8H | X[8X | | |
| 11929 | [illegible] | HHU+ | HHUQ | HH+ | HHU[ | HH[ | | | | | |
| 11930 | [illegible] | BGHH | BGH | GHOH | | | | | | | |
| 11931 | [illegible] | HHSY | | | | | | | | | |
| 11932 | [illegible] | HHHY | | | | | | | | | |
| 11933 | [illegible] | TBHK | TBXK | | | | | | | | |
| 11934 | [illegible] | U+T2 | U+T8 | UQT2 | UQT8 | UQ2 | UQ8 | U[T2 | U[T8 | | |
| 11935 | [illegible] | OMT2 | OMT8 | MOT2 | MOT8 | OM2 | OM8 | MO2 | MO8 | | |
| 11936 | [illegible] | QAT2 | QAT8 | QA2 | QA8 | | | | | | |
| 11937 | [illegible] | RSQG | RSG | RQG | | | | | | | |
| 11938 | [illegible] | 8SH4 | 8FH4 | 87H4 | 8HS4 | 8H4 | | | | | |
| 11939 | [illegible] | 8STY | 8S7Y | 8SY | 8FTY | 8F7Y | 8FY | 87TY | 877Y | 87Y | 8TZ |
| | | 8TLY | 872Y | | | | | | | | |

| | | | | | | | | | | | |
|---|---|---|---|---|---|---|---|---|---|---|---|
| 11940 | [illegible] | 8S+J | 8F+J | 87+J | 8+AJ | 8+J | 8S[J | 8F[J | 87[J | 8[AJ | 8[J |
| 11941 | [illegible] | E4HK | E4H2 | E4H8 | 7H2K | 7H=K | 7H22 | 7H=2 | 7H28 | 7H=8 | 7H2 |
| | | 7H8 | | | | | | | | | |
| 11942 | [illegible] | E4YT | 7YTT | 7Y2T | 7YT | | | | | | |
| 11943 | [illegible] | E4BF | E4B2 | E4F | 7BFF | 7B2F | 7BF | 7B2 | E4B% | 7B% | |
| 11944 | [illegible] | E4QY | 7QY | | | | | | | | |
| 11945 | [illegible] | E403 | E404 | E4H3 | E4K4 | 7-K3 | 7-K4 | 7K-3 | 7K-4 | 703 | 704 |
| | | 7K4 | | | | | | | | | |
| 11946 | 騑 | E4EE | E42E | 7EE | 72E | | | | | | |
| 11947 | [illegible] | E4CE | 7CHE | 7CE | E4JE | 7JHE | 7JE | | | | |
| 11948 | 騅 | E4TE | E4'E | E4E | 7TTE | 7THH | 7TE | 7'E | 7E | | |
| 11949 | [illegible] | E480 | 78HO | 780 | | | | | | | |
| 11950 | [illegible] | 7UHO | | | | | | | | | |
| 11951 | [illegible] | QAQ4 | QAQ+ | QA4 | QA+ | QAQ\| | QA[ | | | | |
| 11952 | [illegible] | TABH | TAH | | | | | | | | |
| 11953 | [illegible] | E32L | ES3L | E3L | D2HL | D2L | | | | | |
| 11954 | [illegible] | E3BC | ES3C | E3C | DBC2 | DBC | | | | | |
| 11955 | [illegible] | E3AA | E32A | ES3A | DAA | D2A | | | | | |
| 11956 | [illegible] | PPER | PP;R | MEER | MER | M;R | | | | | |
| 11957 | [illegible] | KK-A | RR-A | KKOA | RROA | RRA | K-OA | R-OA | KOA | | |
| 11958 | [illegible] | QROM | QAMO | RO-M | RMO- | ROM | RMO | | | | |
| 11959 | [illegible] | QRH2 | QRH8 | QR2 | QR8 | RH2K | RH=K | RH22 | RH=2 | RH28 | RI |
| | | RHK | RH2 | RH8 | | | | | | | |
| 11960 | [illegible] | QRTE | QR'E | 'QRE | QRSE | QRE | RTTE | RTHH | RTE | R'E | RE |
| 11961 | [illegible] | U4UR | JU2R | JU=R | JUR | | | | | | |
| 11962 | [illegible] | J+A. | J[A. | | | | | | | | |
| 11963 | [illegible] | U450 | J50 | | | | | | | | |
| 11964 | [illegible] | U4PL | U44L | JPL | J-4L | J4L | | | | | |
| 11965 | [illegible] | U4-X | U4QX | J-QX | JTQX | J-X | JQX | | | | |
| 11966 | [illegible] | U42R | J2OR | J2R | | | | | | | |
| 11967 | [illegible] | U4UR | JUBR | JUR | | | | | | | |
| 11968 | [illegible] | U44J | J'4J | J4J' | J4J | | | | | | |
| 11969 | [illegible] | U4EO | JE'O | JEO | | | | | | | |
| 11970 | [illegible] | U4-3 | U4-4 | U4+3 | U4+4 | J-3. | J-4. | J+3. | J+4. | J-3 | J- |
| | | J+3 | J+4 | | | | | | | | |
| 11971 | [illegible] | U43A | J3A | | | | | | | | |
| 11972 | [illegible] | U48Y | U48' | J8'Y | J8-Y | J823 | J8=3 | J8H3 | J8Y | J8' | |
| 11973 | [illegible] | 2JB4 | =JB4 | 25J5 | =5J5 | 2J5 | =J5 | | | | |
| 11974 | [illegible] | +ZB4 | +Z4 | +UZ5 | +Z5 | [ZB4 | [Z4 | [UZ5 | [Z5 | | |
| 11975 | [illegible] | +AB4 | +A4 | +A.5 | +A5 | [AB4 | [A4 | [A.5 | [A5 | | |
| 11976 | [illegible] | KTB4 | KT4 | KTT5 | K2T5 | KT5 | -3T5 | | | | |
| 11977 | [illegible] | -HB4 | 3HB4 | -3H5 | 3H5 | | | | | | |
| 11978 | [illegible] | LGB4 | CGB4 | LG4 | CG4 | CLG5 | CG5 | LG5 | | | |
| 11979 | [illegible] | 42B4 | 48B4 | 425 | 485 | | | | | | |
| 11980 | [illegible] | BFBF | BF4 | B7B4 | B74 | 'BF5 | BF5 | 'B75 | B75 | | |
| 11981 | [illegible] | B48Y | B48' | 58-Y | 5823 | 58=3 | 58H3 | 58Y | 58' | 5Y | |
| 11982 | [illegible] | XEB4 | X+E5 | XE5 | X[E5 | | | | | | |
| 11983 | [illegible] | 40B4 | 2205 | 2805 | 8805 | 405 | | | | | |
| 11984 | [illegible] | B4SX | 5S2X | 5S8X | 5SRX | 5SX | | | | | |
| 11985 | [illegible] | ZEB4 | ZE4 | ZE5 | | | | | | | |
| 11986 | [illegible] | EOB4 | E'O5 | EO5 | | | | | | | |
| 11987 | [illegible] | YRB4 | 'RB4 | 'YR5 | 'R5 | YR5 | | | | | |
| 11988 | [illegible] | LFLK | LFK | LHFK | LHK | | | | | | |
| 11989 | [illegible] | LFOK | LFK | LHFK | LHK | | | | | | |
| 11990 | [illegible] | 44AA | 442A | 44A | Q4AA | Q42A | Q4A | | | | |
| 11991 | [illegible] | HS4L | HSOL | HSQL | HSL | | | | | | |
| 11992 | [illegible] | H24L | H84L | HR4L | H2OL | H8OL | HROL | H2QL | H8QL | HRQL | |
| 11993 | [illegible] | +HHX | +XHX | +HX | [HHX | [XHX | [HX | | | | |
| 11994 | [illegible] | EL+X | ;L+X | ELX | EL[X | ;L[X | | | | | |
| 11995 | [illegible] | ELTO | ;LTO | ;L+ | ;L[ | | | | | | |
| 11996 | [illegible] | EL'E | ;L'E | ELE | ;LE | | | | | | |
| 11997 | [illegible] | ELCO | ;LCO | ELC | ;LC | ELJO | ;LJO | | | | |
| 11998 | [illegible] | ELX2 | ELX= | ;LX2 | ;LX= | EL2 | EL= | ;L2 | ;L= | | |
| 11999 | [illegible] | TDKW | TK2W | TX2W | .X2W | | | | | | |
| 12000 | [illegible] | GUTZ | GQTZ | GUZ | | | | | | | |
| 12001 | [illegible] | TTOK | TTEK | TT2K | | | | | | | |
| 12002 | [illegible] | TIX4 | TI4 | TX44 | TXQ4 | | | | | | |
| 12003 | [illegible] | UORJ | UFRJ | UURJ | U7RJ | | | | | | |
| 12004 | [illegible] | TOKC | TEKC | T2KC | TKC | | | | | | |
| 12005 | [illegible] | LAKQ | LKBI | LKQI | LKQ | | | | | | |
| 12006 | [illegible] | OTYR | | | | | | | | | |
| 12007 | [illegible] | HO30 | HO-O | HOTO | | | | | | | |
| 12008 | [illegible] | OLYG | OL'G | OL2G | OLG | | | | | | |
| 12009 | [illegible] | OTU4 | OT74 | OU74 | OTQ4 | OUQ4 | OT4 | 'OU4 | | | |

| | | |
|---|---|---|
| 12010 | 嘣 | OPPE OPP; OMUE OMU; OME OM; |
| 12011 | 嘲 | OG32 OG38 |
| 12012 | 墉 | HTU4 HT74 HU74 HTQ4 HUQ4 |
| 12013 | 墟 | HO2Z HO8Z IHOZ |
| 12014 | 塴 | HPPE HPP; HMUE HMU; HM; IHME IHM; |
| 12015 | 嬰 | T4LX TL2X TL8X TLRX TGLX G4LX GL2X GL8X GLRX TLX GLX |
| 12016 | 嬪 | V4SK V4NK V44K V24K V4K |
| 12017 | 嬾 | VYO2 VYO8 VYO2 VYO8 VYU2 VYU8 VY2 VY8 |
| 12018 | 嬿 | VHO4 VHF4 VH74 VXO4 VXF4 VX74 |
| 12019 | 維 | ETAL ETLI IUTL \TAL \TLI |
| 12020 | 繕 | EUEG EUG UIUG |
| 12021 | 徽 | 'TTL ]TAL ]TL |
| 12022 | 懭 | I2F2 I2F8 I272 I278 IFQ2 IFQ8 IFF2 IFF8 I7Q2 I7Q I772 I778 |
| 12023 | 擅 | FUEG FU4G |
| 12024 | 擦 | FUEK |
| 12025 | 擷 | FTOR FTAR FTVR FCOR FCAR FCVR FCR |
| 12026 | 擢 | F-AE FTAE FMTE FM'E FME F-TE F-'E F-E |
| 12027 | 擂 | FO4K FO4K FOK |
| 12028 | 擁 | FTU4 FT74 FTQ4 FU74 FUQ4 FT4 FU4 |
| 12029 | 癢 | YXLY YXY |
| 12030 | 旌 | TDTZ TDZ DT2Z DTZZ |
| 12031 | 旖 | TDTB TDB DT8B DTB |
| 12032 | 瞩 | BLHA BLXA BLA |
| 12033 | 橧 | Y4OB Y;HB Y;B |
| 12034 | 檫 | YLWX |
| 12035 | 檩 | YT4X YTUX |
| 12036 | 橊 | YQQQ Y3Q |
| 12037 | 檝 | YHCO YHCX YHC3 YHC |
| 12038 | 檮 | Y4UD |
| 12039 | 樸 | YBNY YNBY YNY YB2Y YB4Y |
| 12040 | 蘖 | +OUY +UAY +ATY +TOY +UY LOUY LUAY LATY [TOY [UY |
| 12041 | 桑 | QQQY 3QY |
| 12042 | 檠 | ZHBY ZBY ZLBY |
| 12043 | 檯 | Y-LZ Y4LZ Y-Z Y4Z |
| 12044 | 檄 | YLT2 YTT2 Y2T2 Y242 YT42 YLT8 YTT8 Y2T8 Y248 YT4 |
| 12045 | 樾 | YN3Z YNOZ YNZ |
| 12046 | 獸 | X-QT X-Q- XOUT XOT XO- |
| 12047 | 殯 | -AH2 -AH8 AH42 AH48 |
| 12048 | 氈 | 3LUB ELUB 3LJB ELJB 3LB ELB |
| 12049 | 瀷 | 3TYR |
| 12050 | 灘 | 3TAL |
| 12051 | 瀰 | 3WWN 32WN 3WUN 32UN 3WN |
| 12052 | 濯 | 3-AE 3TAE 3MTE 3M'E 3ME 3-TE 3-'E 3-E |
| 12053 | 瀫 | 3H3X 3HNX |
| 12054 | 灡 | 3P+Z 3PZ 3P[Z |
| 12055 | 瀍 | 302Z 308Z |
| 12056 | 濫 | 3TXE 3TX- 3AXE 3AX- |
| 12057 | 瀬 | 3YR2 3YR8 3'R2 3'R8 3Y2 3Y8 |
| 12058 | 澹 | 3UEG |
| 12059 | 瀆 | 3T4K |
| 12060 | 瀣 | 3-AS 3OAS |
| 12061 | 爌 | WLH2 WLH8 WL2 WL8 |
| 12062 | 爊 | WLH4 WLF4 WL74 WL4 |
| 12063 | 穌 | HH94 H694 H64 XH94 X694 X34 |
| 12064 | 燮 | EAEW EAUW ;AUW EAW ;AW EUW ;UW |
| 12065 | 煙 | W4HH W44H WQHH WQ4H WQH |
| 12066 | 犥 | 'FL4 'Z4 ZLH4 ZLF4 ZL74 ZL4 |
| 12067 | 犦 | 'FB3 'FB4 'F3 'F4 ZBH3 ZBH4 ZB3 ZB4 |
| 12068 | 犡 | 'F4F Z4SF Z4AF Z4F 'F47 Z4S7 Z4A7 Z47 |
| 12069 | 犤 | 'F3L 'FL Z34L Z3QL Z3L |
| 12070 | 犧 | 'FLA ZLHA ZLA |
| 12071 | 璡 | ETAZ |
| 12072 | 璞 | EBNY ENBY EBY ENY EB2Y EB4Y |
| 12073 | 璬 | E+DX E[DX |
| 12074 | 瑠 | EQQQ E3Q |
| 12075 | 璺 | 424Z 484Z 44-Z 44CZ 42-Z 42CZ 48-Z 48CZ 242Z 248 =42Z =48Z |
| 12076 | 癠 | L2TH LTDH LTKH LTXH LTX2 L.XH L.X2 |
| 12077 | 矉 | 4U32 4U38 4U2 4U8 |
| 12078 | 瞞 | 4NBE |
| 12079 | 瞟 | 4H44 4HQ4 |
| 12080 | 矲 | TKHX KHEX TKXX KXEX |

| | | |
|---|---|---|
| 12081 | [illegible] | TO-A TO-M TOTM TOMA TOMM +-AA +-AM +TAA +TAM +MT. +MA +MM +-A +-M [-AA [-AM [TAA [TAM [MTA [MA [MM [-A [-M |
| 12082 | [illegible] | +EF4 [EF4 |
| 12083 | [illegible] | TOHJ TOXJ +H+J +X+J [H[J [X[J |
| 12084 | [illegible] | E5EO E5E+ E5KO E5K+ ;5KO ;5K+ E5+ ;5+ E5E[ E5K ;5K[ E5[ ;5[ |
| 12085 | [illegible] | TOU2 TOU8 +U32 +U38 +U2 +U8 [U32 [U38 [U2 [U8 |
| 12086 | [illegible] | TOHZ +HUZ +HZ TOXZ +XUZ +XZ [HUZ [HZ [XUZ [XZ |
| 12087 | [illegible] | -YKA 23KA =3KA K-2A K-8A KT2A KT8A KKUX KKU4 KKI. KKA |
| 12088 | [illegible] | 'YTH 'TDH 'TKH 'TH 'TXH 'TX2 '.XH '.X2 |
| 12089 | [illegible] | YRO2 YRO8 'RO2 'RO8 YR2 YR8 'R2 'R8 |
| 12090 | [illegible] | FF+H /+BH /HB+ /+H FF[H /[BH /HB[ /[H |
| 12091 | [illegible] | /FEA /FA |
| 12092 | [illegible] | FF3Q /3UQ /3Q /3E |
| 12093 | [illegible] | FFGO /OGO /GXO /GO |
| 12094 | [illegible] | FFQZ FFJZ /QAZ /QZ /JZ |
| 12095 | [illegible] | 2Y4B Y4HB Y4B =Y4B |
| 12096 | [illegible] | POHY PTHY PH2Y PHY |
| 12097 | [illegible] | N3TG NTKG NTBG NTG |
| 12098 | [illegible] | N3TB NTQB NTQ- |
| 12099 | [illegible] | N32Z N3ZZ N2ZZ NKZZ N2Z NZZ |
| 12100 | [illegible] | N3OY NOOY NOY N3Y |
| 12101 | [illegible] | N3QK NQLK NQK |
| 12102 | [illegible] | N34K N4-K N4OK N4K |
| 12103 | [illegible] | N3U4 NUX4 NU4 |
| 12104 | [illegible] | NUAH NUH |
| 12105 | [illegible] | POH3 POHN PTH3 PTHN PH3 PHN |
| 12106 | [illegible] | N3HZ NHEZ NHZ |
| 12107 | [illegible] | TNEE TEHE |
| 12108 | [illegible] | +EXE +XTE +XHE +XE [EXE [XTE [XHE [XE |
| 12109 | [illegible] | 4HBE 4HE 4XBE 4XE |
| 12110 | [illegible] | 4SF4 4AF4 4S4 4A4 4S74 4A74 |
| 12111 | [illegible] | 2E8T =E8T 2E82 =E82 |
| 12112 | [illegible] | GMEE GM2E GME G3M2 GM2 |
| 12113 | [illegible] | 4KEE 4K2E 4KE 4-K2 4OK2 4K2 |
| 12114 | [illegible] | PULO PUL; PUO PU; -4UO -4U; 4ULO 4UL; |
| 12115 | [illegible] | AUHR AUXR |
| 12116 | [illegible] | ALH4 ALF4 AL74 |
| 12117 | [illegible] | EAE4 EAU4 ;AU4 ;A4 EU4 EUA- EU4- |
| 12118 | [illegible] | 'A2M A-2M A2EM |
| 12119 | [illegible] | 'A3Q A-3Q A3UQ A3OQ A3E |
| 12120 | [illegible] | 'ATC A-TC ATUC AT7C ATQC AU7C AUQC |
| 12121 | [illegible] | H3-+ H34+ X3-+ X34+ H3-[ H34[ X3-[ X34[ |
| 12122 | [illegible] | HL2R HLQR HLR XL2R XLQR XLR |
| 12123 | [illegible] | HU25 HU85 HUR5 HU45 HUJ5 HU5 XU25 XU85 XUR5 XU45 XUJ5 XU5 |
| 12124 | [illegible] | HTZX XTZX |
| 12125 | [illegible] | HTAZ XTAZ HHOZ XHOZ |
| 12126 | [illegible] | HLF4 HL74 HL4 XLF4 XL74 XL4 |
| 12127 | [illegible] | HH42 HH48 XH42 XH48 |
| 12128 | [illegible] | HYTZ HYZ XYTZ XYZ |
| 12129 | [illegible] | HPO2 HPO8 HP2 HP8 XPO2 XPO8 XP2 XP8 |
| 12130 | [illegible] | HYCO HYCX HYC3 HYC XYCO XYCX XYC |
| 12131 | [illegible] | HZHB HZB XZHB XZB |
| 12132 | [illegible] | HTUG HT7G HTQG HU7G HUQG HTG XTUG XT7G XTQG XU7G XUQG XTG |
| 12133 | [illegible] | ++3Q HQQQ H3Q XQQQ X3Q [[3Q |
| 12134 | [illegible] | H4SF H4AF H4F X4SF X4AF X4F |
| 12135 | [illegible] | HYD3 HYD4 H'D3 H'D4 HY3 XYD3 XYD4 X'D3 X'D4 XY3 |
| 12136 | [illegible] | HU4X HUQX HUAX XU4X XUQX XUAX |
| 12137 | [illegible] | HSKJ HTXJ H.XJ XSKJ XTXJ X.XJ |
| 12138 | [illegible] | HLYF HLYJ HL2F HL2J HLF HLJ XLYF XLYJ XL2F XL2. XLF XLJ |
| 12139 | [illegible] | HPJG HPG XPJG XPG |
| 12140 | [illegible] | ++3+ H3TO H3+ X3TO X3+ [[3[ H3[ X3[ |
| 12141 | [illegible] | H'TX H]EX H]X X'TX X]EX X]X H]\X X]\X |
| 12142 | [illegible] | S2T2 S2-2 S2T8 S2-8 S22 S28 |
| 12143 | [illegible] | STQB STQ- |
| 12144 | [illegible] | TLSR TLAR TOAR TASR COAR CASR COSR CSR |
| 12145 | [illegible] | OSPE OS4E SPOE S4OE SPE S4E OSPE OS4E |

| | | | | | | | | | | | |
|---|---|---|---|---|---|---|---|---|---|---|---|
| 12146 | [illegible] | S3UQ | S3OQ | S3E | | | | | | | |
| 12147 | [illegible] | S4-K | S4OK | | | | | | | | |
| 12148 | [illegible] | OS4H | S4HH | S4H | OS4H | | | | | | |
| 12149 | [illegible] | OS4C | OS4S | S4CS | S4C | S4S | OS4C | OS4S | OS4J | OS4J | S4J |
| | | S4J | | | | | | | | | |
| 12150 | [illegible] | HQAS | XQAS | XQS | | | | | | | |
| 12151 | [illegible] | HCXS | HJXS | HXS | XCXS | XJXS | XXS | | | | |
| 12152 | [illegible] | 42MS | 48MS | 4+MS | 4M+S | 4MS | 4[MS | 4M[S | | | |
| 12153 | [illegible] | +EXS | +XS | [EXS | [XS | | | | | | |
| 12154 | [illegible] | OSL4 | OSL4 | SLY4 | SL4 | | | | | | |
| 12155 | [illegible] | OSHY | OSHY | SHHY | OSXY | OSXY | SXHY | | | | |
| 12156 | [illegible] | KTQ4 | KTQB | KTQ- | KT4 | | | | | | |
| 12157 | [illegible] | K2ZZ | KKZZ | K2Z | KZZ | | | | | | |
| 12158 | [illegible] | KQLK | | | | | | | | | |
| 12159 | [illegible] | K4HH | | | | | | | | | |
| 12160 | [illegible] | K4CS | K4C | K4S | K4JS | K4J | | | | | |
| 12161 | [illegible] | KULO | KUL; | KU; | | | | | | | |
| 12162 | [illegible] | K8-B | K84B | K8QB | K8B | K82S | K8=S | | | | |
| 12163 | [illegible] | K8OT | K8-T | K8-2 | K8-4 | K822 | K824 | K8T | K84 | K8B2 | K8B |
| 12164 | [illegible] | K3OY | K3Y | KOY | | | | | | | |
| 12165 | [illegible] | -4BX | 4BDX | 4BX | | | | | | | |
| 12166 | [illegible] | T44R | U44R | | | | | | | | |
| 12167 | [illegible] | AA4R | AAR | | | | | | | | |
| 12168 | [illegible] | UAO+ | UAO[ | | | | | | | | |
| 12169 | [illegible] | 4OKJ | ;29J | ;KQJ | ;KJ | | | | | | |
| 12170 | [illegible] | 4OTX | ;TZX | ;TX | | | | | | | |
| 12171 | [illegible] | 4OHR | ;3HR | ;H-R | ;3-R | ;HR | ;3R | | | | |
| 12172 | [illegible] | 4OTX | 4OHX | ;TPX | ;HPX | ;TX | ;HX | ;T4X | ;H4X | | |
| 12173 | [illegible] | 4O+G | ;+AG | ;+QG | ;+SG | ;+G | 4O[G | ;[AG | ;[QG | ;[SG | ;[G |
| 12174 | [illegible] | 4ORB | ;KKB | ;2KB | ;RRB | ;2RB | ;CRB | ;RB | | | |
| 12175 | [illegible] | 4OL2 | 4OL8 | ;LL2 | ;LL8 | ;LH2 | ;LH8 | ;2H2 | ;2H8 | ;KH2 | ;KH |
| 12176 | [illegible] | 4OMA | ;PPA | ;MA | | | | | | | |
| 12177 | [illegible] | 4OE4 | ;TE4 | ;E-4 | ;E4 | | | | | | |
| 12178 | [illegible] | 4OKA | ;KOA | ;'KA | ;-KA | ;KA | | | | | |
| 12179 | [illegible] | 4OO+ | 4O2+ | ;OO+ | ;OQ+ | ;2Q+ | ;O+ | ;2+ | 4OO[ | 4O2[ | ;OO |
| | | ;OQ[ | ;2Q[ | ;O[ | ;2[ | | | | | | |
| 12180 | [illegible] | 4OAQ | 4OYQ | ;AYQ | ;AQ | ;YQ | | | | | |
| 12181 | [illegible] | 4OFO | 4O/O | ;FFO | ;/8O | ;/O | | | | | |
| 12182 | [illegible] | 4OTX | 4OHX | | | | | | | | |
| 12183 | [illegible] | ZHUK | ZHU. | ZHK | ZH. | ZLHK | ZLH. | ZLHI | ZLI | ZI | |
| 12184 | [illegible] | Z+H2 | Z+H8 | Z+X2 | Z+X8 | Z+2 | Z+8 | ZL+2 | ZL+8 | Z[H2 | Z[I |
| | | Z[X2 | Z[X8 | Z[2 | Z[8 | ZL[2 | ZL[8 | | | | |
| 12185 | [illegible] | AZO+ | AZ+ | ZOQ+ | ZOO+ | Z2O+ | Z2Q+ | ZO+ | AZO[ | AZ[ | ZO[ |
| | | ZOO[ | Z2O[ | Z2Q[ | ZO[ | Z[illegible] | | | | | |
| 12186 | [illegible] | 423K | 483K | 42KK | 48KK | 42.K | 48.K | 42K. | 48K. | | |
| 12187 | [illegible] | TXM2 | TXM8 | TM42 | TM48 | TM2 | TM8 | XGM2 | XMG2 | XM42 | XM2 |
| | | XGM8 | XMG8 | XM48 | XM8 | | | | | | |
| 12188 | [illegible] | 42-+ | 48-+ | 424+ | 484+ | 42+ | 48+ | 42-[ | 48-[ | 424[ | 484 |
| | | 42[ | 48[ | | | | | | | | |
| 12189 | [illegible] | HGHR | HGR | G3HK | GH-R | | | | | | |
| 12190 | [illegible] | HGH2 | HGH8 | HG2 | HG8 | GHG2 | GHG8 | | | | |
| 12191 | [illegible] | HGE4 | HG4 | GTE4 | G'E4 | GE4 | | | | | |
| 12192 | [illegible] | HGKA | GKOA | GKA | | | | | | | |
| 12193 | [illegible] | OG2B | OG8B | G24B | G2QB | G84B | G8QB | G2B | G8B | | |
| 12194 | [illegible] | OGYH | G2YH | GYAH | GYH | | | | | | |
| 12195 | [illegible] | OGWX | GW5X | GWX | | | | | | | |
| 12196 | [illegible] | OGO2 | OGO8 | GO-2 | GO-8 | GO42 | GO48 | GO2 | GO8 | | |
| 12197 | [illegible] | OGAQ | OGYQ | GAYQ | GAQ | GYQ | | | | | |
| 12198 | [illegible] | OGKA | G'KA | G-KA | GKOA | GKA | | | | | |
| 12199 | [illegible] | 4JWC | 4JC | | | | | | | | |
| 12200 | [illegible] | HQ+2 | HQ+8 | Q+H2 | Q+H8 | Q+X2 | Q+X8 | Q+2 | Q+8 | HQ[2 | HQ[ |
| | | Q[H2 | Q[H8 | Q[X2 | Q[X8 | Q[2 | Q[8 | | | | |
| 12201 | [illegible] | HQK3 | QK23 | QKB3 | QK3 | | | | | | |
| 12202 | [illegible] | HQPZ | HQP3 | QP3Z | QPZZ | QPZ | QP3 | | | | |
| 12203 | [illegible] | HQ4K | HQ42 | HQ48 | Q42K | Q422 | Q428 | Q4K2 | Q4K8 | Q4K | |
| 12204 | [illegible] | HQAQ | HQYQ | QAYQ | QAQ | QYQ | | | | | |
| 12205 | [illegible] | O+LK | 2+LK | O[LK | 2[LK | | | | | | |
| 12206 | [illegible] | HO4P | HF4P | H74P | | | | | | | |
| 12207 | [illegible] | HO+P | H2+P | H+P | XO+P | X2+P | X+P | HO[P | H2[P | H[P | XO[ |
| | | X2[P | X[P | | | | | | | | |
| 12208 | [illegible] | -Q4+ | 9-4+ | 94B+ | 94+ | -Q4[ | 9-4[ | 94B[ | 94[ | | |
| 12209 | [illegible] | -Q4K | -Q42 | -Q48 | 942K | 9428 | 94K2 | 94K8 | 94K | 942 | 948 |
| 12210 | [illegible] | 8KLA | $LEA | $LA | 8LEA | 8LA | | | | | |

12211 [illegible] 8KTG 8KDG $TDG $DTG $TG $DG 6TDG 6DTG 6TG 6D(
12212 [illegible] 8KEE 8K2E $EEE $2EE $EE $2E 6EEE 62EE 6EE 62I
12213 [illegible] $C30 $CX $C3 6C30 6CX 6C3
12214 [illegible] 8KTM 8KYM 8K3M 8KM3 $TYM $G3M $MTY $MG3 $TM $YI
$M3 6TYM 6G3M 6MTY 6MG3 6TM 6YM 6M3
12215 [illegible] 8KE3 8K23 $E83 $EE3 $2E3 $E3 $283 $23 6E83 6EI
62E3 6E3 6283 623
12216 [illegible] 8K5S $5SS $50S $5S 65SS 650S 65S
12217 [illegible] 8KTJ $TUJ $T7J $TAJ $U7J $UAJ $TJ 6TUJ 6T7J 6T/
6U7J 6UAJ 6TJ
12218 [illegible] $HBK $HK $XBK $XK 6HBK 6HK 6XBK 6XK
12219 [illegible] 8KEE $ETE $E'E $EE $1UE 6ETE 6E'E 6EE 61UE 8K\
$\TE $\'E $\E 6\TE 6\'E 6\E
12220 [illegible] 8KXX $XYX $XX 6XYX 6XX
12221 [illegible] 8K'G 8KTG $'TG $TTG 8KJG $JTG $JG 6'TG 6TTG 6J
6JG
12222 [illegible] EDX$ EDX6
12223 [illegible] 8KU2 8KU8 $U-2 $U-8 $UT2 $UT8 $UQ2 $UQ8 $U2 $U8
6U-2 6U-8 6UT2 6UT8 6UQ2 6UQ8 6U2 6U8
12224 [illegible] $LE3 $LE4 6LE3 6LE4
12225 [illegible] $LH4 $LX4 6LH4 6LX4
12226 [illegible] 8KLF $LHF $LF 8KL7 $LH7 $L7 6LHF 6LF 6LH7 6L7
12227 [illegible] 8K+J $+QJ $+SJ $+J 6+QJ 6+SJ 6+J 8K[J $[QJ $[S
$[J 6[QJ 6[SJ 6[J
12228 [illegible] $QHH $QXH 6QHH 6QXH
12229 [illegible] 8KTQ $TQX $TOX $TQ 6TQX 6TOX 6TQ
12230 [illegible] 8KS3 $3S3 $S3 63S3 6S3
12231 [illegible] TIYK TIY$ TXYK TXY$ TY8K TYK TY$ TIY6 TXY6 TY6
12232 [illegible] HBXK HBX$ HPXK HPX$ HX8K HX$ HBX6 HPX6 HX6
12233 [illegible] ESK3
12234 關 PPKR M+KR MK4R MKR M[KR
12235 [illegible] PP3H M3UH M3H
12236 [illegible] EE3E E83E E3TE E3'E 283E =83E 23E =3E
12237 [illegible] -ATP TATP MTZP MTP -TZP -TP
12238 [illegible] -AEB TAEB MEEB MEB -EEB -2EB -E'B -EB -A2B TA2B
M2'B -2'B -2B
12239 [illegible] -AQ2 -AQ8 TAQ2 TAQ8 MQH2 MQH8 MQ2 MQ8 -QH2 -QH8
12240 [illegible] -APJ TAPJ MP3J MPYJ MPJ P3J -PYJ -PJ
12241 [illegible] -AY3 TAY3 MYY3 M2Y3 MY3 -YY3 -2Y3 -A23 TA23 M23
12242 [illegible] H+HO H+XO H[HO H[XO
12243 [illegible] -OA+ -AH+ OAH+ -A+ OA+ -OA[ -AH[ OAH[ -A[ OA[
12244 [illegible] 'AX+ A-X+ ARX+ AXH+ AXX+ AX+ 'AX[ A-X[ ARX[ AXH[
AXX[ AX[
12245 [illegible] HHEA HHA
12246 [illegible] HHQ4
12247 [illegible] HHBY
12248 [illegible] EAT2 EAT8 EA2 EA8
12249 [illegible] XYT2 XYT8 XY2 XY8
12250 [illegible] QAT2 QAT8 QA2 QA8
12251 [illegible] EKT2 EKT8 EK2 EK8 E.T2 E.T8 E.2 E.8
12252 [illegible] E4RS 7R-S 7RS 7R
12253 [illegible] EKRS EKR EKS E.RS E.R E.S
12254 [illegible] AERS AER AES
12255 [illegible] RSXS RSS RX2S RX=S RXOS RXOS RXS
12256 [illegible] 8F2E 872E 82EE 82E
12257 [illegible] 8SCO 8SCX 8SC3 8SC 8FCO 8FCX 8FC3 8FC 87CO 87CX
87C3 87C 8C30 8CO 8CX 8C3
12258 [illegible] 8SHK 8FHK 87HK 8HBK 8HK 8SXK 8FXK 87XK 8XBK 8XK
12259 [illegible] YB24 YBK4 'B24 'BK4
12260 [illegible] YBQ4 'BQ4
12261 [illegible] E4KJ 7KAJ 7KJ
12262 [illegible] E4-V E44V 7-4V 7-V 74V
12263 [illegible] E4SY E4JY 7SJY 7SY 7JY
12264 [illegible] E4EZ 7EHZ 7EZ
12265 [illegible] E4WK 7W'K 7W-K 7WK
12266 [illegible] E4KH 7KKH 7KKT 7KH
12267 [illegible] E4PX 7P2X 7P=X 7PCX 7PRX 7PX
12268 [illegible] E4BG 7B-G 7BG
12269 [illegible] E4QA 7QUO 7QA
12270 [illegible] E4UX 7U2X 7U8X 7URX 7UX 7XUX 7UXX
12271 [illegible] E4EO E4E+ 7ETO 7EO 7E+ E4E[ 7E[
12272 [illegible] E4BE 7'BE 7BE 12273 E4BC E4BL 7BCL 7BC 7BL
12274 QAUO QAO
12275 E3KJ E3AJ E3J DKAJ DKJ
12276 E3EB E3B DE8B D3TB DEB
12277 E3YJ E3J DYUJ DYJ
12278 E3+A D+HA D+A E3[A D[HA D[A
12279 -AUX OAUX -OAX
12280 U4HX JH2X JH8X JHRX JHX
12281 U4PX U44X JPX J-4X J4X
12282 U4YT JYTT JY2T JYT JY2
12283 U4EE JEUE JEE
12284 U4BF U4B2 U4F JBFF JB2F JBF JB2 U4B7 U47 JB
JB27 JB7 U4B% JB%
12285 U4AO JATO JAO
12286 U4ER U4;R JEER JER J;R
12287 U48G J8LG J8JG J8G
12288 U43Q J3LQ J3Q
12289 2E84 23T4 28U4 2E8J 23TJ =E84 =3T4 =8U4 =E8J =3
12290 YDU4 YD4
12291 U4TV JTKV JTV
12292 U4TZ JTOZ JTZ
12293 U4HH U46 JH2H JH8H JHRH J6
12294 U4HK U4H2 U4H8 JH2K JH=K JH22 JH=2 JH28 JH=8 JH
JH2 JH8
12295 U4EE JEE J2E
12296 U4YZ J'YZ JYZ U4'Z J'Z- J'Z
12297 ULB4 UAL5 UL5
12298 T3B4 TO35 T35
12299 LTB4 L2B4 L8B4 LET5 L25 L85
12300 EAB4 EA4 IEA5 EA5
12301 -VB4 +VB4 EVB4 -V4 +V4 EV4 -EV5 +EV5 -V5 +V
EV5 [VB4 [V4 [EV5 [V5
12302 HHB4 6BS4 6B54 6B4 H2H5 H8H5 HRH5 65
12303 B4HK B4H2 B4H8 5H2K 5H=K 5H22 5H=2 5H28 5H=8 5H
5H2 5H8
12304 KJB4 KJ4 KJO5 KJ5
12305 YTB4 Y2B4 YT4 YTT5 Y2T5 YT5
12306 POB4 P+O5 PO5 P[O5
12307 PEB4 PE4 PEE5 P2E5 PE5 P25
12308 4XB4 4X5
12309 T+B4 TB+5 T+5 T[B4 TB[5 T[5
12310 CYB4 CY4 JYB4 JY4 'CY5 C2Y5 CY5 'JY5 J2Y5 JY
12311 URB4 UBR5 UR5
12312 UOB4 UO4 UHO5 UO5
12313 AXB4 APX5 AX5
12314 3QB4 LQB4 3LQ5 3Q5 LQ5
12315 PAB4 PA4 'PA5 .PA5 PA5
12316 BS4E B54E B4TE B4'E B4E 5TTE 5THH 5TE 5'E 5E
12317 ERB4 2RB4 ;RB4 ;R4 EER5 2R5 ;R5
12318 Q4B4 Q+B4 Q44 Q+4 'Q45 'Q+5 Q45 Q+5 Q[B4 Q[4
'Q[5 Q[5
12319 YDB4 YD4 'YD4 'DB4 'YD5 'D5
12320 B4BH B4H 5B'H 5B'X 5BT+ 5BH 5BX 5BT[
12321 YBB4 YQB4 YB5 YQ5
12322 8OB4 8HO5
12323 LHFO LFAO LHO LFO LATO LH7O L7AO L7O
12324 LHFR LFER LF;R LHR LFR LEER L;R LH7R L7ER L7;R
L7R
12325 LYPX LY4X L24X LYYX L2YX LYX
12326 4A+A 4A[A
12327 ELHJ ;LHJ ELJ ;LJ
12328 4QHZ 4H-Z 4HCZ 4HZ 4QXZ 4X-Z 4XCZ 4XZ
12329 4QHC 4QHO 4HCO 4HC 4HJO 4QXC 4QXO 4XCO 4XC 4XJO
12330 TDK4 TKH4 TK24 TXH4 TX24 .XH4 .X24
12331 GUCJ GQCJ GUJ GQJ
12332 GULT GQLT
12333 GU82 GQ82
12334 C44E C24E C4TE C4'E C4E
12335 TZO+ TZ2+ TZ+ TZO[ TZ2[ TZ[
12336 OUOR OUFR OU7R OUUR OUR
12337 EXEO EXUO ;XUO EUHO ;UHO ;XO
12338 IH4U IHPU IH4P IHPP H4NH H4NP HPNU HPNP
12339 VTEM VTME VT-M V2EM V2ME V2-M V4EM V4ME V4-M VTM
V2M V4M 12340 [illegible] EWWB E2WB E2UB EWUB EWB EWWO EWUO EWO EHUB EKUB EXUB \WWB \2WB \2UB \WUB \WB \WWO \WUO \WO \HUB \KUB \XUB 12341 [illegible] ETKM ET.M EUKM EU.M ETXM E.XM \TKM \T.M \UKM \U.M \TXM \.XM 12342 [illegible] L42V L48V L44V L4V L2V 12343 [illegible] LU4E LUE LJ2E LJE 12344 [illegible] 'TTK ]TOK ]TEK ]T2K ]TK 12345 [illegible] 'TB3 'TB4 TBE3 TBE4 TBK3 TBK4 ]BE3 ]B3 ]BE4 ]B4

12346 [illegible] ITOK ITEK

12347 [illegible] FLHY FLFY FL2Y FLY

12348 [illegible] F42V F48V F44V F4V F2V

12349 [illegible] FTEM FTME FT-M F2EM F2ME F2-M F4EM F4ME F4-M FTM F2M F4M

12350 [illegible] FUEG FU8G

12351 [illegible] DTEK DTE2 DTE8 DT;K DT;2 DT;8

12352 [illegible] BTAL BTL

12353 [illegible] BHO4 BHF4 BH74 BH4 BXO4 BXF4 BX74 BX4

12354 [illegible] B-AE BTAE BMTE BM'E BME B-TE B-'E

12355 [illegible] YTAL YTL

12356 [illegible] YT4K

12357 [illegible] YLYG YL'G YL2G YLG

12358 [illegible] YTU4 YT74 YTQ4 YU74 YUQ4 YT4 YU4

12359 [illegible] YHEK YHE2 YHK YXEK YXE2 YXK

12360 [illegible] EBHY BTHY EHY BHY

12361 [illegible] YE4O YEO

12362 [illegible] YU4Y YU4' YJ'Y YJY

12363 [illegible] 3TOK 3TEK

12364 [illegible] 32Y2 32Y8 3YQ2 3YQ8 3Y2 3Y8

12365 [illegible] 3WWB 32WB 3WUB 32UB 3WB 3HUB 3XUB 3KUB

12366 [illegible] 3EE2 3EE8 3EQ2 3EQ8 3E2 3E8 32Q2 32Q8

12367 [illegible] 342V 348V 344V 34V 32V

12368 [illegible] 34LJ

12369 [illegible] 3A4J 3ABJ

12370 [illegible] 3TEM 3TME 3T-M 32EM 32ME 32-M 34EM 34ME 34-M 3TM 34M

12371 [illegible] 3TX3 3TXN 3QX3 3QXN

12372 [illegible] 3UOR 3UFR 3U7R 3UUR

12373 [illegible] 38OA 383A

12374 [illegible] TQX3 TQX4 TXB3 TXB4

12375 [illegible] 3-A4 3TA4 3MY4 3M4 3-Y4

12376 [illegible] 3H2M 3H8M 3HM2 3HM8

12377 [illegible] 3HL4 3XL4

12378 [illegible] 3PP3 3PP4 3MB3 3MB4 3M3 3M4

12379 [illegible] WPPE WPP; WMUE WMU; WME WM;

12380 [illegible] W2EM W2SM W25M W2M

12381 [illegible] EE'H 2TEH 2'EH 2'H =TEH ='EH ='H EE'X 2TEX 2'EX 2'X' =TEX ='EX ='X 12382 [illegible] ZTOK ZTEK ZTK 12383 [illegible] Z5-A Z5TA Z5KA Z5A 12384 [illegible] EXEE EXUE EUE. ;XUE ;UE. ;XE ;UE 12385 [illegible] 'BL4 BLH4 BLF4 BL74

12386 [illegible] 'BBY 'BNY BBNY BNBY BB2Y BB4Y

12387 [illegible] H2EX H8EX

12388 [illegible] NHX4 NX4-

12389 [illegible] 4LH2 4LH8 4L2 4L8

12390 [illegible] 4U4X 4UAX 4UX

12391 [illegible] 44UD 44D

12392 [illegible] 44EX 24EX =4EX 4EX

12393 [illegible] TK4F K4SF K4AF K4F TK47 K4S7 K4A7 K47

12394 [illegible] TOE2 TOE8 +EX2 +WX8 +E2 +E8 [EX2 [WX8 [E2 [E8

12395 [illegible] TOHM +H4M +HM TOXM +X4M +XM [H4M [HM [X4M [XM

12396 [illegible] TO3Q +QQQ +3Q [QQQ [3Q

12397 [illegible] QQQO QQQ+ 3QTO 3Q+ QQQ[ 3Q[

12398 [illegible] TOH3 TOX3 +HW3 +HWY [HW3 [HWY +XW3 +XWY [XW3 [XWY

12399 [illegible] TOT2 TOT8 +TT2 +TT8 +T42 +T48 +242 +248 +T2 +T8 [TT2 [TT8 [T42 [T48 [242 [248 [T2 [T8

12400 [illegible] -YLA 23LA =3LA KLHA KLXA KLA

12401 [illegible] 'YL4 YLH4 YLF4 YL74 'LH4 'LF4 'L74 'L4

12402 [illegible] 'YL2 'YL8 YLH2 YLH8 YLQ2 YLQ8 YL2 YL8 'LH2 'LH8 'LQ2 'LQ8 'L2 'L8 YLX2 YLX8 'LX2 'LX8

12403 [illegible] 'YUB YUQB YU4B 'UQB 'U4B 'UB 'YJB

12404 [illegible] T+XX T[XX

12405 [illegible] /HOH /HUH
12406 [illegible] FF-Z FF4Z /-HZ /4HZ /-Z /4Z
12407 [illegible] FFEE /EEE /2EE /2TE /2'E /EE
12408 [illegible] FFTZ /TOZ /TUZ /TZ
12409 [illegible] FFEK FF;K /E5K /;5K /EK /;K
12410 [illegible] 2YE4 =YE4 YEF4
12411 [illegible] N3MA N3MM N-AA N-AM NTAA NTAM NMTA N3-M N-TA N-TM
N-M
12412 [illegible] N3OZ NOBZ NOZ
12413 [illegible] N3H4 NH44 NHQ4 NH4
12414 [illegible] N3T2 N3T8 NT4K NT42 NT48 NT2 NT8
12415 [illegible] 2E-A 2E-M 2ETM 2EMA 2EMM =E-A =E-M =ETM =EMA =EMM
12416 [illegible] HJEE EJEE EJ2E 3JEE 3J2E HLJ2 HJJ2 HHJ2 E'J2 3'J2
EJ2 3J2
12417 [illegible] PUGJ PU4J PUJ -4UJ 4UGJ 4U4J
12418 [illegible] A-AE ATAE AMTE AM'R AME A-TE A-'E A-E
12419 [illegible] AHO4 AHF4 AH74 AH4 AXO4 AXF4 AX74
12420 [illegible] 'AHZ A-HZ AHUZ AHZ 'AXZ A-XZ AXUZ AXZ
12421 [illegible] 'ATH A-TH ATDH YTKH ATXH A.XH ATX2 A.X2
12422 [illegible] HTAL XTAL
12423 [illegible] H-AE HTAE HMTE HM'E HME X-AE XTAE XMTE XM'E XME
H-TE H-'E
12424 [illegible] HE40 HEOO XE40 XEOO
12425 [illegible] HYO2 HYO2 HYO8 HYO8 HYU2 HYU8 HY2 HY8 XYO2 XYO2
XYO8 XYO8 XYU2 XYU8 XY2 XY8
12426 [illegible] HHLA HHA XHLA XHA
12427 [illegible] HF4H HFH XF4H XFH
12428 [illegible] HLYG HL2G HLG XLYG XL2G XLG
12429 [illegible] HO+T H2+T XO+T X2+T HO[T H2[T XO[T X2[T
12430 [illegible] H4UX HUTX X4UX XUTX
12431 [illegible] H'TJ HTUJ X'TJ XTUJ H]UJ H]JJ X]UJ X]JJ
12432 [illegible] H'T3 H'TY HTP3 HTPY X'T3 X'TY XTP3 XTPY H]P3 H]PY
12433 [illegible] HTYR XTYR
12434 [illegible] SU32 SU38 SU2 SU8
12435 [illegible] STDH STKH STXH STX2 S.XH S.X2
12436 [illegible] OSWY SWWY S2WY SWUY S2UY SWY OSWY SHUY SXUY SKUY
12437 [illegible] OSEE SEEE S2EE SEE OSEE S2TE S2'E
12438 [illegible] OSHZ SHUZ SHZ OSHZ OSXZ SXUZ SXZ OSXZ
12439 [illegible] OSHX SHEX SHX OSHX OSXX SXEX SXX OSXX
12440 [illegible] K4QH K4QX
12441 [illegible] K-AA K-AM KTAA KTAM KMTA KTM KMM K-TA K-M
12442 [illegible] 4RTX 4R]X 4RX
12443 [illegible] EXEA EXUA ;XUA ;XA EUA ;UA EUUA ;UUA
12444 [illegible] ;TQB ;TQ- ;TQ4
12445 [illegible] 4OHC ;HBC ;HBL ;HC 4OXC ;XBC ;XBL ;XC
12446 [illegible] 4O4L 4OOL 4OQL ;4LB ;4LE ;4BL ;4EL ;OLB ;OLE ;OBL
;OEL ;QLB ;QLE ;QBL ;QEL
12447 [illegible] 4OQK ;QLK
12448 [illegible] 4O8T 4O82 4O84 ;8OT ;8-T ;8-2 ;8-4 ;822 ;824 ;8T
;82 ;84 ;8B2 ;8B8
12449 [illegible] BDXO BDX; BX4O BXO BX;
12450 [illegible] 4OL4 ;LK4 ;L4 ;L24
12451 [illegible] 4OEX ;EHX ;;HX ;;X
12452 [illegible] HGOY HG3Y
12453 [illegible] GTUZ GT7Z GU7Z
12454 [illegible] OGBX GBDX GBX
12455 [illegible] POHG PTHG PHOG
12456 [illegible] Q2EM
12457 [illegible] HQHQ QHTQ QH2Q QHQ
12458 [illegible] HQOG HQMG QOMG QMOG QOG QMG
12459 [illegible] HQHL QHBC QHBL QHC QHL HQXL QXBC QXBL QXC QXL
12460 [illegible] HQ4K Q4-K Q4OK Q4K
12461 [illegible] +EX+ +EXQ +XHQ +X+ +XQ [EX[ [EXQ [XHQ [X[ [XQ
12462 [illegible] 9Q3Z 9Q4Z 9O3Z 9O4Z 93Z 94Z
12463 [illegible] -AOP TAOP M3OP MOP -3OP -OP -A3P TA3P M33P M3P
-33P -3P
12464 [illegible] UORP UFRP U7RP UURP
12465 [illegible] -QTG 9TKG 9TBG 9TG
12466 [illegible] -QTZ 9TUZ 9T7Z 9U7Z 9TZ 9UZ
12467 [illegible] -QQK 9QLK 9QK
12468 [illegible] -Q4H 94HH 94H
12469 [illegible] 8K3C $3BC $3C 63BC 63C
12470 [illegible] $TZX 6TZX
12471 [illegible] 8KYH $2YH $YAH $YH 62YH 6YAH 6YH 12472 [illegible] $2HB $K4B 62HB 6K4B
12473 [illegible] $29J $KQJ 629J 6KQJ
12474 [illegible] 8K4+ $-4+ $4B+ $4+ 6-4+ 64B+ 64+ 8K4[ $-4[ $4B[
$4[ 6-4[ 64B[ 64[
12475 [illegible] $HAX $HX 6HAX 6HX
12476 [illegible] 8KRB $KKB $2KB $RRB $2RB $RB 6KKB 62KB 6RRB 62R
6RB
12477 [illegible] $K23 $KB3 6K23 6KB3
12478 [illegible] 8K52 8K58 $522 $528 $542 $548 $52 $58 6522 652
6542 6548 652 658
12479 [illegible] 8KWK 8KW. $W-K $WOK $WK 6W-K 6WOK 6WK
12480 [illegible] 8KSA $SJA $SA $JA 6SJA 6SA 6JA
12481 [illegible] $H-H $X-H $X-X 6H-H 6X-H 6X-X
12482 [illegible] 8K02 8K08 $0-2 $0-8 $042 $048 $02 $08 60-2 60-
6042 6048 602 608
12483 [illegible] 8K4K $42K $422 $428 $4KK $4K2 $4K8 $4K 642K 642
6428 64KK 64K2 64K8 64K
12484 [illegible] 8KAQ 8KYQ $AYQ $AQ $YQ 6AYQ 6AQ 6YQ
12485 [illegible] 8KE4 $TE4 $'E4 $E4 6TE4 6'E4 6E4
12486 [illegible] 8KNM $NNM $NTM $NKM $NMT $NMK $NM 6NNM 6NTM 6NK
6NMT 6NMK 6NM
12487 [illegible] 8KWC $WWC $2WC $WUC $2UC $HUC $KUC $XUC $XC 6WW
62WC 6WUC 62UC 6HUC 6KUC 6XUC 6XC
12488 [illegible] $W5X 6W5X
12489 [illegible] 8KL2 8KL8 $LL2 $LL8 $LH2 $LH8 $KH2 $KH8 $2H2 $2
6LL2 6LL8 6LH2 6LH8 6KH2 6KH8 62H2 62H8
12490 [illegible] 8K+G $+AG $+QG $+SG $+G 6+AG 6+QG 6+SG 6+G 8K
$[AG $[QG $[SG $[G 6[AG 6[QG 6[SG 6[G
12491 [illegible] 8K+2 8K+8 $+H2 $+H8 $+X2 $+X8 $+2 $+8 6+H2 6+
6+X2 6+X8 6+2 6+8 8K[2 8K[8 $[H2 $[H8 $[X2 $[
$[2 $[8 6[H2 6[H8 6[X2 6[X8 6[2 6[8
12492 [illegible] 8KPC $PBC $PC 6PBC 6PC
12493 [illegible] 8K3Y $3UY $3OY 63UY 63OY
12494 [illegible] 8KFY 8K/Y $FFY $/YU $/Y 6FFY 6/YU 6/Y
12495 [illegible] $UBZ 6UBZ
12496 [illegible] 8KEY $TEY $'EY $EY 6TEY 6'EY 6EY
12497 [illegible] 8KNO $N3O $NHO $NO 6N3O 6NHO 6NO
12498 [illegible] P2ZK P2Z$ PKZK PKZ$ PZ8K PZK PZ$ P2Z6 PKZ6 PZ
12499 [illegible] PPHX MTPX MHPX MHX MT4X MH4X M4X
12500 [illegible] PP02 PP08 M0-2 M0-8 M042 M048 M02 M08
12501 [illegible] PP8E PP82 M8-E M8OE M8-2 M802 M8E M82
12502 [illegible] -A3L TA3L M3HL -3HL -3L
12503 [illegible] -AWK TAWK MW-K MQOK -AW. TAW. -A. TA. MW. -W
-W.
12504 [illegible] H+TP X+TP H[TP X[TP
12505 [illegible] H+QV H+V X+QV X+V H[QV H[V X[QV X[V
12506 [illegible] 8QTB 89TB 89B
12507 [illegible] HBXB HPXB HXTB HXB
12508 [illegible] -3T2 43T2 4YT2 -3T8 43T8 4YT8
12509 [illegible] HAT2 HAT8 HA2 HA8 XAT2 XAT8 XA2 XA8
12510 [illegible] TMT2 YMT2 GMT2 3MT2 TMT8 YMT8 GMT8 3MT8
12511 [illegible] E3T2 E3T8 23T2 =3T2 23T8 =3T8 E32 E38
12512 [illegible] EBRS E'BR 2BRS =BRS 2'BR ='BR EBR EBS
12513 [illegible] RSE3 RS23 RS3 RE83 R283 RE3 R23
12514 [illegible] 8SHK 8SH. 8S1 8FHK 8FH. 8F1 87HK 87H. 871 8H
8HU. 8H. 81
12515 [illegible] 8HOO 8HHO 8HKO
12516 [illegible] 8S+2 8S+8 8F+2 8F+8 87+2 87+8 8+H2 8+H8 8+X2 8+
8S[2 8S[8 8F[2 8F[8 87[2 87[8 8[H2 8[H8 8[X2 8[
12517 [illegible] 8SL2 8SL8 8FL2 8FL8 87L2 87L8 8LL2 8LH2 8LL8 8L
8KH2 8KH8 82H2 82H8
12518 [illegible] 8S02 8S08 8F02 8F08 8702 8708 80-2 8042 80-8 80
802 808
12519 [illegible] 8S3Y 8F3Y 873Y 83UY 83OY 83Y
12520 [illegible] E4H+ 7HB+ 7H+ E4X+ 7XB+ 7X+ E4H[ 7HB[ 7H[ E4
7XB[ 7X[
12521 [illegible] E4BV 7BUV 7BV
12522 [illegible] E4AK 7ANK 7AK
12523 [illegible] E4Y2 E4YF E4'F E4Y7 E4'7 7'YF 7YFF 7Y2F 7YF 7'
7Y77 7Y27 7Y7 7'2F 7'F 7'77 7'27 7'7 E4# 7#
12524 [illegible] E4EX E4;X 7EEX 7E1X 7EX 7;X
12525 [illegible] 72CE E4JJ 72JE 7JJ
12526 [illegible] E4QR 7'QR 7QRS 7QR 7R

| | | | | | | | | | | | |
|---|---|---|---|---|---|---|---|---|---|---|---|
| 12527 | [illegible] | E4SQ | 7SDQ | 7SQ | | | | | | | |
| 12528 | [illegible] | E4PE | E4P2 | 7'PE | 7.PE | 7PEE | 7P2E | 7'P2 | 7.P2 | 7P2 | |
| 12529 | [illegible] | PG34 | P3E4 | PG4 | PG37 | P37 | | | | | |
| 12530 | [illegible] | QATA | | | | | | | | | |
| 12531 | [illegible] | QA2H | | | | | | | | | |
| 12532 | [illegible] | QA+J | QA[J | | | | | | | | |
| 12533 | [illegible] | E3HB | E3B | DHFB | DH7B | DHB | | | | | |
| 12534 | [illegible] | E3+K | E3+2 | E3+8 | E3FK | E3F2 | E3K | E32 | E38 | D+4K | DF4K |
| | | D+K | D+2 | D+8 | E3[K | E3[2 | E3[8 | D[4K | D[K | D[2 | D[8 |
| 12535 | [illegible] | E324 | E3K4 | DKE4 | D2E4 | DK4 | D24 | | | | |
| 12536 | [illegible] | U4CV | JCBV | JCV | | | | | | | |
| 12537 | [illegible] | U4HY | JHLY | JHY | | | | | | | |
| 12538 | [illegible] | U4BG | JB-G | JBG | | | | | | | |
| 12539 | [illegible] | U4QA | JQUS | JQA | | | | | | | |
| 12540 | [illegible] | JTBX | | | | | | | | | |
| 12541 | [illegible] | JTCK | | | | | | | | | |
| 12542 | [illegible] | BKU4 | BRU4 | BK4 | BR4 | BCRJ | BSKJ | BKJ | BSRJ | BRJ | |
| 12543 | [illegible] | U4SY | JSJY | JSY | JJY | | | | | | |
| 12544 | [illegible] | U4EZ | JEHZ | JEZ | | | | | | | |
| 12545 | [illegible] | U4EB | J3TB | JE8B | JEB | | | | | | |
| 12546 | [illegible] | J+OA | J[OA | | | | | | | | |
| 12547 | [illegible] | U4OM | U4MO | J-OM | JM-O | JOM | JMO | | | | |
| 12548 | [illegible] | U4BE | J'BE | JBE | | | | | | | |
| 12549 | [illegible] | UKB4 | U2K5 | U8K5 | URK5 | | | | | | |
| 12550 | [illegible] | TEB4 | TUE5 | | | | | | | | |
| 12551 | [illegible] | UHB4 | UQB4 | U+B4 | UHQ5 | UQ5 | U[B4 | | | | |
| 12552 | [illegible] | -QB4 | OQB4 | -OQ5 | -Q5 | OQ5 | | | | | |
| 12553 | [illegible] | YCB4 | YC4 | YJB4 | YJ4 | YOC5 | YOC5 | YC5 | YOJ5 | YOJ5 | YJ5 |
| 12554 | [illegible] | +AB4 | +A4 | +OA5 | [AB4 | [A4 | [OA5 | | | | |
| 12555 | [illegible] | YZB4 | Y.Z5 | .YZ5 | YZ5 | | | | | | |
| 12556 | [illegible] | FBB4 | FB4 | 7BB4 | 7B4 | 2'B5 | ='B5 | F'B5 | FFB5 | 2FB5 | =FB5 |
| | | FB5 | 7'B5 | 77B5 | 27B5 | =7B5 | 7B5 | %BB4 | %B4 | %B5 | |
| 12557 | [illegible] | CVB4 | CV4 | CBV5 | CV5 | | | | | | |
| 12558 | [illegible] | SYB4 | SY4 | JY4 | SJY5 | SY5 | JY5 | | | | |
| 12559 | [illegible] | HJB4 | XJB4 | HSJ5 | HJ5 | XSJ5 | XJ5 | | | | |
| 12560 | [illegible] | 4KB4 | 4K4 | 4K.5 | 4.K5 | 4K5 | | | | | |
| 12561 | [illegible] | BGB4 | BG4 | B-G5 | BG5 | | | | | | |
| 12562 | [illegible] | BCB4 | BLB4 | BL4 | BJB4 | BCL5 | BC5 | BL5 | BJL5 | BJ5 | |
| 12563 | [illegible] | OSB4 | O5B4 | OCB4 | OJB4 | OOS5 | O-S5 | OO55 | O-55 | OOC5 | O2C5 |
| | | O=C5 | OOJ5 | O2J5 | O=J5 | 2-S5 | =-S5 | 2-55 | =-55 | 22C5 | ==C5 |
| | | 22J5 | ==J5 | | | | | | | | |
| 12564 | [illegible] | AXB4 | AX4 | AHX5 | AX5 | | | | | | |
| 12565 | [illegible] | OZB4 | OZ4 | OZL5 | OZ5 | | | | | | |
| 12566 | [illegible] | L4B4 | L44 | L+45 | L45 | L[45 | | | | | |
| 12567 | [illegible] | PAB4 | PA4 | 'PA5 | .PA5 | PUH5 | PA5 | | | | |
| 12568 | [illegible] | KNN4 | K2N4 | KNB4 | K2B4 | KN4 | HNN4 | H2N4 | HNB4 | H2B4 | HN4 |
| | | XNN4 | X2N4 | X2B4 | XNB4 | XN4 | KNN5 | K2N5 | K25 | KN5 | HNNE |
| | | H2N5 | HN5 | H25 | XNN5 | X2N5 | XN5 | X25 | | | |
| 12569 | [illegible] | SJX4 | SXB4 | SJX5 | STX5 | JTX5 | SX5 | | | | |
| 12570 | [illegible] | 'YW4 | 'WB4 | YWB4 | YW4 | 'YW5 | YW5 | 'W5 | | | |
| 12571 | [illegible] | +OA4 | +AB4 | +OA5 | [OA4 | [AB4 | [OA5 | | | | |
| 12572 | [illegible] | HKB4 | HK4 | XKB4 | XK4 | HUK5 | XUK5 | | | | |
| 12573 | [illegible] | LHFM | LFOM | LFMO | LHM | LFM | LH7M | L7OM | L7MO | L7M | |
| 12574 | [illegible] | LF5P | LF54 | L75P | L754 | | | | | | |
| 12575 | [illegible] | LHFX | LFPX | LH7X | L7PX | | | | | | |
| 12576 | [illegible] | 44T3 | Q4T3 | | | | | | | | |
| 12577 | [illegible] | 44KL | 44L | Q4KL | | | | | | | |
| 12578 | [illegible] | 'YD4 | 'D44 | YD44 | 'DQ4 | YDQ4 | | | | | |
| 12579 | [illegible] | 44UL | Q4UL | 44L | | | | | | | |
| 12580 | [illegible] | EL42 | ;L42 | EL2 | ;L2 | EL48 | ;L48 | EL8 | ;L8 | | |
| 12581 | [illegible] | ELEZ | ;LEZ | ELZ | ;LZ | | | | | | |
| 12582 | [illegible] | GUHL | GQHL | GQL | | | | | | | |
| 12583 | [illegible] | GUUO | GUDO | GQUO | GQDO | GUO | GQO | | | | |
| 12584 | [illegible] | GUO2 | GQO2 | GUO8 | GQO8 | | | | | | |
| 12585 | [illegible] | GUSO | GQSO | GUO | GQO | | | | | | |
| 12586 | [illegible] | GUUL | GQUL | GQL | | | | | | | |
| 12587 | [illegible] | AEB2 | | | | | | | | | |
| 12588 | [illegible] | THKE | TXKE | TH2E | TH8E | TX8E | THE | | | | |
| 12589 | [illegible] | T242 | T248 | THR2 | THR8 | TTK2 | TTK8 | TKK2 | T2K2 | TKK8 | T2 |
| | | TK42 | TK48 | TRR2 | T2R2 | TRR8 | T2R8 | TR42 | TR48 | | |
| 12590 | [illegible] | LYEJ | LEJ | L22J | | | | | | | |
| 12591 | [illegible] | 242J | =42J | 248J | =48J | HR2J | HR8J | TK2J | TK8J | KK2J | 2K |
| | | K42J | KK8J | 2K8J | K48J | =K2J | =K8J | RR2J | 2R2J | R42J | RK |
| | | 2R8J | R48J | =R2J | =R8J | | | | | | |

12592 嚨 OTYE

12593 嚳 OEX2 OEX8 OE2 OE8

12594 嚾 OHOE OH2E OHE OXOE OX2E OXE

12595 嬭 VEEA VIUE V\EA

12596 孆 VEEX V2EX

12597 巑 EBGE EBEE IUBE

12598 巏 EHOE EH2E EHE EXOE EX2E EXE

12599 廱 L3LE L3E

12600 懽 I2HE IHOE IH2E I2XE IXOE IX2E

12601 摳 FU2L FU8L FURL FUEL FU:L

12602 檮 YH3J YX3J

12603 櫼 YTEM YTME YT-M Y2EM Y2ME Y2-M Y4EM Y4ME Y4-M YT Y4M

12604 櫵 YUOR YUFR YU7R YUUR

12605 櫸 YE5H YEKH Y:5H Y:KH Y:H

12606 櫰 YTOK YTEK

12607 灢 3UEK 3UE. 3U-K 3UOK 3EUK 3EU.

12608 灖 3PPP 33P 33-4 334 3444

12609 灦 3KKA 3K-A 3KOA 3RRA 3R-A 3ROA

12610 灈 344E 34TE 34'E 34E

12611 灕 33LE 33TE 33'E

12612 灋 33QH 33IH

12613 灎 3HE4 3XE4

12614 爝 WA4J WABJ WAJ

12615 爚 W8-A W8OA W83A W8A

12616 爙 WTOK WTEK WT2K

12617 獾 ZHOE ZH2E ZHE ZXOE ZX2E ZXE

12618 甗 TA-Z TACZ TUAZ T7AZ U7AZ UA-Z UACZ

12619 瓥 L2Y2 L2Y8 L'Y2 L'Y8 LYE2 LYE8 LY2 LY8 L'E2 L'E8 L2'2 L2'8

12620 矙 4-AE 4TAE 4MTE 4M'E 4ME 4-TE 4-'E 4-E

12621 礹 TOME TO-E +-AE +TAE +MTE +M'E +ME +-TE +-'E +-E [-AE [TAE [MTE [M'E [ME [-TE [-'E [-E

12622 礵 TALO TAL+ TLTO TLO TAL[

12623 礫 TOW3 TOWN +WW3 +2W3 +WWN +2WN +WU3 +2U3 +WUN +2UN +KU3 +KUN +HU3 +HUN +XU3 +XUN +W3 +WN [WW3 [2W3 [WWN [2WN [WU3 [2U3 [WUN [2UN [KU3 [KUN [HU3 [HUN [XU3 [XUN [W3 [WN

12624 籛 FFQX /QVX /QX

12625 籜 FF3Q /3AQ /3YQ /3Q

12626 籟 2YLA YLHA YLXA =YLA

12627 纑 N3L2 NLH2 NL2 N3L8 NLH8 NL8

12628 纈 Y3T2 YNT2 Y32 YN2 Y3T8 YNT8 Y38 YN8

12629 纋 NHO2 NHO8

12630 纏 NT4X NTUX

12631 纗 N34H N4HH N44H N4H N3QH NQHH NQ4H NQH

12632 纝 QQQ3 QQQN 3QN3 3Q3 3QN

12633 纞 QQQE 3QHE 3QE QQQ\ 3QH\ 3Q\

12634 羻 2ELX =ELX

12635 耰 2YTX =YTX

12636 躉 TLAR TLQR TLYR TOAR TOQR TOYR TQYR TAQR COAR CAQR CAYR CQYR CQR CYR CQY

12637 鱌 HTOK HTEK XTOK XTEK

12638 鱄 HLHY HLFY HL7Y HL2Y HF2Y H72Y HLY XLHY XLFY XL7Y XL2Y XF2Y X72Y XLY

12639 鱥 ++MO H-AO HTAO HM3O X-AU XTAO XM3O XMO H-3O H-O X-3O X-O ++M3 H-A3 HTA3 X-A3 XTA3 XM3 [[MO [[M3

12640 鱅 HPAG HPG XPAG XPG

12641 鮭 HH2E HH8E XH2E XH8E

12642 鰣 HH+C HH+Y XH+C XH+Y HH[C HH[Y XH[C XH[Y

12643 鰠 HEXE HEX3 XEXE XEX2

12644 鱸 HTZZ HUZZ XTZZ XUZZ XTZ

12645 鰣 H4LJ H4WJ HLWJ X4LJ X4WJ XLWJ

12646 鰹 H42V H48V H44V H2V X42V X48V X44V X2V

12647 鰷 HKHQ HKQ XKHQ XKQ

12648 鰵 HTX3 HTXN HQX3 HQXN HT3 HTN XTX3 XTXN XQX3 XQXN XT3 XTN

12649 鼓 H8TX H82X H84X X8TX X82X X84X X8X

12650 齗 H8OA H83A X8OA X83A

12651 蠕 OS4B OS:B S4OB S4HB S4B S:HB S:B OS4B OS:B

12652 蠕 OS3Q SQQQ S3Q OS3Q

12653 蠘 OSHM SH4M SHM OSHM OSXM SX4M SXM OSXM

12654 嬲 TQSS TQ2S

| | | | | | | | | | | | |
|---|---|---|---|---|---|---|---|---|---|---|---|
| 12655 | [illegible] | 29SS | 202S | 20S | 202 | KOSS | KO2S | KOS | =0SS | =02S | =0S |
| | | =02 | =9= | | | | | | | | |
| 12656 | [illegible] | YXYS | YXKS | YKOS | YKOS | YYKS | YYS | YKS | | | |
| 12657 | [illegible] | AJSS | AJ2S | AZJS | AJS | ZJSS | ZJ2S | ZJS | | | |
| 12658 | [illegible] | '4HM | '4M | 4H4M | 4HM | 4-HM | 4-M | '4XM | 4X4M | 4XM | 4-XM |
| 12659 | [illegible] | KHO2 | KHO8 | | | | | | | | |
| 12660 | [illegible] | KH42 | KH48 | | | | | | | | |
| 12661 | [illegible] | KBH3 | KBH4 | KB3 | KB4 | | | | | | |
| 12662 | [illegible] | KTBB | KT2B | KTTB | | | | | | | |
| 12663 | [illegible] | FKGA | FSGA | FGUA | 7KGA | 7SGA | 7GUA | | | | |
| 12664 | [illegible] | ;TUZ | ;TOZ | | | | | | | | |
| 12665 | [illegible] | ;HLJ | ;HJJ | ;3'J | ;E'J | ;EJ | | | | | |
| 12666 | [illegible] | ;DGG | ;2DG | | | | | | | | |
| 12667 | [illegible] | 4OFG | ;FKG | ;FSG | ;FG | 407G | ;7KG | ;7SG | ;7G | | |
| 12668 | [illegible] | 4440 | 4240 | 4840 | 44; | 42; | 48; | 2420 | =420 | 2480 | =4 |
| | | 242; | =42; | 248; | =48; | 240 | =40 | 2; | =; | | |
| 12669 | [illegible] | 42E4 | 48E4 | | | | | | | | |
| 12670 | [illegible] | 4242 | 4848 | 342 | 348 | | | | | | |
| 12671 | [illegible] | HGEE | HG2E | GEEE | GEE | | | | | | |
| 12672 | [illegible] | OGTA | OGKA | G-2A | G-8A | GT2A | GT8A | GK1A | GKUX | GKU4 | GT |
| | | GKA | | | | | | | | | |
| 12673 | [illegible] | OGEH | GT4H | G4-H | GEAH | GEH | | | | | |
| 12674 | [illegible] | HQE4 | QEF4 | QE4 | | | | | | | |
| 12675 | [illegible] | HQ4J | Q4EJ | Q4J | | | | | | | |
| 12676 | [illegible] | E5EQ | E5KQ | E5Q | ;5KQ | ;5Q | ;KQ | | | | |
| 12677 | [illegible] | U-KP | UOKP | UEKP | EUKP | UE.P | EU.P | UKP | U.P | | |
| 12678 | [illegible] | HOEP | H2EP | XOEP | X2EP | | | | | | |
| 12679 | [illegible] | EEAP | IUEP | | | | | | | | |
| 12680 | [illegible] | -QMA | -QMM | 0-AA | 0-AM | OTAA | OTAM | OMTA | OMM | O-TA | 0- |
| 12681 | [illegible] | 8KTG | $TKG | $TBG | $TG | 6TKG | 6TBG | 6TG | | | |
| 12682 | [illegible] | $TUZ | $T7Z | $U7Z | 6TUZ | 6T7Z | 6U7Z | | | | |
| 12683 | [illegible] | 8K4K | $4-K | $40K | $4K | 64-K | 640K | 64K | | | |
| 12684 | [illegible] | 8K2Z | 8KKZ | $2ZZ | $KZZ | $2Z | $KZ | $ZZ | 62ZZ | 6KZZ | 62 |
| | | 6KZ | 6ZZ | | | | | | | | |
| 12685 | [illegible] | 8KHZ | $HEZ | $HZ | 6HEZ | 6HZ | | | | | |
| 12686 | [illegible] | 8KOY | $3OY | $OY | $3Y | 63OY | 6OY | 63Y | | | |
| 12687 | [illegible] | $QAZ | $AAZ | $AZ | 6QAZ | 6AAZ | 6AZ | | | | |
| 12688 | [illegible] | 8KTC | 8KUC | $TUC | $T7C | $TQC | $U7C | $UQC | $TC | $UC | 6T |
| | | 6T7C | 6TQC | 6U7C | 6UQC | 6TC | 6UC | | | | |
| 12689 | [illegible] | $HHY | $XHY | 6HHY | 6XHY | | | | | | |
| 12690 | [illegible] | 8KGM | $G3M | $GM | 6G3M | 6GM | | | | | |
| 12691 | [illegible] | 8KAX | $AUX | $AGX | $AX | 6AUX | 6AGX | 6AX | | | |
| 12692 | [illegible] | 8K8T | 8K82 | 8K84 | $80T | $8-T | $8-2 | $8-4 | $822 | $824 | $8 |
| | | $82 | $84 | $8B2 | $8B8 | 680T | 68-T | 68-2 | 68-4 | 6822 | 68 |
| | | 68T | 682 | 684 | 68B2 | 68B8 | | | | | |
| 12693 | [illegible] | PPHZ | MHEZ | MHZ | | | | | | | |
| 12694 | [illegible] | PP4K | M4-K | M40K | M4K | | | | | | |
| 12695 | [illegible] | PP3Q | PP3E | M3UQ | M30Q | M3Q | M3E | | | | |
| 12696 | [illegible] | -AOM | -APM | TAOM | TAPM | MOPM | MO4M | MPM | M4M | -OPM | -( |
| | | -PM | | | | | | | | | |
| 12697 | [illegible] | MTEX | M]EX | | | | | | | | |
| 12698 | [illegible] | H+NM | H[NM | | | | | | | | |
| 12699 | [illegible] | HHHH | HHXH | | | | | | | | |
| 12700 | [illegible] | HRT2 | HRT8 | 3RT2 | 3RT8 | HR8 | | | | | |
| 12701 | [illegible] | RSK3 | RS3 | RK23 | RKB3 | RK3 | | | | | |
| 12702 | [illegible] | KKKR | 3KRS | KKRS | KRS | KR-S | KR'S | 3K.R | 3.KR | 3KR | KR |
| 12703 | [illegible] | RSSQ | RSDQ | RSQ | | | | | | | |
| 12704 | [illegible] | 8STB | 8ST4 | 8ST- | 8FTB | 8FT4 | 8FT- | 87TB | 87T4 | 87T- | 8TQB |
| | | 8TQ- | 8TQ4 | 8TB | 8T4 | | | | | | |
| 12705 | [illegible] | 8SGM | 8SM | 8FGM | 87GM | 87M | 8G3M | 8GM3 | 8GM | | |
| 12706 | [illegible] | E4HE | 7HOE | 7HOE | 7HE | | | | | | |
| 12707 | [illegible] | E4EB | E42B | 7EEB | 72EB | 7E'B | 72'B | 7EB | 72B | | |
| 12708 | [illegible] | E4QH | 7QHH | 7QXH | 7QH | 7QX | | | | | |
| 12709 | [illegible] | E4QG | 7'QG | 7QG | | | | | | | |
| 12710 | [illegible] | E4S3 | 73S3 | 7S83 | 7383 | 7S3 | | | | | |
| 12711 | [illegible] | EXE4 | DXE4 | EDX7 | EX7 | | | | | | |
| 12712 | [illegible] | HH94 | H9E4 | H94 | HH07 | H0.7 | H97 | | | | |
| 12713 | [illegible] | E4T+ | 7TK+ | 7TB+ | 7T+ | E4T[ | 7TK[ | 7TB[ | 7T[ | | |
| 12714 | [illegible] | QALY | QAL2 | QAY | | | | | | | |
| 12715 | [illegible] | ES3K | E3HK | E3XK | E3K | DHBK | DXBK | DHK | DXK | | |
| 12716 | [illegible] | ES3A | E3HA | E3XA | DHUT | DHU2 | DHA | DXUT | DXU2 | DXA | |
| 12717 | [illegible] | ES3X | E3BX | DB4X | DBX | | | | | | |
| 12718 | [illegible] | ES33 | E3S3 | E33 | D3S3 | DS83 | DS3 | | | | |
| 12719 | [illegible] | -ATC | OATC | OAC | | | | | | | |

12720 [illegible] QR-3 QR43 QR3 QR-Y QR4Y R-43 R423 R-3 R43 R-4Y R4-Y R4Y
12721 [illegible] JU40
12722 [illegible] JTOA JTHA
12723 [illegible] U424 U4K4 U44 JKE4 JK4 J2E4 J24
12724 [illegible] JTUX JT7X JU7X
12725 [illegible] U4BJ JBHJ JBJ
12726 [illegible] U4BE JBEE JB2E JBE JB2
12727 [illegible] U4AE JAHE JAE
12728 [illegible] U4BE J'BE JB-E JBE
12729 [illegible] U4SQ JSDQ JSQ
12730 [illegible] UOB4 UO4 UEO5 UO5
12731 [illegible] LOB4 LO4 LEO5 LO5
12732 [illegible] 24B4 244 K4B4 K44 =4B4 =44 KE45 K45 2E45 =E45 245 =45
12733 [illegible] 34B4 34-5 345 44B4 44-5 445
12734 [illegible] H4RX H5RX H5X
12735 [illegible] -OA5
12736 [illegible] +KB4 +2B4 +8B4 FKB4 F2B4 F24 F8B4 +4K5 +425 +485 F4K5 F425 F485 +25 +85 F25 F85 [KB4 [2B4 [8B4 [4K5 [425 [485 [25 [85
12737 [illegible] +B84 +B4 +B+5 +B85 +B5 HB84 HB85 [B84 [B4 [B[5 [B85 [B5
12738 [illegible] -YB4 4YB4 4Y4 -4Y5 -Y5 4Y5
12739 [illegible] BVB4 BV4 BUV5 BV5
12740 [illegible] QAB4 QA4 QUA5 QA5
12741 [illegible] CEB4 JEB4 CCB4 JJB4 EEB4 CC4 JJ4 2CE5 =CE5 2JE5 =JE5 CC5 JJ5 EE5 2B4 25
12742 [illegible] BYB4 'BY5 BY-5 BK+5 BY5 BK|5
12743 [illegible] SQB4 SDQ5 SQ5
12744 [illegible] 4AB4 4A4 4TA5 4A5
12745 [illegible] 8OB4 8EO5
12746 [illegible] B4LR 5LTR 5LUR 5LR
12747 [illegible] ADD4
12748 [illegible] NDB4 NTD4 ND4 NTD5 ND5
12749 [illegible] B4E4 B44 BS47 B547 B47 5EC4 5EJ4 5E4 57
12750 [illegible] B4BE 5'BE 5B-E 5BE
12751 [illegible] 4YB4 4Y4 '4Y5 4Y5
12752 [illegible] 2SB4 8SB4 2SE5 8SE5 2S25 8S25 2S5 8S5
12753 [illegible] TQ2H
12754 [illegible] LHFY LH7Y LH4Y LF4Y L74Y LHY LFY L7Y
12755 [illegible] 44-H 444H Q4-H Q44H
12756 [illegible] 44HL Q4HL
12757 [illegible] 448H 448X Q48H Q48X
12758 [illegible] HKXO HXAO
12759 [illegible] HKXA HXKK HKXK HXK
12760 [illegible] HKXK HXEK HXK
12761 [illegible] ELEA ELA ;LEA ;LA
12762 [illegible] TDK2 TDK8 TKH2 TKH8 TK22 TK28 TXH2 TXH8 TX22 TX2 .XH2 .XH8 .X22 .X28
12763 [illegible] GUBM GUQM GUM GQBM GQQM
12764 [illegible] 2H8U 22TU 2=TU 2H8Q 22TQ 2=TQ 2HGU 2HU 2HGQ 2HQ =H8U =2TU ==TU =H8Q =2TQ ==TQ =HGU =HU =HGQ =HQ
12765 [illegible] TAL3 TL23 TL=3 TALY TL-Y
12766 [illegible] TEU4 T;U4 T;4
12767 [illegible] OHQS OHAS OXQS OXAS
12768 [illegible] O+PK 2+PK =+PK OLPK 2LPK =[PK
12769 [illegible] O242 O248 OHR2 OHR8 OTK2 OTK8 OKK2 O2K2 OK42 OK2 OKK8 O2K8 OK48 OK8 ORR2 O2R2 OR42 OR2 ORR8 O2R OR48 OR8
12770 [illegible] ;NNK N;NK 4ONK
12771 [illegible] V-AF VALF V-A V-F VAF V-A7 VAL7 V-7 VA7
12772 [illegible] N;NV N;V ;NNV ;NV TNNV T22V T4V
12773 [illegible] EHBV EHHV EHV IUHV EKBV EKHV EKV IUKV EXBV EXH IUXV \HBV \HHV \HV \KBV \KHV \KV \XBV \XHV
12774 [illegible] IUK2 IUK8 IUR2 IUR8 E242 E248 EHR2 EHR8 ETK2 ETK EKK2 E2K2 EKK8 E2K8 EK42 EK48 EK2 EK8 ERR2 E2R ERR8 E2R8 ER42 ER48 ER2 ER8 \248 \HR2 \HR8 \TK \TK8 \KK2 \2K2 \KK8 \2K8 \K42 \K48 \K2 \K8 \RR \2R2 \RR8 \2R8
12775 [illegible] L-A L-AF LALF .L-A .L-F .LAF L-A7 LAL7 .L-7 .LA
12776 [illegible] FTAE FQAE FQE
12777 [illegible] FLYE FL22 FLE 12778 [illegible] F-AF FALF F-A F-F FAF F-A7 FAL7 F-7 FA7
12779 [illegible] F242 F248 FHR2 FHR8 FTK2 FTK8 FKK2 F2K2 FKK8 F2K
FK42 FK48 FK2 FK8 FRR2 F2R2 FRR8 F2R8 FR42 FR4
FR2 FR8
12780 [illegible] Y44E Y24E Y2TE Y2'E Y4E
12781 [illegible] YEEA YIUA
12782 [illegible] Y42X Y4KX Y4EX Y4PX Y44X
12783 [illegible] 44EL 4EEL 4E3L 2EEL 2E3L =EEL =E3L
12784 [illegible] 3TAE 3QAE
12785 [illegible] 3LYE 3L2E 3L22
12786 [illegible] 3OSB 3STB 3OSB 3ST4 3ST- 3SB
12787 [illegible] 3242 3248 3HR2 3HR8 3TK2 3TK8 3KK2 32K2 3KK8 32K
3K42 3K48 3K2 3K8 3RR2 32R2 3RR8 32R8 3R42 3R4
3R2 3R8
12788 [illegible] WSSS W3S
12789 [illegible] WHOE WH2E WHE WXOE WX2E WXE
12790 [illegible] YVRH YQRH YR'H YRT+ YRH 'VRH 'QRH 'R'H 'RT+. 'RH
YRT[ 'RT[
12791 [illegible] ZTLX ZBLX ZGTX ZGLX ZGX
12792 [illegible] EHOE EH2E EHE EXOE EX2E EXE
12793 [illegible] 5KAE 5-AE 5TAE
12794 [illegible] EHH4 EHJ4 E3J4 EEJ4
12795 [illegible] EEEA EIUA
12796 [illegible] L24V L44V L42V L48V L4V
12797 [illegible] 'BAJ 'BJ BA4J BAJ
12798 [illegible] TOM4 +-A4 +TA4 +MY4 +M4 +-Y4 [-A4 [TA4 [MY4 [M4
[-Y4
12799 [illegible] K8-A K8OA K83A K8A
12800 [illegible] 'YTK YTOK YTEK 'TOK 'TEK YT2K 'T2K
12801 [illegible] 'YAJ YA4J YABJ 'A4J 'ABJ 'AJ
12802 [illegible] FFME FF-E /-AE /TAE /MTE /M'E /ME /-TE /-'E /-E
12803 [illegible] /F4H
12804 [illegible] FF$3 FF$4 /8K3 /8K4 /$03 /$04 /$3 /$4 FF63 FF6
/603 /604 /63 /64
12805 [illegible] FF8M FF$M /8KM /$MM /$2M /8K2 /8M /$M /$2 FF6
/6MM /62M /6M /62
12806 [illegible] FFT4 FFU4 /TU4 /T74 /TQ4 /U74 /UQ4 /T4 /U4
12807 [illegible] 8YEE TYEE 8Y2E
12808 [illegible] D435
12809 [illegible] N3T4 NTU4 NT74 NTQ4 NU74 NUQ4 NT4 NU4
12810 [illegible] HET4 HEU4
12811 [illegible] 4H+J 4H[J
12812 [illegible] A44E A24E A4TE A4'E A2TE A2'E A4E
12813 [illegible] 'AT4 'AU4 A-T4 A-U4
12814 [illegible] HU-K HUOK HUEK HEUK HEU. HU. ++Q. HQ-K HQOK HQ.
XU-K XUOK XUEK XEUK XEU. XU. XQ-K XQOK XQ. [[Q.
12815 [illegible] HPTM H4TM HPM XPTM X4TM XPM
12816 [illegible] HH2H HH8H XH2H XH8H
12817 [illegible] HBGE XBGE
12818 [illegible] ++QH H3QH X3QH [[QH
12819 [illegible] HYVR H'VR HYR H'R XYVR X'VR XYR X'R
12820 [illegible] STAL
12821 [illegible] OSHK SHEH SHEK SHKK SH2K SHK OSHK
12822 [illegible] OST4 STU4 ST74 STQ4 SU74 SUQ4 ST4 SU4 OST4
12823 [illegible] TALS TLOS TLOS
12824 [illegible] EBHS BTHS EHOS BHOS EHOS BHOS EHS BHS \BHS \THS
\HOS \HOS \HS
12825 [illegible] KTAL KTL
12826 [illegible] H24R H84R H8R
12827 [illegible] UQ4R UQR
12828 [illegible] UABY UANY
12829 [illegible] 4OKE ;KAE ;KA2 ;KJ2 ;KE
12830 [illegible] 4O3Q ;QQQ ;3Q
12831 [illegible] 4OUX ;UAX ;U4X ;UQX ;UX
12832 [illegible] TJ4O THJO THJ; TJ; THJO JHJ; TJO TJ;
12833 [illegible] ;UAQ ;UYQ
12834 [illegible] 4OEG ;EEG ;EG ;2EG ;2G
12835 [illegible] PPH2 PP2 PPH8 PP8
12836 [illegible] OGLJ GLHJ GLKJ GLJ
12837 [illegible] OGLH GL4H GLQH GLH OGL6 GL46 GLQ6 GL6
12838 [illegible] OG-Z OG4Z G-LZ G4LZ G-Z G4Z
12839 [illegible] OGBY OGNY GBNY GNBY GB2Y GB4Y GBY GNY
12840 [illegible] OG3L G3QL G3L G3AL G34L 12841 [illegible] OGFN GF4N
12842 [illegible] THJG TJOG ]HJG ]JOG ]JG
12843 [illegible] HQ3Q QQQQ Q3Q
12844 [illegible] HQBY HQNY QBNY QNBY QB2Y QB4Y QBY QNY
12845 [illegible] 242P =42P =4=P 248P =48P HR2P HR8P TK2P TK8P K.
2K2P =K2P =K=P K42P K2P KK8P 2K8P =K8P K48P K.
RR2P 2R2P =R2P =R=P R42P R2P RR8P 2R8P =R8P R.
R8P
12846 [illegible] 8KU2 $U32 $U2 8KU8 $U38 $U8 6U32 6U2 6U38 6
12847 [illegible] 8KTA 8KMA $-AA $-AM $TAA $TAM $MTA $-TA $-M $
6-AA 6-AM 6TAA 6TAM 6MTA 6-TA 6-M 6MA
12848 [illegible] $HEX $HX $XEX $XX 6HEX 6HX 6XEX 6XX
12849 [illegible] H3HK Q3HK HH8K QH8K HQH$ HH$ Q3H$ QH$ HQH6 H
Q3H6 QH6
12850 [illegible] 8KUJ $UGJ $U4J $UJ 6UGJ 6U4J 6UJ
12851 [illegible] $TDH $TKH $TXH $TX2 $.XH $.X2 6TDH 6TKH 6TXH 6
6.XH 6.X2
12852 [illegible] 8KWY $WWY $2WY $WUY $2UY 4HUY $KUY $XUY $WY 6
62WY 6WUY 62UY 6KUY 6XUY 6WY
12853 [illegible] 8KKA $-2A $-8A $T2A $T8A $KUX $KU4 $K1A $KA 6
6-8A 6T2A 6T8A 6KUX 6KU4 6K1A 6KA
12854 [illegible] $HH4 $XH4 6HH4 6XH4
12855 [illegible] $4EJ 64EJ
12856 [illegible] TAJ4 MSJ4 MSX4 MJX4 -SJ4 -SX4 -JX4 -S4 -J4
12857 [illegible] HH4C HH4J HH4S
12858 [illegible] GMT2 GMT8 GM8
12859 [illegible] 8TT2 82T2 84T2 88T2 8T2 8TT8 82T8 84T8 88T8 8
12860 [illegible] RSEG RS2G RSG REEG R2EG REG R2G' R2G
12861 [illegible] TNEK TN8K TE8K TNK TNE8
12862 [illegible] 8SHZ 8FHZ 8FZ 8HUZ 8HZ 8SXZ 8FXZ 8XUZ 8XZ
12863 [illegible] E4YH 7YAH 7YH
12864 [illegible] E42B E48B 724B 72QB 774B 78QB 72B 78B
12865 [illegible] E44+ 7-4+ 74B+ 74+ E44[ 7-4[ 74B[ 74[
12866 [illegible] E4EK 7EKK 7E2K 7E1K 7EK
12867 [illegible] E4PZ 7P3Z 7PZ
12868 [illegible] E4SA E4JA 7SJA 7SA 7JA
12869 [illegible] E4HH E4XH 7-HH 7-XH 7HHH 7XHH 7HH 7XH
12870 [illegible] E4T4 7TU4 7T74 7U74 7T4- 7U4-
12871 [illegible] E40+ E42+ 70Q+ 700+ 720+ 72Q+ 70+ 72+ E40[ E
70Q[ 700[ 720[ 72Q[ 70[ 72[ E4@ 7@
12872 [illegible] E4TX 7TZX 7TX
12873 [illegible] QAHR QAR
12874 [illegible] ES3B E32B E3B D24B D2QB D2B
12875 [illegible] PPHX MTPX MHPX MHX MT4X MH4X M4X
12876 [illegible] 5Y5A 55-A 550A 55A 5YA
12877 [illegible] QRT4 QRU4 QR4 RTU4 RT74 RT4- RU74 RU4- RT4 RU4
12878 [illegible] QRNM RNNM RNTM RNMT RNKM RNMK RNM
12879 [illegible] U4T+ U4+ JTK+ JTB+ JT+ U4T[ U4[ JTK[ JTB[ JT[
12880 [illegible] U4-E U4TE U4ME J-AE JTAE JMC- JME J-E
12881 [illegible] U4E2 U4E8 JE42 JE2 JE48 JE8
12882 [illegible] U4+J J+QJ J+SJ J+AJ J+J U4[J J[QJ J[SJ J[AJ J[J
12883 [illegible] U4EH JEXH JEH
12884 [illegible] U4HC JH+C JHC JH[C
12885 [illegible] U4ZZ JZLZ JZZ
12886 [illegible] U4EB JEEB J2EB JE'B J2'B JEB
12887 [illegible] JTIY JTXY
12888 [illegible] TE4X TEJX ]E4X ]EJX T\4X T\JX ]\4X ]\JX
12889 [illegible] EXU4 EX4 EDXJ EXJ
12890 [illegible] U4HB U4QB JHQB JHB JQB
12891 [illegible] U4W3 U4WY JW23 JW-Y JW3 JWY
12892 [illegible] LAB4 LA4 LEA5 LA5
12893 [illegible] +JB4 +J4 +QJ5 +SJ5 +AJ5 +J5 [JB4 [J4 [QJ5 [SJ5
[AJ5 [J5
12894 [illegible] KXB4 K4X5 KX5
12895 [illegible] E3B4 23B4 =3B4 EE35 2E35 =E35 E835 2835 =835 E35
235 =35
12896 [illegible] HYB4 XYB4 H8Y5 H8'5 HY5 X8Y5 X8'5 XY5 X'5
12897 [illegible] BKB4 BK4 BLK5
12898 [illegible] QVB4 QV4 QOV5 QOV5 QV5
12899 [illegible] FTB4 FKB4 /TB4 /KB4 /T4 /K4 FTK5 /TK5 /T5 /K5
12900 [illegible] TDK4 DTK4 DKB4 DK4 TDK5 DTK5 DK5
12901 [illegible] 3AX4 3XB4 3AX5 3X5
12902 [illegible] HH94 H9B4 H94 HH95 H9.5 H95
12903 [illegible] YOX4 YOX4 YXB4 YOX5 YOX5 YTX5 YX5

| | | |
|---|---|---|
| 12904 | [illegible] | CRX4 CXB4 CX4 CKX5 CRX5 CX5 |
| 12905 | [illegible] | PBB4 PHB5 PB5 |
| 12906 | [illegible] | OEB4 OTE5 O'E5 OE5 |
| 12907 | [illegible] | QHB4 QHH5 QXH5 QH5 |
| 12908 | [illegible] | KATA KAQA |
| 12909 | [illegible] | 44+K 44+2 44+8 44FK 44F2 44F8 447K 4472 4478 Q4+K Q4+2 Q4+8 Q4FK Q4F2 Q4F8 Q47K Q472 Q478 44[K 44[2 44[8 Q4[K Q4[2 Q4[8 |
| 12910 | [illegible] | ELUK ;LUK |
| 12911 | [illegible] | EL4K ;L4K |
| 12912 | [illegible] | ELU+ ;LU+ ELUQ ;LUQ ELU[ ;LU[ |
| 12913 | [illegible] | 4HE3 4HE4 4QH3 4QH4 4XE3 4XE4 4QX3 4QX4 |
| 12914 | [illegible] | GUOY GUOY GUQ GQOY GQOY GQQ |
| 12915 | [illegible] | 8OTL 8OL 8TAL 8TL |
| 12916 | [illegible] | 8A'Y 8-AY 8OAY 8AY 8-A' 8OA' 8A' |
| 12917 | [illegible] | TQN3 T3Q3 T3QN TQ3 TQN |
| 12918 | [illegible] | OZSJ OSSJ ZSSJ O2SJ Z2SJ OZ2J |
| 12919 | [illegible] | 4QIH 4Q+- 4QH 4Q[- |
| 12920 | [illegible] | HOLX HOOX H2OX H2LX HOX HOX H2X |
| 12921 | [illegible] | KBO+ KB2+ KB+ KBO[ KB2[ KB[ |
| 12922 | [illegible] | VOLX VOOX V2OX V2LX VOX |
| 12923 | [illegible] | ETAK EUAK IUTK IUUK \TAK \UAK |
| 12924 | [illegible] | LQ4S LQ+S LQSS LQ2S L4SS L42S L+SS L+2S LQ[S L[2S |
| 12925 | [illegible] | 544X 524X 54EX 52EX 54X |
| 12926 | [illegible] | HKEG H2EG H8EG HEG |
| 12927 | [illegible] | I234 I3U4 I3O4 I344 I3Q4 I34 |
| 12928 | [illegible] | I24X I44X I4EX |
| 12929 | [illegible] | F3U4 F3O4 F344 F3Q4 F34 |
| 12930 | [illegible] | F/43 F/4N F/3 F/N |
| 12931 | [illegible] | TXE4 TEU4 TX;4 T;U4 |
| 12932 | [illegible] | N;NB N;B ;NNB ;NB TNNB T22B T4B |
| 12933 | [illegible] | Y242 Y248 YHR2 YHR8 YTK2 YTK8 YKK2 Y2K2 YKK8 Y2K8 YK42 YK48 YK2 YK8 YRR2 Y2R2 YRR8 Y2R8 YR42 YR48 YR2 YR8 |
| 12934 | [illegible] | ;NNY N;NY ;NY N;Y TNNY T22Y T4Y |
| 12935 | [illegible] | Y4NE Y4E |
| 12936 | [illegible] | HBXA HPXA HXKA HXA |
| 12937 | [illegible] | 3PP+ 3MO+ 3M2+ 3M+ 3PP[ 3MO[ 3M2[ 3M[ |
| 12938 | [illegible] | 3EUR 3;UR 3;4R |
| 12939 | [illegible] | LYE4 LYY4 L224 |
| 12940 | [illegible] | ZH+T ZHT ZX+T ZXT ZH[T ZX[T |
| 12941 | [illegible] | ZOLX ZOOX Z2OX Z2LX ZOX |
| 12942 | [illegible] | Z44X Z24X Z4EX Z2EX Z4X Z2X |
| 12943 | [illegible] | L23E L3LE L3E |
| 12944 | [illegible] | 4HOE 4H2E 4HE 4XOE 4X2E 4XE |
| 12945 | [illegible] | FFTZ /TZZ /UZZ /TZ /UZ |
| 12946 | [illegible] | FF8H FF$H /8KH /8H /$HH /$HQ /$H FF6H /6HH /6HQ /6H |
| 12947 | [illegible] | NTOK NTEK |
| 12948 | [illegible] | 'AUR A-UR AUOR AUFR AU7R AUUR |
| 12949 | [illegible] | HTAE HQAE XTAE XQAE XQE |
| 12950 | [illegible] | HTDE HTKE HTD- HTK- HT- XTDE XTKE XTD- XTK- XT- |
| 12951 | [illegible] | HITK HIK XITK XIK |
| 12952 | [illegible] | HLYE HL22 HLE XLYE XL22 XLE |
| 12953 | [illegible] | HYK2 HY2 HYK8 HY8 XYK2 XY2 XYK8 XY8 |
| 12954 | [illegible] | H+X3 H+XN X+X3 X+XN X+3 X+N H[X3 H[XN X[X3 X[XN X[3 X[N |
| 12955 | [illegible] | HHTK XHTK |
| 12956 | [illegible] | STOK STEK |
| 12957 | [illegible] | 444C 44C 444S 44S |
| 12958 | [illegible] | SCXE SCX2 SEXE SEX2 |
| 12959 | [illegible] | OS4V S44V S42V S48V S4V OS4V S2V |
| 12960 | [illegible] | KH2M KH8M KHM2 KHM8 |
| 12961 | [illegible] | KPPY KMY4 KMYQ KMY |
| 12962 | [illegible] | KTEM KTME KT-M K2EM K2ME K2-M K4EM K4ME K4-M KTM K4M |
| 12963 | [illegible] | UAH4 UAX4 |
| 12964 | [illegible] | 4OH4 ;HO4 ;HF4 ;H74 ;H4 4OX4 ;XO4 ;XF4 ;X74 ;X4 |
| 12965 | [illegible] | E4OE E;E |
| 12966 | [illegible] | TALO TL4O TLO TAL; TL; |
| 12967 | [illegible] | 4OLG 4OLC ;LYG ;L2G ;LG ;LC' ;LC |
| 12968 | [illegible] | 4OTL 4OL |
| 12969 | [illegible] | TR42 TR48 2TR2 =TR2 2TR8 =TR8 2UR2 =UR2 2UR8 =UR8 |
| 12970 | [illegible] | OGTL GTAL GTL |

```
12071 [illegible] HQT4 HQU4 QTU4 QT74 QTQ4 QU74 QUQ4 QT4
12072 [illegible] HQLG QLYG QL2G QLG
12973 [illegible] -QH4 9HO4 9HF4 9H74 9H4 -QX4 9XO4 9XF4 9X74 9X4
12974 [illegible] 8KTG $TUG $T7G $TUG $U7G $UQG $TG 6TUG 6T7G 6TU
         6U7G 6UQG 6TG
12075 [illegible] $TT2 $T42 $242 $2T2 $T2 $TT8 $T48 $248 $2T8 $T8
         6TT2 6T42 6242 62T2 6T2 6TT8 6T48 6248 62T8 6T8
12976 [illegible] 8KHZ 8KXZ $HEZ $HZ $XEZ $XZ 6HEZ 6HZ 6XEZ 6XZ
12977 [illegible] 8KY3 $YD3 $YD4 $'D3 $'D4 6YD3 6YD4 6'D3 6'D4
12978 [illegible] 8K3L $3QL $3L 63QL 63L
12979 [illegible] H+HX H+XH H[HX H[XH
12980 [illegible] H+B4 H[B4
12981 [illegible] TBHX TBXX
12982 [illegible] 7HEM 7HME
12983 [illegible] E4TB E4T- 7TQB 7TQ- 7TB 7T-
12984 [illegible] ES3K E3QK E3K DQLK DQK
12985 [illegible] ES3K E34K E3K D4-K D4OK D4K
12986 [illegible] ES3B E38B E3B D84B D8QB D8B
12987 [illegible] U4KJ U42J J29J JKQJ J2J JKJ
12988 [illegible] U4EJ JEHJ JEOJ JEJ
12989 [illegible] U4EK JEKK JE2K
12990 [illegible] U4SA U4JA JSJA JSA JJA
12991 [illegible] U4WX JW5X JWX
12992 [illegible] U4T4 U44 JTU4 JT74 JT4- JU74 JU4- JT4 JU4
12993 [illegible] U4AQ U4YQ JAYQ JAQ JYQ
12994 [illegible] U4HR J3HR JH-R JHR
12995 [illegible] U4UZ JUBZ JUZ
12996 [illegible] U4KA J'KA J-KA JKOA JKA
12997 [illegible] B4TX 5TZX
12998 [illegible] KJB4 KJ4 29J5 =9J5 KQJ5
12999 [illegible] K3B4 K34 K235 KB35 K35
13000 [illegible] 4+B4 -4+5 4B+5 4+5 4[B4 -4[5 4B[5 4[5
13001 [illegible] EKB4 EK4 EIK5 EKK5 E2K5
13002 [illegible] SAB4 SA4 JAB4 JA4 SJA5 SA5 JA5
13003 [illegible] O+B4 O+4 OQ+5 OO+5 2O+5 =O+5 2Q+5 =Q+5 O+5 2+B
         =+B4 2+5 =+5 O[B4 O[4 OQ[5 OO[5 2O[5 =O[5 2Q[
         =Q[5 O[5 2[B4 =[B4 2[5 =[5 @B4 @5
13004 [illegible] 4425 4485
13005 [illegible] E4B4 TE45 E-45 E45
13006 [illegible] KAB4 KOA5
13007 [illegible] E4B4 TE45 'E45 E45
13008 [illegible] T3K4 T3K5
13009 [illegible] HFB4 H7B4 HOF5 HF5 HO75 H75 XFB4 X7B4 XOF5 XF5
         XO75 X75
13010 [illegible] LTB4 L-B4 L-4 LKT5 LK-5 LET5 LE-5 L-5
13011 [illegible] H2B4 H8B4 HQ25 HQ85 H25 H85
13012 [illegible] MYB4 PPY5 MY5
13013 [illegible] MAB4 MA4 PPA5 MA5
13014 [illegible] HHB4 XHB4 HHH5 HXH5 XXH5 XH5
13015 [illegible] AQB4 YQB4 AYQ5 AQ5
13016 [illegible] LY+2 LY2 LY+8 LY8 LY[2 LY[8
13017 [illegible] Y3TA Y3QA Y4TA Y4QA Y4A
13018 [illegible] 44S3 443 Q4S3 Q43
13019 [illegible] CX44 CXQ4 EX44 EXQ4 CX4
13020 [illegible] U64L U6OL U6QL U6L
13021 [illegible] HKXS HXXS HXS
13022 [illegible] EL24 ELK4 ;L24 ;LK4 ;L4
13023 [illegible] ELAK ;LAK
13024 [illegible] ELLR ELR ;LLR ;LR
13025 [illegible] 4HBC 4HC 4HBL 4HL 4XBC 4XC 4XBL 4XL
13026 [illegible] TDKE TKHE TK2E TXHE .XHE
13027 [illegible] GUPX GU4X GUX GQPX GQ4X GQX
13028 [illegible] GUHB GQHB GUB
13029 [illegible] GUKJ GUJ GQKJ GQJ
13030 [illegible] GUER GQER GU;R GQ;R GUR GQR
13031 [illegible] ODGU OEDU OEGU OEU ODU ODGQ OEDQ OEGQ OEQ ODQ
13032 [illegible] HOHO 2HOO 2HHO 2HKO 2HXO =HOO =HHO =HKO =HXO
13033 [illegible] VP3C VP3S VP4C VP4S VPC VPS
13034 [illegible] P342 P348 P42 P48
13035 [illegible] FOZS FOSS FO2S FOZ2 FZSS FZ2S FOS
13036 [illegible] B3U4 B3O4 B344 B3Q4 B34
13037 [illegible] BOLX BOOX B2OX B2LX BOX
13038 [illegible] Y3U4 Y3O4 Y34 Y3UR Y3OR
13039 [illegible] 3P3O 3P3S 3P4C 3P4S
```

13040 [illegible] 3HMY 3XMY
13041 [illegible] 3B32 3B2 3B38 3B8
13042 [illegible] 3EFR 3E4R
13043 [illegible] W3U4 W304 W344 W3Q4 W34
13044 [illegible] ETAK EUAK
13045 [illegible] ASZS ASS
13046 [illegible] N;N4 N;4 ;NN4 ;N4 TNN4 T224 T44
13047 [illegible] TOK2 TOK8 +242 +248 +HR2 +HR8 +TK2 +TK8 +KK2 +2K
+KK8 +2K8 +K42 +K48 +K2 +K8 TOR2 TOR8 +RR2 +2R
+RR8 +2R8 +R42 +R48 +R2 +R8 [242 [248 [HR2 [HR
[TK2 [TK8 [KK2 [2K2 [KK8 [2K8 [K42 [K48 [K2 [K8
[RR2 [2R2 [RR8
13048 [illegible] -YY2 -YY8 23Y2 23Y8 =3Y2 =3Y8 KYK2 KY2 KYK8 KY8
13049 [illegible] -YK2 -YK8 -YR2 -YR8 23K2 23K8 23R2 23R8 =3K2 =3K
=3R2 =3R8 K242 K248 KHR2 KHR8 KTK2 KTK8 KKK2 K2K
KKK8 K2K8 KK42 KK48 KK2 KK8 KRR2 K2R2 KRR8 K2R
KR42 KR48 KR2 KR8
13050 [illegible] FFFT /FLT /FNT /FT
13051 [illegible] NEEA
13052 [illegible] 4N;N 4N; 4;NN 4;N
13053 [illegible] 'AEX A-EX AEEX A2EX
13054 [illegible] H3TM H3M X3TM X3M
13055 [illegible] OSHE SHOE SXOE SHE OSHE
13056 [illegible] OS4E S44E S24E S4E OS4E
13057 [illegible] SEEA
13058 [illegible] EHB4 EH24 EBB4 E2B4 E-B4 E-24
13059 [illegible] 4OPG ;PAG ;PG
13060 [illegible] 4OMY ;PPY ;MY4 ;MYQ ;MY
13061 [illegible] OGWX OG;X GTWX GWTX GWX G;WX G;X GW;X
13062 [illegible] GTOK GTEK GT2K GTK
13063 [illegible] HBHG HHOG XBHG XHOG XBG
13064 [illegible] OGMY GMY4 GMYQ GMY
13065 [illegible] -QLY 9LYY 9L2Y 9LY
13066 [illegible] -Q-O -QMO 9-AO 9TAO 9M3O 9-3O 9-O 9MO -QM3 9-/
9TA3 9M3
13067 [illegible] 9A4J 9ABJ
13068 [illegible] 38E2 38K 3$ 38
13069 [illegible] 8KTL $TAL $TL 8TAL 8TL
13070 [illegible] 8KEO $E4O $EO 8E4O 8EO
13071 [illegible] 3TTE 3THH EEE 3TE 3'E
13072 [illegible] -SEZ TSEZ MSEZ MSZ
13073 [illegible] TAEE TA2E MEE M2E M2TE M2'E -2TE -2'E -EE -2E
13074 [illegible] -ATL TATL MTAL MTL -TAL -TL
13075 [illegible] H+H2 H+H8 H[H2 H[H8
13076 [illegible] HHH2 HHH8
13077 [illegible] E4U2 E4U8 7U32 7U38 7U2 7U8
13078 [illegible] QAU2 QA2 QAU8 QA8
13079 [illegible] 3QTR 3HTR 3TQR
13080 [illegible] U4TB JTQB JTQ- JTB JT-
13081 [illegible] U4QK U4Q. JQ-K JQOK JQK JQ.
13082 [illegible] U44L U4OL JQBL JQLB JQLE JQEL JQL J4BL J4LB J4L
J4EL J4L JOBL JOLB JOLE JOEL JOL U4L
13083 [illegible] U4OY J3OY JOOY JOY J3Y
13084 [illegible] U44K J4-K J4OK J4K
13085 [illegible] U48B J8-B J84B J8QB J82S J8=S J8B
13086 [illegible] 3AK4 3AK5
13087 [illegible] TGB4 TG4 TKG5 TBG5 TG5
13088 [illegible] TBB4 T-B4 TQB5 TQ-5 TB5 T-5
13089 [illegible] B42M B4M 52EM 52M
13090 [illegible] TUK5 T7K5 TOK5 U7K5 UOK5
13091 [illegible] 4HB4 4HH5 4H5
13092 [illegible] 4CB4 4C4 4SB4 4S4 4JB4 4J4 4CS5 4JS5 4C5 4S5
13093 [illegible] TA5R TLAR TOAR TL5R TO5R COAR CB4R CA5R C5R
13094 [illegible] YBC4 YCB4 YC4 YBJ4 YJB4 YJ4 YBC5 YC5 YBJ5 YJ5
13095 [illegible] POH4 PTH4 PHB4 PH4 POH5 PTH5 PH5
13096 [illegible] EXB4 EUB4 ;XB4 ;UB4 EXU5 ;XU5 EX5 EU5 ;X5 ;U5
13097 [illegible] BDX4 BXB4 BX4 BDX5 BX5
13098 [illegible] LHFQ LFQQ LFQ LHF- LH- LFQ- LF- LH7Q L7QQ L7Q
LH7- L7Q- L7-
13099 [illegible] HKXH HX3H
13100 [illegible] 4QHL 4H3L 4HL 4QXL 4X3L 4XL
13101 [illegible] GUT3 GU3 GQT3 GQ3
13102 [illegible] GUQA GUA GQQA GQA 13103 [illegible] GUOS GU2S GUS GUO5 GU25 GU5 GQOS GQ2S GQS GQO'
GQ25 GQ5
13104 [illegible] O+OK O+UK OOUK O[OK O[UK
13105 [illegible] F+OK F+UK FOUK FOK F[OK F[UK
13106 斷 P3CT P4CT P44T PCLT PCT PSLT PST
13107 [illegible] YP3C YP4C YPC YP3S YP4S YPS YP3J YP4J
13108 [illegible] Y3QN Y3Q3
13109 [illegible] YHMY YXMY
13110 [illegible] YOZS YOSS YO2S YZSS YZ2S YZS
13111 [illegible] 3-OK 3+OK 3+OK 3+UK 3+OK 3OUK 3OOK 3[OK 3[UK 3[UK
3[OK
13112 [illegible] WEFR WE4R WER
13113 [illegible] 'FKX ZK4X ZKGX ZKLX ZKX
13114 [illegible] 43U4 4304 4344 43Q4 434
13115 [illegible] 4PPX 4MTX 4MHX 4MX
13116 [illegible] TOOX TO2X +OLX +OOX +2OX +2LX +2X [OLX [OOX [2OX
[2LX [2X
13117 [illegible] FF4Z /4DZ /4Z
13118 [illegible] FFK2 FFR2 FFK8 FFR8 /HR2 /HR8 /242 /248 /TK2 /TK8
/KK2 /2K2 /K42 /K2 /KK2 /2K2 /K42 /K2 /KK8 /2K8
/K48 /K8 /KK8 /2K8 /K48 /K8
13119 [illegible] EYEE EY2E EYE
13120 [illegible] N3-A N3-F N3AF N-AF N-F NALF NAF
13121 [illegible] N3K2 N3R2 N3K8 N3R8 N242 N248 NHR2 NHR8 NTK2 NTK8
NKK2 N2K2 NK42 NK2 NKK2 N2K2 NK42 NK2 NKK8 N2K8
NK48 NK8 NKK8 N2K8 NK48 NK8
13122 [illegible] EQ43 EQ3 EQ4N EQN
13123 [illegible] N34E N4NE N4E
13124 [illegible] N;NA N;A ;NNA ;NA TNNA T22A T4A
13125 [illegible] HKEA H2EA H8EA
13126 [illegible] HQN3 H3Q3 H3QN HQ3 HQN XQN3 X3Q3 X3QN XQ3 XQN
13127 [illegible] H5HE H5E X5XE X5E
13128 [illegible] HT4O HT2O HT8O H4O2 H4O8 XT4O XT2O XT8O X4O2 X4O8
13129 [illegible] K-AF K-A K-F KALF KAF K-A7 K-7 KAL7 KA7
13130 [illegible] KHUS KHA KHU KXUS KXA KXU
13131 [illegible] KHHS KXHS
13132 [illegible] KYKF KYKJ KYXF KYXJ KYF KYJ
13133 [illegible] UAEA UA\A
13134 [illegible] 4O3P ;PPP ;3P ;3-4 ;34
13135 [illegible] 4OHE ;HOE ;H2E ;HE 4OXE ;XOE ;X2E
13136 [illegible] GU2L GU8L GUKL GUEL GU;L
13137 [illegible] GHYB GXYB
13138 [illegible] OG4E OG2E G44E G24E G4TE G4'E G4E
13139 [illegible] $H3J $X3J $3J 6H3J 6X3J 63J
13140 [illegible] 8KMY $MY4 $HYQ $MY 6MY4 6MYQ 6MY
13141 [illegible] 8KTM $TEM $TME $T-M $2EM $2ME $2-M $4EM $4ME $4-M
$TM $4M 6TEM 6TME 6T-M 62EM 62ME 62-M 64EM 64ME
64-M 6TM 64M
13142 [illegible] $UOR $UFR $U7R $UUR 6UOR 6UFR 6U7R 6UUR
13143 [illegible] $UEG 6UEG
13144 [illegible] -SAX TSAX MSAX -SX
13145 [illegible] WQT2 WQT8 2QT2 2QT8 =QT2 =QT8
13146 [illegible] 8STK 8FTK 87TK 8TOK 8TEK 8TK
13147 [illegible] U43B J3UB J3OB J3FB J37B J3B
13148 [illegible] U4EK U4;K JE5K JEK J;5K J;K
13149 [illegible] JTDH JTHA JTXH JTX2 J.XH J.X2
13150 [illegible] UJB4 UJ4 UGJ5 UJ5
13151 [illegible] KAB4 KA4 -2A5 -8A5 KIA5 KA5
13152 [illegible] EEB4 2EB4 =EB4 EEE5 2EE5 =EE5 2E5 =E5
13153 [illegible] HZB4 HZ4 XZB4 XZ4 HUZ5 HZ5 XUZ5 XZ5
13154 [illegible] E5E4 E5K4 E54 EKB4 EK4 ;5K4 ;54 ;KB4 ;K4 E5K
;5K5
13155 [illegible] ZKB4 ZK4 ;ZK4 Z;K4 ;Z4 ;K4 ;ZK5 ;Z5 Z;Z5 ZK5
13156 [illegible] LFTH LFH L7TH L7H
13157 [illegible] 44UO 44U; Q4UO Q4U; Q4;
13158 [illegible] OQ4L OQQL OQQL OOQL 2OQL =OQL 2Q4L =Q4L 2QOL =QO
2QQL =QQL QQL
13159 [illegible] 4HT4 4XU4 4XT4
13160 [illegible] GU34 GU44 GQ34 GQ44
13161 [illegible] GU+K GUK GU+2 GU+8 GQ+K GQK GQ+2 GQ+8 GUFK GUF
GUF8 GQFK GQF2 GQF8 GU7K GU72 GU78 GQ7K GQ72 GQ7
GU[K GU[2 GU[8 GQ[K GQ[2 GQ[8
13162 [illegible] GUCE GUJE GUCC GUJJ GUEE GQCE GQJE GQCC GQJJ GQE

| | | | | | | | | | | | |
|---|---|---|---|---|---|---|---|---|---|---|---|
| 13163 | [illegible] | 2EHU | 2EGU | 2EU | 2HGU | 2HU | 2EHQ | 2EGQ | 2EQ | 2HGQ | 2HQ |
| | | =EHU | =EGU | =EU | =HGU | =HU | =EHQ | =EGQ | =EQ | =HGQ | =HQ |
| 13164 | [illegible] | O;NY | ON;Y | ONY | O;NY | ON;Y | ONY | OB2Y | OB4Y | OB2Y | OB4 |
| 13165 | [illegible] | 3B42 | 3B48 | | | | | | | | |
| 13166 | [illegible] | FFCR | /TAR | /T4R | /CAR | /C4R | /CR | | | | |
| 13167 | [illegible] | S44X | S4EX | S2EX | | | | | | | |
| 13168 | [illegible] | HGK2 | HGR2 | HG2 | HGK8 | HGR8 | HG8 | GKK2 | G2K2 | GK42 | GK2 |
| | | GKK8 | G2K8 | GK48 | GK8 | GRR2 | G2R2 | GR42 | GR2 | GRR8 | G2R |
| | | GR48 | GR8 | | | | | | | | |
| 13169 | [illegible] | OGK2 | OGK8 | GKK2 | G242 | G248 | GHR2 | GHR8 | GTK2 | GTK8 | G2K |
| | | GK42 | GKK8 | G2K8 | GK48 | GK2 | GK8 | GRR2 | G2R2 | GR42 | GRR |
| | | G2R8 | GR48 | GR2 | GR8 | | | | | | |
| 13170 | [illegible] | -Q-A | -Q-F | -QAF | 9-AF | 9-A | 9-F | 9AF | -Q-7 | -QA7 | 9-A |
| | | 9-7 | 9A7 | | | | | | | | |
| 13171 | [illegible] | $EEA | $IUA | 6EEA | 6IUA | | | | | | |
| 13172 | [illegible] | $3QH | 63QH | | | | | | | | |
| 13173 | [illegible] | $HKM | $HEM | $HME | $XKM | $XEM | $XME | 6HKM | 6HEM | 6HME | 6XK |
| | | 6XEM | 6XME | | | | | | | | |
| 13174 | [illegible] | $HOE | $H2E | $XOE | $X2E | 6HOE | 6H2E | 6XOE | 6X2E | | |
| 13175 | [illegible] | E4H4 | 7HO4 | 7HF4 | 7H74 | E4X4 | 7XO4 | 7XF4 | 7X74 | | |
| 13176 | [illegible] | PPUL | MU4L | MUOL | MUQL | MUL | | | | | |
| 13177 | [illegible] | U4HM | U4M | JH4M | JHM | U4XM | UXM | JX4M | JXM | | |
| 13178 | [illegible] | U4BY | U4NY | JNBY | JBNY | JB2Y | JB4Y | JNY | JBY | | |
| 13179 | [illegible] | U4LA | JLHA | JLXA | JLA | | | | | | |
| 13180 | [illegible] | U4/M | J/OM | J/MO | J/M | | | | | | |
| 13181 | [illegible] | B4B3 | B43 | B4B4 | B44 | 5BH3 | 5B3 | 5BH4 | 5B4 | | |
| 13182 | [illegible] | 3QB4 | QB4 | QQQ5 | 3Q5 | | | | | | |
| 13183 | [illegible] | LK44 | LKQ4 | LBK4 | LK4 | | | | | | |
| 13184 | [illegible] | POHL | PTHL | PH4L | PHOL | PHQL | PHL | | | | |
| 13185 | [illegible] | 8AFB | 8A7B | 8A2B | 8AB | | | | | | |
| 13186 | [illegible] | 3T+2 | 3T+8 | 3T[2 | 3T[8 | | | | | | |
| 13187 | [illegible] | 3'B3 | 3'B4 | B3B3 | B4B4 | | | | | | |
| 13188 | [illegible] | 2YHY | =YHY | 2YXY | =YXY | YHMY | YXMY | | | | |
| 13189 | [illegible] | TRT4 | URT4 | | | | | | | | |
| 13190 | [illegible] | OSPC | OSPJ | OSPS | SP3C | SP3J | SP4C | SP4J | SPC | SPJ | SP3 |
| | | SP4S | SPS | OSPC | OSPJ | OSPS | | | | | |
| 13191 | [illegible] | 3EMS | 3EM2 | 3MSS | 3M2S | 3M2 | | | | | |
| 13192 | [illegible] | FNSS | FN2S | F4NS | F4N2 | FNS | FN2 | | | | |
| 13193 | [illegible] | ;TAK | ;UAK | | | | | | | | |
| 13194 | [illegible] | AZ4X | AZ2X | AZX | Z44X | Z24X | Z4EX | Z2EX | Z4X | Z2X | |
| 13195 | [illegible] | G44X | G24X | G4EX | G2EX | | | | | | |
| 13196 | [illegible] | 4JU2 | 4J2 | 4JU8 | 4J8 | 4JUE | | | | | |
| 13197 | [illegible] | -A3G | -AG | TA3G | M3LG | M3G | -3LG | | | | |
| 13198 | [illegible] | 3PT2 | 3P2 | 3PT8 | 3P8 | PPP2 | PPP8 | 34T2 | 34T8 | 4442 | 444 |
| | | 3-42 | 3-48 | | | | | | | | |
| 13199 | [illegible] | HET2 | HE2 | HET8 | HE8 | XET2 | XE2 | XET8 | XE8 | | |
| 13200 | [illegible] | HERS | HER | HOER | H2ER | TXRS | TXR | .XRS | .XR | XERS | XER |
| | | XOER | X2ER | | | | | | | | |
| 13201 | [illegible] | 8SK2 | 8SR2 | 8S22 | 8FK2 | 8FR2 | 8F22 | 87K2 | 87R2 | 8722 | 8KK |
| | | 82K2 | 8K42 | 8RR2 | 82R2 | 8R42 | 8K2 | 8R2 | 8SK8 | 8SR8 | 8S2 |
| | | 8FK8 | 8FR8 | 8F28 | 87K8 | 87R8 | 8728 | 8KK8 | 82K8 | 8K48 | 8RR |
| | | 82R8 | 8R48 | 8K8 | 8R8 | | | | | | |
| 13202 | [illegible] | 3"YB | 'B'B | | | | | | | | |
| 13203 | [illegible] | E4TK | 7TOK | 7TEK | 7TK | | | | | | |
| 13204 | [illegible] | E4M4 | 7-A4 | 7TA4 | 7MY4 | 7M4 | 7-Y4 | | | | |
| 13205 | [illegible] | E4HC | E4HJ | E4HY | 7H+C | 7H+J | 7H+Y | 7HC | 7HJ | 7HY | 7H[ |
| | | 7H[J | 7H[Y | | | | | | | | |
| 13206 | [illegible] | ES3K | E3TK | E3K | DTOK | DTEK | | | | | |
| 13207 | [illegible] | T4B4 | U4B4 | TU45 | T745 | TQ45 | U745 | UQ45 | | | |
| 13208 | [illegible] | TAL4 | TLB4 | TAL5 | TL5 | | | | | | |
| 13209 | [illegible] | 4QHK | 4HQK | 4HK | 4QXK | 4XQK | 4XK | | | | |
| 13210 | [illegible] | T+2G | T+8G | TX2G | TX8G | T[2G | T[8G | | | | |
| 13211 | [illegible] | Y-AE | YTAE | YMOE | Y-OE | Y-E | YME | | | | |
| 13212 | [illegible] | W-AE | WTAE | WMOE | W-OE | W-E | WME | | | | |
| 13213 | [illegible] | H3XL | HX4L | HXOL | HXQL | HXL | X3XL | XX4L | XXOL | XXQL | XXL |
| 13214 | [illegible] | UGKX | GKGX | GKLX | GKX | | | | | | |
| 13215 | [illegible] | $3U4 | $3O4 | $344 | $3Q4 | 63U4 | 63O4 | 6344 | 63Q4 | | |
| 13216 | [illegible] | $TAK | $UAK | 6TAK | 6UAK | | | | | | |
| 13217 | [illegible] | $44X | $24X | $4EX | $2EX | 644X | 624X | 64EX | 62EX | | |
| 13218 | [illegible] | E4HE | 7HOE | 7H2E | 7HE | E4XE | 7XOE | 7X2E | 7XE | | |
| 13219 | [illegible] | E4EA | 7EEA | 7IUA | | | | | | | |
| 13220 | [illegible] | 8AB4 | 8A4 | 8-A5 | 8OA5 | 8A5 | | | | | |

| | | | | | | | | | | | |
|---|---|---|---|---|---|---|---|---|---|---|---|
| 13221 | [illegible] | HEAD | HEUD | HED | H:AD | H:HD | H:D | XEAD | XEUD | XED | X:A |
| | | X:UD | X:D | | | | | | | | |
| 13222 | [illegible] | 4OH: | :H2: | :H8: | :H: | | | | | | |
| 13223 | [illegible] | 8KPC | 8KPS | $P3C | $P3J | $P4C | $P4J | $PC | $P3S | $P4S | $PS |
| | | 6P3C | 6P3J | 6P4C | 6P4J | 6PC | 6P3S | 6P4S | 6PS | | |
| 13224 | [illegible] | U4HE | JHOE | JH2E | JHE | U4XE | JXOE | JX2E | JXE | | |
| 13225 | [illegible] | KAQK | KAUK | KAQ. | KAU. | KA. | | | | | |
| 13226 | [illegible] | L2NA | L2:A | L:NA | LN:A | LNA | L:A | L2TA | LT4A | | |
| 13227 | [illegible] | 3EC4 | 3EJ4 | 37 | | | | | | | |
| 13228 | [illegible] | U4-A | U4-F | U4AF | U4F | J-AF | J-A | J-F | JAF | U4-7 | U4A |
| | | U47 | J-A7 | J-7 | JA7 | | | | | | |
| 13229 | [illegible] | -AB4 | -FB4 | -F4 | AFB4 | AF4 | -7B4 | -74 | A7B4 | A74 | -AF |
| | | -LF5 | -F5 | ALF5 | AF5 | -A75 | -L75 | -75 | AL75 | A75 | -A5 |
| 13230 | [illegible] | 3QK4 | 3UK4 | 3Q.4 | 3U.4 | | | | | | |
| 13231 | [illegible] | 3YH3 | 3YU3 | 3Y3 | | | | | | | |
| 13232 | [illegible] | WYH3 | WYU3 | WY3 | | | | | | | |
| 13233 | [illegible] | 3LHF | LFLF | 3LH7 | L7L7 | | | | | | |
| 13234 | [illegible] | TAKU | TKGU | TAKQ | TKGQ | UAKU | UKGU | UAKQ | UKGQ | | |
| 13235 | [illegible] | 4H+K | 4HOK | 4HK | 4X+K | 4XOK | 4XK | 4H\|K | 4X\|K | | |
| 13236 | [illegible] | 3TAL | TLTL | | | | | | | | |

I claim:

1. A method for inputting information in Chinese through the hieroglyphic approach, comprising the steps of:

(1) establishing a combination in which the Chinese characters are arranged to be correlated with the English letters and symbols on a keyboard in form, pronunciation and meaning;

(2) establishing inputting rules according to said combination which includes:

(i) characters are obtainable with no more than four codes and once the four codes are inputted, the character composed of such indexing codes are automatically displayed without having to press an entering key;

(ii) when a character has repeated portions in construction, this character is code indexed for the repeated portions per se and prefixed with the number of the repeated portions, e.g. 2E, 3S, 4T, etc.; and (iii) any code which is contained in a character but separated by other elements thereof can be code indexed directly, such as the characters " ", " ", " ", " ", " ", " ", and " ", for which the separated indexing codes " ", " ", " ", " ", " ", " ", " ", and " " are taken, respectively; and (v) phrases are indexing coded by direct inputting the first code of each word in the phrase and at the last code, there is added a tone code for avoiding word repetition and increasing the processing speed, for example, the phrases " " is indexing coded by "BNHH2";

(3) establishing arrangement for the keyboard; and (4) installing an interface card for Chinese characters; thereby allowing the Chinese characters which are code indexed according to the hieroglyphic approach to be correlated in form, pronunciation and meaning with the English letters, symbols and numerals arranged on the keyboard.

2. The method as claimed in claim 1, further comprising a step for arranging a conventional standard English language keyboard having the following relationships between the basic radicals of the Chinese characters and the individual keys of the keyboard:

| KEY | CORRESPONDING CHARACTERS |
|---|---|
| A | and characters of like shapes |
| B | and characters of like shapes |
| C | and characters of like shapes |
| D | and characters of like shapes |
| E | and characters of like shapes |
| F | (the radical of ) and characters of like shapes |
| G | and characters of like shapes |
| H | and characters of like shapes |
| I | and characters of like shapes and the radical |
| J | (J resembling a fishhook) and characters of like shapes |
| K | and characters of like shapes |
| L | and characters of like shapes |
| M | (symbolizing men fighting) and characters of like shapes |
| N | and characters of like shapes |
| O | and characters of like shapes |
| P | (the radicals , ) and characters of like shapes |
| Q | and characters of like shapes |
| R | and characters of like shapes |
| S | and characters of like shapes |
| T | and characters of like shapes |
| U | and characters of like shapes |
| V | the radical (relating to briefs) |
| W | the upper portions of |
| X | and the radical |
| Y | and characters of like shapes |
| Z | (relating to a zoo), etc. |
| 2 | and characters of two strokes or having two identical portions |
| 3 | and characters of three strokes or having three identical portions |
| 4 | and characters of like shapes |
| 5 | and characters of like shapes |
| 6 | (used the same as $ for the convenience of code indexing) |
| 7 | ( means the "horse" which is No. 7 of the 12 animals symbolizing the Chinese lunar year) |
| 8 | and the radical |
| 9 | and characters of like shapes |
| 0 | and characters having their periphery shaped like the □ (not including the elements enclosed therein) |
| = | and characters written with two horizontal strokes or dots, two portions |

-continued

| KEY | CORRESPONDING CHARACTERS |
|---|---|
| | separated by two stroke, or having two identical portions |
| + | and characters of like shapes |
| – | (a cloud in the sky), etc. exclusive code for |
| / | the radical and as the exclusive code for character |
| ; | exclusive code for |
| , | exclusive code for and the downward stroke "/" |
| . | and characters comprising one stroke or of like shapes |
| [ | used the same as "+" for the convenience of code indexing |
| ] | exclusive code for the radical |
| = | exclusive code for |
| ! | exclusive code for |
| @ | exclusive code for |
| # | exclusive code for |
| $ | exclusive code for |
| % | exclusive code for |
| | exclusive code for |
| & | exclusive code for |
| ( | exclusive code for |
| ) | exclusive code for |

-continued

3. The method as claimed in claim 1, further comprising a step for indexing the codes according to the following:

| Key | B | P | M | F | D | T | N | L | G |
|---|---|---|---|---|---|---|---|---|---|
| Phenotic Symbol | | | | | | | | | |
| Key | K | H | J | 7 | C | W | ] | + | Z |
| Phenotic Symbol | | | | | | | | | |
| Key | 9 | / | S | – | X | Y | A | O | V |
| Phenotic Symbol | | | | | | | | | |
| Key | E | I | = | 5 | 8 | U | O | R | N |
| Phenotic Symbol | | | | | | | | | |

| Key | SPACE or "." | 1 | 2 | 3 | 4 |
|---|---|---|---|---|---|
| Tones | | | | | |
| | Tone Keys | | | | |

* * * * *